Nov. 3, 1964 R. E. BIBLE ETAL 3,155,816

DIGITAL COMPUTER

Filed Nov. 8, 1957 61 Sheets-Sheet 1

INVENTORS
ROBERT E. BIBLE
EDWARD L. BRAUN
JAMES L. CASS
ROBERT L. McINTYRE
ROBERT R. WILLIAMSON

BY Geo. Sievers
ATTORNEY $j_1 = \bar{J}_1 \bar{N} T$ $\bar{j}_1 = (J_1 + N) T$ $j_2 = (J_1 \bar{J}_2 \bar{J}_5 + N) T$ $\bar{j}_2 = J_1 J_2 \bar{N} T$ $j_3 = J_1 J_2 \bar{J}_3 \bar{N} T$ $\bar{j}_3 = (J_1 J_2 J_3 + N) T$ $j_4 = J_1 J_2 J_3 \bar{J}_4 \bar{N} T$ $\bar{j}_4 = (J_1 J_2 J_3 J_4 + N) T$ $j_5 = J_1 J_2 J_3 J_4 \bar{N} T$ $\bar{j}_5 = (J_1 J_5 + N) T$

*INVENTORS*

ATTORNEY $k_1 = \bar{K}_1 P_{17} T$ $\bar{k}_1 = (K_1 P_{17} + N) T$ $k_2 = K_1 \bar{K}_2 P_{17} T$ $\bar{k}_2 = (K_1 K_2 P_{17} + N) T$ $k_3 = K_1 K_2 \bar{K}_3 P_{17} T$ $\bar{k}_3 = (K_1 K_2 K_3 P_{17} + N) T$ $k_4 = K_1 K_2 K_3 \bar{K}_4 P_{17} T$ $\bar{k}_4 = (K_1 K_2 K_3 K_4 P_{17} + N) T$ $k_5 = K_1 K_2 K_3 K_4 \bar{K}_5 P_{17} T$ $\bar{k}_5 = (K_1 K_2 K_3 K_4 K_5 P_{17} + N) T$ $k_6 = K_1 K_2 K_3 K_4 K_5 \bar{K}_6 P_{17} T$ $\bar{k}_6 = (K_1 K_2 K_3 K_4 K_5 K_6 P_{17} + N) T$ $k_7 = K_1 K_2 K_3 K_4 K_5 K_6 \bar{K}_7 P_{17} T$ $\bar{k}_7 = N T$

*INVENTORS*

ATTORNEY

ATTORNEY

DIGITAL COMPUTER

Filed Nov. 8, 1957

INVENTORS

ATTORNEY $$a_2=\bar{G}_5P_{18}T(A_1\bar{L}_3+A_1L_4+F_1L_3\bar{L}_4)$$

$$\bar{a}_2=\bar{G}_5P_{18}T(\bar{A}_1\bar{L}_3+\bar{A}_1L_4+\bar{F}L_3\bar{L}_4)$$

$$a_3=(y\mathcal{R}P_{2/18}+y\mathcal{R}G_5+\mathcal{R}\bar{S}_1P_{1/17}+\bar{R}Y\bar{G}_5P_{18}+F_2F_3\bar{Y}\bar{G}_5P_{18}+\bar{A}_2S_1\bar{G}_5P_1)T$$

$$\bar{a}_3=(\bar{y}\bar{\mathcal{R}}P_{2/18}+\bar{y}\bar{\mathcal{R}}G_5+\bar{\mathcal{R}}\bar{S}_1P_{1/17}+RY\bar{G}_5P_{18}+\bar{F}_2F_3\bar{Y}\bar{G}_5P_{18}+A_2S_1\bar{G}_5P_1)T$$

INVENTORS

ATTORNEY

Nov. 3, 1964 R. E. BIBLE ETAL 3,155,816

DIGITAL COMPUTER

Filed Nov. 8, 1957 61 Sheets-Sheet 7

$b_1=(B_2\bar{G}_5P_{18}+\alpha L_1\bar{L}_2P_{1/17}+\bar{L}_1\bar{L}_2L_3L_4F_1G_5J_3P_{1/17})T$ $\bar{b}_1=(\bar{B}_2\bar{G}_5P_{18}+\bar{\alpha}\bar{L}_1\bar{L}_2P_{1/17}+\bar{L}_1\bar{L}_2L_3L_4\bar{F}_1G_5J_3P_{1/17})T$

INVENTORS

ATTORNEY

Nov. 3, 1964 R. E. BIBLE ETAL 3,155,816

DIGITAL COMPUTER

Filed Nov. 8, 1957

61 Sheets-Sheet 8

$b_2=\bar{G}_5 P_{18}(B_1\bar{L}_3+B_1\bar{L}_4+F_1 L_3 L_4)T$ $\bar{b}_2=\bar{G}_5 P_{18}(\bar{B}_1\bar{L}_3+\bar{B}\bar{L}_4+\bar{F}_1 L_3 L_4)T$ $b_3=Y_p\bar{S}_1 P_{2/17}\ T$ $\bar{b}_3=S_1(\bar{B}_2 Y+B_2\bar{Y}+\bar{G}_5 P_{17})T$

*INVENTORS*

ATTORNEY $$y=[\bar{Y}\bar{D}\bar{G}_1\bar{G}_5P_{18}+S_1(\bar{A}_2\bar{B}_2\bar{y}_N+A_2\bar{B}_2y_N+\bar{A}_2B_2\bar{Y}+A_2B_2Y)]T$$

$$\bar{y}=[\bar{Y}\bar{D}\bar{G}_1\bar{G}_5P_{18}+S_1(\bar{A}_2\bar{B}_2y_N+A_2\bar{B}_2\bar{y}_N+\bar{A}_2B_2Y+A_2B_2\bar{Y})]T$$

$$y_N=(Y\bar{B}_3+\bar{Y}B_3)T$$

$$\bar{y}_N=(YB_3+\bar{Y}\bar{B}_3)T$$

INVENTORS

ATTORNEY

Nov. 3, 1964

R. E. BIBLE ETAL

DIGITAL COMPUTER 3,155,816

Filed Nov. 8, 1957

61 Sheets-Sheet 10

FIG. 12

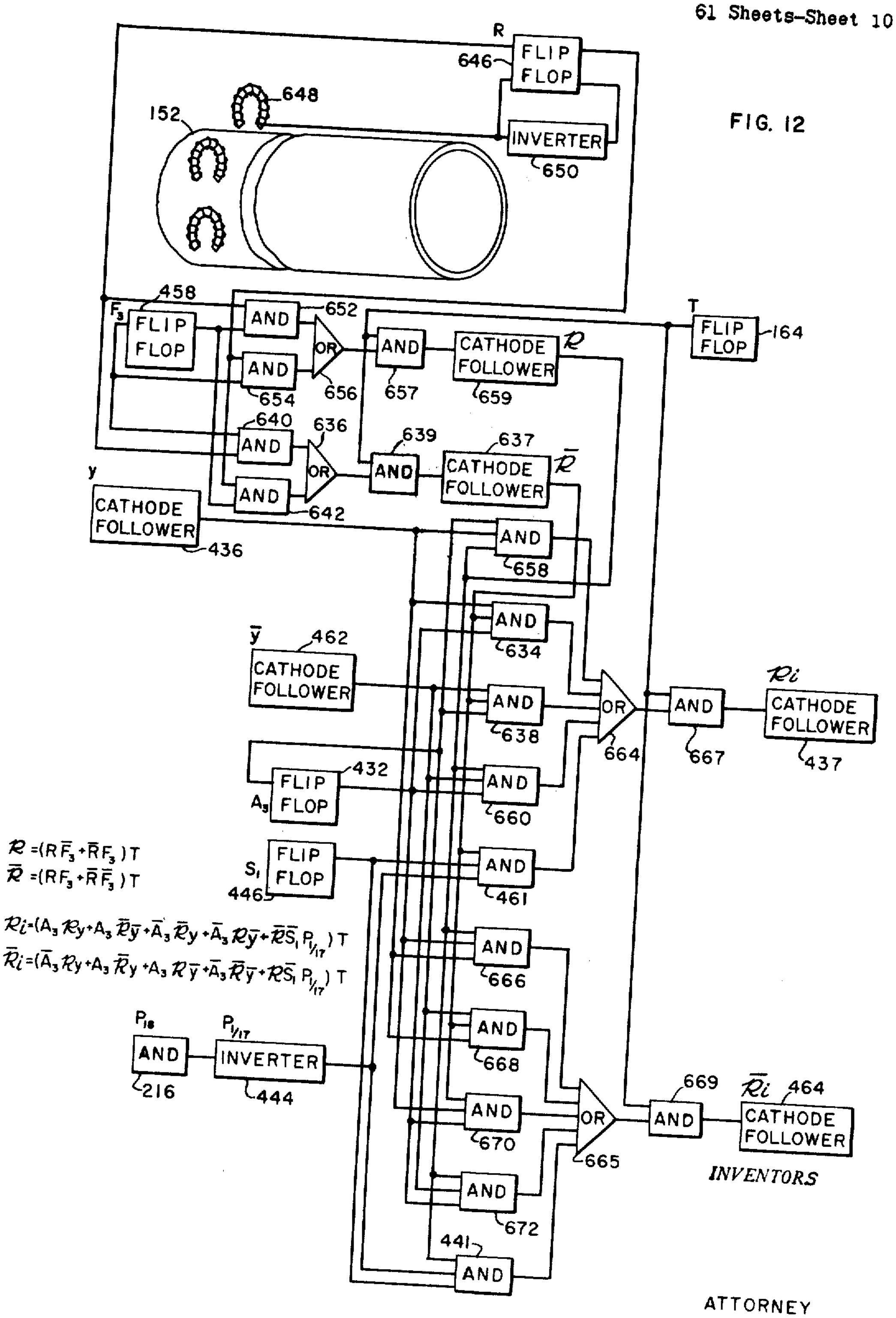

$\mathcal{R} = (R\bar{F}_3 + \bar{R}F_3)T$ $\bar{\mathcal{R}} = (RF_3 + \bar{R}\bar{F}_3)T$ $\mathcal{R}i = (A_3\mathcal{R}y + A_3\bar{\mathcal{R}}\bar{y} + \bar{A}_3\bar{\mathcal{R}}y + \bar{A}_3\mathcal{R}\bar{y} + \bar{\mathcal{R}}\bar{S}_1 P_{1/17})T$ $\bar{\mathcal{R}}i = (\bar{A}_3\mathcal{R}y + A_3\bar{\mathcal{R}}y + A_3\mathcal{R}\bar{y} + \bar{A}_3\bar{\mathcal{R}}\bar{y} + \mathcal{R}\bar{S}_1 P_{1/17})T$

*INVENTORS*

ATTORNEY

INVENTORS

ATTORNEY

INVENTORS

ATTORNEY

Nov. 3, 1964 R. E. BIBLE ETAL 3,155,816

DIGITAL COMPUTER

Filed Nov. 8, 1957 61 Sheets-Sheet 13

$S_1=(Y_p\bar{S}_1P_{2/17}+L_1L_2P_{18})T$ $\bar{S}_1=\bar{G}_5P_{17}T$ $S_2=(U_pS_2J_5+L_2U_pP_{18}+G_1P_1)T$ $\bar{S}_2=(\bar{G}_5P_{17}+C_2'P_{17}+G_1P_{17}+U_pS_2G_1C_2'K_2K_1J_4)T$

*INVENTORS*

ATTORNEY $c_1 = \bar{C}_1 Q L_1 L_2 T P_{1/17}$ $\bar{c}_1 = (C_1 Q L_1 L_2 + L_2 P_{18}) T$ $c_1' = (\bar{C}_1' C_1 \alpha Q L_1 L_2 + \bar{C}_1' \bar{C}_1 \bar{\alpha} Q L_1 L_2) T P_{1/17}$ $\bar{c}_1' = (L_2 P_{18} + Q L_1 L_2 C_1' C_1 \alpha + Q L_1 L_2 \bar{\alpha} C_1' \bar{C}_1) T$ $c_1'' = (L_2 P_{18} + C_1' C_1 \alpha Q L_1 L_2) T$ $\bar{c}_1'' = \alpha \bar{C}_1' \bar{C}_1 Q L_1 L_2 T P_{1/17}$

INVENTORS

ATTORNEY $c_2 = (C_1 L_2 P_{18} + \bar{A}_2 \bar{G}_1 P_1 + C_2' G_1 P_{1/2})T$ $\bar{c}_2 = (\bar{C}_1 L_2 P_{18} + A_2 \bar{G}_1 P_1 + \bar{C}_2' G_1 P_{1/2})T$ $c_3 = (C_2 U S_2 + C_2 U G_1 P_1 + A_2 \bar{S}_2 \bar{G}_1 P_1)T$ $\bar{c}_3 = (\bar{C}_2 \bar{U} S_2 + \bar{A}_2 \bar{S}_2 \bar{G}_1 P_1 + L_2 P_{18})T$

*INVENTORS*

ATTORNEY $c_2' = (C_1' L_2 P_{18} + \bar{L}_1 \bar{L}_2 \bar{G}_5 P_{18} + \bar{C}_2'' G_1 P_1 + E_4 G_1 \bar{P}_2)\, T$ $\bar{c}_2' = [(\bar{C}_1' L_2 P_{18} + L_1 \bar{L}_2 \bar{G}_5 P_{18} + C_2'' G_1 P_1 + \bar{E}_4 G_1 P_2 + \bar{G}_1 P_{17} (\bar{D} + \bar{F}_2 + \mathcal{U} + \mathcal{R}_i)(D + F_2 + \bar{\mathcal{U}} + \mathcal{R}_i)]\, T$

INVENTORS

ATTORNEY

Nov. 3, 1964　　R. E. BIBLE ETAL　　3,155,816

DIGITAL COMPUTER

Filed Nov. 8, 1957　　61 Sheets-Sheet 17

$C_2'' = (C_1'' L_2 P_{18} + B_2 \bar{G}_1 P_1 + \mathcal{E} S_2 G_1 + \mathcal{E} G_1 P_1 + Y_p G_1 P_1 \bar{G}_5) T$ $\bar{C}_2'' = (\bar{C}_1'' L_2 P_{18} + \bar{B}_2 \bar{G}_1 P_1 + \bar{\mathcal{E}} \bar{Y}_p G_1 P_1 + \bar{\mathcal{E}} G_5 G_1 P_1) T$

INVENTORS

ATTORNEY $f_1 = ({}_0Z\bar{L}_1\bar{L}_2L_3L_4P_{1/17} + A_1\bar{G}_5L_3\bar{L}_4P_{18} + B_1\bar{G}_5L_3L_4P_{18})\,T$ $\bar{f}_1 = ({}_0\bar{Z}\bar{L}_1\bar{L}_2L_3L_4P_{1/17} + \bar{A}_1\bar{G}_5L_3\bar{L}_4P_{18} + \bar{B}_1\bar{G}_5L_3L_4P_{18})\,T$

*INVENTORS*

ATTORNEY

Nov. 3, 1964 R. E. BIBLE ETAL 3,155,816

DIGITAL COMPUTER

Filed Nov. 8, 1957 61 Sheets-Sheet 19

$f_2 = (\bar{Z}_4 G_5 P_{12} + D \mathcal{U} \mathcal{R}_i C_2' \bar{G}_1 G_5 P_{17} + \bar{L}_1 \bar{L}_2 L_3 \bar{L}_4 \bar{J}_4 \bar{J}_5)\, T$ $\bar{f}_2 = [\bar{G}_5 P_{18} + \bar{D} \mathcal{U} \bar{\mathcal{R}}_i C_2' \bar{G}_1 G_5 P_{17} + (\bar{B}_2 A_2 + B_2 \bar{A}_2)\, Y_p \bar{S}_1 P_{2/17} \bar{G}_5]\, T$

*INVENTORS*

ATTORNEY $$f_3=[G_5P_{16}+C_2'\bar{F}_3\bar{G}_1G_5P_{18}+(YA_2+\bar{Y}\bar{A}_2)F_2Y_p\bar{S}_1P_{2/17}]\,T$$

$$\bar{f}_3=F_3T[\bar{G}_5P_{18}+\bar{a}C_2'\bar{G}_1P_{17}(\bar{R}\bar{F}_2+RF_2)+(a+\bar{C}_2'+J_1+\bar{J}_5+G_1)(R\bar{F}_2+\bar{R}F_2)]$$

*INVENTORS*

ATTORNEY

INVENTORS

ATTORNEY

Nov. 3, 1964

R. E. BIBLE ETAL 3,155,816

DIGITAL COMPUTER

Filed Nov. 8, 1957

61 Sheets-Sheet 22

$e_2 = (E_3 P_{1/4} K_2 + \bar{\varepsilon} S_2 E_4 K_2 P_{5/18}) T$ $\bar{e}_2 = (\bar{E}_3 P_{1/4} K_2 + \varepsilon S_2 \bar{E}_4 K_2 P_{5/18}) T$ $e_3 = (E_4 P_{1/4} K_2 + \bar{\varepsilon} S_2 E_4 K_2 P_{5/18}) T$ $\bar{e}_3 = (\bar{E}_4 P_{1/4} K_2 + \varepsilon S_2 \bar{E}_4 K_2 P_{5/18}) T$ $e_4 = (\varepsilon S_2 K_2 P_{3/17} + U_p K_2 P_1) T$ $\bar{e}_4 = (\bar{\varepsilon} S_2 K_2 P_{3/17} + \bar{U}_p K_2 P_1) T$

*INVENTORS*

ATTORNEY $g_1 = L_2 P_{18} T$ $\bar{g}_1 = \bar{L}_2 \bar{G}_5 P_{18} T$ $g_2 = \varepsilon \bar{G}_2 N T$ $\bar{g}_2 = (\bar{\beta} G_2 N + \bar{\alpha} G_2 N) T$ $g_5 = (\bar{L}_3 \bar{L}_4 P_{18} + \bar{L}_1 \bar{L}_2 P_{18}) T$ $\bar{g}_5 = S_1 P_1 T$

INVENTORS

ATTORNEY $_oy = T(\alpha y_N S_1 \bar{G}_3 + \alpha A_2 \bar{S}_1 P_{2/17} + \alpha Y \bar{S}_1 P_{18} + \bar{\alpha} Y_P S_1 + \bar{\alpha} V_\mu \bar{S}_1 + Y_P G_3 S_1)$ $_o\bar{y} = T(\alpha \bar{y}_N S_1 \bar{G}_3 + \alpha \bar{A}_2 \bar{S}_1 P_{2/17} + \alpha \bar{Y} \bar{S}_1 P_{18} + \bar{\alpha} \bar{Y}_P S_1 + \bar{\alpha} \bar{V}_\mu \bar{S}_1 + \bar{Y}_P G_3 S_1)$

INVENTORS

ATTORNEY $\cdot r = (\bar{\alpha} G_1 P_{17} + \bar{\alpha} G_5 P_{17} + \bar{\alpha} \bar{G}_1 P_{18} + \alpha \mathcal{R}_i G_1 + \alpha \mathcal{R}_N \bar{G}_1) T$ $\cdot \bar{r} = (\bar{\alpha} \bar{G}_5 P_1 + \bar{\alpha} \bar{S}_1 P_1 + \alpha \bar{\mathcal{R}}_i G_1 + \alpha \bar{\mathcal{R}}_N \bar{G}_1) T$

INVENTORS

ATTORNEY $_{o}U = [\alpha(\mathcal{U}_N + \bar{U}\bar{S}_2G_1P_1 + C_2''\bar{S}_2G_1P_{18}) + \bar{\alpha}U_P]T$ $_{o}\bar{U} = [\alpha(\bar{\mathcal{U}}_N S_2 + U\bar{S}_2P_1 + \bar{C}_2''\bar{S}_2P_{18} + \bar{S}_2\bar{G}_1) + \bar{\alpha}\bar{U}_P]T$

INVENTORS

ATTORNEY $Z = \alpha T[\bar{G}_1 P_{18}(A_1\bar{L}_1 + A_1\bar{G}_5 + \Delta\mu L_1 L_3 G_5 + \Delta R L_1 \bar{L}_3 G_5) + Z_2 P$
$G_1 P_{18}(\bar{D} C_2'' + Z_2 U \bar{C}_2'' \bar{Y}_P + \bar{Z}_2 \bar{U} C_2'' + \bar{Z}_2 \bar{C}_2'' Y_P) + P_1(A_3\bar{G}_5 + A_3\bar{S}_1 + B_1 G_5 S_1)]$

*INVENTORS*

ATTORNEY

Nov. 3, 1964 R. E. BIBLE ETAL 3,155,816

DIGITAL COMPUTER

Filed Nov. 8, 1957 61 Sheets-Sheet 28

$$°\bar{Z}=\left[\bar{\alpha}+\bar{G}_1P_{18}(\bar{A}_1\bar{L}_1+\bar{A}_1\bar{G}_5+\Delta\bar{\mu}L_1L_3G_5+\Delta\bar{R}L_1\bar{L}_3G_5)+\bar{Z}_2P_{2/17}+G_1P_{18}(DC_2''+\bar{Z}_2U\bar{C}_2''\bar{Y}_p+Z_2\bar{U}\bar{C}_2''+Z_2\bar{C}_2''Y_p)+P_1(\bar{A}_3\bar{G}_5+\bar{A}_3\bar{S}_1+\bar{B}_1G_5S_1)\right]T$$

*INVENTORS*

ATTORNEY

| COUNT | ($J_1$) FLIP FLOP 170 | ($J_2$) FLIP FLOP 180 | ($J_3$) FLIP FLOP 190 | ($J_4$) FLIP FLOP 200 | ($J_5$) FLIP FLOP 210 |
|---|---|---|---|---|---|
| 1 | R | R | R | R | R |
| 2 | L | R | R | R | R |
| 3 | R | L | R | R | R |
| 4 | L | L | R | R | R |
| 5 | R | R | L | R | R |
| 6 | L | R | L | R | R |
| 7 | R | L | L | R | R |
| 8 | L | L | L | R | R |
| 9 | R | R | R | L | R |
| 10 | L | R | R | L | R |
| 11 | R | L | R | L | R |
| 12 | L | L | R | L | R |
| 13 | R | R | L | L | R |
| 14 | L | R | L | L | R |
| 15 | R | L | L | L | R |
| 16 | L | L | L | L | R |
| 17 | R | R | R | R | L |
| 18 | L | R | R | R | L |

INVENTORS

ATTORNEY

| COUNT | ($K_1$) FLIP FLOP 234 | ($K_2$) FLIP FLOP 244 | ($K_3$) FLIP FLOP 254 | ($K_4$) FLIP FLOP 262 | ($K_5$) FLIP FLOP 264 | ($K_6$) FLIP FLOP 266 | ($K_7$) FLIP FLOP 268 |
|---|---|---|---|---|---|---|---|
| 1 | R | R | R | R | R | R | R |
| 2 | L | R | R | R | R | R | R |
| 3 | R | L | R | R | R | R | R |
| 4 | L | L | R | R | R | R | R |
| 5 | R | R | L | R | R | R | R |
| — | — | — | — | — | — | — | — |
| 9 | R | R | R | L | R | R | R |
| 10 | L | R | R | L | R | R | R |
| 11 | R | L | R | L | R | R | R |
| — | — | — | — | — | — | — | — |
| 17 | R | R | R | R | L | R | R |
| 18 | L | R | R | R | L | R | R |
| — | — | — | — | — | — | — | — |
| 33 | R | R | R | R | R | L | R |
| 34 | L | R | R | R | R | L | R |
| 35 | R | L | R | R | R | L | R |
| 36 | L | L | R | R | R | L | R |
| — | — | — | — | — | — | — | — |
| 65 | R | R | R | R | R | R | L |
| — | — | — | — | — | — | — | — |
| 81 | R | R | R | R | L | R | L |
| 82 | L | R | R | R | L | R | L |
| — | — | — | — | — | — | — | — |
| 97 | R | R | R | R | R | L | L |
| — | — | — | — | — | — | — | — |
| 122 | L | R | R | L | L | L | L |
| 123 | R | L | R | L | L | L | L |
| 124 | L | L | R | L | L | L | L |
| 125 | R | R | L | L | L | L | L |

INVENTORS

ATTORNEY

| $\mathcal{Y}$ | $\mathcal{R}$ | $(A_3)_n$ | $\mathcal{R}i$ | $(A_3)_{n+1}$ | $a_3$ | $\bar{a}_3$ |
|---|---|---|---|---|---|---|
| 0 | 0 | 0 | 0 | 0 | 0 | 0 |
| 0 | 0 | 1 | 1 | 0 | 0 | 1 |
| 0 | 1 | 0 | 1 | 0 | 0 | 0 |
| 0 | 1 | 1 | 0 | 1 | 0 | 0 |
| 1 | 0 | 0 | 1 | 0 | 0 | 0 |
| 1 | 0 | 1 | 0 | 1 | 0 | 0 |
| 1 | 1 | 0 | 0 | 1 | 1 | 0 |
| 1 | 1 | 1 | 1 | 1 | 0 | 0 |

INVENTORS

ATTORNEY

FIG. 37

| −dZ VALUES (+1, −1) | $\mathcal{U}$ at $P_{17}$ VALUES (−2, 0) | CARRY D AT $P_{18}$ VALUES (0,+2) | $\mathcal{E}$ d $\mathcal{R}$ |
|---|---|---|---|
| 0 | 0 | 0 | −1 |
| 0 | 0 | 1 | +1 (E) |
| 0 | 1 | 0 | −3 |
| 0 | 1 | 1 | −1 |
| 1 | 0 | 0 | +1 |
| 1 | 0 | 1 | +3 |
| 1 | 1 | 0 | −1 (E) |
| 1 | 1 | 1 | +1 |

FIG. 38

| $\mathcal{U}$ AT $P_{17}$ | $\mathcal{R}i$ AT $P_{17}$ | CARRY D AT $P_{17}$ | CARRY D AT $P_{18}$ |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

*INVENTORS*

ATTORNEY

Nov. 3, 1964 R. E. BIBLE ETAL 3,155,816

DIGITAL COMPUTER

Filed Nov. 8, 1957 61 Sheets-Sheet 33

*INVENTORS*

ATTORNEY

*INVENTORS*

ATTORNEY

| ε d U COUNT | $C_1$ | $C_1'$ | $C_1''$ |
|---|---|---|---|
| +3 | 1 | 1 | 1 |
| +2 | 0 | 1 | 1 |
| +1 | 1 | 0 | 1 |
| 0 | 0 | 0 | 1 |
| −1 | 1 | 1 | 0 |
| −2 | 0 | 1 | 0 |
| −3 | 1 | 0 | 0 |

INVENTORS

ATTORNEY

FIG. 44

| BINARY DIGITAL ERROR, E- POSITION 17 | 1 10 9 8 7 6 5 4 3 2 | DECIMAL VALUE | ERROR REGISTER CODING $E_4$ $E_3$ $E_2$ |
|---|---|---|---|
| 0———— | 0 1 1 1 1 1 1 1 1 1 | +511 | 0 1 1 |
| 0———— | 0 1 1 1 1 1 1 1 1 0 | +510 | 0 1 1 |
| | ⋮ | ⋮ | ⋮ |
| 0———— | 0 0 1 1 0 1 0 0 0 0 | +208 | 0 1 1 |
| | ⋮ | ⋮ | ⋮ |
| 0———— | 0 0 0 0 0 0 1 0 1 1 | | |
| 0———— | 0 0 0 0 0 0 1 0 1 1 | | |
| 0———— | 0 0 0 0 0 0 1 0 1 1 | +10 | 0 1 1 |
| 0———— | 0 0 0 0 0 0 1 0 0 0 | +9 | 0 1 1 |
| 0———— | 0 0 0 0 0 0 0 1 1 1 | +8 | 0 1 1 |
| 0———— | 0 0 0 0 0 0 0 1 1 1 | +7 | 0 1 1 |
| 0———— | 0 0 0 0 0 0 0 1 0 1 | +6 | 0 1 1 |
| 0———— | 0 0 0 0 0 0 0 1 0 0 | +5 | 0 1 1 |
| 0———— | 0 0 0 0 0 0 0 0 1 1 | +4 | 0 1 1 |
| 0———— | 0 0 0 0 0 0 0 0 1 0 | +3 | 0 1 1 |
| 0———— | 0 0 0 0 0 0 0 0 0 1 | +2 | 0 1 1 |
| 0———— | 0 0 0 0 0 0 0 0 0 0 | +1 | 0 0 1 |
| 1———— | 1 1 1 1 1 1 1 1 1 1 | 0 | 0 0 0 |
| 1———— | 1 1 1 1 1 1 1 1 1 0 | -1 | 1 1 1 |
| 1———— | 1 1 1 1 1 1 1 1 0 1 | -2 | 1 1 0 |
| 1———— | 1 1 1 1 1 1 1 1 0 0 | -3 | 1 0 1 |
| 1———— | 1 1 1 1 1 1 1 0 1 1 | -4 | 1 0 0 |
| 1———— | 1 1 1 1 1 1 1 0 1 1 | -5 | 1 0 0 |
| 1———— | 1 1 1 1 1 1 1 0 0 1 | -6 | 1 0 0 |
| 1———— | 1 1 1 1 1 1 1 0 0 1 | -7 | 1 0 0 |
| 1———— | 1 1 1 1 1 1 0 1 1 1 | -8 | 1 0 0 |
| 1———— | 1 1 1 1 1 1 0 1 1 0 | -9 | 1 0 0 |
| 1———— | 1 1 1 1 1 1 0 1 0 1 | -10 | 1 0 0 |
| | | -11 | 1 0 0 |
| | ⋮ | ⋮ | ⋮ |
| 1———— | 1 0 1 0 1 0 0 0 0 0 | -352 | 1 0 0 |
| | ⋮ | ⋮ | ⋮ |
| 1———— | 1 0 0 0 0 0 0 0 1 0 | -510 | 1 0 0 |
| 1———— | 1 0 0 0 0 0 0 0 0 1 | -511 | 1 0 0 |
| 1———— | 1 0 0 0 0 0 0 0 0 0 | -512 | 1 0 0 |

PROPORTIONAL REGION $P_{17}$ $P_{16}$ $P_{15}$ $P_{14}$ $P_{13}$ $P_{12}$ $P_{11}$ $P_{10}$ $P_9$ $P_8$ $P_7$ $P_6$ $P_5$ $P_4$ $P_3$ $P_2$ $P_1$ $P_0$ ←TIME

*INVENTORS*

ATTORNEY

FIG. 46
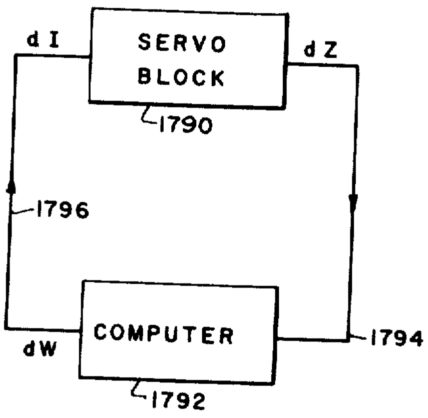
FIG. 47
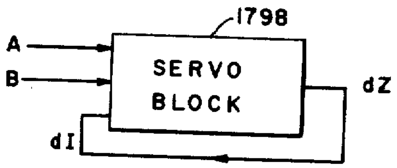
FIG. 48
| NORMAL SERVO OPERATION | | | | ADDITION OF +1 INCREMENT IN "ZERO-RATE" SERVO | | | | ADDITION OF −1 INCREMENT IN "ZERO-RATE" SERVO | | | |
|---|---|---|---|---|---|---|---|---|---|---|---|
| COUNT | $C_1''$ | $C_1'$ | $C_1$ | $C_2''$ | $C_2'$ | $C_2$ | $C_3$ | $C_2''$ | $C_2'$ | $C_2$ | $C_3$ |
| +3 | 1 | 1 | 1 | 0 | 1 | 0 | 1 | 0 | 1 | 0 | 0 |
| +1 | 1 | 0 | 1 | 0 | 0 | 0 | 1 | 0 | 0 | 0 | 0 |
| −1 | 0 | 1 | 1 | 1 | 1 | 0 | 1 | 1 | 1 | 0 | 0 |
| −3 | 0 | 0 | 1 | 1 | 0 | 0 | 1 | 1 | 0 | 0 | 0 |
*INVENTORS*
ATTORNEY

INVENTORS

ATTORNEY

INVENTORS
ROBERT E. BIBLE
EDWARD L. BRAUN
JAMES L. CASS
ROBERT L. McINTYRE
ROBERT R. WILLIAMSON
BY
ATTORNEY

Nov. 3, 1964 R. E. BIBLE ETAL 3,155,816

DIGITAL COMPUTER

Filed Nov. 8, 1957 61 Sheets-Sheet 40

INVENTORS
ROBERT E. BIBLE
EDWARD L. BRAUN
JAMES L. CASS
ROBERT L. McINTYRE
ROBERT R. WILLIAMSON

BY

ATTORNEY

INVENTORS
ROBERT E. BIBLE
EDWARD L. BRAUN
JAMES L. CASS
ROBERT L. McINTYRE
ROBERT R. WILLIAMSON
BY
ATTORNEY

INVENTORS
ROBERT E. BIBLE
EDWARD L. BRAUN
JAMES L. CASS
ROBERT L. McINTYRE
ROBERT R. WILLIAMSON
BY
ATTORNEY

INVENTORS
ROBERT E. BIBLE
EDWARD L. BRAUN
JAMES L. CASS
ROBERT L. McINTYRE
ROBERT R. WILLIAMSON
BY
ATTORNEY

INVENTORS
ROBERT E. BIBLE
EDWARD L. BRAUN
JAMES L. CASS
ROBERT L. MC INTYRE
ROBERT R. WILLIAMSON

BY

ATTORNEY

INVENTORS
ROBERT E. BIBLE
EDWARD L. BRAUN
JAMES L. CASS
ROBERT L. McINTYRE
ROBERT R. WILLIAMSON

BY

ATTORNEY

INVENTORS
ROBERT E. BIBLE
EDWARD L. BRAUN
JAMES L. CASS
ROBERT L. McINTYRE
ROBERT R. WILLIAMSON

BY

ATTORNEY

INVENTORS
ROBERT E. BIBLE
EDWARD L. BRAUN
JAMES L. CASS
ROBERT L. McINTYRE
ROBERT R. WILLIAMSON
BY
ATTORNEY

INVENTORS
ROBERT E. BIBLE
EDWARD L. BRAUN
JAMES L. CASS
ROBERT L. McINTYRE
ROBERT R. WILLIAMSON
BY
ATTORNEY

INVENTORS
ROBERT E. BIBLE
EDWARD L. BRAUN
JAMES L. CASS
ROBERT L. McINTYRE
ROBERT R. WILLIAMSON

BY

ATTORNEY

INVENTORS
ROBERT E. BIBLE
EDWARD L. BRAUN
JAMES L. CASS
ROBERT L. McINTYRE
ROBERT R. WILLIAMSON

BY

ATTORNEY

DIGITAL COMPUTER

Filed Nov. 8, 1957

INVENTORS
ROBERT E. BIBLE
EDWARD L. BRAUN
JAMES L. CASS
ROBERT L. McINTYRE
ROBERT R. WILLIAMSON
BY
ATTORNEY

INVENTORS
ROBERT E. BIBLE
EDWARD L. BRAUN
JAMES L. CASS
ROBERT L. Mc INTYRE
ROBERT R. WILLIAMSON
BY
ATTORNEY

INVENTORS
ROBERT E. BIBLE
EDWARD L. BRAUN
JAMES L. CASS
ROBERT L. McINTYRE
ROBERT R. WILLIAMSON
BY
ATTORNEY

INVENTORS
ROBERT E. BIBLE
EDWARD L. BRAUN
JAMES L. CASS
ROBERT L. McINTYRE
ROBERT R. WILLIAMSON
BY
ATTORNEY

FIG. 67

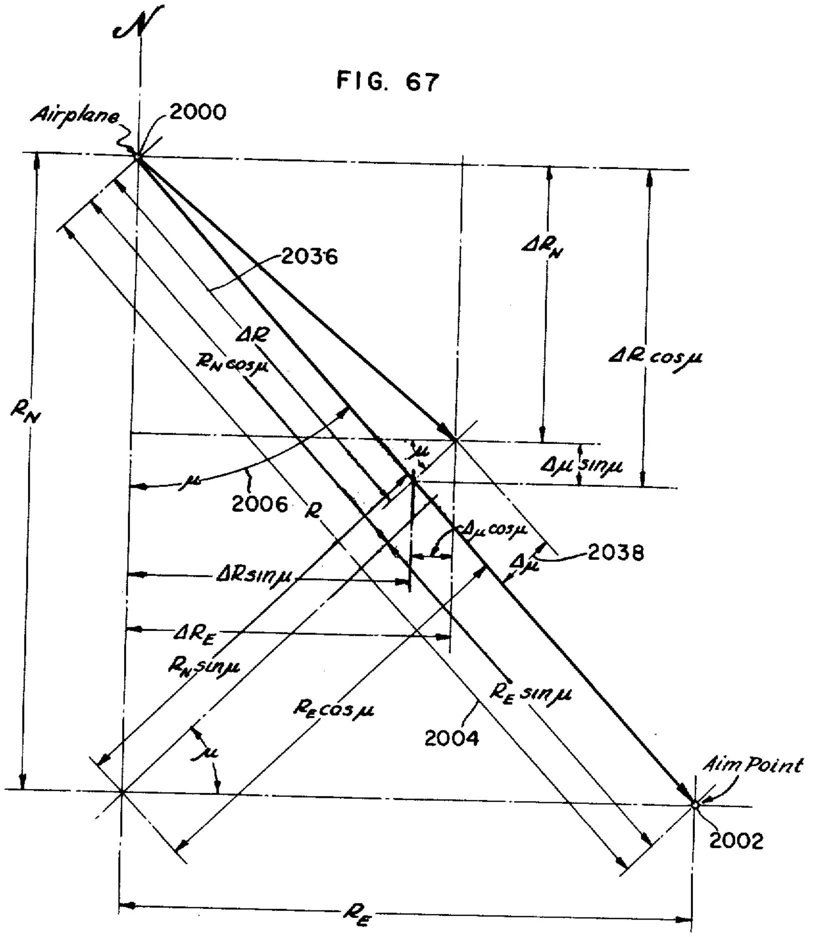

$$\Delta R_E = \Delta R\sin\mu + \Delta\mu\cos\mu$$

$$\Delta R_N = \Delta R\cos\mu + \Delta\mu\sin\mu$$

$$\Delta V_{WN} = \frac{1}{t_R}\Delta R\sin\mu + \frac{1}{t_\mu}\Delta\mu\cos\mu$$

$$\Delta V_{WN} = \frac{1}{t_R}\Delta R\cos\mu + \frac{1}{t_\mu}\Delta\mu\sin\mu$$

$$R = R_N\cos\mu + R_E\sin\mu.$$

$$R_N\sin\mu - R_E\cos\mu = 0.$$

INVENTORS
ROBERT E. BIBLE
EDWARD L. BRAUN
JAMES L. CASS
ROBERT L. McINTYRE
ROBERT R. WILLIAMSON
BY
ATTORNEY $$V_{gN} = V_A \cos\theta + V_W \cos\omega$$
$$V_{gE} = V_A \sin\theta + V_W \sin\theta$$
$$V_g = V_{gN} \cos\eta + V_{gE} \sin\eta$$

INVENTORS
ROBERT E. BIBLE
EDWARD L. BRAUN
JAMES L. CASS
ROBERT L. McINTYRE
ROBERT R. WILLIAMSON
BY

ATTORNEY $t_R = \overline{T}_R \varepsilon_R N$ $\overline{t}_R = T_R N$ $t_U = \overline{T}_U \varepsilon_U NT$ $\overline{t}_U = T_U NT$ INVENTORS
ROBERT E. BIBLE
EDWARD L. BRAUN
JAMES L. CASS
ROBERT L. McINTYRE
ROBERT R. WILLIAMSON
BY
ATTORNEY $B_E = V_{g_E} t_f + C_{T_E}$
$B_N = V_{g_N} t_f + C_{TN}$ INVENTORS
ROBERT E. BIBLE
EDWARD L. BRAUN
JAMES L. CASS
ROBERT L. McINTYRE
ROBERT R. WILLIAMSON
BY
ATTORNEY $$V_W = V_{WN}\cos\omega + V_{WE}\sin\omega$$
$$V_{WN}\sin\omega - V_{WE}\cos\omega = 0$$

$$A_E = R_E + S_E = R\sin\mu + S\sin\psi$$
$$A_N = R_N + S_N = R\cos\mu + S\cos\psi$$

INVENTORS
ROBERT E. BIBLE
EDWARD L. BRAUN
JAMES L. CASS
ROBERT L. McINTYRE
ROBERT R. WILLIAMSON
BY
ATTORNEY

FIG. 75

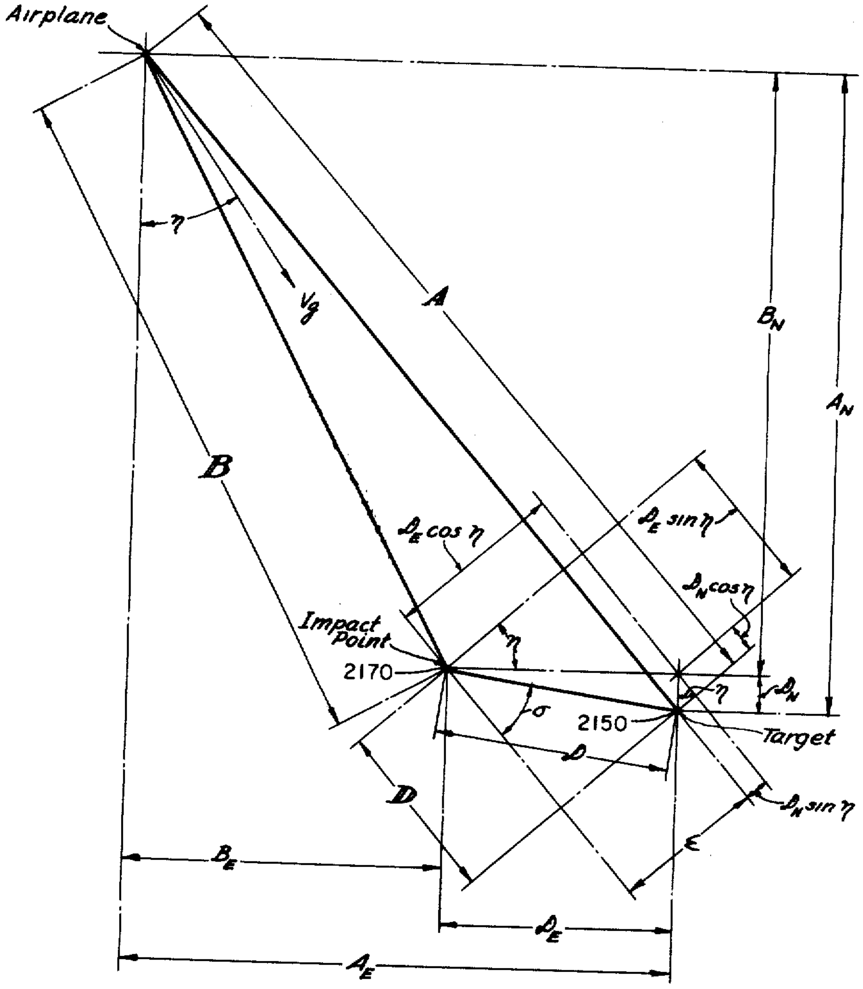

$\mathcal{D}_N = A_N - B_N$ $\mathcal{D}_E = A_E - B_E$ $D = \mathcal{D}_E \sin\eta + \mathcal{D}_N \cos\eta$ $\epsilon = \mathcal{D}_E \cos\eta - \mathcal{D}_E \sin\eta$ $\sigma = \tan\frac{\epsilon}{D} \approx \frac{\epsilon}{D} \approx \frac{\epsilon}{D+K} \approx \frac{\epsilon}{|D|+K+|\epsilon|}$ INVENTORS
ROBERT E. BIBLE
EDWARD L. BRAUN
JAMES L. CASS
ROBERT L. McINTYRE
ROBERT R. WILLIAMSON
BY
ATTORNEY Nov. 3, 1964 R. E. BIBLE ETAL 3,155,816

DIGITAL COMPUTER

Filed Nov. 8, 1957 61 Sheets-Sheet 61

$$r = R\cos\phi + (H_p - H_A)\sin\phi$$

$$R\sin\phi - (H_p - H_A)\cos\phi = 0.$$

INVENTORS
ROBERT E. BIBLE
EDWARD L. BRAUN
JAMES L. CASS
ROBERT L. McINTYRE
ROBERT R. WILLIAMSON

BY

ATTORNEY

United States Patent Office 3,155,816

Patented Nov. 3, 1964

3,155,816
DIGITAL COMPUTER

Robert E. Bible, Burbank, Edward L. Braun, Los Angeles, James L. Cass, Burbank, Robert L. McIntyre, La Crescenta, and Robert R. Williamson, Sunland, Calif., assignors to General Precision, Inc., a corporation of Delaware Filed Nov. 8, 1957, Ser. No. 697,299
23 Claims. (Cl. 235—151)

This invention relates to digital computers for solving mathematical problems on an incremental basis, and more particularly to digital differential analyzers for operating on an incremental basis to solve differential problems. The invention is also concerned with apparatus including a digital differential analyzer for controlling the movements of an output member such as an aircraft in accordance with computations provided by the digital differential analyzer.

In recent years a whole new field of computation has been made possible. In this field computations of complex mathematical problems are obtained automatically and in relatively short periods of time in comparison to the laborious processes required to obtain mathematical solutions mentally and manually. The new field of computation has been opened up because of the vast strides which have been made in electronic techniques and circuitry for solving the problems.

Various types of computers have been built in recent years. In general these computers may be classified into two categories. One type of computer indicates values on an incremental basis such that various numbers are indicated by combinations of signals in a plurality of digital positions. For example a decimal value such as "57" may be indicated in binary form as 111001, where the least significant digit is at the right. Since this type of computer indicates different values by various combinations of signal indications, it is known as a "digital computer." This type of computer has the advantage of obtaining accurate solutions to problems in a short time.

Other computers operate on whole numbers rather than breaking numbers down into a plurality of different signal indications. For example, a value such as "57" may be indicated by a single potential of 57 volts. These computers are known as "analogue computers." They have the advantage of being small and compact, but they do not solve problems with the accuracy obtained from the digital machines. Analogue machines for solving differential equations are known as differential analyzers.

Relatively recently the digital computer and differential analyzer have been combined to obtain a machine having the advantages of both in obtaining the solution of differential equations. This type of computer is known as a "digital differential analyzer." It solves differential equations on a digital basis and requires relatively little equipment and a relatively short time to obtain accurate solutions.

Although the digital differential analyzers now in use have solved certain problems, many problems still have required solution. For example, the digital differential analyzers now in use have been too large to be used as control instruments for controlling the operation of an output member. This has been especially true when the output member has been an aircraft since size and weight are vital considerations in the design of an aircraft. The problems have resulted not only from size and weight but also have resulted from relative inaccuracies in operation. Furthermore, various techniques have not been devised to make the analyzer sufficiently flexible for use as a control instrument. Because of this, digital differential analyzers have not been capable of use until now in apparatus for controlling the movements of an output member in accordance with computations provided by the digital differential analyzer.

This invention provides a digital differential analyzer for overcoming the above disadvantages. For example, the digital differential analyzer constituting this invention is able to solve the products of two numbers in a single block instead of requiring three or more blocks as in previous analyzers. Furthermore, the digital differential analyzer constituting this invention is able to solve a product operation in the block at the same time as the block is performing another operation such as a servo operation. By performing two operations simultaneously and by minimizing the number of blocks required for such operations as the determination of products, the size and weight of the digital differential analyzer constituting this invention is considerably reduced below the size and weight of the analyzers now in use.

The digital differential analyzer constituting this invention is also able to provide increased accuracy over those obtained by previous analyzers. By way of illustration, the digital differential analyzer constituting this invention utilizes new servo techniques which minimize errors in the calculations of certain quantities. As another example, more than one block can be used to indicate certain quantities when these quantities have to be indicated with increased accuracy. By increasing the number of digital positions to represent the quantity, increased accuracies are obtained.

The digital differential analyzer constituting this invention is also advantageous in that it provides increased flexibilities in operation over the analyzers now in use. For example, a block in the analyzer may receive increments from two different sources for a particular quantity in the block. At certain times, the quantity in the block should accept increments from one of the sources and at other times should accept increments from the other sources. At still other times the particular quantity in the block should accept increments from both sources.

The digital differential analyzer constituting this invention operates automatically to control whether the particular quantity in the block accepts increments from one of the other sources or from both sources. This mode of operation is designated in this application as "deleted address." By way of illustration, the mode designated as "deleted address" may be used in conjunction with a mode designated as "rate solution" to project the position of an aircraft from previous computations by the digital differential analyzer when contemporary indications from measuring apparatus such as radar equipment are not being received. When the indications from the radar equipment are being received by the digital differential analyzer, the signal indications from the mode designated as "rate solution" will not be accepted since such signal indications are not required to determine the position of the aircraft.

Because of the advanced techniques used in the digital differential analyzer constituting this invention, increased accuracies in operation are obtained at the same time that space and size are minimized. Furthermore, the use of new techniques in the digital differential analyzer constituting this invention has increased the flexibility in the operation of the computer and has caused new problems to be solved not previously capable of solution. Because of these advantages, the digital differential analyzer constituting this invention has been able to be included in apparatus for controlling the operation of an output member such as an aircraft. The combination of the digital differential analyzer in such apparatus is also considered to be a novel feature of this invention. This is especially true when the output member is represented by an aircraft.

FIGURES 4 to 30, inclusive, are circuit diagrams illustrating in block form various portions of a digital differential analyzer forming a part of this invention.

Figure 30:
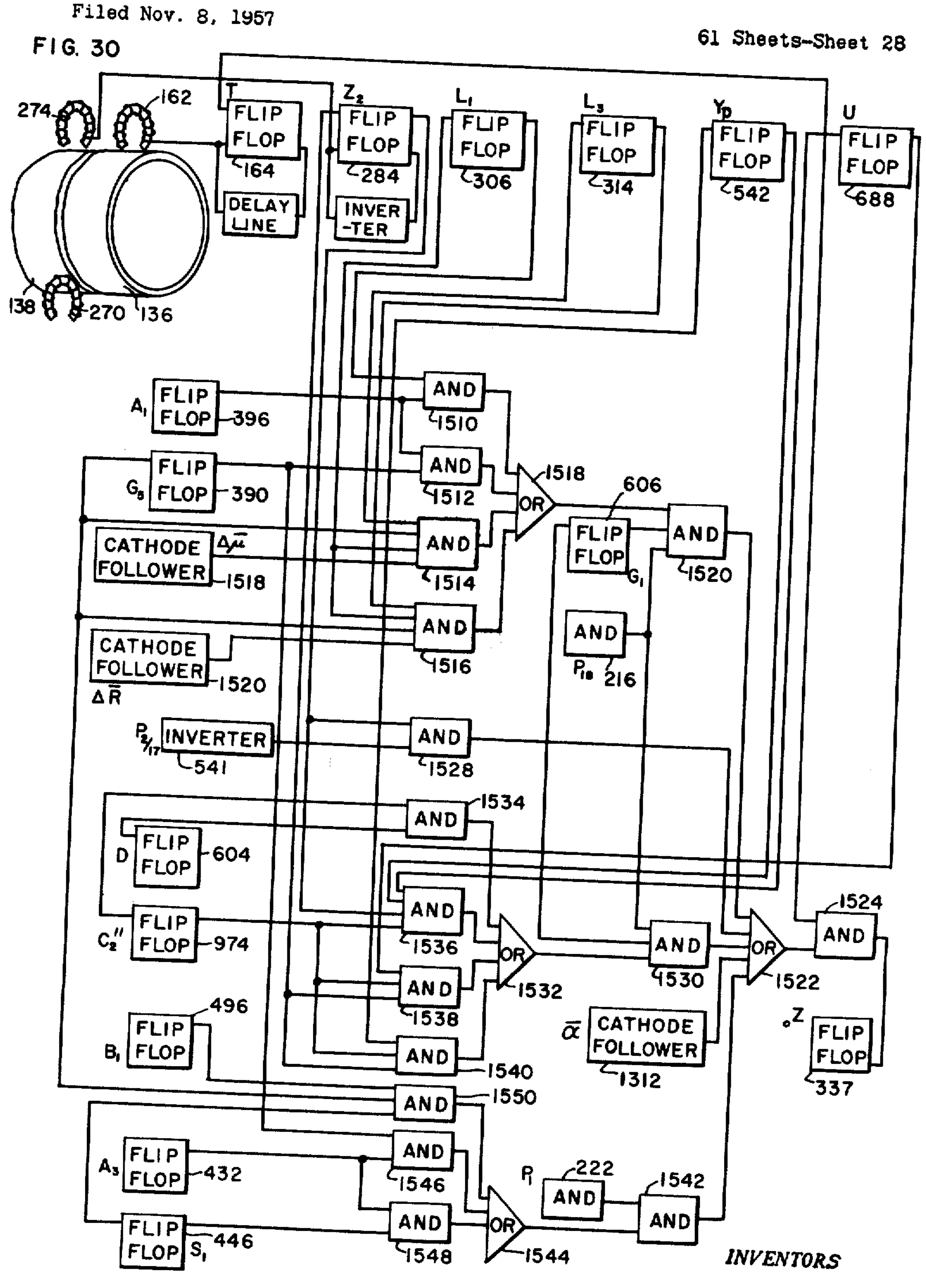
Figures 31, 32:
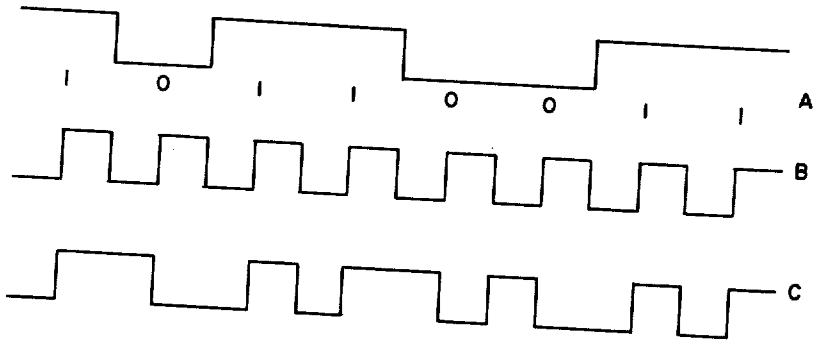

FIGURE 31 shows a number of curves illustrating the operation of the digital differential analyzer represented in block form in FIGURES 4 to 30, inclusive, when the digital differential analyzer is used with a particular type of reading and recording system.

Figure 4:
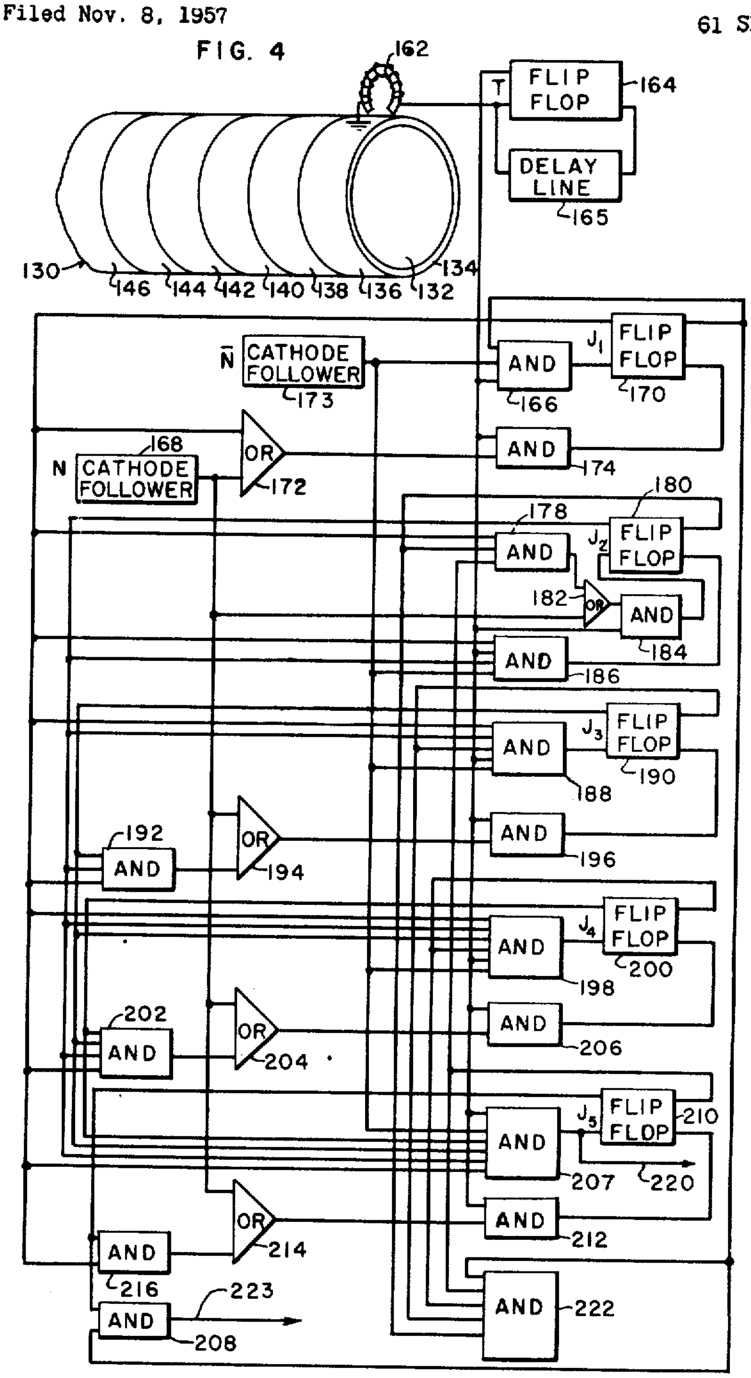

FIGURE 32 is a table illustrating the operation of the stages shown in FIGURE 4 in counting a plurality of numbers on a cyclic basis.

Figure 5:
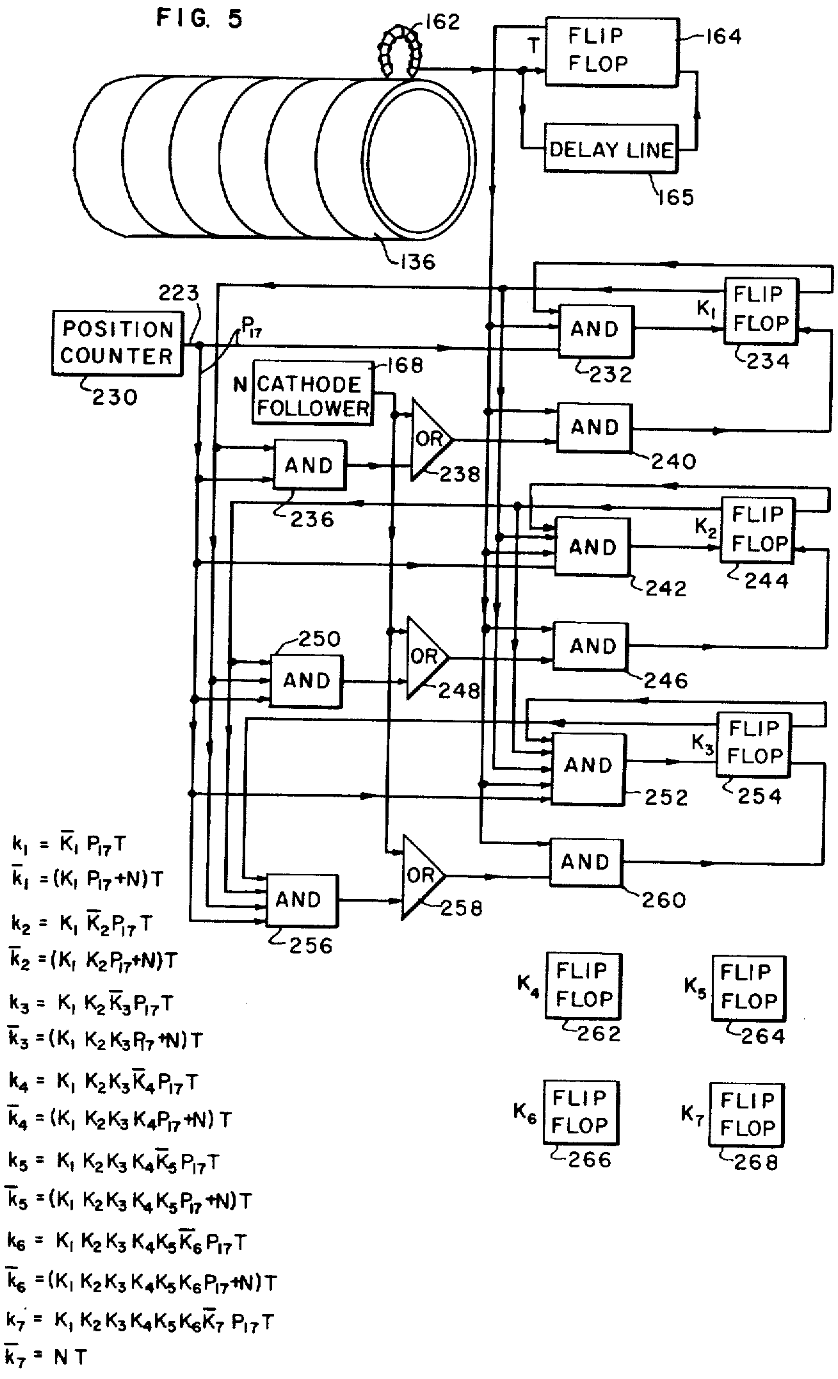
Figures 33, 34:
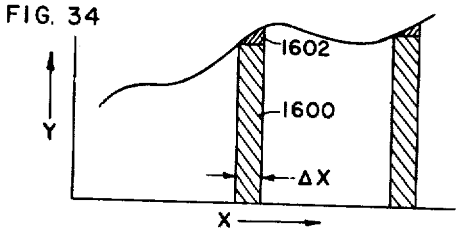

FIGURE 33 is a table illustrating the operation of the stages shown in FIGURE 5 in counting the number of times that the stages shown in FIGURE 4 complete a count and resume a new count.

FIGURE 34 is a curve somewhat schematically illustrating the operation of the digital differential analyzer in solving a differential equation on a digital basis.

FIGURE 35 is a block diagram somewhat schematically illustrating the inter-relationship between a plurality of blocks when the blocks are programmed to solve a particular problem.

Figure 8:
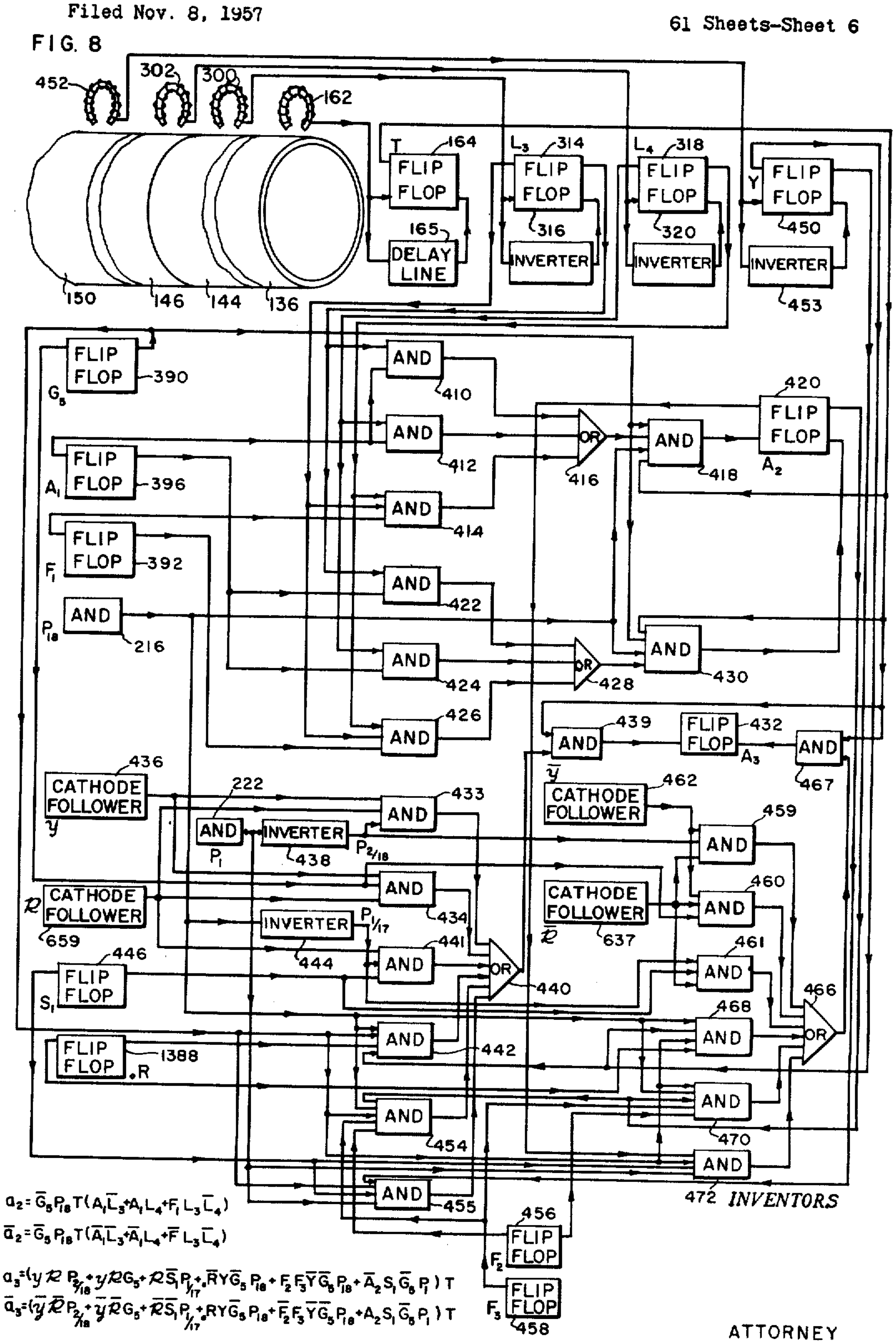
Figure 36:
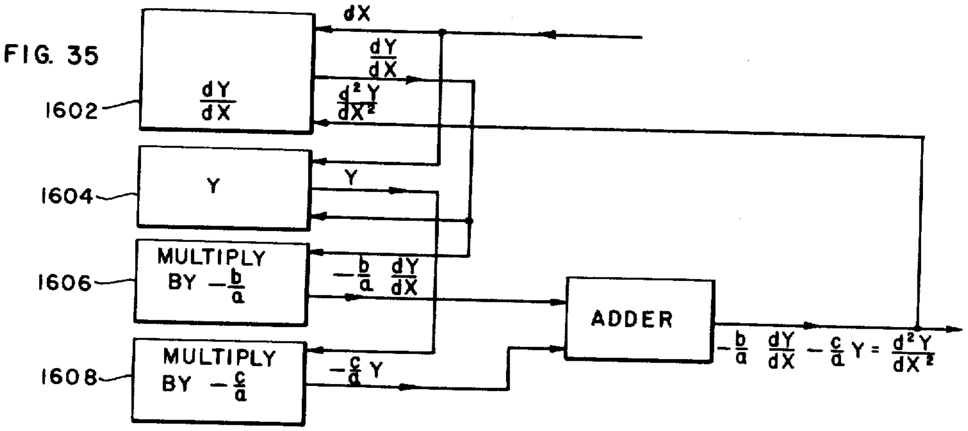

FIGURE 36 is a table providing further information relative to the operation of certain stages shown in FIGURE 8.

Figure 18:
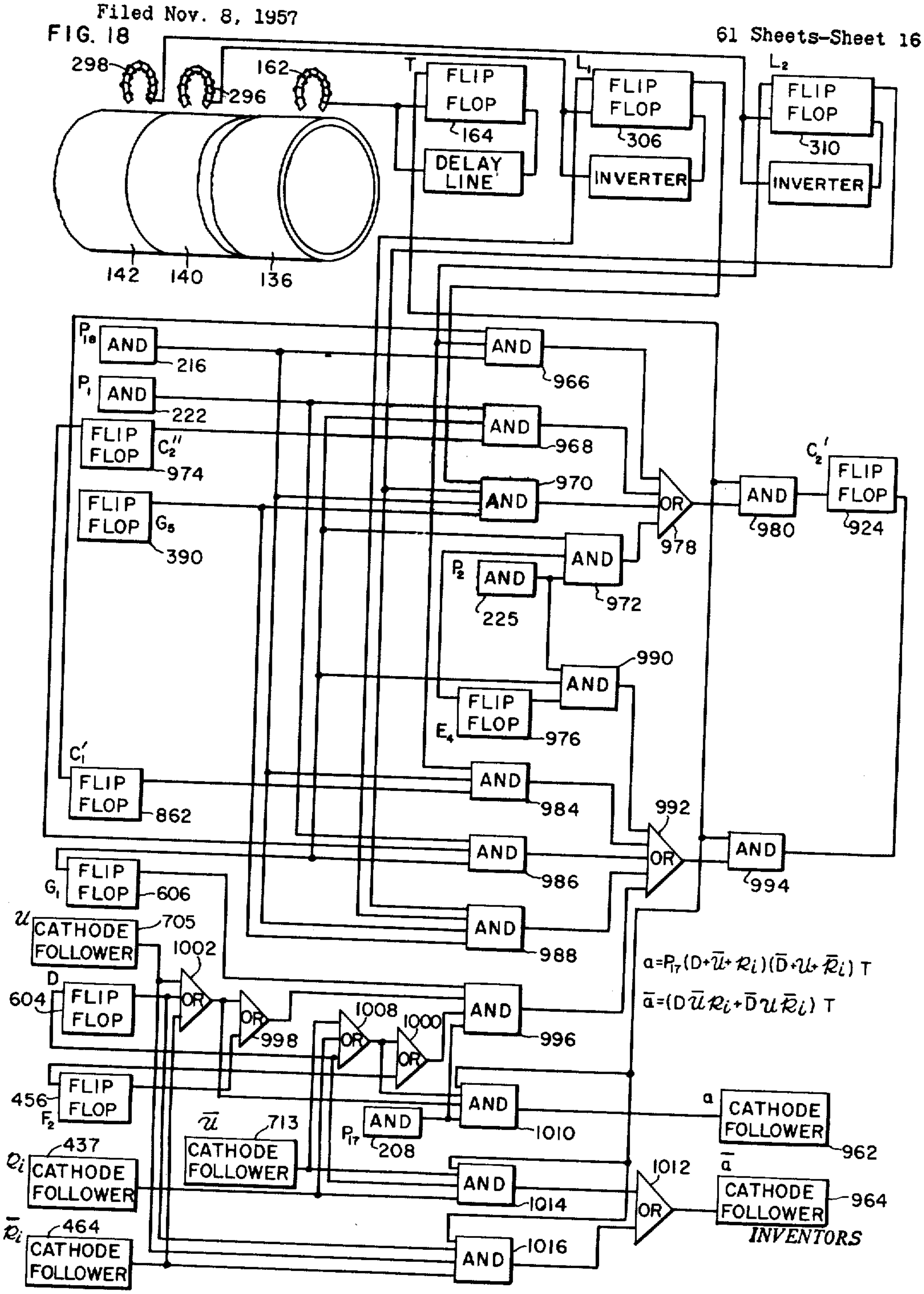
Figure 21:
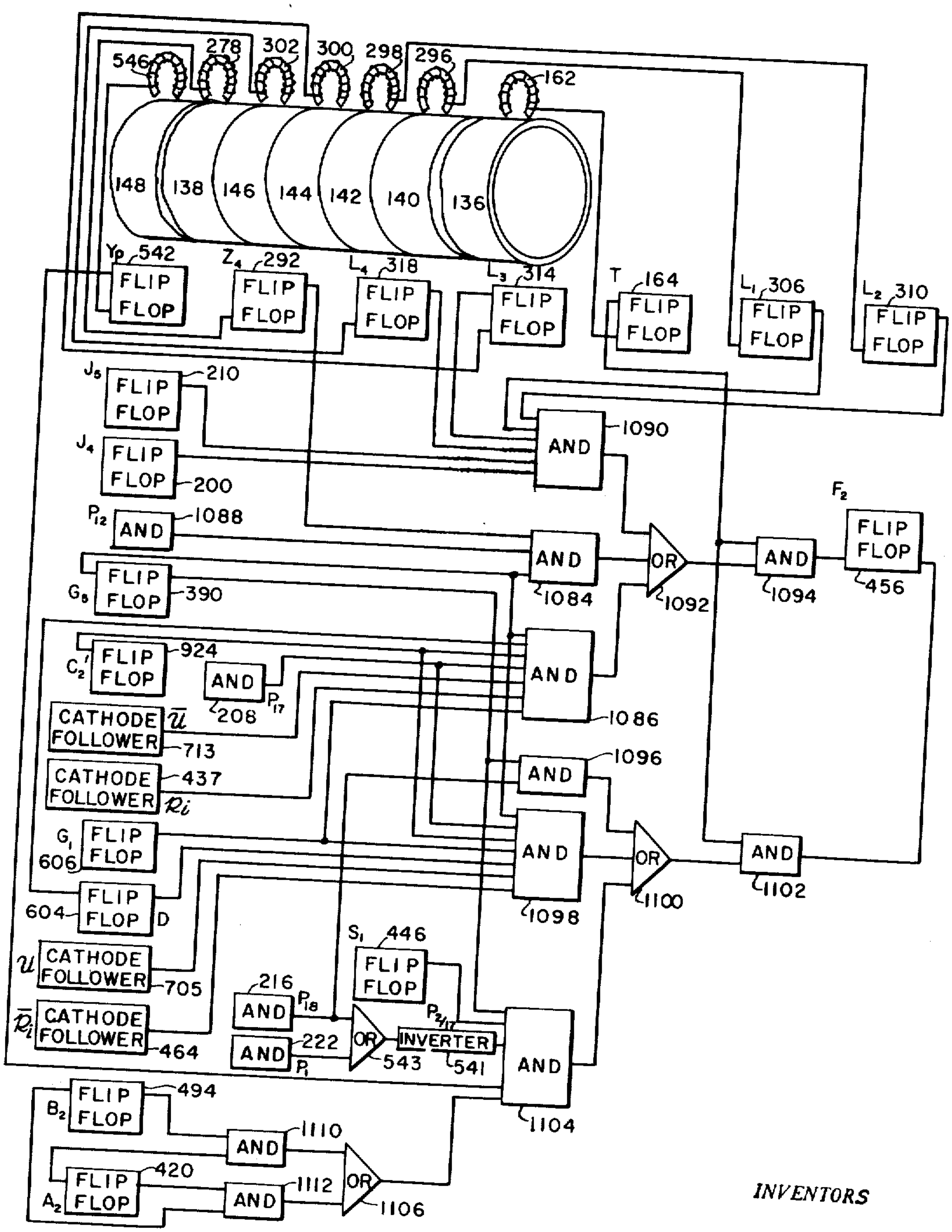
Figure 22:
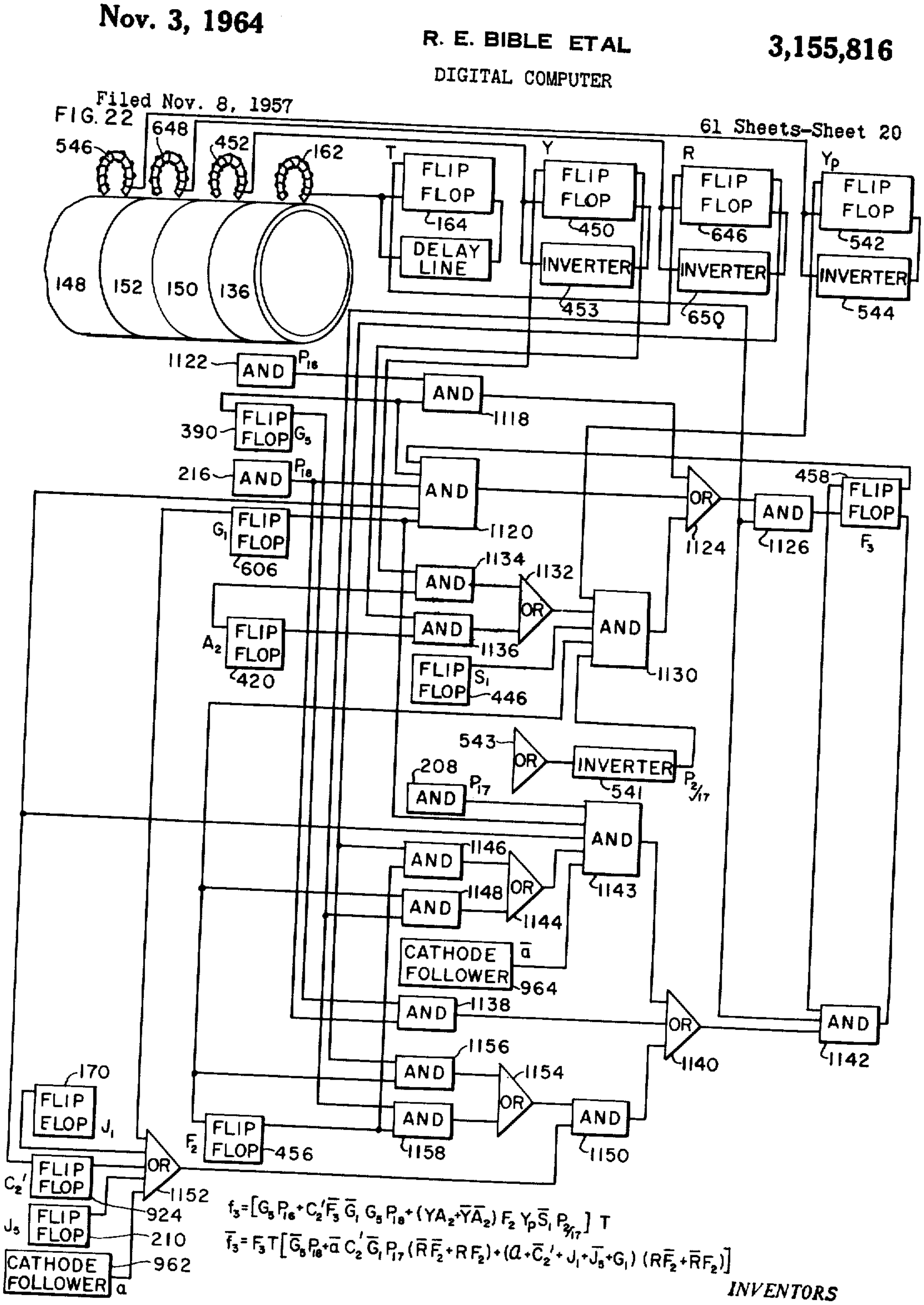

FIGURES 37 and 38 are tables providing further information relating to the operation of certain stages shown in FIGURES 18, 21 and 22.

Figure 39:
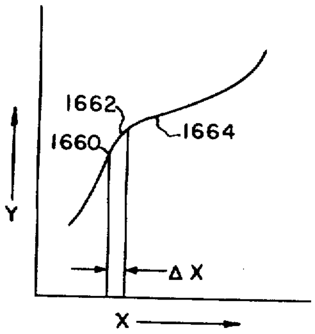

FIGURE 39 is a curve illustrating the principle of extrapolation used by the digital differential analyzer shown in FIGURES 4 to 30, inclusive, to increase the accuracy of computation.

Figure 40:
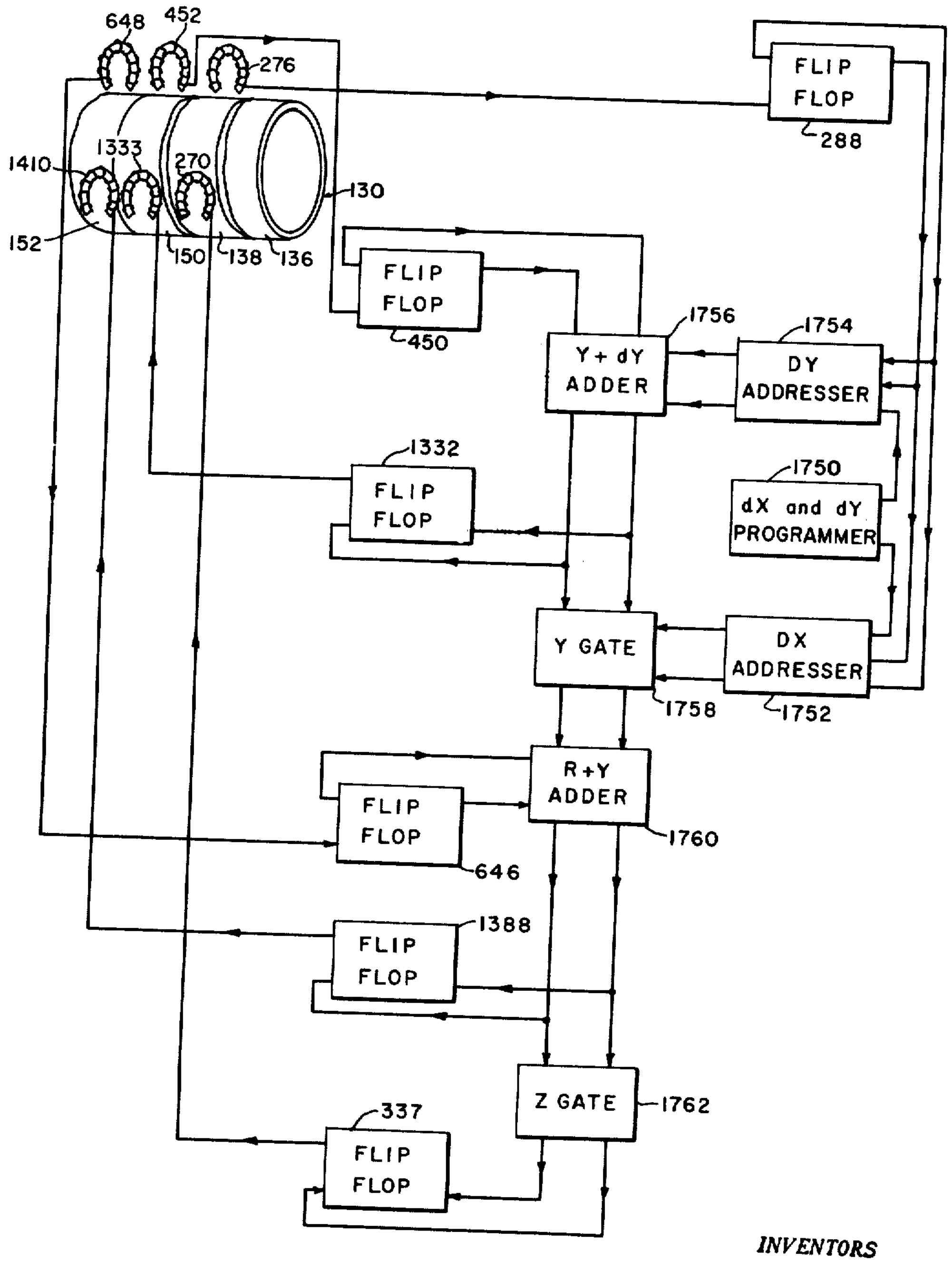

FIGURE 40 is a simplified block diagram illustrating how the various stages in the digital differential analyzer shown in FIGURES 4 to 30, inclusive, are interrelated to perform a "normal" type of integration.

Figure 41:
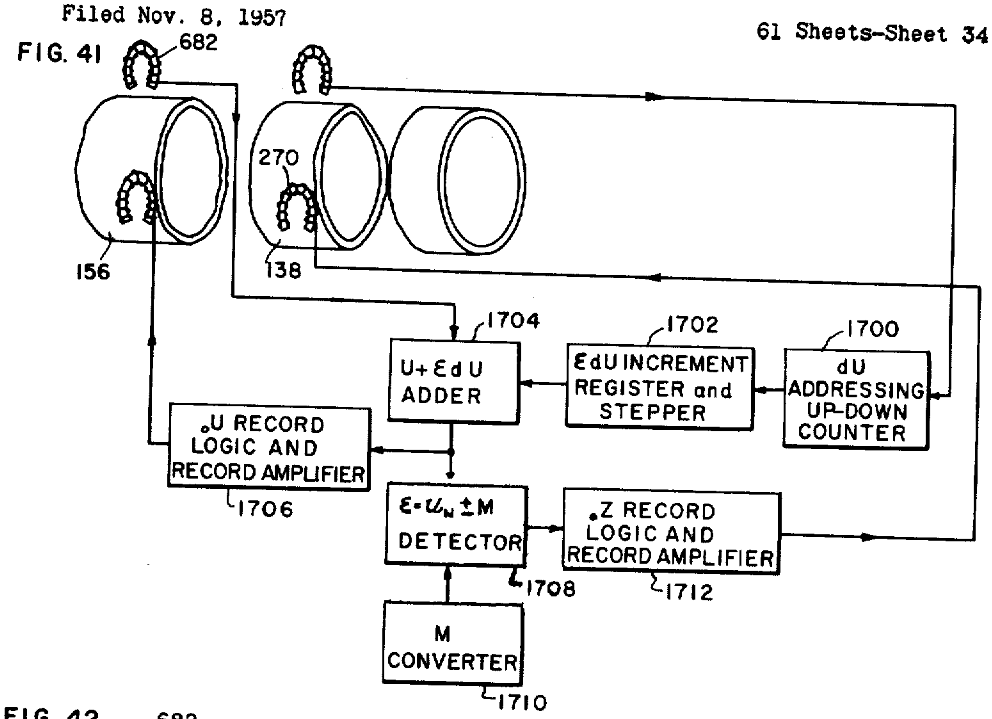

FIGURE 41 is a simplified block diagram illustrating one type of a servo operation used in the digital differential analyzer shown in FIGURES 4 to 30, inclusive.

Figure 42:
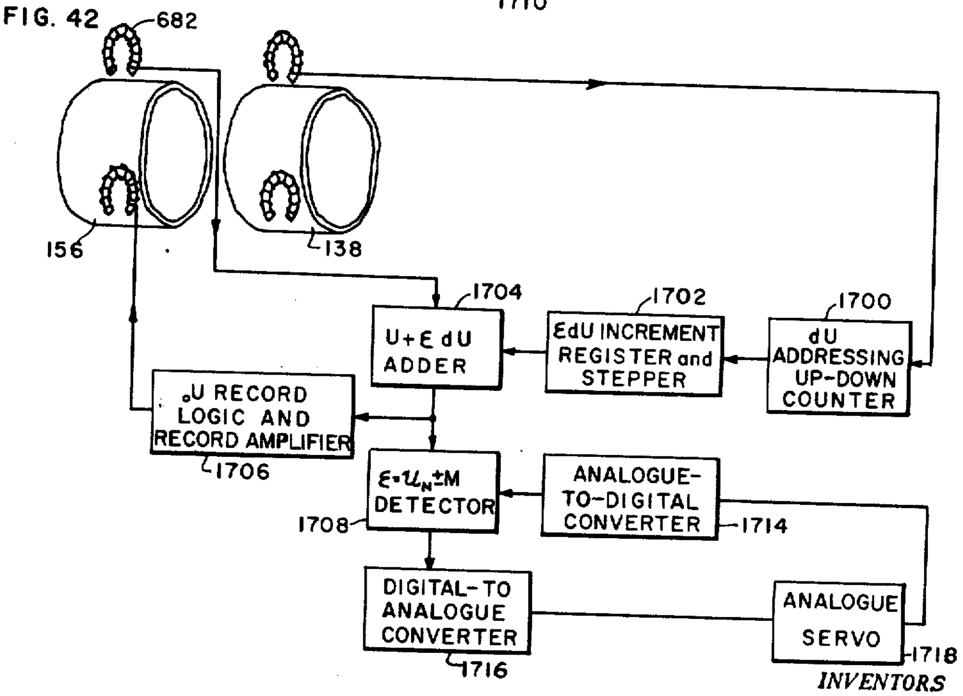

FIGURE 42 is a simplified block diagram illustrating another type of servo operation used in the digital differential analyzer shown in FIGURES 4 to 30, inclusive.

Figure 16:
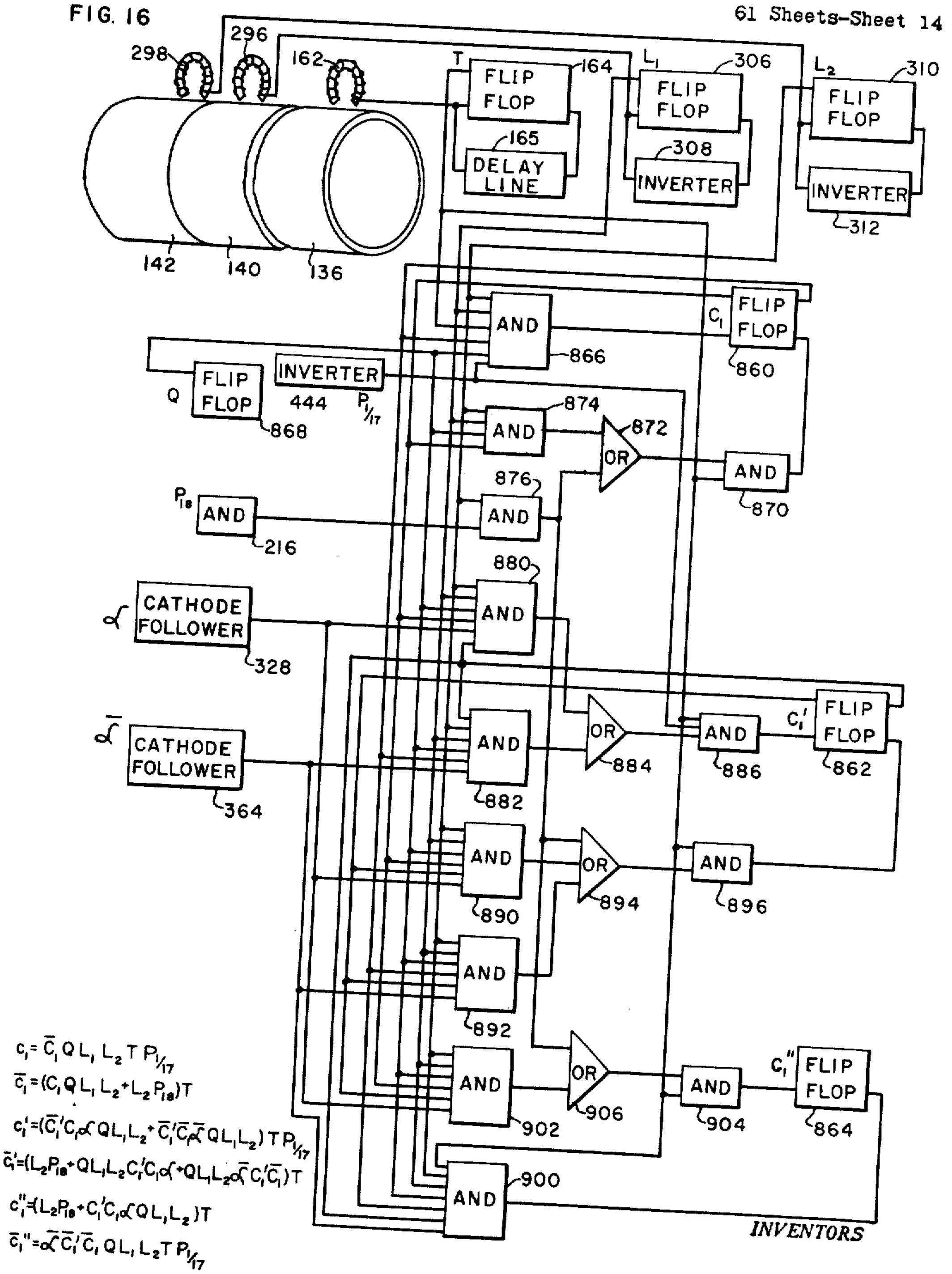
Figures 43, 45:
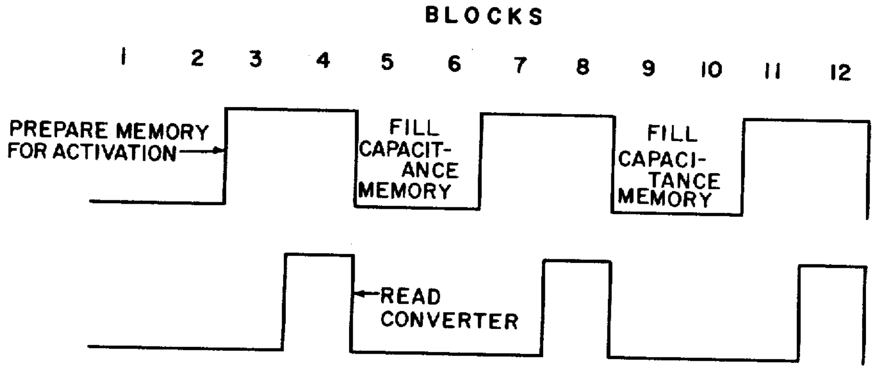

FIGURE 43 is a table providing further information relating to the operation of certain stages shown in FIGURE 16.

Figure 23:
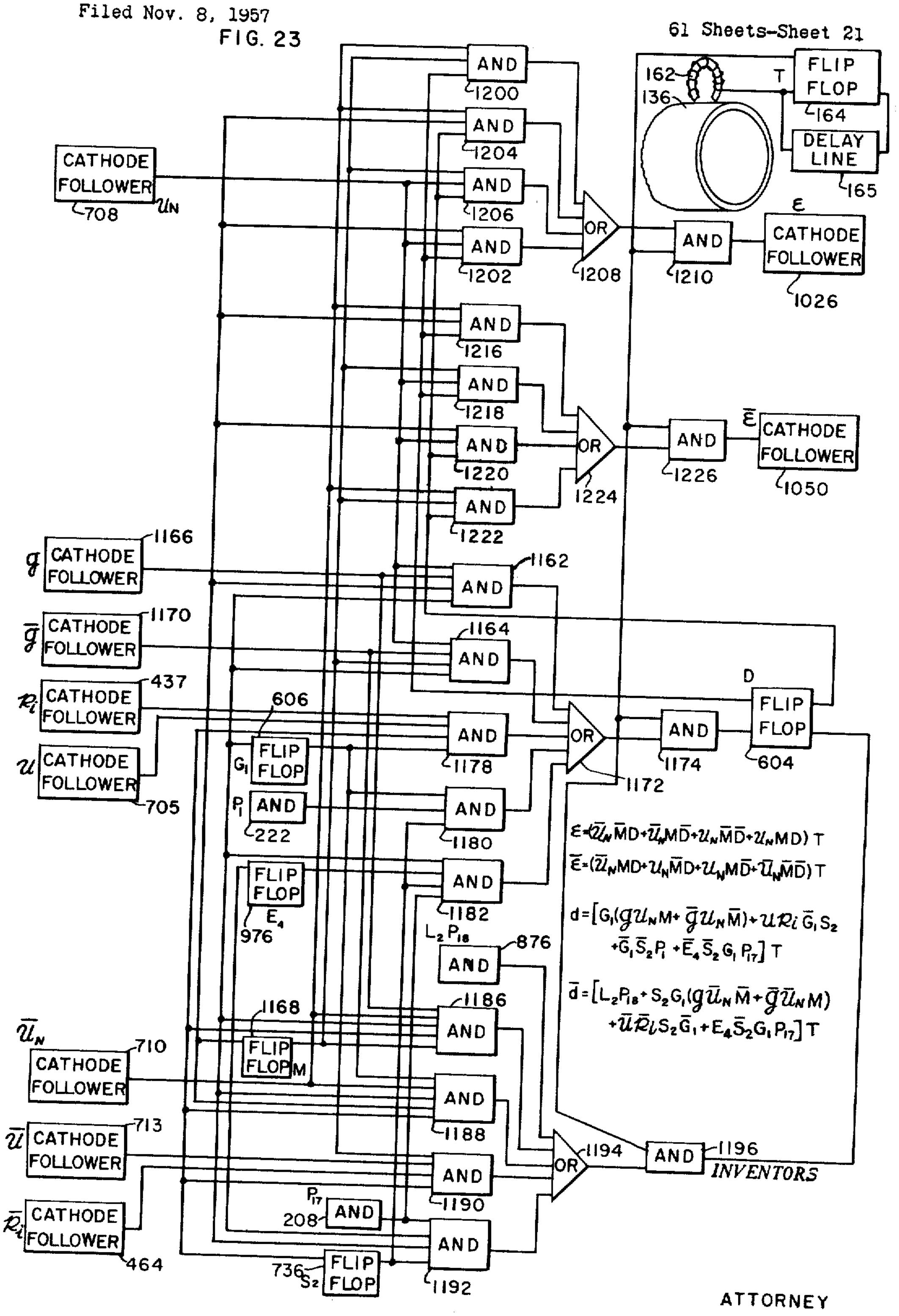
Figure 24:
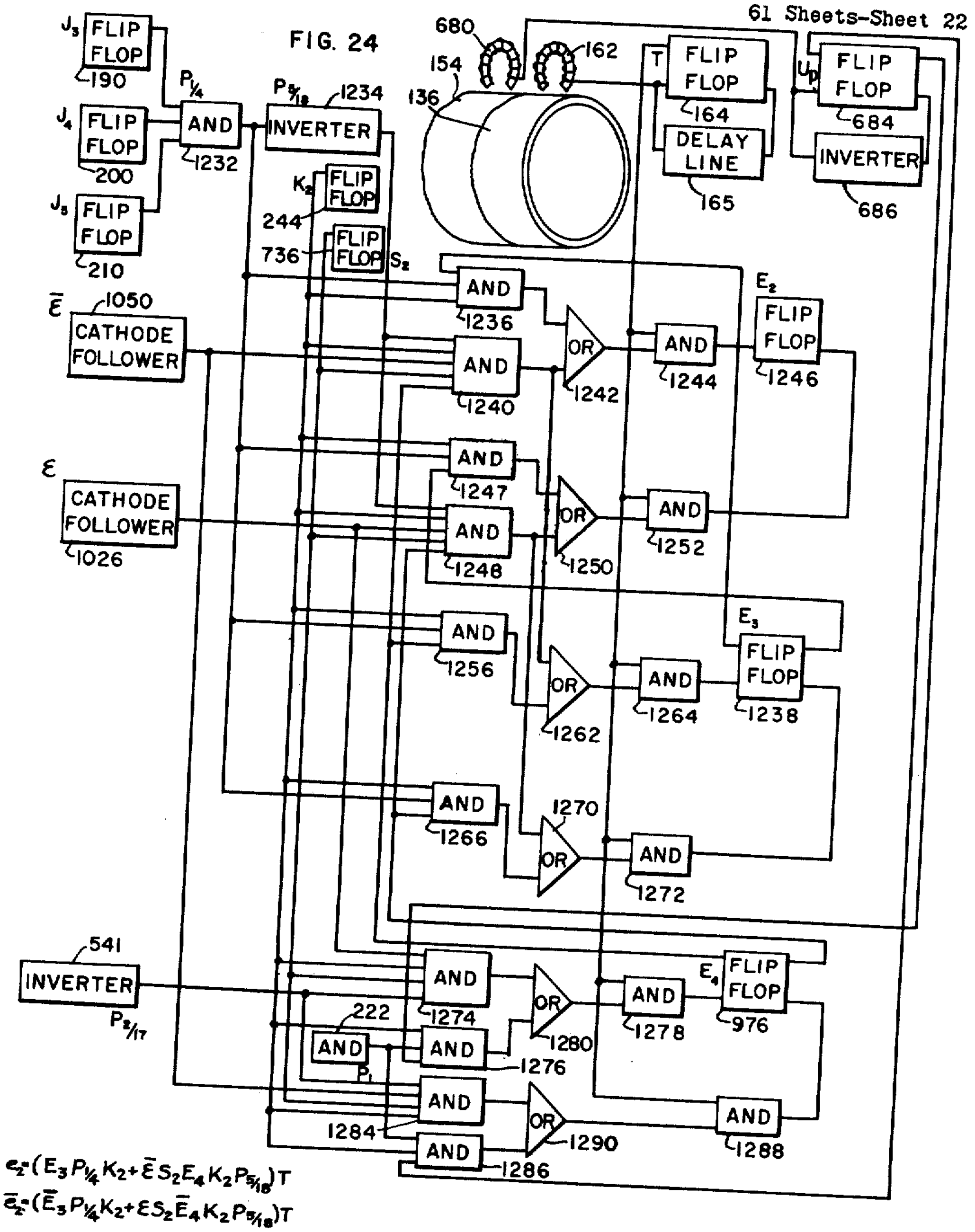

FIGURE 44 is a table schematically illustrating the operation of certain stages shown in FIGURES 23 and 24 for representing an error obtained during a servo operation.

FIGURE 45 shows curves illustrating the time relationship in successive blocks for obtaining a servo operation and for using the results of the servo operation to control the positioning of various output members.

FIGURE 46 is a simplified block diagram illustrating how one type of servo operation is performed.

FIGURE 47 is a simplified block diagram illustrating how another type of servo operation is performed.

Figures 49, 50:
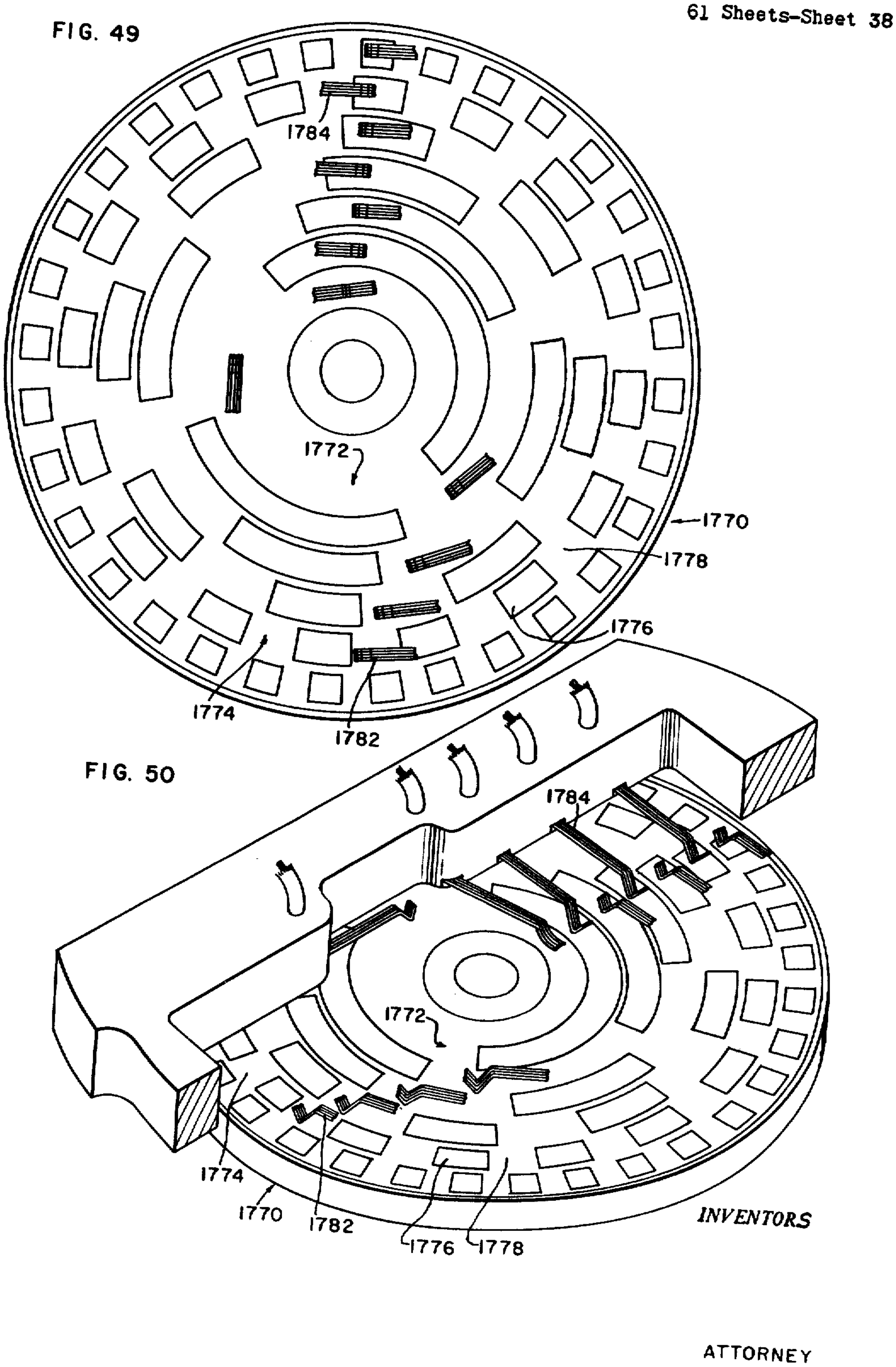

FIGURE 48 is a table illustrating the pattern of operation of certain flip-flops in a new type of servo operation designated in the specification as a "zero-rate servo"; and FIGURE 49 is a top plan view of apparatus used in the digital differential analyzer to obtain a conversion of analogue signals to a digital form.

Figure 64:
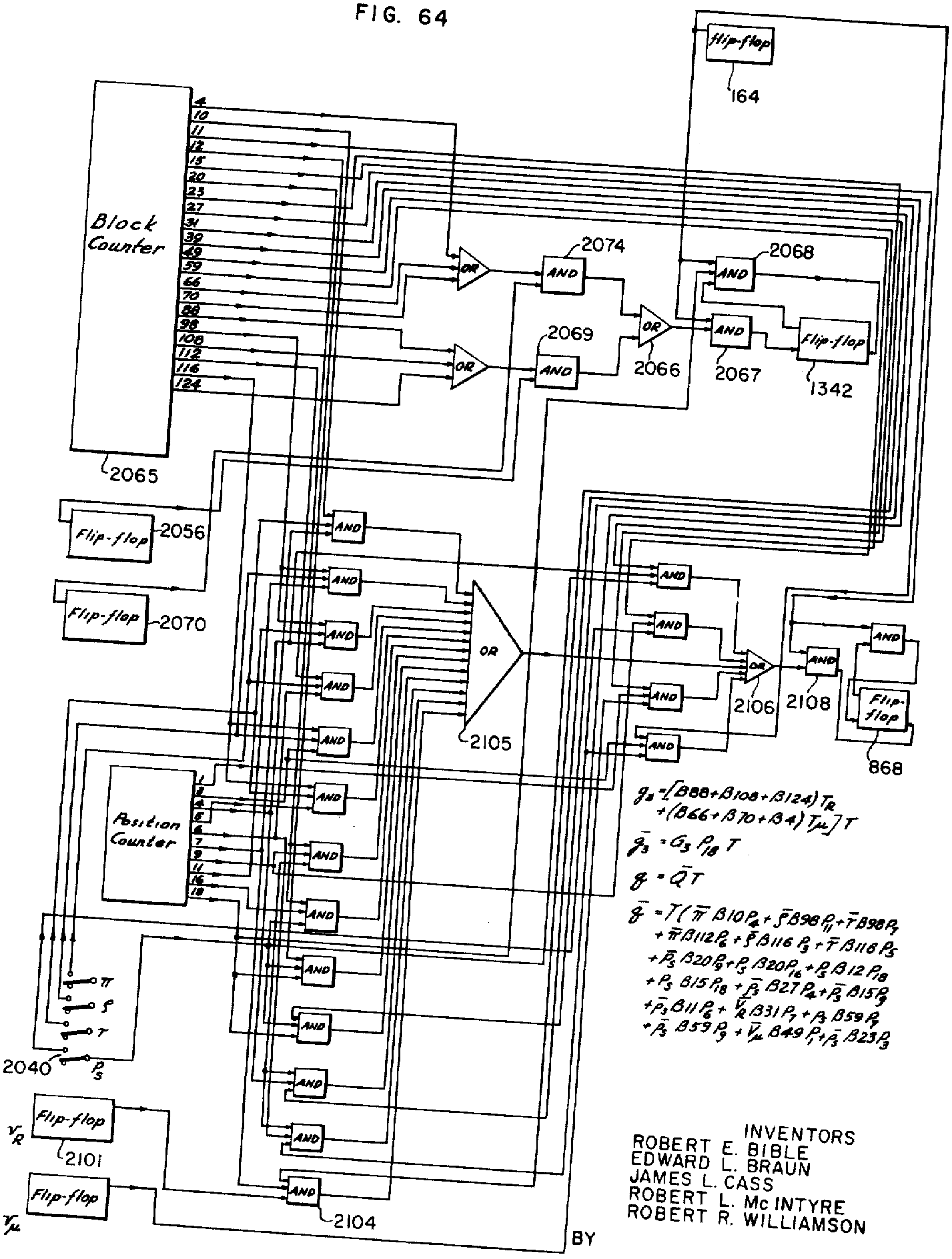
Figure 65:
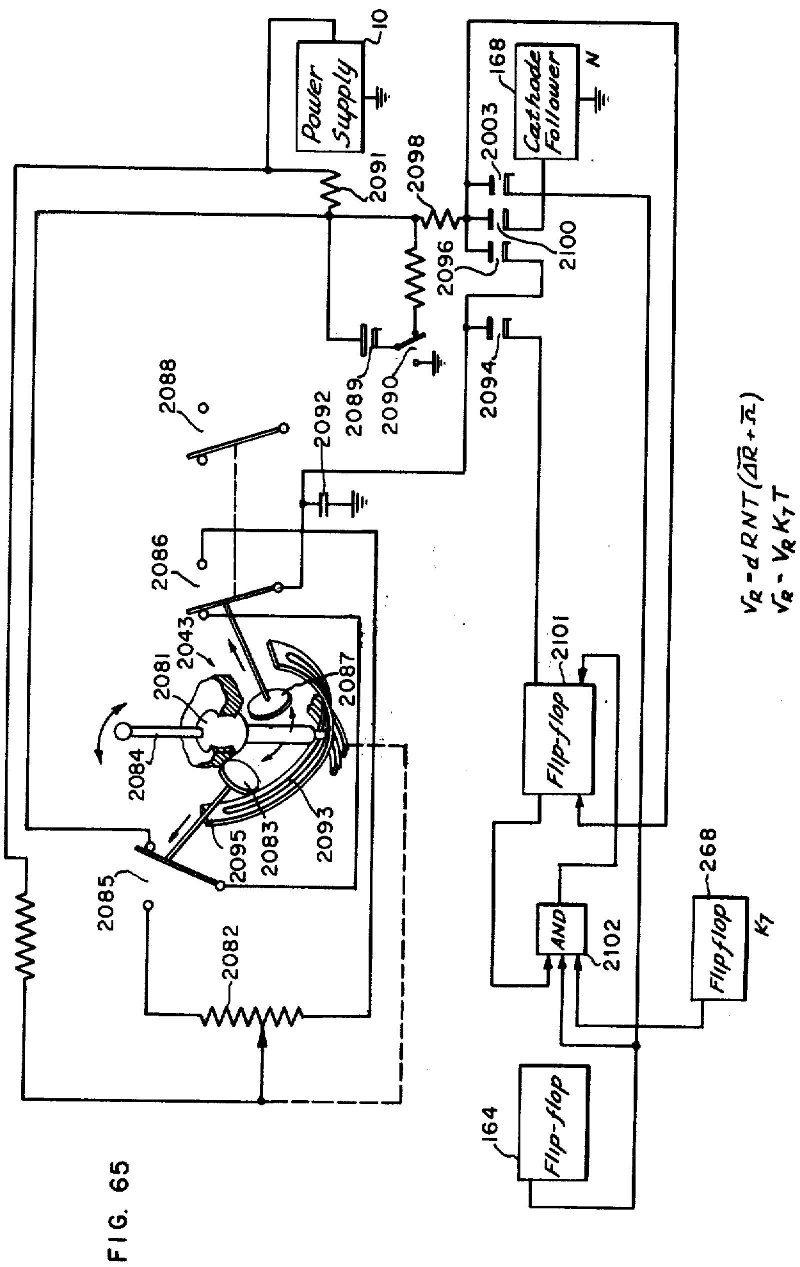
Figures 66, 76:
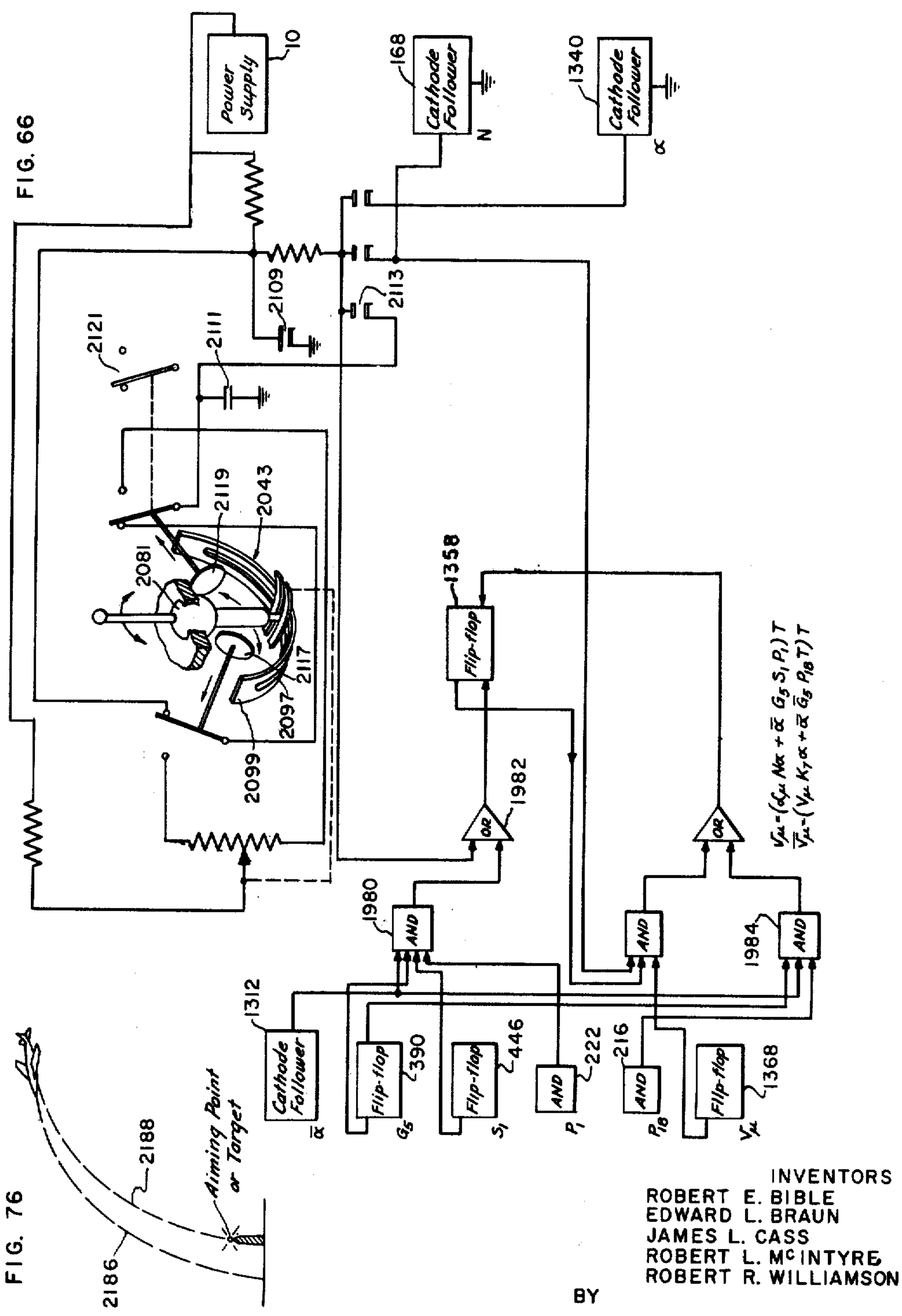
Figure 68:
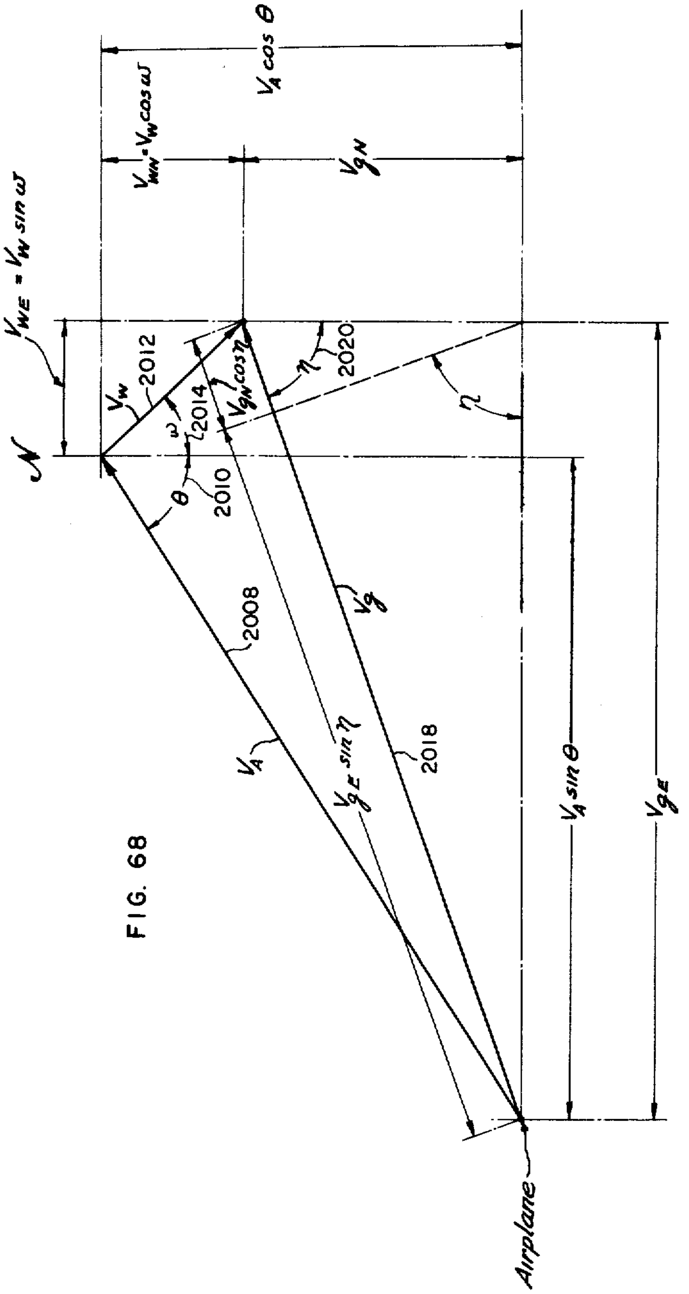
Figure 69:
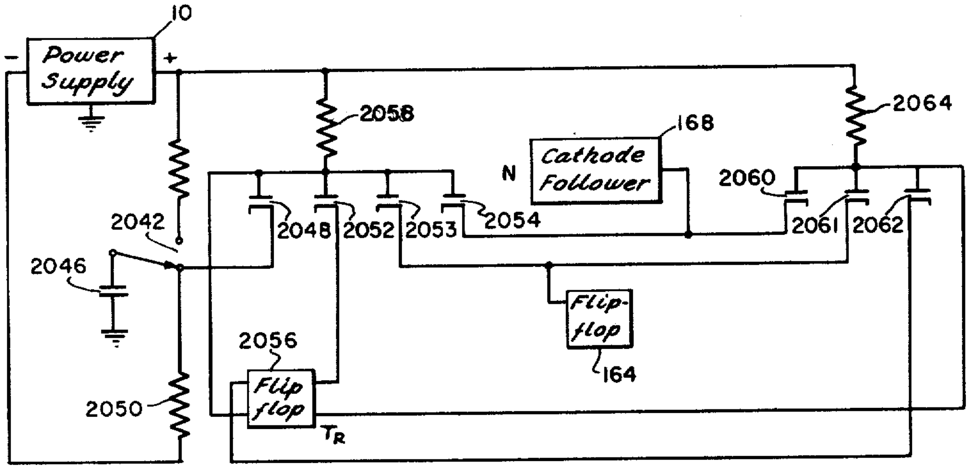
Figure 70:
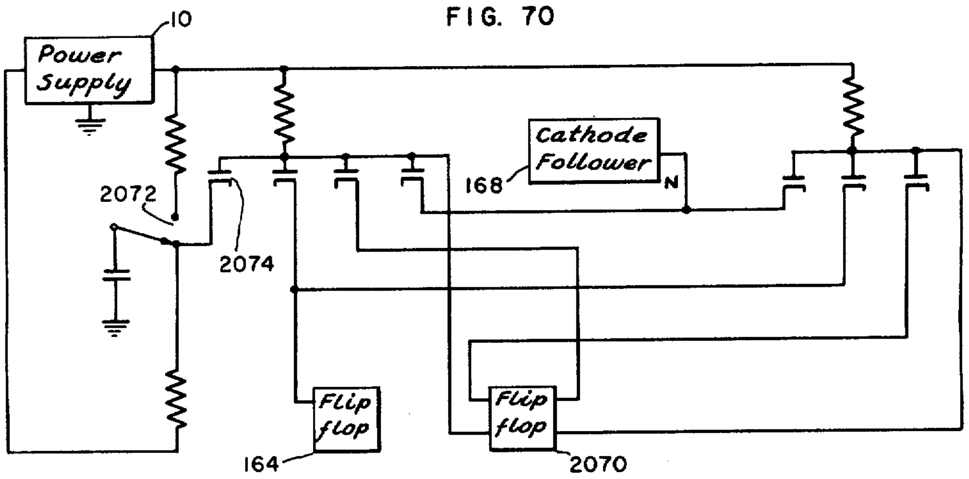
Figure 71:
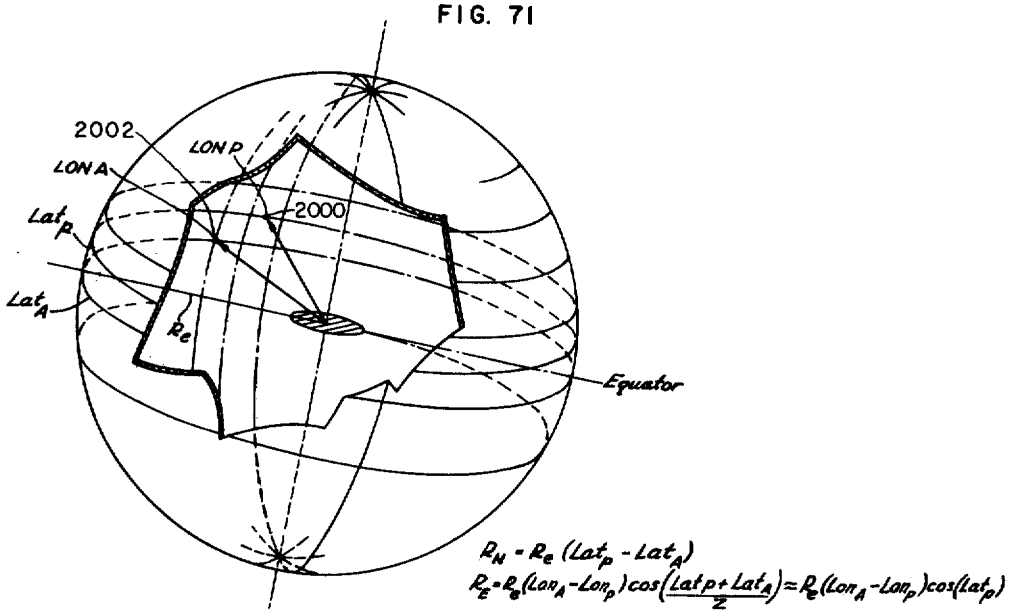
Figure 74:
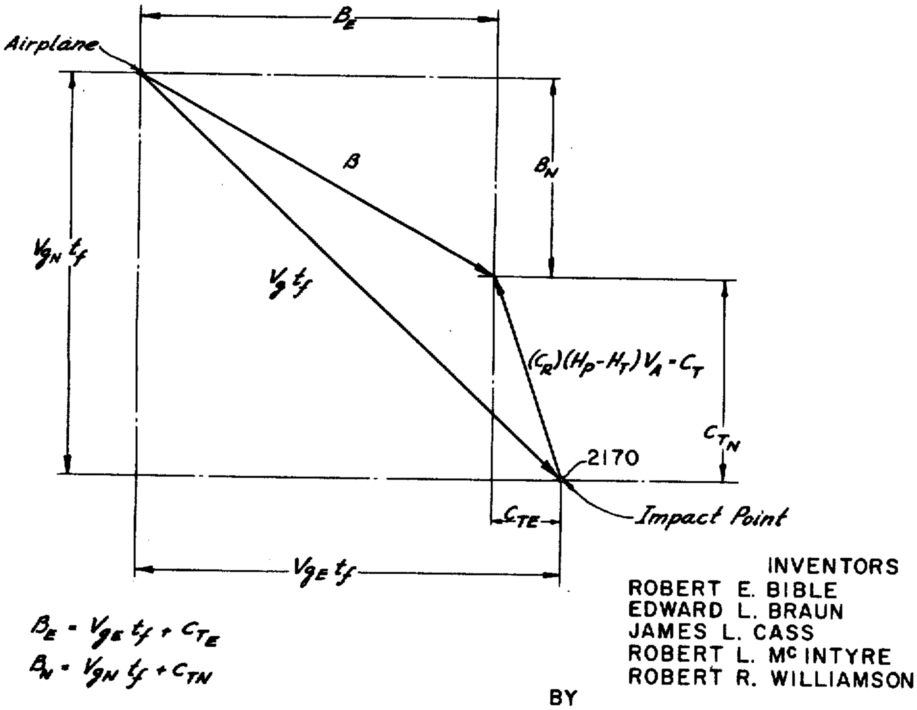
Figure 77:
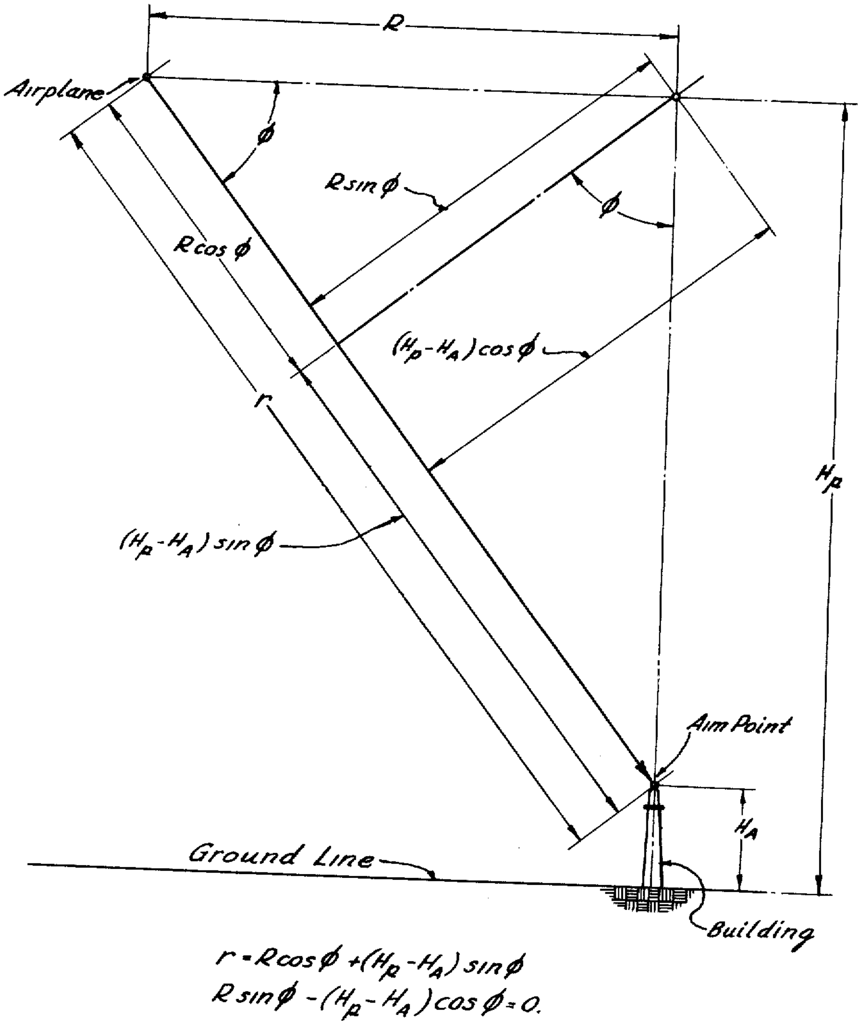

FIGURE 50 is a perspective view of the apparatus shown in FIGURE 49 and illustrates the apparatus in further detail;

FIGURES 51 to 63, inclusive, illustrate the inter-relationship between the different blocks in the digital differential analyzer shown in FIGURES 1 to 30, inclusive and represent a particular inter-relationship to control the flight of an aircraft toward a target and the release of projectiles from the aircraft to strike the target;

FIGURE 64 repersents a particular inter-relationship of logical networks for deleting signals from certain blocks at selected times in accordance with the operation of external controls;

FIGURES 65 and 66 illustrate electrical circuitry including logical networks and further illustrate apparatus for controlling the operation of such circuitry so that signals can be introduced at a controlled rate to particular blocks in the digital differential analyzer;

FIGURES 67 and 68 illustrate certain vectorial relationships solved by the digital differential analyzer in the inter-relationship between the blocks shown in FIGURES 51 to 64, inclusive to control the flight of the aircraft toward the target;

FIGURES 69 and 70 illustrate electrical circuitry including logical networks for producing signals representing particular time relationships in the digital differential analyzers;

FIGURE 71 is a perspective view, partially broken away, of the earth to indicate the relationship in space between the aircraft and an aim point at any instant of time;

FIGURES 72 to 75, inclusive, illustrate other vectorial relationships solved by the digital differential analyzer in the inter-relationships between the blocks shown in FIGURES 51 to 64, inclusive, to control the flight of the aircraft toward the target;

FIGURE 76 is a schematic diagram illustrating the actual path followed by a projectile in dropping from an aircraft to a target as a result of air resistance and further indicating a theoretical path which would be followed by the projectile in the absence of air resistance, and;

FIGURE 77 illustrates a vectorial relationship solved by the digital differential analyzer in the inter-relationship between the blocks shown in FIGURES 51 to 64, inclusive, to obtain a determination of particular quantities involved in controlling the release of the projectile from the aircraft such that the projectile will strike the target.

*Flip-Flop Construction and Operation*

The apparatus forming a part of the digital differential analyzer constituting this invention includes a plurality of flip-flops. Each flip-flop may be constructed in a manner similar to that shown in FIGURE 1. Each flip-flop and the stages associated with the flip-flop are adapted to receive voltages from a suitable power supply such as a power supply 10. The power supply 10 is adapted to supply a relatively high potential such as +250 volts on a line 12, an intermediate positive potential such as 100 volts on a line 14 and a negative potential such as −150 volts on a line 16.

The line 12 is connected through a resistance 18 to the plate of a vacuum tube 20, the cathode of which is grounded. The grid of the tube 20 is biased in potential through a resistance 22 connected to the line 16. The grid of the tube 20 is also connected to the plate of a diode 24, the cathode of which has a common terminal with a grounded resistance 26 and a capacitance 28. The capacitance 28 is connected to a logical network 30. The logical network 30 may take different forms, as will be described in detail subsequently.

Voltages are also supplied to the grid of the tube 20 through a parallel combination of a resistance 32 and a capacitance 34 connected to the plate of a tube 36. The tube 36 has characteristics and connections similar to the tube 20 and may constitute one half of a double triode, the tube 20 constituting the other half. For example, the plate of the tube 36 has voltage applied to it from the line 12 through a resistance 38 corresponding to the resistance 18, and the cathode of the tube is grounded.

A biasing potential is applied to the grid of the tube 36 from the line 16 through a resistance 40 corresponding to the resistance 22. Voltage is also applied to the grid of the tube 36 from a parallel combination of a resistance 42 and a capacitance 44 connected to the plate of the tube 20. The resistance 42 and the capacitance 44 have values corresponding to the resistance 32 and the capacitance 34, respectively. In addition to its other connections, the grid of the tube 36 is connected to the plate of a diode 46, the cathode of which has a common terminal with a grounded resistance 48 and with a capacitance 50. The capacitance 50 is connected to a logical network 52 corresponding to the network 30.

In addition to being connected to the resistance 18, the plate of the tube 20 is connected to a resistance 54 and a capacitance 56 in parallel. Connections are made from the parallel combination of the resistance 54 and the capacitance 56 to a grounded resistance 58 and to the grid of a tube 60. The plate of the tube 60 has voltage to it from the line 12. The cathode of the tube 60 serves as one of the output terminals for the flp-flop, as will be described in detail subsequently. For this reason, an output line 62 extends from the cathode of the tube. The cathode of the tube 60 is also connected to a grounded resistance 64 and to the cathode of a diode 66. The plate of the diode 66 receives voltage from the line 14.

Similarly, the voltage on the plate of the tube 36 is applied to a resistance 70 and a capacitance 72. The resistance 70 and the capacitance 72 are connected in parallel and are provided with values respectively corresponding to those of the resistance 54 and the capacitance 56. The resistance 70 and the capacitance 72 are connected to a grounded resistance 74 and to the grid of a tube 76. The tube 76 may constitute one half of a double triode and the tube 60 the other half.

Voltage is applied to the plate of the tube 76 from the line 12 and voltage is produced on the cathode of the tube 76 upon the flow of current through a grounded resistance 78 connected to the cathode of the tube and having a value corresponding to that of the resistance 64. An output line 80 extends from the cathode of the tube 76. Connections are made to the cathode of a diode 82 from the cathode of the tube 76 and to the plate of the diode 82 from the line 14. The diode 82 has characteristics corresponding to those of the diode 66.

The tubes 20 and 36 are so interconnected that only one of the tubes can be conductive at any one time. For example, the tube 36 may be conductive and the tube 20 non-conductive at a particular instance. Since the tube 36 is conductive, current flows through a circuit including the power supply 10, the line 12, the resistance 38 and the tube. This current produces a voltage drop across the resistance 38 and causes a relatively low voltage to be produced on the plate of the tube 36. This low voltage is introduced to the grid of the tube 76 through the coupling network formed by the resistance 70 and the capacitance 72. Since the grid of the tube 76 has a relatively low voltage applied to it, the tube is cut off and a potential in the order of 100 volts is produced on the cathode of the tube. A potential in the order of 100 volts is produced because of the flow of current through a circuit including the power supply 10, the line 14, the diode 82 and the resistance 78.

The low voltage on the plate of the tube 36 is also introduced to the grid of the tube 20 through the coupling network formed by the resistance 32 and the capacitance 34. This voltage maintains the tube 20 cut off. Since no current flows through the tube 20, the current flowing through the resistance 18 is limited to that flowing through a circuit including the resistances 18, 42 and 40. This causes a relatively small voltage drop to be produced across the resistance 18 such that the voltage on the plate of the tube 20 is maintained at substantially the potential on the line 12. A resultant high potential is introduced to the grid of the tube 60 through the coupling network formed by the resistance 54 and the capacitance 56. This potential makes the tube 60 conductive. The resultant flow of current through the tube 60 and the resistance 64 causes a relatively high voltage to be produced across the resistance and introduced to the output line 62. This voltage is in the order of 125 volts.

When the tube 36 is conductive and the tube 20 is cut off, the introduction of a negative triggering signal from the logical network 30 to the grid of the tube 20 has no effect. However, a negative pulse of voltage from the logical network 52 is differentiated by the capacitance 50 and the resistance 48 to produce a sharp triggering signal. This triggering signal passes through the diode 46, which is included to prevent the passage of positive signals. The negative triggering signal is then introduced to the grid of the tube 36 to cut off the tube. The interruption of current flow through the tube 36 causes the voltage on the plate of the tube to rise to a relatively high value. This voltage is introduced to the grid of the tube 76 to render the tube conductive for the production of a relatively high voltage across the resistance 78.

The relatively high voltage on the plate of the tube 36 is also introduced to the grid of the tube 20 to render the tube 20 conductive. The resultant flow of current through the resistance 18 and the tube 20 causes a relatively low voltage to be produced on the plate of the tube. This potential is introduced to the grid of the tube 60 to cut off the tube so that a potential approximating 100 volts is produced on the cathode of the tube.

A subsequent pulse of voltage from the logical network 30 is differentiated by the capacitance 28 and the resistance 26 to produce a sharp triggering signal. This signal is introduced to the grid of the tube 20 to cut off the tube and to render the tube 36 conductive. This in turn results in a relatively high potential on the cathode of the tube 60 and a relatively low potential on the cathode of the tube 76. In this way, the operation of the flip-flop shown in FIGURE 1 is dependent at any instant upon the signals introduced to the flip-flop from the logical networks 30 and 52.

In accordance with the introduction of the signals from the logical networks 30 and 52, a high potential approximating 125 volts is produced at any instant on the cathode of one of the tubes 60 and 76 and a low potential approximating 100 volts is produced on the cathode of the other tube. Each of the tubes 60 and 76 serves in a cathode-follower stage for isolating the flip-flop electrically from successive stages and for improving the match in impedances between the flip-flop and the successive stages.

*Construction and Operation of "And" and "Or" Networks*

Figures 1, 2, 3:
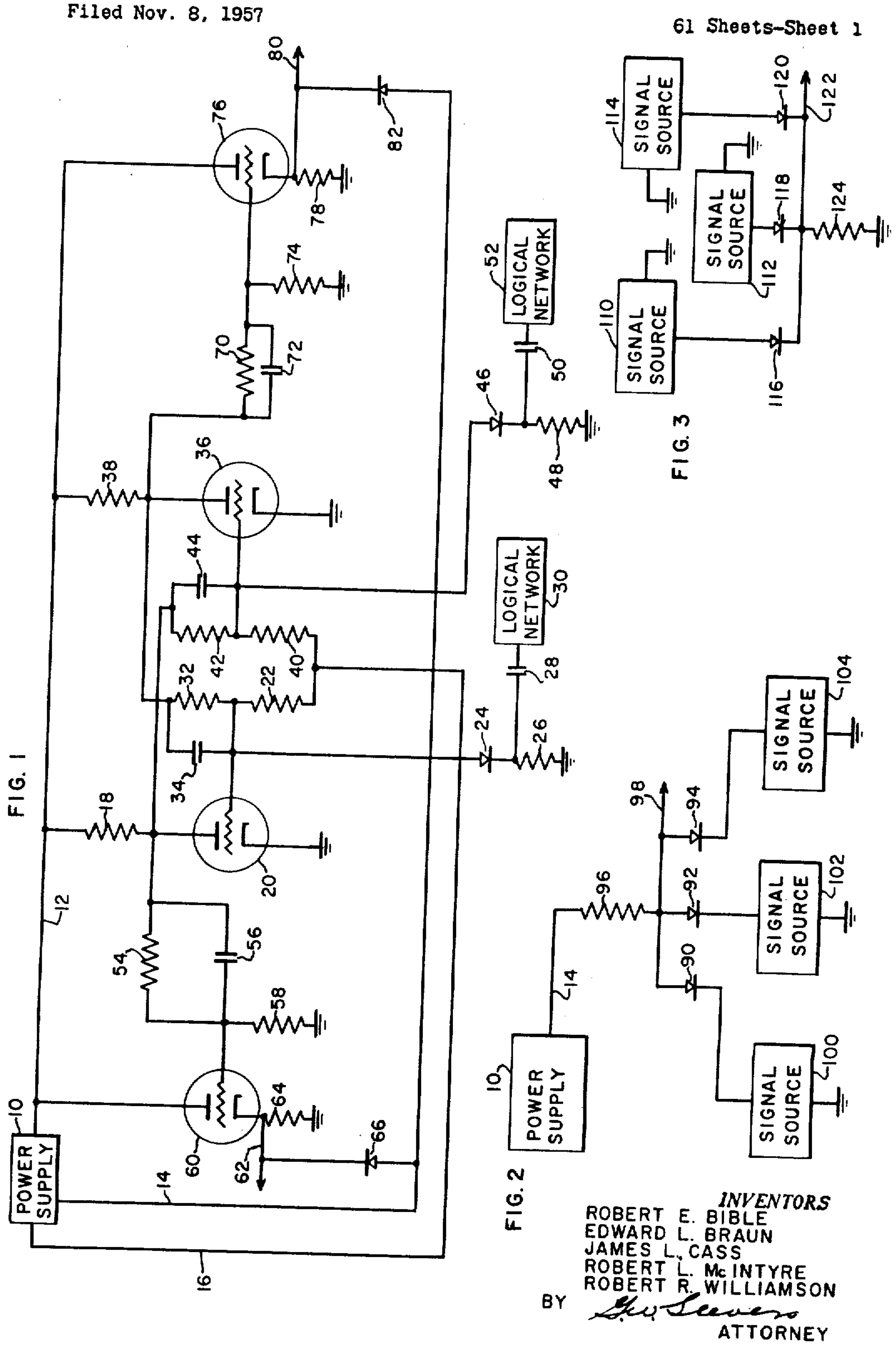
FIGURE 1 is a circuit diagram of a flip-flop used throughout the invention and shown in block form in the various stages forming a part of this invention.
FIGURE 2 is a circuit diagram of a typical "and" network used throughout the invention and shown in block form in a number of the other figures.
FIGURE 3 is a circuit diagram of a typical "or" network used through the invention and shown in block form in a number of other figures.

In addition to having a number of flip-flops similar to that shown in FIGURE 1 and described above, the computer constituting this invention also includes a number of "and" networks to control the operation of the flip-flops. Each of the "and" networks may be constructed in a manner similar to that shown in FIGURE 2. For example, a typical "and" network may include diodes 90, 92 and 94 the plates of which have voltage applied to them through a resistance 96 from the line 14 and the plates of which produce an output voltage on a line 98. The cathodes of the diodes 90, 92 and 94 are connected to signal sources 100, 102 and 104, which may be flip-flops, other "and" networks, "or" networks or other types of circuits, as will be described in detail hereinafter.

At particular times, relatively high voltages are simultaneously produced by the signal sources 100, 102 and 104. These voltages are respectively introduced to the cathodes of the diodes 90, 92 and 94. Since the voltages on the plates of diodes tend to follow the voltages on the cathodes of the diodes, the voltages on the plates of the diodes 90, 82 and 94 also become relatively high. These high voltages prevent current from flowing through a circuit including the power supply 10, the line 14, the resistance 96 and the diodes such that a relatively high voltage is produced on the output line 98. The high voltage remains on the output line 98 until the voltage from one or more of the sources 100, 102 and 104 becomes low. For example, the voltage from the source 100 may become low. When this occurs, current flows through a circuit including the power supply 10, the line 14, the resistance 96, the diode 90 and the signal source 100 and produces a voltage drop across the resistance. The drop of voltage across the resistance 96 causes a negative pulse of voltage to be produced on the output line 98. This negative drop in voltage is differentiated by such differentiating circuits as the capacitance 28 and the resistance 26 in FIGURE 1 so as to trigger a flip-flop corresponding to that shown in FIGURE 1 into its alternate state of operation.

It should be appreciated that the "and" network shown in FIGURE 1 can be formed from a different number of branches than the three branches shown in FIGURE 1. It should also be appreciated that different types of "and" networks may be used in addition to that shown in FIGURE 2.

"Or" networks also form an important part of the computer constituting this invention. One type of "or" network capable of use is shown in FIGURE 3. Sources 110, 112 and 114 are shown by way of example. These sources may be flip-flops, "and" networks, "or" networks or other types of circuits. Connections are made from the sources 110, 112 and 114 to the plates of diodes 116, 118 and 120. The cathodes of the diodes are connected to an output line 122 and to a grounded resistance 124.

When the sources 110, 112 and 114 simultaneously produce low voltages, no current is able to flow through any of the diodes 116, 118 and 120. This causes a relatively low potential to be produced across the resistance 124 and on the output line 122. A different condition exists when a high voltage is produced in one or more of the sources 110, 112 and 114. For example, the introduction of a relatively high voltage from the source 110 causes current to flow through a circuit including the source, the diode 116 and the resistance 124. This current produces a potential across the resistance 124 such that a relatively high voltage is obtained on the output line 122. This output voltage may then be introduced to flip-flops, "and" networks or other "or" networks as will be described in detail subsequently.

*Construction of The Digital Differential Analyzer*

Flip-flops, "and" networks and "or" networks are associated with one another in various patterns to control the operation of the digital differential analyzer. The digital differential analyzer also includes a memory member such as a drum generally indicated at 130 in FIGURE 4 and other figures. The drum may be formed from a cylinder 132 made from a suitable nonmagnetic material such as aluminum. The cylinder 132 may have a suitable diameter such as approximately 7 inches and may have an axial length such as approximately 2⅝ inches. A thin coating 134 of a suitable magnetic material such as a powdered ferrite is deposited on the cylinder 132. The coating 134 may be deposited on the cylinder 132 as by spraying and may be formed of a thickness having a few molecular layers.

The drum 130 may be considered to be divided into a plurality of channels or tracks, each of which gives magnetic information. Each of the tracks is separated by a sufficient distance from the adjacent tracks so that it is magnetically independent of the information carried by the adjacent tracks. For example, 13 tracks are provided in the drum 130. These tracks are designated at 136,

138, 140, 142, 144, 146, 148, 150, 152, 154, 156, 158 and 160. Different tracks are shown in FIGURES 4 to 30, inclusive. Each of the tracks 136 to 160, inclusive (even numbers only) performs an individual function which will be disclosed in detail hereinafter.

Each of the tracks 136 to 160, inclusive (even numbers only) is divided into a plurality of pulse positions. The pulse positions in each track are magnetically independent from one another so that separate information can be stored in each pulse position. For example, the periphery of each track may be divided into 2,250 pulse positions, each of which receives magnetic information in different patterns as the computation proceeds.

The track 136 serves to produce clock signals as the drum 130 rotates. These signals may be produced by cutting notches in the track at successive intervals along the peripheral distance of the track and by providing a permanent magntization in the notches. By cutting the notches and permanently magnetizing the track 136, alternate signals are induced in a coil 162 (FIGURE 4) as the drum 130 rotates.

The output signals from the coil 162 are introduced to the left input terminal in a flip-flop 164 and to the input terminal of a delay line 165. The output from the delay line 165 is in turn applied to the right input terminal in the flip-flop 164. The signals introduced to the left and right input terminals in the flip-flop 164 respectively correspond to the signals introduced to the capacitances 28 and 50 in the flip-flop shown in FIGURE 1. It should be appreciated that the flip-flop 164 and the delay line 165 are shown only by way of illustration. For example, a blocking oscillator could be used instead of the flip-flop 164 and the delay line 165.

The voltage on the left output terminal in the flip-flop 164 is applied to an input terminal of an "and" network 166. Other input terminals of the "and" network 166 are connected to the output terminal of a cathode follower 173 and to the right output terminal in a flip-flop 170. The signals passing through the "and" network 166 are in turn applied to the left input terminal in the flip-flop 170.

The voltage on the left output terminal in the flip-flop 170 is applied to an input terminal of an "or" network 172, another input terminal of which is connected to the output terminal in a cathode follower 168. The signals from the "or" network 172 in turn pass to an input terminal of an "and" network 174 having another input terminal connected to the left output terminal in the flip-flop 164. The sigals passing through the "and" network 174 are in turn applied to the right input terminal in the flip-flop 170.

An "and" network 178 has input terminals connected to the left output terminal in the flip-flop 170 and to the right output terminals in flip-flops 180 and 210. The signals from the "and" network 178 and from the cathode follower 168 pass through an "or" network 182 to an input terminal of an "and" network 184. Another input terminal of the "and" network 184 is connected to the left output terminal of the flip-flop 164. The output signals from the "and" network 184 are introduced to the left input terminal of the flip-flop 180 to trigger the flip-flop. Similarly, signals are introduced to the right input terminal of the flip-flop 180 from an "and" network 186 having input terminals connected to the cathode follower 173 and to the left output terminals of the flip-flops 164, 170 and 180.

Connections are made to the input terminals of an "and" network 188 from the left output terminals in the flip-flops 164, 170 and 180, from the right output terminal in a flip-flop 190 and from the cathode follower 173. The signals from the "and" network 188 are applied to the left input terminal in the flip-flop 190. The signals passing to the right input terminal in the flip-flop 190 are controlled by the operation of an "and" network 192, an "or" network 194 and an "and" network 196.

The "and" network 192 receives signals from the left output terminals in the flip-flops 170, 180 and 190 and in turn passes signals to the "or" network 194, which also receives voltages from the cathode follower 168. The signals from the "or" network 194 also pass to the "and" network 196, the operation of which is also controlled by signals from the left output terminal in the flip-flop 164. The signals from the "and" network 196 in turn pass to the right input terminal in the flip-flop 190.

Signals are applied from an "and" network 198 to the left input terminal in a flip-flop 200. The operation of the "and" network 198 is controlled by the voltages on the left output terminals of the flip-flops 164, 170, 180 and 190, on the right output terminal of the flip-flop 200 and on the output terminal of the cathode follower 173. An "and" network 202, an "or" network 204 and an "and" network 206 control the signals passing to the right input terminal in the flip-flop 200. Connections are made to input terminals of the "and" network 202 from the left input terminals in the flip-flops 170, 180, 190 and 200. The signals from the "and" network 202 and from the cathode follower 168 are applied to the "or" network 204. The signals from the "or" network 204 and from the left output terminal in the flip-flop 164 are in turn applied to the "and" network 206, the output from which passes to the right input terminal in the flip-flop 200.

In like manner, an "and" network 207 is connected to the left input terminal in the flip-flop 210. Signals are applied to the "and" network 207 from the left output terminals in the flip-flops 164, 170, 180, 190 and 200 and from the cathode follower 173. The right input terminal in the flip-flop 210 receives signals from an "and" network 212 having input terminals connected to an "or" network 214 and to the left output terminal in the flip-flop 164. The operation of the "or" network 214 is controlled by signals passing to input terminals of the "or" network from an "and" network 216 and from the cathode follower 168. The "and" network 216 in turn receives signals from the left output terminals in the flip-flops 170 and 210.

The "and" network 207 not only passes signals to the left input terminal of the flip-flop 210 but also to an output line 220 to provide control functions which will be described in detail subsequently. In like manner, signals pass from the "and" network 208 to an output line 223 to provide certain control functions which will be described in detail subsequently. An "and" network 222 is included in FIGURE 4 to provide other control functions. The "and" network 222 is connected to the right output terminals of the flip-flops 170, 180, 190, 200 and 210.

The stages shown in some detail in FIGURE 4 are illustrated schematically as a single block in FIGURE 5. This block is designated as a "position counter" in FIGURE 5 and is indicated at 230. The output line 223 is shown as extending from the position counter 230 and is adapted to receive signals passing through the "and" network 208 as shown in FIGURE 4. The output line 223 is connected to an input terminal in an "and" network 232. Other input terminals of the "and" network 232 receive voltages from the left output terminal in the flip-flop 164 and from the right output terminal in a flip-flop 234. The output from the "and" network 232 is applied to the left input terminal in the left flip-flop 234.

The signals introduced to the right input terminal in the flip-flop 234 are controlled by the operation of an "and" network 236, an "or" network 238 and an "and" network 240. Input terminals of the "and" network 236 are connected to the left output terminal of the flip-flop 234 and through the output line 223 to the position counter 230. The signals from the "and" network 236 and from the left output terminal of the cathode follower 168 also shown in FIGURE 4 pass to the "or" network 238. The signals from the "or" network 238 and from the left output terminal in the flip-flop 164 in turn pass to the input terminals of the "and" network 240. The output terminal of the "and" network 240 is connected to the right input terminal in the flip-flop 234.

An "and" network 242 has signals applied to it from the left output terminals in the flip-flops 164 and 234, from the right output terminal in a flip-flop 244 and through the line 223 from the counter 230. The signals from the "and" network 242 in turn pass to the left input terminal in the flip-flop 244. The right input terminal in the flip-flop 244 receives signals from an "and" network 246 having input terminals connected to the left output terminal in the flip-flop 164 and to an "or" network 248. Signals pass through the "or" network 248 from the cathode follower 168 and from an "and" network 250. The operation of the "and" network 250 is controlled by signals passing from the left output terminals in the flip-flops 234 and 244 and through the line 223 from the counter 230.

Similarly, connections are made to input terminals of an "and" network 252 from the left output terminals in the flip-flops 164, 234 and 244, from the right output terminal in a flip-flop 254 and through the line 223 from the counter 230. The signals from the "and" network 252 are applied to the left input terminal of the flip-flop 254. The signals passing to the right input terminal of the flip-flop 254 are controlled by the operation of an "and" network 256, an "or" network 258 and an "and" network 260. Input terminals of the "and" network 256 are connected to the left output terminals in the flip-flops 234, 244 and 254 and through the line 220 to the counter 230. The output signals from the "and" network 256 and from the cathode follower 168 pass through the "or" network 258 to an input terminal of the "and" network 260. The "and" network 260 also receives at an input terminal the signals from the left output terminal in the flip-flop 164. The signals from the "and" network 260 are applied to the right input terminal of the flip-flop 254.

In like manner, flip-flops 262, 264, 266 and 268 are associated with the flip-flops 234, 244 and 254 to form a counter which will hereinafter be designated as a "block" counter. The particular connections to the flip-flops 262, 264, 266 and 268 are not shown for purposes of simplication since it is believed that a person skilled in the art will understand these connections from the description of operation which will hereinafter be made and from the logical equations which will be set forth to explain this operation. These logical equations are also set forth in FIGURE 5.

Figure 6:
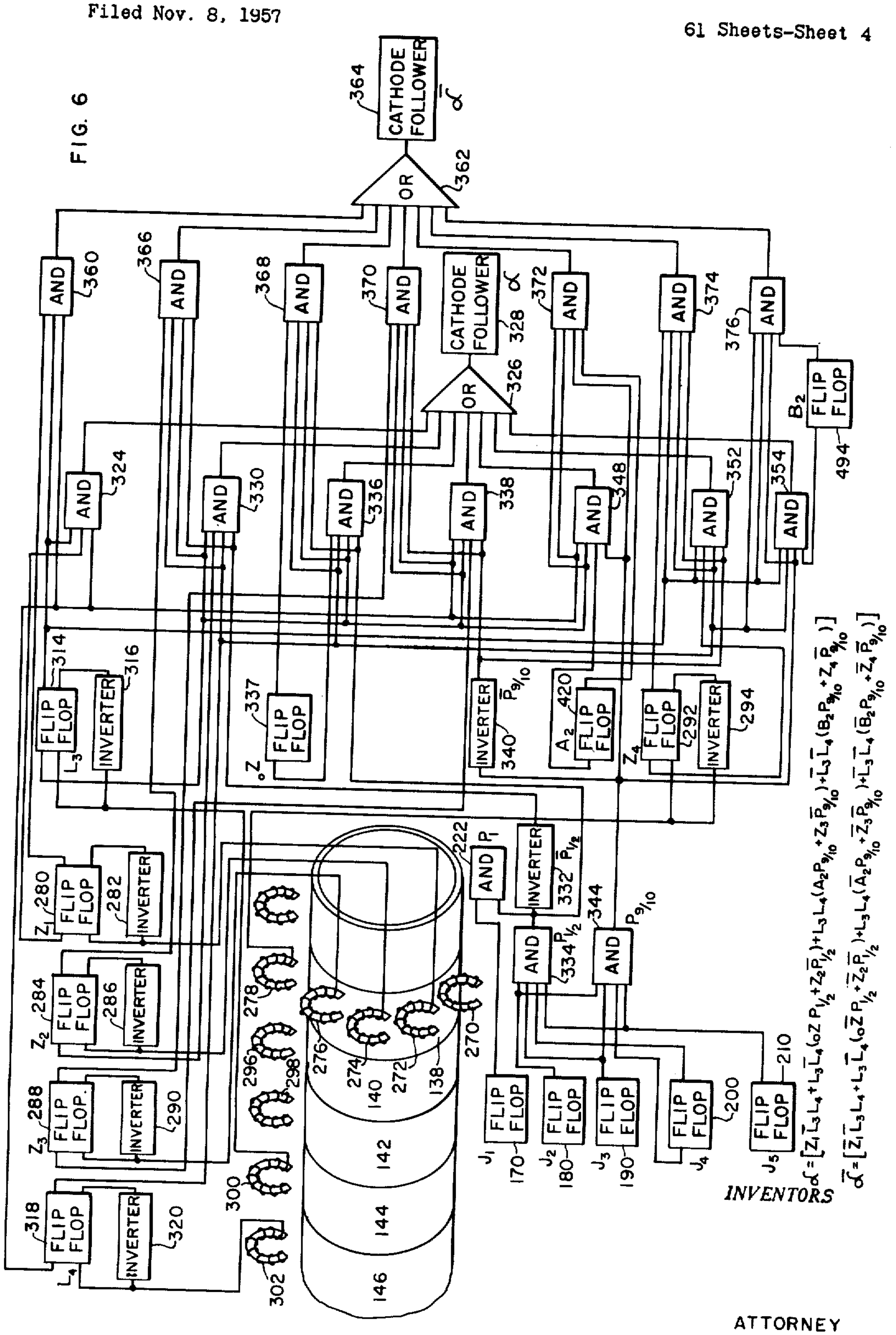

Coils 270, 272, 274, 276 and 278 are shown in FIGURE 6 as being positioned in contiguous relationship to the track 138 for magnetic association with the track. The coil 270 is adapted to receive electrical signals and to induce a pattern of magnetic signals in the track 138 in accordance with the pattern of the electrical signals. The coils 272, 274, 276 and 278 are separated from the coil 270 by particular distances. Each of the coils 272, 274, 276 and 278 has electrical signals induced in it in accordance with the pattern of the magnetic information in the track 138 as the magnetic information moves past the coil.

The signals induced in the coil 272 are introduced to the left input terminal of a flip-flop 280 and to the input terminal of an inverter 282. The output signals from the inverter 282 are applied to the right input terminal in the flip-flop 280. Similarly, the signals induced in the coils 274, 276 and 278 are respectively introduced to a flip-flop 284 and an inverter 286, a flip-flop 288 and an inverter 290, and a flip-flop 292 and an inverter 294. The flip-flops 284 and 288 and 292 are associated with the inverters 286, 290 and 294 in a manner similar to the association between the flip-flop 280 and the inverter 282.

Figure 7:
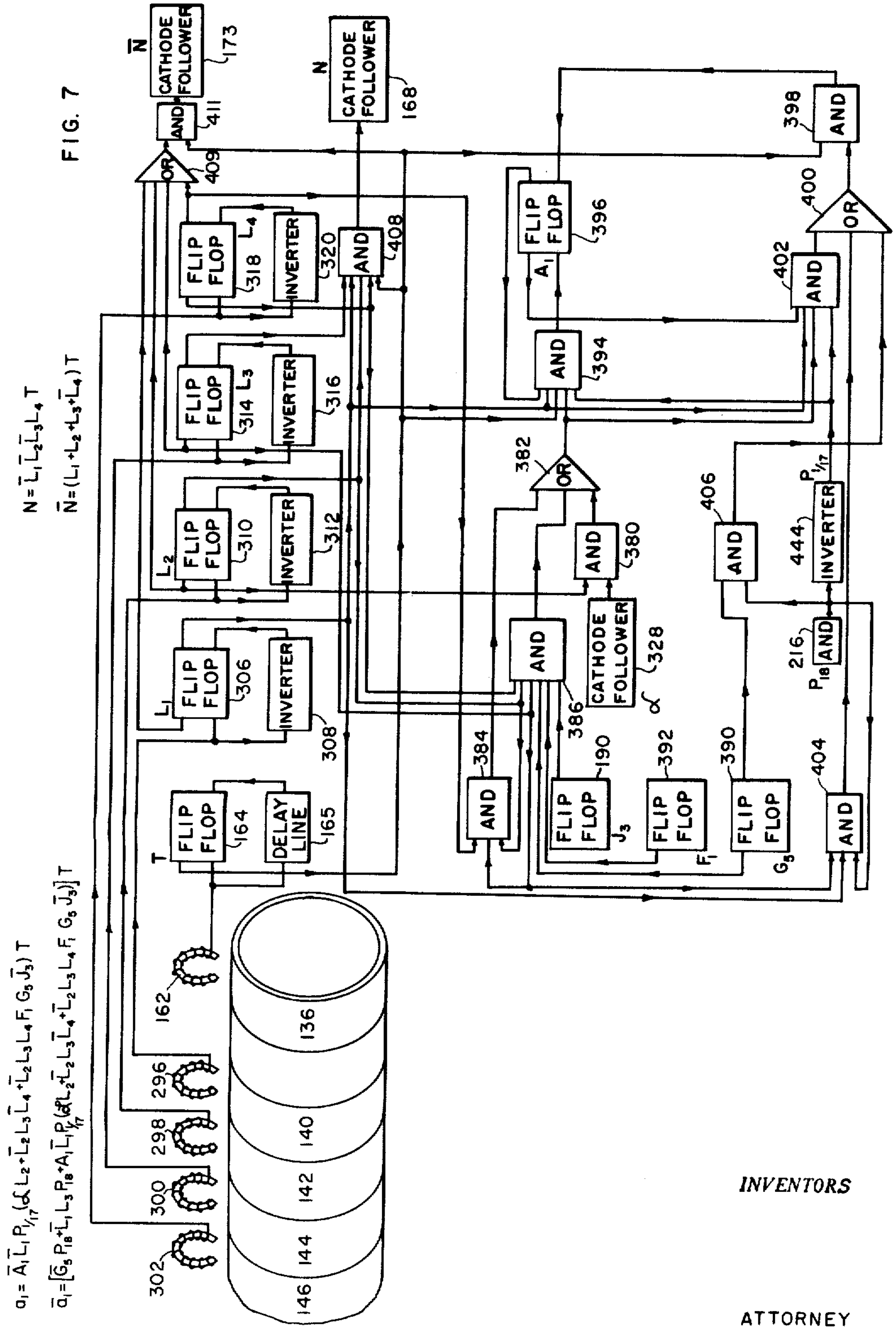

Coils 296, 298, 300 and 302 are shown in FIGURE 7 as being respectively disposed in contiguous relationship to the tracks 140, 142, 144 and 146 for magnetic association with the tracks. As will be described in detail hereinafter, magnetic information is permanently recorded in the tracks 140, 142, 144 and 146 and this information is induced in the coils 296, 298, 300 and 302 as the drum 130 rotates. The electrical signals induced in the coils 296, 298, 300 and 302 are respectively introduced to a flip-flop 306 (FIGURE 7) and an inverter 308, to a flip-flop 310 and an inverter 312, to a flip-flop 314 (FIGURES 6 and 7) and an inverter 316 and to a flip-flop 318 and an inverter 320. Electrical connections are provided between the flip-flop 306 and the inverter 308, the flip-flop 310 and the inverter 312, the flip-flop 314 and the inverter 316, and the flip-flop 318 and the inverter 320 in a manner similar to that described above for the flip-flop 280 and the inverter 282.

The voltages on the left output terminals of the flip-flops 280 and 318 and on the right output terminal of the flip-flop 314 are applied to input terminals of an "and" network 324 in FIGURE 6. Signals from the "and" network 324 pass through an "or" network 326 to a cathode follower stage 328 which is constructed in a conventional manner. Signals also pass to the "or" network 326 from an "and" network 330. Input terminals of the "and" network 330 are connected to the left output terminals in the flip-flops 284 and 314, to the right output terminal in the flip-flop 318 and to the output terminal of an inverter 332. The inverter 332 receives signals from an "and" network 334. Connections are made to input terminals of the "and' network 334 from the right output terminals in the flip-flops 180, 190, 200 and 210 also shown in FIGURE 4.

The signals passing through the "and" network 334 are introduced to an input terminal of an "and" network 336 as well as the input terminal of the inverter 332. Other input terminals of the "and" network 336 are connected to the left output terminal of the flip-flop 314, the right output terminal of the flip-flop 318 and the left output terminal of a flip-flop 337. The signals from the "and" network 336 pass to the "or" network 326.

In addition to receiving the output signals from the "and" networks 324, 330 and 336, the "or" network 326 has signals applied to it from an "and" network 338. Connections are made to input terminals of the "and" network 338 from the left output terminals in the flip-flops 288, 314 and 318 and the output terminal of an inverter 340. The inverter 340 is adapted to invert signals passing to it from an "and" network 344. Connections are made to input terminals of the "and" network 344 from the right output terminals in the flip-flops 180, 190 and 210 and from the left output terminal in the flip-flop 200.

An "and" network 348 also operates to pass signals to the "or" network 326. The "and" network 348 receives signals from the left output terminals in the flip-flops 314 and 318 and in a flip-flop 420 and also receives signals from the output terminal of the "and" network 344. Similarly, signals pass to the "or" network 326 from an "and" network 352. Connections are made to input terminals of the "and" network 352 from the left output terminal of the flip-flop 292, the right output terminals of the flip-flops 314 and 318 and the output terminal of the inverter 340. Signals from an "and" network 354 are also introduced to the "or" network 326. The operation of the "and" network 354 is controlled by signals from the right output terminals of the flip-flops 314 and 318, the left output terminal in a flip-flop 494 and the output terminal of the "and" network 344.

An "and" network 360 has signals applied to it from the right output terminals of the flip-flops 280 and 314 and the left output terminal of the flip-flop 318. The signals from the "and" network 360 in turn pass through an "or" network 362 to a cathode follower 364 corresponding to the cathode follower 328. Signals from an "and" network 366 also pass through the "or" network 362 to the cathode follower 364. Input terminals of the "and" network 366 are connected to the right output terminals of the flip-flops 284 and 318, the left output terminal of the flip-flop 314 and the output terminal of the inverter 332.

The "or" network 362 receives the output signals from "and" networks 368 and 370 as well as from the "and" networks 360 and 366. The input terminals of the "and" network 368 are connected to the left output terminal of the flip-flop 314, the right output terminals of the flip-flops 318 and 337 and the output terminal of the "and" network 334. Connections are made to input terminals of the "and" network 370 from the left output terminals of the flip-flops 314 and 318, the right output terminal of the flip-flop 288 and the output terminal of the inverter 340.

Signals from "and," networks 372, 374 and 376 also pass through the "or" network 362 to the cathode follower 364. The operation of the "and" network 372 is controlled by signals from the left output terminals of the flip-flops 314 and 318, the right output terminal of the flip-flop 420 and the output terminal of the "and" network 344. Signals are introduced to input terminals of the "and" network 374 from the right output terminals of the flip-flops 292, 314 and 318 and from the output terminal of the inverter 340. Connections are made to input terminals of the "and" network 376 from the right output terminals of the flip-flops 314, 318 and 494 and the output terminal of the "and" network 344.

The cathode follower indicated at 328 in FIGURE 6 is also shown in FIGURE 7. The output signals from the cathode follower 328 and from the left output terminal of the flip-flop 310 are applied to an "and" network 380. The signals from the "and" network 380 pass to an "or" network 382, which also receives signals from "and" networks 384 and 386. Input terminals of the "and" network 384 are connected to the left output terminal of the flip-flop 314 and the right output terminals of the flip-flops 310 and 318. The operation of the "and" network 386 is controlled by the voltages on the left output terminals of the flip-flops 314 and 318, the right output terminals of the flip-flops 310 and 190 and the left output terminals of flip-flops 390 and 392.

The signals from the "or" network 382 are introduced to an "and" network 394, which also receives signals from the left output terminal of the flip-flop 164, the right output terminals of the flip-flop 306 and of a flip-flop 396 and the output terminal of an inverter 444. The signals from the "and" network 394 pass to the left input terminal in the flip-flop 396 to trigger the flip-flop. The right input terminal of the flip-flop 396 receives signals from an "and" network 398, the input terminals of which are connected to an "or" network 400 and to the left output terminal in the flip-flop 164. Connections are made to input terminals of the "or" network 400 from "and" networks 402, 404 and 406.

The "and" network 402 has voltages applied to it from the "or" network 382, the inverter 444, the left output terminal of the flip-flop 396 and the right output terminal of the flip-flop 306. In like manner, signals are introduced to the input terminals of the "and" network 404 from the left output terminal in the flip-flop 314, the right output terminal in the flip-flop 306 and he "and" network 216 also shown in FIGURE 4. In addition to being applied to the "and" network 404, the signals from the "and" network 216 also pass to the inverter 444 and to an input terminal of the "and" network 406, another input terminal of which is connected to the right output terminal in the flip-flop 390.

Logical networks are also shown in FIGURE 7 for controlling the operation of the cathode followers 168 and 173. The cathode follower 168 receives from an "and" network 408 having input terminals connected to the left output terminals of the flip-flops 318 and 164, and the right output terminals of the flip-flops 306, 310 and 314. Signals pass to the cathode follower 173 from an "and" network 411 having input terminals connected to an "or" network 409 and the left output terminal of the flip-flop 164. Signals are introduced to the "or" network 409 from the left output terminals of the flip-flops 306, 310 and 314 and the right output terminal of the flip-flop 318.

As will be described in detail subsequently, the logical networks shown in FIGURE 7 control the triggering of the flip-flop 396. The flip-flop 396 is also included in FIGURE 8 to help control the operation of certain stages shown in that figure. The signals from the left output terminal in the flip-flop 396 are applied to "and" networks 410 and 412. Second input terminals of the "and" networks 410 and 412 are respectively connected to the right output terminal of the flip-flop 314 and the left output terminals of the flip-flop 318.

Signals from the "and" networks 410 and 412 and from an "and" network 414 pass through an "or" network 416 to an "and" network 418. The operation of the "and" network 414 is controlled by voltages on the left output terminals of the flip-flops 314 and 392 and on the right output terminal of the flip-flop 318. In addition to receiving the signals from the "or" network 416, the "and" network 418 has voltages applied to it from the "and" network 216, the left output terminal of the flip-flop 164 and the right output terminal of the flip-flop 390. The signals from the "and" network 418 pass to the left input terminal of the flip-flop 420 (also shown in FIGURE 6) to trigger the flip-flop.

The signals passing to the right input terminal of the flip-flop 420 are controlled by networks similar to those associated with the left input terminal of the flip-flop. These networks include "and" networks 422, 424 and 426. Voltages are applied to input terminals of the "and" network 422 from the right output terminals of the flip-flops 314 and 396 and to the "and" network 424 from the left output terminal of the flip-flop 318 and the right output terminal of the flip-flop 396. The "and" network 426 has input terminals connected to the left output terminal of the flip-flop 314 and the right output terminals of the flip-flops 318 and 392.

The signals from the "and" networks 422, 424 and 426 pass through an "or" network 428 to an input terminal of an "and" network 430. Connections are made to other input terminals of the "and" network 430 from the "and" network 216, the left output terminal of the flip-flop 164 and the right output terminal of the flip-flop 390. The output terminal of the "and" network 430 is connected to the right input terminal of the flip-flop 420.

The circuitry shown in FIGURE 8 controls the operation of a flip-flop 432 as well as the operation of the flip-flop 420. This circuitry includes "and" networks 433 and 434. The "and" network 433 has input terminals cocented to cathode followers 436 and 659 and to an inverter 438, which is adapted to receive the signals from the "and" network 222 also shown in FIGURE 4. Connections are made to input terminals of the "and" network 434 from the cathode followers 436 and 659 and from the left output terminal of the flip-flop 390.

The signals from the "and" networks 433 and 434 pass through an "or" network 440 to an input terminal of an "and" network 439 having another output terminal connected to the left output terminal of the flip-flop 164. The output terminal of the "and" network 439 has a common connection with the left input terminal of the flip-flop 432 from "and" networks 441 and 442. The operation of the "and" network 441 is controlled by the voltages on the output terminals of the cathode follower 659 and an inverter 444 and on the right output terminal of a flip-flop 446. The inverter 444 is adapted to invert the signals from the "and" network 216.

In like manner, the "and" network 442 has voltages applied to it from the "and" network 216, the right output terminals of the flip-flop 390 and of a flip-flop 1388 and the left output terminal of a flip-flop 450. Signals are introduced to the left input terminal of the flip-flop 450 from a coil 452 disposed in contiguous relationship to the track 150 of the drum 130. An inverter 453 also receives the signals induced in the coil 452 and passes output signals to the right input terminal of the flip-flop 450.

In addition to the "and" networks 433, 434, 441 and 442, "and" networks 454 and 455 pass signals through the "or" network 439 to the left input terminal in the flip-flop 432. The operation of the "and" network 454 is controlled by signals from the "and" network 216, the right output terminals of the flip-flops 390 and 450 and the left output terminals of flip-flops 456 and 458. Input terminals of the "and" network 455 are connected to the "and" network 222, the left output terminal of the flip-flop 446 and the right output terminals of the flip-flops 390 and 420.

"And" networks 459, 460 and 461 control in part the signals passing to the right input terminal of the flip-flop 432. Connections are made to input terminals of the "and" networks 459 and 460 from cathode followers 462 and 637. The "and" networks 459 and 460 also have input terminals respectively connected to the inverter 438 and the left output terminal of the flip-flop 390. Signals also pass from the inverter 444 to an input terminal of the "and" network 461, other input terminals of which are connected to the cathode follower 637 and to the right output terminal of the flip-flop 446.

The signals from the "and" network 459, 460 and 461 pass to an input terminal of an "or" network 466. The signals from the "or" network 466 pass through an "and" network 467 having another input terminal connected to the left output terminal of the flip-flop 164. The signals pass through the "and" network 467 to the right input terminal of the flip-flop 432. "And" networks 468, 470 and 472 also furnish signals to the right input terminal of the flip-flop 432 through the "or" network 466 and the "and" network 467. Input terminals of the "and" network 468 are connected to the "and" network 216, the left output terminals of the flip-flops 450 and 1388 and the right output terminal of the flip-flop 390. Connections are made to input terminals of the "and" network 470 from the "and" network 216, the left output terminal of the flip-flop 458 and the right output terminals of the flip-flops 390, 450 and 456. The operation of the "and" network 472 is controlled by voltages from the "and" network 222, the left output terminals of the flip-flops 420 and 446 and the right output terminal of the flip-flop 390.

Figure 9:
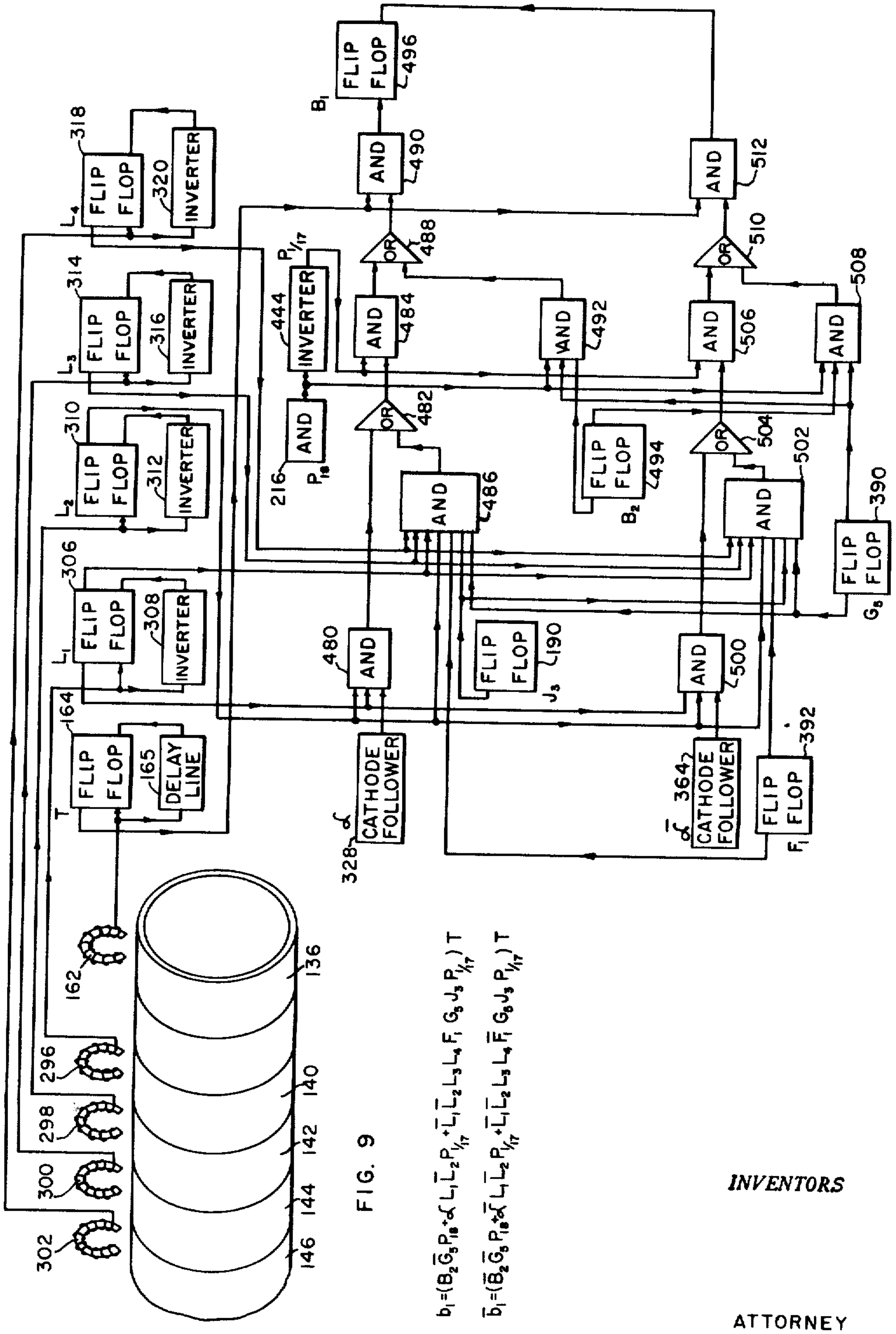

The cathode followers indicated at 328 and 364 in FIGURE 6 are also shown in FIGURE 9. The output from the cathode follower 328 is introduced to an "and" network 480, which also receives signals from the left output terminal of the flip-flop 306 and the right output terminal of the flip-flop 310. The output signals from the "and" network 480 pass through an "or" network 482 to an "and" network 484. Signals from an "and" network 486 also pass through the "or" network 482 to the "and" network 484. The input terminals of the "and" network 486 are connected to the left output terminals of the flip-flops 190, 314, 318, 390 and 392 and to the right output terminals of the flip-flops 306 and 310.

The "and" network 484 has an input terminal connected to the inverter 444 as well as an input terminal connected to the "or" network 482. The output signals from the "and" network 484 pass through an "or" network 488 to an "and" network 490. The "and" network 490 also receives signals through the "or" network 488 from an "and" network 492 having input terminals connected to the "and" network 216, the right output terminal in the flip-flop 390 and the left output terminal in the flip-flop 494 (also shown in FIGURE 6). The output signals from the "and" network 490 are in turn introduced to the left input terminal in a flip-flop 492 to trigger the flip-flop into a particular state of operation.

Just as the "and" network 480 receives signals from the cathode follower 328, an "and" network 500 receives signals from the cathode follower 364. Other input terminals of the "and" network 500 are connected to the left output terminal in the flip-flop 306 and the right output terminal in the flip-flop 310. The signals from the "and" network 500 and from an "and" network 502 pass through an "or" network 504 to an "and" network 506. Connections are made to input terminals of the "and" network 502 from the left output terminals of the flip-flops 190, 314, 318 and 390 and from the right output terminals of the flip-flops 306, 310 and 392.

The operation of the "and" network 506 is controlled by signals from the inverter 444 as well as from the "or" network 504. The output signals from the "and" network 506 and from an "and" network 508 pass to an "or" network 510, the input terminals of the "and" network 508 being connected to the "and" network 216 and the right output terminals of the flip-flops 390 and 494. The signals introduced to the "or" network 510 pass through the "or" network to an "and" network 512, which also has signals applied to it from the left output terminal of the flip-flop 164. The output terminal of the "and" network 512 is connected to the right input terminal of the flip-flop 496.

Figure 10:
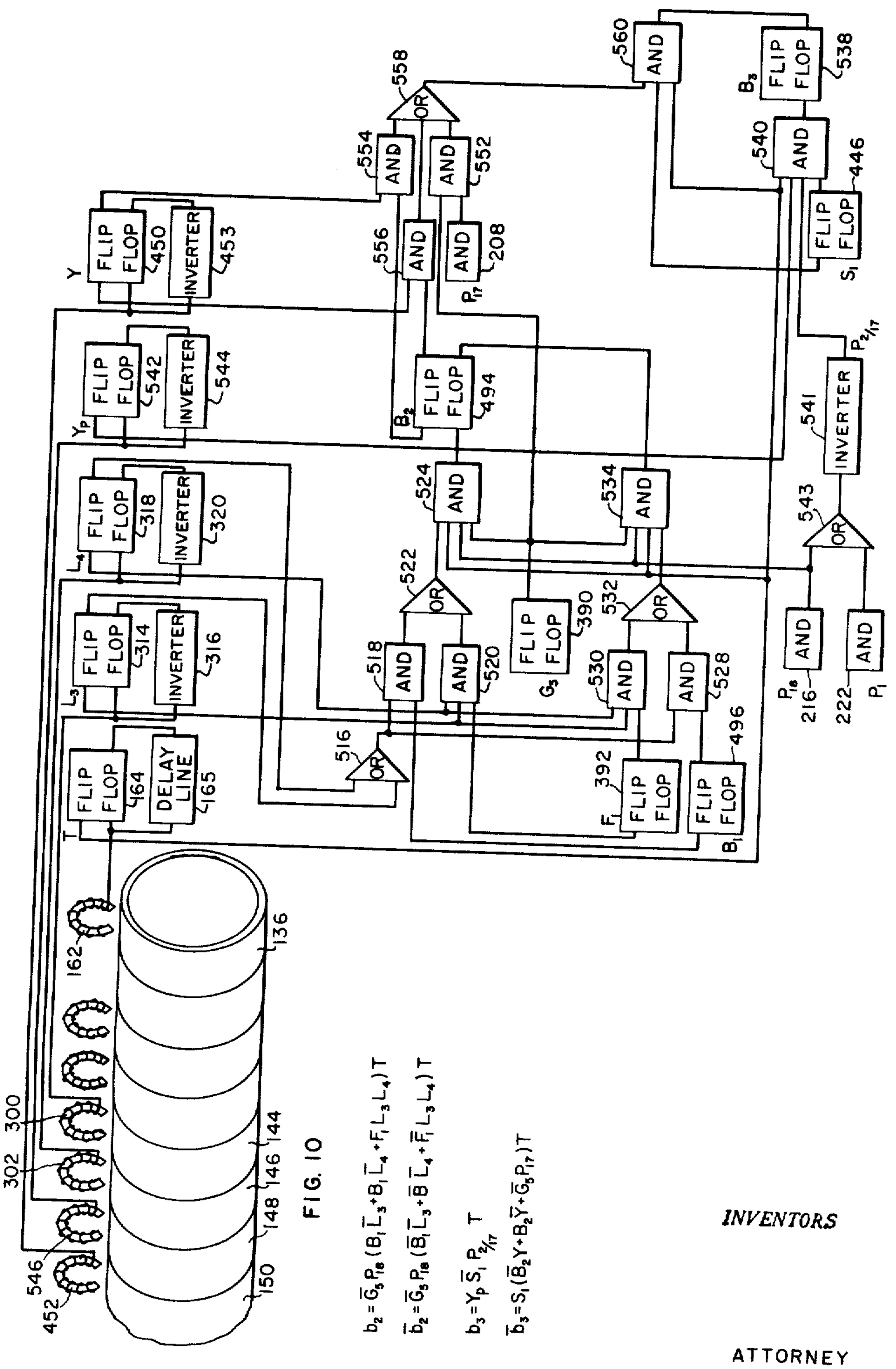

The operation of the flip-flop 494 shown in FIGURE 9 is controlled by certain logical networks illustrated in FIGURE 10. These networks include an "or" network 516 which receives signals from the right output terminals in the flip-flops 314 and 318 and passes these signals to an "and" network 518. The operation of the "and" network 518 is controlled by signals from the left output terminal in the flip-flop 496 as well as the signals from the "or" network 516. The signals from the "and" network 518 and from an "and" network 520 in turn pass through an "or" network 522 to an "and" network 524. Input terminals of the "and" network 520 are connected to the left output terminals of the flip-flops 314, 318 and 392. In addition to the signals from the "or" network 522, the "and" network 524 receives signals from the "and" network 216, the left output terminal of the flip-flop 164 and the right output terminal of the flip-flop 390. The signals from the "and" network 524 are applied to tht left input terminal of the flip-flop 494.

"And" networks 528 and 530 corresponding to the "and" networks 518 and 520 described above are also shown in FIGURE 10. The "and" network 528 receives signals from the "or" network 516 and the right output terminal of the flip-flop 496. The "and" network 530 has voltages applied to it from the left output terminals of the flip-flops 314 and 318 and the right output terminal of the flip-flop 392.

The signals from the "and" networks 528 and 530 pass through an "or" network 532 to an input terminal of an "and" network 534. Other input terminals of the "and" network 534 are connected to the "and" network 216, the left output terminal in the flip-flop 164 and the right output terminal in the flip-flop 390. The output signals from the "and" network 534 are introduced to the right input terminal in the flip-flop 494 to trigger it into a particular state of operation.

Logical networks are also shown in FIGURE 10 for controlling the operation of a flip-flop 538. These logical networks include an "and" network 520 which receives signals from an inverter 541, the inverter in turn receiving input signals through an "or" network 543 from the "and" networks 216 and 222. The "and" network 540 also receiving signals from the left output terminal in the flip-flop 164 and the right output terminal in the flip-flop 446. An input terminal of the "and" network 540 is also connected to the left output terminal of a flip-flop 542. The flip-flop 542 and an inverter 544 are adapted to receive signals from a coil 546 disposed in contiguous relationship to the track 148. The flip-flop 542 and the inverter 544 are electrically interrelated in a manner similar to that described above for the flip-flop 280 and the inverter 282 in FIGURE 6.

Connections are made to input terminals of an "and" network 552 from the "and" network 208 also shown in FIGURE 4 and from the right output terminal of the flip-flop 390. An "and" network 554 receives input signals from the left output terminal of the flip-flop 494 and from the right output terminal of the flip-flop 450. Similarly, an "and" network 556 has signals applied to it from the right output terminal of the flip-flop 494 and from the left output terminal of the flip-flop 450. The signals from the "and" networks 552, 554 and 556 pass through an "or" network 558 to an input terminal of an "and" network 560. Other input terminals of the "and" network 560 are connected to the left output terminals of the flip-flops 164 and 446. The output signals from the "and" network 560 are introduced to the right input terminal of the flip-flop 538 to trigger the flip-flop.

Figure 11:
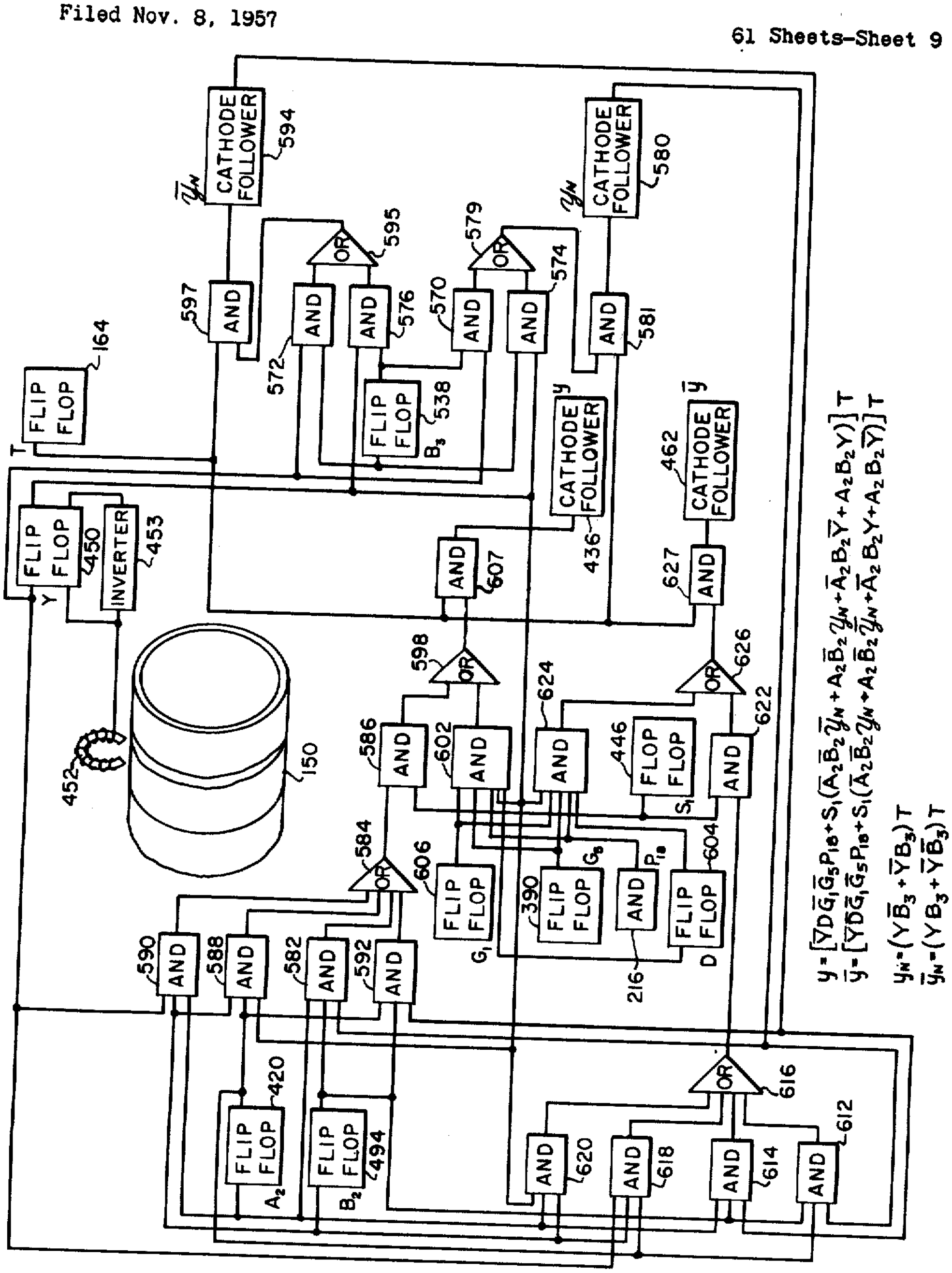

The flip-flop 450 shown in FIGURES 8 and 10 is also shown in FIGURE 11. The signals on the left output terminal of the flip-flop 450 are introduced to input terminals of "and" networks 570 and 572 and the signals on the right input terminal of the flip-flop 450 are introduced to input terminals of "and" networks 574 and 576. The "and" networks 572 and 574 have second input terminals connected to the left output terminal of the flip-flop 538 also shown in FIGURE 10. Similarly, connections are made from the right output terminal of the flip-flop 538 to second input terminals of the "and" networks 570 and 576.

The signals from the "and" networks 570 and 574 pass through an "or" network 579 to an input terminal of an "and" network 581 having another input terminal connected to the left output terminal of the flip-flop 164. The signals from the "and" network 581 in turn pass to an input terminal of a cathode follower 580, the output terminal of which is connected to an input terminal of an "and" network 582. Other input terminals of the "and" network 582 are connected to the left output terminal of the flip-flop 420 also shown in FIGURE 8 and to the right output terminal of the flip-flop 494 also shown in FIGURE 10. The signals from the "and" network 582 in turn pass through an "or" network 584 to an "and" network 586. Signals from "and" networks 588, 590 and 592 also pass through the "or" network 584 to the "and" network 586.

Input terminals of the "and" network 588 are connected to the left output terminal of the flip-flop 494 and to the right output terminals of the flip-flops 420 and 450. The "and" network 590 has input terminals connected to the left output terminals of the flip-flops 420, 450 and 494. Similarly, the "and" network 592 receives signals from the right output terminals of the flip-flops 420 and 494 and from a cathode follower 594. The cathode follower 594 in turn receives signals from an "and" network 597, the operation of which is controlled by signals from an "or" network 595 and the left output terminal of the flip-flop 164. Input terminals of the "or" network 595 are connected to the "and" networks 572 and 576.

In addition to receiving the signals passing through the "or" network 584, the "and" network 586 has signals introduced to it from the left output terminal of the flip-flop 446. The signals from the "and" network 586 are applied to an "or" network 598. Signals are also introduced to the "or" network 598 from an "and" network 602 having input terminals connected to an output terminal of the "and" network 216, the left output terminal of a flip-flop 604 and the right output terminals of the flip-flops 390, 606 and 450. The signals introduced to the "or" network 598 pass through the network to an input terminal of an "and" network 607 having another input terminal connected to the left output terminal of the flip-flop 164. The ouput signals from the "and"

network 607 are in turn introduced to the cathode follower 436 also shown in FIGURE 8.

The output signals from the cathode followers 580 and 594 also respectively pass to input terminals of "and" networks 612 and 614. Other input terminals of the "and" network 612 are connected to the right output terminals of the flip-flops 420 and 494. In like manner, other input terminals of the "and" network 614 are connected to the left output terminal of the flip-flop 420 and the right output terminal of the flip-flop 494. The signals from the "and" networks 612 and 614 pass to an "or" network 616, which also receives signals from "and" networks 618 and 620.

Connections are made to input terminals of the "and" network 618 from the left output terminals of the flip-flops 450 and 494 and from the right output terminal of the flip-flop 420. In like manner, the input terminals of the "and" network 620 have voltages applied to them from the left output terminals of the flip-flops 420 and 494 and the right output terminal of the flip-flop 450.

The signals from the "or" network 616 are introduced to an input terminal of an "and" network 622 having a second input terminal connected to the left output terminal of the flip-flop 446. The signals from the "and" network 622 pass through an "or" network 626 to an input terminal for an "and" network 627 having another input terminal connected to the left output terminal of the flip-flop 164. The output signals from the "and" network 627 are introduced to the cathode follower 462 also shown in FIGURE 8. Signals from an "and" network 624 also pass through the "or" network 626 to the "and" network 627. The "and" network 624 has input terminals connected to the output terminal of the "and" network 216 and to the right output terminals of the flip-flops 390, 450, 604 and 606.

The logical networks shown in FIGURE 11 are included to control the passage of signals to the cathode followers 436 and 462 shown in both FIGURES 8 and 11. The cathode followers 436 and 462 in turn operate in conjunction with other stages to control the operation of the cathode followers 659 and 637, shown in FIGURE 12, these cathode followers having also been previously shown in FIGURE 8. The signals from the cathode follower 436 pass to an "and" network 634, which also receives signals from the right output terminal in the flip-flop 432 and from the cathode follower 637. Signals are introduced to the cathode follower 637 from an "and" network 639 having input terminals connected to an "or" network 636 and the left output terminal of the flip-flop 164.

The "or" network 636 receives signals from "and" networks 640 and 642. Input terminals of the "and" network 640 are connected to the left output terminals of flip-flops 458 and 646. Similarly, the "and" network 642 has input terminals connected to the right output terminals of the flip-flops 458 and 646. The left input terminal of the flip-flop 646 receives signals from a coil 648 disposed in contiguous relationship to the track 152. The coil 648 has electrical signals induced in it in accordance with the pattern of magnetic information in the track 152 as the drum 130 rotates. The signals from the coil 648 pass to the input termial of an inverter 650 as well as to the left input terminal of the flip-flop 646, the output terminal of the inverter 650 being connected to the right input terminal of the flip-flop 646.

"And" networks 652 and 654 perform functions similar to the "and" networks 640 and 642. The operation of the "and" network 652 is controlled by signals from the left output terminal of the flip-flop 646 and the right output terminal of the flip-flop 458. In the manner, the operation of the "and" network 654 is controlled by signals from the right output terminal of the flip-flop 646 and the left output terminal of the flip-flop 458.

The signals from the "and" networks 652 and 654 pass through an "or" network 656 to an input terminal of an "and" network 657 having another input terminal connected to the left output terminal of the flip-flop 164. The signals from the "and" network 657 are introduced to a cathode follower 659, which then passes the signals to an input terminal of an "and" network 658. Other input terminals of the "and" network 658 are connected to the cathode follower 436 and to the left output terminal of the flip-flop 432.

The signals from the "and" network 658 and from the "and" networks 634 and 638 pass through an "or" network 664. The signals then pass to an input terminal of an "and" network 667 having another input terminal connected to the left output terminal of the flip-flop 164 and having its output terminal connected to the cathode follower 437. Signals from "and" networks 660 and 461 also pass through the "or" network 664 to the "and" network 667. Connections are made to input terminals of the "and" network 660 from the cathode follower 659, the cathode follower 462 and the right output terminal of the flip-flop 432. Since the "and" network 461 is also shown in FIGURE 8, the connections to the "and" network have previously been described in detail.

Signals are introduced to the cathode follower 464 from an "and" network 669 having input terminals connected to an "or" network 665 and to the left output terminal of the flip-flop 164. The "or" network 665 in turn receives signals from a plurality of "and" networks 666, 668, 670, 672 and 441. The operation of the "and" network 666 is controlled by signals from the cathode followers 436 and 659 and from the right output terminal of the flip-flop 432. The "and" network 668 has voltages applied to it from the cathode followers 436 and 637 and the left output terminal of the flip-flop 432.

The "and" network 670 receives signals from the cathode followers 462 and 637 and the right output terminal of the flip-flop 432. Input terminals of the "and" network 672 are connected to the cathode followers 462 and 659 and to the left output terminal of the flip-flop 432. Since the "and" network 441 is also shown in FIGURE 8, the connections to the "and" network have previously been described in detail.

Figure 13:
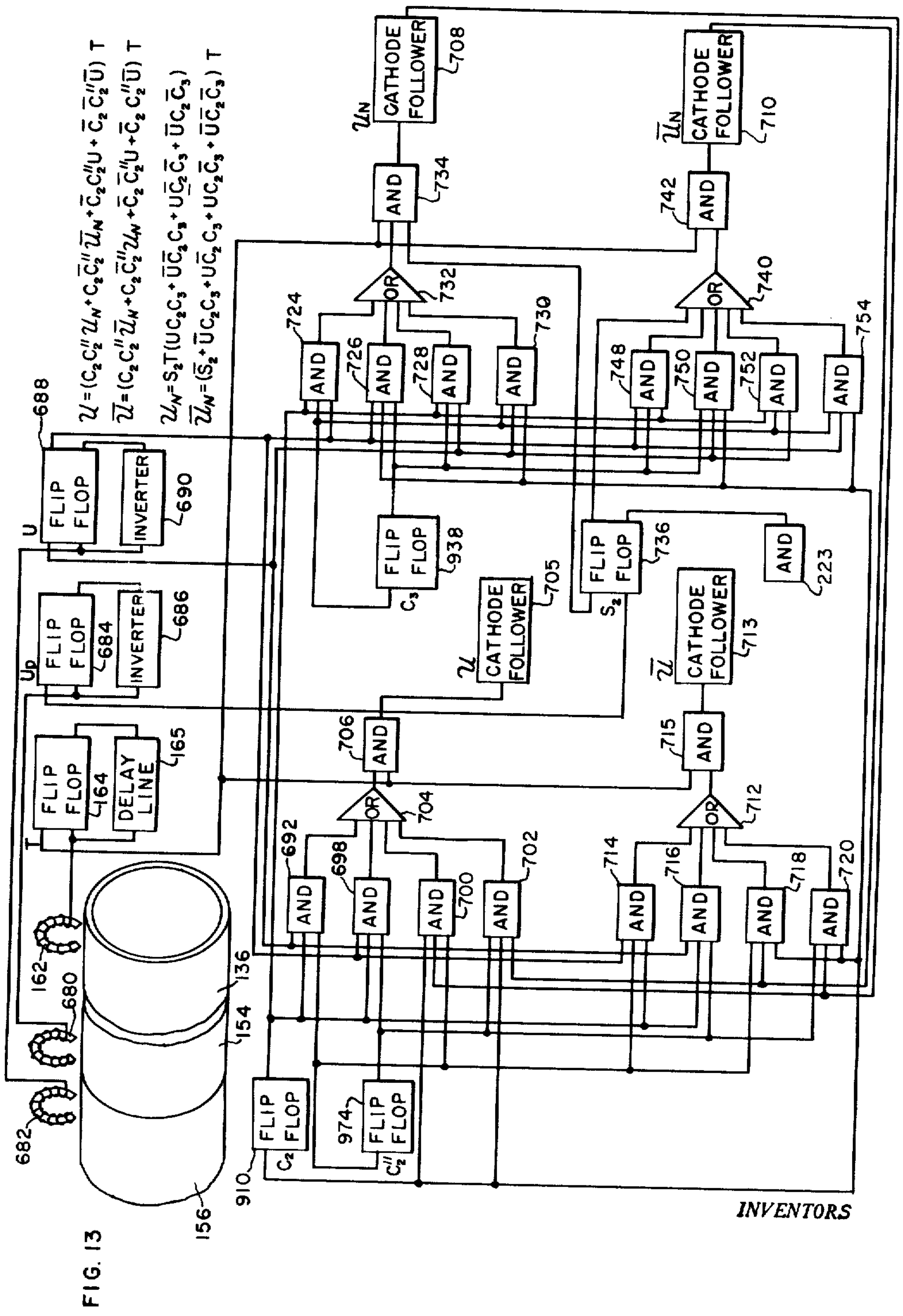

The stages shown in FIGURE 13 utilize signals electrically induced in coils 680 and 682 in accordance with the pattern of magnetic information in the tracks 154 and 156. Signals are induced in the coils 680 and 682 because of the disposition of the coils in contiguous relationship to the tracks 154 and 156, respectively. Signals from the coil 680 pass to the left input terminal in a flip-flop 684 and to the input terminal in an inverter 686. Similarly, the left input terminal in a flip-flop 688 and the input terminal in an inverter 690 receive signals from the coil 682. The output terminals of the inverters 686 and 690 are respectively connected to the right input terminals in the flip-flops 684 and 688.

The signals on the left output terminal of the flip-flop 688 pass to an input terminal of an "and" network 692 having other input terminals connected to the right output terminal in a flip-flop 910 and to the left output terminal in a flip-flop 974. Similarly, the signals on the right output terminal of the flip-flop 688 pass to an input terminal of an "and" network 698, other input terminals of which are connected to the right output terminals of the flip-flops 910 and 974.

The output signals from the "and" networks 692 and 698 and from "and" networks 700 and 702 are introduced through an "or" network 704 to an input terminal of an "and" network 706 having another input terminal connected to the left output terminal of the flip-flop 164 and having its output terminal connected to a cathode follower 705. Signals are applied to the input terminals of the "and" network 700 from a cathode follower 708 and from the left output terminals of the flip-flops 910 and 974. The input terminals of the "and" network 702 are connected to a cathode follower 710, to the left output terminal of the flip-flop 910 and to the right output terminal of the flip-flop 974.

A cathode follower 713 is adapted to receive signals representing the inverse of the information passing to the cathode follower 705. The cathode follower 713 is connected to the output terminal of an "and" network 715, the input terminals of which receive voltages from an "or" network 712 and the left output terminal of the flip-flop 164. The "or" network 712 passes the output signals from "and" networks 714, 716, 718 and 720. The "and" network 714 has voltages applied to it from the right output terminals in the flip-flops 688 and 910 and the left output terminal of the flip-flop 974. Similarly, the "and" network 716 has voltages applied to it from the right output terminals of the flip-flops 910 and 974 and from the left output terminal of the flip-flop 688. Input terminals of the "and" network 718 are connected to the cathode follower 710 and to the left output terminals of the flip-flops 910 and 974. The operation of the "and" network 720 is controlled by signals from the cathode follower 708, the left output terminal of the flip-flop 910 and the right output terminal of the flip-flop 974.

Logical networks are also shown in FIGURE 13 for controlling the operation of the cathode followers 708 and 710. These logical networks include an "and" network 724 having input terminals connected to the right output terminals in the flip-flops 688 and 910 and to the left output terminal in a flip-flop 938. The signals from the "and" network 724 and from "and" networks 726, 728 and 730 pass to an "or" network 732. Signals from the "or" network 732 and from the left output terminals of the flip-flop 164 and a flip-flop 736 are introduced to an "and" network 734. The output from the "and" network 734 is applied to the cathode follower 708.

As disclosed above, the "and" networks 724, 726, 728 and 730 control the operation of the "or" network 732. Input terminals of the "and" network 726 are connected to the right output terminals of the flip-flops 688 and 938 and to the left output terminal of the flip-flop 910. The "and" network 728 has input terminals connected to the right output terminals of the flip-flops 910 and 938 and to the left output terminal of the flip-flop 688. The "and" network 730 is operatively controlled by signals from the left output terminals of the flip-flops 688, 910 and 938.

The operation of the cathode follower 710 is controlled by signals from an "and" network 742, which receives signals from an "or" network 740 and from the left output terminal of the flip-flop 164. The "or" network 740 receives signals from the right output terminal of the flip-flop 736. Signals from "and" networks 748, 750, 752 and 754 also pass to the "or" network 740. Connections are made to input terminals of the "and" network 748 from the right output terminals of the flip-flops 688, 910 and 938. The "and" network 750 has input terminals connected to the left output terminal of the flip-flops 688 and 910 and the right output terminal of the flip-flop 938. The "and" network 752 receives at its input terminals signals from the left output terminals of the flip-flops 688 and 938 and from the right output terminal of the flip-flop 910. Voltages are applied to the "and" network 754 from the left output terminals of the flip-flops 910 and 938 and the right output terminal of the flip-flop 688.

Figure 14:
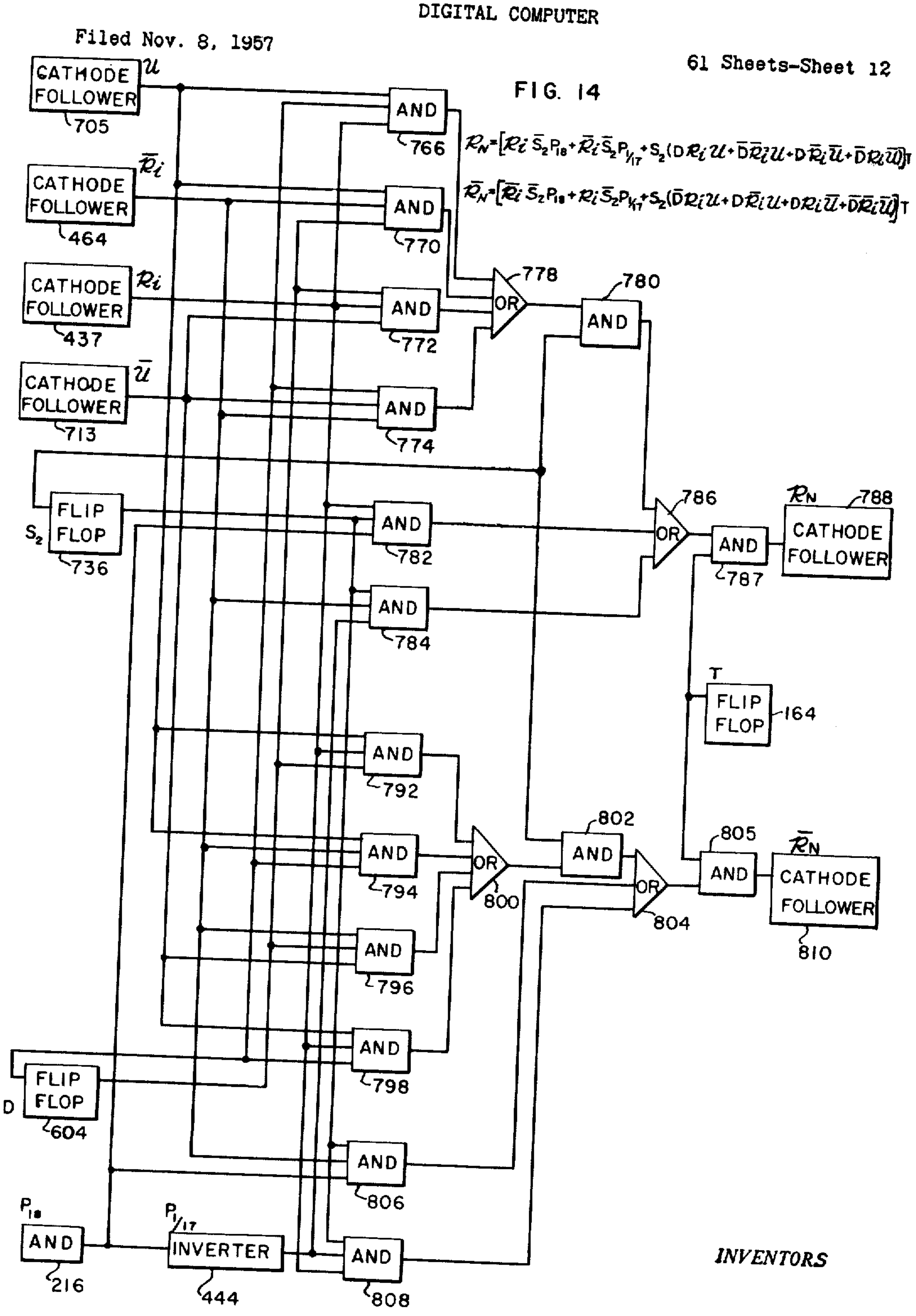

The cathode followers 437 and 464 shown in FIGURE 12 and the cathode followers 705 and 713 shown in FIGURE 13 are included in the circuitry illustrated in FIGURE 14. The output signals from the cathode followers 437 and 705 are introduced to input terminals of an "and" network 766, another input terminal of which is connected to the left output terminal of the flip-flop 604. Similarly, an "and" network 770 has signals applied to it from the cathode followers 464 and 705 and from the right output terminal of the flip-flop 604. An "and" network 772 receives voltages from the cathode followers 437 and 713 and from the right output terminal of the flip-flop 604. An "and" network 774 is operatively controlled by signals from the cathode followers 464 and 713 and from the left output terminal of the flip-flop 604.

The signals from the "and" network 766, 770, 772 and 774 pass through an "or" network 778 to an input terminal of an "and" network 780 having another input terminal connected to the left output terminal of the flip-flop 736. The signals from the "and" network 780 and from "and" networks 782 and 784 in turn pass through an "or" network 786 to an input terminal of an "and" network 787 having another input terminal connected to the left output terminal of the flip-flop 164 and having its output terminal connected to a cathode follower 788. The operation of the "and" network 782 is controlled by the signals from the cathode follower 437, the "and" network 216 and the right output terminal of the flip-flop 736. Signals are applied to the "and" network 784 from the cathode follower 464, the inverter 444 and the right output terminal of the flip-flop 736.

"And" networks 792, 794, 796 and 798 perform functions similar to the "and" networks 766, 770, 772 and 774. The "and" network 792 receives signals from the cathode followers 437 and 705 and from the right output terminal of the flip-flop 604. Voltages are applied to the "and" network 794 from the cathode followers 464 and 705 and from the left output terminal of the flip-flop 604. The "and" network 796 has input terminals connected to the cathode followers 464 and 713 and to the right output terminal of the flip-flop 604. Connections are made to input terminals of the "and" network 798 from the cathode followers 437 and 713 and from the left output terminal of the flip-flop 604.

The signals from the "and" networks 792, 794, 796 and 798 pass through an "or" network 800 to an input terminal of an "and" network 802, another input terminal of which is connected to the left output terminal of the flip-flop 736. The signals from the "and" network 802 and from "and" networks 806 and 808 in turn pass through an "or" network 804 to an input terminal of an "and" network 805 having another input terminal connected to the left output terminal of the flip-flop 164 and having its output terminal connected to a cathode follower 810. Input terminals of the "and" network 806 are connected to the cathode follower 464, the "and" network 216 and the right output terminal of the flip-flop 736. Voltages are applied to input terminals of the "and" network 808 from the cathode follower 437, the inverter 444 and the right output terminal of the cathode follower 736.

Figure 15:
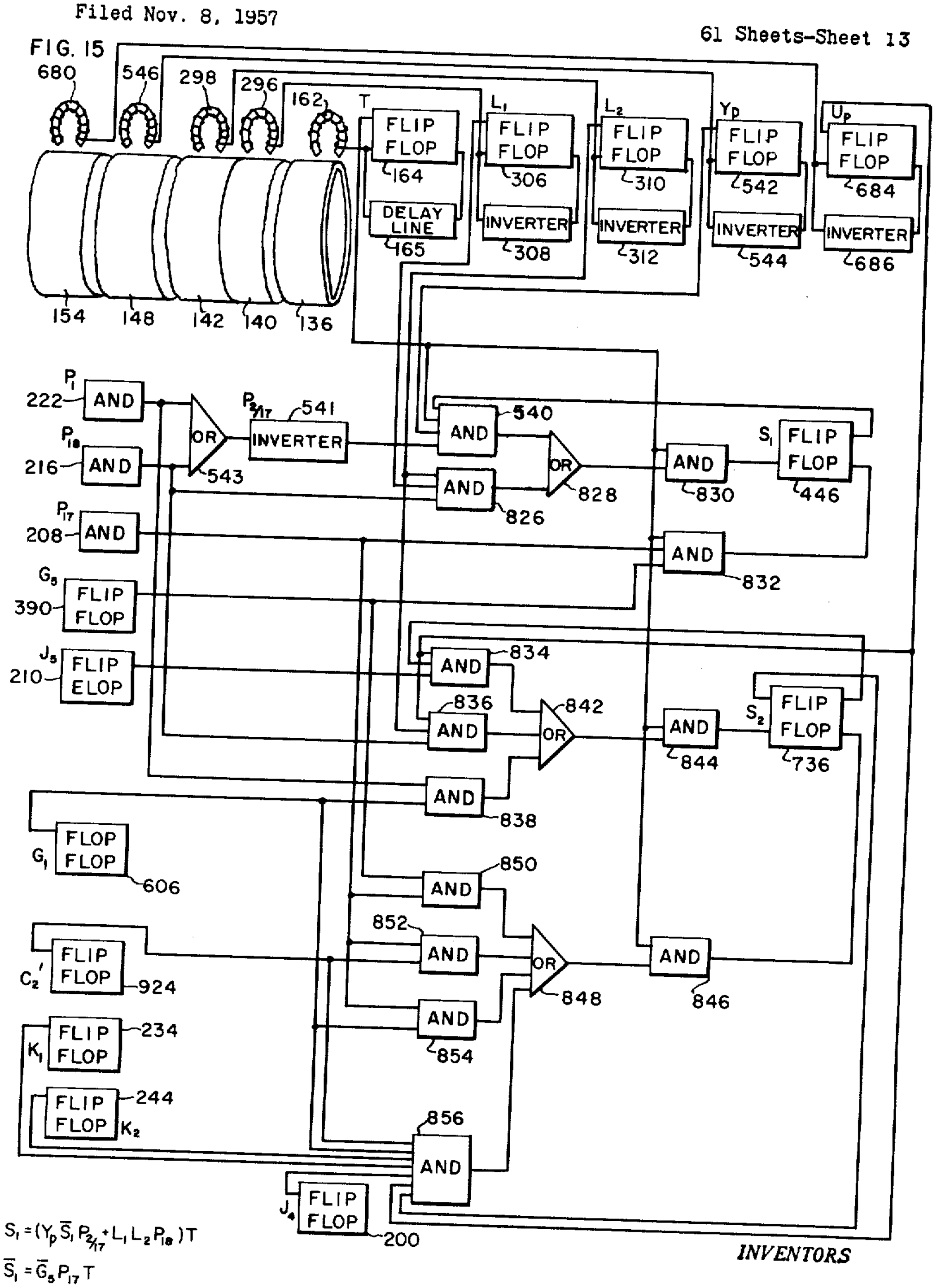

IN FIGURE 15 stages are shown for controlling the operation of the flip-flop 446 shown in FIGURE 12 and the flip-flop 736 shown in FIGURES 12 and 13. The stages include the "and" network 540, which receives signals from the inverter 541 and the flip-flops 446 and 542 as described above and shown in FIGURE 10. An "and" network 826 is associated with the "and" network 540. Input terminals of the "and" network 826 are connected to the "and" network 216 and to the left output terminals of the flip-flops 306 and 210. The signals from the "and" networks 540 and 826 pass through an "or" network 828 to an "and" network 830 having a second input terminal connected to the left output terminal of the flip-flop 164. The signals from the "and" network 826 are in turn introduced to the left input terminal of the flip-flop 446 to trigger the flip-flop.

The operation of the flip-flop 446 is also controlled by signals which are introduced to the right input terminal of the flip-flop from an "and" network 832. Signals are received by the "and" network 832 from the output terminal of the "and" network 208, the left output terminal of the flip-flop 164 and the right output terminal of the flip-flop 390.

"And" networks 834, 836 and 838 are included in the stages which control the operation of the flip-flop 736. Connections are made to input terminals of the "and" network 834 from the left output terminal of the flip-flop 684 and from the right output terminals of flip-flops 210 and 736. Input terminals of the "and" network 836 are connected to the "and" network 216 and to the left output terminals of the flip-flops 310 and 684. The "and" network 838 receives signals from the "and" network 222 and the left output terminal of the flip-flop 606.

The signals from the "and" networks 834, 836 and 838 pass through an "or" network 842 to an input terminal of an "and" network 844, input terminals of which are connected to the left output terminal of the flip-flop 164. The signals from the "and" network 844 are in turn introduced to the left input terminal of the flip-flop 736 to control the operation of the flip-flop.

Signals are applied to the right input terminal of the flip-flop 736 from an "and" network 846 having input terminals connected to an "or" network 848 and to the left output terminal in the flip-flop 164. The "or" network 848 receives signals from "and" networks 850, 852, 854 and 856. First input terminals of the "and" networks 850, 852 and 854 are connected to the "and" network 208. Second input terminals of the "and" networks 850, 852 and 854 respectively have voltages applied to them from the right output terminal of the flip-flop 390, the left output terminal of a flip-flop 924 and the left output terminal of the flip-flop 606. The operation of the "and" network 856 is controlled by the voltages on the left output terminals of the flip-flops 200, 234, 244, 606, 684, 736 and 924.

In FIGURE 16, stages are shown for controlling the operation of flip-flops 860, 862 and 864. The stages include an "and" network 866 having input terminals connected to the left output terminals of flip-flops 868, 164, 306 and 310, to the right output terminal of the flip-flop 860 and to the output of an inverter 444. The signals from the "and" network 866 are introduced to the left input terminal of the flip-flop 860.

Signals are introduced to the right input terminal of the flip-flop 860 in accordance with the operation of an "and" network 870, input terminals of which are connected to an "or" network 872 and to the left output terminal of the flip-flop 164. The "or" network 872 receives signals from "and" networks 874 and 876. Connections are made to input terminals of the "and" network 874 from the left output terminals of the flip-flops 306, 310, 860 and 868. Input terminals of the "and" network 876 are connected to the "and" network 216 and the left output terminal of the flip-flop 310.

"And" networks 880 and 882 are included for controlling the operation of the flip-flop 862. Signals are applied to input terminals of the "and" network 880 from the cathode follower 328 also shown in FIGURE 6, the left output terminals of the flip-flops 306, 310, 860 and 868 and the right output terminal of the flip-flop 862. The operation of the "and" network 882 is controlled by voltages from the cathode follower 364 also shown in FIGURE 6, the left output terminals of the flip-flops 306, 310 and 868 and the right output terminals of the flip-flops 860 and 862. The signals from the "and" networks 880 and 882 pass through an "or" network 884 to an input terminal of an "and" network 886 having other input terminals connected to the left output terminal of the flip-flop 164 and to the output terminal of inverter 444. The signals from the "and" network 886 are applied to the left input terminal of the flip-flop 862 to trigger the flip-flop.

"And" networks 890 and 892 corresponding to the "and" networks 880 and 882 control in part the signals passing to the right input terminal of the flip-flop 862. The "and" network 890 has signals applied to its input terminals from the cathode follower 328 and the left output terminals of the flip-flops 306, 310, 860, 862 and 868. The "and" network 892 receives voltages at its input terminals from the cathode follower 364, the left output terminals of the flip-flops 306, 310, 862 and 868 and the right output terminal of the flip-flop 860. Signals from the "and" networks 890 and 892 and from the "and" network 876 pass through an "or" network 894 to an input terminal of an "and" network 896. Another input terminal of the "and" network 896 is connected to the left output terminal of the flip-flop 164, and the output terminal of the "and" network is connected to the right input terminal of the flip-flop 862.

Signals pass to the right input terminal in the flip-flop 864 from an "and" network 900. Connections are made to input terminals of the "and" network 900 from the cathode follower 364, the left output terminals of the flip-flops 164, 306, 310 and 868 and the right output terminals of the flip-flops 860 and 862. Signals are introduced to the left input terminal of the flip-flop 864 in accordance with the operation of "and" networks 902 and 904 and an "or" network 906. Input terminals of the "and" network 902 have signals applied to them from the cathode follower 328 and the left output terminals of the flip-flops 306, 310, 860, 862 and 868. Signals from the "and" network 902 and the "and" network 876 pass through the "or" network 906 to the "and" network 904, another input terminal of which is connected to the left output terminal of the flip-flop 164. The signals from the "and" network 904 are applied to the left input terminal of the flip-flop 864 to trigger the flip-flop.

Figure 17:
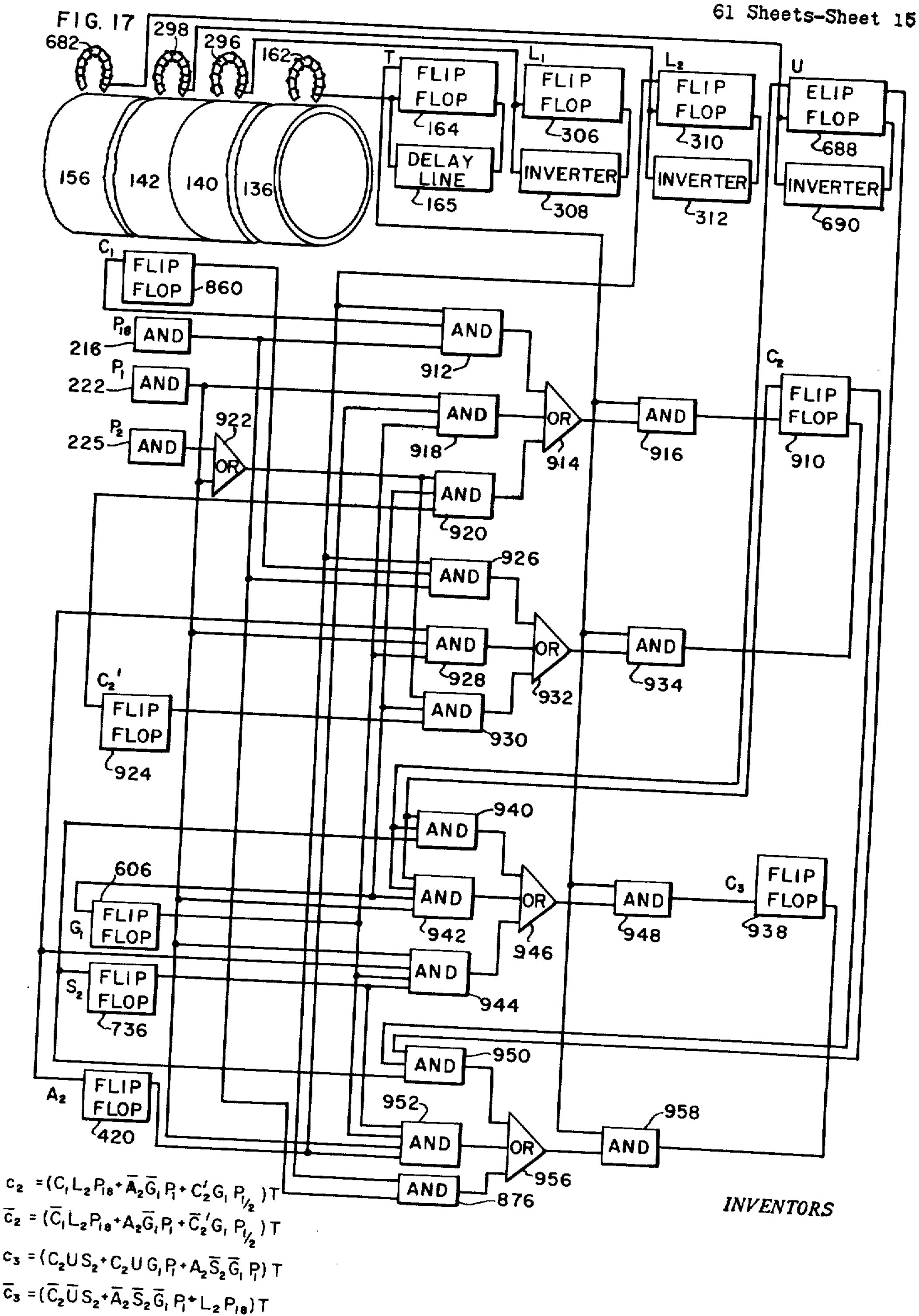

The flip-flop 860 shown in FIGURE 16 is included in FIGURE 17 to control the operation of the flip-flop 910 (previously shown in FIGURE 13). The voltage on the left output terminal of the flip-flop 860 is applied to an input terminal of an "and" network 912, which also receives voltages from the "and" network 216 and the left output terminal of the flip-flop 310. The signals from the "and" network 912 pass through an "or" network 914 to an input terminal of an "and" network 916 having another input terminal connected to the left output terminal of the flip-flop 164. The output terminal from the "and" network 916 is connected to the left input terminal of the flip-flop 910.

Signals from "and" networks 918 and 920 also pass through the "or" network 914 to the "and" network 916. Signals are received at input terminals of the "and" network 918 from the "and" network 222 and from the right output terminals of the flip-flops 420 and 606. The operation of the "and" network 920 is controlled by the voltages from an "or" network 922 and the left output terminals of the flip-flop 606 and the flip-flop 924 (also shown in FIGURE 15). The "or" network 922 receives signals from the "and" network 222 and an "and" network 225. It is believed that a person skilled in the art would be able to construct the "and" network 225 to obtain a signal at position 2 in each block. A person skilled in the art would be able to construct the "and" network 225 in view of the discussion relating to other "and" networks such as network 222 and the chart shown in FIGURE 32.

"And" networks 926, 928 and 930 are included to control the signals passing to the right input terminal of the flip-flop 910. The "and" network 926 has input terminals connected to the "and" network 216, the left output terminal of the flip-flop 310 and the right output terminal of the flip-flop 860. Connections are made to input terminals of the "and" network 928 from the "and" network 222, the left output terminal of the flip-flop 420 and the right output terminal of the flip-flop 606. The "and" network 930 receives voltages at its input terminals from the "or" network 922, the left output terminal of the flip-flop 606 and the right output terminal of the flip-flop 924. The signals from the "and" networks 926, 928 and 930 pass through an "or" network 932 to an input terminal of an "and" network 934 having another input terminal connected to the left output terminal of the flip-flop 164. The signals from the "and" network 934 are applied to the right input terminal of the flip-flop 910.

Logical networks are also shown in FIGURE 17 for controlling the operation of a flip-flop 938. These stages include "and" networks 940, 942 and 944. Signals are applied to the "and" network 940 from the left output terminals of the flip-flops 688, 736 and 910. The "and" network 942 has voltages introduced to it from the "and" network 222 and the left output terminals of the flip-flops 606, 688 and 910. The "and" network 944 receives voltages at its input terminals from the "and" network 222, the left output terminal of the flip-flop 420 and the right output terminals of the flip-flops 606 and 736. The signals from the "and" networks 940, 942 and 944 pass through an "or" network 946 to an input terminal of an "and" network 948, another input terminal of which is connected to the left output terminal of the flip-flop 164. The output signals from the "and" network 948 in turn pass to the left input terminal of the flip-flop 938 to trigger the flip-flop.

"And" networks 950 and 952 respectively correspond to the "and" networks 940 and 942. The "and" network 950 has input terminals connected to the left output terminal of the flip-flop 736 and the right output terminals of the flip-flops 688 and 910. The "and" network 952 has voltages applied to it from the "and" network 222 and the right output terminals of the flip-flops 420, 606 and 736. The signals from the "and" networks 950 and 952 and from the "and" network 876 (also shown in FIGURE 16) pass through an "or" network 956 to an input terminal of an "and" network 958 having another input terminal connected to the left output terminal of the flip-flop 164. The signals from the "and" network 958 are applied to the right input terminal of the flip-flop 938.

FIGURE 18 shows stages for controlling the operation of the flip-flop 924 also shown in FIGURE 17 and the operation of cathode followers 962 and 964. "And" stages 966, 968, 970 and 972 control in part the triggering signals introduced to the flip-flop 924. The "and" network 966 has input terminals connected to the "and" network 216 and to the left output terminals of the flip-flops 310 and 662. The "and" network 968 has voltages applied to its input terminals from the "and" network 222, the left output terminal of the flip-flop 606 and the right output terminal of the flip-flop 974. The "and" network 970 receives voltages at its input terminals from the "and" network 216 and from the right output terminals of the flip-flops 306, 310 and 390. Voltages are applied to the input terminals of the "and" network 972 from the "and" network 225 (also shown in FIGURE 16) and the left output terminals of the flip-flop 606 and a flip-flop 976.

The signals from the "and" networks 966, 968, 970 and 972 pass through an "or" network 978 to an input terminal of an "and" network 980, another input terminal of which is connected to the left output terminal of the flip-flop 164. The signals passing through the "and" network 980 are in turn applied to the left input terminal of the flip-flop 924 to trigger the flip-flop into the "true" state of operation of the flip-flop.

"And" networks 984, 986, 988 and 990 control in part the signals passing to the right input terminal of the flip-flop 924. Connections are made to input terminals of the "and" network 984 from the "and" network 216, the left output terminal of the flip-flop 310 and the right output terminal of the flip-flop 862. Input terminals of the "and" network 986 are connected to the "and" network 222 and the left output terminals of the flip-flops 606 and 974. The "and" network 988 receives voltages from the "and" network 216, the left output terminal of the flip-flop 306 and the right output terminals of the flip-flops 310 and 390. Voltages are applied to input terminals of the "and" network 990 from the "and" network 225, the left output terminal of the flip-flop 606 and the right output terminal of the flip-flop 976.

The output signals from the "and" networks 984, 986, 988 and 990 pass through an "or" network 992 to an input terminal of an "and" network 994. Another input terminal of the "and" network 994 is connected to the left output terminal of the flip-flop 164, and the output terminal of the "and" network is connected to the right input terminal of the flip-flop 924. Signals from an "and" network 996 also pass through the "or" network 992 to the "and" network 994. Input terminals of the "and" network 996 receive voltages from the "and" network 208, "or" networks 998 and 1000 and the right output terminal of the flip-flop 606.

Voltages are applied to input terminals of the "or" network 998 from an "or" network 1002 and from the right output terminal of the flip-flop 456. The operation of the "or" network 1002 is controlled by the voltages from the cathode followers 464 and 705 and from the right output terminal of the flip-flop 604. Similarly, the "or" network 1000 receives at its input terminals voltages from an "or" network 1008 and from the left output terminal of the flip-flop 456. Signals pass to the "or" network 1008 from the cathode followers 437 and 713 and from the left output terminal of the flip-flop 604. The signals from the "or" networks 1002 and 1008 pass to input terminals of an "and" network 1010, other input terminals of which are connected to the "and" network 208 and to the left output terminal of the flip-flop 164. The output signals from the "and" network 1010 are in turn applied to the cathode follower 962.

The cathode follower 964 receives signals through an "or" network 1012 from "and" networks 1014 and 1016. Input terminals of the "and" network 1014 are connected to the cathode followers 437 and 713 and to the left output terminals of the flip-flops 164 and 604. Connections are made to input terminals of the "and" network 1016 from the cathode followers 464 and 705, the left output terminal of the flip-flop 164 and the right output terminal of the flip-flop 604.

Figure 19:
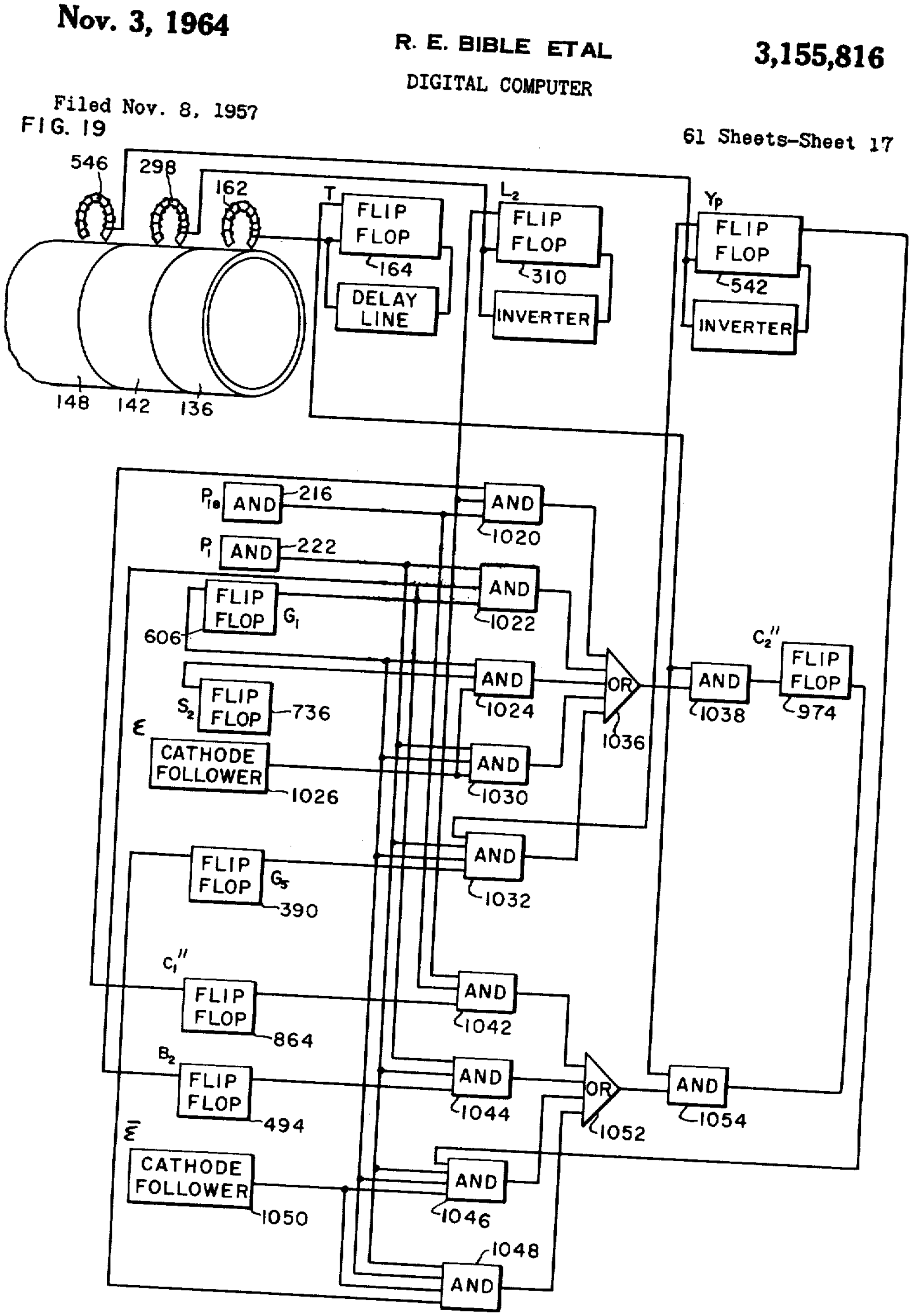

"And" networks 1020, 1022 and 1024 are shown in FIGURE 19. Signals are applied to the "and" network 1020 from the "and" network 216 and from the left output terminals of the flip-flops 310 and 864. The "and" network 1022 has voltages applied to it from the "and" network 222, the left output terminal of the flip-flop 494 and the right output terminal of the flip-flop 606. The "and" network 1024 receives voltages from a cathode follower 1026 and the left output terminals of the flip-flops 606 and 736.

The "and" networks 1020, 1022 and 1024 are associated with "and" networks 1030 and 1032. Connections are made to input terminals of the "and" network 1030 from the "and" network 222, the cathode follower 1026 and the left output terminal of the flip-flop 606. The operation of the "and" network 1032 is controlled by signals from the "and" network 222, the left output terminals of the flip-flops 542 and 606 and the right output terminal of the flip-flop 390.

The signals from the "and" networks 1020, 1022, 1024, 1030 and 1032 are applied through an "or" network 1036 to an input terminal of an "and" network 1038 having another input terminal connected to the left output terminal of the flip-flop 164. The output signals from the "and" network 1038 in turn pass to the left input terminal of the flip-flop 974 to trigger the flip-flop to its "true" state of operation.

"And" networks 1042, 1044, 1046 and 1048 are associated with one another to control the signals passing to the right input terminal of the flip-flop 974. Voltages are applied to the "and" network 1042 from the "and" network 216, the left output terminal of the flip-flop 310 and the right output terminal of the flip-flop 864. The "and" network 1044 receives signals from the "and" network 222 and the right output terminals of the flip-flops 494 and 606.

Signals are introduced to the "and" network 1046 from the "and" network 222, a cathode follower 1050, the left output terminal of the flip-flop 606 and the right output terminal of the flip-flop 542. Input terminals of the "and" network 1048 are connected to the "and" network 222, the cathode follower 1050 and the left output terminals of the flip-flops 390 and 606.

The signals from the "and" networks 1042, 1044, 1046 and 1048 pass through an "or" network 1052 to an input terminal of an "and" network 1054. Another input terminal of the "and" network 1054 is connected to the left output terminal of the flip-flop 164. The output terminal of the "and" network 1054 is connected to the right input terminal of the flip-flop 974.

Figure 20:
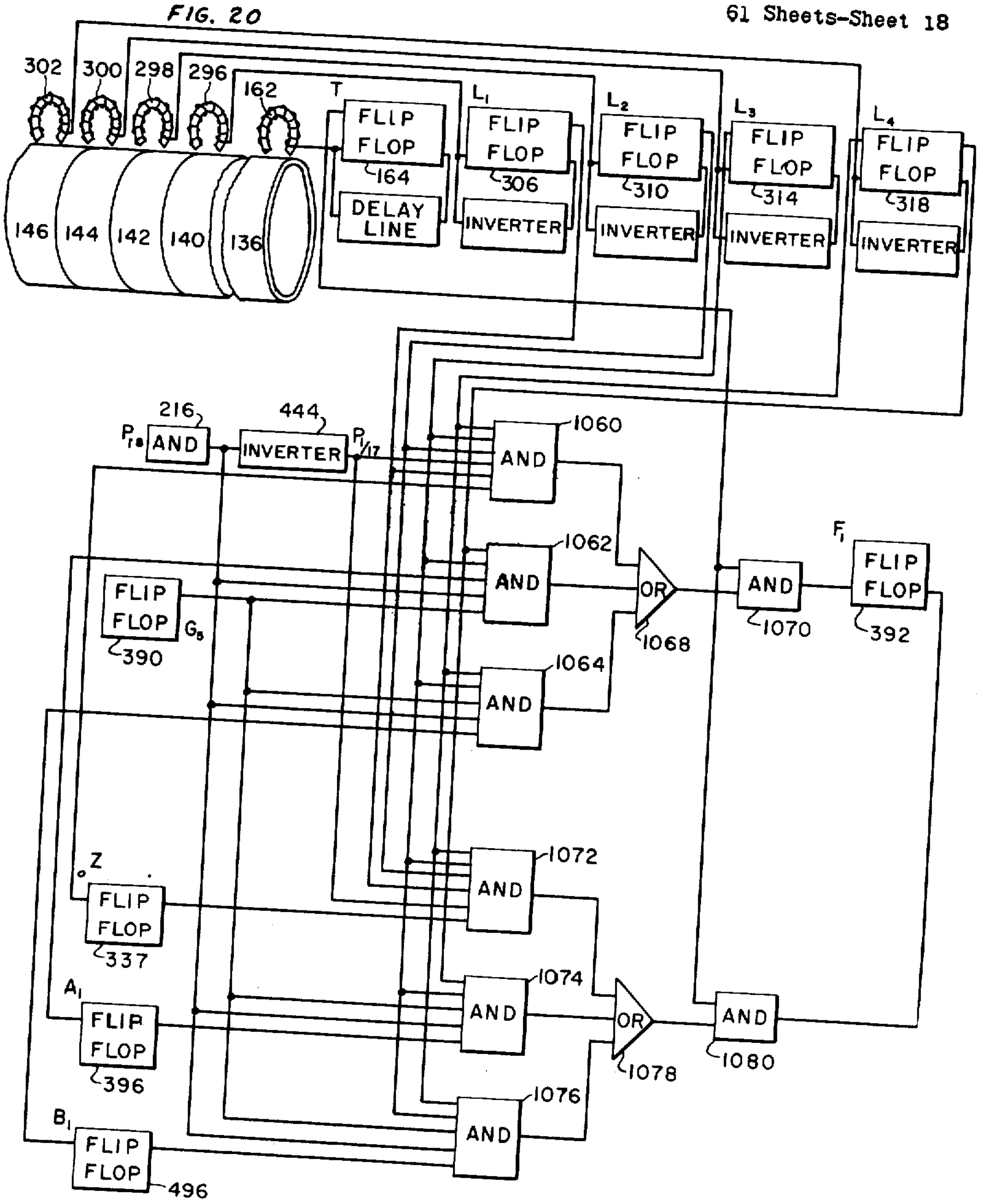

Stages are shown in FIGURE 20 for passing triggering signals to the input terminals of the flip-flop 392 also shown in FIGURE 9. The stages include "and" networks 1060, 1062 and 1064. The operation of the "and" network 1060 is controlled by signals from the inverter 444, the right output terminals in the flip-flops 306 and 310 and the left output terminals in the flip-flops 314 and 318, and in the flip-flop 337. The "and" network 1062 receives voltages from the "and" network 216, the left output terminals of the flip-flops 314 and 396 and the right output terminals of the flip-flops 318 and 390. The "and" network 1064 has signals applied to it from the "and" network 216, the left output terminals of the flip-flops 314, 318 and 496, and the right output terminal of the flip-flop 390.

The signals from the "and" networks 1060, 1062 and 1064 are introduced through an "or" network 1068 to an input terminal of an "and" network 1070, another input terminal of which is connected to the left output terminal of the flip-flop 164. The signals from the "and" network 1070 are in turn applied to the left input terminal of the flip-flop 392 to trigger the flip-flop.

"And" networks 1072, 1074 and 1076 perform functions similar to the "and" networks 1060, 1062 and 1064. The "and" network 1072 has input terminals connected to the inverter 444, the left output terminals of the flip-flops 314 and 318 and the right output terminals of the flip-flops 306, 310 and 337. Voltages are applied to input terminals of the "and" network 1074 from the "and" network 216, the left output terminal of the flip-flop 314 and the right output terminals of the flip-flops 318, 390 and 396. Input terminals of the "and" network 1076 are connected to the "and" network 216, the left output terminals of the flip-flops 314 and 318 and the right output terminals of the flip-flops 390 and 496.

The signals from the "and" networks 1072, 1074 and 1076 pass through an "or" network 1078 to an input terminal of an "and" network 1080 having another input terminal connected to the left output terminal of the flip-flop 164. The signals from the "and" network 1080 are applied to the right input terminal of the flip-flop 392 to trigger the flip-flop.

The stages shown in FIGURE 21 control the operation of the flip-flop 456 also shown in FIGURE 8. These stages include "and" networks 1084, 1086 and 1090. The "and" network 1084 receives voltages at its input terminals from an "and" network 1088, the left output terminal of the flip-flop 390 and the right output terminal of the flip-flop 292. It is believed that a person skilled in the art would be able from the specification and the drawings to construct the "and" network 1088 to produce a signal at position 12 for each block.

Voltages are applied to the input terminals of the "and" network 1086 from the "and" network 208, the cathode followers 437, 604 and 713, the left output terminals of the flip-flops 390, 604 and 924 and the right output terminal of the flip-flop 606. Connections are made to input terminals of the "and" network 1090 from the left output terminal of the flip-flop 314 and the right output terminals of the flip-flops 200, 210, 306, 310 and 318.

The signals from the "and" networks 1084, 1086 and 1090 pass through an "or" network 1092 to an input terminal of an "and" network 1094. Another input terminal of the "and" network 1094 is connected to the left output terminal of the flip-flop 164. The output terminal from the "and" network 1094 is connected to the left input terminal of the flip-flop 456.

The signals passing to the right input terminal of the flip-flop 456 are controlled in part by the operation of "and" networks 1096 and 1098. Signals pass to the "and" network 1096 from the "and" network 216 and the right output terminal of the flip-flop 390. The "and" network 1098 has voltages applied to it from the "and" network 208, the cathode followers 464 and 705, the left output terminals of the flip-flops 390 and 924 and the right output terminals of the flip-flops 604 and 606.

The signals from the "and" networks 1096 and 1098 pass through an "or" network 1100 to an input terminal of an "and" network 1102, another input terminal of which is connected to the left output terminal of the flip-flop 164. The signals from the "and" network 1102 are in turn introduced to the right input terminal of the flip-flop 456 to trigger the flip-flop into its "false" state of operation.

Signals from an "and" network 1104 are also introduced to the "or" network 1100. Input terminals of the "and" network 1104 are connected to the left output terminal of the flip-flop 542 and the right output terminals of the flip-flops 446 and 390. Other input terminals of the "and" network 1104 are connected to an "or" network 1106 and to the inverter 541 (also shown in FIGURE 10). The "or" network 1106 receives the output signals from "and" networks 1110 and 1112. The operation of the "and" network 1110 is controlled by the voltages on the left output terminal of the flip-flop 420 and the right output terminal of the flip-flop 494. Similarly, the "and" network 1112 operates in accordance with the voltages on the left output terminal of the flip-flop 494 and the right output terminal of the flip-flop 420.

Just as the operation of the flip-flop 456 is controlled by the stages shown in FIGURE 21, the operation of the flip-flop 458 (previously shown in FIGURE 8) is controlled by the stages represented in block form in FIGURE 22. These stages include a pair of "and" networks 1118 and 1120. The "and" network 1118 receives signals from an "and" network 1122 and the left output terminal of the flip-flop 390. It is believed that a person skilled in the art would be able to construct the "and" network 1122 from the specification and drawings so as to produce a signal at position 16 for each block.

Voltages are applied to the "and" network 1120 from the "and" network 216, the left output terminals of the flip-flops 390 and 924 and the right output terminals of the flip-flops 458 and 606. The signals from the "and" networks 1118 and 1120 pass through an "or" network 1124 to an input terminal of an "and" network 1126 having another input terminal connected to the left output terminal of the flip-flop 164. The signals from the "and" network 1126 are applied to the left input terminal of the flip-flop 458.

Signals from an "and" network 1130 also pass through the "or" network 1124 to the "and" network 1126. The "and" network 1130 has input terminals connected to an "or" network 1132, the inverter 541 also shown in FIGURES 10 and 21, the left output terminals of the flip-flops 456 and 542 and the right output terminal of the flip-flop 446. Voltages are applied to the "or" network 1132 from "and" networks 1134 and 1136. Input terminals of the "and" network 1134 are connected to the left output terminals of the flip-flops 420 and 450. Similarly, input terminals of the "and" network 136 are connected to the right output terminals of the flip-flops 420 and 450.

An "and" network 1138 controls in part the signals passing to the right input terminal of the flip-flop 458. The "and" network 1138 receives at its input terminals signals from the "and" network 216 and the right output terminal of the flip-flop 390. The signals from the "and" network 1138 pass tbhrough an "or" network 1140 to an input terminal of an "and" network 1142. The output signals from the "and" network 1142 are introduced to the right input terminal of the flip-flop 458.

Signals from an "and" network 1143 also pass through the "or" network 1140 to the "and" network 1142. The "and" network 1143 receives voltages at its input terminals from the "and" network 208, the cathode follower 964, the left output terminal of the flip-flop 924 and the right output terminal of the flip-flop 606. Signals are also introduced to the "and" network 1143 from an "or" network 1144 having input terminals connected to "and" networks 1146 and 1148. Connections are made to input terminals of the "and" network 1146 from the right output terminals of the flip-flops 456 and 646. The "and" network 1148 has input terminals connected to the left output terminals of the flip-flops 456 and 646.

Signals from an "and" network 1150 as well as from the "and" networks 1138 and 1143 pass through the "or" network 1140. One input terminal of the "and" network 1150 is connected to an "or" network 1152. The "or" network 1152 receives voltages at its input terminals from the cathode follower 962, the left output terminals of the flip-flops 170 and 606 and the right output terminals of the flip-flops 210 and 924.

Another input terminal of the "and" network 1150 is connected to an "or" network 1154, the operation of which is controlled by "and" networks 1156 and 1158. The "and" network 1156 has input terminals connected to the left output terminal of the flip-flop 456 and the right output terminal of the flip-flop 646. Similarly, input terminals of the "and" network 1158 are connected to the left output terminal of the flip-flop 646 and the right output terminal of the flip-flop 456.

In FIGURE 23, stages are shown for controlling the triggering signals passing to the flip-flop 604 also shown in FIGURE 14. Two of these stages are "and" networks 1162 and 1164. Input terminals of the "and" network 1162 are connected to the cathode follower 708 and a cathode follower 1166 and to the left output terminals of the flip-flop 606 and a flip-flop 1168. The "and" network 1164 receives at its input terminals the voltages from the cathode follower 708 and a cathode follower 1170, the left output terminal of the flip-flop 606 and the right output terminal of the flip-flop 1168. The signals from the "and" networks 1162 and 1164 pass through an "or" network 1172 to an input terminal of an "and" network 1174, another input terminal of the "and" network 1174 being connected to the left output terminal of the flip-flop 164. The signals from the "and" network 1174 are introduced to the left input terminal of the flip-flop 604.

The "or" network 1172 also receives the output signals from "and" networks 1178, 1180 and 1182. The "and" network 1178 has input terminals connected to the cathode followers 437 and 705, the left output terminal of the flip-flop 736 and the right output terminal of the flip-flop 606. Connections are made to input terminals of the "and" network 1180 from the "and" network 222 and the right output terminals of the flip-flops 606 and 736. Voltages are applied to the "and" network 1182 from the "and" network 208, the left output terminal of the flip-flop 606 and the right output terminals of the flip-flops 736 and 976.

The "and" network 876 (previously shown in FIGURE 16) and "and" networks 1186 and 1188 are associated with one another to pass signals to the right input terminal of the flip-flop 604 under particular sets of circumstances. The "and" network 1186 passes a signal upon the simultaneous occurrence of high voltages from the cathode followers 710 and 1166, from the left output terminals of the flip-flops 606 and 736 and the right output terminal of the flip-flop 1168. Similarly, the "and" network 1188 passes a signal when high voltages simultaneously are introduced to it from the cathode followers 710 and 1170 and the left output terminals of the flip-flops 606, 736 and 1168.

"And" networks 1190 and 1192 are associated with the "and" networks 876, 1186 and 1188. Input terminals of the "and" network 1190 are connected to the cathode followers 464 and 713, the left output terminal of the flip-flop 736 and the right output terminal of the flip-flop 606. Connections are made to input terminals of the "and" network 1192 from the "and" network 208, the left output terminals of the flip-flops 606 and 976 and the right output terminal of the flip-flop 736.

The signals from the "and" networks 1190 and 1192 and from the "and" networks 876, 1186 and 1188 pass through an "or" network 1194 to an input terminal of an "and" network 1196. Another input terminal of the "and" network 1196 is connected to the left output terminal of the flip-flop 164. The output terminal of the "and" network 1196 is connected to the right input terminal of the flip-flop 604.

The signals on the left output terminal of the flip-flop 604 are introduced to input terminals of "and" networks 1200 and 1202. Connections are made to other input terminals of the "and" network 1200 from the cathode follower 710 and the right output terminal of the flip-flop 1168. Similarly, other input terminals of the "and" network 1202 receive signals from the cathode follower 708 and the left output terminal of the flip-flop 1168.

"And" networks 1204 and 1206 are associated with the "and" networks 1200 and 1202. The "and" network 1204 receives at its input terminals signals from the cathode follower 710, the left output terminal of the flip-flop 1168 and the right output terminal of the flip-flop 604. Similarly, the "and" network 1206 has voltages applied to it from the cathode follower 708 and the right output terminals of the flip-flops 604 and 1168.

The signals from the "and" networks 1200, 1202, 1204 and 1206 are introduced to an "or" network 1208. The "or" network 1208 in turn passes these signals to an input terminal of an "and" network 1210, another input terminal of the "and" network being connected to the left output terminal of the flip-flop 164. The cathode follower 1026 previously shown in FIGURE 19 receives the output signals from the "and" network 1210.

"And" networks 1216, 1218, 1220 and 1222 correspond to the "and" networks 1200, 1202, 1204 and 1206. The "and" network 1216 has input terminals connected to the cathode follower 710 and the left output terminals of the flip-flops 604 and 1168. Similarly, input terminals of the "and" network 1218 are connected to the cathode follower 708, the left output terminal of the flip-flop 604 and the right output terminal of the flip-flop 1168.

Voltages are applied to the "and" network 1220 from the cathode follower 708, the left output terminal of the flip-flop 1168 and the right output terminal of the flip-flop 604. The "and" network 1222 passes a signal upon the simultaneous occurrence of the proper voltages from the cathode follower 710 and the right output terminals of the flip-flops 604 and 1168.

The signals from the "and" networks 1216, 1218, 1220 and 1222 pass through an "or" network 1224 to an input terminal of an "and" network 1226, another input terminal of which is connected to the left output terminal of the flip-flop 164. The signals from the "and" network 1226 are applied to the cathode follower 1050 also shown in FIGURE 19.

An "and" network 1232 and an inverter 1234 are shown in FIGURE 24. The "and" network 1232 receives voltages from the right output terminals of the flip-flops 190 200, and 210 and introduces its output signals to the inverter 1234. The output signals from the "and" network 1232 are also introduced to an input terminal of an "and" network 1236 having other input terminals connected to the left output terminals of the flip-flop 244 and a flip-flop 1238.

Similarly, the output from the inverter 1234 passes to an input terminal of an "and" network 1240, other input terminals of the "and" network 1240 being connected to the cathode follower 1050 and the left output terminals of the flip-flops 244, 736 and 976. The signals from the "and" networks 1236 and 1240 pass through an "or" network 1242 to an input terminal of an "and" network 1244 having another input terminal connected to the left output terminal of the flip-flop 164. The output signals from the "and" network 1244 are introduced to the left input terminal of a flip-flop 1246 to trigger the flip-flop.

"And" networks 1247 and 1248 correspond to the "and" networks 1236 and 1240. The "and" network 1247 has input terminals connected to the "and" network 1232, the left output terminal of the flip-flop 244 and the right output terminal of the flip-flop 1238. The "and" network 1248 receives voltages at its input terminals from the inverter 1234, the cathode follower 1026, the left output terminals of the flip-flops 244 and 736 and the right output terminal of the flip-flop 976. The output signals from the "and" networks 1247 and 1248 are introduced through an "or" network 1250 to an input terminal of an "and" network 1252. Another input terminal of the "and" network 1252 is connected to the left output terminal of the flip-flop 164. The signals from the "and" network 1252 pass to the right input terminal of flip-flop 1246 to trigger the flip-flop.

The "and" network 1240 is associated with an "and" network 1256 to control the operation of the flip-flop 1238. Connections are made to input terminals of the "and" network 1256 from the "and" network 1232 and the left output terminals of the flip-flops 244 and 976. An "or" network 1262 receives the output signals from the "and" networks 1240 and 1256 and passes these signals to an input terminal of an "and" network 1264 having another input terminal connected to the left output terminal of the flip-flop 164. The output from the "and" network 1264 is introduced to the left input terminal of the flip-flop 1238.

An "and" network 1266 performs functions similar to the "and" network 1256. The "and" network 1266 becomes operative upon the simultaneous introduction of high voltages from the "and" network 1232, the left output terminal of the flip-flop 244 and the right output terminal of the flip-flop 976. The signals from the "and" network 1266 and the "and" network 1248 are applied through an "or" network 1270 to an input terminal of an "and" network 1272, another input terminal of which is connected to the left output terminal of the flip-flop 164. The output signals from the "and" network 1272 in turn pass to the right input terminal of the flip-flop 1238 to trigger the flip-flop.

The operation of "and" networks 1274 and 1276 determines when signals pass from an "and" network 1278 to the left input terminal of the flip-flop 976. Input terminals of the "and" network 1274 are connected to the inverter 541 (also shown in FIGURE 10), the cathode follower 1026 and the left output terminals of the flip-flops 244 and 736. The "and" network 1276 becomes activated upon the simultaneous introduction of signals from the "and" network 222 and the left output terminals of the flip-flops 244 and 684. Signals from the "and" networks 1274 and 1276 pass through an "or" network 1280 to an input terminal of the "and" network 1278. Another input terminal of the "and" network 1278 is connected to the left output terminal of the flip-flop 164.

"And" networks 1284 and 1286 operate to control the signals passing from an "and" network 1288 to the right input terminal of the flip-flop 976. The "and" network 1284 receives at its input terminals signals from the inverter 541, the cathode follower 1050 and the left output terminals of the flip-flops 244 and 736. Voltages are applied to input terminals of the "and" network 1286 from the "and" network 222, the left output terminal of the flip-flop 244 and the right output terminal of the flip-flop 684. The output signals from the "and" networks 1284 and 1286 pass through an "or" network 1290 to an input terminal of the "and" network 1288, another input terminal of which is connected to the left output terminal of the flip-flop 164.

Figure 25:
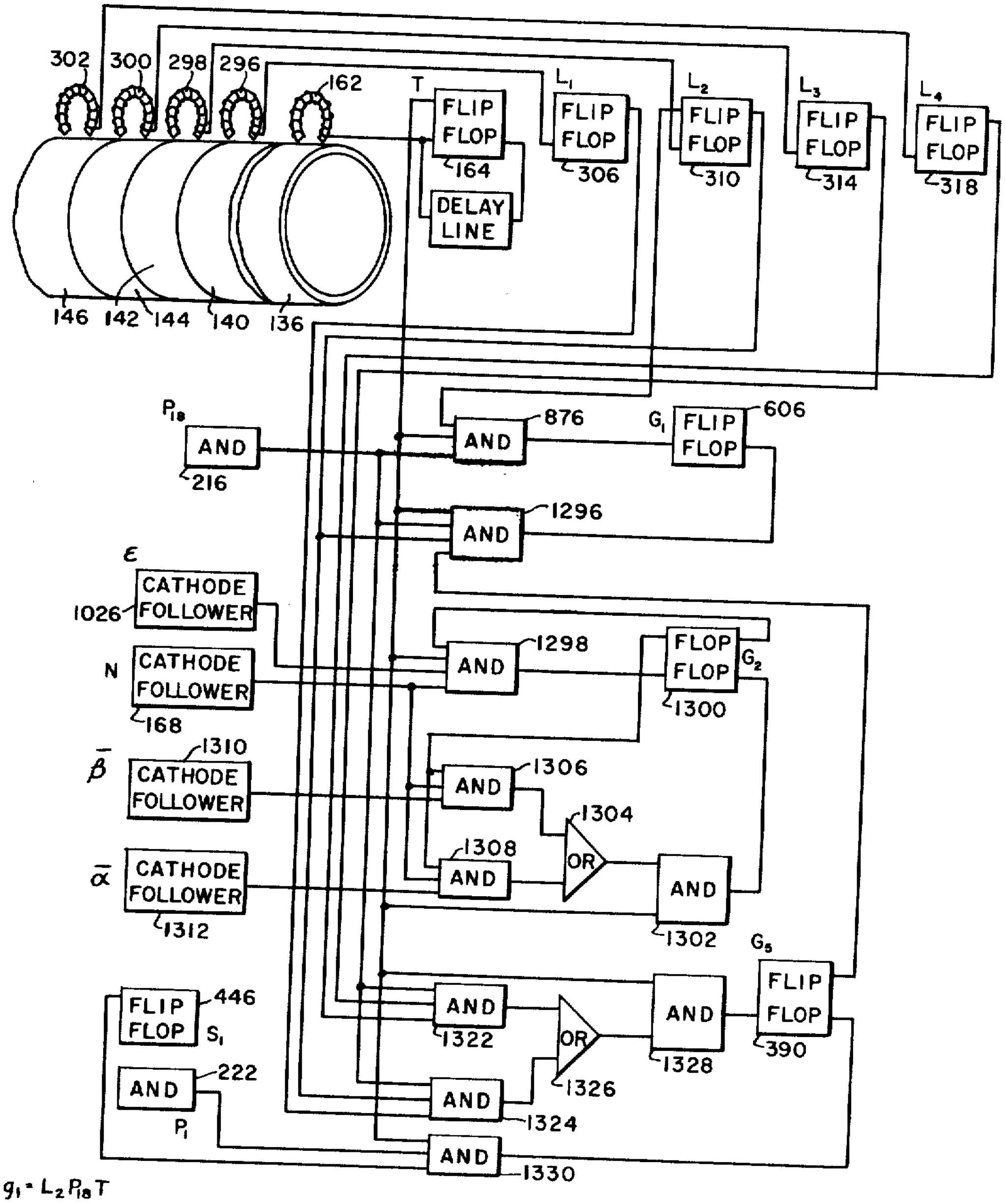

The "and" network 876 and an "and" network 1296 are shown in FIGURE 25 for controlling the operation of the flip-flop 606. The connections to the "and" network 876 have been previously described. Connections are made to input terminals of the "and" network 1296 from the "and" network 216, the left output terminal of the flip-flop 164 and the right output terminals of the flip-flops 310 and 390. The signals from the "and" networks 876 and 1296 respectively pass to the left and right input terminals of the flip-flop 606.

Signals from an "and" network 1298 are introduced to the left input terminal of a flip-flop 1300 to trigger the flip-flop. The "and" network 1298 passes a signal when relatively high voltages are simultaneously introduced to it from the cathode followers 168 and 1026, the left output terminal of the flip-flop 164 and the right output terminal of the flip-flop 1300. Signals pass to the right input terminal of the flip-flop 1300 from an "and" network 1302, input terminals of which are connected to an "or" network 1304 and to the left output terminal of the flip-flop 164. The "or" network 1304 in turn receives signals from "and" networks 1306 and 1308. The "and" network 1306 becomes activated upon the simultaneous introduction of signals from the cathode follower 168 and a cathode follower 1310 and from the left output terminal of the flip-flop 1300. The operation of the "and" network 1308 is controlled by signals from the cathode follower 168 and a cathode follower 1312 and from the left output terminal of the flip-flop 1300.

"And" networks 1322 and 1324 are associated with each other. Voltages are applied to input terminals of the "and" network 1322 from the "and" network 216 and the right output terminals of the flip-flops 314 and 318. The "and" network 1324 receives at its input terminals signals from the "and" network 216 and the right output terminals of the flip-flops 306 and 310. The signals from the "and" networks 1322 and 1324 are introduced through an "or" network 1326 to an input terminal of an "and" network 1328, another input terminal of which is connected to the left output terminal of the flip-flop 164. The signals from the "and" network 1328 pass to the left input terminal of the flip-flop 390 to trigger the flip-flop. The right input terminal of the flip-flop 390 has triggering signals applied to it from an "and" network 1330. Input terminals of the "and" network 1330 are connected to the "and" network 222 and the left output terminals of the flip-flops 164 and 446.

The left output terminal of a flip-flop 1332 is connected to a coil 1333 disposed in contiguous relationship to the channel 150 to record signals in the channel. The operation of the flip-flop 1332 is controlled by the stages shown in FIGURE 26. These stages include "and" networks 1334, 1336 and 1338. Voltages are applied to the "and" network 1334 from the cathode follower 580 and a cathode follower 1340, the left output terminal of the flip-flop 446 and the right output terminal of a flip-flop 1342. The "and" network 1336 receives voltages at its input terminals from the cathode follower 1340, the inverter 541, the left output terminal of the flip-flop 420 and the right output terminal of the flip-flop 446. The "and" network 1338 becomes operative when relatively high voltages are simultaneously introduced to it from the "and" networks 216, the cathode follower 1340, the left output terminal of the flip-flop 450 and the right output terminal of the flip-flop 446. The signals from the "and" networks 1334, 1336 and 1338 pass through an "or" network 1346 to an input terminal of an "and" network 1348, another input terminal of which is connected to the left output terminal of the flip-flop 164. The output signals from the "and" network 1348 are introduced to the left input terminal of the flip-flip 1332.

"And" networks 1352, 1354 and 1356 are associated with the "and" networks 1334, 1336 and 1338 in passing signals through the "or" network 1346 to the "and" network 1348. The "and" network 1352 has input terminals connected to the cathode follower 1312 and the left output terminals of the flip-flops 446 and 542. The operation of the "and" network 1354 is controlled by signals from the cathode follower 1312, and the left output terminal of a flip-flop 1358 and the right output terminal of the flip-flop 446. Connections are made to input terminals of the "and" network 1356 from the left output terminals of the flip-flops 446, 542 and 1342.

"And" networks 1360, 1362 and 1364 perform functions similar to the "and" networks 1334, 1336 and 1338. The "and" network 1360 has voltages applied to it from the cathode followers 594 and 1340, the left output terminal of the flip-flop 446 and the right output terminal of the flip-flop 1342. The "and" network 1362 receives at its input terminals signals from the inverter 541, the cathode follower 1340 and the right output terminals of the flip-flops 420 and 446. The "and" networks 1364 becomes operative upon the simultaneous introduction of high voltages from the "and" network 216, the cathode follower 1340 and the right output terminals of the flip-flops 446 and 450. The signals from the "and" networks 1360, 1362 and 1364 pass through an "or" network 1366 to an input terminal of an "and" network 1368 having another input terminal connected to the left output terminal of the flip-flop 164. The output from the "and" network 1368 is applied to the right input terminal of the flip-flop 1332 to trigger the flip-flop.

"And" networks 1370, 1372 and 1374 also pass signals through the "or" network 1366 to the "and" network 1368. The "and" network 1370 has input terminals connected to the cathode follower 1312, the left output terminal of the flip-flop 446 and the right output terminal of the flip-flop 542. Voltages are applied to input terminals of the "and" network 1372 from the cathode follower 1312 and from the right output terminals of the flip-flops 446 and 1358. The "and" network 1374 is operatively controlled by signals from the left output terminals of the flip-flops 446 and 1342 and the right output terminal of the flip-flop 542.

Figure 27:
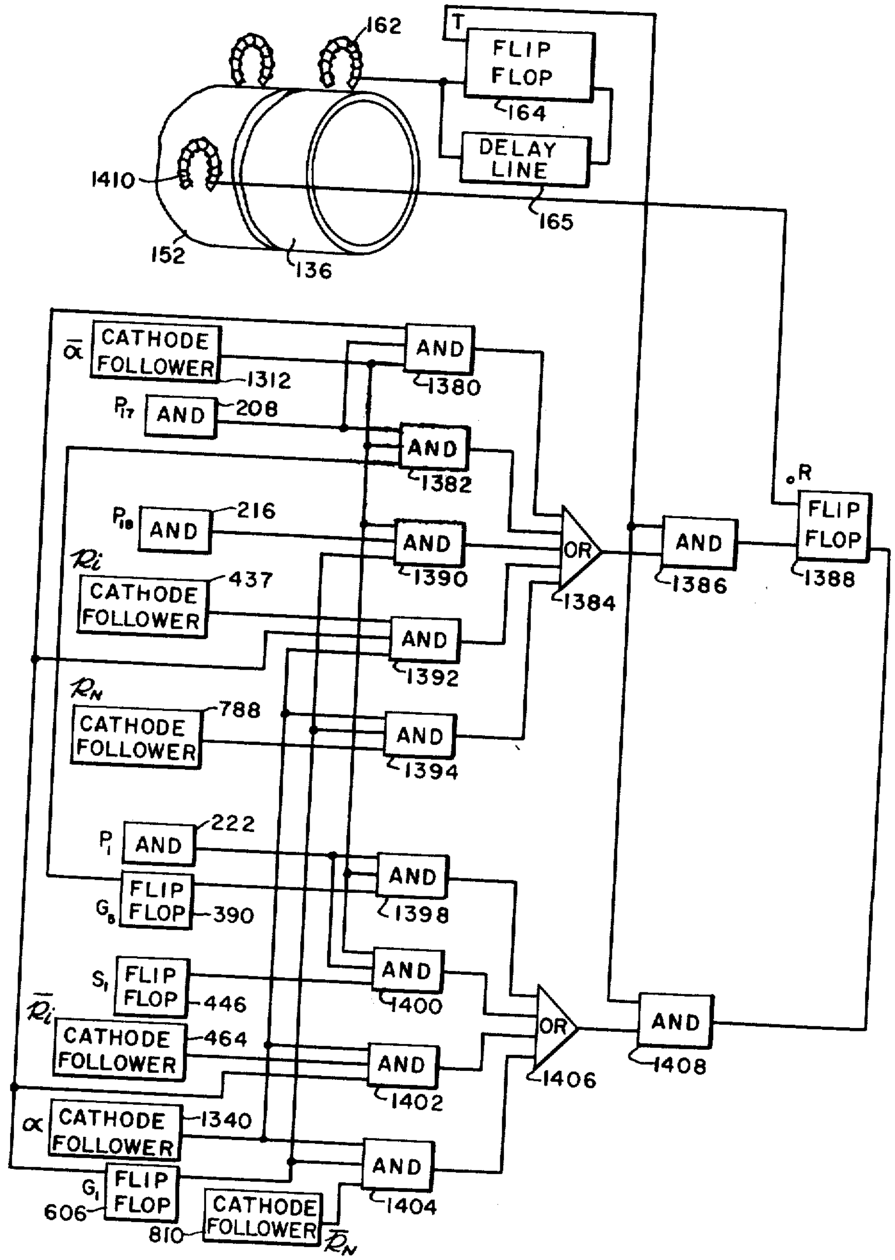

"And" networks 1380 and 1382 are shown in FIGURE 27. The "and" network 1380 becomes activated upon the simultaneous introduction of high voltages from the "and" network 208, the cathode follower 1312 and the left output terminal of the flip-flop 606. The "and" network 1382 passes a signal when it simultaneously receives high voltages from the "and" network 208, the cathode follower 1312 and the left output terminal of the flip-flop 390. The signals from the "and" networks 1380 and 1382 are introduced through an "or" network 1384 to an input terminal of an "and" network 1386, another input terminal of which is connected to the left output terminal of the flip-flop 164. The output signals from the "and" network 1386 are in turn applied to the left input terminal of the flip-flop 1388 to trigger the flip-flop. The flip-flop 1388 has been previously shown in FIGURE 8.

"And" networks 1390, 1392 and 1394 are associated with the "and" networks 1380 and 1382 in applying signals to the "or" network 1384. The "and" network 1390 receives signals from the "and" network 216, the cathode follower 1312 and the right output terminal of the flip-flop 606. The "and" network 1392 has input terminals connected to the cathode followers 437 and 1340 and the left output terminal of the flip-flop 606. Connections are made to input terminals of the "and" network 1394 from the cathode followers 788 and 1340 and the right output terminal of the flip-flop 606.

"And" networks 1398, 1400, 1402 and 1404 control the triggering signals passing to the right input terminal of the flip-flop 1388. The "and" network 1398 has voltages applied to it from the "and" network 222, the cathode follower 1312 and the right output terminal of the flip-flop 390. The "and" network 1400 receives at its input terminals signals from the "and" network 222, the cathode follower 1312 and the right output terminal of the flip-flop 446. Input terminals of the "and" network 1402 are connected to the cathode followers 464 and 1340 and the left output terminal of the flip-flop 606. The "and" network 1404 becomes activated upon the simultaneous introduction of high voltages from the cathode followers 810 and 1340 and the right output terminal of the flip-flop 606.

The output signals from the "and" networks 1398, 1400, 1402 and 1404 pass through an "or" network 1406 to an input terminal of an "and" network 1408 having another input terminal connected to the left output terminal of the flip-flop 164. The signals from the "and" network 1408 are in turn applied to the right input terminal of the flip-flop 1388. The signals from the left output terminal of the flip-flop 1388 are introduced to a coil 1410 disposed in contiguous relationship to the track 152 on the drum 130.

As will be described in detail hereinafter, the flip-flops 1332 and 1388 in FIGURES 26 and 27 respectively operate to record information in the tracks 150 and 152. Similarly, signals pass from the left output terminal of a flip-flop 1414 (FIGURE 28) to a coil 1416 disposed in contiguous relationship to the track 156 to record information in the track. The voltages on the left output terminal of the flip-flop 1414 are controlled in part by signals passing to the left input terminal of the flip-flop from an "and" network 1418. Input terminals of the "and" network 1418 are connected to an "or" network 1420 and to the left output terminal of the flip-flop 164.

The "or" network 1420 receives signals from an "and" network 1422 having input terminals connected to the cathode follower 1312 and to the left output terminal of the flip-flop 684. The "or" network 1420 also has signals applied to it from an "and" network 1424, input terminals of which are connected to the cathode follower 1340 and an "or" network 1426. Signals pass through the "or" network 1426 from the cathode follower 708 and "and" networks 1430 and 1432. Connections are made to input terminals of the "and" network 1430 from the "and" network 222, the left output terminal of the flip-flop 606 and the right output terminals of the flip-flops 688 and 736. The "and" network 1432 becomes activated when high voltages are simultaneously introduced to its input terminals from the "and" network 216, the left output terminals of the flip-flops 606 and 974 and the right output terminal of the flip-flop 736.

"And" networks 1434, 1436, 1438 and 1440 are associated with one another. The "and" network 1434 receives signals from the cathode follower 710 and the left output terminal of the flip-flop 736. The "and" network 1436 has voltages applied to it from the "and" network 222, the left output terminal of the flip-flop 688 and the right output terminal of the flip-flop 736. Connections are made to input terminals of the flip-flop 1438 from the "and" network 216 and the right output terminals of the flip-flops 736 and 974. The "and" network 1440 becomes activated upon the simultaneous occurrence of high voltages on the right output terminals of the flip-flops 606 and 736.

The signals from the "and" networks 1434, 1436, 1438 and 1440 pass through an "or" network 1442 to an input terminal of an "and" network 1444, another input terminal of which is connected to the cathode follower 1340.

The output from the "and" network 1444 is in turn applied through an "or" network 1446 to an input terminal of an "and" network 1448 having another input terminal connected to the left output terminal of the flip-flop 164. Signals from an "and" network 1450 also pass through the "or" network 1446 to the "and" network 1448, input terminals of the "and" network 1450 being connected to the cathode follower 1312 and to the right output terminal of the flip-flop 684. The output signals from the "and" network 1448 pass to the right input terminal of the flip-flop 1414.

Figure 29:
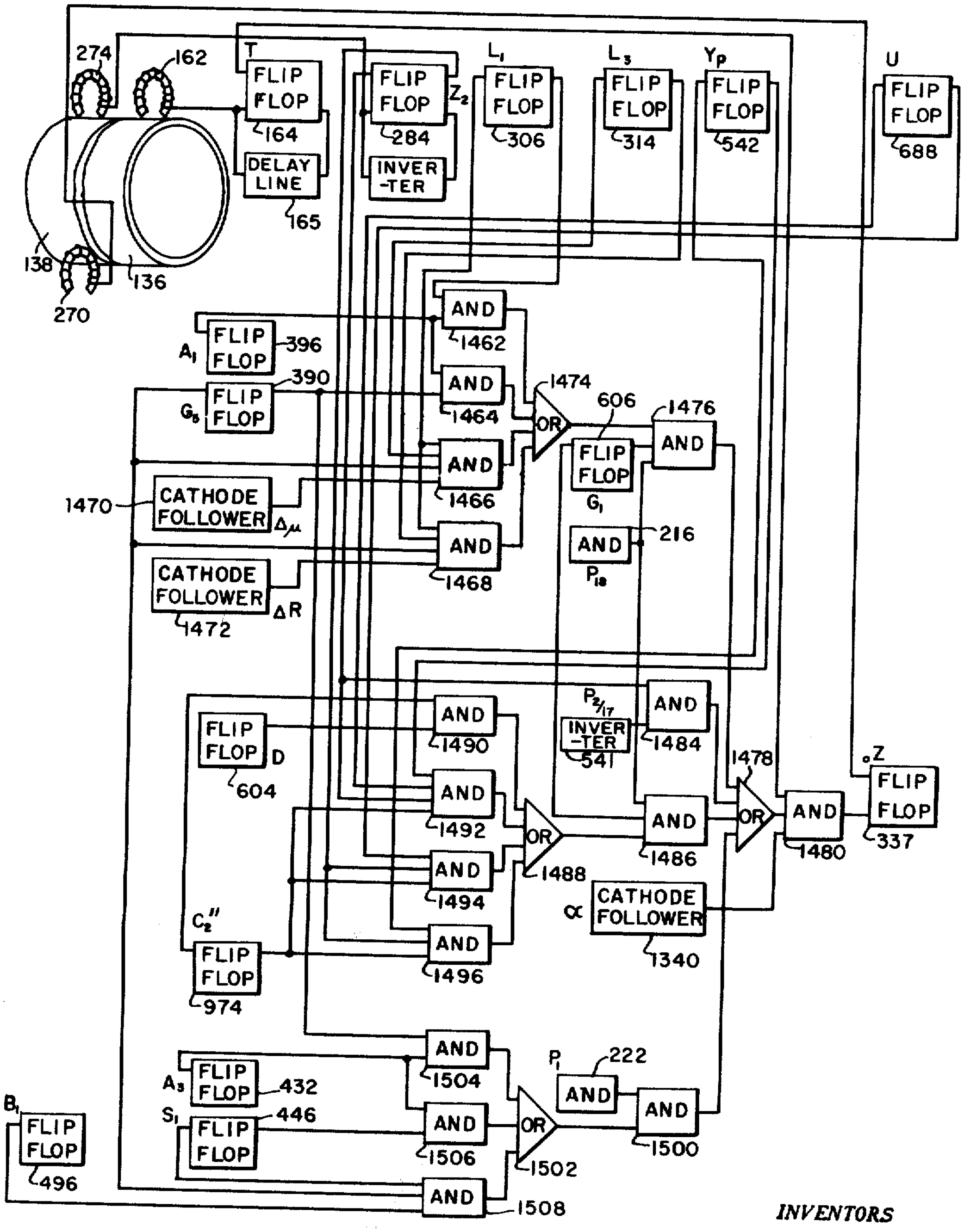

FIGURES 29 and 30 show stages for controlling the operations of the flip-flops 337, the output signals from which are introduced to the coil 270 to produce a pattern of signals in the channel 138. The stages include "and" networks 1462, 1464, 1466 and 1468. The "and" network 1462 has signals applied to it from the left output terminal of the flip-flop 396 and the right output terminal of the flip-flop 306. Signals are introduced to the "and" network 1464 from the left output terminal of the flip-flop 396 and the right output terminal of the flip-flop 390. Input terminals of the "and" network 1466 are connected to a cathode follower 1470 and to the left output terminals of the flip-flops 306, 314 and 390. The "and" network 1468 becomes activated upon the simultaneous introduction of high voltages from a cathode follower 1472, the left output terminals of the flip-flops 306 and 390 and the right output terminal of the flip-flop 314.

The signals from the "and" networks 1462, 1464, 1466 and 1468 pass through an "or" network 1474 to an input terminal of an "and" network 1476 having other input terminals connected to the "and" network 216 and the right output terminal of the flip-flop 606. The output signals from the "and" network 1476 are applied through an "or" network 1478 to an input terminal of "and" network 1480. Other input terminals of the "and" network 1480 are connected to the cathode follower 1340 and to the left output terminal of the flip-flop 164. The output signals from the "and" network 1480 pass to the left input terminal of the flip-flop 337 to trigger the flip-flops.

Signals are also introduced to the "or" network 1478 from "and" networks 1484 and 1486. Connections are made to input terminals of the "and" network 1484 from the inverter 541 and the left output terminal of the flip-flop 284 adapted to receive information through the coil 274 from the channel 138. The "and" network 1486 has voltages applied to it from the "and" network 216, and "or" network 1488 and the left output terminal of the flip-flop 606. The "or" network 1488 in turn receives signals passing through "and" networks 1490, 1492, 1494 and 1496.

The "and" network 1490 has input terminals connected to the left output terminal of the flip-flop 974 and the right output terminal of the flip-flop 604. The "and" network 1492 receives at its input terminals signals from the left output terminal of the flip-flops 284 and 688 and the right output terminals of the flip-flops 542 and 974. The "and" network 1494 passes a signal when relatively high voltages are simultaneously introduced to it from the right output terminals of the flip-flops 284, 688 and 974. Input terminals of the "and" network 1496 are connected to the left output terminal of the flip-flop 542 and to the right output terminals of the flip-flops 284 and 974.

In addition to receiving the output signals from the "and" networks 1476, 1484 and 1486, the "or" network 1478 also has voltages applied to it from an "and" network 1500. Input terminals of the "and" network 1500 are connected to the "and" network 222 and to an "or" network 1502 which is adapted to receive signals from "and" networks 1504, 1506 and 1508. Connections are made to input terminals of the "and" network 1504 from the left output terminal of the flip-flop 432 and the right output terminal of the flip-flop 390. The "and" network 1506 is adapted to become activated upon the simultaneous introduction of high voltages from the left output terminal of the flip-flop 432 and the right output terminal of the flip-flop 446. The "and" network 1508 passes a signal when relatively high voltages are simultaneously introduced to it from the left output terminals of the flip-flops 390, 446 and 496.

Just as the stages shown in FIGURE 29 control the passage of triggering signals to the left input terminal in the flip-flop 337, the stages shown in FIGURE 30 control the passage of triggering signals to the right input terminal of the flip-flop. These stages include "and" networks 1510, 1512, 1514 and 1516. Voltages are applied to input terminals of the "and" network 1510 from the right output terminals of the flip-flops 306 and 396. Similarly, the "and" network 1512 has voltages introduced to it from the right output terminals of the flip-flops 390 and 396. The "and" network 1514 receives at its input terminals signals from a cathode follower 1518 and the left output terminals of the flip-flops 306, 314 and 390. Input terminals of the "and" network 1516 are connected to a cathode follower 1520, the left output terminals of the flip-flops 306 and 390 and the right output terminal of the flip-flop 314.

The signals from the "and" networks 1510, 1512, 1514 and 1516 pass through an "or" network 1518 to an input terminal of an "and" network 1520, other input terminals of which are connected to the "and" network 216 and the right output terminal of the flip-flop 606. The output signals from the "and" network 1520 are introduced through an "or" network 1522 to an input terminal of an "and" network 1524 having another input terminal connected to the left output terminal of the flip-flop 164. The right input terminal of the flip-flop 337 receives the output signals from the "and" network 1424.

Signals are also applied to the "or" network 1522 from the cathode follower 1312 and from "and" networks 1528 and 1530. Input terminals of the "and" network 1528 connected to the inverter 541 and to the right output terminal of the flip-flop 284. The "and" network 1530 is adapted to receive voltages from the "and" network 216, an "or" network 1532 and the left output terminal of the flip-flop 606. Connections are made to the "or" network 1532 from "and" networks 1534, 1536, 1538 and 1540.

The "and" network 1534 is adapted to become activated upon the simultaneous introduction of high voltages from the left output terminals of the flip-flops 604 and 974. Input terminals of the "and" network 1536 are connected to the left output terminal of the flip-flop 688 and the right output terminals of the flip-flops 284, 542 and 974. Input terminals of the "and" network 1538 have common connections with the left output terminal of the flip-flop 284 and the right output terminals of the flip-flops 688 and 974. The "and" network 1540 has voltages applied to its input terminals from the left output terminal of the flip-flops 284 and 542 and the right output terminal of the flip-flop 974.

Signals pass to the "or" network 1522 from an "and" network 1542 as well as from the cathode follower 1312 and the "and" networks 1520, 1528 and 1530. The operation of the "and" network 1542 is controlled by signals from the "and" network 222 and from an "or" network 1544. The "or" network 1544 in turn receives the output signals from "and" networks 1546, 1548 and 1550. Connections are made to input terminals of the "and" network 1546 from the right output terminals of the flip-flops 390 and 432. Similarly, the "and" network 1548 has input terminals connected to the right output terminals of the flip-flops 432 and 446. The "and" network 1450 is adapted to become activated upon the simultaneous introduction of high voltages from the left output terminals of the flip-flops 390 and 446 and the right output terminal of the flip-flop 496.

*Clock Channel and System of Reading and Recording Signals on the Drum*

As previously described, a permanent pattern of signals is recorded in the track 136 on the drum 130. This permanent recordation may be made by cutting notches at spaced intervals on the periphery of the track. By cutting such notches alternating signals are induced in the coil 162 as the notches move past the coil. Each alternating signal is introduced to the left input terminal in the flip-flop 164. The negative portion of each alternating signal is instrumental in triggering the flip-flop. When the flip-flop is triggered by a signal introduced to the left input terminal of the flip-flop, a relatively high voltage is produced on the left output terminal of the flip-flop 164, and a relatively low voltage is produced on the right output terminal of the flip-flop. These voltages are produced in a manner similar to that described above in connection with the flip-flop shown in FIGURE 1.

The alternating signals induced in the coil 162 are also introduced to the delay line 165. The delay line 165 operates to delay the alternating signals by a particular amount of time such as a period equivalent to one half cycle of alternating voltage. Because of this delay, the negative portion of each alternating signal is introduced to the right input terminal of the flip-flop 164 approximately one half of an alternating cycle after it is introduced to the left input terminal of the flip-flop. The negative triggering signal triggers the flip-flop 164 such that a relatively high voltage is produced on the right output terminal of the flip-flop and a relatively low voltage is produced on the left output terminal of the flip-flop. In this way, the flip-flop 164 is triggered into its two alternate states of operation during the occurrence of each alternating signal.

The digital differential analyzer constituting this invention is adapted to be used with different types of systems for reading and recording magnetic information on the drum 130. For example, the reading and recording may be accomplished by the systems commonly known as the "return-to-zero" system and the NRZ systems. However, the digital differential analyzer is especially adapted to be used with the Ferranti system of reading and recording.

The Ferranti system of reading and recording may be seen from a particular example such as that shown in FIGURE 31. The operation of a flip-flop is seen in FIGURE 31A; the clock signals produced by the flip-flop 164 are shown in FIGURE 31B; and the pattern of magnetic information recorded in an information channel is illustrated in FIGURE 31C. As may be seen, the waveform of the information recorded in a channel of the drum 130 is dependent upon the pattern of "1's" and "0's" recorded in the channel as a result of the operation of an associated flip-flop. For example, when an indication of "1" is to be recorded in the channel, the waveform rises from an amplitude of zero to a positive amplitude at a particular time in a clock cycle. Similarly, the waveform falls from a positive amplitude to an amplitude of zero at a particular time in a clock cycle when an indication of "0" is to be recorded in the channel of the drum 130. The particular time at which the waveform rises or falls is at the midpoint of each clock cycle.

In the Ferranti system, when an indication of "1" is to be followed by an indication of "0" or vice versa, the waveform continues at the same amplitude from the midpoint in one clock cycle to the midpoint in the next clock cycle. When an indication of "1" continues in two successive cycles, the waveform falls at the end of the first clock cycle so as to be ready to rise in the midpoint of the next cycle. Similarly, for two successive indications of "0," the waveform is at a value of zero at the first clock cycle, rises to a positive amplitude at the end of the first cycle and falls again to an amplitude of zero at the midpoint of the second clock cycle.

The rise and fall of the magnetic signal pattern in a channel may be expressed logically by the following equations:

$$\text{Up}=X_x\overline{G}_4+\overline{X}_xG_4 \quad (1)$$

$$\text{Down}=X_xG_4+\overline{X}_x\overline{G}_4 \quad (2)$$

Where:

Up=a change in the magnetic information recorded in a channel from a zero level to a positive level;

Down=a change in the magnetic information recorded in a channel from a positive level to a zero level;

$X_x$=a relatively high voltage on the left output terminal of the flip-flop whose pattern of operation is to be recorded in the channel;

$\overline{X}_x$=a relatively high voltage on the right output terminal of the flip-flop whose pattern of operation is to be recorded in the channel;

$G_4$=a relatively high voltage on the left output terminal of the flip-flop 164; and $\overline{G}_4$=a relatively high voltage on the right output terminal of the flip-flop 164.

*Position and Block Counters*

The voltage on the left output terminal of the flip-flop 164 is introduced to the various stages controlling the operation of the flip-flops 170, 180, 190, 200 and 210 shown in FIGURE 4. These flip-flops operate as a counter to count the number of clock signals introduced to the flip-flop 164. In their initial state of operation, the flip-flops 170, 180, 190, 200 and 210 have a pattern of operation in which relatively high voltages are simultaneously produced on the right output terminals of all of the flip-flops. This corresponds to a decimal count of "1," as may be seen in the table shown in FIGURE 32. In the table shown in FIGURE 32, the letter "L" indicates a relatively high voltage on the left output terminal of a flip-flop and the letter "R" indicates a relatively high voltage on the right output terminal of a flip-flop.

When the voltage on the left output terminal of the flip-flop 164 becomes high for the first time, the "and" network 166 becomes activated. The "and" network becomes activated because of the simultaneous introduction of high voltages from the cathode follower 168, the left output terminal of the flip-flop 164 and the right output terminal of the flip-flop 170. A triggering signal then passes through the "and" network 166 at the instant that the voltage on the left output terminal of the flip-flop 164 becomes relatively low. This signal triggers the flip-flop 170 so that a relatively high voltage is produced on the left output terminal of the flip-flop and a relatively low voltage is produced on the right output terminal of the flip-flop. As indicated in FIGURE 32, the flip-flops 170, 180, 190, 200 and 210 now have a pattern of operation corresponding to a decimal count of "2."

The relatively high voltage produced on the left output terminal of the flip-flop 170 in FIGURE 4 passes through the "or" network 172 to the "and" network 174 because of the operation of the "or" network 172 in passing high voltages. At the next clock signal, a relatively high voltage is also introduced to the "and" network 174 from the left output terminal of the flip-flop 164. This causes the "and" network 174 to become activated and a triggering signal to pass through the network upon the production of a relatively low voltage on the left output terminal of the flip-flop 164. The signal passing through the "and" network 174 triggers the flip-flop 170 and causes a relatively high voltage to be produced on the right output terminal of the flip-flop and a relatively low voltage to be produced on the left output terminal of the flip-flop.

During the time that a high voltage is produced on the left output terminal of the flip-flop 170, the "and" network 178 becomes activated. The "and" network 178 becomes activated because relatively high voltages are simultaneously introduced to it from the left output terminal of the flip-flop 170 and the right output terminals of the flip-flops 180 and 210. This high voltage then passes through the "or" network 182 to the "and" network 184. Because of this high voltage, a triggering signal passes through the "and" network 184 when the voltage on the left output terminal of the flip-flop 164 changes from a high to a low value.

The signal from the "and" network 184 triggers the flip-flop 180 into its alternate state of operation such that a relatively high voltage is produced on the left output terminal of the flip-flop and a relatively low voltage is produced on the right output terminal of the flip-flop. The simultaneous production of relatively high voltages on the left output terminal of the flip-flop 180 and on the right output terminals of the flip-flops 170, 190, 200 and 210 corresponds to a decimal count of "3" as indicated in FIGURE 32.

The "and" network 166 again becomes activated upon the occurrence of the next clock signal. This causes the flip-flop 170 to be triggered into its alternate state of operation for the production of a relatively high voltage on the left output terminal of the flip-flop and a relatively low voltage on the right output terminal of the flip-flop. As indicated in FIGURE 32, the simultaneous production of relatively high voltages on the left output terminals of the flip-flops 170, 180 and on the right output terminals of the flip-flops 190, 200 and 210 corresponds to a decimal value of "4."

The next clock signal causes the "and" network 174 to become activated in a manner similar to that described above. The resultant signal passing through the "and" network 174 triggers the flip-flop 170 to produce a change in the voltage on the left output terminal of the flip-flop from a high value to a low value. This change in voltage from a high value to a low value causes a signal to pass through the "and" network 186 to trigger the flip-flop 180 into its alternate state of operation. A triggering signal passes through the network 186 since the network was previously activated by the simultaneous introduction of high voltages from the cathode follower 173 and the left output terminals of the flip-flops 164, 170 and 180.

When the flip-flop 180 is triggered, the voltage on its left output terminal changes from a high value to a low value. This causes a signal to pass through the "and" network 188, which was previously activated by the simultaneous introduction of signals from the cathode follower 173, the left output terminals of the flip-flops 164, 170 and 180 and the right output terminal of the flip-flop 190. The signal passing through the "and" network 188 triggers the flip-flop 190 to produce a relatively high voltage on the left output terminal of the flip-flop. In this way, relatively high voltages are simultaneously produced on the left output terminal of the flip-flop 190 and on the right output terminals of the flip-flops 170, 180, 200 and 210. As may be seen from the chart shown in FIGURE 32, such a simultaneous occurrence of high voltages represents a decimal count of "5."

In like manner, each clock signal induced in the coil 162 triggers certain of the flip-flops 170, 180, 190, 200, and 210 into a pattern of operation which is different from the pattern of operation of the flip-flops at the occurrence of previous clock signals. Since the flip-flops 170, 180, 190, 200 and 210 are triggered into different patterns of operation for each clock signal, the flip-flops provide a count of the number of clock signals induced in the coil 162. The pattern of operation of the flip-flops 170, 180, 190, 200 and 210 for each decimal count is indicated in the chart shown in FIGURE 32.

As will be seen in the chart shown in FIGURE 32, relatively high voltages are produced on the left output terminals of the flip-flops 170 and 210 at a decimal count of "18." Because of this simultaneous production of high voltages, a signal passes from the "and" network 216 through the "or" network 214 to the "and" network 212. This signal prepares the "and" network 212 for activation upon the occurrence of the next clock signal. When the next clock signal is introduced to the "and" network 212, a signal passes through the "and" network and triggers the flip-flop 210 to produce a relatively high voltage on the right output terminal of the flip-flop. The clock signal also passes through the "and" network 174 and triggers the flip-flop 170 for the production of a relatively high voltage on the right output terminal of the flip-flop. In this way, the voltages on the right output terminals of the flip-flops 170, 180, 190, 200 and 210 become simultaneously high. As will be seen in the chart, shown in FIGURE 32, this pattern of voltages corresponds to a decimal value of "1." Since a decimal value of "1" is produced in the flip-flops, the flip-flops start to count again from a decimal value of "1" to a decimal value of "18" upon the introduction of successive clock signals to the flip-flop 164.

Since each decimal integer is represented by a different pattern of operation of the flip-flops 170, 180, 190, 200 and 210, "and" networks can be connected to the flip-flops to pass signals only for a particular count. For example, the "and" network 222 passes a signal only for a value of "1" because of its connections to the right output terminals of the flip-flops 170, 180, 190, 200 and 210. Similarly, the "and" network 225 (FIGURE 17) may be connected to the left output terminal of the flip-flop 170 and the right output terminals of the flip-flops 180, 190, 200 and 210 to pass an output signal only for a decimal count of "2." The "and" network 208 passes an output signal when relatively high voltages are simultaneously produced on the left output terminals of the flip-flops 170 and 210 to indicate a decimal count of "18."

Because of the operation of the stages shown in FIGURE 4 to count repetitively from "1" to "18," the pulse positions in the different tracks on the drum 130 can be considered as being divided into a plurality of blocks or integrators. Each of the blocks has a length of 18 pulse positions. These blocks are counted by the stages shown in FIGURE 5. The count is represented at any instant by the pattern of operation of the flip-flops 234, 244, 254, 262, 264, 266 and 268. As will be seen in the table shown in FIGURE 33, the flip-flops have a different pattern of operation for each block. In this way, when 2250 pulse positions are provided on each track in the drum 130, the pulse positions become divided into 125 blocks each having a length of 18 pulse positions.

The cathode followers 168 and 173 are provided to insure that the flip-flops shown in FIGURES 4 and 5 are returned to a pattern representing a value of "1" at the end of each count. A signal passes through the "and" network 408 and the cathode follower 168 in FIGURE 7 when relatively high voltages are simultaneously produced on the left output terminal of the flip-flop 318 and the right output terminals of the flip-flops 306, 310 and 314. Such a pattern of operation is simultaneously produced in the flip-flops 306, 310, 314 and 318 only once in each cycle of operation. This results from a coding in the tracks 140, 142, 144 and 146 at a particular position in each track. The coding is retained in successive cycles of operation since the information on the tracks 140, 142, 144 and 146 is permanently recorded in the tracks for the solution of a problem. This will be described in detail hereinafter.

The operation of the flip-flops 170, 180, 190, 200 and 210 in FIGURE 4 can be represented by the following equations:

$$j_1 = \overline{J}_1 \overline{N} T \quad (3)$$

$$\overline{j}_1 = (J_1 + N) T \quad (3a)$$

$$j_2 = (J_1 \overline{J}_2 \overline{J}_5 + N) T \quad (4)$$

$$\overline{j}_2 = J_1 J_2 \overline{N} T \quad (4a)$$

$$j_3 = J_1 J_2 \overline{J}_3 \overline{N} T \quad (5)$$

$$\overline{j}_3 = (J_1 J_2 J_3 + N) T \quad (6)$$

$$j_4 = J_1 J_2 J_3 \overline{J}_4 \overline{N} T \quad (7)$$

$$\overline{j}_4 = (J_1 J_2 J_3 J_4 + N) T \quad (8)$$

$$j_5 = J_1 J_2 J_3 J_4 \overline{N} T \quad (9)$$

$$\overline{j}_5 = (J_1 J_5 + N) T \quad (10)$$

In the above equations:

$J_1$=a relatively high voltage on the left output terminal of the flip-flop 170;

$\overline{J}_1$=a relatively high voltage on the right output terminal of the flip-flop 170;

$j_1$=a triggering signal introduced to the left input terminal of the flip-flop 170;

$\overline{j}_1$=a triggering signal introduced to the right input terminal of the flip-flop 170;

$J_2$=a relatively high voltage on the left output terminal of the flip-flop 180;

$J_3$=a relatively high voltage on the left output terminal of the flip-flop 190;

$J_4$=a relatively high voltage on the left output terminal of the flip-flop 200;

$J_5$=a relatively high voltage on the left output terminal of the flip-flop 210;

$N$=a high voltage from the cathode follower 168;

$\overline{N}$=a high voltage from the cathode follower 173; and $T$=a relatively high voltage on the left output terminal of the flip-flop 164.

The symbols $J_2$, $j_2$ and $\overline{j}_2$ represent voltages and signals for the flip-flop 180 corresponding to the symbols $\overline{J}_1$, $j_1$ and $\overline{J}_1$, respectively, for the flip-flop 170. Similarly, corresponding symbols are provided in the above equations for the flip-flops 190, 200 and 210.

It will be seen from the above equations that the flip-flops 170, 190, 200 and 210 are triggered by the "origin" pulse passing through the cathode follower 168 to produce relatively high voltages on the right output terminals of the flip-flops. However, the "origin" pulse passing through the cathode follower 168 triggers the flip-flop 180 to produce a relatively high voltage on the left output terminal of the flip-flop. A relatively high voltage is produced on the left output terminal of the flip-flop 180 so that information in the last block—in other words, Block 125—can be recorded in the proper flip-flops before the next cycle of counting is commenced.

It will also be seen from the above equations and from FIGURE 4 that the voltage on the right output terminal of the flip-flop 210 is introduced to the "and" network 178 to control the operation of this network. If such a signal were not introduced to the network 178, the flip-flop 180 would be triggered upon a return from a count of "18" to a count of "1." This triggering would produce a relatively high voltage on the left output of the flip-flop 180 and would prevent a count of "1" from being properly obtained after a count of "18." The introduction of the voltage from the right output terminal of the flip-flop 210 to the "and" network 178 prevents a signal from passing through the "and" network at position 18 since a relatively low voltage exists on the right output terminal of the flip-flop at this position.

The operation of the flip-flops 234, 244, 254, 262, 264, 266 and 268 in FIGURE 5 occurs in accordance with the following logical equations:

$$k_1 = \overline{K}_1 P_{17} T \quad (11)$$

$$\overline{k}_1 = (K_1 P_{17} + N) T \quad (12)$$

$$k_2 = K_1 \overline{K}_2 P_{17} T \quad (13)$$

$$\overline{k}_2 = (K_1 K_2 P_{17} + N) T \quad (14)$$

$$k_3 = K_1 K_2 \overline{K}_3 P_{17} T \quad (15)$$

$$\overline{k}_3 = (K_1 K_2 K_3 P_{17} + N) T \quad (16)$$

$$k_4 = K_1 K_2 K_3 \overline{K}_4 P_{17} T \quad (17)$$

$$\overline{k}_4 = (K_1 K_2 K_3 K_4 P_{17} + N) T \quad (18)$$

$$k_5 = K_1 K_2 K_3 K_4 \overline{K}_5 P_{17} T \quad (19)$$

$$\overline{k}_5 = (K_1 K_2 K_3 K_4 K_5 P_{17} + N) T \quad (20)$$

$$k_6 = K_1 K_2 K_3 K_4 K_5 \overline{K}_6 P_{17} T \quad (21)$$

$$\overline{k}_6 = (K_1 K_2 K_3 K_4 K_5 K_6 P_{17} + N) T \quad (22)$$

$$k_7 = K_1 K_2 K_3 K_4 K_5 K_6 \overline{K}_7 P_{17} T \quad (23)$$

$$\overline{k}_7 = NT \quad (24)$$

In the above equations:

$K_1$=a relatively high voltage on the left output terminal of the flip-flop 234;

$K_2$=a relatively high voltage on the left output terminal of the flip-flop 244;

$K_3$=a relatively high voltage on the left output terminal of the flip-flop 254;

$K_4$=a relatively high voltage on the left output terminal of the flip-flop 262;

$K_5$=a relatively high voltage on the left output terminal of the flip-flop 264;

$K_6$=a relatively high voltage on the left output terminal of the flip-flop 266;

$K_7$=a relatively high voltage on the left output terminal of the flip-flop 268;

$P_{17}$=a signal passing through the line 223 to represent position 17 for each block; and N and $\overline{N}$ have been previously defined. Only one of the symbols for each flip-flop has been included to identify the flip-flop. The other symbols for each flip-flop represent functions similar to those given for the flip-flop 170 in FIGURE 4.

As described above, a signal is produced in the cathode follower 168 once in each cycle of computation. This signal is produced in the cathode follower 168 because of a particular and permanent coding provided in the channels 140, 142, 144 and 146. This coding is represented by simultaneous indications of "0" in the channels 140, 142 and 144 and of "1" in the channel 146. Upon such a simultaneous occurrence of signals, relatively high voltages are simultaneously produced on the right output terminals of the flip-flops 306, 310 and 314 and on the left output terminal of the flip-flop 318. This causes a signal designated as the "origin" pulse to pass through the "and" network 408 to the cathode follower 168 in FIGURE 7 for the purpose of synchronizing the operation of the computer once in each cycle of computation.

In this way, the cathode follower 168 operates in accordance with the logical expression:

$$n = \overline{L}_1 \overline{L}_2 \overline{L}_3 L_4 T \quad (25)$$

Where:

$n$=the passage of a signal to the cathode follower 168;

$\overline{L}_1$=a relatively high voltage on the right output terminal of the flip-flop 306;

$\overline{L}_2$=a relatively high voltage on the right output terminal of the flip-flop 310;

$\overline{L}_3$= a relatively high voltage on the right output terminal of the flip-flop 314; and $L_4$= a relatively high voltage on the left output terminal of the flip-flop 318.

The cathode follower 173 produces a signal in every clock cycle in which a signal is not produced by the cathode follower 168. Thus, the cathode follower 173 produces a signal when any one or more of the terms $L_1$, $L_2$ and $L_3$ is true or $L_4$ is false. When one or more of the terms $L_1$, $L_2$ and $L_3$ is true or $L_4$ is false, a signal passes through the "or" network 409 to the "and" network 411. Because of its connection to the left output terminal of the flip-flop 164, the "and" network 411 synchronizes the signals from the "or" network 409 at an optimum time in the clock cycles. The "and" network 411 then introduces the signals to the cathode follower 173. The operation of the cathode follower 173 can thus be expressed as $$\bar{n}=T(L_1+L_2+L_3+\bar{L}_4) \quad (26)$$

where all of the terms have previously been defined.

*Schematic Presentation of Digital Differential Analysis*

The blocks formed by the circuitry shown in FIGURES 4 and 5 are used in various combinations to solve differential problems. Each block includes information relating to a dependent quantity Y and to variations in an independent quantity X. These variations will hereafter be designated as "$\Delta x$" or sometimes as "$dx$." The block obtains the combination of Y and $\Delta$Y upon the occurrence of $\Delta$X increments to produce variations $y\Delta x$ in a quantity which may be designated as "R." This quantity may be considered as the output quantity from the block or may be considered as the cumulative value of the differential combination of $y$ and $\Delta x$.

A typical relationship between an independent quantity $x$ and a dependent quantity $y$ is shown in FIGURE 34. In this figure, the value $x$ is represented along the abscissa of the curve and the value $y$ is represented along the ordinate. The relationship between $x$ and $y$ can be represented by $y=f(x)$ where $f(x)$ represents a function of $x$. The area under the curve represents the values $$\int_{x_0}^{x_1} y\,dx$$

where the "$\int$" sign represents the integral of $ydx$ between the values of "$x_0$" and "$x_1$" for the independent quantity. It is well known in the field of mathematics that the value $$\int_{x y_0}^{x_1} dx$$

may be approximated by obtaining the cumulative value $$\sum_{y_{x_0}}^{x_1} \Delta x. \text{ The value } \sum_{x_0}^{x_1} y\Delta x$$

represents an accumulation of $y\Delta x$ increments between the values $x_0$ and $x_1$ for the independent quantity $x$. By reducing the value of the $\Delta x$ increments, the cumulative value of the $y\Delta x$ increments represented by $$\sum_{y_{x_0}}^{x_1} \Delta x \text{ can be made to approach the value } \int_{y_{x_0}}^{x_1} dx$$

with as small an error as may be desired.

As may be seen in the curve shown in FIGURE 34, each increment $\Delta x$ represents an area under the curve $y=f(x)$ for the particular $\Delta x$ increment. For example, an area indicated in cross-hatching at 1600 is illustrated in FIGURE 34 for a particular $\Delta x$ increment. It will be seen that the area 1600 approximates the area under the curve, especially if the $\Delta x$ increment is relatively small.

As the solution of the differential problem proceeds, $\Delta x$ increments in the independent quantity $x$ for each block are obtained. The $\Delta x$ increments are obtained so that progressive values of the independent quantity $x$ are produced to trace curves corresponding to the typical curve shown in FIGURE 34. At the same time, increments in the dependent quantity $y$ are obtained so that the proper value of $y$ will result for successive positions along the curve. The digital variations in the dependent quantity $y$ for a block will hereafter be designated as "$\Delta y$" or sometimes as "$dy$."

The $\Delta x$ increments for each block are obtained from the differential combinations for other blocks in a pattern dependent upon the problem being solved. For example, a relatively simple differential problem is solved by an inter-relationship of blocks similar to that shown in FIGURE 35. This inter-relationship is provided to obtain the solution for the differential equation $$a\frac{d^2q}{dx^2}+b\frac{dy}{dx}-cy=0$$

In the inter-relationship shown in FIGURE 35, the different blocks are represented by rectangles such as the rectangles 1602, 1604, 1606 and 1608. The $\Delta x$ increments for each block are shown as being introduced to the block at a position on the upper right side of the block. Similarly, the $\Delta y$ increments for each block are shown as being introduced to the block at a position at the lower right side of the rectangle representing the block. The $y\Delta x$ increments for each block are shown as leaving the block at an intermediate position on the right side of the rectangle representing the block.

In the relationship of blocks shown in FIGURE 35, the block 1606 obtains its $\Delta x$ increments from the output of the block 1602. Similarly, the value of the independent quantity $x$ for the block 1608 varies in accordance with the introduction of the output quantity from the block 1604 to the block 1608 in representation of $\Delta x$ increments for the block 1608. In this way, the $\Delta x$ increments for each block are obtained from the output quantity of a different block in an inter-relationship dependent upon the differential problem to be solved. As will be described in detail subsequently, $\Delta x$ increments for a block may also be sometimes obtained from an external source. For example, the block 1602 in FIGURE 35 obtains $\Delta x$ increments from an external source.

The $\Delta y$ increments for each block are often obtained from the output quantity for a different block dependent upon the problem to be solved. The $\Delta y$ increments for a block are sometimes obtained from the output quantity of the same block in the solution of certain problems. As will be disclosed in detail hereinafter, this is especially true when the block is operating as a servo. As an example of the introduction of the output quantity of one block as the $\Delta y$ increments of a second block, the output quantity from the block 1602 is introduced to the block 1604 to obtain $\Delta y$ increments for the block 1604.

FIGURE 40 illustrates in simplified block form the stages required to solve differential problems on a digital basis. The stages include the coils 270 and 276 associated with the channel 138, the coils 452 and 1333 associated with the channel 150 and the coils 648 and 1410 associated with the channel 152. The flip-flops 288, 450 and 646 are included to produce signals in accordance with the signals respectively induced in the coils 276, 452 and 648 by the magnetic information in the channels. The flip-flops 337, 1332 and 1388 are also included to introduce signals to the coils 270, 1333 and 1410, respectively, for the recordation of magnetic information in the channels 138, 150 and 152.

As the drum 130 rotates, the counters shown in FIGURES 4 and 5 count the number of clock signals in the clock channel 136 and divide the channel into a plurality of blocks. Each block contains numerical information in the channel 150 relating to the dependent quantity $y$ and numerical information in the channel 152 relating to the cumulative value of the Y$\Delta$X increments. As will be described in detail hereinafter, the channel 152 provides only a limited capacity for each block so that overflows occur in the value of $\Sigma$Y$d$X for each block. These overflows are recorded in the channel 139 and are circulated in the channel as the drum 130 rotates.

As has been described previously in connection with the circuit diagram shown in FIGURE 35 for the solution of a particular problem, each block receives $\Delta$X and $\Delta$Y increments from the outputs of various blocks in the digital differential analyzer. Since the output of each block can be considered as the overflow signal information recorded in the channel 138, this signal information is used to determine the $\Delta$X and $\Delta$Y increments for the various other blocks.

During the presentation of a block for computation, the $\Delta X$ and $\Delta Y$ increments for the block are determined in accordance with the output from certain blocks selected in accordance with the problem to be solved. The output signal information for a block is selected by programming permanently provided for the block. As will be described in detail subsequently, this programming is represented by coded patterns of signal indications in the channels 140, 142, 144 and 146. One pattern controls the selection of an output signal indication to control the occurrence and polarity for each $\Delta X$ increment in the block undergoing computation. A different pattern controls the selection of an output signal indication to control the occurrence and polarity for each $\Delta Y$ increment in the block undergoing computation.

A number of stages are required to decode the programmed informaiton in the channels 140, 142, 144 and 146 and to produce signal indications representing the $\Delta X$ and $\Delta Y$ increments for the block undergoing computation. For purposes of simplicity, these stages are shown in FIGURE 40 as a single block 1750 which is programmed to control the occurrence of the $\Delta X$ and $\Delta Y$ increments for each block. The output from the programmer 1750 is introduced to addressers 1752 and 1754 for respectively producing signal indications representing the $\Delta X$ and $\Delta Y$ increments for each block as the block undergoes computation. Since the overflow signal indications in the channel 138 are also introduced to the addressers 1752 and 1754, the programmer 1750 controls which of the overflow signal indications are selected as the $\Delta X$ and $\Delta Y$ increments for each block. For purposes of simplicity, the overflow indications are shown in FIGURE 40 as being made available only through the coil 276 and the flip-flop 288 to the addressers 1750 and 1752. Actually, the coils 272, 274 and 278 shown in FIGURE 6 and the flip-flops associated with the coils are also used to increase the flexibility in the inter-coupling between various blocks.

The signal indications from the addresser 1754 representing the $\Delta Y$ increment for each block are introduced to an adder 1756. The adder 1756 is shown as a single block in FIGURE 40 but is actually formed from a number of different stages, as will be described in detail subsequently. The adder 1756 combines the signal indications representing the $\Delta Y$ increment and the signal indications from the channel 150 representing Y. As a result of this combination, the adder 1756 produces signal indications representing $Y_N = Y + \Delta Y$. These signal indications are introduced to the flip-flop 1332, which in turn introduces the signals to the coil 1333 for recordation in the channel 150. In this way, new information relating to the value of the dependent quantity Y for each block is obtained in each cycle of computation and is used for combination with $\Delta Y$ in the next cycle of computation.

The output information from the adder 1756 for each block is also introduced to a Y gate 1758, which is opened by signals from the addresser 1752, representing a $\Delta X$ increment for the block. When the $\Delta X$ increment is positive, the signals representing Y pass through the gate 158 without change. Upon the occurrence of a negative $\Delta X$ increments for a block, the indications representing Y are changed to invert the polarity of Y. In this way, the gate 1758 passes signals representing Y or $-Y$ for each block. This is equivalent to $+Y\Delta X$ or $-Y\Delta X$ if each $\Delta X$ increment can be considered to have a unitary value.

The signal indications representing Y or $-Y$ pass from the gate 1758 to the adder 1760. The adder 1760 combines these signals with the signal indications representing $\Sigma Y\Delta X$, or, in other words, the cumulative value of the $Y\Delta X$ increments. In this way, signal indications representing a new cumulative value of the $Y\Delta X$ increments for each block are produced by the adder 1760. These signal indications are introduced to the flip-flop 1388 and are in turn applied by the flip-flop to the coil 1410 for recordation in the channel 152. By this technique, the signal indications for each block are presented in the next cycle of computation to the adder 1760 for combination with the signal indications representing the next $Y\Delta X$ increment for the block. In this way, new indications representing $\Sigma Y\Delta X$ are obtained for each block in each cycle of computation.

Since the capacity of the signal indications in the channel 152 for each block is somewhat limited, the signal indications often overflow when $Y\Delta X$ increments are added in successive cycles of computation. The overflow signal indication for each block passes through stages shown schematically in FIGURE 40 as a Z gate 1762. The gate 1762 passes these signals only at position 18 for each block. After passing through the gate 1762, the signals are introduced to the flip-flop 337 for recordation by the coil 270 in the channel 138.

Because of the operation of the gate circuit 1762 in passing signals only at position 18 for each block, the signal indications presented in the channel 138 at other positions for each block are able to be recirculated. These signals represent positive or negative overflows for other blocks. By providing such a recirculation of overflow information, the outputs of various blocks are made available to each block as it undergoes computation so that the $\Delta X$ and $\Delta Y$ increments for the block can be determined. As described briefly above, the programmer 1750 and the addressers 1752 and 1754 provide such a determination.

*The Production of $\Delta X$ and $\Delta Y$ Increments*

The inter-relationship between the different integrators in the solution of a differential problem is obtained by coded patterns in the various tracks of the drum 130. For example, coded patterns controlling the production of $\Delta X$ and $\Delta Y$ increments for each block are provided in the tracks 140, 142, 144 and 146 on the drum 130. Since the coded patterns controlling the production of $\Delta X$ and $\Delta Y$ increments for each integrator are fixed during the solution of a particular pattern, the coded patterns in the tracks 140, 142, 144 and 146 are permanently recorded in the tracks during the solution of the problem. The tracks 140, 142, 144 and 146 will be designated hereinafter as "$L_1$," "$L_2$," "$L_3$" and "$L_4$" in the logical equations which will hereinafter be set forth.

A $\Delta X$ increment for an integrator is obtained only when a particular code simultaneously appears in corresponding pulse positions of the tracks 140 and 142. This coded pattern is represented by the configuration "0" and "1" for the tracks 140 and 142, respectively. Because of this configuration, a signal of high amplitude is induced in the coil 298 (FIGURE 7) at the same time that a signal of low amplitude is induced in the coil 296. This causes a relatively high voltage to be simultaneously produced on the left output terminal of the flip-flop 310 and the right output terminal of the flip-flop 306. When high voltages are simultaneously produced on the right output terminal of the flip-flop 306 and the left output terminal of the flip-flop 310, the flip-flop 396 (FIGURE 7) is prepared for triggering. The flip-flop 396 is triggered when a relatively high voltage is obtained at the same time from the cathode follower 328. The operation of the cathode follower 328 and of a complementary cathode follower 364 will be described in detail subsequently.

The "and" network 380 (FIGURE 7) receives the high voltages from the cathode follower 328 and the left output terminal of the flip-flop 310. When these voltages are simultaneously high, the "and" network 380 passes a signal through the "or" network 382 to the "and" networks 394 and 402. The "and" network 394 passes a signal only when a relatively high voltage is produced on the right output terminal of the flip-flop 306 to represent part of the required coding for a $\Delta X$ increment, as described above. Since the "and" network 394 also receives signals from the inverter 444, it can pass signals only when the voltage from the inverter is high. The inverter 444 provides a high voltage only for pulse positions 1 to 17, inclusive, of each block. The inverter 444 operates in this manner because it inverts the high voltage provided by the "and" network 216 at pulse position 18 of each block.

The "and" network 394 is also connected to the right output terminal of the flip-flop 396. In this way, the "and" network 394 passes a signal only when a relatively high voltage is introduced to it from the right output terminal of the flip-flop 396. In addition to the connections described above, the "and" network 394 has an input terminal connected to the left output terminal of the flip-flop 164. Since the flip-flop 164 supplies clock signals to the "and" network 394, the "and" network passes signals only at an optimum time in each clock cycle.

The signals passing through the "and" network 394 are introduced to the left input terminal of the flip-flop 396 to trigger the flip-flop. When the flip-flop 396 becomes triggered, a relatively high voltage is produced on the left output terminal of the flip-flop and a relatively low voltage is produced on the right output terminal of the flip-flop. The operation of the "and" network 380, the "or" network 382 and the "and" network 394 in introducing triggering signals to the left input terminal of the flip-flop 396 can be expressed as $$a_1=\overline{A}_1\overline{L}_1P_{1/17}\text{L}L_2T \qquad (27)$$

Where:

$a_1$=a triggering signal introduced to the left input terminal of the flip-flop 396;

$\overline{A}_1$=a relatively high voltage on the right output terminal of the flip-flop 396;

$\overline{L}_1$=a relatively high voltage on the right output terminal of the flip-flop 306;

$L_2$=a relatively high voltage on the left output terminal of the flip-flop 310;

$P_{1/17}$=a relatively high voltage from the inverter 444 to indicate pulse positions 1 to 17, inclusive for each integrator; and L=a relatively high voltage from the cathode follower 328.

At the end of certain blocks, a signal passes through the "and" network 406. A signal passes through the "and" network 406 at the end of a block only when a relatively high voltage is introduced to the "and" network from the right output terminal of the flip-flop 390. As will be described in detail hereinafter, a signal is produced on the right output terminal of the flip-flop 390 only when an operation is being completed. For example, two blocks may be effectively combined at times to perform a single operation with an increased accuracy in the operation resulting from the increased number of pulse positions. A relatively high voltage would be produced on the right output terminal of the flip-flop 390 only for the second half of this double length operation. A relatively high voltage is also produced on the right output terminal of the flip-flop 390 when the block undergoing computation is used as a single length operation.

The "and" network 406 is able to pass a signal only at pulse position 18 for certain blocks because of its connection to the "and" network 216. The signals from the "and" network 406 pass through the "or" network 400 to the "and" network 398. The "and" network 398 also receives the clock signals from the flip-flop 164. Because of the introduction of the clock signals, the signals passing through the "and" network 398 are synchronized at an optimum time in each cycle of alternating voltage. The signals from the "and" network 398 are introduced to the right input terminal of the flip-flop 396 to trigger the flip-flop for the production of a relatively high voltage on the right output terminal of the flip-flop and a relatively low voltage on the left output terminal of the flip-flop.

The operation of the "and" network 406, the "or" network 400 and the "and" network 398 in passing triggering signals to the right input terminal of the flip-flop 396 can be expressed as $$\overline{a}_1=\overline{G}_5P_{18}T \qquad (28)$$

Where:

$\overline{a}_1$=the introduction of a triggering signal to the right input terminal of the flip-flop 396;

$\overline{G}_5$=a relatively high voltage on the right output terminal of the flip-flop 390; and $P_{18}$ and T have previously been defined.

The signals passing to the flip-flop 396 from the "and" network 398 trigger the flip-flop at the end of each operation performed in one or more blocks to prepare the flip-flop for proper operation during the next block.

As described above, a relatively high voltage is produced on the right output terminal of the flip-flop 396 at the end of each operation performed in one or more blocks. When a negative ΔX increment occurs in the next block performing a new operation, the flip-flop 396 continues to provide a relatively high voltage on its right output terminal. A high voltage is maintained on the right output terminal of the flip-flop 396 because a relatively low voltage is produced in the cathode follower 328 in a manner which will be described in detail subsequently. This low voltage prevents a signal from passing through the "and" network 380 to prepare the "and" network 394 for operation. This prevents a triggering signal from passing through the "and" network 394 to the left input terminal of the flip-flop 396 to trigger the flip-flop to its "true" state of operation.

At the end of a block, the state of operation of the flip-flop 396 (FIGURES 7 and 8) is transferred to the flip-flop 420 (FIGURE 8). The transfer is obtained only at the end of single-length blocks or at the completion of the second half of double-length blocks. The transfer is obtained only for these blocks because of the connection from the right output terminal of the flip-flop 390 to the "and" network 418. The transfer can occur only at pulse position 18 for these blocks because of the introduction of the output signals from the "and" network 216 to the "and" network 418.

The "and" network 418 also has a third input terminal connected to the "or" network 416, which in turn receives signals from the "and" networks 410 and 412. One input terminal in each of the networks 410 and 412 is connected to the left output terminal of the flip-flop 396 to indicate that a transfer of information from the flip-flop 396 is being obtained. Second input terminals of the "and" networks 410 and 412 are respectively connected to the right output terminal of the flip-flop 314 and the left output terminal of the flip-flop 318. This causes the "and" networks 410 and 412 to pass signals indicating $A_1\overline{L}_3+A_1L_4$ where $\overline{L}_3$ and $L_4$ respectively represent coding information in the channels 144 and 196. As is well known, $A_1\overline{L}_3+A_1L_4=(\overline{L}_3+L_4)A_1$. By Boolean algebra, it can be shown that $\overline{L}_3+L_4=(\overline{L_3\overline{L}_4})$. In this way, the "and" networks 410 and 412 pass a signal at all times that the code $L_3\overline{L}_4$ is not true. The purpose of the code $L_3\overline{L}_4$ will be described in detail hereinafter.

As will be seen from the above description, the following logical expression can be set forth for the operation of the stages 410, 412, 416 and 418.

$$a_2=\overline{G}_5P_{18}T(A_1\overline{L}_3+A_1L_4) \qquad (29)$$

Where:

$a_2$=the introduction of a triggering signal to the left input terminal of the flip-flop 420;

$\overline{L}_3$=a relatively high voltage on the right output terminal of the flip-flop 314;

$L_4$=a relatively high voltage on the left output terminal of the flip-flop 318; and the other terms have previously been defined.

The "and" networks 422 and 424 operate in a manner similar to the "and" networks 410 and 412, respectively, but pass signals of high amplitude on the right output terminal of the flip-flop 396. These signals pass through the "or" network 428 to the "and" network 430 for synchronization at optimum times in the clock cycles. The signals are then introduced to the right input terminal of the flip-flop 420. The signals trigger the flip-flop 420 so as to produce a relatively high voltage on the right output terminal of the flip-flop. The flip-flop 420 is triggered by the passage of signals through the stages 422, 424, 428 and 430 in accordance with the logical equation $$\bar{a}_2=\bar{G}_5P_{18}T(\bar{A}_1\bar{L}_3+\bar{A}_1L_4) \quad (29a)$$

Where:

$\bar{a}_2$=the introduction of a triggering signal to the right input terminal of the flip-flop 420; and the other terms have previously been defined.

The operation described above for the flip-flops 396 and 420 and developed logically in Equations 27, 28, 29 and 29*a* is similar to that of the addresser 1752 in FIGURE 40. Similarly, the flip-flops 496 and 494 operate in a manner similar to the addresser 1754 shown in FIGURE 40 and discussed briefly above. The operation of the flip-flops 496 and 494 will be discussed in detail in the subsequent paragraphs.

In like manner, the occurrence of ΔY increments is controlled by a particular code in the channels 140 and 142. This particular code is represented by the simultaneous occurrence of a relatively high voltage in the channel 140 and a relatively low voltage in the channel 142. These voltages in turn cause relatively high voltages to be simultaneously produced on the left output terminal of the flip-flop 306 and the right output terminal of the flip-flop 310 in a manner similar to that described above.

The voltages on the left output terminal of the flip-flop 306 and on the right output terminal of the flip-flop 310 are introduced to the "and" network 480 in FIGURE 9. Since the "and" network 480 also receives voltages from the cathode follower 328, it is able to pass a signal only for positive ΔY increments. The signals from the "and" network 480 pass through the "or" network 482 to the "and" network 484. The "and" network 484 is able to open only in pulse positions 1 to 17 inclusive, for each block because of its connection to the inverter 444.

The signals from the "and" network 484 are in turn introduced through the "or" network 488 to the "and" network 490. The "and" network 490 operates to synchronize these signals at an optimum time in the clock signals because of its connection to the left output terminal of the flip-flop 164. The signals from the "and" network 490 in turn trigger the flip-flop 496 to produce a relatively high voltage on the left output terminal of the flip-flop and a relatively low voltage on the right output terminal of the flip-flop. The production of a relatively high voltage on the left output terminal of the flip-flop 496 indicates a positive Δy increment for a block. The operation of the stages 480, 482, 484, 488 and 490 in passing triggering signals to the flip-flop 496 can be expressed logically as follows:

$$b_1=L_1\bar{L}_2P_{1/17}\mathsf{L}T \quad (30)$$

Where:

$b_1$=a triggering signal introduced to the left input terminal in the flip-flop 496; and the other terms have previously been defined.

In like manner, signals are introduced to the right input terminal of the flip-flop 496 to represent negative ΔY increments. These signals pass through the "and" network 500, the "or" network 504, the "and" network 506, the "or" network 510 and the "and" network 512. With one exception, the stages 500, 504, 506, 510 and 512 operate in a manner similar to that described above for the stages 480, 482, 488 and 490. By this exception, signals from the cathode follower 364 are introduced to the "and" network 500 rather than signals from the cathode follower 328. As will be described in detail hereinafter, the signals from the cathode follower 364 represent negative increments.

The signals passing to the right input terminal in the flip-flop 496 trigger the flip-flop to produce a relatively high voltage on the right output terminal of the flip-flop and a relatively low voltage on the left output terminal of the flip-flop. The triggering signals passing through the stages 500, 504, 506, 510 and 512 can be logically represented as $$\bar{b}_1=L_1\bar{L}_2P_{1/17}\bar{\mathsf{L}}T \quad (31)$$

Where:

$\bar{b}_1$=a triggering signal passing to the right input terminal of the flip-flop 496;

$\bar{\mathsf{L}}$=a signal from the cathode follower 364 to represent a negative increment; and the other terms have previously been defined.

Just as the information in the flip-flop 396 (FIGURES 7 and 8) is transferred to the flip-flop 420 (FIGURE 8) at the end of a block, the information in the flip-flop 496 (FIGURES 9 and 10) is transferred to the flip-flop 494 (FIGURE 10). Relatively high voltages on the left output terminal of the flip-flop 496 are transferred at the end of a block to the flip-flop 494 to produce a relatively high voltage on the left output terminal of the flip-flop 494. The transfer is obtained through the operation of stages including the flip-flop 496, the "or" network 516, the "and" network 518, the "or" network 522, the "and" network 524 and the flip-flop 494. The operation of these stages can be logically expressed as $$b_2=\bar{G}_5P_{18}B_1T(\bar{L}_3+\bar{L}_4) \quad (32)$$

Where:

$b_2$=a triggering signal introduced to the left input terminal of the flip-flop 494; and the other terms have previously been defined.

The term $\bar{L}_3+\bar{L}_4=(L_3L_4)'$, where $(L_3L_4)'$ is the negation of $L_3L_4$, indicates that $L_3L_4$ represents a special coding at $P_{18}$ to transfer information to the flip-flop 494 from stages other than the flip-flop 496.

The relatively high voltages on the right output terminal of the flip-flop 496 are transferred at the end of each operation to the flip-flop 494 to produce a relatively high voltage on the right output terminal of the flip-flop 494. This transfer is obtained through stages including the flip-flop 496, the "or" network 516, the "and" network 528, the "or" network 532, the "and" network 534 and the flip-flop 494. The operation of these stages can be expressed by the following logical equation:

$$\bar{b}_2=\bar{G}_5P_{18}\bar{B}_1T(\bar{L}_3+\bar{L}_4) \quad (33)$$

Where:

$\bar{b}_2$=the introduction of a triggering signal to the right input terminal of the flip-flop 494; and the other terms have previously been defined.

At certain times, the ΔY information obtained for one block may be desired for use as the ΔY increment of subsequent blocks. This is obtained by transferring the ΔY information in the flip-flop 494 back to the flip-flop 496. Such a transfer is produced by the operation of the gate circuits 492 and 508 in FIGURE 9. The gate circuit 492 passes a signal when the voltage on the left output terminal of the flip-flop 494 is high. The gate circuit 492 passes a signal only at pulse position 18 for a block because of its connection to the "and" network 216. Signals pass through the gate circuit 492 only for those blocks in which an operation is being completed. This results from the connection of the right output terminal of the flip-flop 390 to an input terminal of the "and" network 492.

Signals from the "and" network 492 pass through the "or" network 488 to the "and" network 490. The "and" network 490 operates to synchronize these signals so that they pass through the "and" network at an optimum time in the clock cycles. This results from the introduction to the "and" network 490 of relatively high voltages on the left output terminal of the flip-flop 164. The signals from the "and" network 490 trigger the flip-flop 496 to produce a relatively high voltage on the left output terminal of the flip-flop. The passage of signals through the "and" network 492, the "or" network 488 and the "and" network 490 can be expressed logically as:

$$b_1 = B_2\overline{G}_5P_{18}T \qquad (34)$$

where all of the terms have previously been defined.

In like manner, the "and" network 508, the "or" network 510 and the "and" network 512 operate to transfer relatively high voltages on the right output terminal of the flip-flop 494 to the right output terminal of the flip-flop 496. The "and" network 508, the "or" network 510 and the "and" network 512 pass signals in accordance with the logical expression:

$$\overline{b}_1 = \overline{B}_2\overline{G}_5P_{18}T \qquad (35)$$

where all of the terms have previously been defined.

In this way, ΔY increments are obtained for one block and are stored in the flip-flop 496 for the remainder of the block. At the end of the block, the increments are transferred to the flip-flop 494 so that the flip-flop 496 can receive information relating to the ΔY increments for the next block. At the end of this next block, the information relating to the ΔY increments in the flop-flop 494 are sometimes transferred back to the flip-flop 496 to serve as the ΔY information for a third block which follows the second block.

The information obtained by the flip-flop 496 and transferred to the flip-flop 494 represents ΔY increments. The ΔY increments obtained for each block are added to the value of the dependent quantity Y to obtain a new value of Y for the block. This new value of Y is obtained every time that the block is presented for computation. The value of Y for each block is stored in the channel 150 and is made available when the block is presented for computation.

*The Combination of Y and ΔY*

In FIGURE 40, the block 1756 is shown as performing the function of adding the value of Y with the ΔY increments for each block upon the presentation of the block for computation. As described previously, the block 1756 is only a schematic representation and is actually equivalent to a number of stages. The operation of these stages will now be described in detail.

The value of Y for each block is not necessarily stored in all of the eighteen positions in the channel 150 for the block. When the block is being used for normal integration, the value of Y is actually stored in a number of positions less than eighteen. The beginning of the Y information for each block is represented by a relatively high signal permanently recorded in the channel 148. This signal triggers the flip-flop 542 in FIGURE 15 to produce a relatively high voltage on the left output terminal of the flip-flop. The signal will hereafter be designated as the "start" pulse.

The relatively high voltage on the left output terminal of the flip-flop 542 is introduced to the "and" network 540. Signals from the inverter 541 are also introduced to the "and" network 540. Since the inverter 541 has signals introduced to it through the "or" network 543 from the "and" networks 222 and 216, the inverter passes a signal to the "and" network 540 between positions 2 to 17, inclusive, for each block. In this way, the "and" network 540 passes the coding pulse in the channel 152 when the pulse occurs in pulse positions 2 to 17, inclusive, for a block. The "and" network 540 passes a signal when a relatively high voltage is produced on the right output terminal of the flip-flop 446.

The signals from the "and" network 540 pass through the "or" network 828 to the "and" network 830. The "and" network 830 performs a synchronizing operation in a manner similar to that described above to pass the signal at an optimum time in a clock cycle. The signal passing through the "and" network 830 triggers the flip-flop 446 to produce a relatively high voltage on the left output terminal of the flip-flop. This production of a relatively high voltage on the left output terminal of the flip-flop 446 can be logically expressed as:

$$s_1 = Y_p\overline{S}_1P_{2/17}T \qquad (36)$$

Where:

$s_1$=the introduction of a triggering signal to the left input terminal of the flip-flop 446;

$Y_p$=a relatively high voltage on the left output terminal of the flip-flop 542 to represent the "start" pulse;

$\overline{S}_1$=a relatively high voltage on the right output terminal of the flip-flop 446; and $P_{2/17}$=a signal from the inverter 541 to indicate pulse positions 2/17 inclusive for a block.

As previously described, certain operations carry over from one block to a successive block so that the two blocks essentially serve as one elongated block. Coding must be provided to indicate at the end of the first block that the operation will continue in the second block. This coding is permanently provided by relatively high signals in the channels 140 and 142 at pulse position 18 for the first block. Upon the occurrence of such a coding at pulse position 18 for the first block, relatively high voltages are simultaneously introduced to the "and" network 826 (FIGURE 15) from the "and" network 216 and the left output terminals of the flip-flops 306 and 310. This causes a signal to pass through the "and" network 826, the "or" network 828 and the "and" network 830 to trigger the flip-flop 446 for the production of a relatively high voltage on the left output terminal of the flip-flop. The operation of the stages 826, 828 and 830 in passing triggering signals to the flip-flop 446 can be logically expressed as:

$$s_1 = L_1L_2P_{18}T \qquad (37)$$

where all of the terms have previously been defined.

The addition of the ΔY increment to the value of Y for a block does not start until a relatively high voltage has been produced on the left output terminal of the flip-flop 446 in a manner similar to that described above. Only one ΔY increment is added to the value of Y for a block every time that the block is presented for computation. The addition is obtained by the operation of the flip-flop 538 in FIGURE 10 and the cathode followers 580 and 594 in FIGURE 11.

The flip-flop 538 in FIGURE 10 indicates a carry from one pulse position to the next when each ΔY increment is added to the value of Y for a block. A carry is obtained when the sum of the indications in one position represents a binary value of "2" or more. For example, a carry is obtained when an indication of "1" in the value of Y for a certain position such as position 11 for a block coincides with a positive ΔY increment at this position. The addition of an indication of "1" for Y in a particular position and an indication of "1" for the ΔY increment in the position produces a value of "2." This can be represented by an indication of "0" for the position and a carry of "1" to the next position. The carry is then added to the indications of Y and ΔY at the next position. Similarly, additions of indications of "1" for Y, ΔY and the carry flip-flop 538 for a position produce a resultant value of "3." This is equivalent in binary form to an indication of "1" for the position and a carry of "1" to the next position.

The carry flip-flop 538 is triggered in each block to produce a relatively high voltage on its left output terminal at the "start" position. This triggering is effectuated by the passage of a triggering signal to the left input terminal of the flip-flop 538 from the "and" network 540 in FIGURE 10. The operation of the "and" network 540 has been previously described in detail and has been logically expressed in Equation 36. As described above, the "and" network 540 passes a signal to indicate that the information in the remaining positions in the channel 150 for the block undergoing computation represents the value of Y.

Signal indications representing ΔY are combined in each position with the indications representing Y. A positive ΔY increment representing a value of +1 is represented by an indication of "1" in the position of least significance and indications of "0" in the subsequent positions. A negative ΔY increment representing a value of "−1" is represented by an indication of "1" in the position of least significance as well as indications of "1" in all of the following positions. As may be seen, the triggering of the flip-flop 538 to an indication of "1" in the position of least significance is consistent for both positive and negative ΔY increments. For this reason, a relatively high voltage is produced on the left output terminal of the flip-flop 538 at the first information position for Y. This voltage is produced by the passage of the "start" pulse through the "and" network 540 to the flip-flop. The high voltage on the left output terminal of the flip-flop 538 represents a binary indication of "1" for ΔY in the last significant position. The carry flip-flop 538 is triggered to a "true" state in accordance with the logical equation $$b_3=Y_p\overline{S}_1P_{2/17}T \qquad (38)$$

where all of the terms have previously been defined.

Since only one ΔY increment is being added each time to a value of Y, two representative examples will be given. One represents the addition of a +ΔY increment to a value of Y and the other represents the addition of a −ΔY increment to Y. As the first example, a positive ΔY increment may be added to binary indications of 101110011 (representing a decimal value of "371") where the least significant binary digit is at the right. This addition is represented below as

```
 101110011
 000000001
 ---------
 101110100
```

As will be seen, the addition of a +ΔY increment causes the indications representing Y for each position to be inverted until after the first 0 in a position for Y is obtained. In the above example, the indications representing Y are inverted until the fourth position. Thereafter the value of Y in each position remains the same as before the addition of the positive Δy increment. The above rules may be seen to apply for other examples.

It will be seen from the above that the carry flip-flop 538 should indicate a carry for the addition of a positive ΔY increment until after the first indication of "0" in a position for Y is obtained. At that time, no further carries from one position to the next should be provided by the flip-flop 538 so that the value of Y in subsequent positions can be copied without change. The operation of the flip-flop 538 in indicating a carry until after the first indication of "0" in a pulse position for Y is controlled by the "and" network 554 in FIGURE 10. This network receives a signal from the left output terminal of the flip-flop 494 to indicate that a positive ΔY increment has occurred. The "and" network 554 also receives a voltage from the right output terminal of the flip-flop 450 to represent indications of "0" in the different positions for Y.

Upon the simultaneous introduction of high voltages to the "and" network 554 from the flip-flops 450 and 494, a signal passes through the "and" network 554 and the "or" network 558. This signal is synchronized in a clock cycle by the operation of the "and" network 560 and is introduced to the right input terminal of the flip-flop 538 to trigger the flip-flop. When the flip-flop 538 is triggered, a relatively high voltage is produced on the right output terminal of the flip-flop to indicate that no further carries from one position to the next will be produced. The operation of the stages 554, 558 and 560 in introducing triggering signals to the flip-flops 538 can be logically expressed as $$\overline{b}_3=S_1B_2\overline{Y}T \qquad (39)$$

Where:

$\overline{b}_3$=the introduction of a triggering signal to the right input terminal of the flip-flop 538;

$\overline{Y}$=a relatively high voltage on the right output terminal of the flip-flop 450; and the other terms have previously been defined.

As will be seen from the above example, representing the addition of a +ΔY increment, the indications of Y are inverted as long as a carry is being obtained from one position to the next. For example, an indication of "1" in a position for Y becomes inverted to a value of "0" in the position, and an indication of "0" in a position for Y becomes inverted to an indication of "1" in the position. This is obtained in part from the operation of the "and" network 574 and the "or" network 579 in FIGURE 11 and in part from the operation of the "and" network 572 and the "or" network 595.

The "and" network 574 passes a signal representing an indication of "0" in a position for Y when a carry is being indicated by the flip-flop 538. This signal passes through the "or" network 579 to the "and" network 581. The "and" network 581 synchronizes the signal at an optimum time in the clock cycle and introduces the signal to the cathode follower 580. The cathode follower then produces a signal representing an indication of "1" for the position. An operation of the "and" network 574, the "or" network 579 and the "and" network 581 in converting indications of "0" to indications of "1" can be expressed as $$y_N=\overline{Y}B_3T \qquad (40)$$

Where:

$y_N$=the introduction of a signal to the cathode follower 580 to represent an indication of "1" in the new value of Y for a position; and the other terms have previously been defined.

In like manner, the "and" network 572 passes a signal when relatively high voltages are simultaneously produced on the left output terminals of the flip-flops 450 and 538. The "and" network passes a signal to represent that an indication of "1" for a position is being inverted to an indication of "0" because of the introduction of a carry from the flip-flop 538. Each signal from the "and" network 572 passes through the "or" network 595 to the "and" network 597, which synchronizes the signal at an optimum time in the clock cycle. The signal then passes through the cathode follower 594 to represent an indication of "0" for a position. The operation of the "and" network 572, the "or" network 595 and the "and" network 597 in inverting indications of "1" to indications of "0" can be logically expressed as $$\overline{Y}_N=YB_3T \qquad (41)$$

Where:

$\overline{Y}_N$=the introduction of a signal to the cathode follower 594 to represent an indication of "0" in the new value of Y for a position;

Y=a relatively high voltage on the left output terminal of the flip-flop 450 to represent an indication of "1" in the previous value of Y for the position, and the other terms have previously been defined.

It has been described above that the carry flip-flop 538 is turned off when inversion is no longer required. For the addition of a positive ΔY increment, this occurs when the first indication of "0" in a position for Y has been presented. Thereafter, the indications of "y" for each position in the block controlling computation are recirculated without change. The recirculation occurs because of the operation of the "and" networks 570 and 576 in FIGURE 11. The "and" network 570 receives indications of "1" in the positions for Y and introduces these signals through the "or" network 579 to the "and" network 581. The signals are synchronized at optimum times in the clock cycles and are introduced to the cathode follower 580. The "and" network 570, the "or" network 579 and the "and" network 581 pass signals in accordance with the logical expression:

$$Y_N=Y\overline{B}_3T \qquad (42\text{ and }43)$$

Where:

$\overline{B}_3$=a relatively high voltage on the right output terminal of the flip-flop 538; and the other terms have previously been defined.

Similarly, the "and" network 576 receives indications of "0" in the positions for Y and passes these indications through the "or" network 595 to the "and" network 597. The "and" network synchronizes these signals and introduces them to the cathode follower 594. The logical equation controlling the passage of signals through the "and" network 576, the "or" network 595 and the "and" network 597 is:

$$\overline{Y}_N=\overline{Y}\overline{B}_3T \qquad (44)$$

where all of the terms have previously been defined.

Just as a positive ΔY increment is represented by an indication of "1" in the position of least significance and an indication of "0" in every succeeding position, a negative ΔY increment is represented by an indication "1" in each position. This indication of "1" in each position is added to the indication of Y in the position. As a particular example, a negative ΔY increment may be added to a value of Y as follows, the least significant digit being at the right:

101011000
111111111
---------
101010111

As will be seen from the above example, the indication of Y in each position is inverted until the first indication of "1" in a position for Y. Thereafter, the indication of Y in each position is coupled without change to obtain the new value of Y.

It will be seen from the above example that no carry is actually obtained in certain of the first positions where the value of Y is being inverted. This may be seen from the first three positions in the above example. In order to obtain the inversion in the value of Y, however, the carry flip-flop 538 is initially triggered into its true state by the operation of the "and" network 540 in FIGURE 10. The operation of the "and" network 540 has been described above and expressed logically in Equation 38. The carry flip-flop then remains in its true state until the inversion in the value of Y is no longer required. During the time that the carry flip-flop remains in its true state, indications of "0" for Y pass through the "and" network 574 to the cathode follower 580, which provides indications of "1." This inversion is obtained in accordance with logical Equation 40. Similarly, the "and" network 576 passes indications of "1" to the cathode follower 594 for inversion to indications of "0." This is in accordance with logical Equation 41.

When inversion is no longer required, the flip-flop 538 is triggered into its false state by the operation of the "and" network 556 in FIGURE 10. The "and" network 556 receives the voltages on the left output terminal of the flip-flop 450 and the right output terminal of the flip-flop 494. The simultaneous occurrence of such high voltages represents the first indication of "1" in a position for Y when the ΔY increment is negative. The signal from the "and" network 556 passes through the "or" network 558 to the "and" network 560. The "and" network 560 passes this signal only when indications representing the value of Y are being presented in the channel 150 since the "and" network 560 is connected to the left output terminal of the flip-flop 446. The signals from the "and" network 560 trigger the flip-flop 538 to produce a relatively high voltage on the right output terminal of the flip-flop. The operation of the "and" network 556, the "or" network 558 and the "and" network 560 in passing triggering signals to the flip-flop 538 may be logically expressed as $$\overline{b}_3=S_1\overline{B}_2YT \qquad (45)$$

where all of the terms have previously been defined.

Since the carry flip-flop 538 remains in its true state until the inversion in the indications of Y is no longer required, the cathode followers 580 (FIGURE 11) and 594 operate for negative ΔY increments in a manner similar to that described above for positive Δy increments. During the time that inversion is being obtained for negative Δy increments, the "and" network 574 inverts indications of "0" to indications of "1" for introduction to the cathode follower 580. Similarly, the "and" network 572 inverts indications of "1" to indications of "0" for introduction to the cathode follower 594. When inversion is no longer required for negative Δy increments, indications of "1" pass through the "and" network 570 to the cathode follower 580. Similarly, indications of "0" pass through the "and" network 576 to the cathode follower 594. The operation of the "and" networks 574, 572, 570 and 576 has been logically expressed in Equations 40, 41, 43 and 44.

In order to make certain that the carry flip-flop 538 in FIGURE 10 is prepared at the end of each operation for proper functioning at the beginning of the next operation, the "and" network 552 is included to control the operation of the flip-flop. The "and" network 552 receives voltages from the right output terminal of the flip-flop 390. As previously described, a relatively high voltage on the right output terminal of the flip-flop 390 indicates a single block or the second half of a double block when the two blocks perform a single operation. The "and" network 552 is also connected to the "and" network 208, which produces a relatively high voltage at position 17 for each block.

The signals from the "and" network 552 pass through the "or" network 558 to the "and" network 560. The "and" network 560 in turn passes the signals when a relatively high voltage is produced on the left output terminal of the flip-flop 446 to show that the signals in the channel 150 represent indications of Y. The signals from the "and" network 560 trigger the flip-flop 538 to produce a relatively high voltage on the right output terminal of the flip-flop. The operation of the "and" network 552, the "or" network 558 and the "and" network 560 can be logically expressed as:

$$\overline{b}_3=\overline{U}_5P_{17}S_1T \qquad (46)$$

where all of the terms have previously been defined.

The signals produced in the cathode followers 580 and 594 in FIGURE 11 represent the new value of Y for each block. These signals are recorded in the channel 150 so that they can be used in the next cycle of computation. The signals in the cathode follower 580 are recorded as indications of "1" in accordance with the operation of the "and" network 1334 in FIGURE 26. The "and" network 1334 receives the signals from the cathode follower 580 and from the left output terminal of the flip-flop 446. Signals are introduced to the "and" network 1334 from the flip-flop 446 so that the new value of Y will be recorded in the channel 150 for a block only during the positions after the "start" pulse. Signals are also introduced to the "and" network 1334 from the cathode follower 1340 to indicate that computation is proceeding.

The signals from the "and" network 1334 pass through the "or" network 1346 to the "and" network 1348. The "and" network 1348 synchronizes these signals at an optimum time in the clock cycles because of the introduction of a voltage from the left output terminal of the flip-flop 164. The signals then pass through the "and" network 1348 to the flip-flop 1332. These signals trigger the flip-flop 1332 and produce a relatively high voltage on the left output terminal of the flip-flop. The signals on the left output terminal of the flip-flop 1332 are introduced to the coil 1333 so that the coil may record the information in the channel 150.

The operation of the stages 1334, 1346 and 1348 in passing signals to the flip-flop 1332 can be logically expressed as:

$$_0Y=\alpha Y_n S_1 \overline{G}_3 T \quad (47)$$

Where:

$_0Y$=the introduction of a triggering signal to the left input terminal of the flip-flop 1332;

$Y_n$=a relatively high voltage from the cathode follower 580;

$S_1$=a relatively high voltage on the left output terminal of the flip-flop 466; and $\overline{G}_3$=a relatively high voltage on the right output terminal of the flip-flop 1342.

Figure 26:
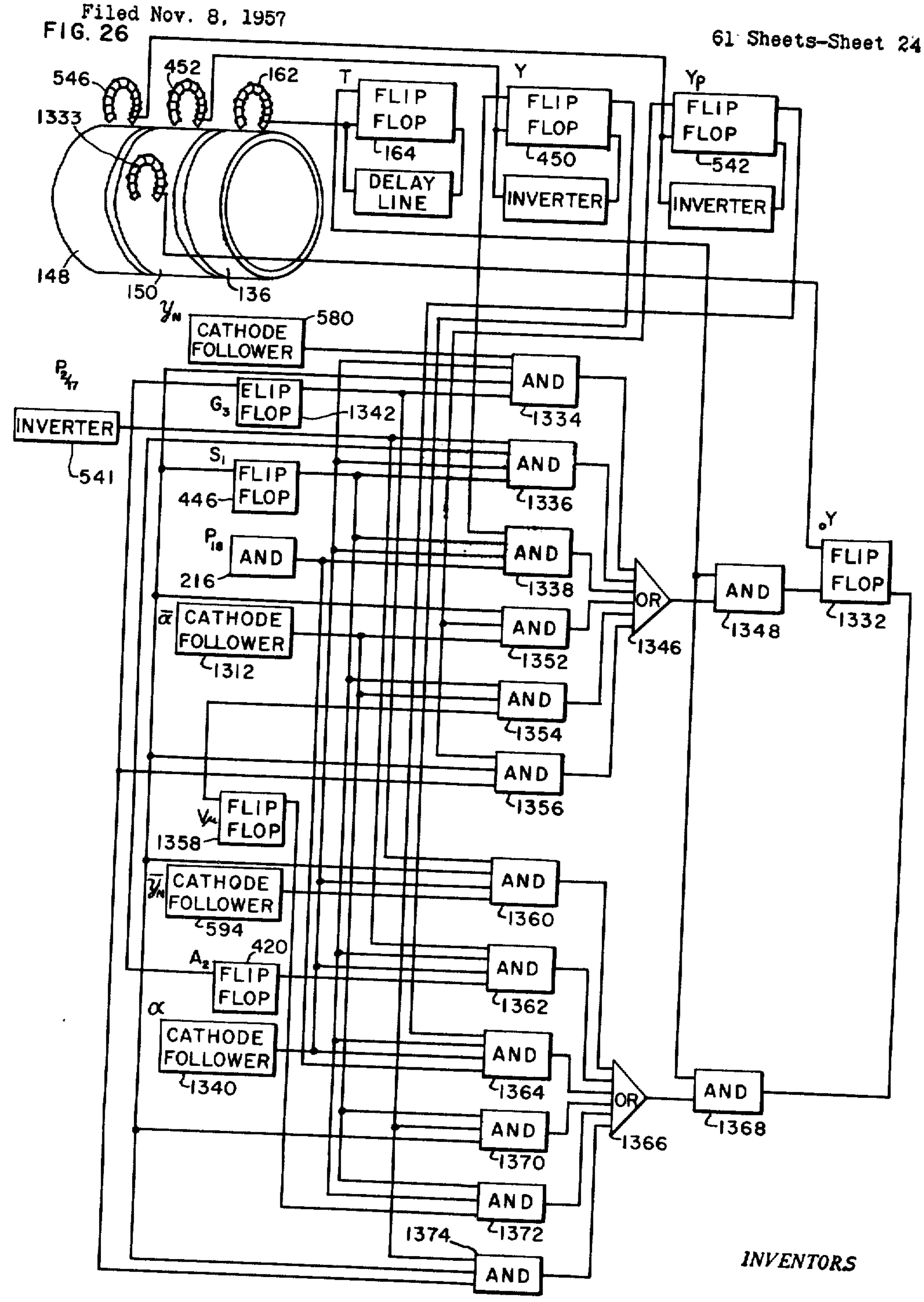

Just as the signals from the cathode follower 580 pass through the "and" network 1334 in FIGURE 26, the signals from the cathode follower 594 pass through the "and" network 1360. The signals passing through the "and" network 1360 are in turn introduced through the "or" network 1366 to the "and" network 1368, which synchronizes the signals at an optimum time in the clock cycles. The signals from the "and" network 1368 then pass to the flip-flop 1332 to trigger the flip-flop. When the flip-flop 1332 is triggered, a relatively high voltage is produced on the right output terminal of the flip-flop and a relatively low voltage is produced on the left output terminal of the flip-flop.

The signals of low amplitude on the left output terminal of the flip-flop 1332 pass to the coil 1333 for recordation in the channel 150. These signals represent indications of "0" in the positions of "Y" for a block. The logical equation representing the operation of the "and" network 1360, the "or" network 1366 and the "and" network 1368 is $$_0\overline{Y}=\alpha \overline{Y}_n S_1 \overline{G}_3 T \quad (48)$$

Where:

$_0\overline{Y}$=the introduction of a triggering signal to the right input terminal of the flip-flop 1332;

$\overline{Y}_n$=a signal from the cathode follower 594; and the other terms have previously been described.

*The Combination of YΔX and R*

As previously described, the area under a curve $y=f(x)$ can be obtained by producing ΔX increments and combining these increments with the value of Y to obtain successive YΔX increments. These successive YΔX increments are then combined to obtain the area under the curve represented by $y=f(x)$. Since the value of Y for each block is retained in the appropriate positions in the channel 150 for the block, these indications are utilized in conjunction with the ΔX indications in the flip-flop 420 to obtain the YΔX increments. A typical YΔX increment is illustrated at 1600 in FIGURE 34.

The YΔX increment obtained for each block in a cycle of computation is combined with the cumulative value of the previous YΔX increments for the block undergoing computation. The combination is schematically represented as being obtained by the adder 1760 in FIGURE 40, but actually the combination is obtained by the operation of a plurality of stages. The operation of these stages will be described in the subsequent paragraphs.

It will be seen that each YΔX increment in FIGURE 34 approximates the area under the curve $y=f(x)$ for the ΔX increment, but does not actually equal this area. The approximation can be made relatively accurate by decreasing the value of each ΔX increment. The approximation can be further enhanced in accuracy by providing a truncation correction for each YΔX increment. This truncation correction is obtained by approximating the value of Y at an intermediate position in each ΔX increment. The intermediate value of Y is approximated by determining the value of Y at the beginning and at the end of each ΔX increment and by producing a value half way between those at the beginning and end of the ΔX increment. In this way, a correction represented by a cross-hatched area 1602 in FIGURE 34 is combined with each YΔX increment to produce an area closely approximating the area under the curve $y=f(x)$.

Since each block has only one ΔX increment every time that the block is presented for computation, the true correction in the value of Y for the block is represented by ½ΔY. When both the ΔX increment and the ΔY increment are positive, the YΔX increment can be represented by $$\left[\left(Y+\frac{2^{-n}}{2}\right)(\Delta X)\right]$$

where there are $n$ positions in the channel 150 to represent the value of Y in digital form. The corrective value represented by $$\frac{2^{-n}}{2}$$

will be discussed at a subsequent time. The value of YΔX for each position is obtained by the logical equation $$y=S_1 A_2 B_2 Y \quad (49)$$

Where:

$y$=an indication of "1" in a particular position for a YΔX increment;

$A_2$=a relatively high voltage on the left output terminal of the flip-flop 420 to indicate a positive ΔY increment;

$B_2$=a relatively high voltage on the left output terminal of the flip-flop 494 to indicate a positive ΔY increment, $Y$=a relatively high voltage for the dependent quantity Y in the particular position in the channel 150; and $S_1$=a relatively high voltage on the left output terminal of the flip-flop 446.

The "and" network 590, the "or" network 584 and the "and" network 586 in FIGURE 11 operate in accordance with the logical equation given above to pass signals through the "or" network 584 to the "and" network 586. Since the "and" network 586 is connected to the left output terminal of the flip-flop 446, it passes signals only in the positions representing indications of Y in the channel 150. The signals from the "and" nework 586 pass through the "or" network 598 to the "and" network 607. The "and" network 607 synchronizes the signals at optimum times in the clock cycles and introduces the signals to the cathode follower 436 for passage through the cathode follower.

Similarly, the "and" network 620 passes the signals in the channel 150 when the ΔX and ΔY increments are both positive for the block undergoing computation and the indications of Y are "0." The "and" network 620 operates at these times since it receives the voltages from the left output terminals of the flip-flops 420 and 494. The signals from the "and" network 620 pass through the "or" network 616 to the "and" network 622. The "and" network 622 passes signals only at positions after the "start" pulse for each block. The signals then pass through the "or" network 626 to the "and" network 627. The "and" network 627 synchronizes the signals at an optimum time in the clock cycle and passes the signals through the "or" network 626 to the cathode follower 462. The stages 620, 616, 622 and 626 operate in accordance with the logical equation:

$$\bar{y}=S_1A_2B_2\bar{Y} \qquad (50)$$

Where:

$\bar{y}$=a signal passing to the cathode follower 462 to represent an indication of "0" for a pulse position, and the other terms have previously been defined.

Sometimes the ΔX increment may be positive for a block and the ΔY increment for the block may be negative. At such times, the value of Y should be corrected by the process of truncation so that the corrected value of Y is less than the value of Y from the channel 150. This correction is obtained by subtracting ½ΔY from the value of Y in the channel 150. This is equivalent to adding ½ΔY to the new value of Y which is recorded in the channel 150 during the particular cycle of computation. The reason for this is that the new value of Y is less by one integer than the old value of Y because of the subtraction of a ΔY increment from the old value of Y. In other words $$Y-\tfrac{1}{2}2^{-n}=Y_n+\tfrac{1}{2}2^{-n}$$

The value of $y$ for a positive ΔX increment and a negative ΔY increment can be represented by $$y=S_1A_2\bar{B}_2Y_n \qquad (51)$$

This logical equation represents in part the operation of the "and" network 582 since the "and" network receives input signals from the cathode follower 580, the left output terminal of the flip-flop 420 and the right output terminal of the flip-flop 494. The signals from the "and" network 582 pass through the "or" network 584, the "and" network 586, the "or" network 598 and the "and" network 607 to the cathode follower 436.

In like manner, the "and" network 614 passes indications of "0" in the channel 150 for a block when the ΔX increment is positive and the ΔY increment is negative. The signals from the "and" network 614 pass through the "or" network 616, the "and" network 622, the "or" network 626 and the "and" network 627 to the cathode follower 462. The logical equation controlling the operation of the stages 614, 616, 622 and 626 is $\bar{y}=S_1\bar{Y}_nA_2\bar{B}_2$, where all of the terms have previously been defined.

At certain times, the ΔX increment for a block may be negative and the ΔY increment may be positive. At such times, the corrected YΔX increment may be represented by $$\left(Y+\frac{2^{-n}}{2}\right)(-\Delta X)=\overline{\left(Y+\frac{2^{-n}}{2}\right)}(\Delta X)$$

In order to complement the value of Y, the indication for Y in each position is inverted and an indication of "1" is added in the least significant position. Because of this $$\overline{\left(Y+\frac{2^{-n}}{2}\right)}=\left(\bar{Y}-\frac{2^{-n}}{2}\right)+2^{-n}=\bar{Y}+\frac{2^{-n}}{2}$$

Since the correction of $$\frac{2^{-n}}{2}$$

will be described in detail later, $$y=\bar{A}_2B_2\bar{Y}S_1 \qquad (52)$$

when the ΔX increment for a block is negative and the ΔY increment for the block is positive. This logical equation controls the operation of the "and" network 588 since the "and" network receives the voltages on the right output terminals of the flip-flops 420 and 450 and on the left output terminal of the flip-flop 494. The signals from the "and" network 588 in FIGURE 11 pass through the "or" network 584, the "and" network 586, the "or" network 598 and the "and" network 607 to the cathode follower 436.

The "and" network 618 passes signals for a block when the ΔX increment for the block is negative and the ΔY increment for the block is positive. The "and" network 618 passes signals at this time because of its connections to the right input terminal of the flip-flop 420 and the left input terminal of the flip-flop 494. The "and" network 618 also receives the indications of "1" on the left output terminal of the flip-flop 450 and passes the signals through the "or" network 616, the "and" network 622, the "or" network 626 and the "and" network 627 to the cathode follower 462. The operation of the stages 618, 616, 622 and 626 can be logically expressed as:

$$\bar{y}=S_1\bar{A}_2B_2Y \qquad (52a)$$

where all of the terms have previously been defined.

It may sometimes happen that the ΔX increment and the ΔY increment for a block are both negative. When this occurs, the corrected YΔX increment for the block is equal to $\left(Y-\frac{2^{-n}}{2}\right)(-\Delta X)=\overline{\left(Y-\frac{2^{-n}}{2}\right)}(\Delta X)$. Since the complementary value of $Y$ is $\bar{Y}+\frac{2}{2}$, as described above, $$\overline{\left(Y-\frac{2^{-n}}{2}\right)}=(\bar{Y}+2^{-n})+\frac{2^{-n}}{2}=\bar{Y}+\frac{3}{2}2^{-n})$$

But $Y_n=Y-2^{-n}$, since ΔY is being subtracted from Y. Complementing $$\bar{Y}_n+2^{-n}=\overline{(Y-2^{-n})}+2^{-n}$$

On a simplified basis, this can be represented as $\bar{Y}_n=\bar{Y}+2^{-n}$. Substituting, $$\overline{(Y-2^{-n})}=\bar{Y}+\frac{3}{2}2^{-n}=\bar{Y}_n+\frac{2^{-n}}{2}$$

The compensation provided by $$\frac{2^{-n}}{2}$$

will be described in detail hereinafter. On the basis of the above, $$y=S_1\bar{A}_2\bar{B}_2\bar{Y}_n \qquad (53)$$

when the ΔX and ΔY increments are negative.

The "and" network 592 in FIGURE 11 operates in accordance with this logical expression and causes signals to pass through the "or" network 584, the "and" network 586, the "or" network 598 and the "and" network 607 to the cathode follower 436.

In like manner, the "and" network 612 becomes operative when the ΔX increment and ΔY increment for a block are both negative. The "and" network 612 becomes operative at this time because of its connection to the right output terminals of the flip-flops 420 and 494. At such times, the "and" network 612 receives the signals representing $Y_n$ from the cathode follower 580 and passes the signals through the "or" network 616, the "and" network 622, the "or" network 626 and the "and" network 627 to the cathode follower 462. The logical equation controlling the operation of the stages 612, 616, 622, 626 and 627 is $$\bar{y}=S_1\bar{A}_2\bar{B}_2Y_n \qquad (53a)$$

The YΔX increments obtained for each block are combined to form a differential combination which may be designated as "R." Thus $R=\Sigma Y\Delta X$. Since the symbol "y" represents the YΔX increment obtained for a block upon the presentation of the block for computation, $y$ is added to R for each block in each cycle of computation to obtain a new value of R.

The value of R for each block is stored in the appropriate positions in the channel 152 for the block. The indications representing the value of R for the block are stored in the channel 152 in the positions after the start pulse. When a block is being used for normal integration, the indications representing the differential combination "R" pass through the "and" networks 652 and 642 in FIGURE 12 without any change. The indications of "1" pass through the "and" network 652 since the carry flip-flop 458 is in its "off" conditions represented by a high voltage on the right output terminal of the flip-flop. The functions of the carry flip-flop 458 will be described in detail subsequently.

The signals from the "and" network 652 pass through the "or" network 656 to the "and" network 657. The "and" network 657 synchronizes these signals at optimum times in the clock cycles and introduces the signals to the cathode follower 659. The operation of the "and" network 652, the "or" network 656 and the "and" network 657 in passing indications of "1" in the positions for R can be logically expressed as:

$$R=R\overline{F}_3T \qquad (54)$$

Where:

$R$=a signal introduced to the cathode follower 659;

$R$=a relatively high voltage on the left output terminal of the flip-flop 646 to represent an indication of "1" in the channel 152 for a position; and $\overline{F}_3$=a relatively high voltage on the right output terminal of the flip-flop 458.

In like manner, the indication of "0" for R in the channel 152 causes relatively high voltages to be produced on the right output terminal of the flip-flop 646. These voltages pass through the "and" network 642 because of the relatively high voltage on the right output terminal of the flip-flop 458. The signals from the "and" network 642 pass through the "or" network 636 to the "and" network 639, which synchronizes the signals at optimum times in the clock cycles. The signals then pass to the cathode follower 637. The logical equation expressing the operation of the stages 642, 636, 639 and 637 is:

$$\overline{R}=\overline{R}\overline{F}_3T \qquad (55)$$

Where:

$\overline{R}$=the introduction of a signal to the flip-flop 464;

$\overline{R}$=a relatively high voltage on the right output terminal of the flip-flop 646; and the other terms have previously been defined.

It has previously been described that the value of Y for a block is adjusted in each cycle of computation by a value substantially equal to ½ΔY. By utilizing indications of Y, $\overline{Y}$, $Y_n$ and $\overline{Y}_n$ at particular times as described above to obtain the YΔX increments, the truncation correction in the value of Y can be adjusted always to a value of +½ΔY for a block, even though the ΔY increment for the block is negative. For purposes of convenience, this value of +½ΔY is added to the value of R in each cycle of computation.

Since the truncation correction in the value of Y is represented by +½ΔY, the correction must be made at a position of less digital importance than the position of least significance indicating the value of R. Because of the binary code, this correction must be made at the position of the "start" pulse, which is the position just before the position of least significance in the value of R. The correction is provided by the operation of the "and" networks 461 and 441 in FIGURE 12.

As previously described, the flip-flop 446 is triggered by the start pulse in the channel 148. Since the flip-flop is triggered by the start pulse, a relatively high voltage is not produced on the left output terminal of the flip-flop until the end of the start position. For this reason, the flip-flop 446 has a relatively high voltage on its right output terminal at the position of the start pulse. This high voltage is introduced to the "and" network 461 and 441 in FIGURE 12 to prepare the "and" networks for operation The "and" networks 461 and 441 can become operative only in positions 1 to 17, inclusive, for each block because of their connection to the inverter 444. The "and" network 461 also receives signals from the cathode follower 637 which provides indications of "0" in the positions in the channel 152 for R. The "and" network 461 passes these signals through the "or" network 664 to the "and" network 667. The "and" network 667 synchronizes the signals at optimum times in the clock cycles and introduces these signals to the cathode follower 437. Since the cathode follower 437 provides indications of "1," the indications passing through the "and" network 461 to the cathode follower 437 become inverted. By inverting an indication of "0" at the start position to an indication of "1," a value of ½ΔY is added to the value of "R." The "and" network 461, the "or" network 664, the "and" network 667 and the cathode follower 437 operate in accordance with the logical equation:

$$R_1=\overline{R}\overline{S}_1P_{1/17}T \qquad (56)$$

Where:

$R_1$=the introduction of a signal to the cathode follower 437;

$\overline{R}$=a signal from the cathode follower 637;

$\overline{S}_1$=a relatively high voltage on the right output terminal of the flip-flop 446; and $P_{1/17}$=a signal from the inverter 444.

The "and" network 441 receives indications of "1" as represented by signals from the cathode follower 659. At positions before the start pulse and including the start pulse, the "and" network 441 introduces the signals from the cathode follower 659 through the "or" network 665 to the "and" network 669. The "and" network 669 synchronizes these signals at optimum times in the clock cycles and introduces the signals to the cathode follower 464. Since the cathode follower 464 provides indications of "0," the indications of "1" from the cathode follower 659 become inverted. Such inversion is proper when an indication of "1" representing ½ΔY at the start position is added to an indication of "1" for "R" at this position. The addition of two indications of "1" at the start position produces a value of "2," which is equivalent in binary form to an indication of "0" for the position and a carry of "1" to the next position. The operation of the stages 441, 665, 669 and 464 in inverting the indications of "1" to indications of "0" at the start position can be logically expressed as:

$$\overline{R}_1=R\overline{S}_1P_{1/17}T \qquad (57)$$

Where:

$\overline{R}_1$=the introduction of a signal to the cathode follower 464;

$R$=an output signal from the cathode follower 659; and the other terms have previously been defined.

In the previous paragraph, it has been shown that a carry is obtained from the start position to the next position when a truncation correction of +½ΔY is added to an indication of "1" for "R" in the start position. This carry is obtained by the operation of the flip-flop 432 in FIGURE 8. The carry is obtained by the passage of a signal through the "and" network 441, the operation of which has previousluy been described in detail. The signal from the "and" network 441 passes through the "or" network 440 to the "and" network 439. The "and" network 439 synchronizes these signals at optimum times in the clock cycles and introduces the signals to the flip-flop 432. These signals trigger the flip-flop 432 to produce a relatively high voltage on the left output terminal of the flip-flop. The triggering of the flip-flop 432 by the passage of signals through the stages 441, 440 and 439 can be logically expressed as:

$$a_3=R\overline{S}_1P_{1/17}T \qquad (58)$$

Where:

$a_3$=the introduction of a triggering signal to the left input terminal of the flip-flop 432; and the other terms have previously been defined.

The term $P_{2/17}$ could replace $P_{1/17}$ to eliminate the possibility of an undesirable signal at $P_1$ time.

When the indication of R at the start position is "0," the addition of a truncation correction represented by an indication of "1" causes the indication of R to change to "1" without any carry to the next position. Since no carry is obtained, a relatively high voltage is produced on the right output terminal of the flip-flop 432. This voltage is produced by the passage of a signal through the "and" network 461, the operation of the "and" network having been previously described in detail. The signals from the "and" network 461 pass through the "or" network 466 to the "and" network 467. The signals introduced to the "and" network 467 are synchronized in the clock cycles and introduced to the flip-flop 432. These signals trigger the flip-flop 432 to produce a relatively high voltage on the right output terminal of the flip-flop. The passage of signals through the "and" network 461, the "or" network 466 and the "and" network 467 can be logically expressed as:

$$\bar{a}_3=\bar{R}\bar{S}_1P_{1/17}T \qquad (59)$$

Where:

$\bar{a}_3$=the introduction of a triggering signal to the right input terminal of the flip-flop 432; and the other terms have previously been defined.

The term $P_{2/17}$ could replace $P_{1/17}$ to eliminate the possibility of an undesirable signal at $P_1$ time.

It has been previously described that each YΔX increment for a block is combined with the value of R for the block to obtain a new value of R every time that the block is presented for computation. This combination is obtained by adding the indications of Y representing the YΔX increment to the indications of R. The new indications of R for each position are designated as $R_1$ and are obtained for each position by combining the indications of YR and the carry resulting from the addition from the previous position. This carry is indicated in the flip-flop 432 and is designated as $A_3$.

It will be seen from the previous paragraph that an indication of "1" in the value of $R_1$ for a position may be obtained from various combinations. In one combination, an indication of "1" for $R_1$ in a position is obtained when the indications of Y and $A_3$ are "0" and the indications of R is "1." The "and" network 660 in FIGURE 12 passes a signal for such a condition. Similarly, an indication of "1" is obtained in a position for R when the indications of $A_3$ and R are "0" for the position and the indications of Y is "1." For such a condition, the "and" network 634 passes a signal.

A signal passes through the "and" network 638 to represent an indication of "1" for $R_1$ in a position upon the simultaneous occurrence of indications of "0" for Y and R and an indication of "1" for $A_3$. Indications of "1" for Y, R, and $A_3$ are introduced to the "and" network 658. Since the addition of three indications of "1" is equivalent in binary form to a resultant indication of "1" and a carry of "1" to the next position, the "and" network 658 passes a signal representing an indication of "1" for the position undergoing computation.

The signals from the "and" networks 634, 638, 658, and 660 pass through the "or" 'network 664 to the "and" network 667. These signals are synchronized at optimum times in the clock cycles by the operation of the "and" network 667. The signals are then introduced to the cathode follower 437. The stages 634, 638, 658, 660, 664, 667 and 437 operate in accordance with the logical equation:

$$R_1=T(\overline{Y}\overline{A}_3R+Y\overline{A}_3\overline{R}+Y\overline{A}_3\overline{R}+YA_3R) \qquad (60)$$

Where:

$R_1$=the introduction of a signal to the cathode follower 437;

$A_3$=a relatively high voltage on the left output terminal of the flip-flop 432;

$\bar{A}_3$=a relatively high voltage on the right output terminal of the flip-flop 432; and the other terms have previously been defined.

Just as the cathode follower 437 receives signals representing indications of "1" for $R_1$ in the different positions, the cathode follower 464 receives signals representing indications of "0." For example, the "and" network 670 passes signals to the cathode follower 464 when indications of "0" are simultaneously introduced to the "and" network from the cathode followers 462 and 637 and from the right output terminal of the flip-flop 432. Such a simultaneous introduction of signals represent indications of "0" for Y, R, and $A_3$. The "and" network 670 passes a signal since the addition of three indications of "0" gives an output indication of "0."

A signal passes through the "and" network 666 upon the simultaneous introduction of signals from the cathode followers 436 and 659 and from the right output terminal of the flip-flop 432. Such a simultaneous introduction of signals represents indications of "1" for Y and R and indications of "0" for $A_3$. The addition of these indications gives a resultant indication of "2," which is equivalent to an indication of "0" for the position undergoing computation and a carry of "1" to the next position. In like manner, the "and" network 668 passes a signal when indications of "1" representing Y and $A_3$ are introduced to the network at the same time as indications of "0" representing R. Similarly, the "and" network 672 becomes activated in the pulse positions where indications of "1" for R and $A_3$ and indications of "0" for Y are simultaneously introduced to the network.

The signals from the "and" networks 666, 668, 670 and 672 are introduced through the "or" network 665 to the "and" network 669. The "and" network 669 synchronizes the signals at optimum times in the clock cycles and introduces the signals to the cathode follower 464. The operation of the stages 666, 668, 670, 672, 665, 669 and 464 can be expressed by the following logical equation:

$$\bar{R}_1=T(\overline{YA_3}\bar{R}+YA_3\bar{R}+\bar{Y}A_3R+Y\bar{A}_3R) \qquad (60a)$$

Where:

$\bar{R}_1$=the introduction of a signal to the cathode follower 464; and the other terms have previously been defined.

The indications of $R_1$ representing the new value of the differential combination R for each block are recorded in the channel 152 for subsequent use. The indications of "1" for $R_1$ pass through the "and" network 1392 in FIGURE 27. The indications for $R_1$ pass only during periods of actual computation because of the introduction of a signal to the "and" network 1392 from the cathode follower 1340. The operation of the cathode follower 1340 will be described in detail subsequently. The indications of "1" for $R_1$ pass through the "and" network 1392 only for "normal" integrators. The item "normal integration" will become more apparent subsequently when other types of integration are discussed. However, "normal" integrators can be considered as integrators which perform the relatively simple and straightforward function of combining $y\Delta x$ increments without any of the additional functions which will be described in detail subsequently. Signals pass through the "and" network 1392 only for blocks performing "normal" integration since the voltage on the left output terminal of the flip-flop 606 is introduced to the network.

The signals from the "and" network 1392 pass through the "or" network 1384 to the "and" network 1386. The "and" network 1386 synchronizes the signals at optimum times in the clock cycles and introduces the signals to the flip-flop 1388. These signals trigger the flip-flop 1388 to produce a relatively high voltage on the left output terminal of the flip-flop. This voltage is introduced to the coil 1410 which records the voltage as indications of "1" in the channel 152. The stages 1392, 1384, 1386 and 1388 operate to produce recordation of information in the channel 152 in accordance with the logical equation:

$$_0r=\alpha R_1 G_1 T \quad (61)$$

Where:

$_0r$=the introduction of a triggering signal to the left input terminal of the flip-flop 1388;

$\alpha$=a signal from the cathode follower 1340;

$G_1$=a relatively high voltage on the left output terminal of the flip-flop 606; and the other terms have previously been defined.

Just as the indications of "1" for $R_1$ pass through the "and" network 1392 in FIGURE 27, the indications of "0" representing $\overline{R}_1$ pass through the "and" network 1402. The signals are then introduced through the "or" network 1406 to the "and" network 1408. The signals are synchronized by the "and" network 1408 and are introduced to the right input terminal of the flip-flop 1388 to trigger the flip-flop. Such a triggering of the flip-flop 1388 causes a relatively high voltage to be produced on the right output terminal of the flip-flop and a relatively low voltage to be produced on the left output terminal of the flip-flop. The low voltage on the left output terminal of the flip-flop 1388 is introduced to the coil 1410 so that the coil will record an indication of "0" in the channel 152. The operation of the "and" network 1402, the "or" network 1406, the "and" network 1408 and the flip-flop 1388 in recording indications of "0" in the channel 152 can be logically expressed as:

$$_0\overline{r}=\alpha \overline{R}_1 G_1 T \quad (62)$$

Where:

$_0\overline{r}$=the introduction of a triggering signal to the right input terminal of the flip-flop 1388; and the other terms have previously been defined.

It has been previously disclosed that the flip-flop 432 in FIGURE 8 indicates the carry from one position to the next when the indications representing a YΔX increment are arithmetically combined with the indications representing R. The operation of the carry flip-flop 432 may be seen from the table shown in FIGURE 36. Several vertical columns are included in this table. The first three columns provide indications representing the possible different combinations for Y, R, and the carry $A_3$ for a particular position. These indications are combined to obtain a new indication for the position, as indicated by the fourth column represented by $R_1$. A carry is also obtained by the addition of the indications in the first three columns. The carry obtained for the next position is indicated in the fifth column in the table shown in FIGURE 36. This carry is utilized in the addition of the indications of Y and R in the next position.

It will thus be seen from the above description and from the table shown in FIGURE 36 that column 3 in the table represents the carry for one pulse position and column 5 represents the carry for the next pulse position. A comparison of the two tables indicates that the carry in the third column remains the same as the carry in the first column except for two situations.

Since the carry remains the same from one position to the next in most of the situations, there is no need to change the operation of the flip-flop in these situations. It is only necessary to change the operation of the flip-flop 432 in the situations where the carry changes from an indication of "0" in one position to an indication of "1" in the next position or from an indication of "1" in the first position to an indication of "0" in the next.

The carry changes from a "0" in a first position to a "1" in the second position only for one set of conditions. This set of conditions is represented by $YR\overline{A}_3$ and is indicated in the seventh vertical column in FIGURE 36 by an indication of "1" for $a_3$. The term "$\overline{A}_3$" is not needed in the above expression since the expression YR would insure that the flip-flop 432 would become triggered into its "true" condition representing $A_3$ if the flip-flop is not already in its "true" condition. Thus, $$a_3=YRP_{2/18}T \quad (63)$$

The term "$P_{2/18}$" is included so that the operation of each block will be distinct from the operation of the next block. The reason is that some of the operations for each block are concluded at position 1 of the next block. This will become more apparent from the subsequent discussion.

The "and" network 433 in FIGURE 8 operates substantially in accordance with the logic expressed in Equation 63. The "and" network 433 receives signals representing Y and R from the cathode followers 436 and 659. The "and" network 433 also receives signals from the inverter 438, which inverts the signals from the "and" network 222 to represent positions 2 to 18, inclusive, for each block. The signals from the "and" network 433 pass through the "or" network 440 to the "and" network 439 for synchronization at optimum times in the clock cycles. The signals then pass to the left input terminal of the flip-flop 432. These signals trigger the flip-flop 432 for the production of a relatively high voltage on the left output terminal of the flip-flop.

The $A_3$ flip-flop is triggered from an "on" state of operation to an "off" state of operation for only one set of conditions. This set of conditions is illustrated in the second vertical column of FIGURE 36 by an indication of "1" and could be represented by the logical equation:

$$a_3=\overline{Y}\overline{R}A_3T$$

The term $A_3$ is not necessary in the above equation for the same reasons that the term $\overline{A}_3$ is not necessary in Equation 63. The "and" network 459 in FIGURE 8 operates in accordance with the logic expressed in Equation 64 by receiving at its input terminals signals from the cathode followers 462 and 637. The "and" network 459 also receives the signals from the inverter 438, which provides indications of positions 2 to 18, inclusive, for each block in a manner similar to that described above. The signals from the "and" network 459 pass through the "or" network 466 to the "and" network 467 for synchronization at optimum times in the clock cycles. The signals then pass to the right input terminal of the flip-flop 432 to trigger the flip-flop to its "false" state of operation. When the flip-flop 432 is triggered by the signals from the "and" network 467, a relatively high voltage is produced on the right output terminal of the flip-flop 432 to indicate a lack of carry. The passage of signals from the "and" network 459 through the "or" network 466 to the "and" network 467 can be expressed by the following logical equation:

$$a_3=\overline{Y}\overline{R}P_{2/18}T \quad (64)$$

*Recording of Overflow Information in the Z Channel 138*

As the indications of Y are added to the indications of R in the channel 152, the indications of $R_1$ change. When both Y and R are positive, the indications of $R_1$ increase. However, the value of $R_1$ which can be recorded in digital form in the channel 152 for each block is limited, since there are at most only eighteen positions available for $R_1$ in the block. For this reason, the indications of $R_1$ sometimes overflow when positive values of Y are added to R. As described briefly above and as shown schematically in FIGURE 40, the overflow indications are passed by the Z gate 1762 in FIGURE 40 and are recorded in the channel 138 for subsequent use.

Overflows in the indications of $R_1$ for an addition of positive values of Y and R may be seen from a representative example. In the following example, a positive value of R is indicated on the top line and a positive value of Y is indicated on the second line. As will be seen, a positive value of Y is represented by an indication of "1" at position 17 for a block. The results of adding Y and R are indicated in the third line. The example is as follows:

```
      P18 P17    P23
R      0   1  0 1 1 1
Y          1  1 1 0 0
     ----------------
Ri     1 | 1  0 0 1 1
       <-'
```

As will be seen, the value obtained by the addition of the above values of Y and R is represented by a carry of "1" at position 18. This carry of "1" at position 18 represents a positive overflow in the indications of $R_i$ which are recorded in the channel 152.

The occurrence of an overflow in the value of $R_i$ at position 18 for a block may be further seen from the following discussion. Because of its limited number of positions, the value of $R_i$ recorded in the channel 152 for a block may be considered to have a certain capacity. For example, this capacity might be represented by a decimal value of "+800." The overflow occurs when the value of R exceeds "+800." For example, the value of R might change in one cycle of computation from a decimal value of "794" to a decimal value of "804." When the overflow occurs, the new value of R would be "+4" since this is the difference between "804" and the capacity of "800." When Y is subsequently added to R in subsequent cycles of computation, the indications of R would increase from "+4" until they again exceeded the capacity of "+800." At that time, another overflow would occur. In this way, the indications of R would fluctuate between a value of "0" and the capacity of "+800" and overflows would occur every time that the value of R exceeded "+800."

When an overflow in the indications of $R_i$ occurs in the channel 152 for a block, it is represented by a carry at position 18. This may be seen from the above example. The carry causes the flip-flop 432 in FIGURE 8 to be triggered into its true state at position 18 of the block in accordance with the logic expressed above in Equation 63. Since the flip-flop 432 is triggered to its "true" state at position 18 of the block, the "and" networks 1506 and 1500 in FIGURE 29 become activated for the passage of a signal. The "and" network 1506 becomes activated since it is connected to the left output terminal of the flip-flop 432. The "and" network 1506 also has the voltage on the right output terminal of the flip-flop 446 introduced to it. A relatively high voltage on the right output terminal of the flip-flop 446 at position 18 for a block indicates that the information relating to the dependent quantity Y has been completed in the channel 150 for the block.

The signals from the "and" network 1506 pass through the "or" network 1502 to the "and" network 1500. Since the "and" network 1500 is connected to the "and" network 222, only overflow indications from a block can pass through the "and" network 1500 at position "1" of the next block. These signals then pass through the "or" network 1478 to the "and" network 1480 for synchronization at optimum times in the clock cycles. The signals then pass to the left input terminal of the flip-flop 337. The signals pass to the flip-flop 337 at position 1 of the next block since the signals can pass through the stages 1506, 1502, 1500, 1478 and 1480 only upon the occurrence of the clock signal following the triggering of the flip-flop 432 into its true state.

The signals from the "and" network 1480 trigger the flip-flop 337 for the production of a relatively high voltage on the left output terminal of the flip-flop. When a relatively high voltage is produced on the left output terminal of the flip-flop 337, it is introduced to the coil 270, which is disposed in contiguous relationship to the channel 138. The introduction of this high voltage to the coil 270 causes an indication of "1" to be recorded in the channel 138 as an overflow indication in the value of $R_i$ for the previous block.

Signals pass through the stages 1506, 1502, 1500, 1478 and 1480 to the flip-flop 337 in accordance with the logical equation:

$$_0z=\alpha P_1A_3\bar{S}_1T \qquad (65)$$

Where:

$_0z$=the introduction of a triggering signal to the left input terminal of the flip-flop 337;

$P_1$=a signal from the "and" network 222;

$A_3$=a relatively high voltage on the left output terminal of the flip-flop 432; and $\bar{S}_1$=a relatively high voltage on the right output terminal of the flip-flop 446.

Since positive values of Y for blocks undergoing "normal" integration are represented by an indication of "1" at position 17, negative values of Y for blocks undergoing "normal" integration are represented by an indication of "0" at position 17. For negative numbers having high absolute magnitudes, indications of "0" are provided in the most significant pulse positions. For example, indications of "1" might be initially provided in such positions as positions 16, 15 and 14 for a block having 18 positions when a negative value of low absolute magnitude is being obtained. As the absolute value of a negative number increases, indications of "1" in the positions of most importance would change to indications of "0." This would cause the indications in positions 14, 15 and 16 to become "0" as the absolute magnitude of the negative value increased. In this way, the value of Y might be represented by indications of "0" for every pulse position when the absolute value of Y became quite large in the negative direction.

A typical example of an addition of R and a negative value of Y is given below. The value of R is indicated in binary form in the top line and the negative value of Y is indicated in binary form in the second line. The resultant addition is indicated in the third line. This example is as follows:

```
      P18     P17 P13
R      0    1 0 1 0 1
Y           0 0 1 1 1
     ----------------
Ri     0 |  1 1 1 0 0
       <-'
```

As will be seen, the carry at position 18 of the block undergoing computation is "0." This represents a negative overflow. This may be seen from the above description, which indicates that there is a tendency for negative numbers of increasing absolute magnitude to be represented by indications of "0" in the positions of most importance.

Negative overflows in the value of R for a block pass through the "and" network 1548 in FIGURE 30. The "and" network 1548 also receives signals from the right output terminal of the flip-flop 446 for the same reasons as described above in connection with the logic discussed in Equation 65. The signals from the "and" network 1548 pass through the "or" network 1544 to the "and" network 1542. Since the "and" network 1542 is connected to the "and" network 222, it passes negative overflow signals only at position 1 for each block. The signals from the "and" network 1542 are then introduced through the "or" network 1522 to the "and" network 1524 for synchronization at optimum times in the clock cycles. The signals from the "and" network 1524 trigger the flip-flop 337 for the production of a relatively high voltage on the right output terminal of the flip-flop and a relatively low voltage on the left output terminal of the flip-flop. The low voltage on the left output terminal of the flip-flop in turn causes an indication of "0" to be recorded in the channel 138 at position 1 of the block following the negative overflow.

The stages 1548, 1544, 1542, 1522 and 1524 operate in accordance with the logical equation:

$$_o\bar{z}=P_1\bar{A}_3\bar{S}_1T \qquad (66)$$

Where:

$_o\bar{z}$=the introduction of a triggering signal to the right input terminal of the flip-flop 337; and the other terms have previously been defined.

When the value of $y$ for a block is "0," the output indications representing R for the block should not change. In other words, a positive output in one cycle of computation should be offset by a negative output in the next cycle of computation so that the resultant output for the two cycles of computation will be "0." This may be seen by the addition of R=0 and $y$=0 for successive cycles of computation. A value of R=0 is represented by an indication of "0" in every pulse position. A value of $y$=0 is represented by an indication of "0" in every pulse position except for an indication of "1" in position 17, which is the sign position for $y$. In a first cycle of computation, the addition of R=0 and $y$=0 is as follows:

```
     P18
R    0   0 0 0 0 0
Y        1 0 0 0 0
    ---------------
Ri   0|  1 0 0 0 0
    <-'
```

Since there is no carry at position 18 of the block undergoing computation, a negative overflow is produced.

In the next cycle of computation, the value of R obtained in the previous cycle is added to $y$=0. This addition is as follows:

```
P18P17
0   1 0 0 0 0
    1 0 0 0 0
--------------
1|  0 0 0 0 0
<-'
```

In this addition, a carry is obtained at position 18 of the block undergoing computation to indicate a positive overflow. This positive overflow offsets the negative overflow obtained in the previous cycle of computation. As will be seen, indications representing R at the end of the second addition are the same as the indications representing R before the first addition. These indications are represented by "0" in every position. In subsequent cycles of computation, alternate overflows of "0" and "1" are obtained so that the resultant output from the block is "0."

For positive values of Y, the number of positive overflows should exceed the number of negative overflows. The excess of positive overflows over negative overflows is dependent upon the particular value of being added in successive blocks. For example, when decimal values of Y=+9 are added to an initial value of R=0, the following results are obtained:

```
R=0     0   0 0 0 0 0
Y=+9        1 1 0 0 1
           -----------
Ri      0|  1 1 0 0 1
       <-'
R=+9    0   1 1 0 0 1
Y=+9        1 1 0 0 1
           -----------
        1|  1 0 0 1 0
       <-'
        0   1 0 0 1 0
            1 1 0 0 1
           -----------
        1|  0 1 0 1 1
       <-'
        0   0 1 0 1 1
            1 1 0 0 1
           -----------
        1|  0 0 1 0 0
       <-'
        0   0 0 1 0 0
            1 1 0 0 1
           -----------
        0|  1 1 1 0 1
       <-'
        0   1 1 1 0 1
            1 1 0 0 1
           -----------
        1|  1 0 1 1 0
       <-'
```

As will be seen, in the first six cycles of computation four positive overflows and two negative overflows are obtained. An excess of positive overflows over negative overflows would be also obtained in subsequent cycles of computation.

It will be seen from the above examples that the indications at position 18 represent carries from position 17 to position 18. It will be further seen that the number of positive carries exceed the number of negative carries when indications representing a positive value of Y are added to R.

When the indications of Y represent negative values, the number of negative overflows should exceed the number of positive overflows. The excess of negative overflows over positive overflows for a block is dependent upon the particular values being added in successive cycles of computation for the block. For example, when negative values of Y=−7 are added to an initial value of R=0, the following results are obtained:

```
0   0  0 0 0 0 0
    0  1 1 0 0 1
   --------------
0|  0  1 1 0 0 1
<-'
0   0  1 1 0 0 1
    0  1 1 0 0 1
   --------------
0|  1  1 0 0 1 0
<-'
0   1  1 0 0 1 0
    0  1 1 0 0 1
   --------------
1|  0  0 1 0 1 1
<-'
0   0  0 1 0 1 1
    0  1 1 0 0 1
   --------------
0|  1  0 0 1 0 0
<-'
0   1  0 0 1 0 0
    0  1 1 0 0 1
   --------------
0|  1  1 1 1 0 1
<-'
0   1  1 1 1 0 1
    0  1 1 0 0 1
   --------------
0|  0  1 0 1 1 0
<-'
```

As will be seen from the above examples, the number of negative overflows exceed the number of positive overflows. The number of negative overflows will continue to exceed the number of positive overflows in subsequent cycles of computation.

The information relating to the overflow for a block is recorded in the channel 138 in accordance with the logic expressed in Equations 65 and 66. The information is produced at position 18 for each block and is recorded in the channel 138 at position 1 of the following block. In addition to the overflow information for each block, servo information is recorded in the channel 138 for each block. This information is recorded in the channel 138 at position 18 for the block so that it appears in the channel 138 one position before the overflow information for the block. The production and recordation of servo information for each block will be described in detail subsequently.

Since two bits of information are recorded for each block and there are 125 blocks in the analyzer, 250 bits of information are recorded in the channel 138 during each cycle of computation. The information for each block is recorded by the coil 270. After being recorded, the information moves along the channel 138 as the drum rotates. At a subsequent time, the information appears at a position contiguous to the coil 1274 in FIGURES 6 and 29. As previously described, the coil 274 is separated from the coil 270 by a distance corresponding to approximately 14 blocks. Since each block has a peripheral length of 18 positions, the number of positions in 14 blocks would be 18 times 14=252. For this reason, the coil 1512 is actually separated from the coil 1510 by $14n-2$ positions, where $n$=the number of positions in each block and specifically 18 positions.

When the information recorded by the coil 270 and relating to indications of "1" reaches the coil 274, it passes through the "and" network 1484 in FIGURE 29. The information relating to indications of "1" passes through the "and" network 1484 because of the connection of the "and" network to the left output terminal of the flip-flop 284, which receives the information from the coil 274. This information passes through the "and" network 1484 only in positions 2 to 17, inclusive, for each block because of the connection of the "and" network 1484 to the inverter 541. The "and" network 1484 opens only at positions 2 to 17, inclusive, since new information is being recorded by the coil 270 for each block at position 18 for the block and position 1 for the following block.

The signals passing through the "and" network 1484 are introduced through the "or" network 1478 to the "and" network 1480 for synchronization at optimum times in the clock cycles. The signals are then introduced to the left input terminal of the flip-flop 337 to trigger the flip-flop. Triggering of the flip-flop 337 causes a relatively high voltage to be produced on the left output terminal of the flip-flop. This voltage is introduced to the coil 270 so that an indication of "1" is recorded by the coil in the channel 138.

The logical equation controlling the operation of the "and" network 1484, the "or" network 1478 and the "and" network 1480 is $$ {}_{0}z=\alpha Z_2 P_{2/17} T \qquad (67) $$

Where:

${}_{0}z$=a triggering signal introduced to the left input terminal of the flip-flop 337;

$Z_2$=a relatively high voltage on the left output terminal of the flip-flop 284 as controlled by the signals from the coil 274; and $P_{2/17}$=a signal from the inverter 541.

Just as the "and" network 1484 passes signals representing indications of "1" in the channel 138, the "and" network 1528 in FIGURE 30 passes signals representing indications of "0" in the channel 138. The "and" network 1528 passes these signals because of its connection to the right output terminal of the flip-flop 284, which receives the signals from the coil 274. Since the "and" network 1528 is connected to the inverter 541, it passes the indication of "0" in the channel 138 only for positions 2 to 17, inclusive, for each block.

The signals passing through the "and" network 1528 are introduced through the "or" network 1522 to the "and" network 1524 for synchronization at optimum times in the clock cycles. The signals then pass to the right input terminal of the flip-flop 337 to trigger the flip-flop for the production of a relatively high voltage on the right output terminal of the flip-flop. This causes a low voltage to be produced on the left output terminal of the flip-flop 337 and an indication of "0" to be recorded by the coil 270 in the channel 138.

The operation of the "and" network 1528, the "or" network 1522 and the "and" network 1524 in recirculating the information in the channel 138 can be expressed by the following logical equation:

$$ {}_{0}\bar{z}=\bar{Z}_2 P_{2/17} T \qquad (68) $$

Where:

${}_{0}\bar{z}$=a triggering signal introduced to the right input terminal of the flip-flop 337;

$\bar{Z}_2$=a relatively high voltage on the right output terminal of the flip-flop 284; and the other terms have previously been defined.

Since the information recorded in the channel 138 is recirculated only during positions 2 to 17, inclusive, for each block, new information can be recorded in the channel 138 for the block at position 18 of the block and at position 1 of the following block. Because of the recordation of new information at positions 1 and 18 for each block, the information for each block is recirculated in the channel 138 only until the block is again presented for computation. Upon the presentation of the block for computation, new information is recorded for the block in the channel 18. In this way, the channel 138 retains signal indications for each block representing information obtained during the last cycle of computation. This is necessary for reasons which will presently be described.

It will be seen from the above discussion that the information recorded in the channel 138 for each block represents the output from the block. Since the blocks have an interrelationship dependent upon the problem to be solved, the information recorded in the channel 138 for certain blocks is made available as input information to other blocks. In certain instances, the output information for first blocks in the channel 138 is made available to second blocks to control the production of the $\Delta Y$ increments for the second blocks and the polarity of the $\Delta Y$ increments. In other instances, the output information for first blocks in the channel 138 is presented to third blocks to control the production of $\Delta X$ increments for the blocks and the polarity of the $\Delta X$ increments.

The output indications in the channel 138 are made available to the various blocks as input information in accordance with the operation of the stages shown in FIGURE 6. These stages control the presentation of the output information to the various "read" coils disposed in contiguous relationship to the channel 138. These coils include the coils 272, 274, 276 and 278 in FIGURE 6. As previously described the coil 274 is separated from the "record" coil 270 by a distance equivalent to $14n-2$ pulse positions, where $n$=the number of positions in a block. The coil 272 is disposed between the coils 270 and 274 and is separated from the coil 270 by blocks. The coils 276 and 278 are respectively separated from the coil 270 by blocks.

Four "read" coils are associated with the channel 138 to increase the flexibility in the operation of the digital differential analyzer. Since there are only 18 positions in a block and 125 blocks in the analyzer, the output from approximately only 18/125 other blocks would be made available to each block during the presentation of the block for computation. In this way, each block would be able to obtain the outputs from only approximately 14% of the other blocks. This would present complications in the inter-connections between blocks, especially when all of the blocks have to be used to solve a complex mathematical problem. By using four "read" heads instead of one, the flexibility in the operation of the digital differential analyzer is considerably increased. For example, by using the four read coils 272, 274, 276 and 278 at the strategic positions in the channel 138 described above, the outputs from almost 50% of the blocks are made available to each block during the 18 positions that the block is presented for computation.

*Coding for Using Information in Z Channel to Control the Production of $\Delta X$ and $\Delta Y$ Increments*

Particular codes are provided in the channels 140, 142, 144 and 146 to control which one of the coils 272, 274, 276 and 278 is to be selected for reading. For example, the information introduced to the coil 272 is read when an indication of "0" is produced in the channel 144 at the same time that an indication of "1" is produced in the channel 146. Such a simultaneous occurrence of indications causes relatively high voltages to be simultaneously produced on the right output terminal of the flip-flop 314 and on the left output terminal of the flip-flop 318.

The relatively high voltages on the right output terminal of the flip-flop 314 and on the left output terminal of the flip-flop are introduced to the "and" network 324 in FIGURE 6. The "and" network 324 then opens for the passage of signals from the left output terminal of the flip-flop 280. Relatively high voltages are produced on the left output terminal of the flip-flop 280 when indications of "1" are induced in the coil 272.

The signals from the "and" network 324 pass through the "or" network 326 to the cathode follower 328. The signals passing through the stages 324, 326, and 328 may be represented as $$L=\bar{L}_3L_4Z_1 \qquad (69)$$

Where:

$L$=a signal passing to the cathode follower 328;
$Z_1$=a relatively high voltage on the left output terminal of the flip-flop 280; and the other terms have previously been defined.

The particular coding controlling the opening of the "and" network 324 also controls the opening of the "and" network 360. When the particular coding in the channels 144 and 146 occurs, signals of high amplitude on the right output terminal of the flip-flop 280 pass through the "and" network 360 to the "or" network 362. These signals are produced by indications of "0" induced in the coil 272.

The signals from the "and" network 360 pass through the "or" network 362 to the cathode follower 364. The stages 360, 362 and 364 operate in accordance with the logical equation:

$$\bar{L}=\bar{L}_3L_4\bar{Z}_1 \qquad (70)$$

Where:

$\bar{L}$=a signal passing to the cathode follower 364;
$\bar{Z}_1$=a relatively high voltage on the right output terminal of the flip-flop 280; and the other terms have previously been defined.

Just as a particular code in the channels 144 and 146 controls the passage of the signals induced in the coil 272, a second code in the channels 144 and 146 controls the passage of signals induced in the coil 274. This second coding is represented by simultaneous indications of "1" and "0" in the channels 144 and 146, respectively. When such a coding occurs, relatively high voltages are simultaneously produced on the left output terminal of the flip-flop 314 and on the right output terminal of the flip-flop 318.

The relatively high voltages produced on the left output terminal of the flip-flop 314 and on the right output terminal of the flip-flop 318 are introduced to the "and" network 330 in FIGURE 6. The "and" network 330 also receives the voltages on the left output terminal of the flip-flop 284, the operation of which is controlled by the signal indications induced in the coil 274. Signals are also applied to the "and" network 330 from the inverter 332. The inverter 332 passes signals in positions 3 to 18, inclusive, for each block because of its connection to the "and" network 334. This results from the fact that the "and" network 334 is activated only in positions 1 and 2 of each block because of its connections to the right output terminals of the position-counting flip-flops 180, 190, 200 and 210.

The signals from the "and" network 330 pass through the "or" network 326 to the cathode follower 328. The operation of the "and" network 330, the "or" network 326 and the cathode follower 328 can be logically expressed as:

$$L=L_3\bar{L}_4Z_2\bar{P}_{1/2} \qquad (71)$$

Where:

$L$=a signal from the cathode follower 328;
$Z_2$=a relatively high voltage on the left output terminal of the flip-flop 284;
$\bar{P}_{1/2}$=a signal from the inverter 332 to represent positions other than positions 1 and 2 for each block; and the other terms have previously been defined.

As previously described, new information is introduced to the flip-flop 337 at position 18 of each block and at position 1 of the following block so that the information can be recorded in the channel 138. Since the latest information for each block undergoing computation is being introduced to the flip-flop 337, it would be desirable to use this information rather than the information from the coil 272. It is for this reason that the "and" network 330 becomes activated only during positions 3 to 18, inclusive, for each block for a coding of $L_3\bar{L}_4$ in the channels 144 and 146 as described above.

At positions 1 and 2 for each block the "and" network 336 becomes prepared for activation. The "and" network 336 becomes prepared for activation only in these positions since it has an input terminal connected to the "and" network 334. The "and" network 336 passes signals only for a coding in the channels 144 and 146 similar to the coding which activates the "and" network 330. This coding is represented by the simultaneous occurrence of relatively high voltages on the left output terminal of the flip-flop 314 and on the right output terminal of the flip-flop 318. The "and" network 336 passes a signal only when a relatively high voltage is produced on the left output terminal of the flip-flop 337. This flip-flop receives the information to be recorded in the channel 138. The signals from the "and" network 336 are introduced through the "or" network 326 to the cathode follower 328. The operation of the "and" network 336, the "or" network 326 and the cathode follower 328 can be logically expressed as:

$$L=L_3\bar{L}_4\,{}_0ZP_{1/2} \qquad (72)$$

Where:

${}_0Z$=a relatively high voltage on the left output terminal of the flip-flop 337;
$P_{1/2}$=a signal from the "and" network 334; and the other terms have previously been defined.

Just as the indications of "1" induced in the coil 274 pass through the "and" network 330 during positions 3 to 18, inclusive, for each block, the indications of "0" induced in the coil 274 pass through the "and" network 366. The signals from the "and" network 366 are introduced through the "or" network 362 to the cathode follower 364. The "and" network 366, the "or" network 362 and the cathode follower 364 operate in accordance with the logical equation:

$$\bar{L}=L_3\bar{L}_4\bar{Z}_2\bar{P}_{1/2} \qquad (73)$$

Where:

$\bar{L}$=a signal passing to the cathode follower 364;
$\bar{Z}_2$=a relatively high voltage on the right output terminal of the flip-flop 284; and the other terms have previously been defined.

The "and" network 368 operates in a manner similar to that described above for the "and" network 336. The "and" network 368 is able to become opened only in positions 1 and 2 for each block because of its connection to the "and" network 334. The "and" network becomes opened only for a coding in the channels 144 and 146 represented by $L_3$ and $\bar{L}_4$ because of its particular connections to the flip-flops 314 and 318. When the "and" network 368 becomes prepared for opening, it passes the signals of high amplitude on the right output terminals of the flip-flop 337. These signals represent indications of "0" presently being recorded in the channel 138. The signals from the "and" network 368 pass through the "or" network 362 to the cathode follower 364. These signals pass to the cathode follower 364 in accordance with the logical equation:

$$\bar{L}=L_3\bar{L}_4\,{}_0\bar{Z}P_{1/2} \qquad (74)$$

where all of the terms have previously been defined.

In order to increase the flexibility in the operation of the digital differential analyzer, the signals induced in the coil 276 are made available to various blocks as they are presented for computation. The signals induced in the coil 276 are made available only when a particular code network 338 to prepare the network for activation. The is represented by simultaneous indications of "1" in the channels 144 and 146. When indications of "1" simultaneously occur in the channels 144 and 146, relatively high voltages are simultaneously produced on the left output terminals of the flip-flops 314 and 318.

The signals produced on the left output terminals of the flip-flops 314 and 318 are introduced to the "and" network 338 to prepare the network for activation. The "and" network 338 also receives the signals on the left output terminal of the flip-flop 288 to represent indications of "1" induced in the coil 276. The "and" network 338 is able to become activated in the positions for each block other than positions 9 and 10 for the block. This results from the introduction to the "and" network 338 of the signals from the inverter 340. The inverter 340 passes signals in the positions for each block other than positions 9 and 10, since it is connected to the "and" network 344. The "and" network 344 becomes activated at positions 9 and 10 for each block because of its particular connections to the flip-flops 180, 190, 200 and 210.

When the "and" network 338 becomes activated, it passes signals through the "or" network 326 to the cathode follower 328. The "and" network 338 passes signals to the cathode follower 328 in accordance with the logical equation:

$$L = L_3 L_4 Z_3 \overline{P}_{9/10} \quad (75)$$

Where:

$Z_3$=a relatively high voltage on the left output terminal of the flip-flop 288;

$\overline{P}_{9/10}$=a signal from the inverter 340, and the other terms have previously been defined.

Because of the particular positioning of the coil 276 relative to the coil 270, the coil 276 receives at positions 9 and 10 information which is somewhat old. This information is old because the digital differential analyzer has undergone a complete cycle of computation and new information for the same block as the old block has been or is being recorded in the channel 138. If this information in the channel 138 were allowed to be used, it might produce inaccuracies because of its relatively old status. For this reason, the information induced in the coil 276 at positions 9 and 10 is not allowed to pass through the "and" network 338. This results from the operation of the inverter 340.

In order to increase the flexibility in the coupling between various blocks in the digital differential analyzer, some information should be utilized at positions 9 and 10 for the coding represented by $L_3L_4$. For this reason the information in the flip-flop 420 is made available for use at positions 9 and 10 for a coding represented by the simultaneous occurrence of relatively high voltages on the left output terminals of the flip-flops 314 and 318. The information in the flip-flop 420 is made available for use since the operation of the flip-flop is controlled by particular signals in the channel 138. In this way, the channel 138 sends the information through the flop-flop 420 to the cathode followers 328 and 364 so as to make the information available for blocks which might otherwise not receive the information.

The information on the left output terminal of the flip-flop 420 is introduced to the "and" network 348. The "and" network 348 passes this information only at positions 9 and 10 for a block because of its connection to the "and" network 344. The "and" network 348 passes the information from the "and" network 420 only for the particular coding represented by the simultaneous occurrence of relatively high voltages on the left output terminals of the flip-flops 314 and 318. The signals from the "and" network 348 pass through the "or" network 326 to the cathode follower 328. The "and" network 348, the "or" network 326 and the cathode follower 328 operate in accordance with the logical equation:

$$L = L_3 L_4 A_2 P_{9/10} \quad (76)$$

where all of the terms have previously been defined.

In like manner, the relatively high voltages on the right output terminal of the flip-flop 420 are introduced to the "and" network 372. The "and" network 372 becomes prepared for activation only at the times that the "and" network 348 becomes prepared for activation. This results from the connection of the "and" network 372 to the "and" network 344 and the flip-flops 314 and 318. The signals from the "and" network 372 pass through the "or" network 362 to the cathode follower 364. The signals are produced in accordance with the logical equation:

$$\overline{L} = L_3 L_4 \overline{A}_2 P_{9/10} \quad (77)$$

where all of the terms have previously been defined.

The flexibility in the possible coupling between the different blocks is further enhanced by the inclusion of the coil 278. This coil produces signals in accordance with the magnetic pattern produced in the channel 138 and triggers the flip-flop 292 into a corresponding pattern of operation. The signals of high amplitude produced on the left output terminal of the flip-flop 292 are introduced to the "and" network 352. The "and" network 352 is able to pass these signals only when a particular coding is provided in the channels 144 and 146. This coding is represented by the simultaneous occurrence of indications of "0" in the channels 144 and 146. This coding pattern causes relatively high voltages to be produced simultaneously on the right output terminals of the flip-flops 314 and 318 for introduction to the "and" network 352.

The "and" network 352 is able to pass the signals from the flip-flop 292 in all of the positions for each block other than positions 9 and 10. This results from the fact that the "and" network 352 is connected to the inverter 340. The "and" network 352 is closed to the passage of signals at positions 9 and 10 for the same reasons as the "and" networks 338 and 370. The signals from the "and" network 352 pass through the "or" network 326 to the cathode follower 328. These signals pass to the cathode follower 328 in accordance with the logical equation:

$$L = \overline{L}_3 \overline{L}_4 Z_4 \overline{P}_{9/10} \quad (78)$$

Where:

$Z_4$=a relatively high voltage on the left output terminal of the flip-flop 292; and the other terms have previously been defined.

The "and" network 374 becomes prepared for opening at the same time as the "and" network 352. This results from the connections to the "and" network 374 from the inverter 340 and the right output terminals of the flip-flops 314 and 318. However, the "and" network 374 passes the signals of high amplitude on the right output terminal of the flip-flop 292. The signals from the "and" network 374 pass through the "or" network 362 to the cathode follower 364 in accordance with the logical equation:

$$\overline{L} = \overline{L}_3 \overline{L}_4 \overline{Z}_4 \overline{P}_{9/10} \quad (79)$$

Where:

$\overline{Z}_4$=a relatively high voltage on the right output terminal of the flip-flop 292; and the other terms have previously been defined.

Since the signals induced in the coil 278 cannot pass to the cathode followers 326 and 364 at positions 9 and 10 for each block, other signals should be made available to the cathode followers at these times to enchance the flexibility in the operation of the digital differential analyzer. These signals are made available from the flip-flop 494. The flip-flop 494 is triggered into a pattern of operation in each block in accordance with information obtained from the channel 138. By presenting the information in the flip-flop 494 to the cathode followers 328 and 364, the corresponding information in the channel 138 is made available to certain blocks which might not otherwise receive the information.

The signals of high amplitude on the left output terminal of the flip-flop 494 are introduced to the "and" network 354. These signals pass through the "and" network 354 only when a coding represented by indications of "0" are simultaneously produced in the channels 144 and 146. The signals pass through the "and" network 354 only at positions 9 and 10 for a block because of the connection of the "and" network 354 to the "and" network 344. The signals from the "and" network 354 pass through the "or" network 326 to the cathode follower 328. The "and" network 354, the "or" network 326 and the cathode follower 328 operate in accordance with the logical equation:

$$\mathrm{L}=\bar{L}_3\bar{L}_4B_2P_{9/10} \quad (80)$$

where all of the terms have previously been defined.

The "and" network 376 becomes prepared for activation at the same time as the "and" network 354. This results from the connection of the "and" network 376 to the "and" network 344 and to the right output terminals of the flip-flops 314 and 318. However, the "and" network 376 passes the signals of relatively high amplitude on the right output terminal of the flip-flop 494. The signals from the "and" network 376 pass through the "or" network 362 to the cathode follower 364 in accordance with the logical equation:

$$\vec{\mathrm{L}}=\vec{L}_3\vec{L}_4\bar{B}_2P_{9/10} \quad (81)$$

where all of the terms have previously been defined.

The flexibility in the intercoupling between various blocks is further increased by the operation of certain other stages in addition to those described above. These include the stages shown in FIGURE 20. The operation of the stages shown in FIGURE 20 is controlled by certain patterns of coding provided in the channels 140, 142, 144 and 146. For example, one pattern of coding is represented by simultaneous indications of "0" in the channels 140 and 142 and of "1" in the channels 144 and 146. Such a simultaneous occurrence of coding signals causes relatively high voltages to be produced at the same time on the right output terminals of the flip-flops 306 and 310 and on the left output terminals of the flip-flops 314 and 318.

The "and" network 1060 becomes prepared for activation when relatively high voltages are simultaneously produced on the right output terminals of the flip-flops 306 and 310 and on the left output terminals of the flip-flops 314 and 318. The "and" network 1060 becomes prepared for activation only during positions 1 to 17, inclusive for each block, since the "and" network is connected to the inverter 444. When prepared for activation, the "and" network 1060 passes the signals of high amplitude on the left output terminal of the flip-flop 337. As previously described, these signals represent indications of "1" which are about to be recorded by the coil 270 in the channel 138.

The signals passing through the "and" network 1060 are introduced through the "or" network 1068 to the "and" network 1070. The "and" network 1070 synchronizes these signals at optimum times in the clock cycles and introduces the signals to the left input terminal in the flip-flop 392. These signals trigger the flip-flop 392 and cause a relatively high voltage to be produced on the left output terminal of the flip-flop. Signals pass through the stages 1060, 1068 and 1070 to the flip-flop 392 in accordance with the logical equation:

$$f_1={}_0Z\bar{L}_1\bar{L}_2L_3L_4P_{1/17}T \quad (82)$$

Where:

$f_1$=a triggering signal introduced to the left input terminal of the flip-flop 392; and the other terms have previously been defined.

The "and" network 1072 becomes prepared for activation at the same time as the "and" network 1060. This results from the connections of the "and" network 1072 to the inverter 444, the right output terminals of the flip-flops 306 and 310 and the left output terminals of the flip-flops 314 and 318. When prepared for activation, the "and" network 1072 passes the signals of high amplitude on the right output terminal of the flip-flop 337. These signals represent indications of "0" which are about to be recorded in the channel 138. The signals from the "and" network 1072 pass through the "or" network 1078 to the "and" network 1080 for synchronization at optimum times in the clock cycles. The signals then pass to the right input terminal in the flip-flop 392. These signals trigger the flip-flop for the production of a relatively high voltage on the right output terminal of the flip-flop. The signals passing through the stages 1072, 1078 and 1080 can be logically expressed as:

$$\bar{f}_1={}_0\overline{Z}\overline{L}_1\bar{L}_2L_3L_4P_{1/17}T \quad (83)$$

Where:

$\bar{f}_1$=a triggering signal introduced to the right input terminal of the flip-flop 392; and the other terms have previously been defined.

It has been previously described that the ΔX increment for each block is determined by certain indications in the channel 138. These indications control the operation of the flip-flop 396 in FIGURE 7 in representing the polarity of the ΔX increment for the block. A positive ΔX increment for a block is indicated by a relatively high voltage on the left output terminal of the flip-flop 396 and a negative ΔX increment is indicated by a relatively high voltage on the right output terminal of the flip-flop. Since the operation of the flip-flop 396 is controlled by the indications in the channel 138, the flexibility in the interrelationship between the different blocks is further increased by making the output indications in the flip-flop 396 available to the flip-flop 392 in FIGURE 20 for certain patterns of coding.

The coding representing the passage of information from the flip-flop 396 to the flip-flop 392 is represented by the simultaneous occurrence of an indication of "1" in the channel 144 and an indication of "0" in the channel 146. These simultaneous indications cause relatively high voltages to be produced at the same time on the left output terminal of the flip-flop 314 and on the right output terminal of the flip-flop 318. The voltages from the flip-flops 314 and 318 are introduced to the "and" network 1062 to prepare the "and" network for activation.

The "and" network 1062 becomes prepared for activation only at position 18 for a block since the "and" network is connected to the "and" network 216. The "and" network is able to pass a signal only for a single-block operation or for the second half of a double-block operation. This results from the connection between the input terminal of the "and" network 1062 and the right output terminal of the flip-flop 390. When the "and" network 1062 becomes prepared for operation, it passes the signals of high amplitude on the left output terminal of the flip-flop 396.

The signals passing through the "and" network 1062 are introduced through the "or" network 1068 to the "and" network 1070. These signals are synchronized at optimum times in the clock cycles by the "and" network 1070 and are introduced to the left input terminal in the flip-flop 392. The signals trigger the flip-flop 392 for the production of a relatively high voltage on the left output terminal of the flip-flop. Signals pass through the stages 1062, 1068 and 1070 to the flip-flop 392 in accordance with the logical equation:

$$f_1=A_1\overline{G}_5L_3\overline{L}_4P_{18}T \quad (84)$$

where all of the terms have previously been defined.

The "and" network 1074 becomes prepared for activation at the same time as the "and" network 1062. However, the "and" network 1074 passes the signals of high amplitude on the right output terminal of the flip-flop 396. These signals pass through the "or" network 1078 and the "and" network 1080 to the right input terminal of the flip-flop 392. The signals trigger the flip-flop so that a relatively high voltage is produced on the right output terminal of the flip-flop. The stages 1074, 1078 and 1080 pass signals to the flip-flop 392 in accordance with the logical equation:

$$\overline{f}_1=\overline{A}_1\overline{G}_5L_3\overline{L}_4P_{18}T \quad (85)$$

where all of the terms have previously been defined.

Just as the flip-flop 396 in FIGURE 7 provides indications of the ΔX increment for each block, the flip-flop 496 in FIGURE 9 provides indications of the ΔY increment for the block. As previously described, the operation of the flip-flop 496 is controlled by the output indications in the channel 138. In this way, additional information in the channel 138 can be made available by presenting the information in the flip-flop 496 to the flip-flop 392 in FIGURE 20 for particular patterns of coding in the channels 144 and 146. This particular pattern of coding is represented by the simultaneous occurrence of indications of "1" in the channels 144 and 146.

When indications of "1" appear at the same time in the channels 144 and 146, relatively high voltages are simultaneously produced on the left output terminals of the flip-flops 314 and 318. These high voltages are introduced to the "and" network 1064 in FIGURE 20 to prepare the "and" network for activation. The "and" network 1064 can become activated only at position 18 for each block because of its connection to the "and" network 216. The "and" network 1064 can become activated only for a single-block operation or in the second half of a double-block operation since it is connected to the right output terminal of the flip-flop 390.

Upon becoming prepared for activation, the "and" network 1064 passes the signals of high amplitude on the left output terminal of the flip-flop 496. The signals from the "and" network 1064 pass through the "or" network 1068 and the "and" network 1070 to the left input terminal of the flip-flop 392. These signals trigger the flip-flop 392 and produce a relatively high voltage on the left output terminal of the flip-flop. The passage of signals through the stages 1064, 1068 and 1070 to the flip-flop 392 takes place in accordance with the logical equation:

$$f_1=B_1\overline{G}_5L_3L_4P_{18}T \quad (86)$$

where all of the terms have previously been defined.

The "and" network 1076 becomes prepared for activation at the same time as the "and" network 1064. Upon becoming prepared for activation, the "and" network 1076 passes the signals of high amplitude on the right output terminal of the flip-flop 496. These signals pass through the "or" network 1078 and the "and" network 1080 to the right input terminal of the flip-flop 392. The signals trigger the flip-flop 392 for the production of a relatively high voltage on the right output terminal of the flip-flop. The stages 1076, 1078 and 1080 pass signals to the flip-flop 392 in accordance with the logical equation:

$$\overline{f}_1=\overline{B}_1\overline{G}_5L_3L_4P_{18}T \quad (87)$$

where all of the terms have previously been defined.

Since the flip-flop 392 provides information relating to output signals in the channel 138, the information from the flip-flop is made available to the flip-flops 396 and 496 to control the production of ΔX and ΔY increments. The information from the flip-flop 392 is made available to the flip-flops 396 and 496 upon the occurrence of particular coding patterns in the channels 140, 142, 144 and 146. The information in the flip-flop 392 is made available to the flip-flop 396 in FIGURE 7 when indications of "0" occur in the channels 140 and 142 at the same time that indications of "1" occur in the channels 144 and 146. This simultaneous occurrence of indications causes relatively high voltages to be produced at the same time on the right output terminals of the flip-flops 306 and 310 and on the left output terminals of the flip-flops 314 and 318.

The signals from the flip-flops 310, 314 and 318 are introduced to the "and" network 386 in FIGURE 7. The "and" network 386 also receives signals from the right output terminal of the flip-flop 190. Since the voltage on the right output terminal of the flip-flop 190 is high only during positions 1 to 4, inclusive; 8 to 12, inclusive; and 16 to 18, inclusive, the "and" network 386 can become activated only in these positions for each block. When the "and" network 386 becomes prepared for activation, it passes the signals of high amplitude on the left output terminal of the flip-flop 392.

The "and" network 386 is also connected to the left output terminal of the flip-flop 390. This causes the "and" network 386 to become activated only in the first half of a double-block operation. The "and" network 386 becomes activated only in the first half of a double-block operation since the flip-flop 396 does not have to be used to determine the ΔX increment for the second half of the double-block operation. In this way, the flip-flop 396 is free to receive information from the flip-flop 392 during the first half of the double-block operation and can present the information to the flip-flop 420 during the second half of the double-block operation. By such a procedure, the information in the flip-flop 392 can be made available through the flip-flops 396 and 420 to blocks which might not otherwise be able to receive the information. This is desirable since the information in the flip-flop 392 represents certain output indications in the channel 138.

The signals from the "and" network 386 in FIGURE 7 pass through the "or" network 382 to the "and" network 394. As previously described, the "and" network 394 passes the signals from the "or" network 382 only in positions 1 to 17, inclusive, for each integrator. Furthermore, the "and" network 394 passes the signals only when a relatively high voltage is produced on the right output terminal of the flip-flop 396. The operation of the "and" network 394 is also controlled by the voltage on the right output terminal of the flip-flop 306, which represents part of the particular coding described above.

The signals passing through the "and" network 394 pass to the left input terminal of the flip-flop 396. These signals trigger the flip-flop 396 for the production of a relatively high voltage on the left output terminal of the flip-flop. Signals pass to the flip-flop 396 from the stages 386, 382 and 394 in accordance with the logical equation:

$$a_1=\overline{A}_1\overline{I}_1\overline{L}_2L_3L_4P_{1/17}F_1G_5\overline{J}_3T, \quad (88)$$

Where:

$a_1$=a triggering signal introduced to the left input terminal of the flip-flop 396;

$F_1$=a relatively high voltage on the left output terminal of the flip-flop 392; and all of the other terms have previously been defined.

The signals from the "and" network 386 also pass through the "or" network 382 to the "and" network 402. The "and" network 402 is able to pass these signals only when a relatively high voltage is provided on the left output terminal of the flip-flop 396. The "and" network 402 passes the signals from the "and" network 386 only in positions 1 to 17, inclusive, for each block because of its connection to the inverter 444. The signals from the "and" network 402 pass through the "or" network 400 to the "and" network 398 which synchronizes these signals at optimum times in the clock cycles. The signals then pass to the right input terminal of the flip-flop 396. These signals trigger the flip-flop 396 such that a relatively high voltage is produced on the right output terminal of the flip-flop. Signals pass to the flip flop 396 through the stages 386, 382, 402, 400 and 398 in accordance with the logical equation:

$$\overline{a}_1=A_1\overline{L}_1\overline{L}_2L_3L_4P_{1/17}F_1G_5\overline{J}_3T \quad (89)$$

where all of the terms have previously been defined.

It will be seen from Equations 88 and 89 that the signals of high amplitude on the left output terminal of the flip-flop 392 trigger the flip-flop 396 from one state of operation to the other. For example, the signals from the left output terminal of the flip-flop 392 trigger the flip-flop 396 for the production of a relatively high voltage on the right output terminal of the flip-flop 396 when a relatively high voltage previously existed on the left output terminal of the flip-flop 396. The reason for this will be described in detail subsequently.

Ordinarily, signals pass to the flip-flop 420 from the flip-flop 396 at position 18 for a block. However, for a coding of "$L_3\overline{L}_4$," the signals from the flip-flop 396 pass to the flip-flop 392 at position 18 for a block. Since the signals from the flip-flop 396 pass to the flip-flop 392 instead of the flip-flop 420 for a coding of "$L_3\overline{L}_4$," the flip-flop 420 is free to receive information from another source for such a coding. For this reason, the signals from the flip-flop 392 are introduced to the flip-flop 420 for a coding of $L_3\overline{L}_4$ to increase the flexibility in the interrelationship between the different blocks.

The signals of high amplitude on the left output terminal of the flip-flop 392 pass through the "and" network 414 in FIGURE 8 to the flip-flop 420. The "and" network 414 passes the signals from the flip-flop 392 only for a coding represented by $L_3\overline{L}_4$ because of the introduction to the "and" network of signals from the left output terminal in the flip-flop 314 and the right output terminal in the flip-flop 318. The signals from the "and" network 414 pass through the "or" network 416 to the "and" network 418. The "and" network 418 passes these signals only at position 18 for a block because of its connection to the "and" network 216. The "and" network 418 passes the signals only for a single block operation or the second half of a double-block operation since the "and" network is connected to the right output terminal of the flip-flop 390. The passage of signals through the "and" network 418 only at position 18 of a single-block operation or the second half of a double-block operation corresponds to the time at which signals pass from the flip-flop 396 to the flip-flop 392.

The signals from the "and" network 418 pass to the left input terminal in the flip-flop 420 and trigger the flip-flop for the production of a relatively high voltage on the left output terminal of the flip-flop. In this way, indications representing $\Delta X$ increments for a block are obtained from the flip-flop 392. The passage of signals from the flip-flop 392 through the stages 414, 416 and 418 to the flip-flop 420 can be logically represented as:

$$a_2=\overline{G}_5P_{18}F_1L_3\overline{L}_4T \quad (90)$$

where all of the terms have previously been defined.

Just as the "and" network 414 receives the signals of high amplitude on the left output terminal of the flip-flop 392, the "and" network 426 receives the signals of high amplitude on the right output terminal of the flip-flop.

The "and" network 426 passes the indications on the right output terminal of the flip-flop 392 only for a particular coding represented by $L_3\overline{L}_4$ because of its connections to the flip-flops 314 and 318. The signals from the "and" network 426 pass through the "or" network 428 to the "and" network 430. The "and" network operates in a manner similar to that described above for the "and" network 418 to pass signals only at position 18 of a single-block operation or the second half of a double-block operation. The signals passing through the "and" network 430 are introduced to the right input terminal of the flip-flop 420. These signals trigger the flip-flop 420 for the production of a relatively high voltage on the right output terminal of the flip-flop. Signals pass through the stages 426, 428, and 430 in accordance with the logical equation:

$$\overline{a}_2=\overline{G}_5P_{18}\overline{F}_1L_3\overline{L}_4T \quad (90a)$$

where all of the terms have previously been defined.

Ordinarily, the flip-flop 494 receives the signals produced in the flip-flop 496. For a coding represented by $L_3L_4$, the signals from the flip-flop 496 pass to the flip-flop 392 in a manner similar to that described above. For this reason, the flip-flop 494 is available to receive indications from sources other than the flip-flop 496. Because of this, signals are introduced to the flip-flop 494 from the flip-flop 392 when a coding represented by $L_3L_4$ occurs. In this way, $\Delta Y$ increments are obtained for a block from a source other than directly from the channel 138 so as to increase the flexibility in the operation of the digital differential analyzer.

The signals of high amplitude on the left output terminal of the flip-flop 392 pass through the "and" network 520 in FIGURE 10 to trigger the flip-flop 494. The signals from the flip-flop 392 pass through the "and" network 520 only for a coding of $L_3L_4$ as represented by relatively high voltages on the left output terminals of the flip-flops 314 and 318. The signals from the "and" network 520 pass through the "or" network 522 to the "and" network 524. The "and" network 524 becomes opened for the passage of signals only at position 18 for single-block operations or the second half of double-block operations. The signals from the "and" network 524 then pass to the flip-flop 494 to trigger the flip-flop for the production of a relatively high voltage on the left output terminal of the flip-flop. Signals pass from the flip-flop 392 through the stages 520, 522 and 524 in accordance with the logical equation:

$$b_2=\overline{G}_5P_{18}F_1L_3L_4T \quad (91)$$

where all of the terms have previously been defined.

The "and" network 530 operates in a manner somewhat similar to the "and" network 520 in passing signals for a coding represented by $L_3L_4$. However, the "and" network 530 passes the signals of high amplitude on the right output terminal of the flip-flop 392. The signals from the "and" network 530 are introduced through the "or" network 532 to the "and" network 534. For the same reasons as described above, the "and" network 534 opens for the passage of signals only at position 18 for a single-block operation or the second half of a double-block operation. The signals from the "and" network 534 are then introduced to the right input terminal of the flip-flop 494. These signals trigger the flip-flop to produce a relatively high voltage on the right output terminal of the flip-flop. The triggering signals pass through the stages 530, 532 and 534 to the flip-flop 494 in accordance with the logical equation:

$$\overline{b}_2=\overline{G}_5P_{18}\overline{F}_1L_3L_4T \quad (92)$$

where all of the terms have previously been defined.

Sometimes it may be desired to obtain a negative quantity in a block. For example, it may be desired to obtain a function $y=-\int f(x)dx$ in a block. In order to obtain such negative values, the successive $Y\Delta X$ increments for the block are inverted in polarity. This is obtained by inverting the polarity of each $\Delta X$ increment.

The inversion of the polarity of each $\Delta X$ increment is represented by a particular coding in the channels 140, 142, 144 and 146. This coding is represented by the simultaneous occurrence of indications of "0" in the channels 140, 142 and 146 and an indication of "1" in the channel 144. When such a simultaneous coding occurs in the channels 140, 142, 144 and 146, relatively high voltages are simultaneously produced on the right output terminals of the flip-flops 306, 310 and 318 and on the left output terminal of the flip-flop 314.

The signals on the right output terminals of the flip-flops 310 and 318 and on the left output terminal of the flip-flop 314 are introduced to the "and" network 384 in FIGURE 7. This causes a signal to pass from the "and" network 384 through the "or" network 382 to the "and" network 394. The signals then pass through the "and" network 394 upon the simultaneous occurrence of certain signals. The signals from the "and" network 384 pass through the "and" network 394 only upon the occurrence of a relatively high voltage on the right output terminal of the flip-flop 306. As described in the previous paragraph, this represents part of the coding to invert the polarity of a ΔX increment. The signals are able to pass through the "and" network 394 only in positions 1 to 17, inclusive, for each block because of the connection of the "and" network to the inverter 444. The signals are able to pass through the "and" network 394 only when a relatively high voltage is produced on the right output terminal of the flip-flop 396.

The signals from the "and" network 394 pass to the left input terminal of the flip-flop 396. These signals trigger the flip-flop 396 for the production of a relatively high voltage on the left output terminal of the flip-flop. In this way, the signals passing through the stages 386, 382, and 394 operate on the flip-flop 396 to invert a relatively high voltage on the right output terminal of the flip-flop into a relatively high voltage on the left output terminal of the flip-flop. These signals pass to the flip-flop 396 in accordance with the logical equation:

$$a_1=\bar{A}_1P_{1/17}\bar{L}_1\bar{L}_2L_3\bar{L}_4T \qquad (93)$$

where all of the terms have previously been defined.

In like manner, an indication of a positive ΔX increment for a block is inverted to a negative ΔX increment when a coding of $\bar{L}_1\bar{L}_2L_3\bar{L}_4$ occurs in corresponding positions of the channels 140, 142, 144 and 146. This inversion is represented by a change from a relatively high voltage on the left output terminal of the flip-flop 396 to a relatively high voltage on the right output terminal of the flip-flop. The inversion is obtained by the passage of signals through the "and" network 384, the "or" network 382, the "and" network 402, the "or" network 400 and the "and" network 398. Signals pass through these stages in accordance with the logical equation:

$$\bar{a}_1=A_1P_{1/17}\bar{L}_1\bar{L}_2L_3\bar{L}_4T \qquad (94)$$

where all of the terms have previously been defined.

In order to prepare the flip-flop 396 for proper functioning at the beginning of each operation represented by one or more blocks, the flip-flop must be triggered to its "off" condition at the end of the preceding operation. This is accomplished by the passage of a signal through the "and" network 406 in FIGURE 7. The "and" network passes a signal only at position 18 of a single-block operation or the second half of a double-block operation. This results from the connections made to the "and" network 406 from the "and" network 216 and the right output terminal of the flip-flop 390.

The signals from the "and" network 406 pass through the "or" network 400 to the "and" network 398 for synchronization at optimum times in the clock cycles. The signals then pass to the flip-flop 396 and trigger the flip-flop 396 so as to produce a relatively high voltage on the right output terminal of the flip-flop. The flip-flop 396 receives signals passing through the stages 406, 400 and 398 in accordance with the logical equation previously described $$\bar{a}_1=\bar{G}_5P_{18}T \qquad (95)$$

where all of the terms have previously been defined.

As described previously, the flip-flop 396 sometimes receives information in the first half of a double-block operation. Because of this, it should be prepared for proper operation in the second half of the double-block operation. This is accomplished by the passage of a signal through the "and" network 404 in FIGURE 7. The "and" network 404 passes such a signal only for a particular coding represented by the simultaneous occurrence of indications of "0" in the channel 140 and "1" in the channel 144. This coding causes relatively high voltages to be simultaneously produced on the right output terminal of the flip-flop 306 and on the left output terminal of the flip-flop 314. These signals are introduced to the "and" network 404 so that the "and" network will pass a signal at position 18 for the block undergoing computation. The "and" network passes signals only at position 18 because of its connection to the "and" network 216.

The signals from the "and" network 404 pass through the "or" network 400 and the "and" network 398 to the right input terminal of the flip-flop 396. The signals trigger the flip-flop 396 and produce a relatively high voltage on the right output terminal of the flip-flop. The signals pass through the stages 404, 400 and 398 to the flip-flop 396 in accordance with the logical equation:

$$\bar{a}_1=\bar{L}_1L_3P_{18}T \qquad (96)$$

where all of the terms have previously been defined.

It has been described above that the information in the flip-flop 392 is transferred to the flip-flop 396 for a coding represented by $\bar{L}_1\bar{L}_2L_3L_4$. This transfer occurs in the first half of a double-block operation in one of positions 1 to 4 inclusive; 8 to 12, inclusive, or 16 to 18, inclusive. This is in accordance with the logic expressed above in equation 88. In addition to the above transfer, it may be sometimes desired to transfer the information in the flip-flop 392 to the flip-flop 496 in FIGURE 9 in the first half of a double-block operation. This transfer is effectuated for the same coding which controls the transfer from the flip-flop 392 to the flip-flop 396. The coding is represented by the simultaneous configuration of $\bar{L}_1\bar{L}_2L_3L_4$. However, the transfer can be obtained only in positions 5 to 8, inclusive, and 12 to 16, inclusive. These are the only positions in which a transfer cannot be obtained from the flip-flop 392 to the flip-flop 396. Positions 5 to 8, inclusive, and 12 to 16, inclusive, in each block can be distinguished from the other positions on the block by a relatively high voltage on the left output terminal of the flip-flop 190.

The transfer from the flip-flop 392 to the flip-flop 496 is obtained in part by the passage of a signal through the "and" network 486 in FIGURE 9. This signal passes through the "or" network 482, the "and" network 484, the "or" network 488 and the "and" network 490 to the flip-flop 496. The signal triggers the flip-flop for the production of a relatively high voltage on the left output terminal of the flip-flop. The flip-flop 496 receives signals passing through the stages 486, 482, 484, 488 and 490 in accordance with the logical equation:

$$b_1=\bar{L}_1\bar{L}_2L_3L_4\bar{F}_1G_5J_3P_{1/17}T \qquad (97)$$

where all of the terms have previously been defined.

The "and" network 502 becomes prepared for activation at the same time as the "and" network 486. Upon becoming prepared for activation, the "and" network 502 passes the signals of high amplitude on the right output terminal of the flip-flop 392. These signals pass through the "or" network 504, the "and" network 506, the "or" network 510 and the "and" network 512 to the right input terminal of the flip-flop 496. The signals trigger the flip-flop 496 and cause a relatively high voltage to be produced on the right output terminal of the flip-flop. The flip-flop 496 receives the signals passing through the stages 502, 504, 506, 510 and 512 in accordance with the logical equation:

$$\bar{b}_1=\bar{L}_1\bar{L}_2L_3L_4\bar{F}_1G_5J_3P_{1/17}T \quad (98)$$

where all of the terms have previously been defined.

*Production Operation*

Sometimes the product of two numbers is desired. For example, the product of a quantity "X" and a quantity "Y" may be desired such that $Z=XY$. In order to obtain the product $Z=XY$ on a differential basis, the product can be represented by the equation $XY=\int YdX+\int XdY$. This conversion is well known in the field of differential analysis. Heretofore, several blocks have been required to obtain the product $Z=XY$. Heretofore, one block has been required to obtain the value represented by $\int XdY$ and a second block has been required to obtain $\int YdX$. At least a third block has been required to obtain the sum of the values obtained by the first two blocks and to produce an output indication.

Since at least three blocks have been required until now to obtain the product $Z=XY$, certain disadvantages have accrued in the solution of acomplex equation involving a number of products. Because of the fact that at least three blocks have been required to obtain each product, a large number of blocks have been rendered unavailable for other uses. This has been especially disadvantageous when a large number of blocks have been required to solve a problem. Furthermore, since at least three blocks have been required to obtain each product, the speed of computation has been decreased. This has aggravated a condition already considered worrisome in that the speed of computation is of concern to engineers at present.

This invention provides a digital differential analyzer in which a product $Z=XY$ is obtained in one block. The product is obtained in one block by including only one additional channel and a relatively small amount of additional logic. The product is obtained in one block on a simple and straightforward basis.

Each product operation is controlled by certain coding in the channel 142. This coding is represented by an indication of "0" in the channel 142 at position 18 for a block to indicate that a product operation is to take place in the next block. When an indication of "0" occurs in the channel 142 at position 18 for a block, a signal passes through the "and" network 1296 in FIGURE 25. This results from the connection of the "and" network 1296 to the "and" network 216 and to the right output terminal of the flip-flop 310.

A signal passes through the "and" network 1296 only at position 18 of a single-block operation or the second half of a double-block operation. This results from a connection between the "and" network 1296 and the right output terminal of the flip-flop 390. The connection from the flip-flop 390 is provided to make certain that stages controlling a product operation for a block can be triggered only at the end of the previous operation.

The signals passing through the "and" network 1296 are introduced to the right input terminal of the flip-flop 606. These signals trigger the flip-flop and cause a relatively high voltage to be produced on the right output terminal of the flip-flop. This voltage indicates a product operation for the next block. A relatively high voltage is produced on the right output terminal of the flip-flop 606 in accordance with the logical equation:

$$\bar{g}_1=\bar{L}_2\bar{G}_5P_{18}T \quad (99)$$

Where:

$\bar{g}_1$=the introduction of a triggering signal to the right input terminal of the flip-flop 606; and the other terms have previously been defined.

The relatively high voltage on the right output terminal of the flip-flop 606 continues until the end of the product operation. This is represented by an indication of "1" in the channel 142 at position 18 of the block representing the end of the product operation, which may be either one or two blocks long as will be described in detail subsequently.

Upon the occurrence of a coding pulse representing the end of a product operation, relatively high voltages are simultaneously obtained from the "and" network 216 and the left output terminal of the flip-flop 310. This causes a signal to pass through the "and" network 876 in FIGURE 25. The signal triggers the flip-flop 606 and causes a relatively high voltage to be produced on the left output terminal of the flip-flop. This voltage is produced in accordance with the logical equation:

$$g_1=L_2P_{18}T \quad (100)$$

Where:

$g_1$=the introduction of a triggering signal to the left input terminal of the flip-flop 606; and the other terms have previously been defined.

As has been previously described, the value of Y for a block is accumulated in the appropriate positions in the channel 150 for the block. Each ΔX increment for the block is determined upon the presentation of the block for computation and is represented by the operation of the flip-flops 396 and 420, as previously described. Each ΔY increment for the block is also determined upon the presentation of the block for computation and is represented by the operation of the flip-flops 496 and 494. Since these quantities have already been obtained in the operation of "normal" integrators, only the cumulative value of the ΔX increments has to be obtained in order to have all of the quanities in the product equation $$Z=\int YdX+\int XdY$$

available for computation. The cumulative value of the ΔX increments for a block is obtained by the operation of the channel 156 and will be described in detail subsequently.

Certain stages are included for a product operation to perform functions similar to those described above for normal operation. Since the value of ∫Y*d*X is required just as in "normal" integration, the flip-flops 420 and 494 are included to obtain the values of the ΔX and ΔY incerements every time that a block is presented for computation. The flip-flop 910 in FIGURE 17 is also included to perform functions in obtaining the values of ∫X*d*Y similar to those performed by the flip-flop 494 in obtaining ∫Y*d*X. In like manner, the flip-flop 974 performs functions in obtaining ∫X*d*Y corresponding to those performed by the flip-flop 420 in obtaining ∫Y*d*X.

As will be seen from the above description, a ΔX incerement in obtaining ∫X*d*Y is equivalent to a ΔY increment in obtaining ∫Y*d*X. In obtaining ∫X*d*Y, each ΔX increment is added to the value of X to obtain a new value of X. The ΔX increment is obtained by the flip-flop 910 in accordance with the operation of certain stages shown in FIGURE 17. One of these stages in FIGURE 17 includes the "and" network 918, which receives the indications representing ΔX for each block from the right output terminal of the flip-flop 420.

Signals from the flip-flop 420 pass through the "and" network 918 only at position 1 for a block because of the connection of the "and" network 918 to the "and" network 222. The signals from the flip-flop 420 pass through the "and" network 918 only at poistion 1 for a block so that the block will be prepared in the subsequent positions for the proper utilization of the ΔX increment in obtaining ∫X*d*Y for the block.

The signals from the flip-flop 420 pass through the "and" network 918 only when a relatively high voltage is produced on the right output terminal of the flip-flop 606. As will be explained in detail subsequently, a relatively high voltage on the right output terminal of the flip-flop 606 indicates that a product operation is being performed for the block undergoing computation.

The signals from the "and" network 918 pass through the "or" network 914 to the "and" network 916. The "and" network 916 synchronizes the signals at optimum times in the clock cycles because of its connection to the left output terminal of the flip-flop 164. The "and" network 916 then introduces the signals to the left input terminal of the flip-flop 910. The signals trigger the flip-flop 910 for the production of a relatively high voltage on the left output terminal of the flip-flop. Signals pass through the stages 918, 914 and 916 to the flip-flop 910 in accordance with the logical equation:

$$c_2=\overline{A}_2\overline{G}_1P_1T \qquad (101)$$

Where:

$c_2$=the introduction of a triggering signal to the left input terminal of the flip-flop 910;

$\overline{A}_2$=a relatively high voltage on the right output terminal of the flip-flop 420;

$\overline{G}_1$=a relatively high voltage on the right output terminal of the flip-flop 606; and the other terms have previously been defined.

Just as the signals of high amplitude on the right output terminal of the flip-flop 420 pass to the "and" network 918, the signals of high amplitude on the left output terminal of the flip-flop pass to the "and" network 928. These signals pass through the "and" network 928 only at position 1 for a block for the same reasons as described above. The signals are able to pass through the "and" network 928 only for a product operation, as represented by a relatively high voltage on the right output terminal of the flip-flop 606.

The signals from the "and" network 928 pass through the "or" network 932 to the "and" network 934. These signals are synchronized by the "and" network 934 at optimum times in the clock cycles and are introduced to the right input terminal of the flip-flop 910. The signals trigger the flip-flop for the production of a relatively high voltage on the right output terminal of the flip-flop. The signals pass through the stages 928, 932 and 934 to the flip-flop 910 in accordance with the logical equation:

$$\overline{c}_2=A_2\overline{G}_1P_1T \qquad (102)$$

Where:

$\overline{c}_2$=a signal introduced to the right input terminal of the flip-flop 910; and the other terms have previously been defined.

On the basis of the above discussion, it will be seen that a ΔY increment in obtaining ∫XdY is equivalent to a ΔX increment in obtaining ∫YdX. In obtaining ∫XdY, each ΔY increment controls the polarity of an XΔY increment. The ΔY increment for use in determining XΔY is obtained by the flip-flop 974 in accordance with the operation of certain stages shown in FIGURE 19.

The signals representing positive ΔY increments pass from the left output terminal of the flip-flop 494 through the "and" network 1022 in FIGURE 19. The signals pass through the "and" network 1022 only at position 1 for a block so that the flip-flop 974 can operate in the remaining positions to control the production of the YΔX increment for the block. The signals pass through the "and" network 1022 only when a product is being obtained as represented by a relatively high voltage on the right output terminal of the flip-flop 606.

The signals from the "and" network 1022 are introduced through the "or" network 1036 to the "and" network 1038 for synchronization at optimum times in the clock cycles. The signals then pass to the left input terminal of the flip-flop 974 and trigger the flip-flop so as to produce a relatively high voltage on the left output terminal of the flip-flop. The stages 1022, 1036 and 1038 pass signals to the flip-flop 974 in accordance with the logical equation:

$$\overline{c}_2''=B_2\overline{G}_1P_1T \qquad (103)$$

Where:

$c_2''$=a triggering signal introduced to the left input terminal of the flip-flop 974;

$B_2$=a relatively high voltage on the left output terminal of the flip-flop 494; and the other terms have previously been defined.

The signals of high amplitude on the right output terminal of the flip-flop 494 pass through the "and" network 1044. The signals pass only at position 1 for blocks undergoing a product operation. This results from the connection of the "and" network 1044 to the "and" network 222 and to the right output terminal of the flip-flop 606. The signals from the "and" network 1044 pass through the "or" network 1052 to the "and" network 1054. These signals are synchronized by the "and" network 1054 at optimum times in the clock cycles and are introduced to the right input terminal of the flip-flop 974. The signals trigger the flip-flop 974 and produce a relatively high voltage on the right output terminal of the flip-flop. The flip-flop 974 receives signals passing through the stages 1044, 1052 and 1054 in accordance with the logical equation:

$$\overline{c}_2''=\overline{B}_2\overline{G}_1P_1T \qquad (104)$$

Where:

$\overline{c}_2''$=a triggering signal system introduced to the right input terminal of the flip-flop 974; and the other terms have previously been defined.

The increments of ΔX are combined to obtain the value of X. This value is represented for a block by the indications in the channel 156 for the block. Every time that a block is presented for computation, the indications in the channel 156 are combined with the indications representing the ΔX increment obtained for the block in that cycle of computation. The results obtained represent the new value of X for the block. These new results are obtained by combining in each position the indications representing X and ΔX for the position and the carry obtained by the addition in the previous position. The carry is represented by the operation of the flip-flop 938 shown in FIGURE 17.

As previously described, a positive ΔY increment is represented by an indication of "1" in the position of least significance and indications of "0" in the successive positions. A positive increment is represented in this manner when a ΔY increment is added to the value of Y to obtain a new value of Y for a block. This has been described in detail previously. Similarly, corresponding indications represent a positive ΔX increment when the ΔX increment is added to the value of X to obtain a new value of X.

Since an indication of "1" occurs only in the position of least significance for a positive ΔX increment, this indication of "1" may be represented by a relatively high voltage on the left output terminal of the carry flip-flop 938 in the position of least significance when the ΔX increment is added to X. In this way, the flip-flop 910 representing the ΔX increment may be triggered into an indication of "0" for each position in the block, as represented by a relatively high voltage on the right output terminal of the flip-flop. It is for this reason that a relatively high voltage on the left output terminal of the flip-flop 420 produces a relatively high voltage on the right output terminal of the flip-flop 910. This has been previously represented by the logic expressed in equation 102.

When a positive ΔX increment occurs, the carry flip-flop 938 must be triggered to its "true" state for the reasons discussed in the previous paragraph. The flip-flop 938 becomes triggered to its "true" state by the passage of a signal through the "and" network 944 in FIGURE 17 from the left output terminal of the flip-flop 420. A signal passes through the "and" network 944 from the flip-flop 420 only at position 1 for a block because of the connection from the "and" network 222 to the "and" network 944. The signal from the flip-flop 420 is able to pass through the "and" network 944 only when a product is being obtained since the "and" network 944 is connected to the right output terminal of the flip-flop 606. The signal is able to pass only when a relatively high voltage is simultaneously produced on the right output terminal of the flip-flop 736. As will be described in detail subsequently, the flip-flop 736 operates in a manner similar to the flip-flop 446 to indicate the occurrence of a "start" pulse. However, this "start" pulse occurs in the channel 154 and indicates the beginning of the signals representing the value of X in the channel 156 for the block undergoing computation.

The signals from the "and" network 944 pass through the "or" network 946 to the "and" network 948 for synchronization at optimum times in the clock cycles. The signals then pass to the left input terminal of the flip-flop 938 and trigger the flip-flop to produce a relatively high voltage on the left output terminal of the flip-flop. The operation of the stages 944, 946 and 948 in passing triggering signals to the flip-flop 938 can be logically expressed as:

$$c_3 = A_2\overline{S}_2\overline{G}_1P_1T \qquad (105)$$

Where:

$c_3$=a triggering signal introduced to the left input terminal of the flip-flop 938;

$\overline{S}_2$=a relatively high voltage on the right output terminal of the flip-flop 736; and the other terms have previously been defined.

It has previously been described that a negative ΔY increment is represented by an indication of "1" in each position for a block including the first position when the ΔY increment is combined with the value of Y to obtain a new value of Y. A negative ΔX increment is represented in a similar manner when the ΔX increment is combined with the value of X to obtain a new value of X. Because of this, the relatively high voltage on the right output terminal of the flip-flop 420 representing a negative ΔX increment produces a relatively high voltage on the left output terminal of the flip-flop 910 in acocrdance with the logic expressed in Equation 101.

When the flip-flop 910 is triggered to its "true" condition for a block, it remains in this condition for the remaining positions of the block to provide an indication of "1" for each position. Since the flip-flop 910 indicates "1" for every position including the position of least significance, the flip-flop 938 can be triggered to its "off" condition in the position of least significance. The flip-flop 938 is triggered to its "off" condition by signals passing through the "and" network 952 in FIGURE 17 from the right output terminal of the flip-flop 420. Signals pass through the "and" network 952 only at position 1 for blocks undergoing a product operation and only before the occurence of the "start" pulse in the channel 154. This results from the connections to the "and" network 952 from the "and" network 222 and the right output terminals of the flip-flops 606 and 736.

The signals from the "and" network 952 are introduced through the "or" network 956 to the "and" network 958. These signals are synchronized by the "and" network 958 at optimum times in the clock cycles and are then introduced to the right input terminal of the flip-flop 938. The signal triggers the flip-flop to produce a relatively high voltage on the right output terminal of the flip-flop 938. Signals pass through the stages 952, 956 and 958 to the flip-flop 938 in accordance with the logical equation:

$$c_3 = \overline{A}_2\overline{S}_2\overline{G}_1P_1T \qquad (106)$$

Where:

$\overline{c}_3$=a triggering signal introduced to the right input terminal of the flip-flop 938; and the other terms have previously been defined.

As described above, the indications of X in the channel 156 for a block are combined with the indications representing ΔX to obtain new indications representing X. Such a combination is obtained by the operation of certain stages shown in FIGURE 13. These stages include the stages 724, 726, 728, and 730. The stages 724, 726, 728 and 730 pass signals for particular combinations representing X and ΔX for a position and the carry resulting from the addition in the previous position. In this way, the "and" networks 724, 726, 728 and 730 pass signals for particular combinations of signals from the flip-flops 688, 910 and 938.

The signals from the "and" networks 724, 726, 728 and 730 pass through the "or" network 732 to the "and" network 734. The signals are able to pass through the "and" network 734 only after the occurrence of the "start" pulse in the channel 154 since this start pulse indicates that information relating to X follows in the channel 156. Such an indication is provided by a relatively high voltage on the left output terminal of the flip-flop 736. After the occurrence of the "start" pulse, the signals from the "or" network 732 pass through the "and" network 734 at optimum times in the clock cycles because of the connection between the "and" network 734 and the left output terminal of the flip-flop 164.

The signals from the "and" network 734 pass to the cathode follower 708 to indicate the new value of X for the block undergoing computation. The signals passing to the cathode follower 708 through the stages 724, 726, 728, 730, 732 and 734 can be logically expressed as, $$U_n = S_2T(UC_2C_3 + \overline{U}\overline{C}_2\overline{C}_3 + \overline{U}C_2\overline{C}_3) \qquad (107)$$

Where:

$U_n$=a signal introduced to the cathode follower 708;

$S_2$=a relatively high voltage on the left output terminal of the flip-flop 736;

$U$=a relatively high voltage on the left output terminal of the flip-flop 688;

$C_2$=a relatively high voltage on the left output terminal of the flip-flop 910;

$C_3$=a relatively high voltage on the left output terminal of the flip-flop 938; and the other terms have previously been defined.

As will be seen, the cathode follower 70 receives a signal only when the combinations of U, $C_2$ and $C_3$ represent decimal values of "3" or "1" for a position. A decimal value of "3" is equivalent in binary form to a value of "1" and a carry of "1" to the next position. It will be further seen that the various terms such as $UC_2C_3$, $C_3$, $\overline{U}\overline{C}_2C_3$, $U\overline{C}_2\overline{C}_3$ and $\overline{U}C_2\overline{C}_3$ are equivalent from the standpoint of binary addition to the various terms included in logical Equation 60.

In logical equation 107, a new value of X for a block is obtained by adding the indications of X, ΔX and the carry in all possible combinations. This procedure is relatively long in comparison to that obtained for adding the indications of Y and ΔY to obtain a new value of Y for each block every time that the block is presented for computation. The new value of Y has been previously designated as $Y_N$ and is obtained by the logic expressed in Equations 40 to 43, inclusive. Shortcuts are not used in obtaining the addition of X and ΔX for a block since more than one increment may occur in the value of X upon the presentation of the block for computation. This will be discussed in detail subsequently when the operation of a block as a servo will be presented.

The "and" networks 748, 750, 752 and 754 pass signals for various combinations of X, ΔX and a carry representing a binary indication of "0" for a position. The signals from the "and" networks 748, 750, 752 and 754 pass through the "or" network 740 to the "and" network 742 for synchronization at optimum times in the clock cycles. The signals then pass to the cathode follower 710 to represent an indication of "0" at a particular position in the new value of X for a block. The cathode follower 710 receives signals from the stages 748, 750, 752, 754, 740 and 742 in accordance with the logical equation:

$$\overline{U}_n=(\overline{S}_2+\overline{U}C_2C_3+U\overline{C}_2C_3+UC_2\overline{C}_3+\overline{U}\overline{C}_2\overline{C}_3)T \quad (108)$$

Where:

$\overline{U}_n$=a signal introduced in the cathode follower 710; and the other terms have been previously defined.

As will be in seen in FIGURE 13, the voltage on the right output terminal of the flip-flop 736 is introduced through the "or" network 740 to the "and" network 742. This causes indications of "0" to be introduced to the cathode follower 710 in all positions before and including the "start" pulse in the channel 154. This is equivalent to the inclusion of $\overline{S}_2$ as an "or" term in logical equation (108). Since $\overline{S}_2$ is included as an "or" term in the logical equation, the other terms can be effective only after the occurrence of the "start" pulse in the channel 154. For this reason, the other terms in equation (108) do not have to be modified by an indication of $S_2$ as an "and" term in a manner similar to the *inclusion of* $S_2$ as an "and" term in equation (107). These other terms provide indications of either "2" or "0" for a position. Since "2" is equivalent in binary form to an indication of "0" and a carry of "1" to the following position, all of the terms in Equation 108 formed from combinations of U, $C_2$ and $C_3$ will be indications of "0" for a position.

It has been described above that the new indications of X for a block are obtained after the occurrence of the "start" plus in the channel 154. This is a pulse permanently recorded in the channel and having an amplitude representing an indication of "1." The pulse is permanently recorded in the channel 154 in a position between positions 1 and 16, inclusive, for a block. For a product operation, a "start" pulse occurs in the channel 154 at the same time that a "start" pulse occurs in the channel 148. In this way, computation relating to increments of XΔY and YΔX are simultaneously initiated.

When a positive pulse occurs in the channel 154 in positions 1 to 16, inclusive, for a block, relatively high voltages are simultaneously produced on the left output terminal of the flip-flop 684 and the right output terminal of the flip-flop 210 in FIGURE 15. Such a simultaneous occurrence of voltages causes a signal to pass through the "and" network 834 and the "or" network 842 to the "and" network 844.

The "and" network 844 synchronizes the signals from the "or" network 842 at optimum times in the clock cycles and introduces them to the flip-flop 736 to trigger the flip-flop. This causes a relatively high voltage to be produced on the left output terminal of the flip-flop. A relatively high voltage is produced on the left output terminal of the flip-flop 736 by the passage of signals through the stages 834, 842 and 844 in accordance with the logical equation:

$$s_2=U_pJ_5\overline{S}_2T \quad (109)$$

Where:

$s_2$=a triggering signal introduced to the left input terminal of the flip-flop 736;

$U_p$=a relatively high voltage on the left output terminal of the flip-flop 684; and the other terms have previously been defined.

When a relatively high voltage is produced on the left output terminal of the flip-flop 736 to indicate the occurrence of a start pulse, it continues until the end of the operation controlled by the start pulse. This may occur at the end of a single-block operation or at the end of the second half of a double-block operation. This is represented by a relatively high voltage on the right output terminal of the flip-flop 390.

When a relatively high voltage occurs on the right output terminal of the flip-flop 390, a signal passes through the "and" network 850 at position 17 for the block undergoing computation. This signal passes through the "or" network 848 to the "and" network 846. The "and" network 846 synchronizes the signal at an optimum time in the clock cycle and introduces it to the right input terminal of the flip-flop 736. The signal triggers the flip-flop 736 to the false state of operation of the flip-flop and causes a relatively high voltage to be produced on the right output terminal of the flip-flop. Signals pass through the stages 850, 848 and 846 to the flip-flop 736 in accordance with the logical equation:

$$\overline{s}_2=\overline{G}_5P_{17}T \quad (110)$$

Where:

$\overline{s}_2$=a triggering signal introduced to the right input terminal of the flip-flop 736; and the other terms have previously been defined.

The information relating to the new value of X for a block is recorded in the channel 156 for subsequent utilization. As previously described, this information is obtained by the cathode followers 708 and 710 in FIGURE 13. The information is recorded by the operation of certain stages shown in FIGURE 28. These stages include the "or" network 1426, which passes the signals from the cathode follower 708 to the "and" network 1424. The "and" network 1424 in turn passes the signals from the "or" network 1426 only during the time that the digital differential analyzer is actually computing to solve a mathematical problem. This is represented by a signal from the cathode follower 1340.

The signals from the "and" network 1424 pass through the "or" network 1420 to the "and" network 1418 for synchronization at optimum times in the clock cycles. The signals then pass to the left input terminal of the flip-flop 1414 and trigger the flip-flop so as to produce signals of high amplitude on the left output terminal of the flip-flop. These signals are introduced to the coil 1416 for the recordation in the channel 156 of magnetic signals representing indications of "1." Signals pass to the flip-flop 1414 through the stages 1426, 1424, 1420 and 1418 in accordance with the logical equation:

$$_0u=\alpha U_nT \quad (111)$$

Where:

$_0u$=a triggering signal introduced to the left input terminal of the flip-flop 1414;

$U_n$=a signal from the cathode follower 708 to represent an indication of "1" for a position; and $\alpha$=a signal from the cathode follower 1340 to indicate that the digital differential analyzer is actually operating to solve a problem.

Just as the indications of "1" from the cathode follower 708 pass to the left input terminal in the flip-flop 1414, the indications of "0" representing the new value of X pass to the right input terminal of the flip-flop. These signals pass from the cathode follower 710 through the "and" network 1434. The "and" network 1434 becomes open for the passage of signals from the cathode follower 710 only after the occurrence of the "start" pulse in the channel 154, as represented by a relatively high voltage on the left output terminal of the flip-flop 736.

The signals from the "and" network 1434 are introduced through the "or" network 1442 to the "and" network 1444, which passes the signals only during the time that the digital differential analyzer is actually operating to solve a mathematical problem. The signals then pass through the "or" network 1446 to the "and" network 1448. The "and" network 1448 synchronizes the signals at optimum times in the clock cycles and introduces the signals to the right input terminal of the flip-flop 1414. These signals trigger the flip-flop 1414 such that signals of high amplitude are produced on the right output terminal of the flip-flop and signals of low amplitude are produced on the left output terminal of the flip-flop.

The signals of low amplitude on the left output terminal of the flip-flop 1414 are introduced to the coil 1416 to obtain a recordation of an indication of "0" in the channel 156 for the different positions. The flip-flop 1414 receives the signals passing through the stages 1434, 1442, 1444, 1446 and 1448 in accordance with the logical equation:

$$ {}_0u=\alpha\overline{U}_nS_2T \qquad (112) $$

Where:

${}_0\overline{u}$=a triggering signal introduced to the right input terminal of the flip-flop 1414;

$\overline{U}_n$=a signal from the cathode follower 710 to represent an indication of "0" for a position; and the other terms have previously been defined.

In order to insure the proper utilization of information in the channel 156, indications of "0" are recorded in the channel 156 for a block for all of the positions before and including the "start" pulse in the channel 154. These indications of "0" are recorded by the passage of signals through the "and" network 1440 in FIGURE 28. The "and" network 1440 passes signals only in these positions because of its connection to the right output terminal of the flip-flop 736. The "and" network 1440 passes signals only when a product operation is being performed as represented by a relatively high voltage on the right output terminal of the flip-flop 606.

The signals from the "and" network 1440 are introduced through the "or" network 1442 to the "and" network 1444. The "and" network 1444 passes the signals only when the digital differential analyzer is actually computing since it is connected to the cathode follower 1340. The signals from the "and" network 1444 then pass through the "or" network 1446 and the "and" network 1448 to the right input terminal of the flip-flop 1414. These signals trigger the flip-flop 1414 such that signals of high amplitude are produced on the right output terminal of the flip-flop and signals of low amplitude are produced on the left output of the flip-flop. The signals of low amplitude on the left output terminal of the flip-flop 1414 cause the coil 1416 to record magnetic signals representing indications of "0" in the channel 156. Triggering signals are introduced to the flip-flop 1414 through the stages 1440, 1442, 1444, 1446 and 1448 in accordance with the logical equation:

$$ {}_0\overline{u}=\alpha\overline{S}_2\overline{G}_1T \qquad (113) $$

where all of the terms have previously been defined.

As one of the steps in obtaining the product $Z=XY$, the differential combination represented by the XΔY increment must be obtained. This differential combination is obtained in a manner similar to that for obtaining the differential combination represented by the YΔX increments. The manner of obtaining the YΔX increments has been discussed fully above in connection with the operation of "normal" integration. The stages for obtaining the YΔX increments are shown in FIGURE 11 and are represented logically by Equations 49, 50, 51, 51*a*, 52, 52*a*, 53 and 53*a* given above.

Certain of the stages shown in FIGURE 13 operate to obtain the differential combination represented by the XΔY increments. These stages operate in a manner similar to corresponding stages shown in FIGURE 11 and discussed fully above. The stages shown in FIGURE 13 include the "and" networks 692, 698, 700 and 702. These networks operate to pass signals for various combinations of indications representing ΔY and the old and new values of X for a position and the carry resulting from the addition of the indications in the previous position.

The signals passing through the "and" networks 692, 698, 700 and 702 are introduced through the "or" network 704 to the "and" network 706 for synchronization at optimum times in the clock cycles. The signals then pass to the cathode follower 705.

The signals passing through the stages 692, 698, 700, 702, 704 and 706 to the cathode follower 705 can be logically expressed as:

$$ U=(C_2C_2''U_N+C_2C_2''\overline{U}_N+C_2C_2''+C_2C_2''U)T \qquad (114) $$

Where:

U=a signal introduced to the cathode follower 705 to represent an indication of "1" in a position for the XΔY increment for a block;

$C_2$=a relatively high voltage on the left output terminal of the flip-flop 910 to represent a positive ΔX increment;

$C_2''$=a relatively high voltage on the left output terminal of the flip-flop 974 to represent a positive ΔY increment;

$U_N$=a signal from the cathode follower 708 to represent an indication of "1" in the new value of X for a position;

$\overline{U}_N$=a signal from the cathode follower 710 to represent an indication of "0" in the new value of X for a position; and $U$=a relatively high voltage on the left output terminal of the flip-flop 688 to represent an indication of "1" in the old value of X for a position.

The various terms such as $C_2C_2''U_N$, $C_2\overline{C}_2''\overline{U}_N$, $\overline{C}_2C_2''U$ and $\overline{C}_2\overline{C}_2''\overline{U}$ are respectively equivalent to the terms expressed in equations 51, 53, 49 and 50. The old and new values of X are used in the different terms for the same reasons as described above in obtaining the increments represented by $y=Y\Delta X$. These values are used so that a positive truncation correction of ½ of an increment can be made regardless of the polarities of the increments in the independent and dependent quantities.

As will be seen, the term $C_2''$ in equation 114 represents the same function as the term $A_2$ in equations 51, 53, 49 and 50. Similarly, the term $C_2$ represents a function in equation 114 similar to the term $B_2$ in equations 51, 53, 49 and 50. However, the polarity of the term $C_2$ is inverted in equation 114 in comparison to that of the term $B_2$ in equations 51, 53, 49 and 50. The reason for this has been described above in connection with the discussion relating to the logic in equations 101 and 102. It results from the particular manner in which positive ΔX increments and negative ΔX increments are represented when these increments are combined with X.

The "and" networks 714, 716, 718 and 720 operate in a manner similar to the "and" networks 692, 698, 700 and 702 so as to pass signals for various combinations of the voltages from the flip-flops 688, 910 and 974 and the cathode followers 708 and 710. The signals passing through the "and" networks 714, 716, 718 and 720 provide indications of "0" in the various positions for a block to represent binary values of the differential combination YΔX for the positions. The signals from the "and" networks 714, 716, 718 and 720 pass through the "or" network 712 and the "and" network 715 to the cathode follower 713. The cathode follower 713 receives the signals passing through the stages 714, 716, 718, 720, 712 and 715 in accordance with the logical equation:

$$ \overline{U}=C_2C_2''\overline{U}_N+C_2\overline{C}_2''U_N+\overline{C}_2\overline{C}_2''U+\overline{C}_2C_2''\overline{U} \qquad (115) $$

Where:

$\overline{U}$=a signal passing to the cathode follower 713; and the other terms have previously been defined.

In order to obtain the value of $Z=XY$, the increments of YΔX and XΔY are combined. The increments of $Y\Delta X$ are combined to obtain a value of R as described above. The cumulative value of the various $Y\Delta X$ increments is represented in Equations 60 and 60*a* and is designated as $R_i$. In order to obtain the value $Z=XY$, each increment of $X\Delta Y$ (or U) is combined with the value of $R_i$ to obtain a $R_n$ value. The value $R_n$ represents the value of $Z=XY$ for a block.

These stages shown in FIGURE 14 operate the combine the value of $R_i$ and each increment of $X\Delta Y$ (or U) for a block to obtain the product $Z=XY$. The stages operate to obtain the product designated as $R_N$ by combining the indications of $R_i$ and U for each position and the carry of the addition from the previous position. This carry is indicated in the flip-flop 604 in FIGURE 14. A positive carry is represented by a relatively high voltage on the left output terminal of the flip-flop 604 and a negative carry is represented by a relatively high voltage on the right output terminal of the flip-flop.

The "and" networks 766, 770, 772 and 774 in FIGURE 14 operate to pass signals representing an indication of "1" for a position for various combinations of $R_i$, U and the carry from the flip-flop 604. These combinations correspond to an addition similar to that described above for obtaining $R_i$ and $\overline{R}_i$ as represented by Equations 60 and 60*a*. The signals from the "and" networks 766, 770, 772 and 774 pass through the "or" network 778 to the "and" network 780. Since the "and" network 780 is connected to the left output terminal of the flip-flop 736, the "and" network passes the signals from the "or" network 778 only in the positions after the occurrence of the "start" pulse in the channel 154. The signals passing through the "and" network 780 are introduced through the "or" network 786 to the "and" network 787 for synchronization at optimum times in the clock cycles. The signals then pass to the cathode follower 788 to represent indications of "1" in the product $Z=XY$ for a block. Signals are introduced to the cathode follower through the stages 766, 770, 772, 774, 778, 780, 786 and 787 in accordance with the logical equation:

$$R_N=S_2T(DR_iU+\overline{D}\overline{R}_iU+D\overline{R}_i\overline{U}+\overline{D}R_i\overline{U} \qquad (116)$$

Where:

$R_N$=a signal introduced to the cathode follower 788 to represent an indication of "1" for a position in a block performing a product operation;

$D$=a relatively high voltage on the left output terminal of the flip-flop 604;

$R_i$=a signal from the cathode follower 437;

$\overline{R}_i$=a signal from the cathode follower 464;

U=a signal from the cathode follower 705; and $\overline{U}$=a signal from the cathode follower 713.

Just as the "and" networks 766, 770, 772 and 774 operate to pass signals representing indications of "1" for the different positions, the "and" networks 792, 794, 796 and 798 operate to pass signals representing indications of "0." These signals pass through the "or" network 800 to the "and" network 802, which passes the signals only for the positions after the "start" pulse in the channel 154. The signals then pass through the "or" network 804 to the "and" network 805. The signals are synchronized by the "and" network at optimum times in the clock cycles and are introduced to the cathode follower 810. Signals pass through the stages 792, 794, 796, 798, 800, 802, 804 and 805 to the cathode follower 810 in accordance with the logical equation:

$$\overline{R}_N=S_2T(\overline{D}R_iU+D\overline{R}_iU+DR_i\overline{U}+\overline{D}\overline{R}_i\overline{U}) \qquad (117)$$

Where:

$\overline{R}_N$=a signal introduced to the cathode follower 810; and the other terms have previously been defined.

As described above, each increment of $X\Delta Y$ (or U) for a block is obtained by using the value of X either at the beginning or at the end of the $\Delta Y$ increment. Actually, the accuracy in the value of each $X\Delta Y$ increment (or U) could be enhanced by using a value intermediate to the values of X at the beginning and end of each $\Delta Y$ increment. Such an intermediate value is obtained by the technique of truncation correction described above in connection with the $Y\Delta X$ increments. The technique of truncation correction is accomplished by using for each $X\Delta Y$ increment a value of X halfway between the values at the beginning and end of the $\Delta Y$ increment. This truncation correction is represented by a value of $\frac{1}{2}\Delta X$.

In order to provide a correction of $\frac{1}{2}\Delta X$, an indication of "1" is added to the value of $R_N$ at the position of the "start" pulse in the channel 154. For example, when the value of $R_i$ at the start pulse is represented by an indication of "0," the indication is converted to an indication of "1." This conversion is accomplished by the passage of a signal through the "and" network 784 in FIGURE 14. A signal passes through the "and" network 784 when a signal is produced by the cathode follower 464 to represent an indication of "0" corresponding to a value of $\overline{R}_i$ for a position. The signal from the cathode follower 464 is able to pass through the "and" network 784 only in positions 1 to 17, inclusive, for each block because of the connection of the "and" network to the inverter 444. The signal passes through the "and" network 784 only at positions before and including the start pulse in the channel 154. This results from the connection between the "and" network 784 and the right output terminal of the flip-flop 736.

The signals from the "and" network 784 pass through the "or" network 786 and the "and" network 787 to the cathode follower 788 to represent an indication of "1." The passage of signals through the stages 784, 786 and 787 to the cathode follower 788 is controlled by the logical equation:

$$R_N=\overline{R}_i\overline{S}_2P_{1/17}T \qquad (118)$$

where all of the terms have previously been defined.

In this way, an indication of "0" representing $R_i$ is converted into an indication of "1" representing $R_N$ at the position of the "start" pulse to obtain a truncation correction.

The "and" network 808 becomes prepared for activation at the same time as the "and" network 784. However, the "and" network 808 passes signals from the cathode follower 437 representing indications of "1" for a position. The signals from the "and" network 808 pass through the "or" network 804 and the "and" network 805 to the cathode follower 810. These signals pass through the stages 808, 804 and 805 to the cathode follower 810 in accordance with the logical equation:

$$\overline{R}_N=R_i\overline{S}_2P_{1/17}T \qquad (119)$$

where all of the terms have previously been defined.

In this way, a truncation correction is obtained at the position of the start pulse to change an indication of "1" representing $R_i$ into an indication of "0" representing $\overline{R}_N$.

The operation of the carry flip-flop 604 at each position is controlled by the indications representing $R_i$ and $X\Delta Y$ (or U) for the previous position. The stages for controlling the operation of the carry flip-flop 604 are shown in FIGURE 23. These stages include the "and" network 1178 in FIGURE 23. The "and" network 1178 passes a signal only upon the simultaneous occurrence of indications of "1" for $R_i$ and U for a position as represented by signals from the cathode followers 437 and 705. The "and" network 1178 passes a signal only when a product operation is being performed in a block, as represented by a relatively high voltage on the right output terminal of the flip-flop 696. The "and" network 1178 passes a signal only in the positions after the start pulse in the channel 154 because of the connection between the "and" network and the left output terminal of the flip-flop 736.

The signals from the "and" network 1178 pass through the "or" network 1172 to the "and" network 1174 for synchronization at optimum times in the clock cycles. The signals then pass to the left input terminal in the flip-flop 604. The signals trigger the flip-flop 604 so as to produce a relatively high voltage on the left output terminal of the flip-flop. The flip-flop 604 has triggering signal introduced to it through the stages 1178, 1172 and 1174 in accordance with the logical equation:

$$d=UR_1\overline{G}_1S_2T \qquad (120)$$

Where:

$d$=a triggering signal introduced to the left input terminal of the flip-flop 604; and the other terms have previously been defined.

As will be seen, the above equation controlling the operation of the carry flip-flop 604 corresponds to the logic expressed in Equation 63, which controls the triggering of the carry flip-flop 432 into its true state to indicate a carry. In Equation 120, the expression $UR_1$ corresponds to the expression YR in Equation 63.

It has been discussed above and indicated in the table shown in FIGURE 36 that the carry flip-flop 432 is triggered to its false state only upon the simultaneous occurrence of false states of the two quantities being added. This is logically expressed in Equation 64. In like manner, the carry flip-flop 604 is triggered to its false state only when indications of "0" for a position simultaneously occur for the quantities $R_1$ and U. This triggering action is initiated by the simultaneous introduction of signals to the "and" network 1190 in FIGURE 23 from the cathode followers 464 and 713. The "and" network 1190 then passes a signal when relatively high voltages are introduced to it at the same time from the left output terminal of the flip-flop 736 and the right output terminal of the flip-flop 606.

The signals from the "and" network 1190 are introduced through the "or" network 1194 to the "and" network 1196 and are synchronized by the "and" network 1196 at optimum times in the clock cycles. The signals then pass to the right input terminal of the flip-flop 604. These signals trigger the flip-flop for the production of a relatively high voltage on the right output terminal of the flip-flop to represent a lack of carry from one position to the next. Signals pass through the stages 1190, 1194 and 1196 to the flip-flop 604 in accordance with the logical equation:

$$\overline{d}=\overline{U}R_1S_2\overline{G}_1T \qquad (121)$$

Where:

$\overline{d}$=the introduction of a triggering signal to the right input terminal of the flip-flop 604; and the other terms have previously been defined.

The question of a carry at the position of truncation correction should probably be discussed now. If the value of R at the start position is initially "0," a truncation correction in adding each YΔX increment to R will cause the value of $R_1$ to become "1" at the start position. At the same time, a carry indication is obtained by the flip-flop 432 as discussed above and expressed in Equation 59. When the XΔY increment (or Y) is added to $R_1$, a further truncation correction is produced. This truncation correction causes an indication of "1" at the start position for $R_1$ to change to an indication of "0" at the start position for $R_N$. As will be described subsequently, $R_N$ is recorded into the channel 152 to serve as the value of R in the next cycle of computation. In this way, the value of R at the start position remains "0" in each cycle of computation for a product operation. Similarly, a carry is obtained from the "start" position to the next position in each cycle of computation for a product operation.

Since a carry is obtained from the "start" position to the next position in each cycle of computation for a product operation, the carry flip-flop 604 can be triggered to its "true" state before the "start" pulse. This occurs by the passage of a signal through the "and" network 1130 in FIGURE 23. The "and" network 1180 passes a signal only at position 1 of a product operation because of its connection to the "and" network 222 and the right output terminal of the flip-flop 606. The "and" network 1180 passes a signal only before the occurrence of the "start" pulse in the channel 154, as represented by a relatively high voltage on the right output terminal of the flip-flop 736. As will become more apparent subsequently, this causes a signal to pass through the "and" network 1180 during the first half of a double-block operation but prevents a signal from passing through the "and" network during the second half of a double-block operation.

The signals from the "and" network 1180 pass through the "or" network 1172 to the "and" network 1174 for synchronization at optimum times in the clock cycles. The signals then pass to the left input terminal of the flip-flop 604 and trigger the flip-flop such that a relatively high voltage is produced on the left output terminal of the flip-flop. The flip-flop 604 is triggered by signals passing through the stages 1180, 1172 and 1174 in accordance with the logical equation:

$$d=\overline{G}_1\overline{S}_2P_1T \qquad (122)$$

where all of the terms have previously been defined.

In order to insure that the carry flip-flop 604 is ready for proper functioning at the beginning of each product operation, a signal passes through the "and" network 876 in FIGURE 23. As previously described, the "and" network 876 passes a signal at position 18 of a block when an indication of "1" appears in the channel 142 for the block. This indication represents a code to control the end of a product operation. The signal passing through the "and" network 876 is introduced through the "or" network 1194 in FIGURE 23 to the "and" network 1196. The "and" network synchronizes the signals at optimum times in the clock cycles and introduces the signals to the right input terminal of the flip-flop 604. These signals trigger the flip-flop 604 and cause a relatively high voltage to be produced on the right output terminal of the flip-flop. A relatively high voltage is produced on the right output terminal of the flip-flop 604 by the passage of signals through the stages 876, 1194 and 1196 in accordance with the logical equation:

$$\overline{d}=L_2P_{18}T \qquad (122a)$$

where all of the terms have previously been defined.

In order to perform a product operation in a single block, certain functions must be combined at position 18 of the block. This results from the fact that additions are being performed in each position. For example, several additions are required to obtain new values of Y and X and increments of YΔX and XΔY. Furthermore, other additions are required to combine the YΔX increment and the XΔY increment with the value of R to obtain a new value of R as represented by $R_N$.

The various functions are combined at position 18 so that the value of $R_1$ will represent the value of $R_N$ at this position. As has been previously described, no indication is provided at position 18 for Y representing the YΔX increment. In like manner, no indication is provided for U representing the XΔY increment at position 18. In this way, if the carry represented by the operation of the carry flip-flop 604 is inserted into Y at position 18, the addition of R and Y at position 18 will cause $R_1$ at position 18 to represent $R_N$.

The discussion in the previous paragraph may be seen from a specific example:

```
   Position 18       Position of Start Pulse
   ↓                 ↙
   11.10000-  A3
   10.110000  R
    1.011001  Y
   ----------
   00.001001  Ri
    1.110011  U
   00.00011.  D
   ----------
   01.111100  RN
```

As will be seen from the above example, the value of the carry represented by the D flip-flop 604 is transferred into Y at position 18 so that a single addition will cause $R_i$ to indicate $R_N$.

The transfer of the carry indications in the flip-flop 604 at position 18 is obtained by the operation of certain stages shown in FIGURE 11. These stages include the "and" network 602, which passes the signals of high amplitude on the left output terminal of the flip-flop 604. The "and" network 602 passes the signals from the flip-flop 604 only at position 18 for a block because of the connection between the "and" network 602 and the "and" network 216.

Since the "and" network 602 is connected to the right output terminal of the flip-flop 606, the "and" network is able to pass the information from the flip-flop 604 only for a product operation. Furthermore, the "and" network 602 is able to pass the signal only for a single-block operation or the second half of a double-block operation. This results from the connection between the "and" network 602 and the right output terminal of the flip-flop 390. The purpose of this will become more apparent subsequently. A signal is able to pass through the "and" network 602 only upon the occurrence of a proper coding as represented by an indication of "0" in the channel 150. Upon the occurrence of such as indication, a relatively high voltage is introduced from the right output terminal of the flip-flop 450 to the "and" network 602 to prepare the "and" network for activation.

Signals from the "and" network 602 pass through the "or" network 598 to the "and" network 607. These signals are synchronized at optimum times in the clock cycles and are introduced to the cathode follower 436. As previously described, the cathode follower 436 produces signals representing indications of "1" for Y in the different positions for a block The cathode follower 436 receives the signals passing through the stages 602, 598 and 607 in accordance with the logical equation:

$$Y=\overline{Y}D\overline{G}_1\overline{G}_5P_{18}T \qquad (123)$$

where all of the terms have previously been defined.

The "and" network 624 in FIGURE 11 becomes prepared for activation at the same time as the "and" network 602. However, the "and" network 624 passes the signals of high amplitude on the right output terminal of the flip-flop 604. These signals pass through the "or" network 626 and the "and" network 627 to the cathode follower 462, which provides signals representing indications of "0" corresponding to a value of $\overline{Y}$ in the different positions. Signals pass through the stages 624, 626 and 627 to the cathode follower 462 in accordance with the logical equation:

$$\overline{Y}=\overline{YDG}_1\overline{G}_5P_{18}T \qquad (124)$$

where all of the terms have previously been defined.

It has been described above that the indications designated as $R_N$ and $\overline{R}_N$ represent the new value of R for a block undergoing a product operation. These signals are recorded in the channel 152 to serve as the value of R for the block in the next cycle of computation. The signals are recorded by the operation of certain stages shown in FIGURE 27. These stages include the "and" network 1394 (FIGURE 27), which passes the indications of "1" from the cathode follower 788. The "and" network 1394 passes the signals from the cathode follower 788 only during the time that the digital differential analyzer is actually computing. This results from the connection between the "and" network 1394 and the cathode follower 1340. Furthermore, the "and" network 1394 passes the signals from the cathode follower 788 only during a product operation, as represented by a relatively high voltage on the right output terminal of the flip-flop 606.

The signals from the "and" network 1394 pass through the "or" network 1384 to the "and" network 1386. These signals are synchronized by the "and" network 1386 at optimum times in the clock cycles and are introduced to the left input terminal of the flip-flop 1388. The signals trigger the flip-flop 1388 for the production of signals of high amplitude on the left output terminal of the flip-flop. The signals of high amplitude on the left output terminal of the flip-flop 1388 are applied to the coil 1410 to obtain a recordation of an indication of "1" in the channel 152 for a particular position. Relatively high voltages are produced on the left output terminal of the flip-flop 1388 by the passage of signals through the stages 1394, 1384 and 1386 in accordance with the logical equation:

$$_0r=\alpha R_N\overline{G}_1T \qquad (125)$$

Where:

$_0r$=the introduction of a triggering signal to the left input terminal of the flip-flop 1388;

$R_N$=a signal from the cathode follower 788; and the other terms have previously been defined.

The "and" network 1404 becomes prepared for activation at the same time as the "and" network 1394. Because of its connection to the cathode follower 810, the "and" network 1404 passes indications of "0" for the different positions. These signals pass through the "or" network 1406 and the "and" network 1408 to the right input terminal of the flip-flop 1388. The signals trigger the flip-flop such that signals of high amplitude are produced on the right output terminal of the flip-flop and signals of low amplitude are produced on the left output terminal of the flip-flop. The signals of low amplitude on the left output terminal of the flip-flop 1388 are in turn introduced to the coil 1410 to obtain a recordation of indications of "0" in the channel 152. The triggering of the flip-flop 1388 by the passage of signals through the stages 1404, 1406 and 1408 can be logically expressed as:

$$_0\overline{r}=\alpha\overline{R}_N\overline{G}_1T \qquad (126)$$

Where:

$_0\overline{r}$=the introduction of a triggering signal to the right input terminal of the flip-flop 1388;

$\overline{R}_N$=a signal from the cathode follower 810 to represent an indication of "0," and the other terms have previously been defined.

It will be seen from the logic expressed in Equations 125 and 126 that the values of $R_N$ and $\overline{R}_N$ are recorded in the channel 152 during a product operation. This occurs even at position 18 since the logic expressed in Equations 125 and 126 is not limited by any particular position in a block, including position 18. However, as previously described, the indications of $R_i$ and $\overline{R}_i$ represent the new value of R at position 18 of a single-block operation or the second half of a double-block operation. For this reason, the indications of $R_i$ and $\overline{R}_i$ are respectively transferred to $R_N$ and $\overline{R}_N$ at position 18 so that the values of $R_N$ and $\overline{R}_N$ at this position can be recorded.

The transferral of $R_1$ and $\overline{R}_1$ to $R_N$ and $\overline{R}_N$ at position 18 for a block is effectuated by the operation of certain stages shown in FIGURE 14. These stages include the "and" network 782, which passes the signal indications representing $R_1$ from the cathode follower 437. The "and" network 782 passes the signals from the cathode follower 437 only at position 18 for a block since it is connected to the "and" network 216. The "and" network 782 passes the signals only at the end of a single-block operation or the second half of a double-block operation since it is connected to the right output terminal of the flip-flop 736. As previously described, a relatively high voltage cannot be produced on the right output terminal of the flip-flop 736 at position 18 of the first half of a double-block operation.

The signals from the "and" network 782 pass through the "or" network 786 to the "and" network 787 for synchronization at optimum times in the clock cycles. The signals then pass to the cathode follower 788, which provides indications of "1" for $R_N$ at the different positions. Signals pass to the cathode follower 788 through the stages 782, 786 and 787 in accordance with the logical equation:

$$R_N = R_1\overline{S}_2P_{18}T \qquad (127)$$

where all of the terms have previously been defined.

The "and" network 806 in FIGURE 14 becomes prepared for activation at the same time as the "and" network 782. However, the "and" network 806 passes signals representing $\overline{R}_1$ from the cathode follower 464. The signals from the "and" network 806 pass through the "or" network 804 to the "and" network 805 for synchronization at optimum times in the clock cycles. The signals then pass to the cathode follower 810 to represent indications of "0" for $R_N$. The cathode follower 810 receives signals passing through the stages 806, 804 and 805 in accordance with the logical equation:

$$\overline{R}_N = \overline{R}_1\overline{S}_2P_{18}T \qquad (128)$$

where all of the terms have previously been defined.

*Double-Length Product*

In multiplying two quantities, the number of significant digits in the product is often greater than the number of significant digits in either the multiplicand or the multiplier. Sometimes the positions of least significance in the product are not of special importance so that the number of positions representing the product can correspond to the number of positions representing the multiplicand or the multiplier. In such a situation, the multiplicand, the multiplier and the product can all be adequately indicated in one block.

Sometimes the product obtained by multiplying two numbers may be significant in all positions. In such a situation, undesirable errors might occur if the number of positions representing the product were shortened to the number of positions in one block. For this reason, two blocks are sometimes used to obtain a product. The product operation begins at some time in the first block and continues without interruption through the rest of the first block and through all of the second block.

Operation in a single-block or double-block basis is controlled by the flip-flop 390 and certain stages associated with the flip-flop in FIGURE 25. These stages include the "and" networks 1322 and 1324 in FIGURE 25. The "and" network 1322 passes a signal when a particular combniation of coded signals simultaneously appears in the channels 144 and 146 at position 18 for a block. This simultaneous combination of signals is represented by indications of "0" in the channels 144 and 146. The indications of "0" in the channels 144 and 146 cause relatively high voltages to be produced on the right output terminals of the flip-flops 314 and 318 at the same time that a signal is produced by the "and" network 216 to indicate position 18 for a block.

The signals from the "and" network 1322 pass through the "or" network 1326 to the "and" network 1328 for synchronization at optimum times in the clock cycles. The signals then pass to the left input terminal of the flip-flop 390. These signals trigger the flip-flop for the production of a relatively high voltage on the left output terminal of the flip-flop. Triggering signals pass to the flip-flop 390 through the stages 1322, 1326 and 1328 in accordance with the logical equation:

$$g_5 = \overline{L}_3\overline{L}_4P_{18}T \qquad (129)$$

Where:

$g_5$=the introduction of a triggering signal to the left input terminal of the flip-flop 390; and the other terms have previously been defined.

The flip-flop 390 can also be triggered by a simultaneous indication of "0" in the channels 140 and 142 at position 18 for a block. The simultaneous indications of "0" in the channels 140 and 142 cause relatively high voltages to be introduced at the same time to the "and" network 1324 from the right output terminals of the flip-flop 306 and 310. This causes a signal to pass from the "and" network 1324 through the "or" network 1326 and the "and" network 1328 to the left input terminal of the flip-flop 390. The signals triggers the flip-flop 390 for the production of a relatively high voltage on the left output terminal of the flip-flop. Signals pass through the stages 1324, 1326 and 1328 to the left input terminal of the flip-flop 390 in acordance with the logical equation:

$$g_5 = \overline{L}_1\overline{L}_2P_{18}T \qquad (130)$$

where all of the terms have previously been defined.

The codings of $\overline{L}_3\overline{L}_4$ or $\overline{L}_1\overline{L}_2$ at positions 18 for a block occur only when the next operation is to involve a double block. In this way a relatively high voltage is obtained on the left output terminal of the flip-flop 390 during the first half of a double-block operation. The relatively high voltage on the left output terminal of the flip-flop 390 continues until position 1 of the second half of the double-block operation. At this time, a signal passes through the "and" network 1330 in FIGURE 25. A signal passes through the "and" network 1330 at position 1 of the second half of the double-block operation because of the connection between the "and" networks 1330 and 222. The signal can pass only in the second half of the double-block operation because of the introduction of a relatively high voltage from the left output terminal of the flip-flop 446 to the "and" network 1330. This voltage represents the "start" pulse in the channel 148. A start pulse can occur in the channel 148 only at position 1 of the second half of a double-block operation and not at position 1 of the first half of a double-block operation since the information representing Y in the channel 150 starts only after position 1 of the first block.

The signals passing through the "and" network 1330 are introduced to the right input terminal of the flip-flop 390. These signals trigger the flip-flop such that a relatively high voltage is produced on the right output terminal of the flip-flop. The relatively high voltage on the right output terminal of the flip-flop 390 continues until another double-block operation is to be initiated. In this way, the relatively high voltage on the right output terminal of the flip-flop 390 indicates either a single-block operation or the second half of a double-block operation. Relatively high voltages are produced on the right output terminal of the flip-flop 390 in accordance with the logical equation:

$$\overline{g}_5 = S_1P_1T \qquad (131)$$

Where:

$\overline{g}_5$=the introduction of a triggering signal to the right input terminal of the flip-flop 390; and the other terms have previously been defined.

It has previously been described that certain special operations are performed at position 18 of a block undergoing a product operation. These operations are performed in order to make certain that the product operation is completed during the block. The operations are represented logically by Equations 123 and 124. As will be seen, the term $\overline{G}_5$ is included in each of Equations 123 and 124. For this reason, these operations cannot be performed at position 18 in the first half of a double-block operation. At position 18 of the first half of a double-block operation, the digital differential analyzer operates on a normal basis of combining $R_1$ and $X\Delta Y$ (or Y) at this position to obtain $R_N$. Only at position 18 of the second half of the double-block operation does the logic represented by Equations 123 and 124 become effective to control the signal indications obtained at this position.

The "start" pulse in the channel 154 for a double-block operation occurs in the first block at a position before position 18. This pulse causes a relatively high voltage to be produced on the left output terminal of the flip-flop 736 in accordance with the logic expressed in Equation 109 discussed above. The relatively high voltage on the left output terminal of the flip-flop 736 continues during the remaining positions of the first block and through most of the positions in the second block. For this reason, a value of $R_N$ or $\overline{R}_N$ is obtained at position 18 of the first block in accordance with the logic expressed in Equations 116 and 117. This value is recorded in the channel 152 in accordance with the logic expressed above in Equations 125 and 126. It is only at position 18 of the second block in the double-block operation that the value of $R_1$ becomes effective. This value of $R_1$ is transferred to $R_N$ in accordance with the logic expressed in Equations 127 and 128 so as to be recorded in the channel 152.

In double-length products, a feedback operation is generally included as a step in obtaining the product. This feedback operation is in the nature of a servo function to maintain the information within particular limits. The feedback occurs in each cycle of computation from the error information obtained in the previous cycle of computation. The feedback is from the channel 138 to the channel 152 and occurs during the first half of the double-block operation. The feedback from the channel 138 to the channel 152 is positive when a negative overflow has occurred from the channel 152 to the channel 138 in the second half of the double-block operation. Similarly, the feedback from the channel 138 to the channel 152 is negative when a positive overflow has occurred from the channel 152 to the channel 138 in the previous cycle of computation. This is in accordance with well established servo principles.

The feedback information introduced to the channel 152 is obtained from overflow signals previously recorded in the channel 138. This overflow information is fed back through certain stages included in FIGURE 21, one of the stages being the "and" network 1084. This network passes the signals of high amplitude on the right output terminal of the flip-flop 292 to represent an overflow of "0" in the channel 138. The "and" network 1084 passes the information from the flip-flop 292 only in the first half of a double-block operation because of its connection to the left output terminal of the flip-flop 390. The "and" network 1084 passes the signals from the flip-flop 292 only at position 12 of the particular blocks controlled by the flip-flop 390. The choice of position 12 is arbitrary since the passage of the signal through the "and" network 1084 can occur at any time before position 17. This will become more apparent from the subsequent discussion.

The signals from the "and" network 1084 pass through the "or" network 1092 in FIGURE 21 to the "and" network 1094. The "and" network 1094 synchronizes the signals at optimum times in the clock cycles and introduces the signals to the left input terminal of the flip-flop 456. These signals trigger the flip-flop 456 for the production of a relatively high voltage on the left output terminal of the flip-flop. The flip-flop 456 receives the signals passing through the stages 1084, 1092 and 1094 in accordance with the logical equation:

$$f_2 = Z_4 G_5 P_{12} T \qquad (132)$$

Where:

$f_2$=the introduction of a triggering signal to the left input terminal of the flip-flop 456;

$P_{12}$=a signal from the "and" network 1088; and the other terms have previously been defined.

The flip-flop 456 is triggered to its "off" condition at the end of a single-block operation or at the end of the second block in a double-block operation. This results from the introduction of signals from the "and" network 216 to the "and" network 1096 to prepare the "and" network 1096 for activation at position 18 for a block. The "and" network 1096 is able to pass signals only for single-block operations or for the second half of double-block operations because of the connection between the "and" network and the right output terminal of the flip-flop 390.

The signals passing through the "and" network 1096 are applied through the "or" network 1100 to the "and" network 1102. These signals are synchronized by the "and" network 1102 at optimum times in the clock cycles and are introduced to the right input terminal of the flip-flop 456. The signals trigger the flip-flop 456 to produce a relatively high voltage on the right output terminal of the flip-flop. A high voltage is produced on the right output terminal of the flip-flop 456 by the passage of signals through the stages 1096, 1100 and 1102 in accordance with the logical equation:

$$\overline{f}_2 = \overline{G}_5 P_{18} T \qquad (132a)$$

Where:

$\overline{f}_2$=the introduction of a triggering signal to the right input terminal of the flip-flop 456; and the other terms have previously been defined.

Since the flip-flop 456 is triggered to its "off" condition at the end of each operation, as expressed by the logic in Equation 132*a*, it is not necessary to trigger the flip-flop upon the occurrence of an indication of "1" in the channel 138. For this reason, logic such as $\overline{f}_2 = Z_4 \overline{G}_5 P_{12} T$ does not have to be included to trigger the flip-flop to its off condition in the first half of a special product operation. The logic such as $\overline{f}_2 = \overline{Z}_4 \overline{G}_5 P_{12} T$ would correspond to that expressed in Equation 132. Because of this, the flip-flop 456 represents by the voltages on its output terminals the feedback information from the channel 138 to the channel 152 at a position before position 17 in the first half of a double-block operation.

Since the operation of the flip-flop 456 in the first half of a double-length product represents overflow information in the channel 138, this information can be considered as providing an increment in the differential combination R. The increment in the differential combination is added to the value of R to obtain a new value of R for the special product. Since only one increment from the channel 138 is being added to R for the special product operation in each cycle of computation, the addition of R and ΔR can be performed in a manner similar to that discussed above for the addition of Y and ΔY. The logic controlling the addition of Y and ΔY has been discussed above under "normal" integration and has been expressed logically in Equations 40, 41, 43 and 44. As has been described in detail previously, the term $B_3$ and $\overline{B}_3$ in Equations 40, 41, 43 and 44 represents a carry or lack of carry resulting from the addition of ΔY and Y.

Since the addition of R and ΔR is performed in a manner similar to the addition of Y and ΔY, a carry flip-flop must be included. The carry or lack of carry for the addition of R and ΔR is represented by the operation of the flip-flop 458 and certain associated stages shown in FIGURE 22. These stages include the "and" network 1118 in FIGURE 22. The "and" network 1118 passes a signal in the first half of a double-block operation because of its connection to the left output terminal of the flip-flop 390. The "and" network passes a signal only at position 16 for the block since it receives the signals from the "and" network 1122. The choice of position 16 is arbitrary since any position before position 17 for the block could have been chosen.

The signals from the "and" network 1118 pass through the "or" network 1124 to the "and" network 1126 for synchronization at optimum times in the clock cycles. The signals then pass to the left input terminal of the flip-flop 458. These signals trigger the flip-flop so as to produce a relatively high voltage on the left output terminal of the flip-flop. Relatively high voltages are produced on the left output terminal of the flip-flop 458 by the passage of signals through the stages 1118, 1124 and 1126 in accordance with the logical equation:

$$f_3=G_5P_{16}T \qquad (133)$$

Where:

$f_3$=the introduction of a triggering signal to the left input terminal of the flip-flop 458; and the other terms have previously been defined.

The combination of R and ΔR is controlled by certain stages shown in FIGURE 12. These stages include the "and" networks 652 and 654, the "or" network 656 and the "and" network 657, all of which operate to pass signals to the cathode follower 659. The signals introduced to the cathode follower 659 represent indications of "1" for the different positions in the value of R. The stages 652, 654, 656 and 657 operate in accordance with the logical equation:

$$\mathsf{R}=R\overline{F}_3+\overline{R}F_3 \qquad (134)$$

Where:

$\mathsf{R}$=a signal introduced to the cathode follower 659;
$F_3$=a relatively high voltage on the left output terminal of the flip-flop 458;
$\overline{F}_3$=a relatively high voltage on the right output terminal of the flip-flop 458; and the other terms have previously been defined.

As will be seen, the logic expressed in Equation 134 for R is similar to that expressed in Equations 40 and 43 for Y.

The "and" networks 640 and 642, the "or" network 636 and the "and" network 639 operate to pass signals to the cathode follower 637. These signals represent indications of "0" for the different positions in the value of R for a block. Signals pass to the cathode follower 637 through the stages 640, 642, 636 and 639 in accordance with the logical equation:

$$\overline{\mathsf{R}}=RF_3+\overline{RF}_3 \qquad (134a)$$

Where:

$\mathsf{R}$=the introduction of a signal to the cathode follower 637; and the other terms have previously been defined.

It will be seen that the logic expressed in Equation 134*a* is similar to that expressed in Equations 41 and 44.

When the flip-flop 458 becomes triggered to its true state at position 16, it remains in this state until the occurrence of particular patterns of infromation in the flip-flop 456 and the channel 138. These patterns of information are controlled by the operation of certain stages shown in FIGURE 22. These stages include the "and" networks 1156 and 1158 in FIGURE 22. The "and" network 1156 passes signals upon the simultaneous occurrence of relatively high voltages on the left output terminal of the flip-flop 456 and the right output terminal of the flip-flop 646, the latter flip-flop being triggered in accordance with the information in the channel 138. Similarly, the "and" network 1158 passes a signal when relatively high voltages are simultaneously produced on the right output terminal of the flip-flop 456 and the left output terminal of the flip-flop 646.

The signals from the "and" networks 1156 and 1158 pass through the "or" network 1154 and the "and" network 1150. The signals pass through the "and" network 1150 only upon the simultaneous introduction of a relatively high voltage from the "or" network 1152. The "or" network 1152 in turn passes a signal only when any one of several propositions is true. For example, a signal passes through the "or" network 1152 when a product operation is not being performed, as represented by a relatively high voltage on the left output terminal of the flip-flop 606. Similarly, a signal passes through the "or" network 1152 when a "special" product is not being performed, as represented by a relatively high voltage on the right output terminal of the flip-flop 924. A definition of "special" products will be made subsequently.

In like manner, signals pass through the "or" network 1152 at positions other than position 17 for a block because of the connection of the "or" network 1152 to the left output terminal of the flip-flop 170 and the right output terminal of the flip-flop 210. A signal also passes through the "or" network 1152 from the cathode follower 962 to indicate that particular conditions during a "special" product operation are not occurring. The reasons for the passage of the various signals through the "or" network 1152 will be discussed in detail hereinafter.

The signals from the "and" network 1150 pass through the "or" network 1140 to the "and" network 1142. The "and" network 1142 passes the signals only when a relatively high voltage has been produced on the left output terminal of the flip-flop 458 to indicate that a carry in the addition of R and ΔR is still being obtained. The signals passing through the "and" network 1142 are introduced to the right input terminal of the flip-flop 458 to trigger the flip-flop. When the flip-flop 458 is triggered, a relatively high voltage is produced on the right output terminal of the flip-flop. The signals passing to the flip-flop 458 under the control of the stages 1156, 1158, 1154, 1152, 1150, 1140 and 1142 can be logically expressed as:

$$\overline{f}_3=F_3(a+\overline{C}'_2+J_1+\overline{J}_5+G_1)(R\overline{F}_2+\overline{R}F_2)T \qquad (135)$$

Where:

$a$=a signal from the cathode follower 962;
$\overline{C}'_2$=a relatively high voltage on the right output terminal of the flip-flop 924; and the other terms have previously been defined.

It will be seen from the above equation that the terms $R\overline{F}_2+\overline{R}F_2$ are at least partly instrumental in turning off the carry flip-flop 458. These terms are similar to corresponding logic expressed in Equations 42 and 45 and controlling the triggering of the flip-flop 538 to its off condition.

In a double-block product, certain problems are involved in the operation of the flip-flop 432 (FIGURE 8), which indicates the carry resulting from the addition of Y and R in the different positions. This results from the fact that the carry flip-flop 432 is normally operative only in positions 2 to 18, inclusive, of a block, as expressed logically in Equations 63 and 64 and discussed fully above. This would prevent the carry flip-flop 432 from operating at position 1 in the second half of a double-block operation. However, operation at this position is necessary since addition of Y and R is occurring at position 1 in the second block of a double-length operation.

Operation of the carry flip-flop 432 at position 1 in the second block of a double-length product is obtained by the inclusion of certain stages shown in FIGURE 8. These stages include the "and" network 434. The "and" network 434 becomes prepared for activation at position 1 in the second half of a double-block operation since it is connected to the left output terminal of the flip-flop 390. As discussed fully above and expressed logically in Equation 131, the flip-flop 390 has a relatively high voltage on its left output terminal at this position since it is triggered to its false state at the end of the position.

When activated, the "and" network 434 passes a signal upon the simultaneous occurrence of signals from the cathode followers 436 and 659 respectively representing Y and R. The "and" network 434 passes a signal upon the simultaneous occurrence of Y and R for the same reasons as discussed above and expressed logically in Equation 63. The signal from the "and" network 434 passes through the "or" network 440 to the "and" network 439 for synchronization at optimum times in the clock cycles. The signals then pass to the left input terminal of the flip-flop 432. The signals trigger the flip-flop 432 so as to produce a relatively high voltage on the left output terminal of the flip-flop. This high voltage is produced by the passage of signals through the stages 434, 440, and 439 in accordance with the logical equation:

$$a_3=\mathbf{YR}G_5T \qquad (136)$$

where all of the terms have previously been defined.

The "and" network 460 becomes activated at the same time as the "and" network 434. However, the "and" network 460 passes signals upon the simultaneous occurrence of signals of high amplitude from the cathode followers 462 and 637. This is in accordance with the logic expressed above in Equation 64. The signals from the "and" network 460 pass through the "or" network 466 to the "and" network 467, which synchronizes the signals at optimum times in the clock cycles. The signals are then introduced to the flip-flop 432 to trigger the flip-flop for the production of a relatively high voltage on the right output terminal of the flip-flop. The flip-flop 432 is triggered by the passage of signals through the stages 460, 466 and 467 in accordance with the logical equation:

$$\bar{a}_3=\overline{\mathbf{YR}}G_5T \qquad (136a)$$

where all of the terms have previously been defined.

As described above, in double-product operations signals representing error increments are introduced to the first one of the two blocks at position 12 for the block. This is in accordance with the logic expressed in Equations 132 and 132*a*. In order to introduce such error signals, the error at the end of the two blocks must be recorded in the Z channel 138. This error is recorded by the operation of certain stages shown in FIGURE 8.

The stages for recording the error signals in the second half of a double-block operation include the "and" network 442 in FIGURE 8. The "and" network 442 passes a signal only upon the simultaneous introduction of high voltages from the right output terminal of the flip-flop 390 and the left output terminal of the flip-flop 450. This simultaneous combination of signals provides a coding to indicate the second half of a double-block operation.

When the "and" network 442 becomes prepared for activation, it passes a signal only at position 18 for a block because of its connection to the "and" network 216. Furthermore, signals are able to pass through the "and" network 442 only upon the simultaneous occurrence of a relatively high voltage on the right output terminal of the flip-flop 1388, which records information relating to R in the channel 152 in accordance with the logic expressed above in Equations 61 and 62. A relatively high voltage on the right output terminal of the flip-flop 1388 at position 18 in the second half of a double-block operation indicates a positive value of R for the operation.

The signals from the "and" network 442 pass through the "or" network 440 to the "and" network 439 for synchronization at optimum times in the clock cycles. The signals then pass to the left input terminal of the flip-flop 432 and trigger the flip-flop so as to produce a relatively high voltage on the left output terminal of the flip-flop. This causes a signal of high amplitude to be recorded in the channel 138 at position 1 of the following block, in accordance with the logic expressed in Equation 65. The flip-flop 432 becomes triggered by the passage of signals through the stages 442, 440 *and* 439 in accordance with the logical equation:

$$a_3={}_0\overline{R}Y\overline{G}_5P_{18}T \qquad (137)$$

where all of the terms have previously been defined.

The "and" network 468 also becomes prepared for activation at position 18 in the second half of a double-block operation. This results from the fact that the "and" network 468 is connected to the "and" network 216, the right output terminal of the flip-flop 390 and the left output terminal of the flip-flop 450. When the "and" network 468 becomes prepared for activation, it passes the signals of high amplitude on the left output terminal of the flip-flop 1388. Such signals indicate a negative value for R in the double-block operation.

The signals from the "and" network 468 pass through the "or" network 466 to the "and" network 467. The "and" network 467 synchronizes the signals at optimum times in the clock cycles and introduces the signals to the right input terminal of the flip-flop 432. This causes the flip-flop 432 to be triggered into its false state of operation as represented by a relatively high voltage on the right output terminal of the flip-flop. The operation of the flip-flop 432 in its false state causes an indication of "0" to be recorded in the channel 138 at position 1 of the following block in accordance with the logic expressed in Equation 66. The flip-flop 432 receives the signals passing through the stages 468, 466 and 467 in accordance with the logical equation:

$$\bar{a}_3={}_0RY\overline{G}_5P_{18}T \qquad (138)$$

where all of the terms have previously been defined.

Since the proposition "$Y\overline{G}_5$" indicates the second half of a double-block operation, the Y channel 150 must be permanently coded with an indication of "1" at the proper positions. This is obtained by the operation of certain stages including the "and" network 1338 in FIGURE 26. The "and" network 1338 becomes prepared for activation only during the periods of actual computation, as represented by signals of high amplitude from the cathode follower 1340. The "and" network 1338 becomes further prepared for activation only at position 18 of a single-block operation or the second half of a double-block operation. This results from the connections made to the "and" network 1338 from the "and" network 216 and the right output terminal of the flip-flop 446. At such times, the "and" network 1338 passes the signals of high amplitude on the left output terminal of the flip-flop 450. Signals of high amplitude are produced on the left output terminal of the flip-flop 450 when indications of "1" are recorded in the channel 150. As a practical matter, the signals are initially coded into the channel 150 only at position 18 in the second half of a double-block operation and not at position 18 of a single-block operation.

The signals from the "and" network 1338 are introduced through the "or" network 1346 to the "and" network 1348 and are synchronized by the "and" network 1348 at optimum times in the clock cycles. The signals then pass to the left input terminal of the flip-flop 1332 and trigger the flip-flop into its true state, as represented by a relatively high voltage on the left output terminal of the flip-flop. This causes an indication of "1" to be recorded by the coil 1333 in the channel 150. Signals pass to the left input terminal of the flip-flop 1332 through the stages 1338, 1346 and 1348 in accordance with the logical equation:

$${}_0y=\alpha Y\overline{S}_1P_{18}T \qquad (139)$$

where all of the terms have previously been defined. In this way, the coded indications of "1" in the channel 150 are recirculated in every cycle of computation.

The "and" network 1364 becomes prepared for activation at the same time as the "and" network 1338 and passes the signals of high amplitude on the right output terminal of the flip-flop 450. These signals pass through the "or" network 1366 and the "and" network 1368 to the right input terminal of the flip-flop 1332. The signals trigger the flip-flop 1332 into its false state such that an indication of "0" is recorded by the coil 1333 in the channel 150. Signals are introduced to the right input terminal of the flip-flop 1332 through the stages 1364, 1366 and 1368 in accordance with the logical equation:

$$_0\overline{y}=\alpha\overline{Y}\overline{S}_1P_{18}T \qquad (140)$$

where all of the terms have previously been defined.

*Double-Length Special Products*

In certain product operations involving two blocks, it may be desired to use the information in the channel 156 for some other purpose during the second block while the product operation is being performed. For example, it may be desired to use the information in the channel 156 during the second of the two blocks for a servo operation while the product operation is being performed during the presentation of the block for computation. Because of this, certain logic has been included to control the operation of these "special" products.

"Special" product operations are represented by a relatively high voltage on the left output terminal of the flip-flop 924. Such a voltage is produced by the operation of certain stages including the "and" network 970 shown in FIGURE 18. The "and" network 970 passes a signal only upon the occurrence of a particular coding represented by indications of "0" in the channels 140 and 142. This causes signals of high amplitude to be simultaneously introduced to the "and" network 970 from the right output terminals of the flip-flops 306 and 310. The "and" network 970 passes signals representing such a coding only at position 18 of a single-block operation or at position 18 of the second block in a double-block operation. This results from the introduction to the "and" network 970 of signals from the "and" network 216 and from the right output terminal of the flip-flop 390.

The signals from the "and" network 970 pass through the "or" network 978 to the "and" network 980 for synchronization at optimum times in the clock cycles. The signals then pass to the left input terminal of the flip-flop 924 and trigger the flip-flop so as to produce a relatively high voltage on the left output terminal of the flip-flop. Such a relatively high voltage is produced by the passage of signals through the stages 970, 978 and 980 in accordance with the logical equation:

$$c_2'=\overline{L}_1\overline{L}_2\overline{G}_5P_{18}T \qquad (141)$$

Where:

$c_2'$=the introduction of a triggering signal to the left input terminal of the flip-flop 924; and the other terms have previously been defined.

The flip-flop 924 operates to distinguish "special" products from normal products of either a single length or double length. Because of this, normal product operations of a single length or double length are represented by a relatively high voltage on the right output terminal of the flip-flop 924. This voltage is produced for a particular coding in the channels 140 and 142, as represented by simultaneous indications of "1" in the channel 140 and "0" in the channel 142. These indications cause relatively high voltages to be simultaneously produced on the left output terminal of the flip-flop 306 and on the right output terminal of the flip-flop 310.

Signals pass through the "and" network 988 in FIGURE 18 when relatively high voltages are simultaneously produced on the left output terminal of the flip-flop 306 and the right output terminal of the flip-flop 310.

Signals are able to pass through the "and" network 988 only upon the completion of a previous operation, as represented by signals from the "and" network 216 and the right output terminal of the flip-flop 390.

The signals from the "and" network 988 are introduced through the "or" network 992 to the "and" network 994. The signals are synchronized by the "and" network 994 at optimum times in the clock cycles and are then introduced to the right input terminal of the flip-flop 924 to trigger the flip-flop. This causes a relatively high voltage to be produced on the right output terminal of the flip-flop 924. The logical equation controlling the passage of signals to the flip-flop 924 through the stages 988, 992 and 994 can be expressed as:

$$\overline{c}_2'=L_1\overline{L}_2\overline{G}_5P_{18}T \qquad (141a)$$

Where:

$\overline{c}_2'$=the introduction of a triggering signal to the right input terminal of the flip-flop 924; and the other terms have previously been defined.

Because of the fact that the channel 156 is available only during the first half of a "special" product, indications representing the XΔY increment (or U) for the special product must be dummied into the second half of the double-block operation. For example, it might be considered that all of the positions in the second half of a special-product double-block operation would have indications of "0" for a positive XΔY increment. Similarly, it might be considered that all of the positions in the second half of a special-product double-block operation would have indications of "1" when the XΔY increment is negative.

Since all of the indications in the second half of a double-block operation are all "0" or all "1," the combination of the XΔY increment with $R_1$ would proceed in a manner similar to the combination of a ΔY increment with Y or a ΔR increment with R. This will become more apparent subsequently. The main difficulty would occur at position 18 of the first half of the double-block operation. Furthermore, indications in the channel 156 are available only during the first block. For these reasons, it would be desirable to make a determination before the end of the first block as to the output at position 18 of the first block. In order to obtain such a determination, the effect of the various indications at position 18 would have to be anticipated. This anticipation occurs at the end of position 17 so that the computation can actually be made at position 18.

In FIGURE 37, a table is shown for anticipating at position 17 the effects of various indications at position 18. These indications represent the various increments which can be made in the value of $R_1$ at position 18 to obtain a value of $R_N$. One of the quantities is the overflow indication in the channel 138, which controls the operation of the flip-flop 456 in accordance with the logic expressed in Equation 132 and in the discussion following Equation 132. An indication of "0" in the channel 138 represents a negative overflow equivalent on a binary basis to a value of −1. An indication of "1" represents a positive overflow in the channel 138 equivalent on a binary basis to a value of +1.

In the second column of the chart shown in FIGURE 37, possible values for the XΔY increment (designated as "U") at position 18 are shown. An indication of "0" in a position would actually represent a binary value of "0" at the position. An indication of "1" would represent a value of −1 in the position. Since a representation of the XΔY increment at position 18 is being made at position 17, the indications in the second column of the table shown in FIGURE 37 should be weighted. Because of the fact that the indications in position 18 are twice as important on a binary scale as the indications in position 17, an indication of "1" at position 17 should have a value of −2 if it is to represent the value at position 18. An indication of "0" at position 17 still has a value of "0" even though it represents position 18 since multiplying a value of "0" by any number still gives "0" as the product.

The third column in the table shown in FIGURE 37 represents the possible carry from position 17 to position 18. An indication of "0" represents a lack of carry equivalent to a value of "0." An indication of "1" in the third column represents a carry. Since the carry is from one position to the position of next highest significance, it has a value of +2 at the position of next highest significance.

As will be seen in the table shown in FIGURE 37, all possible combinations in the indications representing the overflow pulse, the XΔY increment (U) and the carry (D) resulting from the addition of $R_1$ and U are included. The fourth column indicates the cumulative value in the increment of R at position 18. This is represented in the table shown in FIGURE 37 by the designation Σ*d*R. The value of Σ*d*R is indicated in decimal form in column 4 of FIGURE 37. It represents the decimal quantity which must be added to $R_1$ at position 18 to obtain $R_N$. Each value of Σ*d*R in the fourth column of the table shown in FIGURE 37 is obtained by adding the decimal values of the quantities in the first three columns of the table.

As will be seen from the table shown in FIGURE 37, in almost all instances the sign of Σ*d*R shown in the fourth column is similar to that representing the sign of the decimal value represented by the *d*Z pulse shown in column 1. There are two exceptions, designated by "E" after the value in the fourth column of the table. In the first of these exceptions, the sign of Σ*d*R is positive but the sign of *d*Z is negative. In the second exception, the sign of Σ*d*R is negative and the sign of *dz* is positive. There are also two other special situations which are included in the fourth column of the table shown in FIGURE 27.

These are represented by decimal values of −3 or +3 for Σ*d*R.

A second table is shown in FIGURE 38. This table indicates different possible combinations of $R_1$, XΔY(U) and the carry D at position 17. A carry is indicated in the third column to represent the carry at position 17 from position 16. This carry is added to the value of $R_1$ in the second column and of XΔY (designated as "U") in the first column. The values of $R_1$ and U are those which occur at position 17 of the block undergoing computation. The binary carry or lack of carry resulting from the addition of the quantities in the first three columns is indicated in the fourth column. The indications in the fourth column represent the carry or lack of carry from position 17 to position 18.

The channel 156 is not used in the second block of a special product operation. For this reason, indications of "1" are dummied into every position of the second block as well as the last position of the first block, or, as an alternative, indications of "0" are dummied into each position. This causes the indication of XΔY (designated as "U") at position 17 to be the same as the indication of XΔY at position 18. Because of this, the indication in the second column of the table shown in FIGURE 37 is the same at any instant as the indication in the first column of the table shown in FIGURE 38. The third column of the table shown in FIGURE 37 is the same as the fourth column of the table shown in FIGURE 38 since they both represent the carry from position 17 to position 18.

The first exception in the table shown in FIGURE 37 is represented by an indication of "0" for U at position 17 and an indication of "1" for the carry D from position 17 to position 18. The only possibility for this occurrence in the table shown in FIGURE 38 is that represented in the fourth horizontal row. In the fourth horizontal row, the carry in the fourth column can be expressed as:

$$P_{18}D=\bar{U}R_1DP_{17}$$

Furthermore, the first exception in the table shown in FIGURE 37 can be expressed as $F_2\bar{U}P_{18}D$, where $F_2$ indicates a negative polarity for the *dz* increment. The expression $F_2\bar{U}P_{18}D$ is obtained from the representation of the quantities in the second horizontal row of the table shown in FIGURE 37. Substituting the value for $P_{18}D$ obtained from the table shown in FIGURE 38 in the expression $F_2\bar{U}P_{18}D$, the expression $F_2\bar{U}R_1DP_{17}$ is obtained. Since a positive increment in Σ*d*R results from this exception as expressed in the fourth vertical column of the table shown in FIGURE 37, the flip-flop 456 representing Σ*d*R should be triggered to its true state.

The flip-flop 456 is triggered to its true state for the exception discussed in the previous paragraph in accordance with the operation of certain stages shown in FIGURE 21. These stages include the "and" network 1086 in FIGURE 21. The "and" network 1086 passes a signal only upon the simultaneous occurrence of signals representing $D\bar{U}R_1P_{17}$. This results from the connection between the "and" network 1086 and the cathode followers 437 and 713, the "and" network 208 and the left output terminal of the flip-flop 604. Signals are able to pass through the "and" network 1086 only upon the occurrence of the first half of a double-block operation as represented by a relatively high voltage on the left output terminal of the flip-flop 390. Signals are able to pass through the "and" network 1086 only during a special product operation because of the introduction to the "and" network of signals from the right output terminal of the flip-flop 606 and the left output terminal of the flip-flop 924.

The signals from the "and" network 1086 pass through the "or" network 1092 to the "and" network 1094. These signals are synchronized at optimum times in the clock cycles by the "and" network 1094 and are introduced to the left input terminal of the flip-flop 456. The signals trigger the flip-flop 456 so as to produce a relatively high voltage on the left output terminal of the flip-flop. The flip-flop 456 is triggered to its true condition by the passage of signals through the stages 1086, 1092 and 1094 in accordance with the logical equation:

$$f_2=D\bar{U}R_1C_2'G_1G_5P_{17}T \qquad (142)$$

where all of the terms have previously been defined.

The second exception designated as ("E") in the fourth column of the table shown in FIGURE 37 is illustrated in the seventh horizontal row of the table. This exception can be represented from the table shown in FIGURE 37 as $F_2U\bar{D}P_{18}$. As will be seen in the table shown in FIGURE 38, only one possible combination will produce a simultaneous occurrence of $U\bar{D}P_{18}$. This occurs in the fifth horizontal row of the table shown in FIGURE 38. As will be seen, the fifth horizontal row of the table shown in FIGURE 38 can be represented as:

$$\bar{D}P_{18}=\bar{U}R_1\bar{D}P_{17}$$

Substituting the expression obtained from the table shown in FIGURE 38 in the expression obtained from the table shown in FIGURE 37, the latter expression can be represented as:

$$F_2U\bar{R}_1\bar{D}P_{17}$$

Since the resultant increment in R for such a simultaneous occurrence has a negative polarity as indicated in the seventh horizontal row of the table shown in FIGURE 37, the flip-flop 456 should be triggered to its false condition to represent a negative increment.

The flip-flop 456 is triggered to its false condition for the exception discussed in the previous paragraph by the passage of signals through the "and" network 1098, the "or" network 1100 and the "and" network 1102 shown in FIGURE 21. The "and" network 1098 passes signals only upon the simultaneous occurrence of $UR_1\overline{D}P_{17}$. Such a simultaneous occurrence is indicated by signals of high amplitude from the "and" network 208, the cathode followers 464 and 705 and the right output terminal of the flip-flop 604. The "and" network 1098 passes the signals only in the first block of a special-product, double-block operation. This is represented by the simultaneous occurrence of relatively high voltages on the left output terminals of the flip-flops 390 and 924 and the right output terminal of the flip-flop 606.

The signals from the "and" network 1098 are introduced through the "or" network 1100 to the "and" network 1102 for synchronization at optimum times in the clock cycles. The signals then pass to the right input terminal of the flip-flop 456. The signals trigger the flip-flop 456 and cause a relatively high voltage to be produced on the right output terminal of the flip-flop. Signals pass to the right input terminal in the flip-flop 456 through the stages 1098, 1100, 1102 in accordance with the logical equation $$f_2=DU\overline{R}_1C_2'\overline{G}_1G_5P_{17}T \qquad (143)$$

where all of the terms have previously been defined.

In the previous paragraphs, two exceptions have been developed from the tables shown in FIGURES 37 and 38. These exceptions occur when the $\Sigma dR$ increment does not have the same polarity as the $dZ$ increment represented by overflows in the channel 138. The exceptions have been represented on a logical basis as $$D\overline{U}R_1+\overline{D}U\overline{R}_1$$

For reasons which will become more apparent subsequently, it is desirable to control the operation of cathode followers in accordance with the occurrence or lack of occurrence of these exceptions. The cathode followers 962 and 964 have been included in the digital differential analyzer for this purpose. Their operation is controlled by certain stages shown in FIGURE 18.

The "and" networks 1014 and 1016 shown in FIGURE 18 control in part the operation of the cathode follower 964. The "and" network 1014 receives signals from the cathode followers 437 and 713 and from the left output terminal of the flip-flop 604 so as to pass a signal upon the occurrence of one of the exceptions discussed in the previous paragraph. The "and" network 1014 passes signals upon the occurrence of the other exception because of its connection to the cathode followers 464 and 705 and the right output terminal of the flip-flop 604. The signals from the "and" networks 1014 and 1016 pass through the "or" network 1012 to the cathode follower 964. In this way, the stages 1014, 1016 and 1012 pass signals to the cathode follower 964 in accordance with the logical equation:

$$\overline{a}=(D\overline{U}R_1+\overline{D}UR_1)T \qquad (144)$$

Where:

$\overline{a}$=the introduction of a signal to the cathode follower 964; and the other terms have previously been defined.

Just as the cathode follower 964 produces signals representing the occurrence of the two exceptions discussed above, the cathode follower 962 produces signals represening any occurrence other than the two exceptions. The cathode follower 962 produces such signals by the operation, at least in part, of the "or" networks 1002 and 1008 in FIGURE 18. The "or" network 1002 passes a signal when relatively high voltages are introduced from either of the cathode followers 464 or 705 or from the right output terminal of the flip-flop 604. Similarly, a signal passes through the "or" network 1008 upon the occurrence of a signal of high amplitude in either of the cathode followers 437 or 713 or on the left output terminal of the flip-flop 604.

The signals from the "or" networks 1002 and 1008 are introduced to the "and" network 1010 in FIGURE 18. The "and" network 1010 passes the signals only at position 17 for a block because of the connection between the "and" network 1010 and the "and" network 208. The "and" network 1010 passes the signals from the "or" networks 1002 and 1008 only at position 17 for a block, since this is the only time at which the two exceptions discussed above and represented logically in Equation 144 can occur. The signals passing through the "and" network 1010 are in turn introduced to the cathode follower 962. Signals are introduced to the cathode follower 962 through the stages 1002, 1008 and 1010 in accordance with the logical equation:

$$a=P_{17}T(D+\overline{U}+R_1)(\overline{D}+U+\overline{R}_1) \qquad (145)$$

Where:

$a$=a signal introduced to the cathode follower 962; and the other terms have previously been defined.

As will be seen, the term $(D+\overline{U}+R_1)$ in Equation 145 is true at any time when $DUR_1$ is not true. This is in accordance with well established principles of Boolean algebra. Similarly, the term $(\overline{D}+U+\overline{R})$ is true at any time when the exception represented by $D\overline{U}R_1$ is not true.

It has been discussed above that two exceptions occur at position 17 for a special product operation. These exceptions occur where the sign of $\Sigma dR$ cannot be represented by the sign of the $dZ$ increment. Two special situations also exist. These are illustrated in the table shown in FIGURE 37. The special situations occur when $\Sigma dR$ has decimal values of either +3 or −3. The special situations occur because of the difficulty in adding decimal value of ±3 in a single position such as position 18. Actually, values of ±3 would have to be added on a binary basis in two positions, such as positions 18 and 19, where position 18 would indicate a binary value of 1 and position 19 would indicate a value of 2. Position 19 would actually be position 1 of the following block.

As will be seen in the table shown in FIGURE 37, a value of $\Sigma dR=-3$ is obtained when U as shown in vertical column 2 has a binary indication of "1" and the carry from position 17 to position 18 as shown in column 3 has a binary indication of "0." These indications correspond to the second exception shown in FIGURE 37 and designated by an "(E)" in the fourth vertical column of the figure. For this reason, the special situation where $\Sigma dR=-3$ can be represented logically as $DUR_1P_{17}$. This logic was developed above for the second exception shown in the table constituting FIGURE 37.

In like manner, a second special situation is included in the table shown in FIGURE 37. This special situation is represented by the sixth horizontal row in the table and is designated as "special" since the value of $$\Sigma dR=+3$$

For this special situation, the binary indication of U at position 17 is "0" and the carry indication from position 17 to position 18 is "1." As will be seen, these indications correspond to the indications of U and the carry D for the first exception designated as "(E)" in the fourth column of the table shown in FIGURE 37. Since the second special situation corresponds to the first exception in the values of U and the carry D, the second special situation can be logically expressed as:

$$\overline{U}R_1DP_{17}$$

This logic representation was developed above for the first exception included in the table shown in FIGURE 37.

In order to add decimal values of +3 or −3 before the end of the first block in a special product operation, certain controls over the operation of the carry flip-flop 457 *must* be exercised. These controls can be seen by adding the combinations of $\Sigma dR=+3$ with all of the possible values of R. The logic controlling the operation of the carry flip-flop 458 will be developed from these examples. It will subsequently be shown how the same logic controls the addition of $\Sigma dR=-3$ to all of the possible values of R.

A decimal value of $\Sigma dR=+3$ can be represented by indications of "1" at the two positions of least significance and indications of "0" in all of the following positions. Since the indications representing $\Sigma dR$ are initially added at position 17, the two positions of least significance can be considered as positions 17 and 18. The following examples illustrate the addition of a binary quantity representing $\Sigma dR=+3$ to all of the possible binary quantities representing different value of R:

```
R     0 0 0 0  ←Postion 17
ΣdR   0 0 1 1
      -------
      0 0 1 1
←
      0 0 0 1
      0 0 1 1
      -------
      0 1 0 0

      0 0 1 0
      0 0 1 1
      -------
      0 1 0 1

      0 0 1 1
      0 0 1 1
      -------
      0 1 1 0

      0 1 0 0
      0 0 1 1
      -------
      0 1 1 1

      0 1 0 1
      0 0 1 1
      -------
      1 0 0 0

      0 1 1 0
      0 0 1 1
      -------
      1 0 0 1

      0 1 1 1
      0 0 1 1
      -------
      1 0 1 0
```

Certain basic rules of complementation can be developed from the above examples. For example, it will be seen that the indications representing R at position 17 are complemented for every possible value of R. Thus, an indication of "1" for R at position 17 is complemented to an indication of "0" and an indication of "0" for R at position 17 is complemented to an indication of "1." In each of the examples where R has an indication of "0" at position 17, the complementation in the indication of R continues at position 18. The complementation continues at such instances whether R has an indication of "1" or an indication of "0" at position 18. However, when R has an indication of "1" at position 17, no complementation occurs at position 18. No complementation occurs in such instances whether R has an indication of "1" or an indication of "0" at position 18.

In the instances where complementation occurs at position 18, complementation continues into position 19 (or in other words, position 1 of the following block) if the indication of R at position 18 is "1." The complementation continues in subsequent positions until after the first indication of "0" has been presented for R in one of the subsequent positions. If complementation has been provided at position 18 but the indication of R at position 18 is "0," complementation is not provided at position 19 (position 1 of the next block) or in any of the subsequent positions.

It has been described above that the indication of R at position 18 is not complemented if R has an indication of "1" at position 17. In any case where complementation is not provided at position 18 it is resumed at position 19 (position 1 of the next block). This may be seen from the above examples. The complementation then continues until after *the first* indication of "0" for R is presented in one of the subsequent positions.

The logic controlling the operation of the flip-flop 458 can be developed in accordance with the above discussion. For example, the carry flip-flop 458 in FIGURE 22 is initially triggered to its true condition at position 16 in accordance with the logic expressed in Equation 133. Complementation then occurs in position 17 whether the indication of R at this position is "1" or "0." Complementation continues in position 18 when R has an indication of "0" at position 17. The complementation continues until after the first indication of "0" has been presented in one of the positions for R after position 18. This subsequent triggering of the flip-flop 458 to its off condition is controlled by the operation of certain stages shown in FIGURE 22 and including the "or" network 1152.

The "or" network 1152 in FIGURE 22 can pass a signal for any position except position 17. This results from the introduction to the "or" network 1152 of the signals on the left output terminal of the flip-flop 170 and the right output terminal of the flip-flop 210. The "or" network passes such a signal at any position other than position 17 for any type of operation including a special-product operation. The "or" network 1152 is able to pass a signal even for position 17 when the operation is not a product operation, as represented by a relatively high voltage on the left output terminal of the flip-flop 606. Even if the operation should be a product operation, the "or" network is able to pass a signal at any position including position 17 provided that the operation is not a special product. This results from the connection between the "or" network 1152 and the right output terminal of the flip-flop 924. Furthermore, even with a special-product operation, the "or" network 1152 is able to pass a signal at any position including position 17 provided that a signal is introduced from the cathode follower 962 to indicate that none of the special situations at position 17 is occurring. In this way, the "or" network 1152 passes a signal at any time other than when a special situation occurs at position 17 of a special product operation.

The signals from the "or" network 1152 are introduced to the "and" network 1150 to control the times at which signals pass through the "and" network 1150 from the "or" network 1154. The "or" network 1154 in turn serves as an electrical conduit for signals from the "and" networks 1156 and 1158. The "and" network 1156 becomes prepared for activation when a relatively high voltage is produced on the left output terminal of the flip-flop 456 to indicate a positive polarity for the increments in R. When this voltage occurs, a signal is able to pass through the "and" network 1156 only upon the occurrence of an indication of "0" for R as represented by a relatively high voltage on the right output terminal of the flip-flop 646.

The signals passing through the "and" network 1150 are introduced through the "or" network 1140 to the "and" network 1142. The "and" network 1142 passes the signals only when a relatively high voltage is introduced from the left output terminal of the flip-flop 458 as previously described. When this occurs, signals pass through the "and" network 1142 to the right input terminal of the flip-flop 458 to trigger the flip-flop for the production of a relatively high voltage on the right output terminal of the flip-flop. The flip-flop 458 receives the signals passing to it under the control of the stages 1150, 1152, 1154, 1156, 1140 and 1142 in accordance with the logical equation:

$$\overline{J}_3=(a+\overline{C}_2'+J_1+\overline{J}_5+G_1)\overline{R}F_2T \qquad (146)$$

where all of the terms have previously been defined. It may be seen that this equation is included in Equation 135 previously described. In this way, the flip-flop 458 is returned to its false state at any position except position 17 and at position 17 when neither of the special situations represented by Equation 144 exists.

As described above, no complementation occurs at position 18 for a special situation when R has an indication of "1" at position 17 of a special product and the cumulative value of $\Sigma dR=+3$. Complementation is prevented at position 18 by triggering the flip-flop 458 to its false state at the end of position 17. This is accomplished by certain stages including the "and" network 1148 shown in FIGURE 22. The "and" network 1148 passes a signal only upon the simultaneous occurrence of indications of "1" for R and $dR$. These occurrences are respectively represented by relatively high voltages on the left output terminals of the flip-flops 646 and 456. As previously described and expressed logically in Equation 142, a relatively high voltage is produced on the left output terminal of the flip-flop 456 at position 17 to indicate the special situation in which $\Sigma dR$ has a decimal value of +3.

The signals passing through the "and" network 1148 are introduced through the "or" network 1144 to the "and" network 1143. The "and" network 1143 passes these signals only at position 17 of a special product, as represented by signals of high amplitude from the "and" network 208, the left output terminal of the flip-flop 924 and the right output terminal of the flip-flop 606. The signals are able to pass through the "and" network 1143 only upon the occurrence of a special situation since the "and" network is connected to the cathode follower 964. These special situations are expressed logically in Equation 144.

The signals from the "and" network 1143 pass through the "or" network 1140 to the "and" network 1142. The "and" network 1142 in turn passes the signals only upon the occurrence of a relatively high voltage on the left output terminal of the flip-flop 458. The signals passing through the "and" network 1142 are applied to the right input terminal of the flip-flop 458. These signals trigger the flip-flop for the production of a relatively high voltage on the right output terminal of the flip-flop. The flip-flop 458 produces relatively high voltages on its right output terminal by the passage of triggering signals through the stages 1148, 1144, 1143, 1140 and 1142 in accordance with the logical equation:

$$\bar{f}_3=F_3\bar{a}C_2'\bar{G}_1P_{17}RF_2T \qquad (147)$$

where all of the terms have previously been defined.

The carry flip-flop 458 is triggered back to its true state at position 18 if it was previously triggered off at position 17. This may be seen from the examples given above and from the above discussion. The carry flip-flop is triggered back on at position 18 by the passage of a signal through the "and" network 1120 in FIGURE 22. The "and" network 1120 can pass a signal only at position 18 because of its connection to the "and" network 216. The "and" network 1120 can pass a signal at position 18 only in the first block of a special-product operation. This results from the fact that the "and" network 1120 is connected to the left output terminals of the flip-flop 390 and 924 and the right output terminal of the flip-flop 606. The "and" network 1120 can further pass a signal only upon a previous triggering of the flip-flop 458 to its off condition. A signal is able to pass through the "and" network 1120 only at this time because of the connection between the "and" network and the right output terminal of the flip-flop 458.

The signals from the "and" network 1120 are introduced through the "or" network 1124 to the "and" network 1126 for synchronization at optimum times in the clock cycles. The signals then pass to the left input terminal of the flip-flop 458. The signals trigger the flip-flop 458 so as to produce a relatively high voltage on the left output terminal of the flip-flop. The flip-flop 458 is triggered by the signals passing through the stages 1120, 1124 and 1126 in accordance with the logical equation:

$$f_3=C_2'\bar{F}_3\bar{G}_1G_5P_{18}T \qquad (148)$$

where all of the terms have previously been defined.

If the carry flip-flop 458 is triggered to its false state at the end of position 17 in accordance with the logic expressed in Equation 147, it remains in its true state at position 18. For this reason, the logic expressed in Equation 146 would have no effect. If the logic expressed in Equation 146 has no effect, the carry flip-flop 458 is again triggered to its off condition after the first indication of "0" for R after position 18. The flip-flop 458 is triggered to its off condition at this time in accordance with the logic expressed in Equation 146 and discussed fully above.

The above discussion has related to the special situation occurring from the combination of R and $\Sigma dR=+3$. Another special situation arises when the indications of R are combined with the indications of $\Sigma dR=-3$. The indications of $\Sigma dR=-3$ are obtained by inverting the binary indications of $\Sigma dR=+3$ and adding on indication of "1" to the least significant digit. This is in accordance with well established principles of logical algebra. By this system, binary indications of 1101 are obtained to represent $\Sigma dR=-3$, where the least significant digit is at the right.

The various possible combinations on a binary basis of R and $\Sigma dR=-3$ are as follows:

```
0 0 0 0  R
1 1 0 1  ΣdR
-------
1 1 0 1

0 0 0 1  R
1 1 0 1  ΣdR
-------
1 1 1 0

0 0 1 0  R
1 1 0 1  ΣdR
-------
1 1 1 1

0 0 1 1  R
1 1 0 1  ΣdR
-------
0 0 0 0

0 1 0 0  R
1 1 0 1  ΣdR
-------
0 0 0 1

0 1 0 1  R
1 1 0 1  ΣdR
-------
0 0 1 0

0 1 1 0  R
1 1 0 1  ΣdR
-------
0 0 1 1

0 1 1 1  R
1 1 0 1  ΣdR
-------
0 1 0 0
```

As will be seen from the above examples, the indications of R at position 17 are inverted whether the indications are "0" or "1" at this position. The indications of R are further complemented at position 18 if R has an indication of "1" at position 17. The complementation continues until after the first indication of "1" has been presented for R in a position after position 17.

When the indication of R is "0" at position 17, no complementation is provided for R at position 18. No complementation is provided for R at position 18 whether the indication of R is "1" or "0" at this position. However, complementation is started again at position 19 (position 1 of the following block) when it is stopped at position 18. The complementation continues in the subsequent positions until after the first indication of "1" has been presented in one of the subsequent positions after position 18.

As previously disclosed, the flip-flop 458 is triggered to its true state at position 16 in accordance with the logic expressed in Equation 133. Since the flip-flop 458 is triggered to its true state at this position, it remains in its true state at position 17. Because of this, complementation of R occurs at position 17 when $\Sigma dR=-3$, since complementation is able to occur only when the flip-flop 458 is operating in its true state. The complementation occurs at position 17 whether R has an indication of "1" or an indication of "0" at this position. If an indication of "1" has been presented for R at position 17, complementation continues in the subsequent positions until after the first indication of "1" has been presented for R in one of the subsequent positions.

The "and" network 1158 passes a signal upon indications of "1" for R when the polarity of $\Sigma dR$ is negative. This results from the fact that the "and" network 1158 is connected to the left output terminal of the flip-flop 646 and the right output terminal of the flip-flop 456. The signals from the "and" network 1158 pass through the "or" network 1154 to the "and" network 1150. The "and" network 1150 is able to pass these signals at any time except when a special situation occurs at position 17 for a special product operation. The "and" network 1150 becomes prepared for operation at such times because of the operation of the "or" network 1152 as discussed fully above.

The signals from the "and" network 1150 pass through the "or" network 1140 and the "and" network 1142 and trigger the flip-flop 458 to its false state of operation. When the flip-flop 458 becomes triggered to its false state of operation, the indications of R become the indications of R without change. This is in accordance with the logic expressed in Equations 134 and 134a and discussed fully above. The flip-flop 458 becomes triggered to its false state by the passage of signals through the stages 1152, 1158, 1154, 1150, 1140 and 1142 in accordance with the logical equation as previously expressed in Equation 135.

$$\bar{J}_3=F_3(A+\bar{C}_2'+J_1+\bar{J}_5+G_1)R\bar{F}_2T \qquad (149)$$

where all of the terms have previously been defined.

At position 18, complementation does not occur if the indication of R at position 17 is "0" and if $\Sigma dR=-3$. Since the flip-flop 456 reflects by its operation the polarity of $\Sigma dR$ except under the two situations designated as "(E)" in the table shown in FIGURE 37, the flip-flop has a relatively high voltage on its right output terminal when $\Sigma dR=-3$. For this reason, complementation does not occur at position 18 when the proposition $\bar{R}\bar{F}_2$ is true at position 17.

Because of its connections to the flip-flops 646 and 456, the "and" network 1146 in FIGURE 22 passes a signal when the proposition $\bar{R}\bar{F}_2$ is true. This signal passes through the "or" network 1144 to the "and" network 1143. The "and" network 1143 passes the signal only at position 17 of a special product and only when a special situation as represented by a signal from the cathode follower 964 occurs at this time. Upon passing through the "and" network 1143, the signal passes through the "or" network 1140 and the "and" network 1142 provided that a relatively high voltage is produced on the left output terminal of the flip-flop 458 at this time. The signal then triggers the flop-flop 458 for the production of a relatively high voltage on the right output terminal of the flip-flop. This voltage is produced under the control of the stages 1146, 1144, 1143, 1140 and 1142 in accordance with the logical equation:

$$\bar{J}_3=F_3\bar{x}C_2'\bar{G}_1P_{17}\bar{R}\bar{F}_2T \qquad (150)$$

where all of the terms have previously been defined.

When the flip-flop 458 is triggered off at position 17 for the addition of R and $\Sigma dR=-3$ in a special product, it is triggered back to its true state at position 18. This is in accordance with the above discussion. The flip-flop 458 is triggered on again in accordance with the logic expressed above in Equation 148. As expressed in this logic, the flip-flop 458 is triggered to its true state at position 18 of the first block in a special product. The flip-flop 458 is triggered to its true state in accordance with the passage of signals through the stages 1120, 1124, and 1126.

After position 18, the operation of the flip-flop 458 is controlled in a normal manner. Because of this, the flip-flop 458 is triggered to its false state at the position after the first indication of "1" for R appearing in one of the subsequent positions provided that the value of $\Sigma dR$ is negative as represented by a relatively high voltage on the right output terminal of the flip-flop 456. This is in accordance with the logic expressed in Equation 149 and discussed above. As discussed above, this logic corresponds to logic expressed in Equations 42 and 45 and discussed in detail.

It will be appreciated from the above discussion that all of the important operations in a special product are concentrated in the first of the two blocks used in the operation. The operation in the second block is somewhat routine. Furthermore, the special operations are completed at position 17 of the first block except where $\Sigma dR=\pm 3$. Because of this, the flip-flop 924 can be triggered to its false state at position 17, except where $\Sigma dR=\pm 3$. As previously described, the flip-flop 924 is coded to represent a special product operation in its true state.

Certain stages shown in FIGURE 18 control the triggering of the flip-flop 924 to its false state at position 17 of a special product. Four of these stages are the "or" networks 1002 and 998 and the "or" networks 1008 and 1000. Signals pass through the "or" networks 1002 and 998 when $\Sigma dR$ is not $+3$ and signals pass through the "or" networks 1008 and 1000 when $\Sigma dR$ is not $-3$. These signals are introduced to the "and" network 996, which passes a signal only when signals are introduced to it from both of the "or" networks 998 and 1000. The signals from the "or" networks 998 and 1000 are able to pass through the "and" network 996 only at position 17 of a product operation, as represented by signals from the "and" network 208 and the right output terminal of the flip-flop 606.

The signals from the "and" network 996 pass through the "or" network 992 to the "and" network 994. These signals are synchronized by the "and" network 994 at optimum times in the clock cycles and are introduced to the right input terminal of the flip-flop 924. The signals trigger the flip-flop 924 for the production of a relatively high voltage on the right output terminal of the flip-flop. This voltage indicates a routine operation in the subsequent positions of the special product. A relatively high voltage is produced on the right output terminal of the flip-flop 924 by the passage of signals through the stages 1002, 998, 1008, 1000, 996, 992 and 994 in accordance with the logical equation:

$$\bar{C}_2'=\bar{G}_1P_{17}T(\bar{D}+\bar{F}_2+U+\bar{R}_1)(R+F_2+\bar{U}+R_1) \qquad (151)$$

where all of the terms have previously been defined.

Since the channel 156 is not being used in the second half of a special product operation, the "start" flip-flop 736 associated with the channel does not have to remain on during this time. For this reason, the flip-flop 736 is triggered off at position 17 of a special product. This is accomplished by the passage of a signal through the "and" network 852 in FIGURE 15. The "and" network 852 passes a signal at position 17 of a special product because of its connections to the "and" network 208 and the left output terminal of the flip-flop 924.

The signals from the "and" network 852 pass through the "or" network 848 to the "and" network 846 for synchronization at optimum times in the clock cycles. The signals then pass to the right input terminal of the flip-flop 736 and trigger the flip-flop so as to produce a relatively high voltage on the right output terminal of the flip-flop. The flip-flop 736 receives the signals passing through the stages 852, 848 and 846 in accordance with the logical equation:

$$\bar{s}_2 = C_2' P_{17} T \qquad (152)$$

where all of the terms have previously been defined.

*Extrapolation*

It has previously been described that each block receives $\Delta y$ increments in accordance with the output from another block. Sometimes a first block receives the output from a second block following the first block. For example, the $\Delta y$ increments for block 47 may be determined by the output from block 15. Since block 47 follows block 15 in the same cycle of computation, block 47 receives relatively fresh information from block 15. For example, the value of the dependent quantity Y at any instant for block 47 is relatively accurate, especially when the value of Y is compensated in each cycle of computation by a truncation correction of $\frac{1}{2}\Delta Y$.

At other times, the $\Delta Y$ increments for a block are controlled by the output indications from a second block which follows the first block in a cycle of computation. For example, the $\Delta Y$ increments for block 18 may be controlled by the output indications from block 37. In such a situation, each $\Delta Y$ increment for block 18 is determined by the output from block 37 obtained in a previous cycle of computation. Because of this delay in one cycle for each $\Delta Y$ increment, the value of the dependent quantity Y at any instant is not always as fresh as might be desired. Actually, the dependent quantity Y may be considered to be in error by an amount equivalent to the value of the $\Delta Y$ increment in the last cycle of computation. In order to increase the accuracy in the indications representing the dependent quantity Y, a technique known as extrapolation is used.

The technique of extrapolation may be seen from the example shown in FIGURE 39 and the following discussion. In the example shown in FIGURE 39, the value of the dependent quantity Y at any instant for a particular block is represented at 1660. When the block is presented for computation, positive $\Delta X$ and $\Delta Y$ increments may be obtained. With ordinary truncation correction, the value of Y used in the cycle of computation for combination with $\Delta X$ may be represented by a position 1662. The value of Y represented by the position 1662 is obtained by adding $Y+\frac{1}{2}\Delta Y$ by the technique of truncation correction described above. But, when extrapolation is to be provided, the value of Y used for combination with $\Delta X$ may be represented by a position 1664. This value is obtained by adding $(Y+\frac{1}{2}\Delta Y)+\Delta Y$. As will be seen, the value represented by the position 1664 is different from the value represented by the position 1662, this difference being equivalent to the value of a $\Delta Y$ increment. The $\Delta Y$ increment is added to compensate for the fact that the value of Y is always behind its true value by one increment since its increments are being obtained from outputs in a previous cycle of computation.

Even when extrapolation in the value of Y is used for a block, it is only used under special circumstances. For example, it is used only when two successive $\Delta X$ increments have the same polarity. If the first $\Delta X$ increment has one polarity and the next $\Delta X$ increment has an opposite polarity, extrapolation is not used for a block even when the block receives its $\Delta Y$ information from a block in a previous cycle of computation. When two successive $\Delta X$ increments have opposite polarities, the portion of the curve $y=f(x)$ traced in one cycle of computation is retraced in a reverse direction in the next cycle of computation.

The following discussion may indicate the reason for not using extrapolation when two successive $\Delta X$ increments have opposite polarities. If the first $\Delta X$ increment is positive and the $\Delta Y$ increment is also positive, the differential combination may be expressed as:

$$[Y+\tfrac{1}{2}\Delta Y+(\Delta Y)](\Delta X)$$

If each $\Delta X$ and $\Delta Y$ increment is considered to have a unitary value, the differential combination may be amplified to $Y+3/2$. In the next cycle of computation, $\Delta X$ is negative. $\Delta Y$ is also negative since the curve $y=f(x)$ is being retraced and $\Delta Y$ was positive in the previous cycle of computation. This causes the differential combination to be $$[(Y+\tfrac{1}{2}\Delta Y+\Delta Y)](\Delta X)=[(Y-\tfrac{1}{2}+(-1)](-1)=-Y+3/2$$

It will be seen from this discussion that the unitary value representing $(\Delta Y)$ is added in both cycles of computation when $\Delta X$ has opposite polarities in the cycles. This leads to error.

The error may be further seen by a specific example of binary indications. For example, the value of $R=0$ may be added to the value of $Y=0$ and the technique of extrapolation may be used

| | | Start position |
|---|---|---|
| R | 1 0 0 0 0 0 | 0 |
| Y | 0 0 0 0 0 | 0 |
| 3/2ΔY | 1 | 1 |
| $R_1$ | 1 0 0 0 0 1 | 1 |

The value of Y at the end of the cycle is +1 on a decimal basis because of the addition of the $\Delta Y$ increment to $Y=0$.

Since $\Delta X$ is negative in the next cycle of computation, $Y\Delta X=(Y)(-\Delta X)=-Y\Delta X$. When $\Delta X$ has a unitary value, this can be simplified to $-Y$. Since $Y=1$, a value of $-1$ is obtained when $\Delta X$ is negative. A binary value of $Y=-1$ is represented by an indication of "1" in each position. This value is added to the value of R obtained from the previous cycle of computation and the extrapolation of 3/2 is included as discussed in the previous paragraph.

| | | Start position |
|---|---|---|
| R | 1 0 0 0 0 1 | 1 |
| Y | 1 1 1 1 1 | 0 |
| 3/2ΔY | 1 | 1 |
| $R_1$ | 0 0 0 0 1 0 | 0 |

As will be seen, R at the end of the second cycle of computation has a value different from R at the beginning of the first cycle of computation because of the different indications in the second position after the start pulse. Actually, these indications should be the same since the same area under $y=f(x)$ has been traversed in a forward and reverse direction.

From the above discussion, it will be seen that extrapolation is provided for a block only when the block receives old $\Delta Y$ information from a previous cycle of computation and only in the cycles of computation when two $\Delta X$ increments have the same polarity. Extrapolation is further provided only in "normal" integration. As previously described, in "normal" integration the value of R becomes the value of R without change. Because of this, the logic expressed in Equations 134 and 134*a* and discussed fully above is not completely utilized. The logic is not completely utilized since it provides in part for the addition of an increment. Since the logic in Equations 134 and 134*a* is not completely utilized, this provides a convenient way to include the additional $\Delta Y$ increment required to obtain extrapolation. The polarity of the $\Delta Y$ increment for a particular block in a cycle of computation is recorded in the flip-flop 456. In like manner, the polarity of the $\Delta X$ increment for the block is recorded in the flip-flop 458. The polarity of this increment is compared with the polarity of the $\Delta X$ increment in the previous cycle of computation to determine whether extrapolation will be provided. The polarity of the $\Delta X$ increment for the previous cycle of computation is recorded in the channel 159 in a manner which will be described in detail subsequently.

Since only certain blocks require extrapolation, a particular code is included to indicate these blocks. This code is provided in the channels 140, 142, 144 and 146 in one of the first eight positions for the block. The code is represented by indications of "0" in the channels 140, 142 and 146 at the same time as an indication of "1" in the channel 144. This causes relatively high voltages to be simultaneously produced on the right output terminals of the flip-flops 306, 310 and 318 and on the left output terminal of the flip-flop 314. These indications are introduced to the "and" network 1090 in FIGURE 21. The "and" network 1090 passes the signals only when they occur in positions 1 to 8, inclusive, for a block since the "and" network is connected to the right output terminals of the flip-flops 200 and 210.

The signals from the "and" network 1090 pass through the "or" network 1092 to the "and" network 1094 for synchronization at optimum times in the clock cycles. The signals are then introduced to the left input terminal of the flip-flop 456. The signals trigger the flip-flop 456 so as to produce a relatively high voltage on the left output terminal of the flip-flop. Signals pass to the flip-flop 456 through the stages 1090, 1092 and 1094 in accordance with the logical equation:

$$f_2 = \overline{L}_1\overline{L}_2L_3\overline{L}_4\overline{J}_4\overline{J}_5T \quad (153)$$

where all of the terms have previously been defined.

The logic $\overline{L}_1\overline{L}_2L_3\overline{L}_4$ not only controls the triggering of the flip-flop 456 but also the triggering of the flip-flop 396. The logic for controlling the triggering of the flip-flop 396 is expressed above in Equation 94. Since it may be desired to trigger only the flip-flop 456, the flip-flop 396 may provide an incorrect indication of a ΔX increment for a block. This is corrected by subsequently triggering the flip-flop 396 in accordance with the logic expressed above in Equations 93 and 94. This logic represents the sign reversal pulse for the ΔX increment. By triggering the flip-flop 396 twice, the flip-flop is returned to its correct operation. In this way, the flip-flop 396 is made available to receive correct ΔX information for the block.

To obtain extrapolation, the polarity of the ΔX increment for a block is stored in the channel 150 in each cycle of computation for comparison with the polarity of the ΔX increment in the next cycle of computation. This is obtained by the operation of certain stages shown in FIGURE 26. These stages includes the "and" network 1336 in FIGURE 26. The "and" network 1336 can become activated only during periods of actual computation since it is connected to the cathode follower 1340. The "and" network 1336 can become activated only in positions 2 to 17, inclusive, for a block when these positions occur before the start pulse. This results from the connections to the "and" network 1336 from the inverter 541 and the right output terminal of the flip-flop 446. The "and" network 1336 can become activated in these positions to record a pulse in the channel 150 since no information exists in the channel before these positions.

When activated, the "and" network 1336 passes the signals of high amplitude on the left output terminal of the flip-flop 420. These signals indicate a positive ΔX increment for a block. The signals passing through the "and" network 1336 are introduced through the "or" network 1346 to the "and" network 1348. The "and" network 1348 synchronizes the signals at optimum times in the clock cycles and passes them to the left input terminal of the flip-flop 1332. These signals trigger the flip-flop 1332 so as to produce a relatively high voltage on the left output terminal of the flip-flop. Since the relatively high voltage on the left output terminal of the flip-flop 1332 is introduced to the coil 1333, it causes the coil to record a magnetic indication of "1" in the channel 150. A relatively high voltage is produced on the left output terminal of the flip-flop 1332 by the passage of signals through the stages 1336, 1346 and 1348 in accordance with the logical equation:

$${}_0y = \alpha A_2\overline{S}_1P_{2/17}T \quad (154)$$

where all of the terms have previously been defined.

The "and" network 1362 becomes prepared for activation at the same time as the "and" network 1336. However, the "and" network 1362 passes the signals of high amplitude on the right output terminal of the flip-flop 420. These signals indicate negative ΔX increments for a block. The signals pass through the "or" network 1366 to the "and" network 1368, which synchronizes the signals at optimum times in the clock cycles. The signals then pass to the right input terminal of the flip-flop 1332. These signals trigger the flip-flop for the production of a relatively high voltage on the right output terminal of the flip-flop and a relatively low voltage on the left output terminal of the flip-flop. The low voltage on the left output terminal of the flip-flop 1332 causes the coil 1333 to record an indication of "0" in the channel 150. Signals pass through the stages 1362, 1366 and 1368 to trigger the flip-flop 1332 in accordance with the logical equation:

$${}_0\overline{y} = \alpha\overline{A}_2\overline{S}_1P_{2/17}T \quad (155)$$

where all of the terms have previously been defined.

As previously described, the (ΔY)(ΔX) increment representing extrapolation for a block is combined with the indications of R obtain indications representing R. Indications representing R are obtained in accordance with the logic expressed in Equations 134 and 134*a* and described fully above. As part of this logic, the carry flip-flop 458 must be first triggered true when an increment is to be combined with the increment of R. When extrapolation is to be provided, the carry flip-flop 458 is triggered to its true state in accordance with the operation of certain stages shown in FIGURE 22, such as the "and" networks 1134 and 1136. The "and" network 1134 passes a signal when the ΔX increments in two succesive cycles of computation have positive polarities, as represented by simultaneous signals of high amplitude on the left output terminals of the flip-flops 420 and 450. In like manner, the "and" network 1136 passes a signal when the ΔX increments have negative polarities for two successive cycles of computation. This is represented by the simultaneous occurrence of relatively high voltages on the right output terminals of the flip-flops 420 and 450. As previously described, the operation of the flip-flop 450 is controlled by the indications in the channel 150.

The signals from the "and" networks 1134 and 1136 pass through the "or" network 1132 to the "and" network 1130. The "and" network 1130 passes the signals only when extrapolation is to be provided for a block. This is represented by a relatively high voltage on the left output terminal of the flip-flop 456, as described above and expressed logically in Equation 153. Furthermore, the "and" network 1130 passes the signals only in the position immediately before the occurrence of the "start" pulse in the channel 148, and only when such position occurs in positions 2 to 17, inclusive, for the block undergoing computation. This is represented by the simultaneous occurrence of signals of high amplitude from the inverter 541, the left output terminal of the flip-flop 542 and the right output terminal of the flip-flop 446.

The signals from the "and" network 1130 pass through the "or" network 1124 to the "and" network 1126. The "and" network 1126 synchronizes the signals at optimum times in the clock cycles and introduces the signals to the left input terminal of the flip-flop 458. These signals trigger the flip-flop 458 for the production of a relatively high voltage on the left output terminal of the flip-flop to indicate a carry. The flip-flop 458 is triggered by the signals passing through the stages 1134, 1136, 1132, 1130, 1124 and 1126 in accordance with the logical equation:

$$f_3=(YA_2+\overline{YA_2})F_2Y_p\overline{S}_1P_{2/17}T \qquad (156)$$

where all of the terms have previously been defined.

The flip-flop 456 in FIGURE 21 is initially triggered to its true state to provide a code for indication of an extrapolation operation as expressed logically in Equation 153. Upon the occurrence of the "start" pulse in the channel 148, the flip-flop 456 is set to indicate the polarity of the (ΔY)(ΔX) increment for the block undergoing computation. This increment represents the extrapolation correction. Since the flip-flop 456 has previously been triggered to its true state before the start pulse, it can remain in this state at the start pulse when the (ΔX)(ΔY) increment is positive. For this reason, stages are included in FIGURE 21 to trigger the flip-flop 456 only when the (ΔX)(ΔY) increment is negative. These stages include the "and" networks 1110 and 1112 in FIGURE 21. The "and" network 1110 passes a signal only when the ΔX increment is positive and the ΔY increment is negative for a block. In like manner, the "and" network 1112 passes a signal only when the ΔX increment is negative and the ΔY increment is positive for the block. The "and" network 1110 and 1112 operate in this manner because of their connections to the flip-flops 420 and 494.

The signals from the "and" networks 1110 and 1112 pass through the "or" network 1106 to the "and" network 1104. The "and" network 1104 passes the signals only in the position immediately before the occurrence of the "start" pulse in the channel 148 and only when this position occurs in positions 2 to 17, inclusive, for the block undergoing computation. This is represented by the simultaneous occurrence of high voltages from the inverter 541, the left output terminal of the flip-flip 542 and the right output terminals of the flip-flops 446 and 390.

The signals from the "and" network 1104 are introduced through the "or" network 1100 to the "and" network 1102 for synchronization at optimum times in the clock cycles. The signals then pass to the right input terminal of the flip-flop 456. These signals trigger the flip-flop 456 and cause a relatively high voltage to be produced on the right output terminal of the flip-flop in representation of a negative (ΔX)(ΔY) increment. Signals are introduced to the flip-flop 456 through the stages 1110, 1112, 1106, 1104, 1100 and 1102 in accordance with the logical equation:

$$\overline{f}_2=(A_2\overline{B}_2+B_2\overline{A}_2)\overline{G}_5Y_p\overline{S}_1P_{2/17}T \qquad (157)$$

where all of the terms have previously been defined.

When the carry flip-flop 458 is triggered on at the start pulse in accordance with the logic expressed in Equation 156, the indications of R in the successive positions are complemented. For a positive (ΔX)(ΔY) increment, the indications of R are complemented until after the first indication of "0" has been presented for R in a position after the "start" pulse. For a negative (ΔX)(ΔY) increment, the indications of R are complemented until after the first indication of "1" has been presented for R in a position after the "start" pulse. The complementation of the indications of R occurs in accordance with the logic set forth in Equations 134 and 134*a*.

Two special situations are presented. One situation occurs when R is represented by indications of "1" in every position after the "start" pulse in the channel 148. For a positive (ΔX)(ΔY) increment, this would cause the carry flip-flop 458 to remain on in every position. This may be seen from the following example:

```
    1111111  R
    0000000  (ΔX)(ΔY)=+1
   ---------
1|  0000000  R
```

As will be seen, R will be represented by an indication of "0" in every position. Under such a condition, the addition of R and Y to give R will not give a carry in the last position even when Y has a maximum value represented by an indication of "1" in every position. This may be seen from the following example:

```
0|  000000  Ri
    111111  Y
   --------
0|  111111  Ri
```

It will be further seen that no overflow is obtained at position 18 from the addition of R and Y. But an overflow should be obtained since R and Y both have maximum values.

On the basis of the discussion in the previous paragraph, cetain stages are included in FIGURE 8 to trigger the flip-flop 432 to its true state for the representation of a positive overflow. These stages include the "and" network 454 in FIGURE 8. The "and" network 454 is able to pass a signal only when the (ΔX)(ΔY) increment for the block is positive. This results from the connection of the "and" network 454 to the left output terminal of the flip-flop 456. The "and" network 454 is further able to pass a signal only when the carry flip-flop 458 is in its true state at position 18 for a block, the latter being represented by a signal of high amplitude from the "and" network 216. For a positive (ΔX)(ΔY) increment, this can occur only when R is represented by an indication of "1" in every position. The "and" network 454 is also able to pass a signal only at the end of a single-block operation. A relatively high voltage on the right output terminal of the flip-flop 390 indicates the end of an operation. Furthermore, a relatively high voltage on the right output terminal of the flip-flop 450 provides a code to indicate that the operation is only for a single block.

The signals from the "and" network 454 pass through the "or" network 440 to the "and" network 439. The "and" network 439 synchronizes the signals at optimum times in the clock cycles and introduces the signals to the left input terminal of the flip-flop 432. The signals trigger the flip-flop 432 so as to produce a relatively high voltage on the left output terminal of the flip-flop. The relatively high voltage on the left output terminal of the flip-flop 432 is recorded in the channel 138 in accordance with the logic expressed in Equation 65 so as to represent a positive overflow from the block undergoing computation. A relatively high voltage is produced on the left output terminal of the flip-flop 432 by the passage of signals through the stages 454, 440 and 439 in accordance with the logical equation:

$$a_3=F_2F_3\overline{YG_5}P_{18}T \qquad (158)$$

where all of the terms have previously been defined.

Another special situation arises when R is represented on a binary basis by an indication of "0" in every position and the polarity of the (ΔX)(ΔY) increment is negative. Since the indications of R are complemented in every position under such a condition, the carry flip-flop 458 is never triggered to its false state during the block undergoing computation. The addition of R and (ΔX)(ΔY) is as follows:

```
0000000  R
1111111  (ΔX)(ΔY)
-------
1111111  R
```

If Y has a decimal value other than "0," an overflow will be produced at position 18 when R and Y are added. This may be seen from the following example:

```
0   111111  R
    000100  Y
   --------
1|  000011  Ri
```

But, since $R=0$ for a binary indication of "0" in every position, an overflow should not be obtained even when Y has a maximum value represented by an indication of "1" in every position.

In order to prevent an overflow under the conditions discussed in the previous paragraph, the "and" network 470 is included in FIGURE 8. The "and" network 470 passes a signal only for a negative (ΔX)(ΔY) increment for the block undergoing computation, as represented by a relatively high voltage on the right output terminal of the flip-flop 456. The "and" network 470 is also able to pass a signal only when the carry flip-flop 458 is still on at position 18 for a block. This is represented only by the simultaneous occurrence of relatively high voltages from the "and" network 216 and the left output terminal of the flip-flop 458. The network 470 is further able to pass a signal only at the end of a single-block operation. This occurs when the flip-flops 390 and 450 have relatively high voltages on their right output terminals.

The signals from the "and" network 470 pass through the "or" network 466 to the "and" network 467 for synchronization at optimum times in the clock cycles. The signals then pass to the right input terminal of the flip-flop 432. The signals trigger the flip-flop 432 so as to produce a relatively high voltage on the right output terminal of the flip-flop and a relatively low voltage on the left output terminal of the flip-flop. This low voltage is recorded in the channel 138 as an indication of "0" in accordance with the logic expressed in Equation 66 so as to represent a negative overflow for the block undergoing computation. The flip-flop 432 is triggered by the signals passing through the stages 470, 466 and 467 in accordance with the logical equation:

$$\overline{a}_3=\overline{F}_2F_3\overline{Y}\overline{U}_5P_{18}T \qquad (159)$$

where all of the terms have previously been defined.

*Servo Operation*

Certain blocks in the digital differential analyzer may be desired to perform servo operations. In these servo operations, the output from the block would be compared with the output from external members. Any differences between the outputs from the blocks and the external members cause error signals to be generated. For certain operations, the error signals would be introduced to the blocks to vary the output from the blocks so that the output from the blocks would become equal to the output from the external members. For other operations, the error signals would be introduced to the external members to make the outputs from the external members approach the outputs from the blocks.

In FIGURE 41, a simplified block diagram is shown of one typical form of servo operation. The block diagram shown in FIGURE 41 includes the Z channel 138 and the U channel 156. A ΣdU counter 1700 is coupled to the Z channel 138 to receive increments from the Z channel and to count such increments. A register 1702 is connected to the counter 1700 to step the indications from the counter into an adder 1704. The adder 1704 is also adapted to receive indications relating to U from the channel 156. The adder 1704 is adapted to add the indications of U from the channel 156 and the indications of ΣDU from the register 1702 so as to obtain new indications of U for the block every time that the block is presented for computation. The output indications from the channel 1704 are introduced to amplifiers 1706 for recordation in the channel 156. In this way, the new indications of U are recirculated for presentation to the adder 1704 in the next cycle of computation.

The output indications from the adder 1704 are also introduced to an error detector 1708. This detector also receives digital signals from an external source such as an analog-to-digital converter 1710. Various forms of analog-to-digital converters will be described in detail subsequently in connection with a specific control problem. The detector 1708 compares the signals from the adder 1704 and the converter 1710 and produces error signals digitally representing any differences between the signals introduced to it. The polarity of the error signals from the detector 1708 is represented by a signal in one of the last positions for the block. This polarity signal is introduced to amplifiers 1712 for recordation of the signal in the channel 138. In this way, the signal can be subsequently presented to the counter 1700 in the next cycle of computation to serve as a ΣDU increment for the block. By introducing the error signal to the counter 1700 in the next cycle of computation, any error in the signals representing U can be minimized.

The block system shown in FIGURE 41 is adapted to receive signals from an external source such as the source 1710 and to produce variations in the signals in the digital differential analyzer, in accordance with the signals from the external source. The block diagram shown in FIGURE 42 operates on a somewhat converse basis. It utilizes the signals from the digital differential analyzer as represented by the signals from the adder 1704 to control the operation of an external source. The system operates to compare this information with the information from an analogue-to-digital converter 1714 and to produce error signals in accordance with any signals from such comparison. These error signals are produced in the detector 1708 and are introduced from the detector 1708 to a converter 1716. The converter 1716 changes the digital signals from the detector 1708 into a corresponding analog representation such as a single voltage. This voltage is introduced to a servo 1718 which controls the rotation of an output shaft (not specifically shown). This output shaft may drive various output members such as members in an airplane, as will be described in detail hereinafter.

*Determination of ΣdU Increments for a Servo Operation*

In accordance with the above discussion and the block diagram in FIGURE 41, the *d*U increments must be first detected and added. This is indicated in block form at 1700 in FIGURE 41 and will now be described in detail. As a preliminary matter, it should be appreciated that blocks undergoing servo operations may receive more than one *d*U increment in each cycle of computation. For example, a servo block may receive an increment representing the error registered by the detector 1708 in the previous cycle of computation. The servo block may also receive inputs from other blocks to affect the operation of the block. Each servo block is able to receive a maximum of three *d*U increments in each cycle of computation.

The *d*U increments for a servo block are registered by the operation of the stages shown in FIGURE 16. The *d*U increments are able to occur only for a particular coding in the channels 140 and 142. This coding is represented by the simultaneous occurrence of indications of "1" in the channels 140 and 142. Upon the occurrence of such a coding, relatively high voltages are simultaneously produced on the left output terminals of the flip-flops 306 and 310.

The relatively high voltages on the left output terminals of the flip-flops 306 and 310 are introduced to the "and" network 866 in FIGURE 16. The "and" network 866 passes these signals when a relatively high voltage is introduced to it from the left output terminal of the flip-flop 868, the operation of which will be described in detail subsequently. The "and" network 866 is further able to pass a signal only when a relatively high voltage is introduced to it from the right output terminal of the flip-flop 869. The signals passing through the "and" network 866 are introduced to the left input terminal of the flip-flop 860 to trigger the flip-flop. Upon being triggered, the flip-flop 860 has a relatively high voltage produced on its left output terminal. The flip-flop 860 is triggered by signals passing through the "and" network 866 in accordance with the logical equation:

$$c_1 = \overline{C}_1 Q L_1 L_2 P_{1/17} T \quad (160)$$

Where:

$c_1$=a triggering signal introduced to the left input terminal of the flip-flop 860;

$\overline{C}_1$=a relatively high voltage on the right output terminal of the flip-flop 860;

$Q$=a voltage of high amplitude on the left output terminal of the flip-flop 868; and the other terms have previously been defined.

When a relatively high voltage is produced on the left output terminal of the flip-flop 860, it prepares the "and" network 874 for operation. Signals then pass through the "and" network 874 upon the simultaneous introduction of signals of high amplitude from the left output terminal of the flip-flop 868 and the left output terminals of the flip-flops 306 and 310. The signals passing through the "and" network 874 are introduced through the "or" network 872 to the "and" network 870 for synchronization at optimum times in the clock cycles. The signals then pass to the right input terminal of the flip-flop 860 and trigger the flip-flop for the production of a relatively high voltage on the right output terminal of the flip-flop. Voltages of high amplitude are produced on the right output terminal of the flip-flop 860 by the passage of signals through the stages 874, 872 and 870 in accordance with the logical equation:

$$\overline{c}_1 = C_1 Q L_1 L_2 T \quad (161)$$

Where:

$\overline{c}_1$=the introduction of a triggering signal to the right input terminal of the flip-flop 860;

$C_1$=a relatively high voltage on the left output terminal of the flip-flop 860; and the other terms have previously been defined.

The relatively high voltage on the right output terminal of the flip-flop 860 is introduced to the "and" network 866 so that the "and" network will pass a signal upon the occurrence of the next coding pulse for the block. In this way, the flip-flop 860 becomes alternately triggered to one state of operation and then to the other upon the occurrence of successive coding pulsing in a block. Since the position of least significance in a counting operation is represented by alternate indications of "0" and "1," the flip-flop 860 provides an indication as to whether the number of pulses introduced to a block is odd or even.

Each servo block receives $dU$ increments from other blocks or its own output from the previous cycle of computation. These outputs are represented by indications in the channel 138. The indications in the channel 138 are made available to a servo block in the same way that they are made available to a block performing "normal" integration. Because of this, the logic expressed in Equations 69 to 81, inclusive, applies. This logic was fully explained previously and has been designated as L and $\overline{\text{L}}$.

The flip-flops 862 and 864 operate in conjunction with the flip-flop 860 to indicate the $\Sigma dU$ increments for each servo block. The count of the $\Sigma dU$ indications for each servo block is represented by the state of operation of the flip-flops 860 and 862. The polarity of the $\Sigma dU$ increments is represented by the operation of the flip-flop 864. This may be seen from the table shown in FIGURE 43. In this table, various values of $\Sigma dU$ between 0 and +3 and between 0 and −3 are included. As will be seen, the flip-flops 860 and 862 operate in a normal manner to indicate the $\Sigma dU$ count. The flip-flop 864 indicates a positive value for the $\Sigma dU$ increments by a true state of operation and a negative value for the $\Sigma dU$ increments by a false state of operation.

As will be seen from the table shown in FIGURE 43, the flip-flop 862 is triggered to its true state upon the occurrence of a positive $\Sigma dU$ increment only when the value of $\Sigma dU$ changes from +1 to +2. This occurs when the flip-flop 860 has a true state of operation and the flip-flop 862 has a false state of operation. Upon the simultaneous occurrence of relatively high voltages on the left output terminal of the flip-flop 860 and the right output terminal of the flip-flop 862, the "and" network 880 in FIGURE 16 is able to pass a signal. The "and" network 880 passes the signal only for the particular coding represented by relatively high voltages on the left output terminals of the flip-flops 306 and 310. The "and" network 880 is further able to pass a signal only for a positive $dU$ increment as represented by a signal from the cathode follower 328.

The signals from the "and" network 880 pass through the "or" network 884 to the "and" network 886. The "and" network 886 synchronizes the signals at optimum times in the clock cycles and introduces the signals to the left input terminal of the flip-flop 862. These signals trigger the flip-flop 862 so as to produce a relatively high voltage on the left output terminal of the flip-flop. Signals pass through the stages 880, 884 and 886 in accordance with the logical equation:

$$c'_1 = C_1 \overline{C}'_1 \text{L} Q L_1 L_2 P_{1/17} T \quad (162)$$

Where:

$c'_1$=the introduction of a triggering signal to the left input terminal of the flip-flop 862;

$\overline{C}'_1$=a relatively high voltage on the right output terminal of the flip-flop 862; and the other terms have previously been defined.

The flip-flop 862 is able to change from a false state of operation to a true state of operation upon the occurrence of a negative $dU$ increment only for a value of $\Sigma dU$=0. This may be seen from the table shown in FIGURE 48. Since a value of $\Sigma dU$=0 is represented by the simultaneous occurrence of relatively high voltages on the right output terminals of the flip-flops 860 and 862, the flip-flop 862 can be triggered to its true state only at these times for a negative $dU$ increment. The "and" network 882 in FIGURE 16 passes a signal upon the occurrence of relatively high voltages on the right output terminals of the flip-flops 860 and 862. The "and" network 882 passes a signal only when a negative $dU$ increment occurs as represented by a signal from the cathode follower 364. The "and" network 882 is able to pass a signal only at such times that relatively high voltages are introduced to it from the left output terminals of the flip-flops 306, 310 and 868. The signals from the "and" network 882 pass through the stages 884 and 886 and trigger the flip-flop 862 to its true state of operation. The flip-flop 862 receives the signals passing through the stages 882, 884 and 886 in accordance with the logical equation:

$$c'_1 = \overline{C}_1 \overline{C}'_1 \overline{\text{L}} Q L_1 L_2 P_{1/17} T \quad (163)$$

where all of the terms have previously been defined.

The flip-flop 862 changes from a true state of operation to a false state of operation when a negative $dU$ increment occurs for a value of $\Sigma dU$=+2. This may be seen from the table shown in FIGURE 43. Relatively high voltages are simultaneously produced on the right output terminal of the flip-flop 860 and the left output terminal of the flip-flop 862 for a value of $\Sigma dU$=+2. The simultaneous occurrence of these high voltages causes a signal to pass through the "and" network 892. The "and" network 892 passes the signals only upon the occurrence of a negative $dU$ increment, as represented by a signal of high amplitude from the cathode follower 364. The "and" network 892 further passes the signal only upon the occurrence of the $L_1L_2$ coding represented by relatively high voltages on the left output terminals of the flip-flops 306 and 310.

The signals from the "and" network 892 pass through the "or" network 894 to the "and" network 896 for synchronization at optimum times in the clock cycles. The signals then pass to the right input terminal of the flip-flop 862. The signals trigger the flip-flop 862 so as to produce a relatively high voltage on the right output terminal of the flip-flop. The flip-flop 862 is triggered by the passage of signals through the "and" networks 892, 894 and 896 in accordance with the logical equation:

$$\bar{c}'_1=\bar{C}_1C'_1\bar{\mathrm{L}}QL_1L_2T \qquad (164)$$

Where:

$\bar{c}'_1$=the introduction of a triggering signal to the right input terminal of the flip-flop 862; and the other terms have previously been defined.

The flip-flop 862 is also triggered to its false state when $\Sigma dU$ has a negative value of $-1$ and a positive $dU$ increment occurs, as may be seen from the table shown in FIGURE 43. The "and" network 890 passes a signal at this time. The "and" network 890 passes a signal because of the introduction to it of relatively high voltages from the left output terminals of the flip-flops 860 and 862. The "and" network 890 is able to pass a signal only for a positive $dU$ increment since it is connected to the cathode follower 328. The "and" network 890 is further able to pass a signal only upon the occurrence of the particular coding designated as $L_1L_2$. The signals from the "and" network 890 pass through the stages 894 and 896 and trigger the flip-flop 862 to its false state. Signals pass through the stages 890, 894 and 896 to the flip-flop 862 in accordance with the logical equation:

$$\bar{c}'_1=C_1C'_1\mathrm{L}QL_1L_2T \qquad (165)$$

where all of the terms have previously been defined.

As will be seen from the table shown in FIGURE 43, the flip-flop 864 can be triggered to its true state only upon the change of $\Sigma dU$ from a decimal value of $-1$ to a value of 0. This occurs when relatively high voltages are simultaneously produced on the left output terminals of the flip-flops 860 and 862. These voltages cause a signal to pass through the "and" network 902 in FIGURE 16 when a relatively high voltage representing a positive $dU$ increment is produced by the cathode follower 328. Signals are further able to pass through the "and" network 902 only upon the occurrence of the $L_1L_2$ coding represented by relatively high voltages on the left output terminals of the flip-flops 306 and 310.

The signals passing through the "and" network 902 are introduced through the "or" network 906 to the "and" network 904. The signals pass through the "and" network 904 at optimum times in the clock cycles and trigger the flip-flop 864 to its true state. The logic controlling the passage of signals to the flip-flop 864 through the stages 902, 906 and 904 can be expressed as $$c''_1=C_1C'_1\mathrm{L}QL_1L_2T \qquad (166)$$

Where:

$c''_1$=the introduction of a triggering signal to the flip-flop 864; and the other terms have previously been defined.

The flip-flop 864 can be triggered to its false state only when the $\Sigma dU$ increments are changing from a value of "0" to a value of "$-1$." Because of this, the flip-flop 864 can be triggered to its false state only upon the simultaneous occurrence of relatively high voltages on the right output terminals of the flip-flops 860 and 862. These voltages cause the "and" network 900 to become prepared for activation. The "and" network 900 then passes a signal when a negative $dU$ increment occurs, as represented by a signal of high amplitude from the cathode follower 364. The "and" network 900 is further able to pass a signal only when a coding of $L_1L_2$ occurs. The signals from the "and" network 900 trigger the flip-flop 864 to its false state of operation. Signals trigger the flip-flop 864 to its false state of operation in accordance with the logical equation:

$$\bar{c}''_1=\bar{C}_1\bar{C}'_1\bar{\mathrm{L}}QL_1L_2P_{1/17}T \qquad (167)$$

Where:

$\bar{c}''_1$=the introduction of a triggering signal to the right input terminal of the flip-flop 864; and the other terms have previously been defined.

At the end of each servo block, it is desirable to trigger the flip-flops 860, 862 and 864, so that the flip-flops will represent a value of "0." This is desirable so that the flip-flops will be prepared for proper operation in a subsequent block. The flip-flops 860, 862 and 864 are triggered to their proper operation at the end of a servo block when a coding indication of "1" occurs in the channel 142 at position 18. This causes the "and" network 876 to simultaneously receive signals of high amplitude from the "and" network 216 and the left output terminal of the flip-flop 310.

The flip-flop 860 is triggered to its false state by the passage of signals through the stages 876, 872 and 870 in accordance with the logical equation:

$$\bar{c}_1=L_2P_{18}T \qquad (168)$$

Similarly, signals pass through the stages 876, 894 and 896 and trigger the flip-flop 862 to its false state. The flip-flop 862 is triggered by the passage of signals through these stages in accordance with the logical equation:

$$\bar{c}'_1=L_2P_{18}T \qquad (169)$$

The flip-flop 864 is triggered to its true state by the passage of signals through the "and" network 876. This is in accordance with a value of "0" shown in the table of FIGURE 43. The flip-flop 864 is triggered to its true state by the passage of signals through the stages 876, 906 and 904 in accordance with the logical equation:

$$c''_1=L_2P_{18}T \qquad (170)$$

The carry flip-flop 938 in FIGURE 18 is also triggered off by the passage of signals through the stages 876, 956 and 958 in accordance with the logical equation:

$$\bar{c}_3=L_2P_{18}T \qquad (170a)$$

where all of the terms have previously been defined.

Since the information in the flip-flops 860, 862 and 864 are triggered to a "0" pattern at the end of each servo operation, the $\Sigma dU$ information would become lost unless it were transferred at the same time to other stages. For this reason, the information in the flip-flops 860, 862 and 864 is transferred to the flip-flops 910, 924 and 974 at the end of a servo operation. The transfer is obtained upon the occurrence of a coding pulse representing an indication of "1" in the channel 142 at position 18 for a block. This causes signals of high amplitude to be obtained simultaneously from the "and" network 216 and the left output terminal of the flip-flop 310.

*Storage and Stepping of dU Increments for a Servo Operation*

The stages for respectively transferring the information in the flip-flops 860, 862 and 864 to the flip-flops 910, 924 and 974 are shown in FIGURES 17, 18 and 19. These stages include the "and" network 912 in FIGURE 17. The "and" network 912 passes signals of high amplitude on the left output terminal of the flip-flop 860 upon the occurrence of a relatively high voltage on the left output terminal of the flip-flop 310 at position 18 for a block.

The signals from the "and" network 912 pass through the "or" network 914 to the "and" network 916 for synchronization at optimum times in the clock cycles. The signals then pass to the left input terminal of the flip-flop 910. These signals trigger the flip-flop 910 to produce a relatively high voltage on the left output terminal of the flip-flop. The flip-flop 910 becomes triggered by signals passing through the stages 912, 914 and 916 in accordance with the logical equation:

$$c_2=C_1L_2P_{18}T \qquad (171)$$

Where:

$c_2$=the introduction of a triggering signal to the left input terminal of the flip-flop 910; and the other terms have previously been defined.

The "and" network 926 becomes prepared for activation at the same time as the "and" network 912. However, the "and" network 926 passes the signals of high amplitude on the right output terminal of the flip-flop 860. These signals pass through the "or" network 932 to the "and" network 934. The signals are synchronized by the "and" network 934 at optimum times in the clock cycles and are introduced to the right input terminal of the flip-flop 910. These signals trigger the flip-flop for the production of a relatively high voltage on the right output terminal of the flip-flop. Signals pass to the flip-flop 910 through the stages 926, 932 and 934 in accordance with the logical equation:

$$\bar{c}_2=\bar{C}_1L_2P_{18}T \qquad (172)$$

Where:

$\bar{c}_2$=the introduction of a triggering signal to the right input terminal of the flip-flop 910; and the other terms have previously been defined.

In like manner, signals of high amplitude on the left output terminal of the flip-flop 862 pass through the "and" network 966 (FIGURE 18), the "or" network 978 and the "and" network 980 and trigger the flip-flop 924 to produce a relatively high voltage on the left output terminal of the flip-flop 924. These signals are produced by the passage of signals through the stages 966, 978 and 980 in accordance with the logical equation:

$$c'_2=C'_1L_2P_{18}T \qquad (173)$$

Where:

$c'_2$=the introduction of a triggering signal to the left input terminal of the flip-flop 924; and the other terms have previously been defined.

Signals of high amplitude also pass from the right output terminal of the flip-flop 862 through the "and" network 984, the "or" network 992 and the "and" network 994 to the right input terminal of the flip-flop 924. These signals trigger the flip-flop 924 and cause a relatively high voltage to be produced on the right output terminal of the flip-flop.

Relatively high voltages are produced on the right output terminals of the flip-flop 924 by the passage of signals through the stages 984, 992 and 994 in accordance with the logical equation:

$$\bar{c}'_2\bar{C}'_1L_2P_{18}T \qquad (174)$$

Where:

$\bar{c}'_2$=the introduction of a triggering signal to the right input terminal of the flip-flop 924; and the other terms have previously been defined.

Stages are included in FIGURE 19 for transferring information from the flip-flop 864 to the flip-flop 974. The stages providing such a transfer include the "and" network 1020, the "or" network 1036 and the "and" network 1038 in FIGURE 19. These stages operate to provide a transfer of signals of high amplitude from the left output terminal of the flip-flop 864 to the left input terminal of the flip-flop 974. The signals trigger the flip-flop 974 such that a relatively high voltage is produced on the left output terminal of the flip-flop. The flip-flop 974 receives the signals passing through the stages 1020, 1036 and 1038 in accordance with the logical equation:

$$c''_2=C''_1L_2P_{18}T \qquad (175)$$

Where:

$c''_2$=the introduction of a triggering signal to the left input terminal of the flip-flop 974; and the other terms have previously been defined.

The "and" network 1042, the "or" network 1052 and the "and" network 1054 provide a transfer of signals from the right output terminal of the flip-flop 864 to the right input terminal of the flip-flop 974. As a result of this transfer, the flip-flop 974 becomes triggered for the production of a relatively high voltage on the right output terminal of the flip-flop. The flip-flop 974 becomes triggered by the passage of signals through the stages 1042, 1052 and 1054 in accordance with the logical equation:

$$\bar{c}''_2=\bar{C}''_1L_2P_{18}T \qquad (176)$$

Where:

$\bar{c}''_2$=the introduction of a triggering signal to the right input terminal of the flip-flop 974; and the other terms have previously been defined.

As described above, the signal information in the flip-flops 860, 862 and 864 is transferred to the flip-flops 910, 924 and 974 at position 18 for a block. This causes the information to be made available by the flip-flops 910, 924 and 974 at the initial positions of the subsequent block. By a stepping operation, the information in the flip-flop 910 relating to the Σ*d*U increments is made available at position 1 for combination with the signal indications representing U at this position. Similarly, the information in the flip-flop 924 relating to the Σ*d*U increments is made available at position 2 for combination with the signal indications representing U at this position. The signal indications in the flip-flop 974 are made available at position 3 and every subsequent position for combination with the signal indications representing U at these positions. The reason for this will be described in detail subsequently.

Since the information in the flip-flop 910 is being released at position 1 for a block, it is available to receive the information from the flip-flop 924. This transfer is obtained by the operation of certain stages shown in FIGURE 17, including the "and" network 920. The "and" network 920 is able to open only at positions 1 and 2 for a block because of its connection to the "or" network 922. The "and" network 920 is further able to open only during a servo operation as represented by a relatively high voltage on the left output terminal of the flip-flop 606. At such times, the "and" network 920 passes the signals of high amplitude on the left output terminal of the flip-flop 924.

The signals from the "and" network 924 pass through the "or" network 914 and the "and" network 916 to the left input terminal of the flip-flop 910. These signals trigger the flip-flop 910 and cause a relatively high voltage to be produced on the left output terminal of the flip-flop. The flip-flop 910 receives the signals passing through the stages 920, 914 and 916 in accordance with the logical equation:

$$c_2=C'_2G_1P_{1/2}T \qquad (177)$$

where all of the terms have previously been defined.

The "and" network 930 becomes prepared for activation at the same time as the "and" network 920. However, the "and" network 930 passes the signals of high amplitude on the right output terminal of the flip-flop 924. These signals pass through the "or" network 932 and the "and" network 934 to the flip-flop 910 and trigger the flip-flop to produce a relatively high voltage on the right output terminal of the flip-flop. Signals pass to the flip-flop 910 through the stages 930, 932 and 934 in accordance with the logical equation:

$$\bar{c}_2=\bar{C}'_2G_1P_{1/2}T \qquad (178)$$

where all of the terms have previously been defined.

Just as the signals from the flip-flop 924 are stepped into the flip-flop 910 in the first two positions of a servo block, the signals from the flip-flop 974 are stepped into the flip-flop 924. This stepping function is obtained by the operation of certain stages including the "and" network 986 in FIGURE 18. The stepping operation can occur only at position 1 for a servo operation because of the connections to the "and" network 986 from the "and" network 222 and the left output terminal of the flip-flop 606. When the "and" network 986 becomes prepared for activation, it passes the signals of high amplitude on the left output terminal of the flip-flop 974.

The signals from the "and" network 986 pass through the "or" network 992 and the "and" network 994 to the right input terminal of the flip-flop 924. These signals trigger the flip-flop 924 so as to produce a relatively high voltage on the right output terminal of the flip-flop. The flip-flop 924 become triggered to its false state of operation by the passage of signals through the stages 986, 992 and 994 in accordance with the logical equation:

$$\bar{c}'_2 = C''_2 G_1 P_1 T \qquad (179)$$

where all of the terms have previously been defined.

As will be seen, the polartiy of the indications in the flip-flop 974 are inverted by the flip-flop 924 in the stepping operation. This inversion is provided so that indications representing $\Sigma dU$ will have the proper form for combination with the signals representing U. For example, while $\Sigma dU$ was being obtained, a positive value for $\Sigma dU$ was represented by a true state of operation of the flip-flop 864 and a negative value of $\Sigma dU$ was represented by a false state of operation of the flip-flop. As previously described, however, a positive polarity for increments is represented by an indication of "0" and a negative polarity is represented by indications of "1" when the increments are being combined with another value. This has been disclosed fully above in connection with the combination of Y and ΔY. It is for this reason that the polarity in the operation of the flip-flop 974 is inverted when the stage of operation of the flip-flop is stepped into the flip-flop 924.

The signals of high amplitude on the right output terminal of the flip-flop 974 are also inverted during the stepping operation to produce signals of high amplitude on the left output terminal of the flip-flop 924. This inversion is obtained by the operation of stages including the "and" network 968, the "or" network 978 and the "and" network 980 in FIGURE 18. The signals from the left output terminal of the flip-flop 974 pass through the stages 968, 978 and 980 and trigger the flip-flop 924 for the production of a relatively high voltage on the left output terminal of the flip-flop. These signals trigger the flip-flop 924 in accordance with the logical equation:

$$c'_2 = \bar{C}''_2 G_1 P_1 T \qquad (180)$$

where all of the terms have previously been defined.

It will be seen from the above discussion that the information originally in the flip-flop 910 at position 1 for a servo block passes out of the flip-flop at this position. At position 1, the information in the flip-flop 924 passes to the flip-flop 910 and subsequently passes out of the flip-flop 910 at position 2 for the servo block. Similarly, the information in the flip-flop 974 passes in inverted form to the flip-flop 924 at position 1 and to the flip-flop 910 at position 2. This information then passes out of the flip-flop 910 at position 3 for the servo block. Since the flip-flop 910 remains in the same state of operation for all positions after position 3, the information originally in the flip-flop 974 controls the signals passing out of the flip-flop 910 for all positions including and after position 3 for the servo block.

*Determination of Error Signals* $\epsilon = U_N \pm M$

The information passing out of the flip-flop 910 in each position is combined with the information with the channel 156 for the same positions. The addition at each position is also controlled in part by the operation of the flip-flop 938 (FIGURE 17) which represents the carry in the addition from the previous position. The new signals obtained for each position represent $U_N$, which is the new value of U for the servo block undergoing computation. The combination of the signals in the flip-flops 910, 938 and 688 has been described in detail previously and has been logically expressed in Equations 107 and 108. The stages for obtaining this addition in accordance with the logic expressed in Equations 107 and 108 are shown in FIGURE 13.

As shown in FIGURE 41 and as described above, the signals representing $U_N$ are combined with the signals from an external source designated at 1710 in the figure. The signals from the external source are produced in accordance with the movements of external members such as the rotations of external shafts. The rotation of each external shaft represents an analogue quantity. This analogue quantity is converted into digital signals by the operation of certain components including a disk 1770 shown in FIGURES 49 and 50. The disk has a plurality of tracks such as tracks 1772 and 1774, each composed of a plurality of conductive and non-conductive portions disposed in alternate relationship with respect to one another. The conductive and non-conductive portions of each track have the same angular length and a length twice as great as the length of the portions in the previous track. The conductive and non-conductive portions of the track 1774 are respectively indicated at 1776 and 1778 in FIGURES 49 and 50.

Brushes such as brushes 1782 and 1784 are associated with each track as shown in FIGURE 49. The brushes associated with each track are separated from each other by a distance related to the angular lengths of the conductive and non-conductive portions in the track. These brushes provide signals in accordance with the angular movement of the disk. In this way, a plurality of signals are produced by selected brushes in the different tracks to represent in digital form the analogue quantity corresponding to the angular rotation of the disk. The construction and operation of a converter similar to that described above and shown in FIGURES 49 and 50 are fully disclosed in co-pending application Serial Number 489,010 filed February 18th, 1955, now U.S. Patent No. 2,873,441 by Carl A. Miller.

In co-pending application Serial Number 467,154, filed November 5th, 1955, now U.S. Patent No. 3,055,956, issued October 2, 1962, by Leo P. Retzinger, Jr., a system is disclosed for sequentially producing a plurality of signals digitally representing an analogue quantity. The system constituting this invention includes a converter of a type corresponding somewhat to that disclosed in co-pending application Serial Number 489,010. It also includes circuitry for operating in combination with the converter to produce signals in accordance with the disposition of the brushes relative to their associated tracks in the converter. Since the construction and operation of the system for sequentially producing a plurality of signals has been fully disclosed in co-pending application Serial Number 467,154, it should not be necessary to provide a full disclosure in this application.

As described substantially in the co-pending application, the logical equations controlling the sequential production of the signals digitally representing the analogue quantity can be expressed as:

$$\begin{aligned} m = T\{&J_1J_2J_3J_4 + K_1[\bar{J}_3\bar{J}_4\bar{M}(M_0J_1\bar{J}_2J_5 + M^*_1\bar{J}_1\bar{J}_2\bar{J}_5 \\ &+ M^*_2J_1\bar{J}_2\bar{J}_5 + M^*_3\bar{J}_1J_2 + M^*_4J_1J_2) + J_3\bar{J}_4\bar{M}(M^*_5\bar{J}_1\bar{J}_2 \\ &+ M^*_6J_1\bar{J}_2 + M^*_7\bar{J}_1J_2 + M^*_8J_1J_2) + \bar{J}_3J_4\bar{M}(M^*_9\bar{J}_1\bar{J}_2 \\ &+ M^*_{10}J_1\bar{J}_2 + M^*_{11}\bar{J}_1J_2 + M^*_{12}J_1J_2) \\ &+ J_3J_4\bar{M}(M^*_{13}\bar{J}_1\bar{J}_2M^*_{14}J_1\bar{J}_2 + M^*_{15}\bar{J}_1J_2]\} \end{aligned} \qquad (181)$$

$$m'=T\{\overline{M}+\overline{J}_3\overline{J}_4(M_0J_1\overline{J}_2J_5+M_1\overline{J}_1\overline{J}_2\overline{J}_5+M_2J_1\overline{J}_2\overline{J}_5+M_3\overline{J}_1J_2+M_4J_1J_2)+J_3\overline{J}_4(M_5\overline{J}_1\overline{J}_2+M_6J_1\overline{J}_2+M_7\overline{J}_1J_2+M_8J_1J_2)+\overline{J}_3J_4(M_9\overline{J}_1\overline{J}_2+M_{10}J_1\overline{J}_2+M_{11}\overline{J}_1J_2+M_{12}J_1J_2)+J_3J_4(M_{13}\overline{J}_1\overline{J}_2+M_{14}J_1\overline{J}_2+M_{15}\overline{J}_1J_2+J_1J_2)\} \quad (182)$$

$$\overline{m}=(\overline{m}')T \quad (183)$$

In the above equations:

$m$=the introduction of a triggering signal to the left input terminal of a flip-flop designated as M;

$\overline{m}$=the introduction of a triggering signal to the right input terminal of the M flip-flop;

$M$=a relatively high voltage on the left output terminal of the M flip-flop;

$\overline{M}$=a relatively high voltage on the right output terminal of the M flip-flop;

$M_0$=a signal of high amplitude from a brush associated with a first track of conductive and non-conductive portions on the converter disk 1750 in FIGURE 41;

$M_1$=a signal of high amplitude from one of the brushes associated with a second track of conductive and non-conductive portions in the converter disk;

$M^*_1$=a signal of high amplitude from the other brush associated with the second track of conductive and non-conductive portions in the converter disk;

$M_{N-1}$ and $M^*_{N-1}$=signals of high amplitude from the brushes association with the $n$th track of conductive and non-conductive portions in the converter disk; and the other terms have previously been defined.

It will be seen from the above equations that the pairs of brushes are sequentially activated upon the occurrence of successive clock signals. Only one of the brushes in each pair of brushes is actually selected when the brushes become activated. The particular brush selected in each pair is dependent upon whether the M flip-flop is operating in its true or false state when the pair of brushes becomes activated. The particular brush selected in each pair and the disposition of the selected brush relative to the conductive and non-conductive portions in the associated track in turn control the operation of the M flip-flop in the next pulse position.

The operation of the M flip-flop continues in the manner described in the previous paragraph through all of the positions until position 15. At position 15, the M flip-flop is automatically triggered to its true state to indicate a positive number for M. The M flip-flop is triggered to its true state at position 15 because of the inclusion of the first term $J_1J_2J_3J_4$ in the logic expressed in Equation 181.

The signals digitally representing the operation of an external source are obtained only for selected blocks for reasons which will be described in detail subsequently. These selected blocks are spaced so that they can occur at most only once in every group of four successive blocks. For other blocks performing servo operations, the value of M is 0. This is represented by an indication of "0" in every pulse position for the block, except for an indication of "1" at position 17.

In FIGURE 41, the block 1708 is included to combine the signals from the external source 1710 and the signals of $U_N$ representing the new value of U. The resultant signals produced by the block 1708 represent any differences from a value of "0" in the combination of the signals representing $U_N$ and the signals representing M from the external source. The difference signals are designated as $\epsilon$. Since $\epsilon$ is obtained from the combination of $U_N$ and N, $\epsilon=U_N\pm M$.

The combination of $\epsilon=U_N+M$ will be discussed first. This combination is similar to that previously described for $U_N=U+\Sigma dU$. The combination of $U+\Sigma dU$ has been described fully above and expressed logically in Equations 107 and 108. Since the combination of $\epsilon=U_N+M$ is similar to the combination of $U_N=U+dU$, the difference signals $\epsilon$ can be logically expressed as:

$$\epsilon=\overline{U}_N\overline{M}D+\overline{U}_NM\overline{D}+U_N\overline{MD}+U_NMD \quad (184)$$

In the above equation, "D" represents a carry obtained by addition in one position and transferred to the next position for combination with the values of $U_N$ and M.

Certain stages shown in FIGURE 23 are included to obtain the error signals representing $\epsilon=U_N+M$. These stages include "and" networks 1200, 1204, 1206 and 1202, which respectively provide signals representing $\overline{U}_N\overline{M}D$, $\overline{U}_NM\overline{D}$, $U_N\overline{MD}$, and $U_NMD$. The signals from the "and" networks 1200, 1204, 1206 and 1202 pass through the "or" network 1208 to the "and" network 1210 for synchronization at optimum times in the clock cycles. The signals then pass to the cathode follower 1026, which provides output signals representing $\epsilon$.

Just as signals representing $\epsilon$ are obtained for different positions in the addition of $U_N$ and M, signals representing $\overline{\epsilon}$ are obtained in other positions. These signals are obtained by the operation of the "and" networks 1216, 1218, 1220 and 1222. The signals from the "and" networks 1216, 1218, 1220 and 1222 pass through the "or" network 1224 to the "and" network 1226 for synchronization at optimum times in the clock cycles. The signals then pass to the cathode follower 1050 which provides output signals representing $\epsilon$. The cathode follower provides these output signals in accordance with the logical equation:

$$\epsilon=\overline{U}_NMD+U_N\overline{M}D+U_NM\overline{D}+\overline{U}_N\overline{MD} \quad (185)$$

where all of the terms have previously been defined.

In obtaining $\epsilon=U_N+M$, a carry is provided from one position to the next in the addition of U and M. This carry is represented by the symbol "D." The stages for obtaining carry indications from one position to the next are shown in FIGURE 23. These stages include the "and" network 1162. The "and" network 1162 passes a signal only for a block performing a servo operation as represented by a relatively high voltage on the left output terminal of the flip-flop 606. The "and" network 1162 further passes signals only when $\epsilon=U+M$ is being obtained. This results from the connection to the "and" network 1162 from the cathode follower 1166, the operation of which will be described in detail subsequently. When the "and" network 1162 becomes prepared for activation, it passes signals only upon the simultaneous occurrence of indications of "1" for $U_N$ and M. These indications are represented by signals from the cathode follower 708 and the left output terminal of the flip-flop 1168.

The signals from the "and" network 1162 pass through the "or" network 1172 to the "and" network 1174 for synchronization at optimum times in the clock cycles. The signals then pass to the left input terminal of the flip-flop 604. These signals trigger the flip-flop 604 so as to produce a relatively high voltage on the left output terminal of the flip-flop. The flip-flop 604 becomes triggered by the passage of signals through the stages 1162, 1172 and 1174 in accordance with the logical equation:

$$d=G_1GU_NMT \quad (186)$$

Where:

G=a signal from the cathode follower 1166, and the other terms have previously been defined.

As will be seen from the above equation, the term $U_NM$ controlling the operation of the flip-flop 604 is equivalent to the term YR in logical Equation 63 discussed fully above.

As discussed fully above in connection with logical Equation 64, a carry flip-flop becomes triggered to its false state only when the two quantities being added have simultaneous indications of "0." For this reason, signals pass through the "and" network 1186 only when signals of high amplitude are simultaneously introduced to the network from the cathode follower 710 and the right output terminal of the flip-flop 1168. These signals are able to pass through the "and" network 1186 only upon the occurrence of signals from the cathode follower 1166 and the left output terminal of the flip-flop 696.

The signals are further able to pass through the "and" network 1186 only upon the occurrence of a relatively high voltage on the left output terminal of the flip-flop 736. A connection is made to the "and" network 1186 from the left output terminal of the flip-flop 736 so that signals will pass through the "and" network only after the occurrence of the start pulse in the channel 154. This connection is necessary since the signals representing $\bar{U}_N$ are obtained in the positions even before the start pulse, as may be seen from the logic expressed in Equation 108.

The signals from the "and" network 1186 are introduced through the "or" network 1194 to the "and" network 1196. These signals are synchronized by the "and" network 1196 at optimum times in the clock cycles and are introduced to the right input terminal of the flip-flop 604. The signals trigger the flip-flop 604 for the production of a relatively high voltage on the right output terminal of the flip-flop. Signals pass through the stages 1186, 1194 and 1196 in accordance with the logical equation:

$$\bar{d}=S_2G_1\bar{G}\bar{U}_N\bar{M}T \qquad (187)$$

where all of the terms have previously been defined.

Error signals representing $\epsilon=U_N-M$ are sometimes obtained. In order to minimize the number of stages in the digital differential analyzer, it would be desirable to use the same stages for obtaining $\epsilon=U_N-M$ as for obtaining $\epsilon=U_N+M$. As will be explained in the following paragraph, this has been accomplished by using different logic for controlling the operation of the carry flip-flop 604 when an operation to obtain $\epsilon=U_N-M$ is being performed.

As a first step in explaining this logic, it should be appreciated that M is made negative since it is being subtracted from $U_N$. This is generally accomplished by inverting the indications of M in each position and adding an indication of "1" in the position of least significance. This indication of "1" in the position of least significance can be added by making the carry flip-flop 604 true at the position of least significance. Since the indications of M are being inverted, the logic expressed in Equations 186 and 187 may be modified so that $$d=U_N\bar{M} \qquad (188)$$

$$\bar{d}=\bar{U}_NM \qquad (189)$$

The first step discussed in the previous paragraph can now be modified in a second step. This is accomplished by inverting the indications on both sides of Equations 188 and 189. This would produce the following equations for $\epsilon=U_N-M$:

$$\bar{d}=\bar{U}_NM \qquad (190)$$

$$d=U_N\bar{M} \qquad (191)$$

As will be seen, Equation 190 is the same as Equation 189 and Equation 191 is the same as Equation 189. Since the indications of the carry flip-flop 604 are being inverted in every position, they should also be inverted in the position of least significance. This would cause the carry flip-flop 604 to provide an indication of "0" at the position of least significance.

The discussion in the previous paragraphs may be seen from a particular example. For example, $U_N$ may have a value of 010110110, and M may have a value of 010101010, where the least significant digit is at the right in each instance. By using the logic expressed in Equations 188 and 189, the following results are obtained:

| | |
|---|---|
| 111101111 | D |
| 010110110 | $U_N$ |
| 101010101 | $\bar{M}$ |
| 000001100 | $\epsilon_1$ |

By using the logic expressed in Equations 190 and 191, the results are as follows:

| | |
|---|---|
| 111101000 | D |
| 010110110 | $U_N$ |
| 010101010 | M |
| 111110100 | $\epsilon_2$ |

As will be seen, the results obtained for $\epsilon_2$ are different from those obtained for $\epsilon_1$. The results obtained for $\epsilon_1$ represent the true difference of $\epsilon=U_N-M$. On this basis, it might appear that the results obtained for $\epsilon_2$ are wrong. But if the results of $\epsilon_1$ are negated by inverting the indications in each position and adding a "1" to the position of least significance, $\epsilon_2$ is obtained. This may be seen from the following:

| |
|---|
| 111110011 |
| 1 |
| 111110100 |

As will be seen from the logic expressed in Equations 190 and 191, the carry flip-flop 604 becomes triggered to its true state for a condition represented by $U_N\bar{M}$ and becomes triggered to a false state for a condition represented by $\bar{U}_NM$. The "and" network 1164 in FIGURE 23 passes signals upon the occurrence of $U_N\bar{M}$ as represented by signals from the cathode follower 708 and the right output terminal of the flip-flop 1168. The "and" network 1164 passes these signals only for a servo operation as represented by a relatively high voltage on the left output terminal of the flip-flop 606. The "and" network further passes the signals only when the difference represented by $\epsilon=U_N-M$ is being obtained. Such error signals are obtained only when signals of high amplitude are produced by the cathode follower 1170 and introduced to the "and" network 1164. The operation of the cathode follower 1170 can be controlled so as to produce signals of high amplitude only upon the occurrence of certain blocks.

The signals from the "and" network 1164 pass through the "or" network 1172 and the "and" network 1174 to the left input terminal of the flip-flop 604. The signals trigger the flip-flop 604 so as to produce a relatively high voltage on the left output terminal of the flip-flop. Voltages of high amplitude are produced on the left output terminal of the flip-flop 604 by the passage of signals through the stages 1164, 1172 and 1174 in accordance with the logical equation:

$$d=G_1\bar{G}U_N\bar{M}T \qquad (192)$$

where all of the terms have previously been defined.

The "and" network 1188 becomes prepared for activation at the same time as the "and" network 1164 because of its connection to the cathode follower 1170 and the left output terminal of the flip-flop 606. The "and" network 1188 then passes signals only after the occurrence of the start pulse in the channel 154, since it is connected to the left output terminal of the flip-flop 736. The reason for connecting the flip-flop 736 to the "and" network 1188 has been fully described in connection with the logic expressed in Equation 187. When the "and" network 1188 becomes prepared for activation, it passes signals representing $\bar{U}_NM$ from the cathode follower 710 and the left output terminal of the flip-flop 1168.

The signals from the "and" network 1188 pass through the "or" network 1194 and the "and" network 1196 to the right input terminal of the flip-flop 604. The signals trigger the flip-flop so as to produce a relatively high voltage on the right output terminal of the flip-flop. The flip-flop 604 becomes triggered by the passage of signals through the stages 1188, 1194 and 1196 in accordance with the logical equation:

$$\overline{d}=S_2G_1\overline{GU_N}MT \qquad (193)$$

where all of the terms have previously been defined.

It will be seen from the above discussion that an error is obtained from the combination of $U_N$ and M if there is an indication of "1" for $\epsilon$ in any position before position 17 for a servo block. The flip-flop 974 in FIGURE 19 is used to indicate the existence of an error for a servo block. The flip-flop 974 is available even at position "1," since the information recorded in the flip-flop to represent the polarity of $\Sigma dU$ is stepped out of the flip-flop at position 1. This has been described above in connection with the discussion relating to logical Equations 177, 178, 179 and 180.

Certain stages including the "and" network 1024 in FIGURE 19 are included to trigger the flip-flop 974 when an error in the combination of $U_N$ and M occurs. The "and" network 1024 passes signals only for a servo operation because of its connection to the left output terminal of the flip-flop 606. Because of its connection to the left output terminal of the flip-flop 736, the "and" network 1024 becomes further prepared for activation to pass signals only after the occurrence of the start pulse in the channel 154. When the "and" network 1024 becomes prepared for activation, it passes signals representing $\epsilon$ from the cathode follower 1026.

The signals from the "and" network 1024 are introduced through the "or" network 1036 to the "and" network 1038 and are synchronized by the "and" network 1038 at optimum times in the clock cycles. The signals are then applied to the left input terminal of the flip-flop 974 to trigger the flip-flop for the production of a relatively high voltage on the left output terminal of the flip-flop. This high voltage is produced by the passage of signals through the stages 1024, 1036 and 1038 in accordance with the logical equation:

$$c''_2=\epsilon S_2G_1T \qquad (194)$$

where all of the terms have previously been defined.

When the flip-flop 974 becomes triggered to its true state in accordance with the logic expressed in Equation 194 to indicate an error signal, the flip-flop remains in this state of operation until the end of the servo block. In this way, the flip-flop 974 controls the recordation of error signals in the channel 138 for the block undergoing computation. The polarity of the error signal is represented by the state of operation of the carry flip-flop 604 at position 18. The action of the carry flip-flop 604 in indicating the polarity of the error signal is similar to that of the carry flip-flop 432 in indicating the overflow in a normal integrator. The overflow indications provided by the carry flip-flop 432 have been fully described above and expressed logically in Equations 63 and 64.

Since servo operations are being performed, the polarity of the error signals must be inverted to obtain the proper correction. For example, when a negative error is obtained by combining $U_N$ and M, positive additions must be made to overcome this negative error. These positive additions are made by inverting the polarity of the negative error signals at the time that the error signals are being recorded in the channel 138. In this way, positive increments are presented to the servo block in the next cycle of computation to overcome the negative error signal. In like manner, negative increments are presented to the servo block in the next cycle of computation to overcome positive error signals.

The error signals are inverted and recorded in the channel 138 by the operation of certain stages shown in FIGURES 29 and 30. These stages include the "and" network 1490 in FIGURE 29. The "and" network 1490 passes signals only upon the occurrence of a negative error signal as represented by signals of high amplitude on the left output terminal of the flip-flop 974 and the right output terminal of the flip-flop 604. The signals from the "and" network 1490 pass through the "or" network 1488 to the "and" network 1486. The signals are able to pass through the "and" network 1486 only at position 18 for blocks undergoing servo operation. This result is obtained because of the connections to the "and" network 1486 from the "and" network 216 and the left output terminal of the flip-flop 606.

The signals passing through the "and" network 1486 are introduced through the "or" network 1478 to the "and" network 1480. These signals are passed by the "and" network 1480 only during periods of actual computation, as represented by signals of high amplitude from the cathode follower 1340. The signals then pass to the left input terminal of the flip-flop 337 so as to trigger the flip-flop for the production of a relatively high voltage on the left output terminal of the flip-flop. The flip-flop 337 receives the signals passing through the stages 1490, 1488, 1486, 1478 and 1480 in accordance with the logical equation:

$${}_0z=\alpha G_1P_{18}\overline{D}C''_2T \qquad (195)$$

where all of the terms have previously been defined. The signals of high amplitude on the left output terminal of the flip-flop 337 are introduced to the coil 270 to produce a recordation of an indication of "1" in the channel 138.

Error signals of positive polarity pass through the "and" network 1534 in FIGURE 30. This occurs because of the connections to the "and" network 1534 from the left output terminals of the flip-flops 604 and 974. The signals then pass through the "or" network 1532 to the "and" network 1530. The "and" network 1530 becomes open for the passage of these signals only at position 18 for a servo operation. The signals passing through the "and" network 1530 are then applied through the "or" network 1522 to the "and" network 1524, which passes the signals whether or not computation is actually proceeding. The "and" network 1524 passes the signals even during periods of idling, since it is desirable to record indications of "0" in the channel 138 at all times except when indications of "1" have to be recorded. The signals from the "and" network 1524 trigger the flip-flop 337 into a false state of operation, so that an indication of "0" is recorded by the coil 270 in the channel 138. Indications of "0" are recorded by the coil 270 in the channel 138 by the passage of signals through the stages 1534, 1532, 1530, 1522 and 1524 in accordance with the logical equation:

$${}_0\overline{z}=G_1P_{18}DC''_2T \qquad (196)$$

where all of the terms have previously been defined.

*Analogue-to-Digital Conversion of Error Signals From Servos*

As previously described in connection with the block diagram shown in FIGURE 42, the error signals obtained by the block 1708 are sometimes introduced to the external source such as the converter 1714 to vary the operation of the external source. In such cases, it is necessary to convert the signals digitally representing the error into a corresponding analogue signal. The analogue signal then drives the external source such as a control shaft in a direction to reduce the magnitude of the error signal.

The stages shown in FIGURE 24 operate to convert the error signals from a digital form to an analogue form. These stages include the "and" network 1274. The "and" network 1274 becomes prepared for activation only when a relatively high voltage is produced on the left output terminal of the flip-flop 244. Since the flip-flop 244 is the second counter in the block counters, the "and" network 1274 can become activated in only two out of every four blocks. Actually, the "and" network 1274 passes signals in only one of the two activated blocks since signals representing M are introduced to the digital differential analyzer for a servo operation in only every other block. This may be seen from the logic expressed for the M flip-flop 1168 in Equation 181 and from the inclusion of the "$K_1$" term in this logic. Since the "and" network 1274 can become activated only in two blocks out of every four and detection of error between $U_N$ and M can occur only in every other block, the "and" network 1274 actually passes information signals only in one block out of every four.

The "and" network 1274 can pass signals only in positions 2 to 17, inclusive, for each block. This results from the connection between the "and" network 1274 and the inverter 541. The "and" network 1274 is further able to open only in the positions after the start pulse in the channel 154, as represented by a relatively high voltage on the left output terminal of the flip-flop 736.

When the "and" network 1274 becomes prepared for activation, it passes the signals from the cathode follower 1026 representing the error $\epsilon$. These signals pass through the "or" network 1280 to the "and" network 1278, which synchronizes the signals at optimum times in the clock cycles. The signals then pass to the left input terminal of the flip-flop 976 and trigger the flip-flop for the production of a relatively high voltage on the left output terminal of the flip-flop. The flip-flop 976 is triggered by the signals passing through the stages 1274, 1280 and 1278 in accordance with the logical equation:

$$c_4 = \epsilon S_2 K_2 P_{2/17} T \qquad (197)$$

Where:

$c_4$=the introduction of a triggering signal to the left input terminal of the flip-flop 976; and the other terms have previously been defined.

The "and" network 1284 becomes prepared for activation at the same time as the "and" network 1274. However, the "and" network 1284 passes the signals from the cathode follower 1050 representing a lack of error for the different positions. This lack of error is designated as $\bar{\epsilon}$. The signals from the "and" network 1284 pass through the "or" network 1290 to the "and" network 1288. These signals are synchronized at optimum times in the block cycles by the "and" network 1288 and are introduced to the right input terminal of the flip-flop 976. The signals trigger the flip-flop such that a relatively high voltage is produced on the right output terminal of the flip-flop. A relatively high voltage is produced on the right output terminal of the flip-flop 976 by the passage of signals through the stages 1284, 1290 and 1288 in accordance with the logical equation:

$$\bar{c}_4 = \bar{\epsilon} S_2 K_2 P_{2/17} T \qquad (198)$$

Where:

$\bar{c}_4$=the introduction of a triggering signal to the right input terminal of the flip-flop 976; and the other terms have previously been defined.

The information in the flip-flop 976 is stepped into the flip-flop 1238 in successive pulse positions. This results from the operation of certain stages including the "and" network 1256 in FIGURE 24. The "and" network 1256 becomes prepared for activation only in positions 1 to 4, inclusive, of the same blocks in which the "and" networks 1274 and 1284 pass signals. The "and" network 1256 passes signals at these times because of its connection to the "and" network 1232 and the left output terminal of the flip-flop 244. The signals from the "and" network 1256 are introduced through the "or" network 1262 to the "and" network 1264 for synchronization at optimum times in the clock cycles. The signals passing through the "and" network 1264 are then introduced to the left input terminal of the flip-flop 1238 to trigger the flip-flop into a true state of operation. The flip-flop 1238 is triggered into a true state of operation by the passage of signals through the stages 1256, 1262 and 1264 in accordance with the logical equation:

$$c_3 = E_4 P_{1/4} K_2 T \qquad (199)$$

Where:

$c_3$=the introduction of a triggering signal to the left input terminal of the flip-flop 1238;

$E_4$=a relatively high voltage on the left output terminal of the flip-flop 976;

$P_{1/4}$=a signal from the "and" network 1232; and the other terms have previously been defined.

The "and" network 1266 becomes prepared for activation at the same time as the "and" network 1256. However, the "and" network 1266 passes the signals of high amplitude on the right output terminal of the flip-flop 976. These signals pass through the "or" network 1270 to the "and" network 1272. The "and" network 1272 synchronizes the signals at optimum times in the clock cycles and introduces the signals to the right input terminal of the flip-flop 1238 so that the flip-flop can be triggered into a false state of operation. Signals pass to the flip-flop 1238 through the stages 1266, 1270 and 1272 in accordance with the logical equation:

$$\bar{c}_3 = \bar{E}_4 P_{1/4} K_2 T \qquad (200)$$

Where:

$\bar{c}_3$=the introduction of a triggering signal to the right input terminal of the flip-flop 1238;

$\bar{E}_4$=a relatively high voltage on the right output terminal of the flip-flop 976; and the other terms have previously been defined.

Just as the information in the flip-flop 976 is stepped into the flip-flop 1238, the information in the flip-flop 1238 is stepped into the flip-flop 1246. The information is stepped from the flip-flop 1238 to the flip-flop 1246 in the same positions as the stepping operation from the flip-flop 976 to the flip-flop 1238. In these positions, the signals of high amplitude on the left output terminal of the flip-flop 1238 pass through the "and" network 1236 and the "or" network 1242 to the "and" network 1244 for synchronization at optimum times in the clock cycles. The signals then pass to the left input terminal of the flip-flop 1246 and trigger the flip-flop so as to produce a relatively high voltage on the left output terminal of the flip-flop. The flip-flop 1246 receives the signals passing through the stages 1236, 1242 and 1244 in accordance with the logical equation:

$$e_2 = E_3 P_{1/4} K_2 T \qquad (201)$$

Where:

$e_2$=the introduction of a triggering signal to the left input terminal of the flip-flop 1246;

$E_3$=a relatively high voltage on the left output terminal of the flip-flop 1238; and the other terms have previously been defined.

The "and" network 1247 becomes prepared for opening at the same time as the "and" network 1236 but passes the signals of high amplitude on the right output terminal of the flip-flop 1238. These signals are introduced through the "or" network 1250 to the "and" network 1252 which synchronizes the signals at optimum times in the clock cycles. The signals are then applied to the right input terminal of the flip-flop 1246 to trigger the flip-flop into its "off" condition, as represented by a relatively high voltage on the right output terminal of the flip-flop. Such a voltage is produced by the passage of signals through the stages 1247, 1250 and 1252 in accordance with the logical equation:

$$\bar{e}_2=\bar{E}_3P_{1/4}K_2T \qquad (202)$$

Where:

$\bar{e}_2$=the introduction of a triggering signal to the right input terminal of the flip-flop 1246;

$\bar{E}_3$=a relatively high voltage on the right output terminal of the flip-flop 1238; and the other terms have previously been defined.

The stepping operation from the flip-flop 976 to the flip-flop 1238 and then to the flip-flop 1246 occurs only in positions 1 to 4, inclusive, for a servo block. After position 4 for a servo block, the flip-flops 976, 1238 and 1246 perform a somewhat different function. This results from the fact that the difference as represented by $\epsilon=U_N\pm M$ is sometimes relatively large. Since only a limited correction can be provided in the operation of an external source such as an output shaft in each cycle of computation, it is not necessary to record the exact magnitude of the error for values beyond a particular magnitude. For this reason, positive errors are limited to a maximum value of +3 even for errors considerably greater than this value. Similarly, negative errors are limited to a maximum value of −4 even for errors having a considerably greater magnitude than this value.

The flip-flops 976, 1238 and 1246 operate after position 4 of a servo block to detect whether the error is outside of the range $+3\geqq\epsilon\geqq-4$. As one step in this operation, the flip-flop 976 detects any error signals in accordance with the logic expressed in Equations 197 and 198. This detecting operation by the flip-flop 976 continues after position 4 since the term $P_{2/17}$ is included as a part of the logic in Equations 197 and 198.

The flip-flops 1238 and 1246 compare successive pairs of indications. As may be seen from the table shown in FIGURE 44, positive errors having a magnitude greater than +3 are obtained when indications of "1" and "0" occur in any two successive positions after position 4 for a servo block. When this occurs, relatively high voltages are simultaneously obtained from the cathode follower 1050 and the left output terminal of the flip-flop 976. These signals are introduced to the "and" network 1240 in FIGURE 24.

The "and" network 1240 is able to pass the signals from the cathode follower 1050 and from the left output terminal of the flip-flop 976 only during positions 5 to 18, inclusive, for the block undergoing computation. This results from the fact that the "and" network is connected to the inverter 1234. Since the "and" network 1240 is connected to the left output terminal of the flip-flop 736, the "and" network is able to open for the passage of signals only after the occurrence of the start pulse in the channel 154. Because of this, the "and" network 1240 is able to open only in the positions holding digital information for a block. The "and" network 1240 is further able to open in every alternate pair of blocks as a result of the introduction of a signal from the left output terminal of the flip-flop 244.

The signals from the "and" network 1240 pass through the "or" network 1242 and the "and" network 1244 and trigger the flip-flop 1246 to its true state. The flip-flop 1246 is triggered by these signals in accordance with the logical equation:

$$e_2=\bar{\epsilon}E_4S_2K_2P_{5/18}T \qquad (203)$$

where all of the terms have previously been defined. Similarly, the signals from the "and" network 1240 pass through the "or" network 1262 and the "and" network 1264 and trigger the flip-flop 1238 to its true state. Signals pass through the stages 1240, 1262 and 1264 in accordance with the logical equation:

$$e_3=\bar{\epsilon}E_4S_2K_2P_{5/18}T \qquad (204)$$

where all of the terms have previously been defined.

As will be seen in the table shown in FIGURE 44, a positive error is represented by an indication of "0" at position 17. This is true whether the magnitude of the error is less than or greater than +3. For this reason, the flip-flop 976 is triggered to its false state at position 17 in accordance with the logic expressed in Equation 198. Since the flip-flops 1238 and 1246 are triggered to their true states for positive errors greater than +3, the flip-flops 976, 1238 and 1246 operate in a pattern to indicate a pattern of +3 for positive errors greater than this pattern.

Just as the flip-flops 976, 1238 and 1246 convert positive errors greater than +3 into indications of +3, the flip-flops convert negative errors having magnitudes greater than −4 into indications of −4. As will be seen from the table shown in FIGURE 44, negative errors of magnitudes greater than −4 are represented by indications of "0" and then "1" in a pair of successive positions in which at least one of the positions occurs after position 4 for a servo block. This causes signals of high amplitude to be simultaneously obtained from the cathode follower 1026 and the right output terminal of the flip-flop 976. These signals are introduced to the "and" network 1248, which becomes prepared for activation at the same time as the "and" network 1240.

The signals passing through the "and" network 1248 are passed by the "or" network 1250 and the "and" network 1252 to the flip-flop 1246 to trigger the flip-flop into its false state of operation. The flip-flop 1252 receives the signals passing through the stages 1248, 1250 and 1252 in accordance with the logical equation:

$$\bar{e}_2=\epsilon\bar{E}_4S_2K_2P_{5/18}T \qquad (205)$$

where all of the terms have previously been defined. Similarly, the flip-flop 1246 becomes triggered to its false state by the passage of signals through the stages 1248, 1270 and 1272 in accordance with the logical equation:

$$\bar{e}_3=\epsilon\bar{E}_4S_2K_2P_{5/18}T \qquad (206)$$

where all of the terms have previously been defined.

As will be seen in the table shown in FIGURE 44, negative errors are represented by an idication of "1" at position 17, regardless of the magnitude of the error. This causes the flip-flop 976 to be triggered to its true state at position 17. Since the flip-flops 1238 and 1246 have already been triggered to their false state for negative errors having a magnitude greater than −4, the flip-flops 976, 1238 and 1246 provide an indication of −4 for negative errors greater than −4.

At position 17 for a servo block, the flip-flops 976, 1238 and 1246 provide a parallel representation of an indication within the range of $+3=\epsilon=-4$. The indications provided by the flip-flops 976, 1238 and 1246 are thereafter converted into an analogue voltage corresponding to the value indicated by the parallel state of operation of the flip-flops. This digital-to-analogue conversion may be provided by circuitry similar to that disclosed in co-pending application, Serial No. 467,155 filed November 5th, 1954, now U.S. Patent No. 2,914,758 by Leo P. Retzinger, Jr.

As disclosed in co-pending application Serial No. 467,155, the operation of flip-flops corresponding to the flip-flops 976, 1238 and 1246 controls the charging of a pair of capacitances in push-pull relationship. In order to insure the full charging of these capacitances, the charging takes place during the presentation for computation of the two blocks after the servo block. These two blocks are represented by a false state of operation of the flip-flop 244, designated previously as the "$K_2$" flip-flop.

FIGURE 45 provides a curve illustrating the sequence of operations for obtaining an analogue error signal. During the two blocks in which the flip-flop 244 is in a true state of operation, the flip-flops 976, 1238 and 1246 become prepared for operation. The flip-flops 976, 1238 and 1246 operate to obtain an error signal in digital form during the second of these two blocks. This results from the inclusion of the $K_1$ term in the logic expressed in Equation 181 for controlling the operation of the M flip-flop 1168. During the following two blocks in which the flip-flop 244 is in a false state of operation, the indications in the flip-flops 976, 1238 and 1246 are converted into a corresponding analogue voltage as by the charging of certain capacitances. This voltage is used to drive an external member such as as output shaft in a direction to minimize the error signal. In this way, a servo operation for controlling the functioning of an output member can be obtained in only one out of every four blocks.

*$H_1$, $H_2$ and $H_3$ Servos*

Several different types of servos are used in the digital differential analyzer described above and forming a part of this invention. One type of servo will be designated as the $H_1$ servo. A simplified block diagram of the $H_1$ type of servo is shown in FIGURE 46. The servo includes a servo block 1790 such as in the digital differential analyzer constituting this invention. The output from the servo block 1790 is fed into a computer 1792 through a line 1794 to control the operation of this stage. The output from the stage 1794 is in turn introduced to the computer through a line 1796. The computer 1792 may actually be other blocks in the digital differential analyzer than the servo block 1790.

The signals passing through the line 1796 correspond to the signals in the line 1794. However, because of the operation of the servo block 1790, the signals in the line 1796 are delayed for one cycle of computation before they reach the line 1794. The signals in the line 1796 represent increments which may be designated as "$dI$." These signals are obtained from the output channel 138 as $dz$ increments in a manner similar to that described above. Similarly, the signals in the line 1794 represent increments which may be designated as "$dW$." When the signals representing $dW$ are introduced to the servo block 1790, they may be designated as $dI$.

The operation of the servo system illustrated schematically in FIGURE 46 may be seen from a typical example such as that shown below:

| Revolutions | dI = dW | I | dz | dw |
|---|---|---|---|---|
| n | | + | | |
| n + 1 | | +1 | - | - |
| n + 2 | - | 0 | - | - |
| n + 3 | - | -1 | + | - |
| n + 4 | - | -2 | + | + |
| n + 5 | + | -1 | + | + |
| n + 6 | + | 0 | + | + |
| n + 7 | + | +1 | - | + |
| n + 8 | + | +2 | - | - |
| n + 9 | - | +1 | - | - |

As will be seen from the above example, the polarity of the indications representing $dz$ are determined by inverting the polarity of I. If $I=0$, the polarity of the $dz$ increment is obtained by inverting the polarity of I in the previous cycle of computation. Since I represents an error, it will be seen that the error fluctuates between +2 and −2 in successive cycles of computation. On the basis of the above example, $$(dz)_n=-I, \text{ where } I\neq 0 \text{ and}$$
$$n=\text{the } n\text{th cycle of computation}$$

Also $$=(dz)_n=-I_{n-1}, \text{ where}$$
$$I=0 \text{ in the } n\text{th cycle of computation}$$

It will be seen that an error is presumed in an $H_1$ type servo even when $I_n=0$, since the error is then determined from the polarity of I in the previous cycle of computation. For this reason, it is desirable to trigger the flip-flop 974 to its true state of operation at position 1 to stimulate an error even though no error resulting from the logic expressed in Equation 194 may actually occur. The "and" network 1032 is included in FIGURE 19 to pass signals for triggering the flip-flop 974 to its true state for an $H_1$ type servo. The "and" network 1032 passes a signal only at position 1 of a single-block operation or the second half of a double-block operation. This results from the connections to the "and" network 1032 from the "and" network 222 and the right output terminal of the flip-flop 390. The "and" network 1032 is further able to pass signals only upon the simultaneous occurrence of high voltages on the left output terminals of the flip-flops 542 and 606. At position 1, the simultaneous occurrence of these high voltages indicate an $H_1$ type servo. In this way, an indication of "1" in the channel 148 at position 1 of a servo operation provides a permanent code to represent an $H_1$ type servo.

The signals from the "and" network 1032 pass through the "or" network 1036 and the "and" network 1038 to the flip-flop 974. The signals trigger the flip-flop 974 into a true state as representedd by a relatively high voltage on the left output terminal of the flip-flop. The signals trigger the flip-flop 974 in accordance with the logical equation:

$$c_2''=Y_pG_1P_1\overline{G}_5T \qquad (207)$$

where all of the terms have previously been defined.

Since the flip-flop 974 is triggered to its true state at position 1 for an $H_1$ type servo, an error pulse can be recorded in the channel 138 at position 18 in a normal manner. This pulse is recorded in accordance with the logic expressed in Equations 195 and 196. As expressed logically in these equations, an indication of "1" is recorded in the channel 138 for a negative error and an indication of "0" is recorded for a positive error. When the error is zero, a pulse is recorded with a polarity inverted relative to that of the error in the previous cycle of computation. This is recorded automatically because of the operation of the networks shown in FIGURE 23 and expressed logically in Equations 186, 187, 192 and 193. The automatic operation of the networks shown in FIGURE 23 to determine the polarity of the error in the previous cycle of computation for an error of zero in the present cycle is equivalent to the operation described above for a "zero-rate" addition for an addition of $y=0$ with a value of R. This has been described above in connection with the logic described in Equations 65 and 66.

It will be seen that the response of the $H_1$ type servo is relatively slow since the error of this servo fluctuates between values of +2 and −2. It would be more desirable, for example, if the servo could be made to fluctuate between errors of only +1 and −1. This is obtained in an $H_2$ type servo. This type of servo operates in a manner similar to the $H_1$ type of servo, except when an error of 0 occurs. For an error of zero, the servo obtains a $dz$ increment having a polarity opposite to that of the $dz$ increment in the previous cycle of computation.

The operation of an $H_2$ type servo may be seen from a specific example:

| Revolutions | dI = dw | I | dz | dw |
|---|---|---|---|---|
| n | | + | - | - |
| n + 1 | | +1 | - | - |
| n + 2 | - | 0 | + | + |
| n + 3 | - | -1 | + | + |
| n + 4 | + | 0 | - | - |
| n + 5 | + | +1 | - | - |
| n + 6 | - | 0 | + | + |
| n + 7 | - | -1 | + | + |
| n + 8 | + | 0 | - | |
| n + 9 | + | +1 | - | |

On the basis of the above example, the operation of an $H_2$ type servo may be expressed as:

$$(dz)_n = -I_n \text{ if } I_n \neq 0$$

$$(dz)_n = -(dz)_{n-1} \text{ if } I_n = 0$$

When $I_n \neq 0$, $(dz)_n$ may be obtained by the operation of certain stages shown in FIGURES 29 and 30. This has been expressed logically in Equations 195 and 196. Certain stages are also included in FIGURES 29 and 30 to obtain $(dz)$ when $I_n = 0$. These stages include the "and" network 1496 in FIGURE 29.

The "and" network 1496 passes signals when no error is obtained, as represented by a relatively high voltage on the right output terminal of the flip-flop 974. This corresponds to $I_n = 0$. The "and" network 1496 further passes signals only upon the occurrence of a coding pulse. This coding pulse is represented by a relatively high voltage on the right output terminal of the flip-flop 542. Upon the introduction of high voltages from the flip-flops 542 and 974, the "and" network 1496 passes the signals of high amplitude on the right output terminal of the flip-flop 284. This signal represents in inverted form the error signal recorded for the $H_2$ type servo in the previous cycle of computation.

The signals from the "and" network 1496 are introduced through the "or" network 1488 to the "and" network 1486. The "and" network 1486 passes the signals only at position 18 for a servo operation. This results from the fact that the "and" network 1486 is connected to the "and" network 216 and the left output terminal of the flip-flop 606. The signals from the "and" network 1486 pass through the "or" network 1478 to the "and" network 1480. The "and" network 1480 passes the signals only during periods of actual computation, as represented by signals of high amplitude from the cathode follower 1340. The signals then pass to the left input terminal of the flip-flop 337 and trigger the flip-flop to produce a relatively high voltage on the left output terminal of the flip-flop. This voltage causes an indication of "1" to be recorded by the coil 270 in the channel 138. An indication of "1" is recorded in the channel 138 by the passage of signals through the stages 1496, 1488, 1486, 1478 and 1480 in accordance with the logical equation:

$$_0z = \alpha P_{18} G_1 \bar{Z}_2 \bar{U}_2'' Y_p T \tag{208}$$

where all of the terms have previously been defined.

The "and" network 1540 in FIGURE 30 becomes prepared for activation at the same time as the "and" network 1496 in FIGURE 29 but passes the signals of high amplitude on the left output terminal of the flip-flop 284. These signals pass through the stages 1532, 1530, 1522 and 1524 (FIGURE 30) respectively corresponding to the stages 1488, 1486, 1478 and 1480 in FIGURE 29. However, the "and" network 1524 passes signals during periods of idling as well as during periods of actual computation. This occurs because it is desirable to record indications of "0" in the channel 138 at all times that indications of "1" are not being recorded.

The signals from the "and" network 1524 pass to the right input terminal of the flip-flop 337. The signals trigger the flip-flop 337 for the production of a relatively high voltage on the right output terminal of the flip-flop and a relatively low voltage on the left output terminal of the flip-flop. The low voltage on the left output terminal of the flip-flop 337 causes an indication of "0" to be recorded by the coil 270 in the channel 138. The flip-flop 337 is triggered into its false state by the passage of signals through the stages 1540, 1532, 1530, 1522 and 1524 in accordance with the logical equation:

$$_0\bar{z} = P_{18} G_1 Z_2 \bar{U}_2'' Y_p T \tag{209}$$

where all of the terms have previously been defined.

In addition to the $H_1$ and $H_2$ types of servos, a third type of servo is used. This servo has been designated as the $H_3$ type and is shown in simplified block form in FIGURE 47. In the $H_3$ type of servo, the output from a servo block 1798 in each cycle of computation is fed directly into the input to the servo block in the next cycle. Inputs from other sources such as from other blocks may also be introduced as inputs to the servo block 1798 in each cycle of computation. Such inputs are shown in FIGURE 47 as being introduced on lines A and B to the servo block shown in the figure.

The operation of an $H_3$ type of servo may be seen from a specific example:

| Revolutions | A | B | dI | I | dz |
|---|---|---|---|---|---|
| n | + | + | + | 0 | - |
| n + 1 | - | - | - | -3 | + |
| n + 2 | + | + | + | 0 | + |
| n + 3 | - | - | + | -1 | + |
| n + 4 | + | + | + | +2 | - |
| n + 5 | + | - | - | +1 | - |
| n + 6 | - | + | - | -2 | + |
| n + 7 | + | - | + | -1 | + |
| n + 8 | - | + | + | 0 | + |
| n + 9 | + | + | + | +3 | - |
| n + 10 | - | - | - | 0 | - |
| n + 11 | + | + | - | +1 | - |
| n + 12 | + | - | - | 0 | - |
| n + 13 | + | - | - | -1 | + |
| n + 14 | + | - | + | 0 | + |

In the above example, I in each cycle of computation is obtained by adding A, B and $dI$ for that cycle of computation and the value of I from the previous cycle of computation. As will be seen from the above example, the $dz$ increment is obtained by inverting the polarity of the error signal I in the same cycle of computation. If the error signal for the cycle of computation is zero, the polarity of the $dz$ increment is the same as that of the $dz$ increment in the previous cycle of computation. This may be expressed as $$(dz)=-I_n \text{ if } I_n\neq 0 \qquad (210)$$

$$(dz)_n=(dz)_{n-1} \text{ if } I_n=0 \text{ and } I_{n-1}\neq 0 \qquad (211)$$

Although the following expression cannot be seen from the above example, it will be seen from subsequent examples. This expression is as follows:

$$(dz)_n=-(dz)_{n-1} \text{ if } I_n=0 \text{ and } I_{n-1}=0 \qquad (212)$$

The expression may be obtained for an $H_3$ type of servo by making either the A input or the B input zero.

The logic developed in the previous paragraph has been incorporated into the digital differential analyzer by the operation of certain stages shown in FIGURES 29 and 30. To obtain the logic expressed in Equation 210, certain stages shown in FIGURES 29 and 30 operate in accordance with the logic developed above in Equations 186, 187, 192 and 193 and Equations 195 and 196. The operation of these stages has been discussed fully above.

The "and" network 1492 in FIGURE 29 operates in combination with other stages to produce signals representing the logic expressed in Equation 211. As may be seen from the logic expressed in Equation 211, the "and" network 1492 produces a signal only when an error is not produced in the cycle undergoing computation. As previously described, the lack of an error is represented by a signal of high amplitude on the right output terminal of the flip-flop 974. In further conformity with the logic expressed in Equation 211, the "and" network 1492 passes a signal only when an error signal has occurred in the previous cycle of computation, as represented by a signal of high amplitude on the left output terminal of the flip-flop 688. The production of such signals of high amplitude in the flip-flop 688 will be described in detail subsequently. The "and" network 1492 is further able to become activated only for an $H_3$ type of servo and not for either an $H_1$ or $H_2$ type of servo. This is represented by a relatively high voltage on the right output terminal of the flip-flop 542.

When the "and" network 1492 becomes prepared for activation, it passes the signals of high amplitude on the left output terminal of the flip-flop 284. These signals represent the $dz$ increment recorded in the channel 138 for the $H_3$ servo in the previous cycle of computation. The signals from the "and" network 1492 are introduced through the "or" network 1488 to the "and" network 1486, which passes the signals only at position 18 for a servo operation. The operation of the "and" network 1486 has been described in detail previously.

The signals from the "and" network 1486 then pass through the "or" network 1478 to the "and" network 1480, which passes the signals only during periods of actual computation. The signals trigger the flip-flop 337 for the production of a relatively high voltage on the left output terminal of the flip-flop. This voltage causes the coil 270 to record an indication of "1" in the channel 138. The indication of "1" is recorded in the channel 138 by the passage of signals through the stages 1492, 1488, 1486, 1478 and 1480 in accordance with the logical equation:

$$_oz=\alpha\overline{Y}_PZ_2\overline{C}_2''UP_{18}G_1T \qquad (213)$$

where all of the terms have previously been defined.

The "and" network 1536 in FIGURE 30 becomes prepared for activation at the same time as the "and" network 1492 in FIGURE 29. However, the "and" network 1536 passes the signals of high amplitude on the right output terminal of the flip-flop 284 representing a negative $dz$ increment recorded in the previous cycle of computation. The signals from the "and" network 1536 pass through the stages 1532, 1530, 1522 and 1524 to the right input terminal of the flip-flop 337 in a manner similar to that described above. These signals trigger the flip-flop 337 to its false state such that an indication of "0" is recorded by the coil 270 in the channel 138. The flip-flop 337 becomes triggered to its false state by signals passing through the stages 1536, 1532, 1530, 1522 and 1524 in accordance with the logical equation:

$$_o\overline{z}=\overline{Z}_2\overline{Y}_P\overline{C}_2''UP_{18}G_1T \qquad (214)$$

where all of the terms have previously been defined.

Equation 212 indicates that a $dZ$ increment in a cycle of computation is obtained by inverting the polarity of the increment in the previous cycle of computation when both cycles of computation have errors of "0." The "and" network 1494 in FIGURE 29 passes a signal under such circumstances. The "and" network 1494 becomes prepared for activation when errors of "0" are obtained in the present and immediately preceding cycles of computation. This is represented by relatively high voltages on the right output terminals of the flip-flops 688 and 974. When the "and" network 1494 becomes prepared for activation, it passes the signals of high amplitude on the right output terminal of the flip-flop 284. These signals represent $dZ$ increments of negative polarity from previous cycles of computation.

The signals from the "and" network 1494 pass through the "or" network 1488 to the "and" network 1486, which prevents the signals from passing except at position 18 of a servo operation as described previously. The signals from the "and" network 1486 are then introduced through the "or" network 1478 to the "and" network 1480, which passes the signals only during periods of actual computation. The signals passing through the "and" network 1480 trigger the flip-flop 337 to its true state, such that an indication of "1" is recorded by the coil 270 in the channel 138. The flip-flop 337 receives the signals passing through the stages 1494, 1488, 1486, 1487 and 1480 in accordance with the logical equation:

$$_oz=\overline{Z}_2\overline{U}\overline{C}_2''G_1P_{18}T \qquad (215)$$

where all of the terms have previously been defined.

Just as the "and" network 1494 in FIGURE 29 passes the signals of high amplitude on the right output terminal of the flip-flop 284, the "and" network 1538 in FIGURE 30 passes the signals of high amplitude on the left output terminal of the flip-flop. These signals pass through the "or" network 1532 and the "and" network 1530 at position 18 for a servo operation. The signals then pass through the "or" network 1522 and the "and" network 1524 to the right input terminal of the flip-flop 337. The signals trigger the flip-flop 337 to its false state of operation, such that an indication of "0" is recorded by the coil 270 in the channel 138. The flip-flop 337 becomes triggered to its false state by the passage of signals through the stages 1538, 1532, 1530, 1522 and 1524 in accordance with the logical equation:

$$_o\overline{z}=Z_2\overline{U}\overline{C}_2''G_1P_{18}T \qquad (216)$$

where all of the terms have previously been defined.

It will be seen from Equations 213, 214, 215 and 216 that the information relating to an error or lack of error in a servo operation is recorded in the channel 156 during each cycle of computation. The recordation of this information in the channel 156 is provided by the operation of certain stages including the "and" network 1432 shown in FIGURE 28. The "and" network 1432 becomes prepared for activation only at position 18 of a servo operation because of its connection to the "and" network 216 and the left output terminal of the flip-flop 606. The "and" network 1432 is further able to pass a signal only after the information relating to $U_N$ and M has been fully presented for computation in the block. This is represented by a relatively high voltage on the right output terminal of the start flip-flop 736. When the "and" network 1432 becomes prepared for activation, it passes the signals of high amplitude on the left output terminal of the flip-flop 974. These signals represent differences resulting from the combination of $U_N$ and M.

The signals from the "and" network 1432 are introduced through the "or" network 1426 to the "and" network 1424. The "and" network 1424 passes signals only during periods of actual computation since the "and" network is connected to the cathode follower 1340. The signals from the "and" network 1424 pass through the "or" network 1420 to the "and" network 1418 for synchronization at optimum times in the clock cycles. The signals are then introduced to the left input terminal of the flip-flop 1414 to trigger the flip-flop into its true state for the production of a relatively high voltage on the left output terminal of the flip-flop. This voltage causes the coil 1416 to record an indication of "1" in the channel 156. Signals pass to the flip-flop 1414 through the stages 1432, 1426, 1424, 1420 and 1418 in accordance with the logical equation:

$$_0u=\alpha C_2''\overline{S}_2G_1P_{18}T \qquad (217)$$

where all of the terms have previously been defined.

Figure 28:
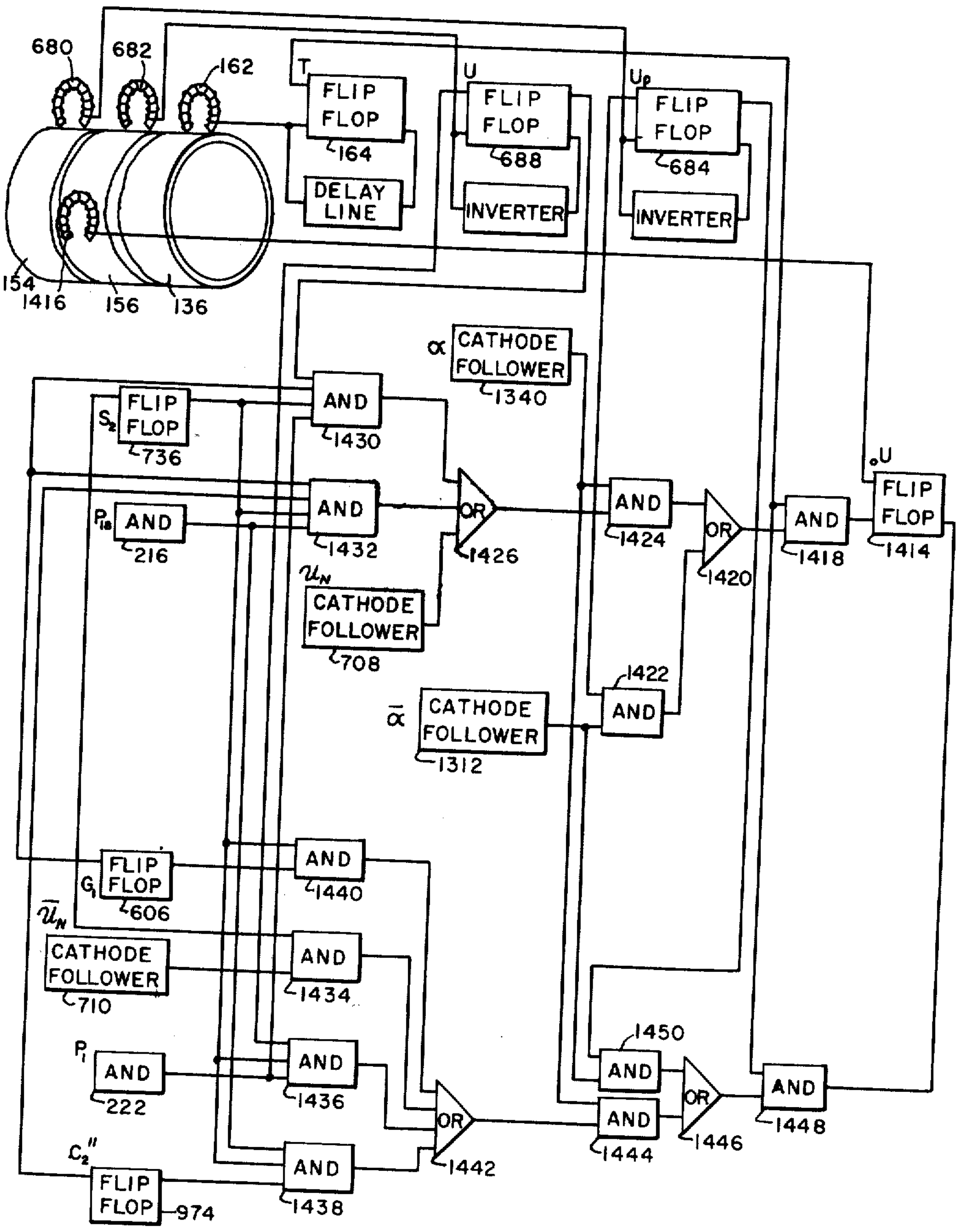

The "and" network 1438 in FIGURE 28 passes signals when an error of "0" is obtained for a servo operation in a cycle of computation. The "and" network 1438 passes such signals because of its connection to the right output terminal of the flip-flop 974. The signals are able to pass through the "and" network 1438 only at position 18 for blocks in which all of the numerical information has already been presented. This results from the fact that the "and" network 1438 is connected to the "and" network 216 and the right output terminal of the flip-flop 736.

The signals from the "and" network 1438 pass through the "or" network 1442 to the "and" network 1444, which passes the signals only during periods of actual computation. The signals then pass through the "or" network 1446 to the "and" network 1448 for synchronization at optimum times in the clock cycles. After such synchronization, the signals are introduced to the right input terminal of the flip-flop 1414 to trigger the flip-flop into a false state of operation. This causes an indication of "0" to be recorded by the coil 1416 in the channel 156. The flip-flop 1414 receives the signals passing through the stages 1438, 1442, 1444, 1446 and 1448 in accordance with the logical equation:

$$_0\overline{u}=\alpha\overline{C}_2''\overline{S}_2P_{18}T \qquad (218)$$

where all of the terms have previously been defined.

In the normal operation of the $H_1$, $H_2$ and $H_3$ types of servos, numerical information is presented in every position between and including positions 1 and 17 for a block. For this reason, the flip-flop 736 is triggered to its true state at position 18 of the block preceding each servo block. This is accomplished by the operation of certain stages including the "and" network 836 in FIGURE 15. The "and" network 836 becomes prepared for activation at position 18 of blocks in which relatively high voltages are produced on the left output terminals of the flip-flops 310 and 684. Since the flip-flops 310 and 684 are triggered in accordance with the signals in the channels 142 and 154, simultaneous indications of "1" in the channels 142 and 154 at position 18 for a block provide a code to indicate that a normal servo operation will take place in the next block. The $H_1$, $H_2$ and $H_3$ types of servos can be considered as normal servos in comparison to other servos which will be described in detail subsequently.

The signals from the "and" network 836 are introduced through the "or" network 842 to the "and" network 844 and are synchronized by the "and" network 844 at optimum times in the clock cycles. The signals from the "and" network 844 pass to the left input terminal of the flip-flop 736 and trigger the flip-flop so as to produce a relatively high voltage on the left output terminal of the flip-flop. Signals are introduced through the stages 836, 842 and 844 to the flip-flop 736 in accordance with the logical equation:

$$s_2=L_2U_pP_{18}T \qquad (219)$$

where all of the terms have previously been defined.

When the start flip-flop 736 is triggered to its true state at position 18 for a block preceding a servo operation, it remains in its true state until position 17 of the servo block. At position 17 of the servo block, a signal passes through the "and" network 854. A signal passes through the "and" network 854 at this time because of the connections to the "and" network from the "and" network 208 and the left output terminal of the flip-flop 606.

The signals from the "and" network 854 pass through the "or" network 848 to the "and" network 846 for synchronization at optimum times in the clock cycles. The signals are then introduced to the right input terminal of the flip-flop 736 to trigger the flip-flop to its false state. The flip-flop 736 becomes triggered by the passage of signals through the stages 854, 848 and 846 in accordance with the logical equation:

$$\overline{s}_2=G_1P_{17}T \qquad (220)$$

where all of the terms have previously been defined. Since the flip-flop 736 is triggered to its false state at position 17, the information relating to the occurrence or lack of occurrence of error signals can be recorded in the channel 154 at position 18 in accordance with the logic expressed in Equations 217 and 218. The information can be recorded at position 18 for normal servo blocks even though the $\overline{S}_2$ term is included in Equations 217 and 218.

*Zero-Rate Servos*

Under certain circumstances, the operation of the $H_1$, $H_2$ and $H_3$ types of servos may not be as accurate as might be desired. To improve the accuracy of these servos, increments of alternate polarity are added to the servos in successive cycles of computation. For example, a positive increment may be added in the first, third, fifth and other odd cycles of computation and a negative increment may be added in the second, fourth, sixth and other even cycles of computation. Since the polarity of the increments is inverted in successive cycles of computation, the net incremental value resulting from this additional input is zero. In this way, the additional input does not introduce any undesirable incremental values to affect the desired output from the servo block. Rather, as will be explained hereinafter, the additional input tends to increase the accuracy of the servo operation.

Servos receiving increments of alternate polarity in successive cycles of computation have been designated as zero-rate "servos." The operation of these servos may be seen from a particular example for an $H_3$ type of servo. This example is as follows:

| Revolution | $Z_R$ | A | B | dI | I | dZ |
|---|---|---|---|---|---|---|
| n | + | + | + | - | +2 | - |
| n + 1 | - | - | - | - | -2 | + |
| n + 2 | + | + | + | + | +2 | - |
| n + 3 | - | - | - | - | -2 | + |
| n + 4 | + | + | + | + | +2 | - |
| n + 5 | - | + | - | - | 0 | - |
| n + 6 | + | - | + | - | 0 | + |
| n + 7 | - | + | - | + | 0 | - |
| n + 8 | + | - | + | - | 0 | + |
| n + 9 | - | + | + | + | +2 | - |
| n + 10 | + | - | - | - | 0 | - |
| n + 11 | - | + | + | - | 0 | + |
| n + 12 | + | + | - | + | +2 | - |
| n + 13 | - | - | + | - | 0 | - |
| n + 14 | + | + | - | - | 0 | + |

When a "zero rate" is added to a $H_3$ servo, it may be distinguished from a normal $H_3$ servo by the designation "$_0H_3$."

As will be seen from the above example, the polarity of the *dz* increments immediately reflects any unbalance in the normal inputs to the servo block such as the A and B inputs. For example, in the $(n+5)$ revolution an extra positive increment is introduced on the A line in comparison to the increments introduced to the A line in the previous cycles of computation. This causes the output to be reflected immediately by an additional negative *dZ* increment. This may be seen by comparing the polarity of the *dZ* increments in the $(n+4)$ and $(n+5)$ revolutions. Similarly, in the $(n+9)$ revolution, an additional positive increment occurs on the B line. This causes two successive *dZ* increments of negative polarity to be produced in the $(n+9)$ and $(n+10)$ revolutions. In the $(n+12)$ revolution, an additional positive increment again appears on the A line. This again causes two successive *dZ* increments of negative polarity to be produced in the $(n+12)$ and $(n+13)$ cycles of computation. In this way, by introducing increments of alternate polarity on the $Z_R$ line, the *dZ* output is made to immediately reflect any unbalances in the normal inputs such as on the A and B lines.

It will be seen from the above example that the error indicated at "1" may be a "0" for a number of successive cycles. Because of this, the logic developed in Equations 210, 211 and 212 becomes fully operative for an $H_3$ type of servo. This is especially true of the logic expressed in Equation 212 since this logic relates to the production of *dZ* increments when at least two successive cycles of computation have a "0" error. The stages for recording the polarity of the *dZ* increments in the channel 138 have been described fully above.

As described above, the flip-flop 736 is triggered to its true state at position 18 for a normal type of servo. This triggering occurs in accordance with the logic expressed in Equation 219. For a "zero rate" servo, the flip-flop 736 cannot be triggered to its true state at position 18 of the block preceding the servo operation. This results from the fact that an indication of "0" is permanently provided in the channel 154 at position 18 of the preceding block to indicate that the servo operation will be on a "zero rate" basis.

Since the flip-flop 736 is not triggered to its true state at position 18 of the block preceding a "zero rate" servo, the flip-flop becomes triggered to its true state at position 1 of the servo block. This occurs in accordance with the operation of certain stages including the "and" network 838 in FIGURE 15. The "and" network 838 passes a signal at position 1 of a servo block since it is connected to the "and" network 222 and the left output terminal of the flip-flop 606. The signals from the "and" network 838 pass through the "or" network 842 and the "and" network 844 to trigger the flip-flop 736 to its true state. The flip-flop 736 receives the signals passing through the stages 838, 842 and 844 in accordance with the logical equation:

$$s_2=G_1P_1T \qquad (221)$$

where all of the terms have previously been defined. The flip-flop 736 remains in its true state until position 17 of the servo block. At this position, the flip-flop is triggered to its false state in accordance with the logic expressed in Equation 220.

It has been previously described that the flip-flop 974 is triggered to a true state when there are any differences between $U_N$ and M in the combination $\epsilon=U_N\pm M$. This has been developed logically in Equation 194. As will be seen, the logic developed in Equation 194 includes the term "$S_2$." For a normal servo operation, the logic expressed in Equation 194 would be sufficient to detect any error since the flip-flop 736 representing $S_2$ is triggered to its true state at position 18 of the preceding block in accordance with the logic expressed in Equation 219. However, the $S_2$ flip-flop is not triggered to its true state until position 1 of a "zero rate" servo as described above. Because of this, the flip-flop 974 would not be triggered to its true state in case the only difference between $U_N$ and M occurred at position 1. For this reason, the "and" network 1030 is included in FIGURE 19. The "and" network 1030 is able to pass a signal only when an error signal occurs at position 1 of a servo operation. This results from the fact that the "and" network 1030 is connected to the "and" network 222, the cathode follower 1026 and the left output terminal of the flip-flop 606.

The signals from the "and" network 1030 are introduced through the "or" network 1036 to the "and" network 1038 for synchronization at optimum times in the clock cycles. The signals then pass to the left input terminal of the flip-flop 974 and trigger the flip-flop so as to produce a relatively high voltage on the left output terminal of the flip-flop. The flip-flop 974 is triggered by the passage of signals through the stages 1030, 1036 and 1038 in accordance with the logical equation:

$$c_2''=\epsilon G_1P_1T \qquad (222)$$

where all of the terms have previously been defined.

It will be seen from the logic expressed in Equations 207 and 222 that the flip-flop 974 becomes triggered to its true state at position 1 either for an $H_1$ type of servo or for an error at position 1 in the combination of $U_N$ and M for any type of servo, whether "zero-rate" or not. For all other conditions, the flip-flop 974 should remain in its false state of operation at position 1. This is obtained by negating the logic expressed in Equations 207 and 222. The "and" networks 1046 and 1048 in FIGURE 19 pass signals in accordance with this negated logic. The signals from the "and" networks 1046 and 1048 pass through the "or" network 1052 and the "and" network 1054 and trigger the flip-flop 974 to its false state of operation. The flip-flop 974 has signals applied to it through the stages 1046, 1048, 1052 and 1054 in accordance with the logical equation:

$$\bar{c}_2''=(\epsilon\bar{Y}_pG_1P_1+\bar{\epsilon}G_5G_1P_1)T \qquad (223)$$

where all of the terms have previously been defined.

In a "zero rate" servo, it has been described that increments of alternate polarity are added to the servo in successive cycles of computation. These increments are obtained by alternately recording signals of opposite polarity in the channel 156 in successive cycles of computation. The recording is obtained by the passage of signals through the "and" networks 1430 and 1436 in FIGURE 28. The "and" network 1430 becomes prepared for activation at position 1 of a servo operation because of its connections to the "and" network 222 and the left output terminal of the flip-flop 606. The "and" network 1430 becomes further prepared for activation only at position 1 for a "zero rate" servo as represented by a relatively high voltage on the right output terminal of the flip-flop 736 at this position. This results from the fact that the flip-flop 736 has a relatively high voltage on its left output terminal at position 1 for servos other than the "zero rate" type.

When the "and" network 1430 becomes prepared for activation, it passes the signals of high amplitude on the right output terminal of the flip-flop 688. These signals represent indications of "0" recorded in the channel 156 in the previous cycle of computation. The signals from the "and" network 1430 are introduced through the "or" network 1426 to the "and" network 1424. The "and" network 1424 passes the signals only during periods of actual computation since it receives the signals from the cathode follower 1340.

The signals from the "and" network 1424 pass through the "or" network 1420 and the "and" network 1418 and trigger the flip-flop 1414 to its true state. The resultant signal of high amplitude produced on the left output terminal of the flip-flop 1414 causes an indication of "1" to be recorded by the coil 1416 in the channel 156. The flip-flop 1414 receives the signals passing through the stages 1430, 1426, 1424, 1420 and 1418 in accordance with the logical equation:

$$ {}_0u=\alpha\overline{US}_2G_1P_1T \qquad (224)$$

where all of the terms have previously been defined.

When an indication of "0" has been recorded in the channel 156 at position 1 of a previous cycle of computation, a signal passes through the "and" network 1436. This results from the introduction to the "and" network 1436 of the signals from the "and" network 222 and the left output terminal of the flip-flop 688. The signals are able to pass through the "and" network 1436 only for a "zero rate" operation as represented by a relatively high voltage on the right output terminal of the flip-flop 736 at position 1 for a block.

The "and" network 1444 receives the signals passing through the "and" network 1436 and the "or" network 1442 and in turn passes the signals only during periods of actual computation. The signals from the "and" network 1444 pass through the "or" network 1446 and the "and" network 1448 to the right input terminal of the flip-flop 1414 to trigger the flip-flop into a false state of operation. This causes an indication of "0" to be recorded by the coil 1416 in the channel 156. An indication of "0" is recorded in the channel 156 by the passage of signals through the stages 1436, 1442, 1444, 1446 and 1448 in accordance with the logical equation:

$$ {}_0u=\alpha U\overline{S}_2P_1T \qquad (225)$$

where all of the terms have previously been defined.

In FIGURE 43, the operation of the flip-flops 860, 862 and 864 is shown for various values representing $\Sigma dU$. The pattern of operation of the flip-flops 860, 862 and 864 for odd values of $\Sigma du$ is listed again in FIGURE 48. Only the odd values are listed again since a servo is used as a "0" rate type only when an odd number of inputs are being introduced to the servo.

As has been described previously and expressed logically in Equations 171 to 176, inclusive, the pattern of operation of the flip-flops 860, 862 and 864 is transferred to the flip-flops 910, 924 and 974 at position 18 for a block. The information in the flip-flops 924 and 974 is then stepped into the flip-flop 910 in the first positions of the next block and the indications in the flip-flop 974 are inverted during the stepping operation. This has been described in detail previously and has been expressed logically in Equations 177 to 180, inclusive. Because of this stepping operation, the information originally in the flip-flop 924 is stepped out of the flip-flop 910 at position 2, and the information in the flip-flop 974 is stepped out of the flip-flop 910 at position 3.

It will be seen that the flip-flop 860 has an indication of "1" for all odd values of $\Sigma dU$. When an indication of "1" is added to the least significant digit as represented by the operation of the flip-flop 860, the resultant addition would cause a binary value of "2" to be produced at this position. This is equivalent to an indication of "0" at the least significant position and a carry of "1" to the next position, as indicated in the middle columns of the table shown in FIGURE 48. For this reason, the flip-flop 860 would be in effect providing an indication of "0" at position 1. Since the flip-flop 860 is providing an indication of "0" at position 1, no errors are produced in the addition of U and $\Sigma dU$ in "zero-rate servos." No error is produced even though the start flip-flop 736 is triggered to its true state of operation at the end of position 1 such that an addition of U and $\Sigma dU$ cannot actually be made at this position.

The carry flip-flop 938 is triggered to its true state when an indication of "+1" is added in a "zero-rate servo" since this causes a carry to be obtained from position 1 to position 2 as described in the previous paragraph. The carry flip-flop 938 is triggered to its true state in accordance with the operation of certain stages including the "and" network 942 in FIGURE 17. The "and" network 942 becomes prepared for activation at position 1 of a servo block because of its connections to the "and" network 222 and the left output terminal of the flip-flop 606. The "and" network 942 passes a signal only when an odd number of inputs are introduced to the servo block as represented by a relatively high voltage on the left output terminal of the flip-flop 910. The "and" network 942 passes the signals only when an indication of +1 is being added on a "zero-rate" basis. This is represented by a signal of high amplitude on the left output terminal of the flip-flop 688. The production of this signal of high amplitude has been described in detail previously and expressed logically in Equation 224.

The signals of high amplitude from the "and" network 942 pass through the "or" network 946 to the "and" network 948 for synchronization at optimum times in the clock cycles. The signals are then introduced to the left input terminal of the flip-flop 938 to trigger the flip-flop into its true state in representation of a carry. The flip-flop 938 is triggered to its true state by the passage of signals through the stages 942, 946 and 948 in accordance with the logical equation:

$$c_3=C_2UG_1P_1T \qquad (226)$$

where all of the terms have previously been defined.

In alternate cycles of computation for a "zero-rate servo" an indication of "1" is subtracted from the indications introduced on the other input lines. When an indication of "1" is subtracted, this causes the indication of "1" in the flip-flop 860 to become an indication of "0," as indicated in the right columns of the table shown in FIGURE 48. As indicated in FIGURE 48, the flip-flop 860 changes to its false state without any carry being obtained from position 1 to position 2 of the servo block. Since the flip-flop 938 was triggered to its false state at position 18 of the previous block in accordance with the logic expressed in Equation 170*a*, no additional logic is necessary to maintain the flip-flop in its false state for the subtraction of an increment in a "zero-rate servo."

*Short-Length Servos*

Sometimes information relating to U occurs in only a few of the available positions for a servo block. Only a few of the available positions are used since the accuracy of the quantity represented by the indications in these positions can be sufficiently obtained from the limited number of positions. Such servos are designated as "short-length servos." These servos are represented by an indication of "1" in the channel 154 at position 1 for a block. When this occurs, signals of high amplitude are simultaneously obtained from the "and" network 222 and the left output terminal of the flip-flop 684. These signals cause the "and" network 1276 in FIGURE 24 to become prepared for activation. The signals can pass through the "and" network 1276 only in two out of every four blocks because of the introduction to the "and" network of the voltage on the left output terminal of the flip-flop 244.

The signals from the "and" network 1276 pass through the "or" network 1280 to the "and" network 1278 for synchronization at optimum times in the clock cycles. The signals then pass to the left input terminal of the flip-flop 976. These signals trigger the flip-flop 976 so as to produce a relatively high voltage on the left output terminal of the flip-flop. Triggering signals are introduced to the flip-flop 976 through the stages 1276, 1280 and 1278 in accordance with the logical equation:

$$e_4 = U_pK_2P_1T \tag{227}$$

where all of the terms have previously been defined.

Since an indication of "1" in the channel 154 at position 1 of a servo block represents a short-length servo, an indication of "0" in the channel at this position indicates that a short-length servo is not being presented. This indication of "0" in the channel 154 causes a relatively high voltage to be produced on the right output terminal of the flip-flop 684. This high voltage is introduced to the "and" network 1286. Because of its connection to the left output terminal of the flip-flop 244, the "and" network passes such signals only in two out of every four blocks.

The signals from the "and" network 1286 are introduced through the "or" network 1290 and the "and" network 1288 to the right input terminal of the flip-flop 976. These signals trigger the flip-flop 976 to its false state as represented by a relatively high voltage on the right output terminal of the flip-flop. The flip-flop 976 becomes triggered to its false state by the passage of signals through the stages 1286, 1290 and 1288 in accordance with the logical equation:

$$\bar{e}_4 = \bar{U}_pK_2P_1T \tag{228}$$

where all of the terms have previously been defined.

It has been previously described and expressed logically in Equations 197 and 198 that the error signals represented by $\epsilon = U_N \pm M$ are introduced to the flip-flop 976 in positions 2 to 17, inclusive, for a block. For this reason, the operation of the flip-flop 976 at position 1 to represent the occurrence or lack of occurrence of a short length servo must be transferred to a different flip-flop at position 2. The information in the flip-flop 976 is transferred to the flip-flop 924 by the operation of certain stages, including the "and" network 972 shown in FIGURE 18. The "and" network 972 becomes prepared for operation in position 2 of a servo block because of its connections to the "and" network 225 and the left output terminal of the flip-flop 606. Upon becoming prepared for activation, the "and" network 972 passes the signals of high amplitude on the left output terminal of the flip-flop 976. In this way, the "and" network 972 passes signals which indicate in coded form the occurrence of a short-length servo.

The signals from the "and" network 972 are introduced through the "or" network 978 to the "and" network 980 and are synchronized by the "and" network 980 at optimum times in the clock cycles. The signals are then applied to the left input terminal of the flip-flop 924. The signals trigger the flip-flop 924 so as to produce a relatively high voltage on the left output terminal of the flip-flop. This high voltage continues for the remainder of the servo block to indicate that a short-length servo operation is being performed. A relatively high voltage is produced on the left output terminal of the flip-flop 924 by the passage of signals through stages 972, 978 and 980 in accordance with the logical equation:

$$c_2' = E_4G_1P_2T \tag{229}$$

where all of the terms have previously been defined. The flip-flop 924 is able to receive the information from the flip-flop 976 at position 2 for a block because the information in the flip-flop 924 was previously stepped into the flip-flop 910 at position 1 for a servo operation and because the information from the flip-flop 974 is stepped into the flip-flop 910 from the flip-flop 924 at position 2 for the block.

The "and" network 990 becomes prepared for activation at the same time as the "and" network 972 but passes the signals of high amplitude on the right output terminal of the flip-flop 976. These signals pass through the "or" network 992 and the "and" network 994 and trigger the flip-flop 924 into its false state of operation, as represented by a relatively high voltage on the right output terminal of the flip-flop. The high voltage on the right output terminal of the flip-flop 924 continues during the remainder of the servo block to indicate that a short-length servo operation is not being performed. The flip-flop 924 has triggering signals applied to it through the stages 990, 992 and 994 in accordance with the logical equation:

$$\bar{c}_2' = \bar{E}_4G_1P_2T \tag{230}$$

where all of the terms have previously been defined.

In a short-length servo, the start flip-flop 736 becomes triggered to its true state at the beginning of the servo operation just as in other types of servos. However, the start flip-flop 736 becomes triggered to its false state at a position before position 17, which is the position that the start flip-flop is generally triggered to its false state for a servo operation. The start flip-flop 736 becomes triggered to its false state by the occurrence of an indication of "1" in the channel 154 in one of the positions between positions 8 and 16, inclusive for a short-length servo operation. Such an occurrence causes a signal to pass to the flip-flop 736 through the "and" network 856 in FIGURE 15 from the left output terminal of the flip-flop 684.

The signals of high amplitude on the left output terminal of the flip-flop 682 passes through the "and" network 856 in positions 8 to 16, inclusive, because of the connection of the "and" network 856 to the left output terminal of the flip-flop 200. The "and" network 856 is able to pass an indication of "1" in the channel 154 only for a short-length servo. This results from the fact that the "and" network 856 is connected to the left output terminals of the flip-flops 606 and 924. The "and" network 856 is further able to pass a signal only in one block out of every four. This block is the second one of the two blocks in which the flip-flop 244 is operating in its true state. Only the second of the two blocks is chosen because of the connection of the "and" network 856 to the left output terminal of the flip-flop 234.

The signals from the "and" network 856 pass through the "or" network 848 to the "and" network 846 for synchronization at optimum times in the clock cycles. The signals then pass to the right input terminal of the flip-flop 736 and trigger the flip-flop to its false state of operation. The flip-flop 736 receives the signals passing through the stages 856, 848 and 846 in accordance with the logical equation:

$$\bar{s}_2 = U_pS_2G_1C_2'K_2K_1J_4T \tag{231}$$

where all of the terms have previously been defined.

Since the start flip-flop 736 is being triggered to its false state before position 17, a carry indication cannot be obtained at position 17. As previously described, the carry indication at position 17 for a servo generally indicates the polarity of any error resulting from the combination of $U_N$ and M in the servo operation. For this reason, certain stages are included in FIGURE 23 to have the carry flip-flop 604 indicate at position 17 the polarity of the error signal in a short-length servo operation. These stages include the "and" network 1182 in FIGURE 23.

The "and" network 1182 becomes prepared for activation only at position 17 of a short-length servo operation since it is connected to the "and" network 208, the left output terminal of the flip-flop 606 and the right output terminal of the flip-flop 736. When the "and" network 1182 becomes prepared for activation, it passes the signals of high amplitude on the right output terminal of the flip-flop 976. As may be seen from the table shown in FIGURE 44, a relatively high voltage on the right output terminal of the flip-flop 976 indicates a positive error.

The signals from the "and" network 1182 in FIGURE 23 are introduced through the "or" network 1172 to the "and" network 1174 for synchronization at optimum times in the clock cycles. The signals then pass to the left input terminal of the flip-flop 604 and trigger the flip-flop to its true state to represent a positive error. Signals pass to the flip-flop 604 through the stages 1182, 1172 and 1174 in accordance with the logical equation:

$$d=\bar{E}_4\bar{S}_2G_1P_{17}T \qquad (232)$$

where all of the terms have previously been defined.

Like the "and" network 1182, the "and" network 1192 in FIGURE 23 becomes prepared for activation only at position 17 of a short length servo. When the "and" network 1192 becomes prepared for activation, it passes the signals of high amplitude on the left output terminal of the flip-flop 976. As may be seen from the table shown in FIGURE 44 and as described fully above, a relatively high voltage on the left output terminal of the flip-flop 976 indicates a negative error.

The signals from the "and" network 1192 are introduced through the "or" network 1194 and the "and" network 1196 to the right input terminal of the flip-flop 604. These signals trigger the flip-flop 604 so as to produce a relatively high voltage on the right output terminal of the flip-flop. Such a high voltage represents a negative error in a manner similar to that described above. The flip-flop 604 becomes triggered to its false state by the passage of signals through the stages 1192, 1194 and 1196 in accordance with the logical equation:

$$\bar{d}=E_4\bar{S}_2G_1P_{17}T \qquad (233)$$

where all of the terms have previously been defined.

*Sub-Filling*

In order to produce a proper operation of the digital differential analyzer described above for an accurate resolution of a problem, certain information must be recorded in the various channels at the beginning of a computation. For example, information relating to the dependent quantity Y must be recorded in the channel 150 before computation is actually commenced. This information would relate to the initial values of Y at the beginning of the actual computation.

The information relating to various initial conditions is recorded permanently in certain channels such as the channels 148 and 154. These channels hold permanent coding information as well as information representing the initial conditions of Y and U for the various blocks. The information is inserted into the channels 148 and 154 by apparatus not constituting a part of this invention.

Before any computation is actually commenced, the indications in the channels 148 and 154 representing the initial conditions of Y and U are respectively transferred to the channels 150 and 156. The information in the channel 148 relating to the initial conditions of Y is transferred to the channel 150 by the operation of certain stages including the "and" network 1352 in FIGURE 26. The information is transferred before the commencement of computation because of the connection to the "and" network 1352 from the cathode follower 1312. The information is transferred for each block only in the positions after the start pulse. This results from the fact that the "and" network 1352 can open for the passage of signals only upon the introduction of a relatively high voltage from the left output terminal of the flip-flop 446. As previously described, the dependent quantity Y for each block is indicated in the position after the start pulse.

When the "and" network 1352 becomes prepared for activation, it passes the signals of high amplitude on the left output terminal of the flip-flop 542. These signals represent indications of "1" in the channel 148. The signals passing through the "and" network 1352 are introduced through the "or" network 1346 to the "and" network 1348 for synchronization at optimum times in the clock cycles. The signals then pass to the left input terminal of the flip-flop 1332 and trigger the flip-flop such that a relatively high voltage is produced on the left output terminal of the flip-flop. This causes indications of "1" to be recorded by the coil 1333 in the channel 150. The flip-flop 1332 receives the signals passing through the stages 1352, 1346 and 1348 in accordance with the logical equation:

$${}_0y=\bar{\alpha}Y_pS_1T \qquad (234)$$

where all of the terms have previously been defined.

Just as the "and" network 1352 passes the indications of "1" in the channel 148, the "and" network 1370 passes the indications of "0" in the channel. These indications pass through the "and" network 1370 only in the position after the start pulse for each block and only during periods when actual computation is not occurring, because of the connections to the "and" network from the left output terminal of the flip-flop 446 and the cathode follower 1312.

The signals from the "and" network 1370 are introduced through the "or" network 1366 to the "and" network 1368 and are synchronized by the "and" network 1368 at optimum times in the clock cycles. The signals then pass to the right input terminal of the flip-flop 1332 and trigger the flip-flop for the production of a relatively high voltage on the right output terminal of the flip-flop. Since a low voltage is produced at the same time on the left output terminal of the flip-flop, an indication of "0" is recorded by the coil 1333 in the channel 150. Triggering signals are introduced to the flip-flop 1332 through the stages 1370, 1366 and 1368 in accordance with the logical equation:

$${}_0\bar{y}=\bar{\alpha}\bar{Y}_pS_1T \qquad (235)$$

where all of the terms have previously been defined.

As previously described, a coding pulse is provided in the channel 150 at position 18 in the second block of a double-block operation. This is in accordance with the logic expressed in Equation 139. As will be described in detail subsequently, certain information relating to the dependent quantity Y for particular blocks is represented during periods of non-computation by a relatively high voltage on the left output terminal of the flip-flop 1358. At such times, a signal of high amplitude is introduced from the left output terminal of the flip-flop 1358 to the "and" network 1354 to prepare the "and" network for activation. The "and" network 1354 is further prepared for activation by the introduction of a signal from the cathode follower 1312 to indicate that computation is not actually proceeding.

Upon becoming prepared for activation, the "and" network 1354 passes the signals of high amplitude on the right output terminal of the flip-flop 446. Because of the particular times at which the "and" network 1354 becomes prepared for activation, the signals of high amplitude on the right output terminal of the flip-flop 446 can pass through the "and" network only at position 18 in the second half of a double-block operation. These signals pass through the "and" network 1354, the "or" network 1346 and the "and" network 1348 to the left input terminal of the flip-flop 1332. The resultant signal of high amplitude produced on the left output terminal of the flip-flop 1332 causes an indication of "1" to be recorded by the coil 1333 in the channel 150. The flip-flop 1332 has signals applied to it through the stages 1354, 1346 and 1348 in accordance with the logical equation:

$$_0y=\bar{\alpha}V_uS_1T \qquad (236)$$

Where:

$V_u$=a relatively high voltage on the left output terminal of the flip-flop 1358; and the other terms have previously been defined.

The "and" network 1374 becomes prepared at the same time as the "and" network 1354. At such times the "and" network passes the signals of high amplitude on the right output terminal of the flip-flop 1538. These signals pass through the stages 1366 and 1376 and trigger the flip-flop 1332 to the false state such that an indication of "0" becomes recorded in the channel 150. An indication of "0" becomes recorded in the channel 150 by the passage of signals through the stages 1374, 1366 and 1368 in accordance with the logical equation:

$$_0y=\bar{\alpha}\bar{V}_u\bar{S}_1T \qquad (237)$$

Where:

$\bar{V}_u$=a relatively high voltage on the right output terminal of the flip-flop 1358; and the other terms have previously been defined.

As described in connection with Equations 236 and 237, the indications in the $Y_p$ channel 148 are recorded in the Y channel 150 only at position 18 in the second half of a double-block operation and not at position 18 in the first half of a double-block operation. This results from the fact that an indication of "1" at position 18 in the second half of a double-block operation is the code for indicating a double-length product, as set forth in Equations 129 and 130. A signal is not transferred to the Y channel 150 from the $Y_p$ channel 148 at position 18 in the first half of a double-block operation since this position is an information position and not a position for controlling operations.

The operation of the $V_u$ flip-flop 1358 is controlled by the operation of certain stages shown in FIGURE 66. These stages include an "and" network 1980 in FIGURE 66. The "and" network 1980 is able to pass a signal only at position 1 in the second half of a double-block operation since it receives signals from the "and" network 222 and the left output terminals of the $G_5$ flip-flop 390 and the $S_1$ flip-flop 446. The "and" network 1980 is able to pass signals only when computation is not proceeding, as represented by a signal from the cathode follower 1312. The signals from the "and" network 1980 pass through an "or" network 1982 and trigger the flip-flop 1358 to the true state. These signals trigger the flip-flop in accordance with the logical equation:

$$v_u=\bar{\alpha}G_5S_1P_1T \qquad (237a)$$

Where:

$v_u$=the introduction of a triggering signal to the left input terminal of the flip-flop 1358; and the other terms have previously been defined.

The flip-flop 1358 remains in the true state of operation until after position 18 in the second half of a double-block operation. At that time, a signal passes through an "and" network 1984 because of the simultaneous introduction of high voltages from the "and" network 216, the cathode follower 1312 and the right output terminal of the flip-flop 390. This signal triggers the flip-flop 1358 to the false state of operation in accordance with the logical equation:

$$\bar{v}_u=\bar{\alpha}\bar{G}_5P_{18}T \qquad (237b)$$

Where:

$\bar{v}_u$=the introduction of a triggering signal to the left input terminal of the flip-flop 1358; and the other terms have previously been defined.

It will be seen from Equations 237*a* and 237*b* that the flip-flop 1358 is true at position 18 in the second half of a double-block operation but not at position 18 in the first half of a double-block operation. In this way, the indication can be transferred from the $Y_p$ channel 148 to the Y channel 150 only at position 18 in the second half of a double-block operation in accordance with Equations 236 and 237.

A relatively high voltage is produced on the right output terminal of the flip-flop 1358 during periods of non-computation at position 18 in all blocks other than the second block of a double-length operation. This will be described in detail subsequently.

Information relating to the initial conditions as to the value of U for the different blocks are initially recorded in the channel 154 before computation is begun. These indications are transferred from the channel 154 to the channel 156 in accordance with the operation of certain stages including the "and" network 1422 in FIGURE 28. The "and" network 1422 becomes prepared for activation only when signals of high amplitude are introduced to it from the cathode follower 1312 to represent periods of non-computation. At such times, the "and" network 1422 passes the signals of high amplitude on the left output terminal of the flip-flop 684. These signals are produced upon the occurrence of indications of "1" in the channel 154.

The signals from the "and" network 1422 in FIGURE 28 pass through the "or" network 1420 to the "and" network 1418. The signals are synchronized by the "and" network 1418 at optimum times in the clock cycles and are introduced to the left input terminal of the flip-flop 1414. This causes the flip-flop 1414 to be triggered to its true state so that an indication of "1" is recorded by the coil 1416 in the channel 156. The flip-flop 1414 becomes triggered to its true state by the passage of signals through the stages 1422, 1420 and 1418 in accordance with the logical equation:

$$_0u=\bar{\alpha}U_pT \qquad (238)$$

where all of the terms have previously been defined.

The "and" network 1450 in FIGURE 28 becomes prepared for activation at the same time as the "and" network 1422 because of its connection to the cathode follower 1312. When the "and" network 1450 becomes prepared for activation, it passes the signals of high amplitude on the right output terminal of the flip-flop 684. These signals represent indications of "0" in the channel 154. The signals of high amplitude on the right output terminal of the flip-flop 684 pass through the "and" network 1450, the "or" network 1446 and the "and" network 1448 to the right input terminal of the flip-flop 1414. The signals trigger the flip-flop 1414 so as to produce a relatively high voltage on the right output terminal of the flip-flop and a relatively low voltage on the left output terminal of the flip-flop. This causes an indication of "0" to be recorded by the coil 1416 in the channel 156. Such indications of "0" are recorded in the channel 156 by the passage of signals through the stages 1450, 1446 and 1448 in accordance with the logical equation:

$$_0\bar{u}=\bar{\alpha}\bar{U}_pT \qquad (239)$$

where all of the terms have previously been defined.

It has been described above that the R channel 152 and the Z channel 138 operate in conjunction to provide values representing the cumulative Y$\Delta$X increments for each block. The R channel 152 has a limited capacity so that overflows occasionally occur from it to the Z channel 138. These overflows are accumulated generally in other blocks to represent $\Delta Y$ increments or increments for the other blocks. The overflows are also made available to other blocks to represent $\Delta X$ increments for the blocks.

At the end of a computation, a value is still indicated in the R channel for each block. Since the value remaining in the R channel for each block does not produce an overflow, it represents a potential error in the computation. This error is relatively small, especially when a relatively large number of overflows occur from the R channel 152 to the Z channel 138. However, in order to minimize any error which may occur, a value is initially set into the R channel for each block before the beginning of a computation. For blocks performing a single-length product operation, this value is represented by an indication of "1" at position 18 and the indications of "0" in the previous positions for each block. Such a value is equal to one half of the capacity of the R channel for each block.

The recordation of an indication of "1" in the channel 152 at position 18 for each block performing a single-length product operation is obtained by the operation of certain circuits including the "and" network 1390 in FIGURE 27. This network becomes prepared for activation only during periods of non-computation, since it receives the signals from the cathode follower 1312. At such times, the "and" network 1390 passes signals only at position 18 for blocks performing product operations. This results from the connections to the "and" network 1390 from the "and" network 216 and the right output terminal of the flip-flop 606.

The signals from the "and" network 1390 pass through the "or" network 1384 to the "and" network 1386 for synchronization at optimum times in the clock cycles. The signals then pass to the left input terminal of the flip-flop 1388 to trigger the flip-flop to its true state. This causes an indication of "1" to be recorded by the coil 1410 in the channel 152. Triggering signals are introduced to the left input terminal of the flip-flop 1388 through the stages 1390, 1384 and 1386 in accordance with the logical equation:

$$ {}_0r=\overline{\alpha G_1}P_{18}T \qquad (240) $$

where all of the terms have previously been defined.

Just as it is desirable to initially fill the R channel to half its capacity for blocks undergoing a single-length product operation, it is also desirable to fill to half of their capacity the blocks performing normal integration or a servo operation. This is accomplished in part by the operation of the "and" network 1380 in FIGURE 27. The "and" network 1380 becomes prepared for activation only during periods of non-computation because of its connection to the cathode follower 1312. At such times, the "and" network 1380 passes signals at position 17 for blocks performing normal integrations or servo operations. This is represented by the simultaneous introduction of signals to the "and" network 1380 from the "and" network 208 and the left output terminal of the flip-flop 606.

The signals from the "and" network 1380 pass through the "or" network 1384 and the "and" network 1386 and trigger the flip-flop 1388 to its true state. This causes an indication of "1" to be recorded by the coil 1410 in the channel 152. Signals pass to the flip-flop 1388 through the stages 1380, 1384 and 1386 in accordance with the logical equation:

$$ {}_0r=\bar{\alpha}G_1P_{17}T \qquad (241) $$

where all of the terms have previously been defined. As will be seen subsequently from the logic in Equation 243, an indication of "1" is recorded at position 18 as well as position 17 for blocks performing servo operations. Recording an indication of "1" at position 18 has no desirable effect but it also has no harmful effect in the subsequent computations.

In double-length operations, an indication representing a value of "−1" is recorded in the channel 152. The reason for this is that in the first cycle of computation the flip-flop 456 receives a value of "+1" in accordance with the logic expressed in Equation 132. This value of "+1" is transferred by the flip-flop 456 to the channel 152 at position 17 in the first half of the double-block operation during the first cycle of actual computation so as to neutralize the value of "−1" initially recorded in the blocks performing double-length product operations.

The "and" network 1382 in FIGURE 27 operates in conjunction with other stages to record an initial value representing "−1" for a double-block operation. This is represented by indications of "1" at positions 17 and 18 for the first block and all of the positions for the second block. The "and" network 1382 becomes prepared for opening only during positions of non-computation, as represented by signals of high amplitude from the cathode follower 1312. The "and" network 1382 then passes a signal at position 17 in the first half of a double-block operation. This is represented by the simultaneous occurrence of signals of high amplitude from the "and" network 208 and the left output terminal of the flip-flop 390.

The signals from the "and" network 1382 are introduced through the "or" network 1384 and the "and" network 1386 to the left input terminal of the flip-flop 1388. These signals trigger the flip-flop 1388 to produce a relatively high voltage on the left output terminal of the flip-flop so that an indication of "1" is recorded by the coil 1410 in the channel 152. When the flip-flop 1388 becomes triggered to its true state at position 17 in the first half of a double-block operation, it remains in this state for the remaining positions of the double-block operation. This will be seen from the subsequent discussion and from the logic expressed in Equation 243. The triggering of the flip-flop 1388 to its true state by the passage of signals through the stages 1382, 1384 and 1386 is produced in accordance with the logical equation:

$$ {}_0r=\bar{\alpha}G_5P_{17}T \qquad (242) $$

where all of the terms have previously been defined.

It will be seen from the above discussion that the flip-flop 1388 should be triggered to its false state at position 1 for any block except the second half of a double-block operation. Position 1 for the second half of a double-block operation is represented by $G_5S_1$. The $G_5$ flip-flop 390 is in its true state at position 1 in the second half of a double-block operation since it becomes triggered to its false state only at the end of position 1. The $S_1$ flip-flop is in its true state at position 1 in the second half of a double-block operation since information relating to the dependent quantity Y is being presented for computation at this time. At position 1 for blocks other than the second half of a double-block operation, $G_5S_1$ is false. This may be represented by $(\overline{G_5S_1})=\overline{G}_5+\overline{S}_1$.

The "and" network 1398 in FIGURE 27 passes signals during periods of non-computation at position 1 for blocks having a relatively high voltage on the right output terminal of the flip-flop 390. Similarly, the "and" network 1400 passes signals during periods of non-computation at position 1 for blocks having a relatively high voltage on the right output terminal of the flip-flop 446. The signals from the "and" networks 1398 and 1400 pass through the "or" network 1406 to the "and" network 1408, which synchronizes the signals at optimum times in the clock cycles.

The signals from the "and" network 1408 in turn pass to the right input terminal of the flip-flop 1388 and trigger the flip-flop to produce a relatively high voltage on the right output terminal of the flip-flop. The resultant low voltage on the left output terminal of the flip-flop causes indications of "0" to be recorded in the channel 152. The flip-flop 1388 receives the signals passing through the stages 1398, 1400, 1406 and 1408 in accordance with the logical equation:

$$\overline{{}_0r}=(\overline{\alpha G}_5P_1+\overline{\alpha S}_1P_1)T \qquad (243)$$

where all of the terms have previously been defined.

As previously defined, the indications in the channel 138 represent overflows from the various blocks in the digital differential analyzer. Positive overflows are represented by indications of "1" and negative overflows by indications of "0." As will be seen, it would be at least as much of an error to initially set the channel 138 to positive overflows as to negative overflows. For this reason, the channel 138 is kept in its original condition before the commencement of computation, such that indications of "0" are retained in all of the positions in the channel.

*Intergrating a Constant*

In the process of integrating a constant, a special technique must be adopted. The chief reason for this arises from the fact that in the case of normal integration, the $dY$ input must be either $\pm 1$. However, when a constant is to be integrated to obtain $\int K dx$, the $dY$ input must be zero at all times during the operation since the value of K must not change.

By inhibiting the function of the "$Y+dY$ adder" described above and expressed logically in equations, $Y_n$ is made to equal Y throughout the operation. As in normal integration, the "$R+Y$ adder" obtains the value of $R+Y$ if $dX$ is $+1$ and $R-Y$ if $dX$ is $-1$.

Subtraction is performed by complementing Y and then adding this complement with R. ($R+\text{comp }_2Y$) As discussed, the complement of a binary number is obtained by reversing the digits of the number and adding one to the least significant digit.

EXAMPLE $R=1.0110101$ $Y=0.1110111$

Subtracting $R-Y$, we have

| | |
|---|---|
| R | 1.0110101 |
| Y | 0.1110111 |
| | 0.0111110 (Answer) |

By complementing, we must take $R+(\overline{Y}+1)$ (least significant digit)

| | |
|---|---|
| R | 1.0110101 |
| $\overline{Y}$ | 1.0001000 |
| | (1) 0.0111110 (Answer) |

As stated, the "$Y+dY$ adder" must be controlled such that during the constant integration operation $y_n$ is made to equal Y. This control is provided by the operation of the flip-flop 446 in FIGURE 15. The "and" network 826 in FIGURE 15 is activated by the simultaneous occurrence of signals from the left output terminals of the flip-flops 306 and 310 and the signal passing through the "and" network 216. The activation of the "and" network 826 in turn causes the "or" network 828 to become energized. Upon a simultaneous occurrence of a signal from the left output terminal of flip-flop 164, the signal from the "or" network 828 activates the "and" network 830. When activated, the "and" network 830 passes a signal to the left input terminal of the flip-flop 446 to produce a relatively high voltage on the left output terminal of the flip-flop 446. This high voltage is produced by the passage of signals through the stages 826, 828 and 830 in accordance with the logical equation:

$$s_1=L_1L_2P_{18}T \qquad (244)$$

where all of the terms have previously been defined.

This logic has been previously set forth. The "and" network 832 is activated by the simultaneous occurrence of signals from the right output terminal of the flip-flop 390, the left output terminal of the flip-flop 164 and the signal passing through the "and" network 208. When activated, the "and" network 832 passes a signal to the right input terminal of the flip-flop 446 so as to produce a relatively high voltage on the right output terminal of flip-flop 446. This high voltage is produced by the passage of signals through the stage 832 in accordance with the logical equation:

$$\overline{s}_1=\overline{G}_5P_{17}T \qquad (245)$$

where all of the terms have previously been defined.

As explained previously and expressed logically supra, the flip-flop 538 ($B_3$) receives a signal at its right input terminal at position 17 of each computing block to produce a relatively high voltage on the right output terminal of the flip-flop 538. This signal is produced by the activation of the "and" network 560 in FIGURE 10.

The simultaneous occurrence of signals from the right output terminal of flip-flop 390 and from the "and" network 208 activates the "and" network 552 which in turn activates the "or" network 558. The simultaneous occurrence of the signal produced by the activation of the "or" network 558, a signal from the left output terminal of the flip-flop 446, and a signal from the left output terminal of the flip-flop 164 in turn causes the "and" network 560 to become activated. Thus, the relatively high voltage on the right output terminal of the flip-flop 538 is produced by the passage of signals in accordance with the logical equation:

$$\overline{b}_3=P_{17}\overline{G}_5S_1T \qquad (246)$$

where all of the terms have previously been defined.

This logic has been expressed previously.

At $P_{18}$, if the next operation is to be a constant integrator, the memory program will be recorded such that flip-flops 306 and 310 ($L_1$ and $L_2$) will be high. Then by Equation 244, $S_1$ will be set high and will remain high until $P_{17}$ of the constant integrator block. By Equation 246, $B_3$ will be set false at $P_{17}$ of each computing block and cannot be set true while $S_1$ is true since the simultaneous occurrence of signals required to set $B_3$ high includes a high signal from the right output terminal of the flip-flop 466 ($S_1$). These simultaneous signals are required to activate the "and" gate 540 in FIGURE 10 and include a signal from the right output terminal of the flip-flop 446, a signal from the left output terminal of the flip-flop 542, a signal from the left output terminal of the flip-flop 164, and a signal from the inverter 541. The activation of the "and" gate 540 will pass a signal to the left input terminal of the flip-flop 538 so as to produce a relatively high voltage on the left output terminal of the flip-flop 538. Thus the passage of signals necessary to produce a relatively high voltage on the left output terminal of flip-flop 538 is in accordance with the logical equation:

$$b_3=Y_p\overline{S}_1P_{2/17}T \qquad (247)$$

where all of the terms have previously been defined.

As has been stated above, $B_3$ will remain low during positions 1 to 17, inclusive, of the constant integrator operation. 1 to 17, inclusive, of the constant integrator operation.

$$y_n=Y\overline{B}_3+\overline{Y}B_3$$

$$\overline{y}_n=\overline{Y}\,\overline{B}_3+YB_3$$

The equations which have been set forth before, show that during positions 1 to 17, inclusive, of the constant integrator operation $y_n$ equals Y since $B_3$ is false. That is, $$y_n=Y$$

$$\overline{y}_n=\overline{Y}$$

We have the equations:

$$y=(A_2B_2Y+A_2\overline{B}_2y_n+\overline{A}_2B_2\overline{Y}+\overline{A}_2\overline{B}_2\overline{y}_n)S_1$$

Since $y_n=Y$, $$\begin{aligned}y&=(A_2B_2Y+A_2\overline{B}_2Y+\overline{A}_2B_2\overline{Y}+\overline{A}_2\overline{B}_2\overline{Y})S_1\\&=(A_2[B_2+\overline{B}_2]Y+\overline{A}_2[B_2+\overline{B}_2]\overline{Y})S_1\\&=(A_2Y+\overline{A}_2\overline{Y})S_1\end{aligned} \quad (248)$$

and $$\overline{y}=(A_2B_2\overline{Y}+A_2\overline{B}_2\overline{y}_n+\overline{A}_2B_2Y+\overline{A}_2\overline{B}_2y_n)S_1$$

Since $y_n=Y$, $$\begin{aligned}y&=(A_2B_2\overline{Y}+A_2\overline{B}_2\overline{Y}+\overline{A}_2B_2Y+\overline{A}_2\overline{B}_2Y)S_1\\&=(A_2[B_2+\overline{B}_2]\overline{Y}+A_2[B_2+\overline{B}_2]Y)S\\&=(A_2\overline{Y}+\overline{A}_2Y)S_1\end{aligned} \quad (249)$$

It has been previously described that $A_2$ is high for a $+dx$ increment and low ($\overline{A}_2$) for a $-dx$ increment.

For $+dx$ ($A_2$), Equation 244 becomes $y=Y$ and Equation 245 becomes $y=\overline{Y}$.

For $-dx$ ($\overline{A}_2$), Equations 244 and 245 respectively become $y=\overline{Y}$; $\overline{y}=Y$.

If $dx$ is negative, in addition to reversing digits of Y, (as above) a value of 1 must be added to the sum of $R+\overline{Y}$ in the least significant digit. This is accomplished by setting the carry flip-flop 423 ($A_3$) high initially. During $P_1$ of a constant integrator operation, the carry flip-flop 432 is set high for a negative value of $dx$ ($\overline{A}_2$) and low for a positive value of $dx$ ($A_2$).

Upon the simultaneous occurrence of high signals from the right output terminal of the flip-flop 420, the right output terminal of the flip-flop 390, the left output terminal of flip-flop 446, and the "and" gate 222, the "and" gate 455 becomes activated and in turn activates the "or" gate 440 in FIGURE 8. The simultaneous occurrence of the signal from the "or" gate 440 and the signal from the left output terminal of flip-flop 164 activates the "and" gate 439, which triggers the flip-flop 432 to produce a high voltage on the left input terminal of flip-flop 432. The passage of signals through the stages 455, 440 and 439 is in accordance with the logical equation:

$$a_3=\overline{A}_2S_1\overline{G}_5P_1T \quad (250)$$

where all of the terms have been previously defined.

The simultaneous occurrence of a signal from the left output terminal of the flip-flop 420, the right output terminal of the flip-flop 390, the left output terminal of flip-flop 446, and the signal produced by the "and" gate 222, activate the "and" gate 472 which in turn activates the "or" gate 466. The simultaneous occurrence of the signals produced by the activation of the "or" gate 466 and the signal from the left output terminal of flip-flop 164 activates the "and" gate 467 which produces a signal on the right input terminal of flip-flop 432. The passage of signals is in accordance with the logical equation:

$$\overline{a}_3=A_2S_1\overline{G}_5P_1T \quad (251)$$

where all of the terms have previously been defined.

Thus, the carry flip-flop 432 has been initially set high for $dx-$ and low for $dx+$, and we have added $R+Y+1$ for $dx-$ and $R+Y$ for $dx+$.

*Repeater Logic*

At certain times, information previously received in a block must be presented to another block for computation. Ordinarily, the information in the first block would be transferred to the Z line 138 for recirculation in that line until the second block is presented for computation. Sometimes, however, the particular information transferred to the Z channel 138 from the first block can not be properly presented to the second block as the successive positions of the second block are presented for computation. This results from the fact that each block is only 18 positions long and that there are 125 blocks in the digital differential analyzer. Since there are a considerably greater number of blocks than pulse positions in each block, each block cannot have presented to it the output indications transfererd to the Z line 138 from all of the other blocks.

In order to increase the coupling between the blocks, a plurality of heads are disposed in contiguous relationship to the channel 138 to read the signal indications previously recorded in the channel. These heads are indicated at 272, 274, 276 and 278 in FIGURE 6 and are respectively designated as $Z_1$, $Z_2$, $Z_3$ and $Z_4$ as described previously. Other techniques are also used to further enhance the coupling between the various blocks. For example, signals representing the output indications from particular blocks are not only recorded in the Z channel 138 but are also recorded in the $F_1$ flip-flop 392 (FIGURE 20), as previously described. These signals are subsequently transferred to the $A_1$ flip-flop 396 (FIGURE 7) and the $B_1$ flip-flop 496 (FIGURE 9) upon the presentation of particular blocks which may be designated as "repeater blocks." These blocks are identified by particular codes in the tracks 140, 142, 144 and 146. The operation of the $A_1$ flip-flop 396 and the $B_1$ flip-flop 496 during the repeater blocks has been previously described in detail. Under certain circumstances, the information transferred from the $F_1$ flip-flop 392 to the $A_1$ flip-flop 396 and the $B_1$ flip-flop 496 may be subsequently transferred back to the $F_1$ flip-flop 392 so as to further enhance the flexibility in the operation of the digital differential analyzer. This has also been described in detail previously.

As has been previously described, new information is transferred into the Z channel 138 in the last two positions for each block. The transfer of information for each block actually occurs during position 18 of the block and during position 1 of the next block because the information produced at one position does not become available until the next position The indications transferred to the Z channel 138 at position 18 of the block often represent servo information as has been described in detail previously. For blocks performing other than servo operations, the indications transferred at position 18 may also represent certain specialized information which will be described in detail subsequently. The indications transferred at position 1 of the next block may represent the information performing normal types of integration and other functions than servo operations.

The transfer of information at position 18 for the specialized operations other than servo operations can occur only for blocks having a coding of $L_1G_5\overline{G}_1$. This will be described in detail subsequently. The $L_1$ coding is permanently recorded in the channel 140. The $G_5$ coding represents a single-block operation or the second half of a double-block operation. The $\overline{G}_1$ coding indicates an operation other than a servo operation. When a block does not have a servo operation and further does not have an $L_1G_5$ coding, information from the block cannot be recorded in the Z channel 138. This makes the Z channel 138 available to receive information from one of the repeater blocks. The information is actually recorded in the Z channel 138 from the $A_1$ flip-flop 396 in accordance with the state of operation of the flip-flop.

The indications of "1" transferred to the Z channel 138 from the $A_1$ flip-flop 396 pass through one of the stages 1462 or 1464 in FIGURE 29 and subsequently pass through the stages 1474, 1476, 1478 and 1480 to the left input terminal of the flip-flop 337. These signals trigger the flip-flop 337 to the true state of operation such that indications of "1" are recorded by the coil 270 in the channel 138. Indications of "1" become recorded in the channel 138 by the passage of signals through the stages 1462, 1464, 1474, 1476, 1478 and 1480 in accordance with the logical equation:

$${}_oz=\alpha\overline{G}_1P_{18}T(A_1\overline{L}_1+A_1\overline{G}_5) \quad (252)$$

where all of the terms have previously been defined.

As will be seen $(\bar{L}_1+\bar{G}_5)$ is true when $L_1G_5$ is false. Furthermore, $\bar{G}_1$ represents operations other than servo operations.

Just as the stages 1462, 1464, 1476, 1478 and 1480 in FIGURE 29 operate to pass the signals representing the indications of "1" on the left output terminal of the flip-flop 396, the stages 1510, 1512, 1518, 1520, 1522 and 1524 operate to pass the signals representing the indications of "0" on the right output terminal of the flip-flop. These signals trigger the flip-flop 337 to the false state of operation such that indications of "0" become recorded in the Z track 138. The logic controlling the passage of signals through the stages 1510, 1512, 1518, 1520, 1522 and 1524 may be expressed as:

$$_0\bar{z}=\bar{G}_1P_{18}T(\bar{A}_1\bar{L}_1+\bar{A}_1\bar{G}_5) \qquad (253)$$

where all of the terms have previously been defined.

As will be seen, the "$\alpha$" term representing actual computation is not included in Equation 253 whereas it is included in Equation 252. The reason is that indications of "1" should be recorded in the Z channel 138 only during actual computation whereas indications of "0" may be recorded at all other times.

Information relating to most of the blocks is also recorded in the Z channel 138 in position 1 of the next blocks. Such a transfer occurs for all of the blocks except for the second block in a double-block operation. When such a transfer occurs, the signals of high amplitude on the left output terminal of the flip-flop 432 pass through the stages 1504, 1506, 1502, 1500, 1478 and 1480 in FIGURE 29. Such signals represent the overflow in the carry of Y and R as expressed in Equations 63 and 64. The signals then trigger the flip-flop 337 to the true state of operation to obtain a recording of an indication of "1" in the Z track 138. Signals pass through the stages 1504, 1506, 1502, 1500, 1478 and 1480 in accordance with the logical equation:

$$_0z=\alpha P_1T(A_3\bar{G}_5+A_3\bar{S}_1) \qquad (254)$$

where all of the terms have previously been defined.

As will be seen, $(\bar{G}_5+\bar{S}_1)$ is the inverse of $G_5S_1$. As previously described, $G_5S_1P_1$ indicates position 1 of the second block of a double-block operation.

The signals of high amplitude on the right output terminal of the $A_3$ flip-flop 432 pass through the stages 1546, 1548, 1544, 1542, 1522 and 1524 in FIGURE 30 in a manner similar to the passage of signals through the stages 1504, 1506, 1502, 1500, 1478 and 1480 in FIGURE 29. These signals of high amplitude on the right output terminal of the flip-flop 432 then trigger the flip-flop 337 to the false state of operation for a recording of an indication of "0" in the Z channel 138. The recording of indications of "0" in the channel 138 by the passage of signals through the stages 1546, 1548, 1544, 1542, 1522 and 1524 may be expressed as:

$$_0z=P_1T(\bar{A}_3\bar{G}_5+\bar{A}_3\bar{S}_1) \qquad (255)$$

where all of the terms have previously been defined.

It has been described in the last few paragraphs that the signals in the $A_1$ flip-flop 396 are recorded in the Z channel 138 at position 18 for certain repeater blocks. At position 1 of the block following certain repeater blocks, the information in the $B_1$ flip-flop 496 is transferred to the Z channel 138. This information can only be transferred during position 1 in the second half of a double-block operation. This results from the simultaneous introduction of signals from the "and" network 222 representing $P_1$ and from the left output terminals of the flip-flops 390 and 446. Signals are allowed to pass from the $B_1$ flip-flop 496 to the Z channel 138 only at position 1 in the second half of a double-block operation since no output signals are produced for transfer to the Z channel at the end of the first block in a double-block operation. Signals are not able to pass to the Z channel 138 at the end of the first block in a double-block operation in accordance with the logic expressed in Equations 254 and 255.

At position 1 in the second half of a double-block operation, the signals of high amplitude on the left output terminal of the flip-flop 496 pass through the stages 1508, 1502, 1500, 1478 and 1480 in FIGURE 29 to the left input terminal of the flip-flop 337. The signals trigger the flip-flop 337 to the true state of operation to obtain the recording of an indication of "1" by the coil 270 in the channel 138. Signals pass through the stages 1508, 1502, 1500, 1478 and 1480 to obtain a recording of an indication of "0" in the channel 138 in accordance with the logic expressed in the following equation:

$$_0z=\alpha P_1B_1G_5S_1T \qquad (256)$$

where all of the terms have been previously defined.

Just as the signals of high amplitude on the left output terminal of the flip-flop 496 pass through the stages 1508, 1502, 1500, 1478 and 1480 in FIGURE 29, the signals of high amplitude on the right output terminal of the flip-flop pass through the stages 1550, 1544, 1542, 1522 and 1524 in FIGURE 30. These signals trigger the flip-flop 337 to the false state of operation to obtain a recording of an indication of "0" in the channel 138. Indications of "0" become recorded in the channel 138 by the passage of signals through the stages 1550, 1544, 1542, 1522 and 1524 in accordance with the logical equation:

$$_0\bar{z}=P_1\bar{B}_1G_5S_1T \qquad (257)$$

where all of the terms have previously been defined.

*Control Apparatus Including the Digital Differential Analyzer*

The stages described above are adapted to solve a particular problem of navigation in directing an airborne vehicle such as an airplane to a desired destination. The stages are additionally adapted to solve problems relating to the release of a bomb from the airplane if such should be desired. The stages perform such computation on an incremental basis by producing a particular interrelationship between the different blocks in the digital differential analyzer constituting this invention. This particular interrelationship will be described in detail subsequently.

The operation of the digital differential analyzer in solving the problem may be seen from the following discussion. In FIGURE 67, the position of an airplane 2000 relative to an aim point 2002 in a horizontal plane is shown. The aim point 2002 may be an airport in a problem of civilian navigation. In a military application, the aim point may be a target to be bombed or it may be a position which is near the target to be bombed and which is easily recognized so that it can be used as a guide position. As will be seen, the horizontal range between the airplane 2000 and the aim point 2002 at any instant is indicated at 2004 at that instant and is designated as "R." The angle between the line 2004 and a line of true north at the same instant may be designated as "$\mu$" in FIGURE 67 and is indicated at 2006.

The instantaneous velocities of the airplane 2000 are shown in FIGURE 68. In that figure, the air velocity of the airplane 2000 is indicated at 2008 and is designated as "$V_A$." The angle between the line 2008 and true north is indicated at 2010 and is designated at "$\theta$". Similarly, the wind velocity may be measured and may be indicated at 2012 in FIGURE 73 and may be designated as "$V_W$". The angle formed between the velocity vector $V_W$ and true north may be indicated at 2014 and may be designated as "$\omega$."

The ground speed of the airplane 2000 may be obtained by vectorially combining the air velocity "$V_a$" of the airplane and the wind velocity "$V_W$". The north component of air speed may be designated as $V_A \cos\theta$ and the north component of the wind velocity may be designated as $V_W \cos \omega$. In this way, $$V_{gN}=V_A \cos \theta+V_W \cos \omega \quad (258)$$

Where:

$V_{gN}$=the north component of the ground speed of the airplane 2000.

Similarly, $$V_{gE}=V_A \sin \theta+V_W \sin \omega \quad (259)$$

Where:

$V_{gE}$=the east component of the ground speed of the airplane 2000.

As will be seen in FIGURE 68, the ground speed of the airplane 2000 is indicated at 2018 and is designated as "$Vg$". The angle between the vector representing the ground speed $Vg$ and true north is indicated at 2020 and is designated as "$\eta$". As may be seen from FIGURE 68, the value of $Vg$ may be obtained from the relationship $$Vg=V_{gN} \cos \eta+V_{gE} \sin \eta \quad (260)$$

Figure 53:
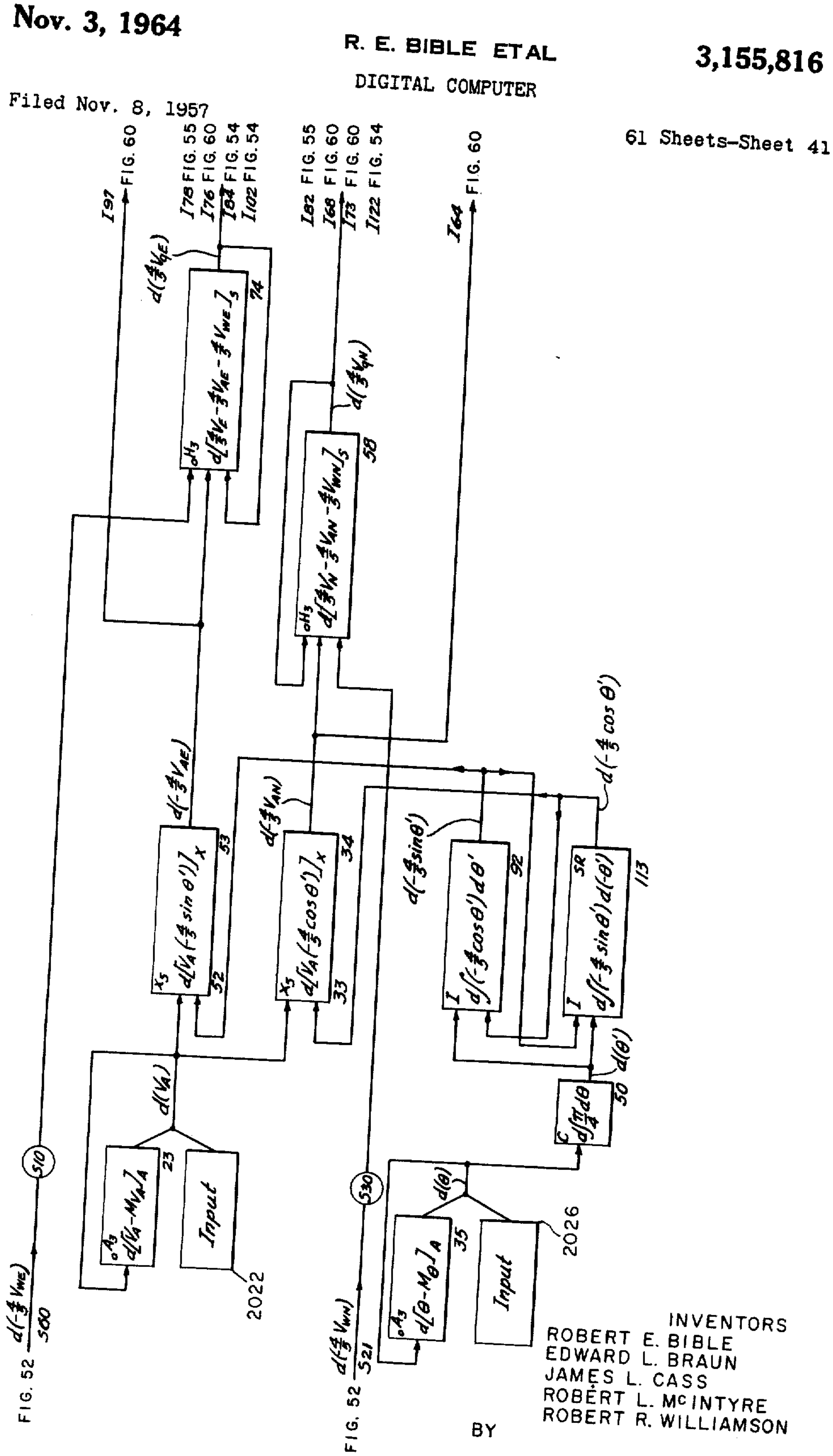
Figure 54:
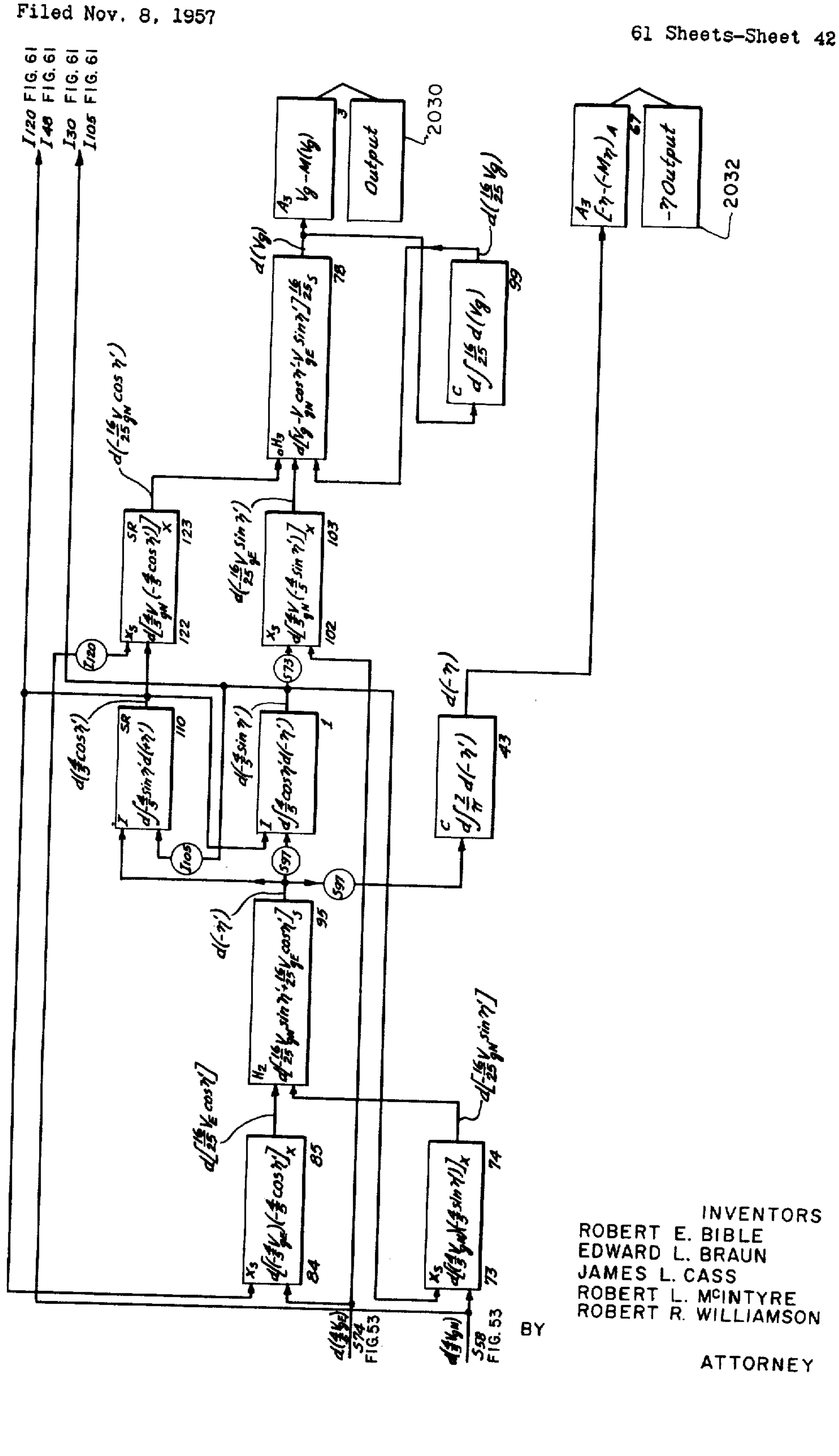

FIGURES 53 and 54 show the interrelationship of a plurality of blocks for solving Equations 258, 259 and 260. Since the air speed of the airplane 2000 can be measured by suitable equipment already known such as radar equipment, these measurements can be introduced as an input quantity through suitable stages indicated by a block 2022 in FIGURE 53. The signals produced in these stages 2022 are compared with the signals produced in the block 23 of the digital differential analyzer. Any difference in the signals is introduced back to the block 23 so that the signals in the block will follow the signals produced in the stages 2022 to represent the air speed. In this way, the block 23 operates to couple the signals from the stages 2022 into the digital differential analyzer.

The blocks shown in FIGURES 51 to 63, inclusive, represent the actual blocks of the digital differential analyzer. The relative number of the block in the digital differential analyzer is indicated at a position just below the lower right corner of the block. For example, the block 23 is indicated by the numeral "23" at a position below the lower right corner of the block. The type of operation performed in the block is indicated in the upper left corner of the block. For example, block 23 is shown as performing an $_0A_3$ type of servo operation.

An $_0A_3$ type is similar to an $_0H_3$ type of servo except that the input from the associated stages such as the stages 2022 can be different from zero. In this way, an $_0A_3$ type of servo can be either an input or output type of servo but an $_0H_3$ type of servo can be only an output type of servo. The operation of an $_0H_3$ type of servo has been described in detail previously.

The particular combination of quantities in a block is indicated within the central portion of the block. For example, the block 23 in FIGURE 53 is shown as obtaining the difference between the value of the signals introduced from the stages 2022 and the value of the signals introduced from the output of the block 23 to the input of the block 23. The signals introduced from the stages 2022 are designated as $MV_A$ since they pass through the M flip-flop 1168 (see FIGURE 23) after being converted from an analogue to a digital value. The signals passing from the output of the block 23 to the input of the block are designated as $V_a$. As will be seen, the output from a block is indicated directly above the output line extending from the block. For example, the output from the block 23 represents increments in the air speed $V_a$ of the airplane.

In like manner, the angle $\theta$ defining the difference of the $V_a$ vector from true north is obtained by suitable equipment such as radar equipment already known. This equipment produces signals which are introduced to stages schematically indicated at 2026 in FIGURE 53. These stages operate to convert the analogue voltage representing $\theta$ into a plurality of signals digitally representing the analogue quantity. The digital signals are then used to produce corresponding signals in the block 35, which operates in a manner similar to the block 23 described above. The output from the block 35 is therefore made to represent the angle $\theta$.

The output from the block 35 is introduced to the block 50, which operates as a constant integrator represented by the letter "C" in the upper left corner to convert the signals indicating $\theta$ into a representation of radians. The output signals from the block 50 then pass to blocks 92 and 113, which operate as normal integrators as represented by the letter "I" in the upper left corner of the block. The blocks are interrelated so that the output from the block 92 is introduced to the block 113 and the output from the block 113 is introduced to the block 92. By this interrelationship, the output from the block 92 is directly proportional to $\sin \theta$ and the output from the block 113 is directly proportional to $\cos \theta$.

The output signals from the block 92 pass to blocks 52 and 53, which are combined in a double block relationship in a manner similar to that described previously. The blocks 52 and 53 also receive the output signals from the block 23 in representation of the air speed "$V_A$." The blocks 52 and 53 combine the input signals in a "special products" operation as represented by the symbol "$X_S$" in the upper left corner of the blocks, a "special products" operation being logically set forth in equations 141 to 152, inclusive. The resultant output from the blocks 52 and 53 indicates the quantity $V_a \sin \theta$. This is equivalent to the component $V_{AE}$, which is the east component of the air speed of the airplane in the east direction. In like manner, the blocks 33 and 34 receive the output signals from the blocks 23 and 113 and combine these signals in a "special products" operation to produce signals representing $V_A \cos \theta$. This is equivalent to $V_{AN}$, which is the north component of the air speed of the airplane 2000.

The signals from the blocks 33 and 34 are introduced to the block 58. Signals representing $V_{WN}=V_W \cos \omega$ (see Equation 258) are also introduced to the block 58. The signals representing $V_{WN}$ are introduced to the block 58 through the block 30, which serves as a repeater to insure that the block 58 is able to receive the signals representing $V_{WN}$. The operation of the block 30 as a repeater is indicated by the letter "S" preceding the number "30" within a circle. The signals representing $V_{WN}$ are produced in a manner which will be described in detail subsequently. The signals repersenting $V_{WN}$ and $V_{AN}$ are combined in the block 58 to produce signals representing $V_{gN}$, which corresponds to the north component of the ground speed of the airplane 2000. The block $58_X$ operates as an $_0H_3$ type of servo to produce the signals representing $V_{gN}$. In like manner, the block 74 operates as an $_0H_3$ type of servo to combine the signals representing $V_{AE}$ and $V_{WE}$ for the production of signals indicating $V_{gE}$. The signals $V_{gE}$ indicate the east component of the air speed of the airplane.

The output signals form the blocks 58 and 74 in FIGURE 53 are introduced to particular stages in FIGURE 54. For example, the signals from the block 74 pass to the blocks 84 and 85, which combine these signals in a "special products" operation with the signals representing $\cos \eta$ from the block 110. Similarly, the blocks 73 and 74 combine the signals representing $V_{gN}$ from the block 58 and the signals representing $\sin \eta$ from the block 1 to produce signals representing $V_{gN} \sin \eta$.

As will be seen from the vectorial diagram shown in FIGURE 68, the value of $V_{gN} \sin \eta$ should be equal to the value of $V_{gE} \cos \eta$. For this reason, $$V_{gE} \sin \eta-V_{gN} \cos \eta=0$$

if $\eta$ has the proper value. The relationship $$V_{gE} \sin \eta-V_{gN} \cos \eta$$

is obtained in the block 95 in FIGURE 54 by combining the signals from the blocks 84 and 85 and from the blocks 73 and 74. Since the block 95 operates as an $H_2$ type of servo, it produces output signals only when the combined value of the various quantities introduced to it is different from zero. These output signals represent increments in the value of $\eta$ so as to make $\eta$ the correct value.

The output signals from the block 95 are introduced directly to the block 110 and through the repeater block 97 to the block 1. The blocks 1 and 110 operate as normal integrators as represented by the symbol "I" in the upper left corners of the blocks. The blocks 1 and 110 are so interrelated that the block 1 produces signals representing sin $\eta$ and the block 110 produces signals representing cos $\eta$, the input to the block 110 being coupled through the repeater block 105 to receive the output signals from the block 1. This coupling of the blocks 1 and 110 is indicated by the symbol "I" preceding the numeral "105" in a circle. A repeater block having the symbol "I" differs from a repeater block having the symbol "S" in that the "I" repeater block receives the output indications from the $B_1$ flip-flop 496 in the first half of a double-block operation whereas the "S" repeater block receives the output indications from the $A_1$ flip-flop 396 in the first half of a double-block operation.

The blocks 122 and 123 in FIGURE 54 operate on a "special product" basis to combine the signals representing cos $\eta$ from the block 110 and the signals representing $V_{gN}$ from the block 58 in FIGURE 53. Similarly, the blocks 102 and 103 in FIGURE 54 operate on a "special products" basis to combine the signals representing $V_{gE}$ from the block 74 in FIGURE 53 and the signals representing cos $\eta$ from the block 1 in FIGURE 54. As indicated in Equation 260, the combination of $$V_{gN}\cos\eta+V_{gE}\sin\eta$$

represents $V_g$. This combination is obtained by the block 78, which operates as an $_0H_3$ type of servo. The signals representing $V_g$ are introduced from the block 78 to the block 3, which operates as an $A_3$ type of servo to control the production of signals by output stages indicated at 2030 in FIGURE 54. The signals produced by the stages 2030 may be in analogue form.

In like manner, the signals representing $\eta$ are introduced from the block 95 through the repeater block 97 to the block 43. The block 43 provides a constant integration on the signals to convert the signals into a form for visual display. The signals are then introduced to the block 67, which operates as an $A_3$ type of servo to control the production of output signals indicated by stages 2032 in FIGURE 54. The signals produced by the stages 2032 may be in analogue form.

Since the values of the ground speed components $V_{gN}$ and $V_{gE}$ can be determined in a manner similar to that described above, the change in position of the airplane 2000 at any instant can also be determined. For example, the change in the range between the airplane 2000 and the aim point 2002 can be determined by the following relationship:

$$(R_N)'=\int_{t_1}^{t}-V_{gN}dt \qquad (261)$$

Where:

$(R_N)'$=the change in the northern component of range from the time $t_1$ to the time $t$;

Similarly, $$(R_E)'=\int_{t_1}^{t}-V_{gE}dt \qquad (262)$$

Where:

$(R_E)'$=the change in the eastern component of range from the $t_1$ to the time $t$.

The determination of $(R_N)'$ and $(R_E)'$ may be made in a mode of operation hereinafter designated as "aided track."

As described previously, FIGURE 67 shows the relative horizontal positions of the airplane 2000 and the aim point 2002 at any instant. The distance R between the airplane and the aim point at any instant is indicated at 2004 and the angle $\mu$ between the line R and true north is indicated at 2006. Since the airplane is moving toward the aim point at any instant, the range R changes. Actually, the change in the range R may vary from the calculated values at any instant. Such deviations in the range R from a calculated value between a particular instant and a certain later time is designated as $\Delta R$ and is indicated at 2036 in FIGURE 67. Because of errors in the flight path of the airplane, the airplane may also be deviating from the range line between the particular instant and the certain later time. The lateral deviation from the range line R may be designated as $\Delta\mu$ and may be indicated at 2038 in FIGURE 67.

As will be seen from the vectorial diagram in FIGURE 67, $$(\Delta R_E)=(\sin\mu)\Delta R+(\cos\mu)\Delta\mu \qquad (263)$$

Where:

$(\Delta R_E)$=the change in range in an easterly direction from the particular instant to the certain later time;

$$\Delta R_N=(\cos\mu)\Delta R+(\sin\mu)\Delta\mu \qquad (264)$$

Where:

$\Delta R_N$=the change in range in a northerly direction from the particular instant to the certain later time.

By dividing the changes $\Delta R_E$ and $\Delta R_N$ in range by the change in time from the particular instant to the certain later instant, velocities are obtained. These velocities represent errors in the calculated rate of movement of the airplane 2000. They may be considered as the velocity of the wind in the eastern and northern directions. By this reasoning, $$\Delta V_{WE}=1/t_r\,(\sin\mu)\Delta R+1/t_u\,(\cos\mu)\Delta\mu \qquad (265)$$

Where:

$\Delta V_{WE}$=the velocity of the wind in the eastern direction;
$t_r$=the time during which $\Delta R$ is measured; and
$t_u$=the time during which $\Delta\mu$ is measured.

As may be seen, the measurements of $t_r$ and $t_u$ may be made from different instants of time. Similarly, $$\Delta V_{WN}=1/t_r\,(\cos\mu)\Delta R+1/t_u\,(\sin\mu)\Delta\mu \qquad (266)$$

Where:

$\Delta V_{WN}$=the velocity of the wind in the northern direction.

As may be seen, the measurements of $\Delta V_{WE}$ and $\Delta V_{WN}$ represent an average value of wind during the time that the measurements are being made. The measurements of $\Delta V_{WN}$ are not made at all times but only during the times that a switch 2040 in FIGURE 64 is manually closed. This switch is designated as "$P_s$" when it is closed and as "$\bar{P}_s$" when it is open. When the switch 2040 is closed, the measurements of $V_{We}$ and $\Delta V_{WN}$ are made in a mode of operation called "rate solution."

The values of $1/t_r$ and $1/t_u$ are determined automatically by the operation of the digital differential analyzer and certain circuits associated with the analyzer. Only the determination of $1/t_r$ is described in detail since the determination of $1/t_u$ may be made in a similar manner. The circuits for determining $1/t_r$ include those shown in FIGURE 69.

As shown in FIGURE 69, a manually operated switch 2042 is provided with a movable contact and upper and lower stationary contacts. The upper stationary terminal of the switch 2042 in FIGURE 67 is coupled through a resistance to the power supply 10 (also shown in FIGURE 1) to receive a suitable voltage such as +50 volts. The movable contact of the switch 2042 is coupled to tracking mechanism generally indicated at 2043 (FIGURE 65)

so as to be pivotally moved when the tracking mechanism is operated. The movable contact of the switch 2042 is connected in FIGURE 69 to one terminal of a storage capacitance 2046 having its other terminal grounded. The lower stationary contact of the switch 2042 in FIGURE 69 has a common connection with the cathode of a diode 2048 and with one terminal of a resistance 2050 adapted to receive a suitable potential such as approximately −150 volts from the power supply 10.

The diode 2048 is included in an "and" network with diodes 2052, 2053 and 2054. The diodes 2052, 2053 and 2054 are respectively connected to receive signals from the cathode follower 168 (also shown in previous figures including FIGURE 5), the left output terminal of the flip-flop 164 and the right output terminal of a flip-flop 2056. The signals produced on the plates of the diodes 2048, 2052 and 2054 are introduced to the left input terminal of the flip-flop 2056. A connection is also made from the plates of the diodes 2048, 2052, 2053 and 2054 to a resistance 2058 which corresponds in the "and" network formed by the diodes to the resistance 96 in FIGURE 2.

Signals also pass to the right input terminal of the flip-flop 2506 from the plates of diodes 2060, 2061 and 2062. A resistance 2064 is included in an "and" network with the diodes 2060, 2061 and 2062 to perform functions similar to the resistance 96 in FIGURE 2. The cathodes of the diodes 2060, 2061 and 2062 respectively have voltages applied to them from the cathode follower 168, the left output terminal of the flip-flop 164 and the left output terminal of the flip-flop 2056.

The movable contact of the switch 2042 is normally disposed in engagement with the upper stationary contact of the switch in FIGURE 69. In this position of the movable contact, the capacitance 2046 becomes charged to a positive voltage. During this time, the cathode of the diode 2048 receives a negative potential through the resistance 2050 from the power supply 10. This negative potential is instrumental in preventing signals from being produced by the "and" network including the diodes 2048, 2052, 2053 and 2054.

The movable contact of the switch 2042 is pivoted from the upper stationary contact to the lower stationary contact when the tracking mechanism in FIGURE 65 is operated as described subsequently to produce corrections in the range R. When the movable contact of the switch 2042 is pivoted from the left stationary contact to the right stationary contact in FIGURE 52, the positive potential produced across the capacitance 2046 is introduced to the cathode of the diode 2048. This potential prepares the "and" network formed by the diodes 2048, 2052, 2053 and 2054 so that a signal will be produced at the proper time. A signal is actually produced by the "and" network at the time that the origin pulse N occurs in the cycle of operation in accordance with the logic expressed in Equation 25. The resultant signal is introduced to the left input terminal of the flip-flop 2056 to trigger the flip-flop to the true state of operation.

The flip-flop 2056 becomes triggered to the true state by the operation of the stages shown in FIGURE 69 in accordance with the logical equation:

$$t_R = \overline{T}_R \Sigma_R N T \qquad (267)$$

Where:

$t_R$=the introduction of a triggering signal to the left input terminal of the flip-flop 2056;

$\overline{T}_R$=the production of a relatively high voltage on the right output terminal of the flip-flop 2056; and $\Sigma_R$=the production of a positive voltage on the cathode of the diode 2048.

The triggering of the flip-flop 2056 to the true state of operation prepares for operation the "and" network including the diodes 2060 and 2062. Because of this, a signal passes through the "and" network upon the occurrence of the next origin pulse N. This signal is introduced to the right input terminal of the flip-flop 2056 and is instrumental in triggering the flip-flop to the false start of operation. The flip-flop 2056 becomes triggered to the false state of operation in accordance with the logical equation:

$$\overline{t}_R = T_R N \qquad (268)$$

Where:

$\overline{t}_R$=the introduction of a triggering signal to the right input terminal of the flip-flop 2056; and $T_R$=the production of a relatively high voltage on the left output terminal of the flip-flop 2056.

In this way, the flip-flop 2056 remains in its true state of operation for a full cycle of operation every time that the movable contact of the switch 2042 is pivoted into engagement with the right stationary contact of the switch.

When the flip-flop 2056 is triggered to its true state of operation, it prepares an "and" network 2069 in FIGURE 64 for operation. This causes the "and" network 2069 to pass a signal upon the occurrence of particular blocks in accordance with the logical interrelationships provided for the flip-flops 234, 244, 254, 264, 266 and 268 (also shown in FIGURE 5). As previously described and as expressed logically in Equations 11 to 24, inclusive, these flip-flops form a block counter which is indicated schematically at 2065 in FIGURE 64. Because of this particular interrelationship, signals pass through the "and" network 2067 upon the presentation of blocks 88, 108 and 124 for computation. These signals pass through an "or" network 2066 and an "and" network 2067 for synchronization at optimum times in the clock cycles. The signals then trigger the flip-flop 1342 to the true state of operation.

The flip-flop 1342 becomes triggered to the true state of operation in accordance with the logical equation:

$$g_3 = (B88 + B108 + B124) T_R T \qquad (269)$$

Where:

$g_3$=the introduction of a triggering signal to the left input terminal of the flip-flop 1342;

$B88$, $B108$ and $B104$=the production of signals upon the presentation of blocks 88, 108 and 124 for computation; and the other terms have previously been defined.

When the flip-flop 1342 becomes triggered to the true state of operation for a particular block, it continues in that state of operation during the remaining pulse positions of the block. At position 18 for the block, the flip-flop 1342 becomes triggered to the false state of operation by the passage of a signal through an "and" gate 2068. The flip-flop 2056 becomes triggered to the false state of operation in accordance with the logical equation:

$$\overline{g}_3 = G_3 P_{18} T \qquad (270)$$

Where:

$\overline{g}_3$=the introduction of a triggering signal to the right input terminal of the flip-flop 1342;

$G_3$=the production of a relatively high voltage on the left output terminal of the flip-flop 1342; and the other terms have previously been defined.

Upon the triggering of the flip-flop 1342 to the true state of operation, certain stages shown in FIGURE 26 become prepared for activation. These stages include the "and" network 1356 in FIGURE 26. When the "and" network 1356 becomes prepared for activation by the production of a relatively high voltage on the left output terminal of the flip-flop 1342, the $Y_p$ information permanently recorded in the channel 148 passes through the "and" network. The $Y_p$ information permanently recorded in the channel 148 is able to pass through the "and" network 1356 only upon the occurrence of the start pulse in the particular block, since the "and" network receives the voltage on the left output terminal of the flip-flop 446.

The signals passing through the "and" network 1356 are introduced through the "or" network 1346 to the "and" network 1348 for synchronization at optimum times in the clock cycles. The signals then pass to the left input terminal of the flip-flop 1332 to trigger the flip-flop to the true state of operation. When the flip-flop 1332 becomes triggered to the true state of operation, indications of "1" are recorded by the coil 1333 in the channel 150. Indications of "1" become recorded in the channel 150 by the passage of signals through the stages 1356, 1346, 1348 in accordance with the logical equation:

$$_0y=Y_PG_3S_1T \qquad (271)$$

where all of the terms have previously been defined.

The "and" network 1374 in FIGURE 26 becomes prepared for activation at the same time as the "and" network 1356. However, the "and" network 1374 passes the indications of "0" permanently recorded in the channel 148 only after the start pulse for the activated block. These signals pass through the "or" network 1366 and the "and" network 1368 to the right input terminal of the flip-flop 1332 and trigger the flip-flop to the false start of operation. In this way, the indications of "0" in the channel 148 becomes recorded in the channel 150. The logical equations controlling the recording of indications of "0" in the channel 150 by the passage of signals through the stages 1374, 1366 and 1368 may be expressed as:

$$_0y=\overline{Y}_PG_3S_1T \qquad (272)$$

where all of the terms have previously been defined.

When the information permanently recorded in the channel 148 becomes transferred to the channel 150 for a block, the determination of the time function $1/t_r$ is initiated. The determination of $1/t_r$ thereafter proceeds on an automatic basis in accordance with a relationship similar to that expressed below:

$$\frac{1}{t_r}=K\left(\frac{2.05}{\tau}e\frac{-t}{\tau}+\frac{.225}{\tau}\right) \qquad (273)$$

Where:

K=a constant;
$\tau$=a second constant; and
$t_r$=the time during which the corrections in the range are being measured.

As will be seen, the above relationship for $1/t_r$ involves the addition of a constant value to an exponential value. This determination may be easily made in one block. The reason for this is that an exponential can be determined in one block by feeding the output of the block back to the input and by inserting in the block an initial value corresponding to the constant which is to be added to the exponential value. This initial value is introduced to the block in accordance with the logic expressed in Equations 271 and 272. The determination of $1/t_r$ in accordance with the relationship expressed in Equation 273 is made by the block 108 in FIGURE 51.

In like manner, circuits similar to those shown in FIGURE 69 control the triggering of a flip-flop 2070 in FIGURE 70 to the true state of operation. Such circuits trigger the flip-flop 2070 to the true state upon the manual actuation of a switch 2072 corresponding to the switch 2042, the switch 2072 being mechanically coupled to the tracking mechanism 2043 in a manner which will be described in detail subsequently. The flip-flop 2070 then remain true for one cycle of operation of the digital differential analyzer and becomes triggered to the false state of operation at the end of the cycle.

The triggering of the flip-flop 2070 to the true state of operation may be represented as follows:

$$t_U=\overline{T}_U\Sigma_uNT \qquad (274)$$

Where:

$t_U$= the introduction of a triggering signal to the left input terminal of the flip-flop 2070;
$\overline{T}_U$=the production of a relatively high voltage on the right output terminal of the flip-flop 2070;
$\Sigma_u$=the production of a relatively high voltage on the cathode of a diode 2074 corresponding to the diode 2048; and the other terms have previously been defined.

Similarly, the logical equation for triggering the flip-flop 2070 to the false state of operation may be expressed as:

$$\bar{t}_U=T_UNT \qquad (275)$$

Where:

$\bar{t}_U$= the introduction of a triggering signal to the right input terminal of the flip-flop 2070; and
$T_U$=the production of a relatively high voltage on the left output terminal of the flip-flop 2070.

During the cycle of operation that the flip-flop 2070 is in its true state of operation, signals pass through an "and" network 2074 in FIGURE 64 for certain blocks. These signals then pass through the stages 2066 and 2067 and trigger the flip-flop 1342 to the true state of operation. The signals pass through the stages 2074, 2066 and 2067 upon the presentation of the blocks 66, 70 and 4 for computation. This may be expressed in the following logical relationship:

$$g_3=(B4+B66+B70)T_UT \qquad (276)$$

where all of the terms have previously been defined. At position 18 of the blocks 66, 70 and 4, the flip-flop 1342 becomes triggered to the false state of operation in accordance with the logic set forth in Equation 270.

Figure 51:
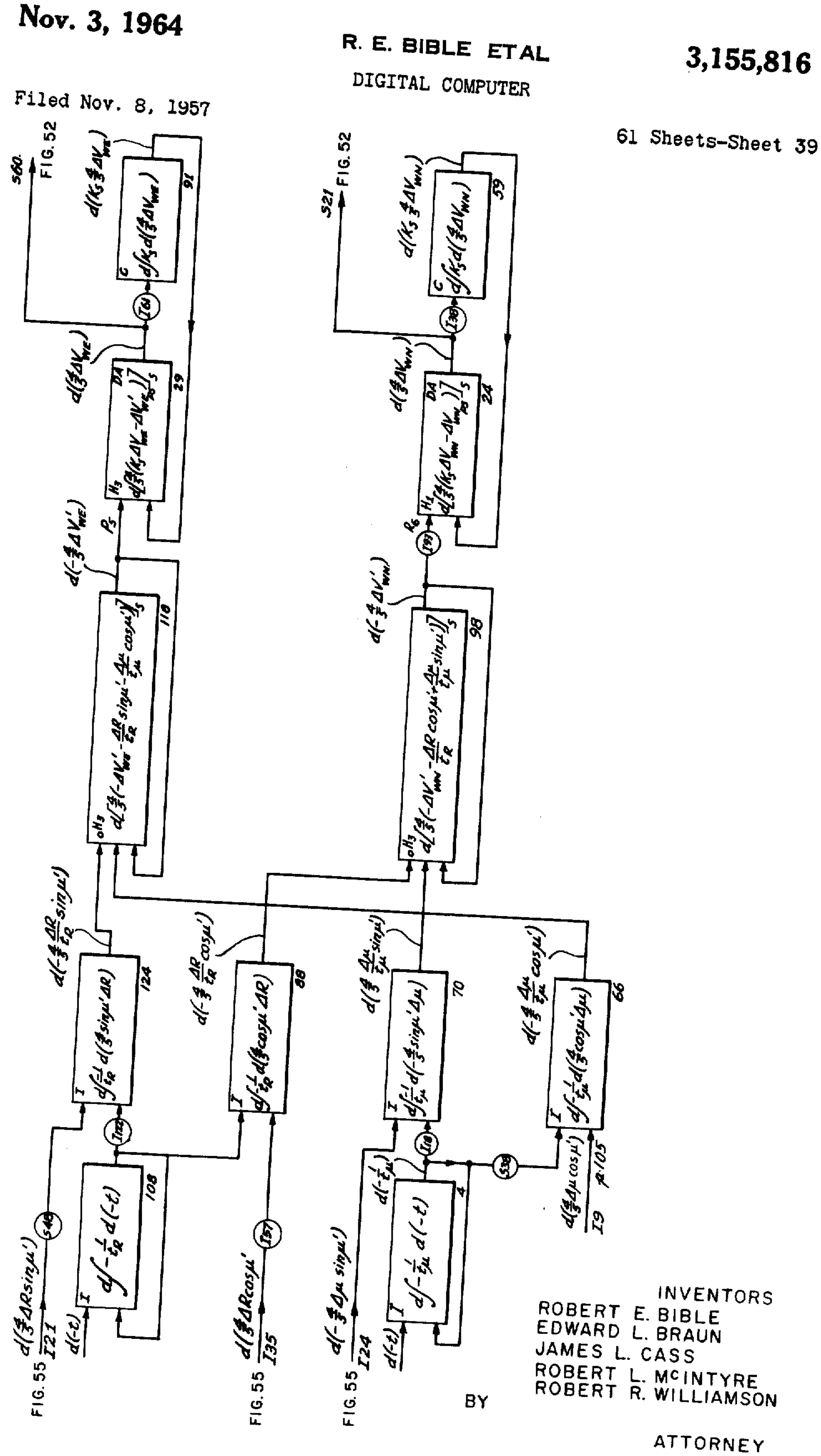

The value represented by $\int 1/t_rdt$ is obtained by the block 108 in FIGURE 51 in the manner described above. The output from the block 108 is introduced directly to the block 88 and through the repeater block 122 to the block 124. Signals representing a value proportional to $\Delta R$ sin $u$ and $\Delta R$ cos $u$ are also respectively introduced to the blocks 124 and 88. The particular manner of producing these signals will be described in detail subsequently.

The block 124 in FIGURE 51 operates as a normal integrator to combine the signals introduced to it so as to produce signals representing a value proportional to $1/t_r\Delta R$ sin $u$. These signals are introduced to the block 118. Similarly, the block 88 operates as a normal integrator to produce signals representing a value proportional to $1/t_r\Delta R$ cos $u$. The output signal from the block 88 pass to block 98.

Just as the block 108 produces signals representing $1/t_r$ the block 4 produces signals representing $1/t_u$. These signals are introduced through the repeater block 38 to the block 66 and through the repeater block 118 to the block 70. The block 70 also receives signals representing a value proportional to $\Delta u$ sin $u$ and operates as a normal integrator to combine these signals and the signals from the block 4 for the production of signals representing a value proportional to $\Delta u/t_u$ sin $u$. Similarly, the block 66 receives signals representing a value proportional to $\Delta u$ cos $u$ and operates as a normal integrator to combine these signals and the signals from the block 4 for the production of signals representing a value proportional to $\Delta u/t_u$ cos $u$. The output signals from the blocks 70 and 66 are respectively introduced to the blocks 98 and 118.

The block 118 operates as an $_0H_3$ type of servo to combine the signals from the blocks 66 and 124 in a relationship corresponding to that expressed above in Equation 265. The signals from the block 118 are introduced to the block 29, which operates as an $H_3$ type of servo to combine these signals with the output signals from the block 91. The signals are combined in the block 29 during the modes of operation other than those designated as "deleted address." This mode of operation is indicated by the symbols "DA" in the upper right corner of the block and will be described in detail subsequently. In this mode of operation, the corrections in wind in the eastern and northern components are computed in accordance with the logic set forth in Equations 265 and 266. The signals from the block 29 then pass through the repeater block 61 to the block 91, which introduces a constant factor into the results. The output from the block 91 is fed back to the block 29 in the modes of operation other than "deleted address" so as to make the output introduced from the block 29 to the blocks other than the block 91 conform in scale factor to the other inputs introduced to these blocks. By using "deleted address" in the block 29, the output from the block can be made greater than the input to the block by a suitable scale factor such as 8:1.

In like manner, the block 98 operates as an $_0H_3$ type of servo to produce signals representing a value proportional to $\Delta R/t_r \cos \mu + \Delta u/t_u \sin u$. These signals are introduced through the repeater block 93 to the block 24, which operates as an $H_1$ type of servo to combine these signals with the signals from the block 59. The signals are combined during the modes of operation designated as "rate solution" and only in the mode of operation other than "deleted address." The signals from the block 24 pass through the repeater block 138 to the block 59, which operates as a constant integrator to change the scale factor of the signals. By using the "deleted address" in the block 24, the output from the block can be made greater than the input to the block by a suitable scale factor such as 8:1.

The output signals from the blocks 29 and 24 in FIGURE 51 respectively pass to the blocks 60 and 21 in FIGURE 52, where they are combined with other signals which will be described in detail subsequently. These other signals are obtained from blocks including the block 11 in FIGURE 52. This block follows the output from stages 2080, which receive analogue signals from other apparatus to indicate the angle $\omega$ representing wind bearing and which convert these signals into corresponding signals in digital form.

The output signals from the block 11 are introduced to the block 13, which also receives signals representing a computed value of the bearing angle $\omega$ from the block 116. Since the block 13 operates on the basis of a "deleted address," only the signals from the block 11 or the block 116 are able to be introduced into the block 13 at any one time. The signals from the block 116 are introduced to the block 13 during the mode of operation designated as "rate solution" and the signals from the block 11 are introduced at other times. As previously described, the mode of "rate solution" is used to correct for errors in the ground speed of the airplane 2000 by determining the drift of the radar antenna from a direction pointing toward the aim point 2002. By operating on either the signals from the block 11 or the signals from the block 116, the block 13 produces signals representing a value proportional to wind bearing $\omega$.

The signals from the block 13 are introduced to the block 0, which operates as a constant integrator to convert the signals into a representation of radians. The output signals from the block 0 are fed back to the block 11 to provide a servo operation in the block for insuring that the block follows the output from the stages 2080 or from the block 116. The output from the block 13 is also introduced to the blocks 23 and 51, which operates as normal integrators. The blocks 23 and 51 are so interrelated that the block 23 produces signals representing values proportional to sin and the block 51 produces signals representing values proportional to cos $\omega$.

The output signals from the blocks 23 and 51 are respectively applied to the blocks 86 and 87 and to the blocks 89 and 90. The blocks 86 and 87 perform a "special product" operation in combining the signals from the block 23 with the signals representing the north component of the wind from the block 21. Similarly, the blocks 89 and 90 perform a "special products" operation in combining the signals from the block 51 with the signals representing the east component of wind from the block 60. The block 116 in turn receives the signals from the blocks 86 and 87 and from the blocks 89 and 90 and combines these signals in an $H_2$ type of servo to obtain signals representing the bearing angle $\omega$. This may be seen from FIGURE 73, which indicates that $$-V_{WE} \cos \omega + V_{WN} \sin \omega = 0 \qquad (277)$$

Since $V_{WE}$ and $V_{WN}$ are both obtained from $V_W$, any errors in Equation 277 result from changes in the bearing angle $\omega$. By keeping account of the changes in the bearing angle $\omega$, the bearing angle can be determined as the cumulative output signals from the block 116.

The operation of the block 11 and stages 2080 has been previously described. As previously described, the measurement of the bearing angle $\omega$ is obtained in the digital differential analyzer by equipment external to the digital differential analyzer and by the introduction of these measurements to the block 11. In the mode designated as "rate solution," however, the determination of bearing angle is made by the digital differential analyzer. Signals representing these measurements are produced in the block 116 as described previously and are introduced from the block 0 to the block 11. The stages 2080 operate as output stages to follow the signals introduced to the block 11 and to convert these signals into analogue form. In this way, the determinations of wind by the digital differential analyzer can be introduced to the equipment external to the analyzer. The signals can be converted into an analogue form by the stages external to the digital differential analyzer.

Figure 52:
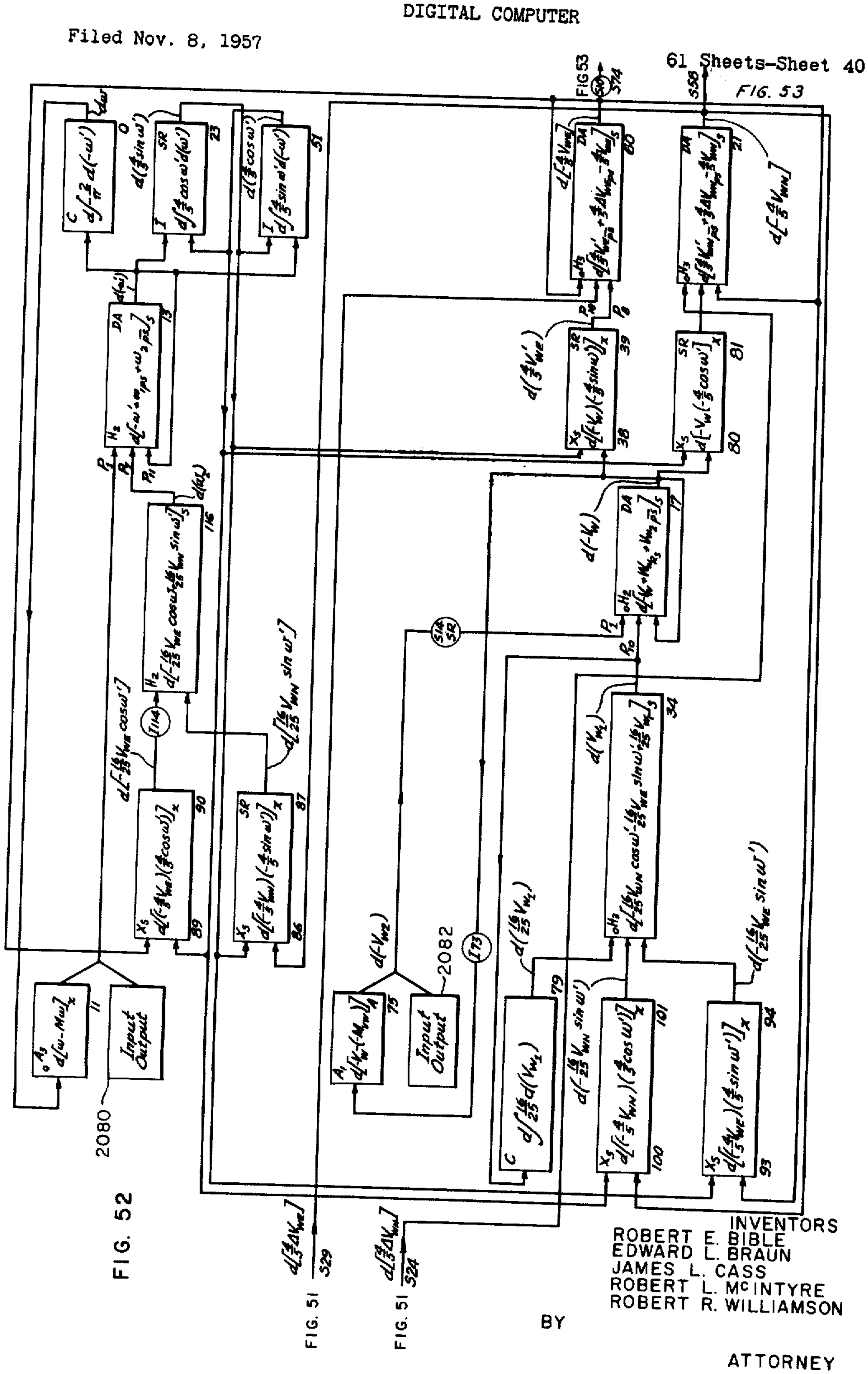

Just as the block 11 and the stages 2080 operate in conjunction with each other to produce signals representing the bearing angle $\omega$, the block 75 and stages 2082 in FIGURE 52 operate in conjunction to produce signals representing the wind velocity $V_W$. At certain times, the stages 2082 receive signals representing the wind bearing $V_W$ from the equipment external to the digital differential analyzer. These signals control the production of corresponding signals by the block 75. In the mode of operation designated as "rate solution," however, the block 75 produces signals representing the wind velocity $V_W$ as computed by the digital differential analyzer. These signals control the production of signals by the stages 2082 for introduction to the equipment external to the digital differential analyzer. The signals introduced to the external equipment may be in analogue form.

In the mode of operation other than "rate solution," the signals from the block 75 are introduced to the block 14, which operates to repeat the signal information and to reverse the polarity of the information. The signals then pass from the block 14 to the block 17, which also receives signals from the block 34. The block 17 operates as an $_0H_3$ type of servo to delete the signals from either the block 14 or the block 34. In the mode of "rate solution," the block 17 accepts the signals from the block 34. At other times, the block 17 accepts the signals repeated by the block 14.

The signals introduced from the block 34 to the block 17 in the mode of "rate solution" are obtained by the operation of the block 79, the blocks 100 and 101 and the blocks 93 and 94. The block 79 operates as a constant integrator to convert the signals representing the wind velocity $V_W$ from the block 34 into signals having a proper scale factor for combination with the other signals introduced to the block 17. The blocks 100 and 101 perform a "special product" operation on the signals from the blocks 21 and 51 to obtain signals representing a value proportional to $V_{WN} \cos \omega$. Similarly, the blocks 93 and 94 perform a "special product" operation on the signals from the blocks 51 and 60 to obtain signals representing a value proportional to $V_{WE}$ sin $\omega$. The signals representing values proportional to $V_{WN}$ cos $\omega$, $V_{WE}$ sin $\omega$ and $V_W$ are combined in a relationship expressed as:

$$-V_{WN}\cos\omega - V_{WE}\sin\omega + V_W = 0 \qquad (278)$$

Figure 73:
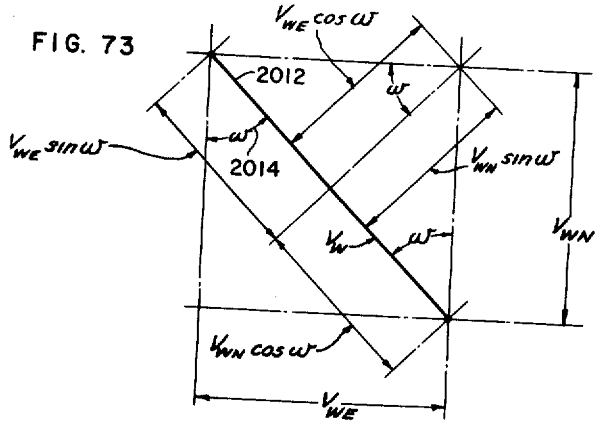
Figure 72:
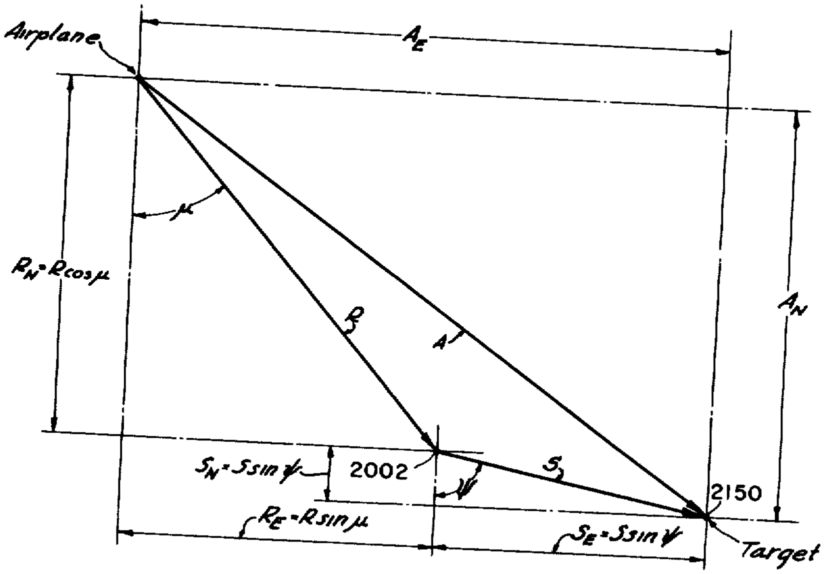

This relationship may be seen from the vectorial diagrams shown in FIGURE 73. When an output is obtained which is different from zero, this output represents changes in $V_W$. This output is obtained by the block 34.

Since the block 17 receives signals representing $V_W$ from the blocks 14 and 34 on a "deleted address" basis, the output from the block 17 also represents $V_W$. The output signals from the block 17 are introduced to the blocks 38 and 39 and to the blocks 80 and 81. The blocks 38 and 39 operate on a "special products" basis to combine the signals from the block 17 with the signals from the block 23 to produce signals representing a value proportional to $V_{WE}$. These signals and the signals from the block 29 are introduced to the block 60, which operates as an $_0H_3$ type of servo.

Figure 58:
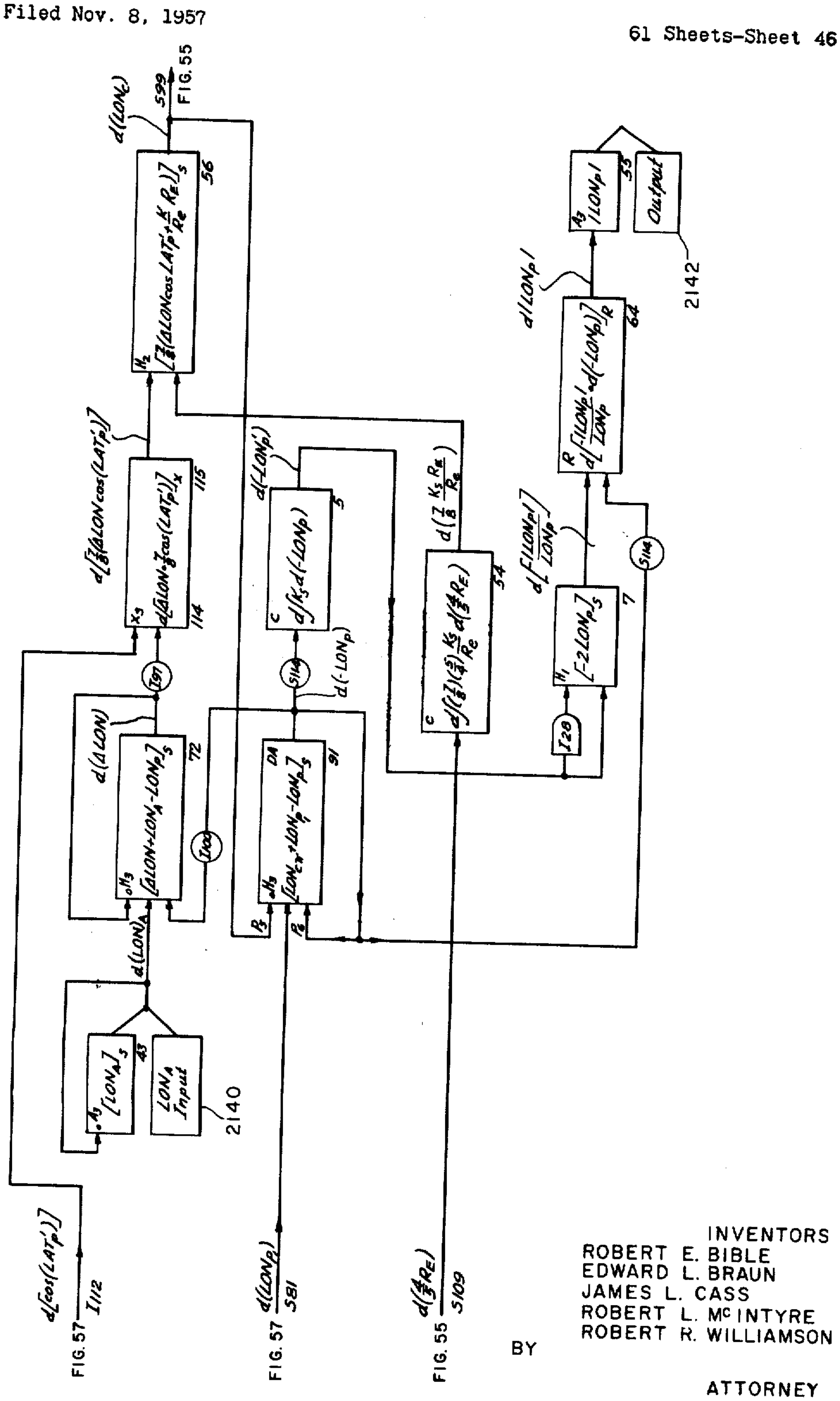

As indicated by the letters "DA" in the upper right corner, the block 60 operates to delete either the signals from the block 39 or the signals from the block 29 in FIGURE 51 in accordance with the operation of the digital differential analyzer in "rate solution" or in some other mode. The output signals from the block 29 in FIGURE 58 are obtained in "rate solution" and the output from the block 39 is obtained in the other modes.

In like manner, the blocks 80 and 81 perform a "special products" operation to combine the signals representing $V_W$ and the signals representing cos $\omega$ to produce signals representing $V_{WN}$. These signals and the signals from the block 24 in FIGURE 51 are introduced to the block 21, which operates as an $_0H_3$ type of servo. The block 21 operates on a "deleted address" basis to accept either the signals from the block 24 or the signals from the blocks 80 and 81. The output signals from the block 21 represent the northern component of wind at any instant.

Figure 55:
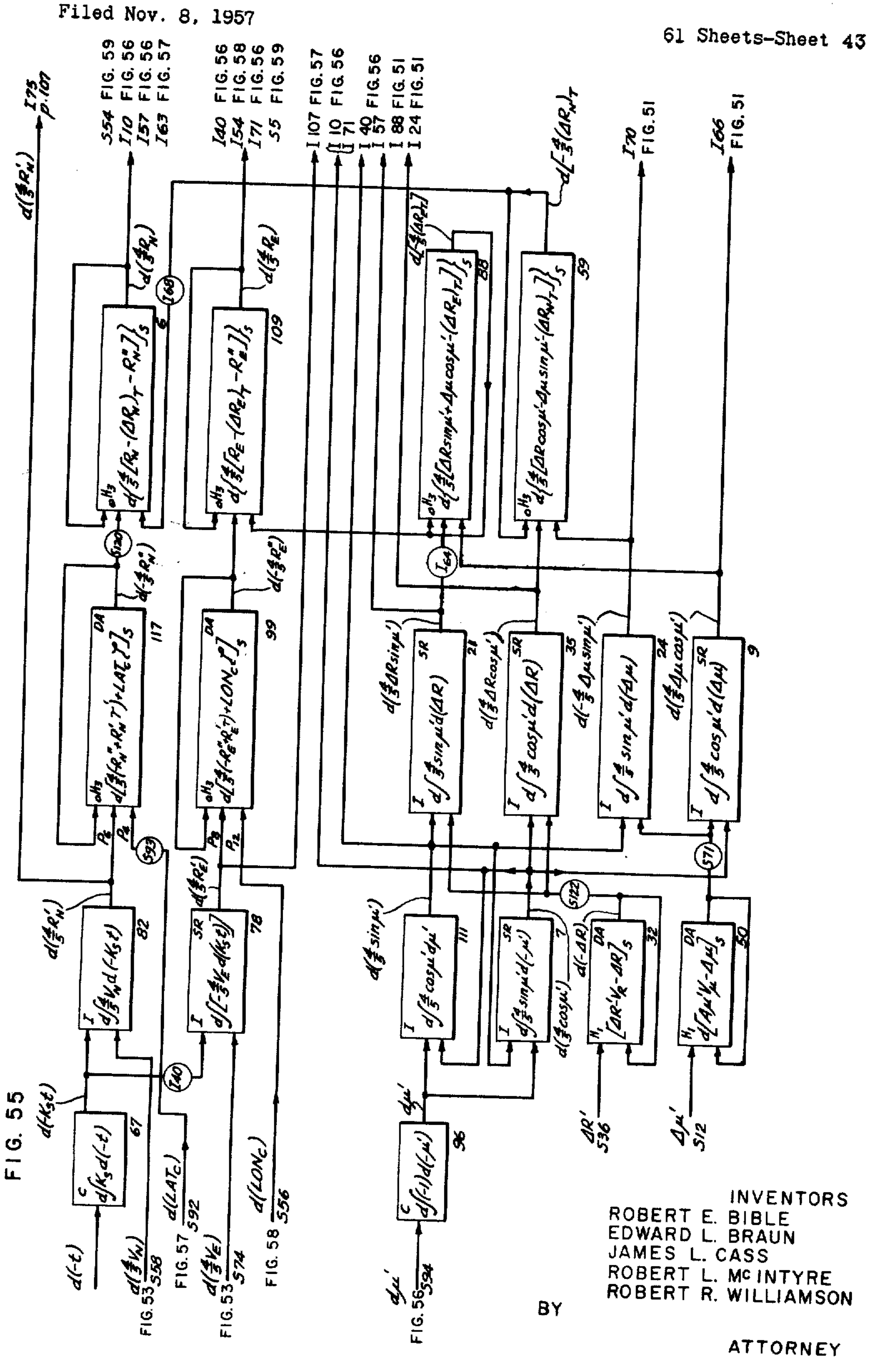

The signals from the block 58 in FIGURE 53 are introduced to the block 82 in FIGURE 55. The block 82 operates as a normal integrator to combine these signals with the signals representing time from the block 67. The resultant signals from the block 82 represent the changes in the northern component of range produced on the airplane 2000 by various factors which are considered in the aggregate as the wind. These signals are introduced to the block 117.

The block 117 operates as an $_0H_3$ type of servo to accept either the signals from the block 82 or the signals through the repeater block 92 from the block 92 in FIGURE 55, the operation of the block 92 being described subsequently. Since the block 117 accepts either the signals from the block 92 or the signals from the block 82, it operates on the basis of a "deleted address." The signals from the block 117 represent a correction in the northern component of range. The signals from the block 117 are combined in the block 6 with the signals from the block 59, which represent a correction introduced by the pilot by the operation of the tracking mechanism 2043 shown in FIGURE 65. Such corrections are made by the pilot or other operator to direct the radar antenna at the aim point 2002. By combining the corrections made manually and the computed corrections, the block 6 operates to produce signals representing corrections in the northern component of the range.

In like manner, the block 78 operates as a normal integrator to combine the signals from the block 67 and from the block 74 in FIGURE 53 for the production of signals representing the corrections computed during "aided track" in the eastern component of range. These signals and the signals from the block 56 in FIGURE 58 are introduced to the block 99, which operates on a "deleted address" basis to accept either the signals from the block 56 or from the block 78. The signals from the block 99 pass to the block 109, which combines the signals with the corrections introduced manually by the operator in operating the tracking mechanism 2043 shown in FIGURE 65. The resultant signals represent the corrections in the eastern component of range.

In order to understand the operation of the remaining stages shown in FIGURE 55, the operation of certain other stages should perhaps first be explained. These include the stages shown in FIGURE 65. As shown in FIGURE 65, the movable arm of a potentiometer 2082 is mechanically coupled to a tracking stick 2084 for movement in accordance with the movements of the tracking stick by the pilot. The tracking stick 2084 is included in the tracking mechanism 2043 and is disposed for pivotable movement about a fulcrum 2081.

The tracking stick 2084 is slidable in a first slot 2093 (FIGURE 65) which extends along a first annular gimbal 2095 in the same direction as the gimbal. The tracking stick 2084 is also slidable in a second slot 2097 (FIGURE 66) which extends along a second annular gimbal 2099 in the same direction as the gimbal. The gimbals 2095 and 2099 are disposed in substantially perpendicular planes and are pivotable in accordance with the movements of the tracking stick 2084. By disposing the slots and gimbals in this relationship, each of the gimbals can be pivoted in accordance with the movements of the tracking stick 2084 without disturbing the disposition of the other gimbal.

The movable arm of the potentiometer 2082 is electrically connected to receive a suitable positive potential such as approximately +70 volts from the power supply 10. The stationary contacts of the potentiometer 2082 are connected to first stationary contacts of a pair of double-pole, single throw switches 2085 and 2086. The movable contacts of the switches 2085 and 2086 and of the switch 2088 are mechanically coupled to the tracking switch 2084. The movable contact of the switch 2085 is coupled to the tracking stick 2084 through a plate 2083 disposed adjacent to one side of the tracking stick. The movable contacts of the switches 2086 and 2088 are coupled to a plate 2087 disposed on the other side of the tracking stick. The tracking stick is pivotable as at 2081 such that the movable contact of the switch 2085 becomes actuated upon a pivotal movement of the tracking stick in one direction along the slot 2093 and the movable contacts of the switches 2086 and 2088 become actuated upon a pivotal movement of the tracking stick in the opposite direction along the slot 2093.

The movable contact of the switch 2085 is electrically connected to the second stationary contact of the switch 2086. A connection is made from the second stationary contact of the switch 2085 to the plate of a diode 2089 and to one terminal of a resistance 2091 having its other terminal connected to the positive terminal of the power supply 10 to receive a suitable positive such as approximately +100 volts. The cathode of the diode 2089 has a common terminal with the movable contact of a switch 2090. One stationary contact of the switch 2090 is grounded and the other stationary contact of the switch is connected through a suitable resistance to the power supply 10 to receive a suitable positive potential such as approximately +100 volts.

The movable contact of the switch 2086 is connected to one terminal of a capacitance 2092, the other terminal of which is grounded. The movable contact of the switch 2086 is also connected to the plate of a diode 2094 having its cathode connected to the right output terminal of a flip-flop 2101. The plate of the diode 2094 has a common terminal with the cathode of a diode 2096, which is included in an "and" network with a resistance 2098 and a pair of diodes 2100 and 2103. The cathodes of the diodes 2100 and 2103 are connected to receive signals from the cathode follower 168 and from the left output terminal of the flip-flop 168. The signals on the plates of the diodes 2096, 2100 and 2103 are introduced to the left input terminal in the flip-flop 2101.

The switch 2090 is coupled to the radar apparatus for operation in accordance with the determination of range made by the radar apparatus. For example, the movable contact of the switch 2090 may be actuated to engage the right stationary contact in FIGURE 65 when the horizontal range from the airplane 2000 to the aim point 2002 is greater than 200 miles. The movable contact of the switch 2090 may be actuated to engage the left stationary contact in FIGURE 65 when the horizontal range from the airplane to the aim point 2002 is less than 200 miles.

The movable contacts of the switches 2085, 2086 and 2088 are ordinarily in the positions shown in FIGURE 65. When the switches are in this position and the range of the airplane is greater than 200 miles, a continuous circuit is established which includes the power supply 10, the resistance 2091, the movable and right stationary contacts of the switch 2085, the left stationary and movable contacts of the switch 2086 and the capacitance 2092. The capacitance 2092 is able to become charged by a flow of current through this circuit since the cathode of the diode 2094 is at a potential above ground. This results from the fact that the flip-flop 2101 is normally in the false state of operation.

When the capacitance 2092 becomes charged, a relatively high voltage is introduced to the cathode of the diode 2096 to prepare the "and" network formed by the diodes 2096, 2100 and 2103 for operation. This causes a relatively high voltage to the produced by the "and" network upon the next introduction of an "origin" pulse from the cathode follower 168 to the cathode of the diode 2100. The signal produced by the "and" network triggers the flip-flop 1358 to the true state of operation.

When the flip-flop 2101 becomes triggered to the true state of operation, a relatively low voltage is produced on the right output terminal of the flip-flop. This low voltage causes the capacitance 2092 to discharge through a circuit including the capacitance, the diode 2094 and the flip-flop 2101.

Since the capacitance 2092 has become discharged as described above, the flip-flop 2101 cannot again become triggered to the true state of operation until the capacitance has again become charged. In this way, the flip-flop 2101 becomes alternately triggered to its true and false states of operation at a rate dependent upon the value of the capacitance 2092 when the range is greater than 200 miles and the switches 2085, 2086 and 2088 are in the positions shown in FIGURE 65. The resultant signals produced by the flip-flop 2101 act in a direction to reduce the range below 200 miles as will be described subsequently. In this way, the signals act on the indications of range in a direction corresponding to the movements of the airplane toward the aim point 2002.

When the range from the airplane 2000 to the aim point 2002 becomes less than 200 miles, the movable contact of the switch 2090 becomes automatically pivoted into engagement with the left stationary contact in FIGURE 65 so as to ground the switch. This prevents the capacitance 2092 from being charged through a circuit including the resistance 2091. Since the capacitance 2092 cannot become charged, the flip-flop 2101 cannot be triggered to the true state of operation as long as the switches 2085, 2086 and 2088 are in the position shown in the drawings. In this way, signals cannot be produced to reduced the range below 200 miles when the range is already less than that distance and when the switches 2085, 2086 and 2088 are in the positions shown in FIGURE 65.

Upon the manual actuation of the tracking stick 2084 toward the left in FIGURE 65, the movable contact of the switch 2085 becomes pivoted from the position shown in FIGURE 65 into engagement with the left stationary contact. The switch 2085 becomes actuated in this manner when the tracking stick 2084 is pivoted in a direction to produce positive ΔR increments as represented by ΔR. This causes a charging circuit to become established to the capacitance 2092. This charging circuit includes the power supply 10, the upper portion of the potentiometer 2082 in FIGURE 65, the left stationary and movable contacts of the switch 2085, the left stationary and movable contacts of the switch 2086 and the capacitance 2092.

The rate of charging the capacitance 2092 is dependant upon the portion of the potentiometer 2082 in the circuit, this in turn being dependant upon the pivotal movement of the tracking stick 2084. In this way, the pivotal movement of the tracking stick 2084 controls the rate at which the flip-flop 2101 becomes alternately triggered true and false. This in turn controls the rate at which the indications of range become reduced below 200 miles. At certain times, the tracking switch 2084 may be pivoted in an opposite direction to obtain negative ΔR increments in the range as represented by $\overline{\Delta R}$. At such times the tracking switch 2084 engages the plate 2087 which in turn actuates the movable contacts of the switches 2086 and 2088. This causes the movable contact of the switches 2086 and 2088 to be pivoted in a direction for engaging the right stationary contacts of the switches in FIGURE 65. Because of the operation of the switch 2086, a continuous circuit is established for charging the capacitance 2092. This continuous circuit includes the power supply 10, the lower portion of the potentiometer 2082 in FIGURE 65, the right stationary and movable contacts of the switch 2086 and the capacitance 2092.

As previously described, the flip-flop 2101 becomes triggered to the true state of operation upon a charging of the capacitance 2092. When the flip-flop 2101 becomes triggered to the true state of operation, a relatively high voltage is produced on the left output terminal of the flip-flop and a relatively low voltage is produced on the right output terminal of the flip-flop. Because of the low voltage on the right output terminal of the flip-flop 2101, the capacitance 2092 is able to discharge through a circuit including the capacitance, the diode 2094 and the flip-flop.

The flip-flop 2101 becomes triggered to the true state of operation in accordance with the logical equation:

$$V_R=\delta_R NT(\overline{\Delta R}+\overline{\Omega}) \qquad (279)$$

Where:

$V_R$=the introduction of a triggering signal to the left input terminal of the flip-flop 2101;

$\delta_R$=the production of a high voltage of the cathode of the diode 2096 to indicate the charging of the capacitance 2092 and the simultaneous operation of the flip-flop 2101 in the false state;

$\overline{\Omega}$=the production of a grounded potential on the movable contact of the switch 2090 to indicate a range of less than 200 miles; and $\overline{\Delta R}$=the production of signals to obtain a range of less than 200 miles when the switches 2086 and 2088 are engaging the left stationary contacts in FIGURE 65.

At the time that the flip-flop 2101 becomes triggered to the true state of operation, an "and" network 2102 becomes prepared for activation. The "and" network 2102 subsequently becomes activated when the $K_7$ flip-flop 268 becomes triggered to the true state of operation. This occurs when approximately one half of the blocks in the digital differential analyzer have been presented for computation. The signal passing through the "and" network 2102 triggers the flip-flop 2101 to the false state of operation. The flip-flop 2101 becomes triggered to the false state of operation in accordance with the logical equation:

$$\bar{v}_r = V_r K_7 T \qquad (280)$$

Where:

$\bar{v}_r$=the introduction of a triggering signal to the right input terminal of the flip-flop 2101;

$V_r$=the production of a relatively high voltage on the right output terminal of the flip-flop 2101; and the other terms have previously been defined.

As will be seen, the value of the resistance in the circuit for charging the capacitance 2092 through the potentiometer 2082 is dependent upon the positioning of the movable arm of the potentiometer. This is in turn dependent upon the positioning of the tracking stick 2084. Since the flip-flop 2101 can be triggered to the true state of operation only when the capacitance 2092 has become charged, the positioning of the tracking stick 2084 determines the rate at which the flip-flop becomes triggered to the true state.

When the movable contact of the switch 2088 is manually pivoted to engage the left stationary contact in FIGURE 65, certain stages shown in FIGURE 29 become operative. These stages include the "and" network 1468 in FIGURE 29. As will be seen, the "and" network 1468 in FIGURE 29 can become operative only in a single-block operation or in the second half of a double-block operation because of the introduction of a signal from the left output terminal of the $G_5$ flip-flop 390. The "and" network 1468 is further able to become operative only for a coding of $L_1\bar{L}_3$ permanently recorded in the channels 140 and 144. This coding is recorded only for a particular block. Upon the presentation of this block for computation during periods of actual computation as represented by a signal from the cathode follower 1340, a signal passes through the stages 1468, 1474, 1476, 1478 and 1480. This signal triggers the flip-flop 337 to the true state of operation for a recordation of an indication of "1" in the channel 138 by the coil 270. This binary indication of "1" is recorded in the channel 138 in accordance with the logical equation:

$${}_0z = \alpha \Delta R L_1 \bar{L}_3 G_5 T \qquad (281)$$

Where:

$\Delta R$=a relatively high voltage from the cathode follower 1472 to indicate a positive increment in range, the cathode follower being connected to produce a signal when the switch 2088 (FIGURE 65) is in the ΔR position to represent positive increments in range; and the other terms have previously been defined.

The "and" network 1516 in FIGURE 30 becomes prepared for operation at the same time as the "and" network 1468 in FIGURE 29. However, the "and" network 1516 passes $\overline{\Delta R}$ signals representing negative increments in range. These signals pass through the stages 1518, 1520, 1522 and 1524 to the right input terminal of the flip-flop 337 and trigger the flip-flop 337 to the false state of operation such that indications of "0" are recorded by the coil 270 in the channel 138. Indications of "0" become recorded in the channel 138 by the passage of signals through the stages 1516, 1518, 1520, 1522 and 1524 in accordance with the logical equation:

$${}_0z = \overline{\Delta R} L_1 \bar{L}_3 G_5 T \qquad (282)$$

$\overline{\Delta R}$=signals produced by the cathode follower 1520 to represent digital decreases in the range from the airplane 2000 to the aim point 2002, such signals being produced upon the operation of the switch 2088 in the $\overline{\Delta R}$ positions; and the other terms have previously been defined.

As will be seen, the "α" term is not included in Equation 282 since indications of "0" should be recorded in the channel 138 whether or not actual computation is proceeding.

The signals recorded in the channel 138 in accordance with the logic expressed in Equations 281 and 282 are presented for computation at position 8 of the block 32 (see FIGURE 55). The block 32 is coded to operate as an $H_1$ type of servo. The signals recorded in the channel 138 are actually introduced to the block 32 only when the flip-flop 2101 is true. This results from the operation of the flip-flop 868 in FIGURE 64 and particularly from the operation of the logical networks 2104, 2105, 2106 and 2108 in triggering the flip-flop to the false state of operation. As will be seen, the flip-flop 858 becomes triggered to the false state of operation at position 7 so as to be false at position 8. The flip-flop 868 becomes triggered false at block 31 so as to provide a control over the introduction of signals during block 32.

The flip-flop 868 in FIGURE 64 becomes triggered to the false state of operation by the passage of signals through the stages 2104, 2106 and 2108 in accordance with the logical equation:

$$\bar{q} = T \bar{v}_R B_{31} P_7 T \qquad (283)$$

As may be seen in FIGURE 64, Equation 283 represents only one of the situations in which the Q flip-flop 868 is triggered false. The Q flip-flop 868 is actually triggered false at certain times, for each block which operates on a "deleted address" basis. The Q flip-flop 868 is triggered false only at a particular position in the blocks operating on a "deleted address" basis as may be seen from the logic set forth in FIGURE 64.

As will be seen, the flip-flop 868 becomes triggered to its false state of operation at the proper position when the flip-flop 2101 is in its false state of operation. Since the rate of triggering the flip-flop 2101 to the false state of operation is dependent upon the positioning of the tracking stick 2084 in FIGURE 65, signals are able to be introduced to the block 32 only at a rate dependent upon the positioning of the tracking stick 2084. Signals are able to be introduced to the block 32 only when the flip-flop 868 is in the true state of operation since the flip-flops 860, 862, and 864 in FIGURE 16 can operate only upon a true state of operation of the flip-flop 868. As previously described, the function of the flip-flops 860, 862 and 864 is to introduce increments in a servo operation.

Figure 56:
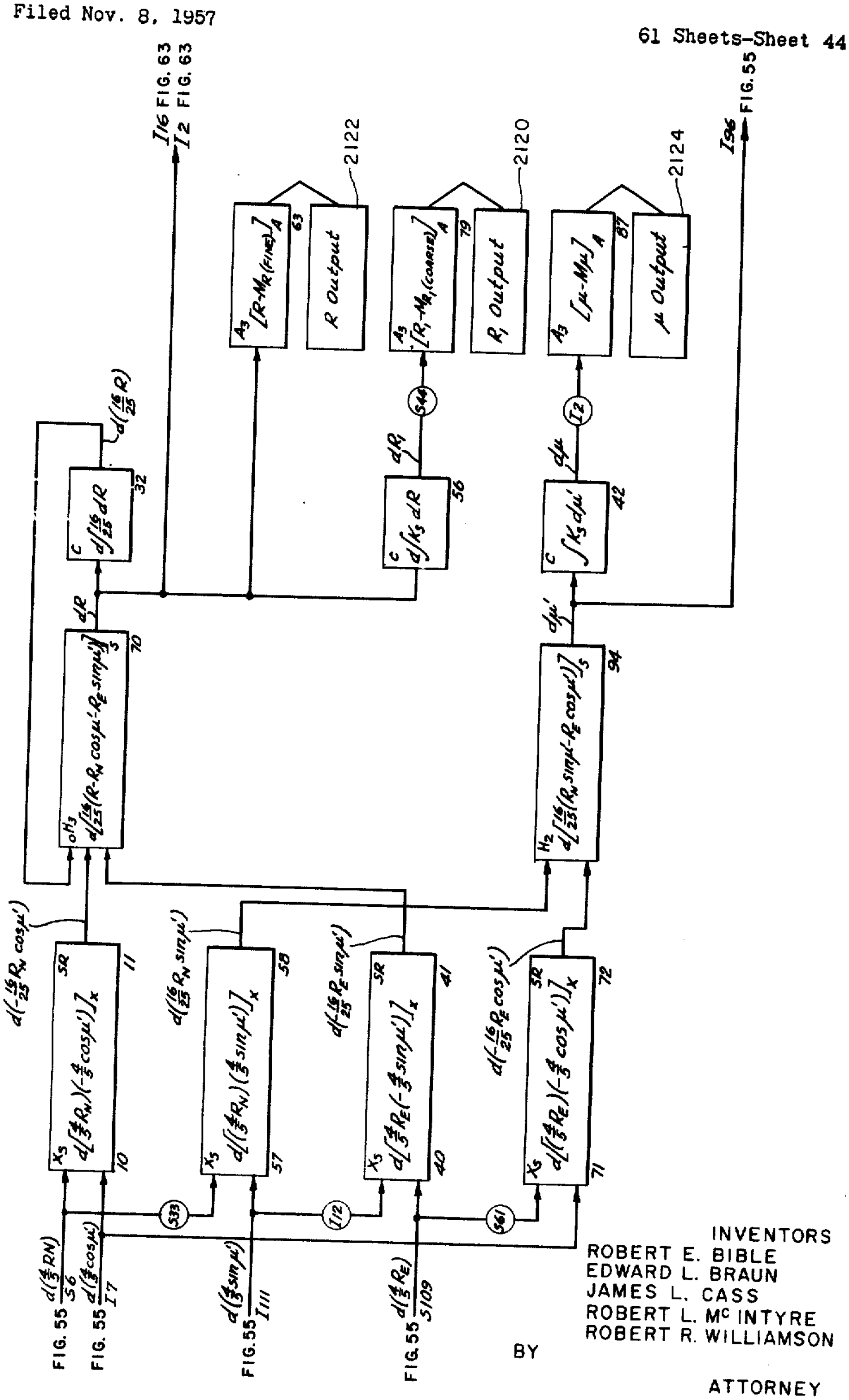

The signals passing from the block 32 in FIGURE 55 represent the negative increments of range. These signals are introduced to the repeater block 122, which in turn passes the signals to the blocks 21 and 35. The blocks 21 and 35 operate as normal integrators to combine the signals representing ΔR with signals representing the trigonometric functions of the angle $\mu$, this angle being shown in FIGURE 67. The signals representing the trigonometric functions of the angle $\mu$ are obtained by the operation of the blocks 96, 111 and 7. The block 96 receives the signals representing $du$ in accordance with the operation of certain stages which are shown in FIGURE 56 and which will be described in detail subsequently. These signals are introduced to the blocks 111 and 7 in FIGURE 55. The blocks 111 and 7 are interrelated to produce respectively sin $\mu$ and cos $\mu$.

As previously described, the circuit shown in FIGURE 65 operates to control the formation of ΔR signals representing changes in the range from the airplane 2000 to the aim point 2002. A similar circuit is provided in FIGURE 66 to control the formation of $\Delta\mu$ signals representing changes in the positioning of the airplane 2000 in a direction perpendicular to the range line as may be seen in FIGURE 67. The only difference between the circuit shown in FIGURE 66 and the circuit shown in FIGURE 65 is that the cathode of a diode 2109 in the $\Delta u$ circuit (FIGURE 66) corresponding to the cathode of the diode 2088 in FIGURE 65 is permanently grounded. In this way, no distinction is provided between distances greater or less than a particular value in a manner similar to the distinction provided in FIGURE 65 between ranges greater or less than a particular value.

The signals representing increments of $\Delta\mu$ or $\overline{\Delta}\mu$ are obtained by moving the tracking stick 2084 toward plates 2117 and 2119 in FIGURE 66. As may be seen, such movements are perpendicular to the movements of the tracking stick in producing signals representing increments of $\Delta R$ or $\overline{\Delta}R$. Increments representing $\Delta R$ or $\overline{\Delta}R$ are obtained by moving the tracking stick 2084 toward the plates 2083 and 2087 in FIGURE 65, as described previously.

Just as the flip-flop 2101 in FIGURE 65 can become triggered to the true state of operation only after the capacitance 2092 has become charged, the flip-flop 1358 in FIGURE 66 can become triggered to the true state only after a capacitance 2111 corresponding to the capacitance 2092 has become charged. The flip-flop 1358 becomes triggered to the true state of operation in accordance with the logical equation:

$$v_u = L_u N \alpha T \quad (284)$$

Where:

$v_u$=the introduction of a triggering signal to the left input terminal of the flip-flop 1358;

$L_u$=a charge produced across the capacitance 2111 to provide a relatively high voltage on the cathode of a diode 2113;

$\alpha$=a signal indicating that computation by the digital differential analyzer is proceeding; and the other terms have previously been defined.

The flip-flop 1358 becomes triggered ot the false state of operation in accordance with logic similar to that previously expressed for the flip-flop 2101. This logic may be expressed as $$\overline{v}_u = V_u K_7 \alpha T \quad (285)$$

Where:

$\overline{v}_u$=the introduction of a triggering signal to the right input terminal of the flip-flop 1358;

$V_u$=the production of a relatively high voltage on the left output terminal of the flip-flop 1358; and the other terms have previously been defined.

The $\Delta u$ signals are introduced to the channel 138. These signals are produced in accordance with the positioning of the tracking stick 2084 and upon the actuation of a switch 2121 in FIGURE 66 corresponding to the switch 2088 in FIGURE 65. The $\Delta u$ signals become introduced to the line 138 by passing through the stages 1466, 1474, 1476, 1478 and 1480 to the flip-flop 337 in FIGURE 29. The signals are able to pass through the stages 1466, 1474, 1476, 1478 and 1480 only in a single-block operation or in the second half of a double-block operation because of the introduction of the voltage on the left output terminal of the $G_5$ flip-flop 390 to the "and" network 1466. The signals are further able to pass through the stages only upon the occurrence of a particular coding designated as $L_1L_3$ permanently programmed into the channels 140 and 144. Signals pass through the stages 1466, 1474, 1476, 1478 and 1480 for recording int he channel 138 in accordance with the logical equation:

$$_oz = \alpha \Delta u L_1 L_3 G_5 T \quad (286)$$

Where:

$\Delta u$=signals produced by the cathode follower 1470 to represent incremental increases in angle in accordance with the operation of the tracking stick 2084, such signals being produced in the $\Delta u$ position of the tracking stick 2084; and the other terms have previously been defined.

The "and" network 1514 in FIGURE 30 becomes prepared for operation at the same time as the "and" network 1466 in FIGURE 29. When the "and" network 1514 in FIGURE 30 becomes prepared for operation, $\overline{\Delta}u$ signals representing negative increments in distance pass through the "and" network. The signals then pass through the stages 1518, 1520, 1522 and 1524 and trigger the flip-flop 337 to the false state of operation. This causes indications of "0" to be recorded by the coil 270 in the channel 138. Indications of "0" become recorded in the channel 138 in accordance with the logical equation:

$$_oz = \overline{\Delta}u L_1 L_3 G_5 T \quad (287)$$

Where:

$\overline{\Delta}u$=signals produced by the cathode follower 1518 to represent digital decreases in distance in accordance with the operation of the tracking stick 2084, such signals being produced in the $\overline{\Delta}u$ position of a switch 2121 in FIGURE 66 corresponding to the switch 2088 in FIGURE 65; and the other terms have previously been defined.

The signals representing $\Delta u$ and $\overline{\Delta}u$ are introduced in FIGURE 55 the block 50, which operates as an $H_1$ type of servo. The block 50 is also controlled on the basis of a "deleted address" in accordance with the operation of the Q flip-flop 868. As previously described, signals representing increments are able to be introduced to the flip-flops 860, 862 and 864 only when the Q flip-flop 868 is true. The Q flip-flop becomes triggered false at particular times that the $V_u$ flip-flop 1358 is in its false state of operation. Specifically, the Q flip-flop becomes triggered false at position 1 of block 49 during the false state of the $V_u$ flip-flop 1358 so as to be false at position 2 of that block. This prevents the $\Delta u$ and $\overline{\Delta}u$ signals from being introduced to the block 50 at position 2.

The output signals representing $\Delta\mu$ and $\overline{\Delta}\mu$ from the block 50 in FIGURE 55 are introduced through the repeater block 71 to the blocks 9 and 24. The blocks 9 and 24 also respectively receive the signals representing cos $u$ and sin $u$ from the blocks 7 and 111. The blocks 9 and 24 operate as normal integrators to combine the signals introduced to them so as to produce signals respectively representing $\Delta u \cos u$ and $\Delta u \sin u$. The signals from the blocks 9 and 21 are introduced to the block 88, which operates as an $_oH_3$ type of servo. The signals are combined in the block in accordance with the following equation:

$$\Delta R_E = \Delta R \sin \mu + \Delta u \cos \mu \quad (288)$$

This relationship may be seen from FIGURE 67. By rearranging Equation 288 as $$\Delta R_E - \Delta R \sin \mu + \Delta u \cos \mu = 0 \quad (288a)$$

the value of $\Delta R_E$ may be obtained by the production of error signals from the block 88 in FIGURE 55.

In like manner, the block 59 in FIGURE 55 receives the signals from the blocks 24 and 35 and combines these signals in an $_oH_3$ type of operation. These signals represent $\Delta R_N$ in accordance with the following relationship:

$$\Delta R_N = \Delta R \cos \mu - \Delta u \sin \mu \quad (289)$$

The signals from the block 59 and from the block 88 are respectively introduced to the blocks 6 and 109 as described previously.

The signals from the blocks 6 and 7 in FIGURE 55 pass to the blocks 10 and 11 in FIGURE 56. The blocks 10 and 11 operate in a "special products" relationship to produce signals representing $R_N \cos \mu$. In like manner, the blocks 57 and 58 operate in a "special products" relationship to produce signals representing $R_N \sin \mu$. The blocks 40 and 41 also operate in a similar manner to produce signals representing $R_E \sin \mu$ and the blocks 71 and 72 operate to produce signals representing $R_E \cos \mu$.

The signals from the blocks 10 and 11 and the blocks 40 and 41 are introduced to the block 70, which operates as an $H_3$ type of servo. The resultant signals produced by the block 70 represent changes in the range between the airplane 2000 and the aim point 2002. These signals represent changes in the range in accordance with the equation $$R=R_N \cos \mu + R_E \sin \mu \qquad (290)$$

This relationship may be seen from the vector diagram illustrated in FIGURE 67. The signals from the block 70 are introduced to the block 32, which serves as a constant integrator to change the scale factor. The signals from the block 32 are then fed back to the block 70 to obtain a servo operation of the block 70.

The signals from the block 70 are also introduced to the block 56, which operates as a constant integrator to scale the signals down by a ratio of 8 to 1. The signals then pass to the repeater block 44, which in turn introduces the signals to the block 79. The block 79 controls the production of signals by stages 2120 and the conversion of these signals by the stages into corresponding analogue values. The indications produced by the stages 2120 provide a coarse indication of range because of the scaling down produced by the block 56. A fine indication of range is provided by stages 2122, which operates in conjunction with the block 63 to follow the indications of range introduced to the block.

Similarly, the block 94 receives the signals from the blocks 57 and 58 and the blocks 71 and 72. The block 94 operates as an $H_2$ type of servo to combine these signals so as to obtain signals representing changes in the bearing angle $\mu$. These signals represent changes in the bearing angle $u$ in accordance with the following relationship:

$$R_N \sin u - R_E \cos u = 0 \qquad (291)$$

This relationship may be seen in FIGURE 67. Since $R_N$ and $R_E$ are both obtained from the range R, the only deviations producing errors in the solution of the above equation will result from changes in the bearing angle $\mu$. In this way, the block 94 operates to produce signals representing the bearing angle $\mu$.

The output signals from the block 94 are introduced to the block 42, which operates as a constant integrator. The signals are then introduced to the repeater block 2, which in turn introduces the signals to the block 87. The block 87 operates as an $A_3$ type of servo to control the production of output signals in associated stages 2124. These stages may be adapted to provide output indications of the bearing angle $\mu$ in an analog form.

Figure 57:
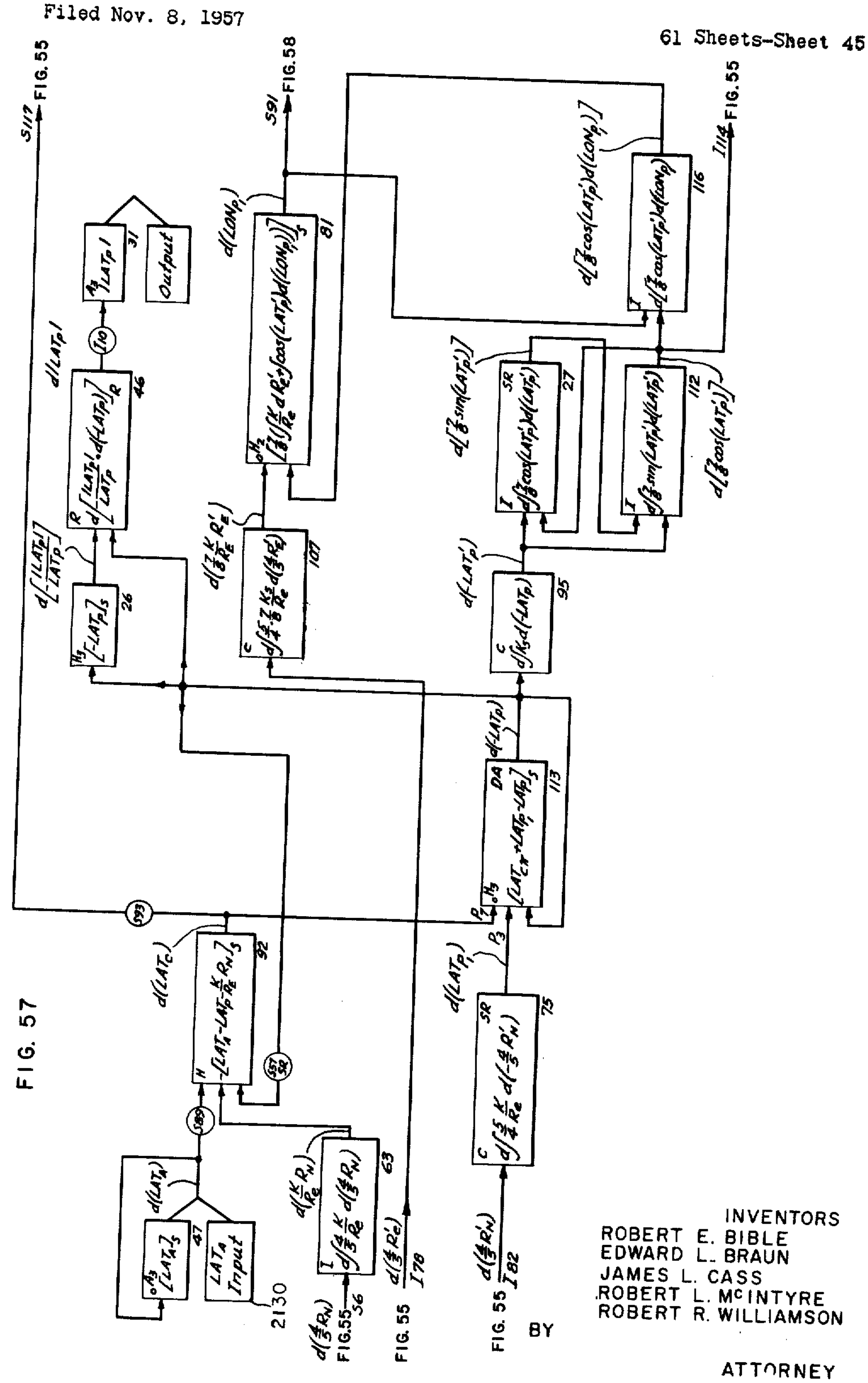

In order to understand fully the operation of the blocks shown in FIGURES 57 and 58, the relationship shown vectorially in FIGURE 71 should perhaps first be explained. As will be seen, FIGURE 71 schematically illustrates a portion of the earth. The relative positions of the airplane 2000 and the aim point 2002 at a particular instant are schematically illustrated in FIGURE 71. The position of the airplane 2000 may be defined at that instant or at any other instant by the latitude and longitude of the airplane. Similarly, the position of the aim point 2002 may be defined by the latitude and longitude of the aim point.

As will be seen, the lines of latitude extend around the surface of the earth in a direction parallel to the equator. Because of this, movement in a direction perpendicular to the lines of latitude represent a movement toward the north or south. It will thus be seen that $$R_N = R_e\ (\text{lat}_A - \text{lat}_P) \qquad (292)$$

Where:

$R_N$= the northern component of range between the airplane 2000 and the aim point 2002 as defined previously;

$R_e$=the radius of the earth;

$\text{lat}_A$=the latitude of the aim point 2002; and $\text{lat}_P$=the latitude of the airplane 2000.

The equation set forth in the previous paragraph is a simplification of the equation $R_N=R_e \sin(\text{lat}_A-\text{lat}_P)$.

This simplification can be made on the basis that the sine of a small angle actually approximates the angle. It will also be seen that the value of $R_N$ is represented as a chord whereas actually it is an arcuate segment. This may be considered to introduce an error. However, for small angles the value of the chord does actually approximate the value of the arcuate segment. Furthermore, as the airplane 2000 approaches the aim point 2002, the value of the chord actually does approach the value of the arcuate segment since the angle defined by $(\text{lat}_A-\text{lat}_P)$ decreases.

Similarly, the lines of longitude extend around the surface of the earth in a direction perpendicular to the lines of latitude and between the north and south poles of the earth. Because of this, adjacent lines of longitude gradually converge as they extend from the equator toward the north and south pole. In order to account for this convergence, a factor should be included to indicate the average distance of the airplane 2000 and the aim point 2002 from the equator. This factor can be represented as cos $$\frac{(\text{lat}_A+\text{lat}_P)}{2}$$

Since the difference between $\text{Lat}_A$ and $\text{Lat}_P$ is generally relatively small, the factor set forth in the previous sentence can be simplified by making $\text{lat}_A=\text{lat}_P$. This causes the factor to become cos $\text{lat}_P$.

The equation for the eastern component of range can be considered as being similar to the equation for the northern component of range with the addition of the factor cos lat $p$. In this way, $$R_E = R_e\ (\text{Lon}_A - \text{Lon}_P) \cos \text{Lat}_P \qquad (293)$$

Where:

$R_E$=the eastern component of the distance between the airplane 2000 and the aim point 2002.

The value of $R_E$ can be considered as having a slight error because it is computed as a chord whereas it is actually an arcuate segment. However, the error is relatively small and decreases as the airplane 2000 approaches the aim point 2002. This has been described in detail in connection with the northern component of range.

The blocks shown in FIGURES 57 and 58 solve for $R_N$ and $R_E$ in accordance with the vectorial relationships set forth in equations 292 and 293. One set of signals introduced to the blocks shown in FIGURE 57 is obtained from the block 6 in FIGURE 55. This set of signals is introduced to the block 63 and is intended to represent the northern component of range between the airplane 2000 and the aim point 2002. The block 63 operates as a constant integrator to change the scale factor of the signals introduced to it and introduces the resultant signals to the block 92.

The block 92 in FIGURE 57 also receives signals from the repeater block 89, which in turn receives signals from the block 47. The block 47 operates as an ${}_oA_3$ type of servo to follow the signals produced by stages 2130. The signals produced by the stages 2130 represent the latitude of the aim point 2002. Because of this, the signals produced by the stages 2130 can remain constant as long as the aim point 2130 remains fixed.

The block 92 operates on a servo basis on the signals from the block 63 and from the repeater block 89. The block 92 operates on the signals introduced to it in accordance with the logic set forth in equation 292 so as to produce signals representing changes in the relative latitude between the airplane 2000 and the aim point 2002. These signals are introduced to the block 113 which operates as an ${}_oH_3$ type of servo on a "deleted address" basis. The block 113 also receives signals from the block 75 which operates as a constant integrator to vary the scale factor of the signals introduced to it. The block 75 operates to reverse the sign of the signals introduced to it. Signals are introduced to the block 75 from the block 82 in FIGURE 55. These signals are produced during the mode of operation designated as "dead reckoning." In this mode of operation, measurements in the change in the position of the airplane 2000 must be computed by the digital differential analyzer on the basis of previous measurements, since current measurements cannot be made because of external conditions.

Since the block 113 operates in the mode designated as "deleted address," it is capable of accepting or rejecting certain of the signals introduced to it. For this reason, the block operates either on the signals from the block 75 alone or on the signals from the block 75 and the block 92. In this way, the output signals from the block 113 represent changes in the latitude of the airplane 2000. These signals are introduced to the block 95, which operates as a constant integrator to change the scale factor of the signals. The output signals from the block 95 are then introduced to the blocks 27 and 112, both of which operate as normal integrators. The blocks 27 and 112 are so interrelated that the block 27 produces signals representing sin $lat_P$ and the block 112 produces signals representing cos $lat_P$.

The signals from the block 113 are introduced to the block 26 as well as to the block 95. The block 26 operates as an $H_3$ type of servo to produce signals representing the sign of the quantity introduced to it. This may be represented as $$\frac{-|lat_P|}{lat_P}$$

Actually, the block 26 operates to indicate $$\frac{|-Lat_P|}{Lat_P}$$

since the value of $-Lat_P$ is introduced to the block. The output signals from the block 26 are introduced to the block 46, which also receives the signals from the block 113. The block 46 operates as a servo type of repeater block to combine the signals from the blocks 26 and 113 so as to obtain signals representing $$\frac{-|Lat_P|}{Lat_P}d(-Lat_P)$$

By factoring out $Lat_P$ in the numerator and in the denominator, it will be seen that the block 46 produces representing the absolute value of Lat $p$. This is designated as |Lat $p$|. The output signals from the block 46 are introduced to the repeater block 10, which in turn introduces the signals to the block 31. The block 31 operates as an $A_3$ type of servo and cooperates with stages 2136 to produce signals representing $|Lat_P|$. These output indications may have an analogue form.

Just as the signals from the block 82 in FIGURE 55 are introduced to the block 75 in FIGURE 57, the signals from the block 78 in FIGURE 55 are introduced to the block 107 in FIGURE 57. The block 107 operates as a constant integrator to multiply the value of the signals by a constant representing $K_s/R_e$, where $R_e$ is the radius of the earth and $K_s$ is a constant. The signals are then introduced to the block 81, which operates as an $_0H_2$ type of servo. The block 81 also receives the signals from the block 116 which operates as a normal integrator to combine the signals from the blocks 81 and 112. The block 81 produces signals representing $\Delta Lon_P$. The block 81 produces such signals in accordance with the equation:

$$\cos Lat_P\ (\Delta Lon_P) = \frac{K_s S_e}{R_e} \qquad (294)$$

As will be seen, the above equation is similar to equation 293 except that $\Delta Lon_P$ is substituted for $Lon_A - Lon_P$. Since $Lon_A$ remains fixed in position for a given aim point, the changes in $Lon_P$ can be considered as being equivalent to $\Delta Lon_P$. These signals are introduced to the block 116, which operates as a normal integrator to combine the signals with the signals from the block 112. The resultant signals produced by the block 116 represent $\Delta Lon_P$ cos $Lat_P$.

The blocks shown in FIGURE 58 operate in a manner similar to certain of the stages shown in FIGURE 57 to obtain signals representing ($Lon_P$) and $\Delta Lon_P$. The blocks shown in FIGURE 58 include the block 43, which operates as an $_0A_3$ type of servo to follow the signals introduced to it from stages 2140 to represent the longitude of the aim point 2002. This is designated as "$Lon_A$." The signals from the block 43 are introduced to the block 72, which operates as an $_0H_3$ type of servo. The block 72 also receives signals from the repeater block 100, which in turn has the output signals from the block 91 introduced to it. The output signals produced by the block 91 represent the longitude of the airplane 2000, as will be described in detail subsequently.

The block 72 operates to combine the signals representing $Lon_P$ and $Lon_A$ to produce signals representing the difference in the longitudinal positions of the airplane 2000 and the aim point 2002. These signals represent "ΔLon," which can be considered as the increment in the longitude required to bring the airplane 2000 over the aim point 2002. The output signals from the block 72 are introduced to the repeater block 97, which operates as a repeater block to have the signals introduced to the blocks 114 and 115.

The blocks 114 and 115 operate on a "special products" basis to combine the signals from the repeater block 97 with the signals from the block 112 in FIGURE 57 so as to produce signals representing ΔLon cos $Lat_P$. These signals are introduced to the block 56 for combination with the signals from the block 54, which operates as a constant integrator to change the scale factor of the signals from the block 109 in FIGURE 55, such signals representing the eastern component of the range R. In this way, the signals to the block 56 from the block 54 represent a value proportional to $K_s R_E/R_e$. The block 56 operates as an $H_2$ type of servo to combine the signals introduced to it so as to obtain signals representing ΔLon. As will be seen, ΔLon is equivalent to $Lon_A - Lon_P$. Since $Lon_P$ approaches $Lon_a$ as the airplane 2000 approaches the aim point 2002, ΔLon can be considered as the longitudinal angle required for the airplane to reach the aim point. The value of ΔLon is obtained by combining values in a vectorial relationship corresponding to that set forth in Equation 293.

The signals from the block 56 are introduced to the block 91, which also receives signals from the block 81 in FIGURE 57. The block 91 operates as an $_0H_3$ type of servo on a "deleted address" basis to combine the signals from the blocks 56 and 81 for the production of output signals representing a value proportional to $Lon_P$. Since the block 91 operates in the mode of "deleted address," it either accepts the signals from the block 81 alone or it combines the signals from the blocks 56 and 81. As previously described, the signals from the block 56 are obtained by "dead reckoning" in accordance with computations made by the digital differential analyzer from previous measurements. "Dead reckoning" is generally used when the equipment has to project positions of the airplane from previous measurements since present measurements cannot for one reason or another be successfully made.

The output signals from the block 91 are introduced to the repeater block 114, which in turn introduces the signals to the block 5. The block 5 operates as a constant integrator to change the scale factor of the signals so as to produce signals directly representing $Lon_P$. The output signals from the block 5 are introduced directly to the block 7 and through the repeater block 28 to the block 7. The block 7 operates as an $H_1$ type of servo to combine the signals introduced to it for the production of signals representing the sign of the longitude of the airplane 2000. Actually, the signals from the block 7 represent the negative value of the sign of $Lon_p$. This may be indicated as $$-\frac{|\mathrm{Lon\ P}|}{\mathrm{Lon\ P}}$$

The output signals from the block 7 are introduced to the block 64, as are the signals from the block 91, these signals being introduced through the repeater block 114. The block 64 operates upon these signals to produce signals representing $$-\frac{|\mathrm{Lon\ P}|}{\mathrm{Lon\ P}}(-\mathrm{Lon\ p})$$

This may be simplified to $-|\mathrm{Lon\ p}|$ by factoring $Lon_P$ from both the numerator and the denominator. It will be seen that the resultant signals from the block 64 represent the absolute value of $Lon_p$. These signals are introduced to the block 55, which operates as an $H_3$ type of servo in conjunction with stages 2142 such that the stages 2142 produce output signals representing $|Lon_P|$. The output signals from the stages 2142 may be in analogue form.

As previously described, the aim point 2002 is chosen as a landmark easily recognized from the air. For example, the aim point 2002 may be a tall tower or a high smoke stack or an odd-shaped building. Preferably, the aim point 2002 is relatively close to an actual target 2150 (FIGURE 72) although the proximity between the aim point and the target is not absolutely necessary. Since the aim point 2002 and the target 2150 are generally preselected, the distance between the aim point and the target is fixed. This distance may be designated as "S." The angle between true north and the line extending from the aim point 2002 to the target 2150 is also fixed. This angle may be designated as "$\psi$." As will be seen in FIGURE 72, the quantities S and $\psi$ and the northern and eastern components of range between the position of the airplane 2000 and the aim point 2002 ($R_N$ and $R_E$) may be used in computing the distance between the airplane and the target 2150. This distance may be designated as "A."

As will be seen, the northern component of the distance between the airplane 2000 and the target 2150 may be obtained from the following relationship:

$$A_N=R_N+S\cos\psi \qquad (295)$$

Where:

$A_N$=the northern component of the distance between the airplane 2000 and the target 2150; and the other terms have previously been defined.

Similarly, $$A_E=R_E+S\sin\psi \qquad (296)$$

Where:

$S_E$=the eastern component of the distance between the airplane 2000 and the target 2150; and the other terms have previously been defined.

Figure 59:
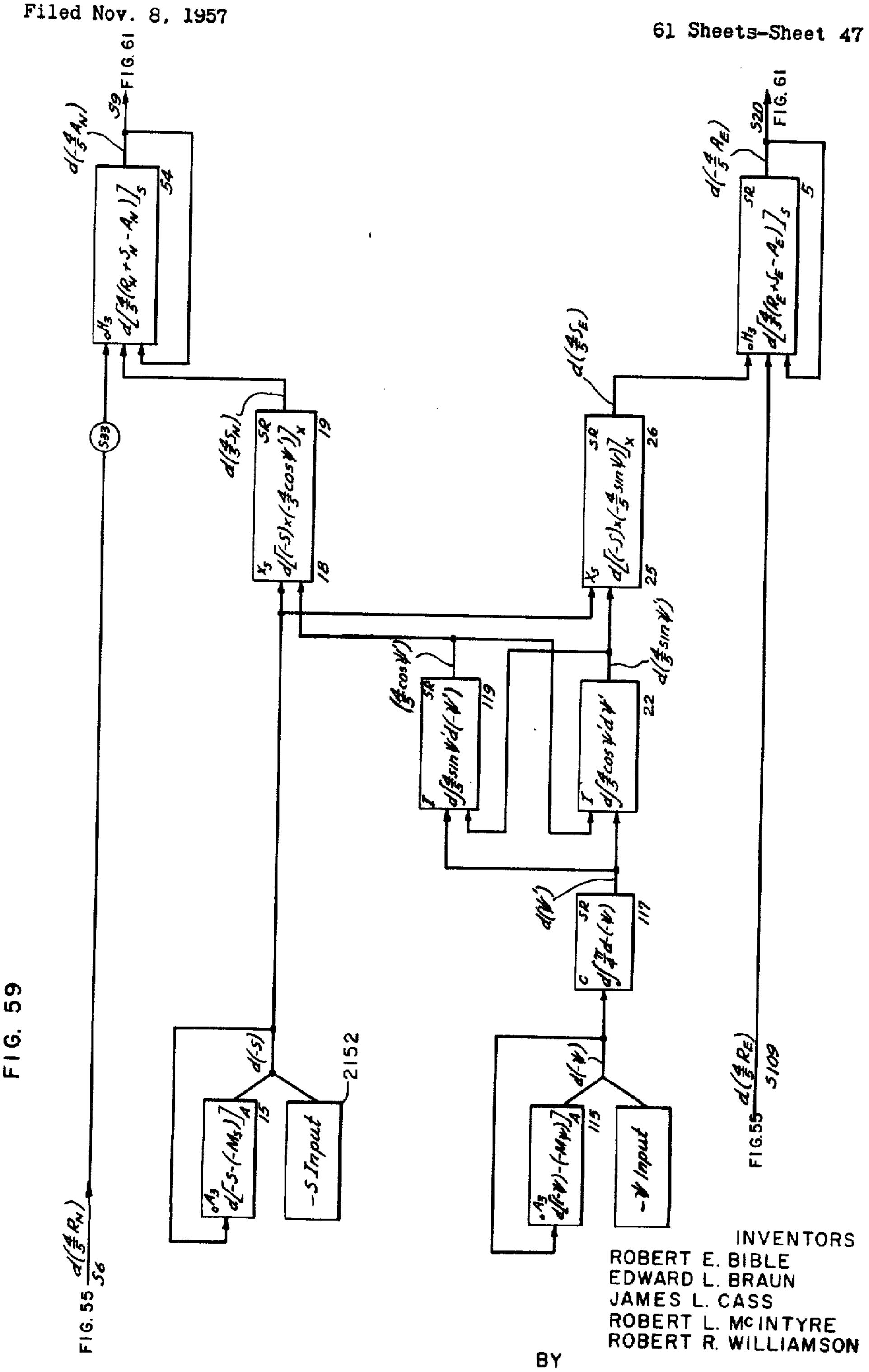

Since the distance S (FIGURE 72) remains constant for a given aim point 2002 and target 2150, the value of S can be inserted by hand input into stages 2152 in FIGURE 59 and can be converted by the stages 2152 from an analogue quantity into a plurality of digital signals. The block 15 follows the signals introduced to the stages 2152 by operating as an ${}_0A_3$ type of servo. Similarly, the angle $\psi$ (FIGURE 72) can be inserted by hand input into stages 2154 since the angle remains constant for a given aim point 2002 and target 2150. The block 115 in FIGURE 59 operates as an ${}_0A_3$ type of servo to follow the signals introduced to the stages 2154 for the production of a plurality of signals representing the angle $\psi$ in digital form.

The signals produced by the block 115 are introduced to the block 117, which operates as a constant integrator to change the signals into a representation of radians. The signals from the block 117 are then introduced to the blocks 22 and 119, which operate as normal integrators. The blocks 22 and 119 are interrelated to produce signals respectively representing sin $\psi$ and cos $\psi$.

The output signals from the block 22 are introduced to the blocks 25 and 26, which also receive signals representing the distance S from the block 15. The blocks 25 and 26 perform a "special products" operation to produce signals representing $S\sin\psi$. The output signals from the blocks 25 and 26 are then introduced to the block 5, as are the signals from the block 109 in FIGURE 55. The block 5 operates as an ${}_0H_3$ type of servo to produce signals representing $A_E$ in accordance with the vectorial representation set forth in Equation 296.

Just as the blocks 25 and 26 receive the signals from the block 22, the blocks 18 and 19 receive the signals from the block 119. The blocks 18 and 19 combine these signals and the signals from the block 15 in a "special products" operation to produce signals representing $S\cos\psi$. These signals are introduced to the block 54 for combination with the signals representing $R_N$ from the block 6 in FIGURE 55. By operating as an ${}_0H_3$ type of servo, the block 54 is able to produce signals representing $A_N$ in accordance with the vectorial relationship set forth in operation 295.

Since the airplane 2000 has a forward motion, a bomb or other object dropped from the airplane travels forwardly. Initially, the bomb has a forward speed approaching that of the airplane. Since the bomb travels in a forward direction after it is released, the airplane 2000 should release the bomb before it reaches the target 2150. This can be seen from the vectorial diagram shown in FIGURE 74. It can be further seen from the vectorial diagram shown in the FIGURE 74 that the vectorial sum of the distance between the present position of the airplane 2000 and the position of bomb release from the airplane plus the horizontal distance moved by the target after being released should equal the distance between the present position of the airplane 2000 and the target 2150. This vectorial relationship is correct if the bomb is to hit the target 2150. As the bomb falls after being released from the airplane 2000, the air exerts a drag on the bomb so as to decrease the forward speed of the bomb. This may be seen from FIGURE 76, which indicates paths 2186 and 2188. The path 2186 indicates the movement which the bomb might follow after being released if no resistance were offered by the air. The path 2188 indicates the movement which the bomb would follow after being released when resistance is offered by the air. As will be seen, the resistance offered to the bomb by the air must be taken into account in order for the bomb to hit the target.

On the basis of prior experience, the coefficient of air resistance opposing the forward motion of the bomb can be closely approximated. This coefficient of resistance is dependent upon certain factors such as the air mass, the temperature of the air, the velocity and direction of the wind and the characteristics of the bomb being released by the airplane 2000. The coefficient of resistance can be inserted as a hand input on an analogue basis to stages 2160 in FIGURE 60. These stages operate to convert the analogue signals into a digital form so that the block 107 operating as an ${}_0A_3$ type of servo can produce corresponding digital signals. The signals representing the coefficient of resistance are designated in the drawings as CR.

Just as the stages 2160 produce signals representing the coefficient of resistance, stages 2162 produce signals representing the difference in height between the airplane 2000 and the target 2150. These signals may be designated as "$H_P-H_T$," where $H_P$ represents the height of the airplane and $H_T$ represents the height of the target. The signals representing $H_P-H_T$ can be obtained since the height of the target is known and the height of the airplane can be determined by conventional apparatus such as radar. The signals may be originally in analogue form and may be converted by the stages 2162 to digital form.

These signals control the block 123, which operates as an ${}_{o}A_3$ type of servo to produce signals corresponding to the signals from the stages 2162.

The signals from the blocks 107 and 123 are introduced to the blocks 61 and 62, which operate on a double-length basis to produce signals representing the product $(H_o-H_t)$(C.R.). The output signals from the blocks 61 and 62 are introduced to the blocks 64 and 65 and to the blocks 97 and 98. The blocks 64 and 65 operate on a "special products" basis to combine the signals from the blocks 61 and 62 with the signals representing the north component of the air speed from the blocks 33 and 34 in FIGURE 53. The resultant signals produced by the blocks 64 and 65 represent the total drag exerted on a bomb as it falls from the airplane 2000 to the target 2150. The output signals from the blocks 64 and 65 are introduced to the repeater block 102 and are introduced from that block to the block 112. The block 112 operates as an ${}_{o}H_3$ type of servo to combine the signals from the block 112 with the signals from the blocks 68 and 69.

The signals produced by the blocks 68 and 69 represent the total horizontal distance travelled by the airplane 2000 in the northern direction during the time that the bomb is falling to the target after being released from the airplane 2000. This corresponds to the horizontal distance that the bomb would travel in the northern direction after being released if no resistance against the bomb movement were exerted by the air. The blocks 68 and 69 produce such signals since they combine on a "special products" basis the signals representing the northern component of the ground speed from the block 58 in FIGURE 53 and signals representing the time for the bomb to fall. The signals representing time are represented as "$t_f$" and are produced by the block 66 in FIGURE 62, as will be described in detail subsequently.

Figure 60:
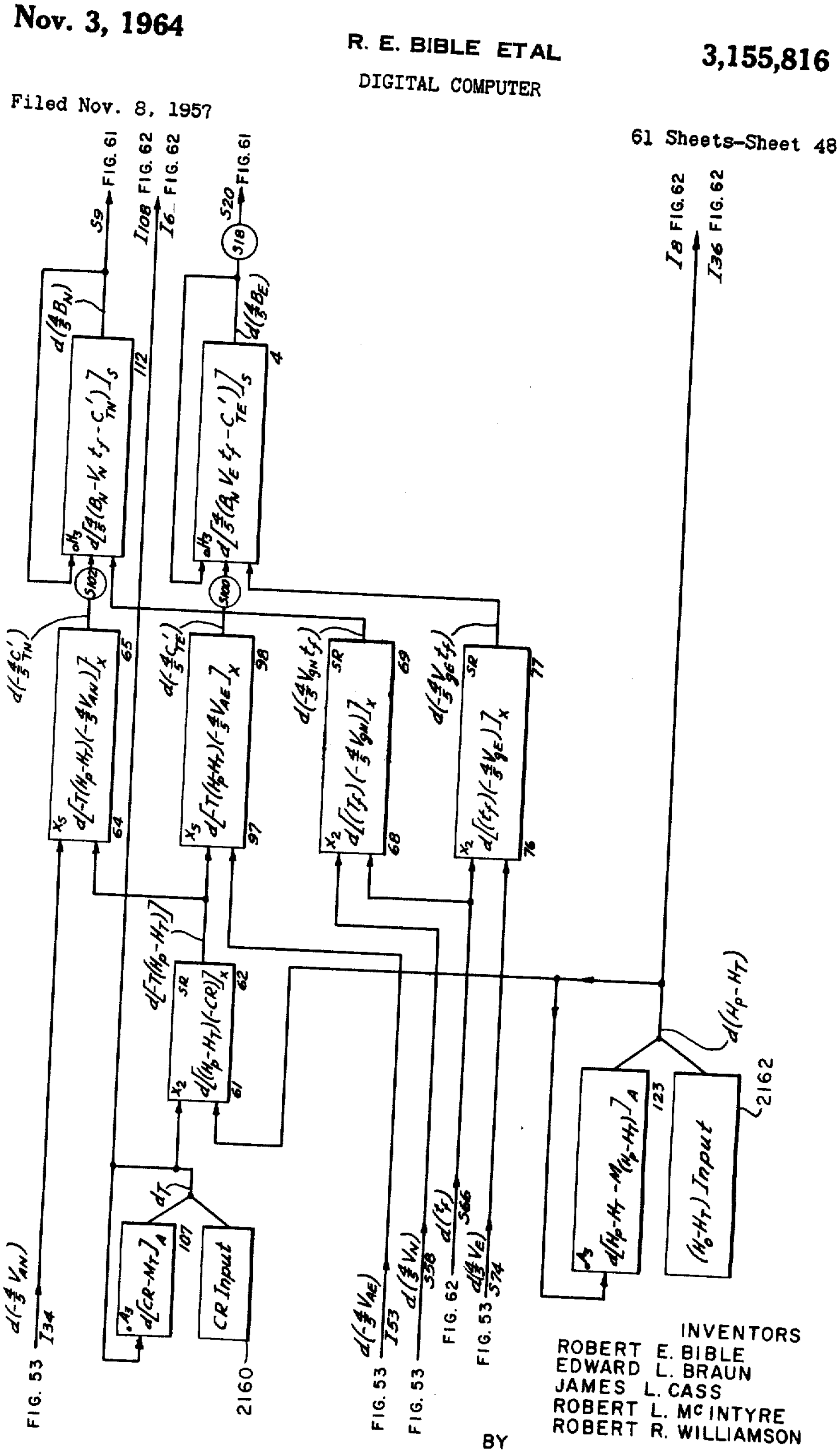

By combining the signals from the blocks 65 and 69, the block 112 in FIGURE 60 operates to produce signals representing the total distance travelled by the bomb in the northern direction. The distance may be seen from the vectorial representation shown in FIGURE 74. This distance is obtained by combining the values of the different quantities in accordance with the following vectorial equation:

$$B_N=V_{gN}t_f+C_{TN} \quad (297)$$

Where:

$B_N$=the northern component of the distance travelled by the bomb after it is released from the airplane 2000;

$C_{TN}$=the northern component of the resistance presented against the bomb by the air mass;

$t_f$=the time required for the bomb to strike the ground after it is released from the airplane; and the other terms have previously been defined.

In like manner, the blocks 76 and 77 in FIGURE 60 perform a double-length product operation on the signals representing the time of fall ($t_f$) and the eastern component of the air speed ($V_{gE}$). These signals are introduced to the blocks 76 and 77 from the block 66 in FIGURE 62 and from the block 74 in FIGURE 53. The resultant signals produced by the blocks 76 and 77 represent the total distance which would be travelled in the eastern direction by the bomb after release if there were no wind resistance opposing the horizontal movement of the bomb in that direction.

The output signals from the blocks 76 and 77 are introduced to the block 4. The block 4 also receives the signals from the repeater block 100, which has signals introduced to it from the blocks 97 and 98, the blocks 97 and 98 operating on a "special products" basis to produce signals representing the total drag exerted by the air on the forward movement of the bomb in the eastern direction. The block 4 operates as an ${}_{o}H_3$ servo to combine the signals introduced to it so as to produce signals representing the distance which would be travelled by the bomb in the eastern direction after the bomb is released from the airplane. These output signals are introduced to the repeater block 18 for subsequent introduction to certain of the other blocks.

Signals are produced by the block 4 to represent the total easterly distance travelled by the bomb after release in accordance with the vectorial equation:

$$B_E=V_{gE}t_f+C_{TE} \quad (298)$$

Where:

$B_E$=the eastern component of the distance travelled by the bomb after it is released from the airplane 2000;

$C_{TE}$=the eastern component of the resistance presented against the bomb by the air mass; and the other terms have previously been defined.

As the airplane approaches the target, the digital differential analyzer may make calculations as to the position at which to drop the bomb and as to the position at which the bomb will hit the ground. This latter position is designated as the "impact point" and is indicated at 2170 in FIGURES 74 and 75. It may sometimes happen that the calculated position of the "impact point" may differ somewhat from the actual aim point. This vectorial difference in position may be designated as "D" and is indicated in FIGURE 75.

As will be seen by the vectorial diagram shown in FIGURE 75, the horizontal vectorial distance D between the target 2150 and the impact point 2170 forms a triangle with the horizontal vectorial distance A between the airplane 2000 and the target and the horizontal vectorial distance B between the airplane and the impact point. Since the quantities D, A and B form a triangle, $$D_N=A_N-B_N \quad (299)$$

Where:

$D_N$=the northern component of the vectorial distance D; and the other terms have previously been defined.

Similarly, $$D_E=A_E-B_E \quad (300)$$

Where:

$D_E$=the eastern component of the vectorial distance D; and the other terms have previously been defined.

Figure 61:
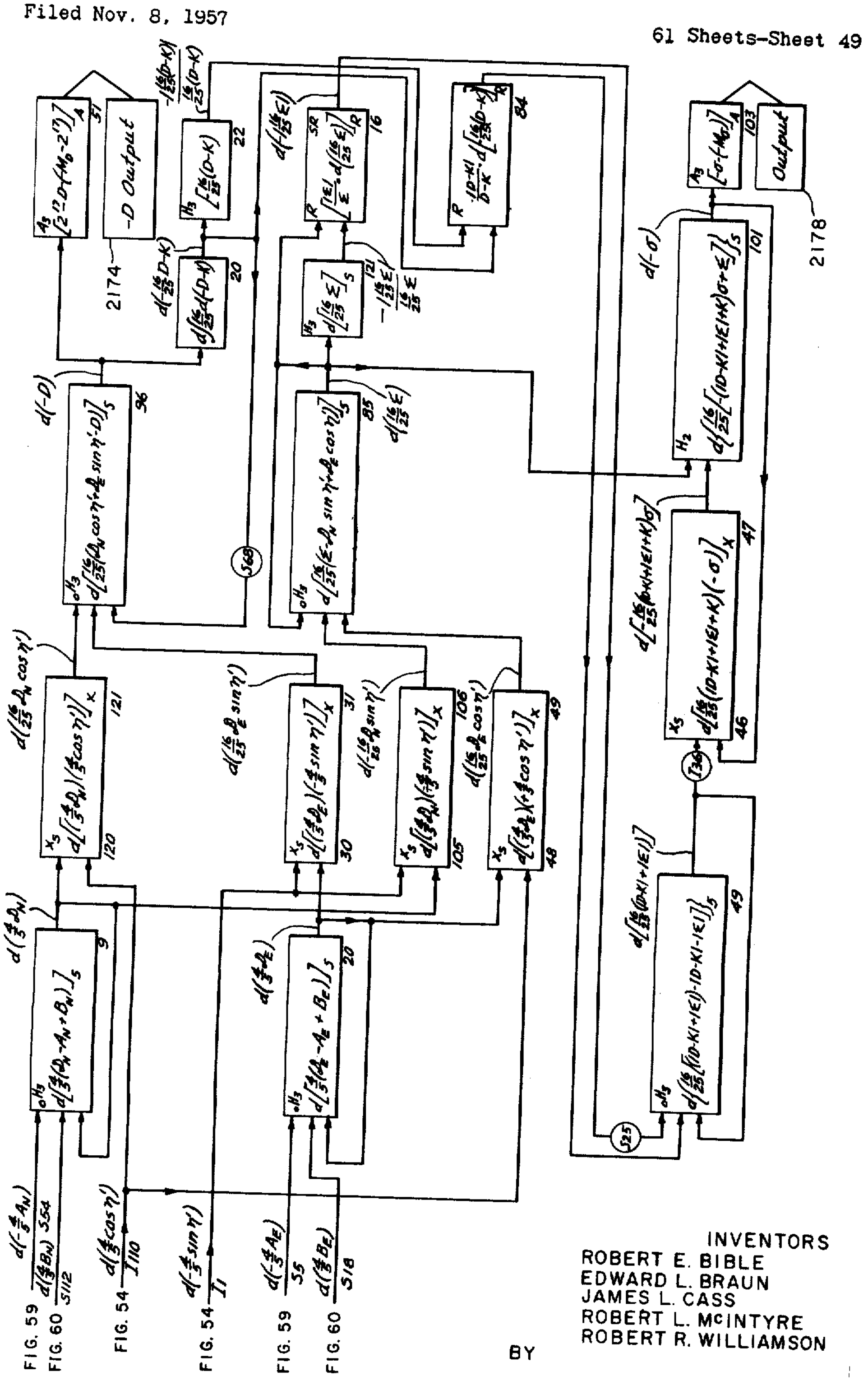

The block 9 in FIGURE 61 operates as an ${}_{o}H_3$ type of servo to produce signals representing $D_N$. The block 9 produces such signals by combining the signals representing $B_N$ from the block 112 in FIGURE 60 and the signals representing $A_N$ from the block 54 in FIGURE 59. Similarly, the block 20 operates as an ${}_{o}H_3$ type of servo to produce signals representing $D_E$. The block 20 produces such signals by combining the signals representing $B_E$ from the repeater block 18 in FIGURE 60 and the signals representing $A_E$ from the block 5 in FIGURE 59.

The signals from the block 9 are introduced to the blocks 120 and 121 for combination with the signals from the block 110 in FIGURE 54. As previously described, the signals from the block 110 in FIGURE 54 represent cos $\eta$, being the angle between the true north and the vector representing the ground speed of the airplane 2000. These signals are combined with the signals representing $D_N$ in the blocks 120 and 121, which operate on a "special products" basis to produce signals representing $D_N$ cos $\eta$.

In like manner, the blocks 30 and 31 operate on a "special products" basis to combine the signals representing $D_E$ from the block 20 and the signals representing sin $\eta$ from the block 1 in FIGURE 54. The resultant signals produced by the blocks 30 and 31 represent $D_E$ sin $\eta$. The blocks 105 and 106 also operate on a "special products" basis to produce signals representing $D_N$ sin $\eta$ and the blocks 48 and 49 similarly produce signals representing $D_E$ cos $\eta$.

The output signals from the blocks 120 and 121 and from the blocks 30 and 31 are introduced to the block 96. This block operates as an $_0H_3$ type of servo to produce signals representing the component of the vector D in the direction corresponding to the ground speed $V_g$ of the airplane 2000. This may be seen from FIGURE 75 and from the vectorial relationship:

$$D = D_N \cos \eta + D_E \sin \eta \qquad (301)$$

Where:

$D$=the component of the vector D in the direction corresponding to the ground speed $V_g$; and the other terms have previously been defined.

The servo operation of the block 96 is obtained by introducing the output signals from the block to the constant integrator 20, which operates to produce signals representing a value proportional to $(D-K)$, where K is a constant. The block 20 in turn introduces the output signals to the repeater block 68 for subsequent introduction back to the block 96. The output signals from the block 96 are also introduced to the block 51, which operates as an $A_3$ type of servo to control the production of corresponding signals by stages 2174. The signals produced by the stages 2174 may be converted into an analogue form.

Just as the block 96 operates to produce signals representing the component of D along a line parallel to the ground speed $V_g$, the block 85 operates to produce signals representing the component of D along a line perpendicular to the ground speed $V_g$. The block 85 produces such signals by operating as an $_0H_3$ type of servo to combine the signals from the blocks 48 and 49 and the signals from the blocks 105 and 106. The output signals from the block 85 are produced in accordance with the vectorial relationship:

$$\Sigma = D_N \sin \eta - D_E \cos \eta \qquad (302)$$

Where:

$\Sigma$=the component of the vector D in the direction perpendicular to the ground speed $V_g$; and the other terms have previously been defined.

The vectorial relationship set forth in Equation 302 may be seen from FIGURE 75.

In addition to determining the values of the perpendicular quantities D and $\Sigma$, the blocks shown in FIGURE 61 also operate to determine the value of the angle $\sigma$. This angle may be defined as the angle formed in a right triangle having the quantities D and $\Sigma$ as the two perpendicular angles. As may be seen in FIGURE 75, the angle $\sigma$ is the angle formed between the leg D and the hypotenuse of the right triangle having D and $\Sigma$ as legs. As is well known, the angle of such a right triangle can be obtained from the relationship $$\tan \sigma = \Sigma / D \qquad (303)$$

When the value of the angle $\sigma$ is relatively small, $\sigma \approx \tan \sigma = \Sigma/D$. As will be seen, certain problems arise in the relationship $\sigma = \Sigma/D$ when the value of D becomes relatively small. This may occur as the airplane approaches the position at which it is to drop the bomb. At such times, errors may be introduced into the determinations of $\sigma$ because of the small value of D. For this reason, a constant K may be added to the denominator to obtain the relationship $\sigma = \Sigma/D+K$.

The relationship $\sigma = \Sigma/D+K$ alleviates the problems when D is small but it still presents problems when $\Sigma$ is large. At such times, the computations for $\sigma$ may be greater than 1 so as to indicate relatively large angles with considerable errors. Because of this, the above relationship may be modified to obtain $\sigma = \Sigma/D+K+\Sigma$, since the value of $\sigma$ would then be generally between 0 and 1. In order to prevent the denominator in the above relationship from becoming too small because of opposite signs in the values of D and $\Sigma$, the absolute values of D and $\Sigma$ may be used in the denominator. This causes the relationship to become $$\sigma = \frac{\Sigma}{|D|+K+|\Sigma|} \qquad (304)$$

As will be seen, the value of $\sigma$ for such a relationship will always be less than 45°. Since the value of $\sigma$ should approach 0° as the computed impact point approaches the target, the value of $\sigma$ set forth in Equation 304 may be considered as adequate, especially when the value of $\sigma$ becomes relatively low.

As previously described, the block 20 in FIGURE 61 is operative to produce signals representing $(D-K)$, where D is the distance between the computed impact point and the target along a line parallel to the ground speed $Vg$ and K is a constant. These signals are introduced to the block 22, which operates as an $H_3$ type of servo to produce signals indicative of the sign of the quantity $(D-K)$. The sign of $(D-K)$ may be represented as $$\frac{|D-K|}{(D-K)}$$

Actually, the block 22 operates to produce signals representing the negative polarity of $(D-K)$ as represented by $$-\frac{|D-K|}{D-K}$$

The signals from the block 22 are introduced to the block 84, as are the signals from the block 20. The block 84 combines the signals introduced to it for the production of signals representing a value proportional to $$(-)\frac{|D-K|}{(D-K)} \cdot (-)(D-K) = |D-K|$$

The signals representing the absolute value of $(D-K)$ from the block 84 are introduced to the block 49, which also receives the signals from the repeater block 25. The block 25 in turn receives the signals from the block 16. The block 16 and the block 121 operate in conjunction in a manner similar to the blocks 20 and 22 to produce signals representing $|\Sigma|$, which is the absolute value of the vectorial component of D perpendicular to the ground speed $Vg$.

The block 49 operates as an $_0H_3$ type to combine the signals introduced to it for the production of signals representing a value proportional to $|D-K|+|\Sigma|$. The output signals produced by the block 49 are introduced to the repeater block 36, which in turn introduces the signals to the blocks 46 and 47. The blocks 46 and 47 also receive signals representing $\sigma$ from the block 101 and operate on these signals on a "special products" basis to produce signals representing a value proportional to $\sigma(|D-K|+|\Sigma|+K)$. The constant K at the end of the relationship set forth in the previous sentence is obtained by introducing it as an initial value into the blocks 46 and 47.

The block 101 receives the signals from the blocks 46 and 47 and the signals from the block 85 and operates as an $H_2$ type of servo to produce signals representing the angle $\sigma$. The block 101 produces such signals by solving an equation which may be designated as $$\sigma(|D-K|+|\Sigma|+K)+\Sigma=0$$

This equation is obtained by transposing the terms in Equation 304. The signals representing $\sigma$ are introduced to the block 103, which operates as an $A_3$ type of servo in conjunction with stages 2178 to obtain the production of output signals by the stages 2178. The signals produced by the stages 2178 may be in analogue form.

On the basis of calculations revised by actual experience, it has been found that the time for the bomb to fall to the target after being released may be expressed by a somewhat complicated equation. This equation may be expressed as:

$$\frac{7}{16}gt^2_f-\left(\frac{7}{8}-\frac{7}{8}K_1CR\right)V_Ht_f-(H_P-H_T)\left[\frac{7}{8}+\frac{7}{8}K_2CR(H_P-H_T+K_3)\right]=0 \quad (305)$$

Where:

$K_1$=a constant;
$K_2$=a constant;
$K_3$=a constant;
$CR$=the coefficient of resistance exerted by the air against the bomb as the bomb falls;
$V_H$=the vertical velocity of the airplane 2000 at the instant that the bomb is released;
$t_f$=the time for the bomb to fall to the target after it has been released from the airplane;
$g$=the acceleration of the bomb as a result of the gravitational force;
$H_P$=the height of the airplane at the time that the bomb is released; and
$H_T$=the height of the target.

The vertical velocity $V_H$ of the airplane 2000 may be determined by known instruments and may be indicated by these instruments in an analogue form. These signals are converted by stages 2180 into a digital form so as the block 19 operating as an ${}_oA_3$ type of servo can produce corresponding signals. The signals from the block 19 are introduced to the blocks 12 and 13, which operate on a "special products" basis to combine these signals with the signals from the block 109. Since the block 109 operates as a constant integrator on the signals representing CR from the block 107 in FIGURE 60, the resultant signals produced by the block 109 represent $CRK_1$. The blocks 12 and 13 then operate on the signals from the blocks 19 and 109 to produce signals representing $$\left(\frac{7}{8}-\frac{7}{8}K_1CR\right)V_H$$

This may be simplified to $M_KV_H$ by having $$M_K=\left(\frac{7}{8}-\frac{7}{8}K_1CR\right)$$

The block 42 receives the output signals from the blocks 12 and 13 and also receives the output signals from the block 118, the latter block operating as a constant integrator to multiply the time of fall $t_f$ by a constant representing the gravitational acceleration $g$. The block 42 operates as an ${}_oH_3$ type of servo to combine the signals introduced so as to produce output signals representing a value proportional to $(gt_f-M_KV_H)$. The output signals from the block 42 are introduced to the blocks 44 and 45, as are the output signals representing the sign of $t_f$ designated as $$\frac{|t_f|}{t_f}$$

from the repeater block 40 and the signals representing $t_f$ from the repeater block 76. The blocks 44 and 45 perform a "double-length" product operation to obtain signals representing a value proportional to $$t_f(gt_f-M_KV_H)|t_f|$$

Figure 62:
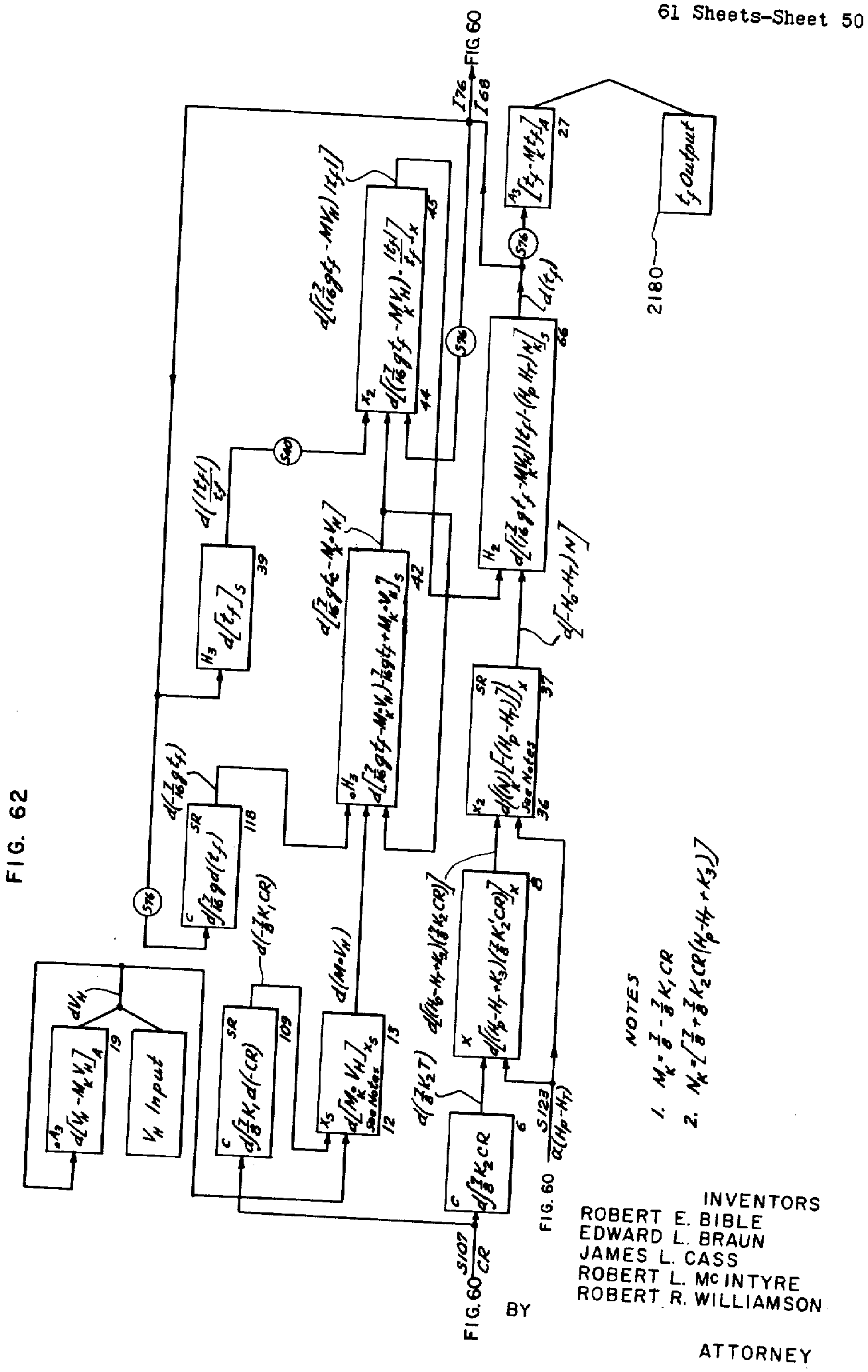

The signals from the repeater block 107 in FIGURE 60 are not only introduced to the block 109 in FIGURE 62 but also to the block 6 in that figure. The block 6 operates as a constant integrator to produce signals representing a value proportional to $K_2CR$. These signals are introduced to the block 8 for combination with the signals representing $(H_P-H_T)$ from the block 123 in FIGURE 60. The block 8 performs a product operation on the signals introduced to it so as to produce signals representing a value proportional to $$(K_{22}CR)(H_P-H_T+K_3).$$

The signals from the block 123 in FIGURE 60 are introduced to the blocks 36 and 37 as well as to the block 8 and are combined in the blocks 36 and 37 with the signals from the block 8. The blocks 36 and 37 operate on a "special products" basis to combine the signals introduced to the blocks for the production of signals representing $$(H_P-H_T)\left[\frac{7}{8}+\frac{7}{8}K_2CR(H_P-H_T+K_3)\right]$$

This may be simplified to $N_K(H_P-H_T)$ by making $$N_K=\frac{7}{8}+\frac{7}{8}K_2CR(H_P-H_T+K_3)$$

The signals produced by the blocks 36 and 37 are combined in the block 66 wth the signals representing $$\left(\frac{7}{16}gt_f-M_KV_h\right)t_f$$

from the block 42 to produce signals representing $t_f$ in accordance with the relationship set forth in equation 305.

The signals from the block 66 are introduced to the block 39, which operates as an $H_3$ type of servo to produce signals representing the sign of $t_f$ in a manner similar to that described previously for other blocks. The sign of $t_f$ may be represented as $$\frac{|t_f|}{t_f}$$

in a manner similar to the representation of the sign of other quantities as described previously. The signals from the block 66 are also introduced to the repeater block 76 for subsequent introduction to the block 27. The block 27 operates as an $A_3$ type of servo to produce signals for controlling the production of corresponding signals by stages 2180. The signals produced by the stages 2180 may be converted into an analogue form.

It may be desired to feed certain information from the digital differential analyzer to associated equipment such as radar apparatus for use by the radar apparatus. This information may include the total distance $r$ between the airplane 2000 and the aim point 2002. This total distance $r$ includes the vertical and horizontal components. It may also include the angle $\phi$ defined by the total range $r$ and the horizontal range R between the airplane and the aim point. The quantities $r$ and $\phi$ may be seen in FIGURE 77.

As will be seen in FIGURE 77, the distance $/r/$ may be defined by the vectorial equation:

$$r=R\sin\phi+(H_P-H_A)\cos\phi \quad (306)$$

Where:

$R$=the horizontal range between the airplane 2000 and the aim point 2002;
$r$=the total distance between the airplane 2000 and the point 2002;
$H_A$=the height of the aim point 2002; the other terms have previously been defined.

Similarly, the angle $\phi$ may be defined by the vectorial equation $$R\cos\phi+(H_P-H_A)\sin\phi=0 \quad (307)$$

where all of the terms have previously been defined.

Figure 63:
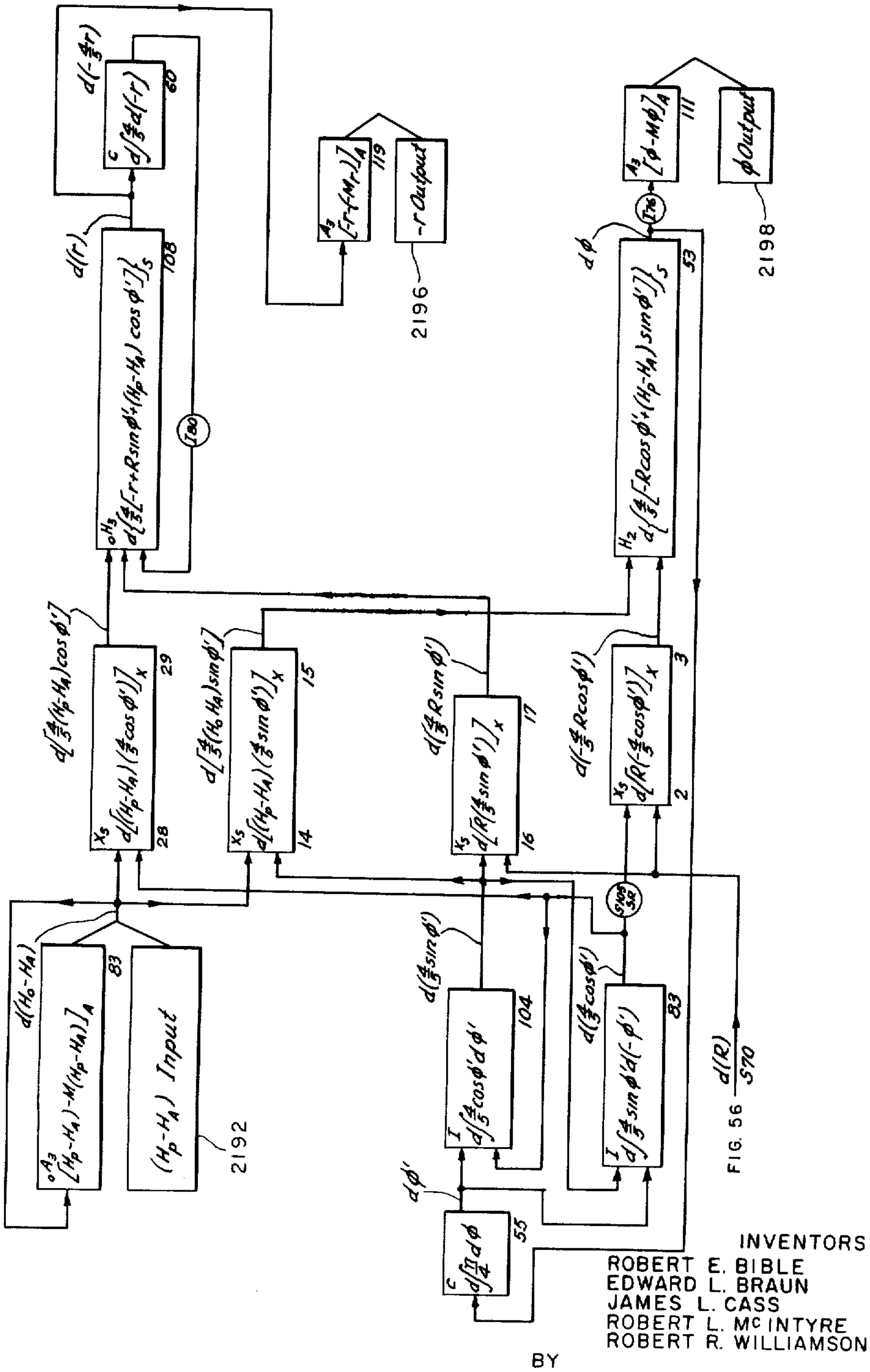

The stages shown in FIGURE 63 operate to produce signals representing $r$ and signals representing $\phi$. These stages include stages 2192 for producing signals representing $(H_P-H_A)$ in accordance with the known height of the aim point 2002 and the height of the airplane 2002 as measured by conventional instruments. The stages 2192 control the production of digital signals representing $(H_P-H_A)$ by the block 82, which operates as an ${}_oA_3$ type of servo. The signals from the block 83 are introduced to the blocks 28 and 29 and to the blocks 14 and 15. The blocks 28 and 29 also receive signals from the block 83 and the blocks 14 and 15 also receive signals from the block 104. The blocks 83 and 104 are interrelated to receive signals representing a value proportional to the angle $\phi$ and to produce signals respectively representing values proportional to sin $\phi$ and cos $\phi$. The blocks 83 and 104 operate as normal integrators to produce output signals representing the trigonometric functions.

By performing a "special products" operation, the blocks 28 and 29 combine the input signals to produce output signals representing a value proportion to $$(H_P-H_A) \cos \phi$$

Similarly, the blocks 14 and 15 operate on a "special products" basis to produce output signals representing a value proportional to $(H_P-H_A)$ sin $\phi$. The output signals from the blocks 28 and 29 and the blocks 14 and 15 are introduced to the block 108. The block 108 operates as an $_0H_3$ type of servo to produce output signals representing $r$ in accordance with the vectorial relationship set forth in Equation 306. The output signals from the block 108 have their scale factor changed by the block 60. The signals from the block 60 are introduced to the repeater block 80, which in turn introduces the signals to the block 108 on a feed-back basis. The signals from the block 60 are also introduced to the block 119, which operates as an $_0A_3$ type of servo so that corresponding signals can be produced by stages 2186. The signals produced by the stages 2186 may be converted into an analogue form.

The signals from the block 104 and the signals representing R from the block 70 in FIGURE 56 are introduced to the blocks 16 and 17. The blocks 16 and 17 perform a "special products" operation to produce signals representing a value proportional to R sin $\phi$. The signals from the block 70 in FIGURE 65 also pass to the blocks 2 and 3, as do the signals representing ($-$ cos $\phi$) from the repeater block 105. The blocks 2 and 3 also perform a "special products" operation to produce signals representing R cos $\phi$.

The block 53 receives the signals from the blocks 2 and 3 and from the blocks 16 and 17 and performs an $H_2$ type of operation on the signals. In this way, the block 53 produces signals representing $\phi$ in accordance with the vectorial representation set forth in Equation 307. These signals are converted into signals representing radians by the block 53, which acts as a constant integrator. The signals from the block 53 are also introduced to the repeater block 176, which in turn introduces the signals to the block 111. The block 111 operates as an $A_3$ type of servo to control the production of corresponding output signals by stages 2198. The signals produced by the stages 2198 may be converted into an analogue form.

Certain operations are represented schematically by switches in FIGURE 64. One of these is indicated schematically as the "$\pi$" (pi) switch in FIGURE 64. The "$\pi$" (pi) switch is considered to be in the "set" state in one position. In the "set" state of the "$\pi$" (pi) switch, corrections are made by the aircraft 2000 in the latitudinal and longitudinal positions of the aircraft. The corrections are made by taking fixings on known or universal fixed positions such as the aim point 2002 or on the north star or some other known celestal body. These corrections are made in accordance with computations provided by the digital differential analyzer with respect to the solution of Equations 292 and 293 set forth above.

Corrections are not provided in the "set" state when the distance between the aircraft 2000 and the aim point 2002 is in excess of 200 miles. The corrections may be provided in the "set" made by fixing on a known position along the course of the aircraft and near the present position of the aircraft. When the "$\pi$" switch is in the "$\bar{\pi}$" position, changes in the latitude and longitude of the aircraft may be determined by "dead reckoning." "Dead reckoning" occurs by integrating the ground speed of the aircraft to determine changes in latitude and longitude of the aircraft.

The switch designated as "$\rho_s$" in FIGURE 64 controls the mode of operation designated as "rate solution." In this mode of operation, the periscope may drift off the aim point if the ground speed determined by the digital differential analyzer is in error. The ground speed and change in range of the aircraft 2000 from the aim point 2002 are determined by the digital differential analyzer during the mode of operation designated as "aided tracking." This drift is used to compute corrections to the magnitude ($V_W$) and direction ($\omega$) of the wind. The required corrections may then be inserted either manually or automatically by the tracking stick 2043 shown in FIGURES 65 and 66.

The switch designated as "$\rho$" in FIGURE 64 controls the mode of operation designated as "point mode." In "point mode," a known landmark such as a tall building in a city near the course of the aircraft may be used as a sighting target to determine the present latitudinal and longitudinal positions of the aircraft. These determinations may be used to correct the indication of range R and bearing $\mu$ provided in the digital differential analyzer. The corrections are provided by operating the "$\rho$" switch to go out of the tracking mode and by subsequently operating the tracking stick 2043.

The switch designated as "$\tau$" controls the mode of operation designated as "aided track." When the switch is in the "$\tau$" position, "aided track" is obtained such that changes in range (R) and relative bearing ($u$) between the aircraft 2000 and the aim point 2002 are determined from the motion of the aircraft 2000. These changes are determined by integrating the motion of the aircraft 2000 with respect to time. In the "$\bar{\tau}$" position of the switch, changes in range R and relative bearing $\mu$ resulting from determinations as to the movement of the aircraft 2000 are deleted.

As used in the specification and in the claims, the term "dependent quantity" is intended to refer to the value of Y in obtaining the value of $\int YdX$. The term "variations in the independent quantity" is intended to refer to the $\Delta X$ increments which approximate $dX$ in obtaining the value of $\int YdX$. The term "differential combination" is intended to refer to the combination of Y and $\Delta X$, as represented by $Y\Delta X$, to approximate the value of $\int YdX$.

The term "integrator storage section" as used in the claims is intended to be equivalent to the term "block" as used in the specification. Each "integrator storage section" is considered as including a dependent quantity Y and a cumulative value of the $Y\Delta X$ increments. The "integrator storage sections" are sequentially presented for computation by rotating the drum 130.

We claim:

1. In a digital differential analyzer, means for defining a plurality of channels, means for delineating a particular integrator storage section in the different channels, means including a first channel in the plurality for providing signal indications digitally representing a dependent quantity for the particular integrator storage section, means for providing signal indications representing digital variations in an independent quantity for the particular integrator storage section, means responsive to the signal indications representing the dependent quantity and the variations in the independent quantity for the particular integrator storage section for differentially combining these signal indications upon each digital variation in the independent quantity for the particular integrator storage section, means including a second channel in the plurality for providing signal indications representing the differential combination for the particular integrator storage section, means including a third channel in the plurality for providing signal indications representing overflows in the signal indications in the second channel for the particular integrator storage section, means responsive to the signal indications from the third channel for the particular integrator storage section for feeding these signal indications back to the positions in the second channel for the particular integrator storage section to maintain the signal indications in the second channel at a substantially constant value, means for delineating a second particular integrator storage section in the different channels, and means including a particular one of the channels responsive to the signal indications representing the feedback information from the third channel to the second channel and coupled to a particular one of the channels for introducing such signal indications to the particular channel for the production of signal indications representing a cumulative value of the feedback information.

2. In a digital differential analyzer defined by a plurality of integrator storage sections and defined by a plurality of digital positions in each integrator storage section and having an interrelationship between the integrator storage sections in the plurality in accordance with a problem to be solved and providing a sequential presentation of the integrator storage sections in the plurality and the digital positions in the information storage sections in the plurality for computation on a cyclic basis electrical circuitry for providing in first positions in a particular integrator storage section in the plurality signal indications digitally representing a first quantity, electrical circuitry for providing in second positions in the particular integrator storage section signal indications digitally representing a second quantity, electrical circuitry for producing signal indications representing digital variations in the first quantity for the particular integrator storage sections upon the presentation of the particular integrator storage section for computation and in accordance with the interrelationship between the different integrator storage sections in the plurality, electrical circuitry for producing signal indications representing digital variations in the second quantity for the particular integrator storage section upon the presentation of the particular integrator storage section for computation and in accordance with the interrelationship between the different integrator storage sections in the plurality, electrical circuitry responsive to the signal indications representing the first quantity for the particular integrator storage section and the signal indications representing the digital variations in the second quantity for the particular integrator storage section for differentially combining these signal indications upon the presentation of the particular integrator storage section for computation to obtain signal indications digitally representing a first intermediate quantity for the particular integrator storage section, electrical circuitry responsive to the signal indications representing the second quantity for the particular integrator storage section and the signal indications representing the digital variations in the first quantity for the particular integrator storage section for differentially combining these signal indications upon the presentation of the particular integrator storage section for computation to obtain signal indications digitally representing a second intermediate quantity for the particular integrator storage section, and electrical circuitry responsive to the signal indications representing the first and second intermediate quantities for the particular integrator storage section for combining these signal indications upon the presentation of the particular integrator storage section for computation to obtain in third positions in the particular integrator storage section signal indications digitally representing the product of the first and second quantities for the particular integrator storage section.

3. In a digital differential analyzer defined by a plurality of integrator storage sections and defined by a plurality of digital positions in each block and having an interrelationship between the blocks in accordance with a problem to be solved and providing a sequential presentation of the integrator storage sections in the plurality and the digital positions in the integrator storage sections for computation on a cyclic basis, means for providing in first positions in a particular integrator storage section in the plurality signal indications digitally representing a first quantity for the particular integrator storage section, means for providing in second positions in the particular integrator storage section signal indications digitally representing a second quantity for the particular integrator storage section, means for providing in third positions in the particular integrator storage section signal indications digitally representing the product of the first and second quantities for the particular integrator storage section, means for producing signal indications representing digital variations in the first quantity for the particular integrator storage section upon the presentation of the particular integrator storage section for computation and in accordance with the interrelationship between the different integrator storage sections in the plurality, means for producing signal indications representing digital variations in the second quantity for the particular integrator storage section upon the presentation of the particular integrator storage section for computation and in accordance with the interrelationship between the different integrator storage sections in the plurality, means responsive to the signal indications representing the product and the signal indications representing the first quantity for the particular integrator storage section for combining these signal indications upon the occurrence of digital variations in the second quantity for the particular integrator storage section and in accordance with the polarity of such digital variations to produce signal indications digitally representing an intermediate quantity for the particular integrator storage section, and means responsive to the signal indications representing the intermediate quantity and the second quantity for the particular integrator storage section for combining these signal indications upon the occurrence of digital variations in the first quantity for the particular integrator storage section and in accordance with the polarity of such digital variations to obtain new signal indications representing the product of the first and second quantities.

4. In a digital differential analyzer defined by a plurality of integrator storage sections and defined by a plurality of digital positions in each integrator storage section and having an interrelationship between the integrator storage sections in the plurality in accordance with a problem to be solved and providing a sequential presentation of the integrator storage sections in the plurality and the digital positions in the integrator storage sections in the plurality for computation on a cyclic basis, means for providing a plurality of channels, means for providing in a first channel in the plurality signal indications digitally representing an independent quantity for a particular pair of successive integrator storage sections in the plurality, means for providing in a second channel in the plurality signal indications digitally representing a dependent quantity for the particular pair of integrator storage sections, means for producing signal indications representing digital variations in the independent quantity for the particular pair of integrator storage sections upon the presentation of the particular pair of integrator storage sections for computation and in accordance with the interrelationship between the different integrator storage sections in the plurality, means for producing signal indications representing digital variations in the dependent quantity for the particular pair of integrator storage sections upon the presentation of the particular pair of integrator storage sections for computation and in accordance with the interrelationship between the different integrator storage sections in the plurality, means responsive to the signal indications representing the dependent quantity and the variations in the independent quantity for the particular pair of integrator storage sections upon the presentation of the particular pair of integrator storage sections for computation for combining these signal indications to produce signal indications representing a first intermediate quantity for the particular pair of integrator storage sections, means responsive to the signal indications representing the independent quantity and the variations in the dependent quantity for the particular pair of integrator storage sections upon the presentation of the particular pair of integrator storage sections for computation for combining these signal indications to produce signal indications representing a second intermediate quantity for the particular pair of integrator storage sections, means for providing in a third channel signal indications representing the product of the independent and dependent quantities for the particular pair of integrator storage sections, means responsive to the signal indications in the third channel and the signal indications representing the first and second intermediate quantities for the particular integrator storage sections for combining these signal indications upon the presentation of the particular pair of integrator storage sections for computation to produce signal indications representing a new value of the product for the particular pair of integrator storage sections, means for indicating which one of the integrator storage sections in the particular pair is being presented for computation, and means including the last mentioned means and operative upon the presentation of the integrator storage sections in the particular pair for computation for providing for a continuation of the computations through the first integrator storage section in the particular pair and into the second integrator storage section in the particular pair without interruption to obtain indications of increased length in representation of the quantities.

5. In a digital differential analyzer as set forth in claim 4, means responsive to the signal indications representing the output quantity and the signal indications representing the first and second intermediate combinations at the last position of the second integrator storage section in the particular pair for combining these signal indications in a particular relationship to produce signal indications representing the new value of the output quantity at this position.

6. In a digital differential analyzer defined by a plurality of integrator storage sections and defined by a plurality of digital positions in each integrator storage section in the plurality and having an interrelationship between the integrator storage sections in the plurality in accordance with a problem to be solved and providing a sequential presentation of the integrator storage sections in the plurality and the digital positions in the integrator storage sections in the plurality for computation on a cyclic basis, means for providing signal indications representing a dependent quantity in a particular pair of successive integrator storage sections in the plurality, means for providing signal indications representing an independent quantity in the first one of the successive integrator storage sections in the particular pair, means for producing signal indications representing digital variatons in the independent quantity for the integrator storage sections in the particular pair upon the presentation of the particular pair of successive integrator storage sections for computation and in accordance with the interrelationship between the particular pair of integrator storage sections and other integrator storage sections in the plurality means for producing signal indications representing digital variations in the dependent quantity for the integrator storage sections in the particular pair upon the presentation of the partcular pair of successive integrator storage sections for computation and in accordance with the interrelationship between the particular pair of successive integrator storage sections and other integrator storage sections in the plurality, means responsive to the signal indications representing the dependent quantity and the variations in the independent quantity for the particular pair of successive integrator storage sections for combining these signal indications upon the presentation of the particular pair of successive integrator storage sections for computation to produce signal indications representing a first differential combination for the particular pair of successive integrator storage sections, means responsive to the signal indications representing the independent quantity and the variations in the dependent quantity for the particular pair of successive integrator storage sections for combining these signal indications upon the presentation of the first integrator storage section in the particular pair for computation to produce signal indications representing a second differential combination for the first integrator storage section in the particular pair, means responsive to the signal indications representing the second differential combination in the first integrator storage section of the particular pair for producing signal indications representing the value of the second differential combination upon the presentation of the second integrator storage section in the particular pair for computation, means for providing signal indications representing an output quantity for the particular pair of successive integrator storage sections upon the presentation of the particular pair of successive integrator storage sections for computation, and means responsive to the signal indications representing the output quantity for the successive integrator storage sections in the particular pair, the first differential combination for the successive integrator storage sections in the particular pair, the second differential combination in the first integrator storage section in the particular pair and the second differential combination in the second integrator storage section in the particular pair for combining these signal indications upon the presentation of the integrator storage sections in the particular pair for computation to obtain signal indications representing a new value of the output quantity for the successive integrator storage sections in the particular pair.

7. In a digital differential analyzer defined by a plurality of integrator storage sections and defined by a plurality of digital positions in each integrator storage section in the plurality and having an interrelationship between the blocks in accordance with a problem to be solved, means for providing a plurality of channels to store signal indications representing information for the different integrator storage sections in the plurality, means for sequentially presenting the integrator storage sections in the plurality and the successive positions in each integrator storage section in the plurality for computation, electrical circuitry for providing in a first channel in the plurality signal indications digitally representing a dependent quantity for a particular pair of successive integrator storage sections in the plurality, means including electrical circuitry for providing in a second channel in the plurality signal indications digitally representing an independent quantity for the first one of the successive integrator storage sections in the patricular pair, means including electrical circuitry for producing signal indications representing digital variations in the independent quantity for the particular pair of successive integrator storage sections in the plurality upon the presentation of the particular pair of successive integrator storage sections for computation and in accordance with the interrelationship between the particular pair of successive integrator storage sections and other integrator storage sections in the plurality, means including electrical circuitry for producing signal indications representing digital variations in the dependent quantity for the particular pair of successive integrator storage sections upon the presentation of the successive integrator storage sections for computation and in accordance with the interrelationship between the successive integrator storage sections in the particular pair and other integrator storage sections in the plurality, means including electrical circuitry responsive to the signal indications representing the dependent quantity and the variations in the independent quantity for the particular pair of successive integrator storage sections for combining these signal indications upon the presentation of the successive integrator storage sections in the particular pair for computation to produce signal indications representing the magnitude and polarity of a first differential combination for the successive integrator storage sections in the particular pair, means including electrical circuitry responsive to the signal indications representing the independent quantity and the variations in the dependent quanity for the successive integrator storage sections in the particular pair of differentially combining these signal indications upon the presentation of the successive integrator storage sections in the particular pair for computation to produce in the first one of the successive integrator storage sections in the particular pair signal indications representing the magnitude and polarity of a second differential combination and to produce in the second one of the successive integrator storage sections in the particular pair signal indications representing the value of the differential combination in accordance with the polarity of the second differential combination in the first one of the successive integrator storage sections in the particular pair, means for providing in a third channel in the plurality signal indications representing the cumulative value of the first and second differential combinations for the successive integrator storage sections in the particular pair to indicate the product of the dependent and independent quantities for the successive integrator storage sections in the particular pair, means including electrical circuitry responsive to the signal indications representing the first differential combination and the cumulative value of the first and second differential combinations for the successive integrator storage sections in the particular pair for combining these signal indications upon the presentation of the successive integrator storage sections in the particular pair for computation to produce signal indications representing an intermediate value for the successive integrator storage sections in the particular pair, means including electrical circuitry responsive to the signal indications representing the second differential combination and the intermediate value for the particular pair of successive integrator storage sections for combining these signal indications upon the presentation of the particular pair of successive integrator storage sections for computation to produce signal indications representing a new cumulative value of the first and second differential combinations and in accordance with the particular combination of signal indications representing the second differential combination and the intermediate value at the end of the first one of the successive integrator storage sections in the particular pair.

8. In a digital differential analyzer defined by a plurality of integrator storage sections and defined by a plurality of digital positions in each integrator storage section in the plurality and having an interrelationship between the integrator storage sections in the plurality in accordance with a problem to be solved, means for sequentially presenting the integrator storage sections in the plurality and the successive digital positions in each integrator storage section for computation, means for providing signal indications digitally representing a dependent quantity for a particular integrator storage section in the plurality, first means for providing signal indications representing digital increments in the dependent quantity for the particular integartor storage section in the plurality upon the presentation of the particular integrator storage section for computation, second means for providing signal indications representing digital increments in the dependent quantity for the particular integrator storage section upon the presentation of the particular integrator storage section for computation, means for controlling the introduction of signal indications to the particular integrator storage section from the first means or the second means in the successive cycles of computation and in accordance with the production of control signals, means responsive to the signal indications representing the dependent quantity for the particular integrator storage section and the signal indications introduced to the particular integrator storage section in representation of digital increments in the dependent quantity for the particular integrator storage section for combining these signal indications upon the presentation of the particular integrator storage section for computation to obtain signal indications representing a new value of the dependent quantity for the particular integrator storage section, means for producing control signals for the particular integrator storage section upon the presentation of the particular integrator storage section for computation and having first and second characteristics in accordance with the occurrence or lack of occurrence of a particular event, means for providing signal indications representing digital increments in an independent quantity for the particular integrator storage section upon the presentation of the particular integrator storage section for computation and in accordance with the interrelationship between the particular integrator storage section and other integrator storage sections in the plurality, means responsive to the signal indications representing the dependent quantity and the variations in the independent quantity for the particular integrator storage section for differentially combining these signal indications upon the presentation of the particular integrator storage section for computation to obtain signal indications representing the differential combination, means for providing signal indications representing an output quantity for the particular integrator storage section upon the presentation of the particular integrator storage section for computation, and means responsive to the signal indications representing the output quantity and the differential combination for the particular integrator storage section for combining these signal indications upon the presentation of the particular integrator storage section for computation to obtain signal indications representing a new value of the output quantity for the particular integrator storage section.

9. In a digital differential analyzer defined for a plurality of integrator storage sections and defined by a plurality of digital positions in each integrator storage section in the plurality and having an interrelationship between the integrator storage sections in the plurality in accordance with a problem to be solved, means for sequentially presenting the integrator storage sections in the plurality and the successive digital positions in the integrator storage sections in the plurality for computation on a cyclic basis, means for providing in a limited number of positions in a particular integrator storage section in the plurality signal indications digitally indicating a dependent quantity for the particular integrator storage section, means including a source external to the particular integrator storage section in the plurality for providing signal indications digitally representing a quantity for comparison with the dependent quantity, means responsive to the signal indications representing the dependent quantity for the particular integrator storage section and the external quantity for comparing these signal indications upon the presentation of the particular integrator storage section for computation to obtain in the limited number of positions for the particular integrator storage section signal indications representing an error or lack of error and the polarity of any such error, means responsive to the signal indications representing an error increment or lack of error increment and the polarity of any such increment for retaining until the end of the presentation of the particular integrator storage section for computation the signal indications representing an error increment or lack of such increment and the polarity of any increment, means responsive to the signal indications representing the error increments for the particular integrator storage section in each cycle of computation for recording such signal indications at the end of the particular storage section upon the presentation of the particular integrator storage section for computation, means responsive to the signal indications representing the dependent quantity and the error signals for the particular integrator storage section for combining these signal indications in a particular relationship upon the presentation of the particular integrator storage section for computation to obtain signal indications representing a corrected value in the dependent quantity for the particular integrator storage section, means for providing signal indications representing digital increments in an independent quantity for the particular integrator storage section upon the presentation of the particular integrator storage section for computation and in accordance with the interrelationship between the particular integrator storage section and other integrator storage sections in the plurality, means responsive to the signal indications representing the dependent quantity and the variations in the independent quantity for the particular integrator storage section for combining these signal indications upon the presentation of the particular integrator storage section for computation to produce signal indications representing the differential combination for the particular integrator storage section, means for providing signal indications representing an output quantity for the particular integrator storage section upon the presentation of the particular integrator storage section for computation, and means responsive to the signal indications representing the output quantity and the differential combination for the particular integrator storage section for combining these signal indications upon the presentation of the particular integrator storage section for computation to obtain signal indications representing a new value in the output quantity for the particular integrator storage section.

10. In a digital differential analyzer defined by a plurality of integrator storage sections and defined by a plurality of digital positions in each integrator storage section in the plurality and having an interrelationship between the integrator storage sections in the plurality in accordance with a problem to be solved, means for sequentially presenting the integrator storage sections in the plurality and the successive digital positions in each integrator storage section in the plurality for computation, means for providing signal indications digitally representing a dependent quantity for a particular integrator storage section in the plurality upon each presentation of the particular integrator storage section for computation, means for providing signal indications representing digital variations in the dependent quantity for the particular integrator storage section upon each presentation of the particular integrator storage section for computation, means responsive to the signal indications representing the dependent quantity and the digital variations in the dependent quantity for the particular integrator storage section for combining these signal indications upon each presentation of the particular integrator storage section for computation to produce signal indications representing a new value of the dependent quantity for the particular integrator storage section, means for controlling the introduction to the particular integrator storage section of the signal indications representing the digital increments in the dependent quantity for the particular integrator storage section upon the presentation of the particular integrator storage section for computation to prevent particular ones of such signal indications from being combined with the signal indications representing the dependent quantity, means for providing signal indications representing digital variations in an independent quantity for the particular integrator storage section upon the presentation of the particular integrator storage section for computation, means for providing signal indications representing an output quantity for the particular integrator storage section upon the presentation of the particular integrator storage section for computation, and means responsive to the signal indications representing the dependent quantity and the output quantity for the particular integrator storage section for combining these signal indications upon the presentation of the particular integrator storage section for computation and in accordance with the signal indications representing the digital variations in the independent quantity for the particular integrator storage section to obtain signal indications representing a new value of the output quantity for the particular integrator storage section.

11. In combination, means for delineating a plurality of integrator storage section, means for providing an interrelationship between the integrator storage sections in accordance with a problem to be solved, means for providing signal indications representing digital variations in an independent quantity for each integrator storage section in the plurality, means for providing signal indications digitally representing a dependent quantity for each integrator storage section in the plurality, means responsive to the signal indications representing the variations in the independent quantity and the signal indications representing the dependent quantity for each integrator storage section in the plurality for combining these signal indications for each integrator storage section in the plurality to obtain signal indications digitally representing an output quantity for that integrator storage section, a movable output member having a variable disposition in accordance with the movements of the member, means coupled to the output member for providing first signals having a magnitude and polarity representing in analog form the disposition and movement of the output member, means responsive to the first signals for converting the first signals into signal indications digitally representing the magnitude and polarity of the first signals, means responsive to the signal indications representing the differential combinations for particular integrator storage sections in the plurality and the signal indications digitally representing the disposition and movements of the output member for comparing these signal indications to obtain signal indications digitally representing errors in the disposition and movement of the output member, means responsive to the signal indications digitally representing the errors in the disposition and movement of the output member for converting such signal indications into second signals having a magnitude and polarity representing the errors in the disposition and movement of the output member, and means responsive to the second signals and coupled to the output member for adjusting the operation of the output member in accordance with the error represented by the magnitude and polarity of such signals.

12. In combination for use in a moving vehicle to control the movements of the vehicle toward a particular position removed from the vehicle, means in the vehicle for providing first signals having a magnitude and polarity representing in analog form the air speed of the vehicle and the angular position of the vehicle relative to a fixed reference at successive instants of time, means in the vehicle and responsive to the first signals for converting the first signals into signal indications digitally representing the magnitude and polarity of the first signals, means including a digital differential analyzer in the vehicle and responsive to the signal indications digitally representing the movements of the vehicle at each instant of time for producing signal indications digitally representing the disposition of the vehicle relative to the particular position at the successive instants of time and representing the movements of the vehicle toward the particular position at such instants of time, and means in the vehicle and responsive to the signal indications digitally representing the movements of the vehicle toward the particular position and the disposition of the vehicle relative to the particular position at the successive instants of time for indicating errors in such movement and such relative disposition.

13. In combination for use in a moving vehicle to control the movements of the vehicle toward a first particular position removed from the vehicle, means in the vehicle for providing signals having an amplitude and polarity representing in analog form the air speed of the vehicle at successive instants of time, means in the vehicle for providing signals having an amplitude and polarity representing in analog form a positioning of the vehicle relative to a second particular position removed from the first particular position and the vehicle, means in the vehicle and responsive to the signals representing the air speed and the positioning of the vehicle relative to the second particular position for converting such signals into signal indications digitally representing the air speed and the positioning of the vehicle relative to the second particular position, a digital differential analyzer having a plurality of integrator storage sections interrelated in a pattern for producing signal indications digitally representing the movement of the vehicle toward the first particular position, means responsive to the signal indications digitally representing the air speed of the vehicle and digitally representing the position of the vehicle relative to the second particular position for introducing such signal indications to first particular integrator storage sections in the digital differential analyzer for use by the digital differential analyzer in the computation of signal indications in accordance with the interrelationship between the different storage sections in the digital differential analyzer and in digital representation of incremental changes in the position of the vehicle relative to the first particular position, means for providing signals representing the time for the incremental changes in the position of the vehicle relative to the first particular position, and means responsive to the signal indications digitally representing the computed incremental changes in the position of the vehicle relative to the first particular position and responsive to the signal indications digitally representing the air speed of the vehicle and responsive to the signals representing the time for the incremental changes in the position of the vehicle for introducing signals to second particular intergrator storage sections in the digital differential analyzer for use by the digital differential analyzer in the computation of signal indications in accordance with the interrelationship between the different storage sections in the digital differential analyzer and in digital representation of errors in the movement of the vehicle toward the first particular position.

14. In combination for use in a moving vehicle to control the movements of the vehicle toward a first particular position removed from the vehicle, a digital differential analyzer having a plurality of integrator storage sections interrelated in a particular pattern in accordance with the desired movement of the vehicle toward the first particular position, means for providing for each integrator storage section in the plurality signal indications representing digital variations in an independent quantity, digitally representing a dependent quantity and digitally representing the differential combination of the dependent quantity and the digital variations in the independent quantity for that integrator storage section, means for providing signals having an amplitude and polarity representing in analog form the air speed of the vehicle, means for providing signals having an amplitude and polarity representing in analog form the angular disposition of the vehicle relative to a second position constituting a fixed reference and different from the first particular position, means responsive to the signals representing the air speed and angular disposition of the vehicle for converting such signals into signal indications digitally representing the air speed and angular disposition of the vehicle, means responsive to the signal indications digitally representing the air speed and the angular disposition of the vehicle for introducing such signal indications to first particular integrator storage sections in the digital differential analyzer for use as the dependent quantity for such sections and for comparison with the signal indications representing the dependent quantity in second particular integrator storage sections in the analyzer and for corresponding adjustments of the signal indications in the second particular integrator storage sections and for use in computations by the other integrator storage sections in the analyzer in accordance with the interrelationship between the different integrator storage sections in the analyzer and in digital representation of incremental changes in the position of the vehicle relative to the particular position, means for providing signal indications digitally representing the incremental time required to produce the incremental changes in the position of the vehicle relative to the first particular position, and means responsive to the signal indications digitally representing the computed incremental changes in the position of the vehicle relative to the particular position and responsive to the signal indications digitally representing the incremental time and responsive to the signal indications digitally representing the air speed and angular position of the vehicle for introducing signal indications to third particular integrator storage sections in the plurality for use as the dependent quantities in these integrator storage sections in the computation of signals in accordance with the interrelationship between the different integrator storage sections in the plurality and in digital representation of errors in the movement of the vehicle toward the first particular position.

15. in combination for use in a moving vehicle to control the movements of the vehicle toward a first particular position removed from the vehicle, a digital differential analyzer having a plurality of integrator storage sections interrelated in a particular pattern to obtain a controlled movement of the vehicle toward the first particular position, means for providing for each integrator storage section in the plurality signal indications representing digital variations in an independent quantity, digitally representing a dependent quantity and digitally representing the differential combination of the dependent quantity and the variations in the independent quantity for the integrator storage section, means for providing signals having an amplitude and polarity representing in analog form the air speed of the vehicle, means for providing signals having an amplitude and polarity representing in analog form the angular disposition of the vehicle relative to a fixed reference position different from the first particular position, means responsive to the signals representing the air speed and the angular disposition of the vehicle for converting such signals into signal indications digitally representing the air speed and angular disposition of the vehicle, means responsive to the signal indications digitally representing the air speed and angular disposition of the vehicle for introducing such signal indications to first particular integrator storage sections in the digital differential analyzer for use as the dependent quantity for such integrator storage sections in the computations in accordance with the interrelationship between the integrator storage sections and for the production by second particular integrator storage sections in the analyzer of signal indications digitally representing the range and angular positioning of the vehicle from the first particular position, a tracking stick movable in different directions to represent increments in the range and the angular positioning of the vehicle with respect to the first particular position, means operatively coupled to the tracking stick and including electrical circuitry for producing signal indications digitally representing incremental changes in the range and the angular positioning of the vehicle with respect to the particular position and for producing such signal indications in accordance with the disposition of the stick, and means responsive to the signal indications produced by the electrical circuitry for obtaining a controlled introduction of signal indications to the second particular integrator storage sections in accordance with the production of signals by the electrical circuitry to obtain corresponding changes in the signal indications representing the dependent quantity for the second particular integrator storage sections and to obtain corresponding changes in the production by the second particular integrator storage sections of signal indications digitally representing the range and angular disposition of the vehicle relative to the first particular position.

16. In combination for use in a moving vehicle to control the movements of the vehicle toward a particular position removed from the vehicle, means in the vehicle for providing signals having an amplitude and polarity representing in analog form the air speed of the vehicle at successive instants of time, means for providing signals having an amplitude and polarity representing in analog form the longitudinal and latitudinal positions of the vehicle at successive instants of time, means responsive to the signals representing the air speed of the vehicle and the longitudinal and latitudinal position of the vehicle for converting such signals into signal indications digitally representing the air speed of the vehicle and the latitudinal and longitudinal position of the vehicle, means in the vehicle for delineating a plurality of integrator storage sections, means in the vehicle for providing for each integrator storage section in the plurality signal indications digitally representing variations in an independent quantity, a dependent quantity and the differential combination of the dependent quantity and the variations in the independent quantity, means intercoupling the integrator storage sections to provide an interrelationship between the integrator storage sections for controlling the movements of the vehicle toward the first particular position, means responsive to the signal indications digitally representing the air speed and the longitudinal and latitudinal position of the vehicle for introducing such signal indications to first particular integrator storage sections in the plurality as the dependent quantity for such first particular integrator storage sections and for use by the interrelated integrator storage sections in the plurality in the computation of signal indications digitally representing the disposition and the changes in disposition of the vehicle relative to the particular position, a tracking stick actuatable to different positions to control the production of signal indications digitally representing incremental changes in the disposition of the vehicle relative to the particular position, and means coupled to the tracking stick and including electrical circuitry for obtaining a controlled introduction of signal indications to second particular integrator storage sections in the plurality at a rate dependent upon the disposition of the tracking stick and for use by the interrelated integrator storage sections in the plurality as corrections in the computation of the signal indications digitally representing the disposition of the vehicle relative to the particular position.

17. In combination for use in a moving vehicle to control the movements of the vehicle toward a first particular position removed from the vehicle, means in the vehicle for providing first signals having an amplitude and polarity representing in analog form the air speed of the vehicle at successive instants of time, means in the vehicle for providing second signals having an amplitude and polarity representing in analog form the positioning of the vehicle relative to a second particular position removed from the first particular position and the vehicle, means in the vehicle for providing third signals having an amplitude and polarity representing in analog form the bearing of the vehicle relative to the second particular position, means in the vehicle and responsive to the first, second and third signals for converting such signals into signal indications digitally representing the magnitude and polarity of such signals, a digital differential analyzer responsive to the signal indications produced by the last mentioned means and having a plurality of integrator storage sections interrelated in a pattern for producing signal indications digitally representing the position and bearing of the vehicle relative to the first particular position and digitally representing the ground speed of the vehicle, means responsive to the signal indications digitally representing the ground speed of the vehicle and the position and bearing of the vehicle relative to the first particular position for introducing such signal indications to first particular integrator storage sections in the digital differential analyzer for use by the digital differential analyzer in the computation of signal indications in accordance with the inter-relationship between the different integrator storage sections in the digital differential analyzer and in digital representation of incremental changes in the position of the vehicle relative to the first particular position, means for providing signals representing the time for the incremental changes in the position of the vehicle relative to the first particular position, and means responsive to the signal indications digitally representing the computed incremental changes in the position of the vehicle relative to the first particular position and responsive to the signal indications digitally representing the ground speed of the vehicle and responsive to the signals representing the time for the incremental changes in the position of the vehicle for introducing signal indications to second particular integrator storage sections in the digital differential analyzer for use by the digital differential analyzer in the computation of signal indications in accordance with the inter-relationship between the different storage sections in the digital differential analyzer and in digital representation of errors in the movement of the vehicle toward the first particular position.

18. In combination for use in a moving vehicle to control the movements of the vehicle toward a first particular position removed from the vehicle, a digital differential analyzer having a plurality of integrator storage sections inter-related in a particular pattern in accordance with the desired movement of the vehicle toward the first particular position.

means for providing for the integrator storage sections in the plurality signal indications representing digital variations in an independent quantity, digitally representing a dependent quantity and digitally representing the differential combination of the dependent quantity and the variations in the independent quantity for the integrator storage sections, means for providing first signals having an amplitude and polarity representing in analog form the air speed of the vehicle, means for providing second signals having an amplitude and polarity representing in analog form the bearing angle of the vehicle relative to a second position removed from the first particular position and the vehicle, means for providing third signals having an amplitude and polarity representing in analog form the angular position of the vehicle relative to the second position, means for providing fourth signals having an amplitude and polarity representing in analog form the latitudinal and longitudinal positions of the vehicle relative to the second position, means responsive to the first, second, third, and fourth signals for converting such signals into signal indications digitally representing the first, second, third and fourth signals, means responsive to the signal indications digitally representing the first, second, third and fourth signals for introducing such signal indications to first particular integrator storage sections in the digital differential analyzer for use in computations by other integrator storage sections in the analyzer to produce signal indications digitally representing the movement of the vehicle toward the first particular position, the course of the vehicle relative to the first particular position and the angular position and range of the vehicle relative to the first particular position, and means responsive to the signal indications digitally representing the movement, bearing, range and angular position of the vehicle relative to the first particular position for indicating desired changes in the movement of the vehicle toward the first particular position.

19. In combination for use in a moving vehicle to control the movements of the vehicle toward a first particular position removed from the vehicle, a digital differential analyzer having a plurality of integrator storage sections inter-related in a particular pattern in accordance with the desired movement of the vehicle toward the first particular position, means for providing each integrator storage section in the plurality signal indications representing digital variations in an independent quantity, digitally representing a dependent quantity and digital representing the differential combination of the dependent quantity and the digital variations in the independent quantity for that integrator storage section, means for providing first signals having an amplitude and polarity representing in analog form the air speed of the vehicle, means for providing second signals having an amplitude and polarity representing in analog form the position of the vehicle relative to a fixed reference position removed from the vehicle and the first particular position, means for providing third signals having an amplitude and polarity representing in analog form the latitudinal and longitudinal positions of the vehicle relative to the fixed reference position, means for providing fourth signals having an amplitude and polarity representing in analog form the bearing angle of the vehicle relative to the fixed reference position, means responsive to the first, second, third and fourth signals for converting such signals into signal indications digitally representing such signals, means responsive to the signal indications digitally representing the first, second, third and fourth signals for introducing such signal indications to first particular integrator storage sections in the digital differential analyzer for use as the dependent quantity for such sections and for use in computations by the other integrator storage sections in the analyzer in accordance with the inter-relationship between the different integrator storage sections in the analyzer and for the production of signal indications digitally representing incremental changes in the position of the vehicle relative to the first particular position and digitally representing the position of the vehicle relative to the first particular position and digitally representing the bearing of the vehicle and the range of the vehicle relative to the first particular position, means for providing signal indications digitally representing the incremental time required to produce the incremental changes in the position of the vehicle relative to the first particular position, and means responsive to the signal indications digitally representing the computed incremental changes in the position of the vehicle relative to the first particular position and responsive to the signal indications digitally representing the incremental time and responsive to the signal indications digitally representing the range, ground speed, and angular position of the vehicle relative to the particular position for introducing signal indications to second particular integrator storage sections in the plurality for use as the dependent quantities in these integrator storage sections in the computation of signals in accordance with the interrelationship between the different integrator storage sections in the plurality and in digital representation of errors in the movement of the vehicle toward the first particular position.

20. In combination for use in a moving vehicle to control the movements of the vehicle toward a first particular position removed from the vehicle, a digital differential analyzer having a plurality of integrator storage sections interrelated in a particular pattern to obtain a controlled movement of the vehicle toward the first particular position, means for providing for each integrator section in the plurality signal indications representing digital variations in an independent quantity, digitally representing a dependent quantity and digitally representing the differential combination of the dependent quantity and the variations in the independent quantity for the integrator storage section, means for providing first signals having an amplitude and polarity representing in analog form the air speed of the vehicle, means for providing second signals having an amplitude and polarity representing in analog form the bearing of the vehicle relative to a fixed reference position removed from the vehicle and the first particular position, means for providing third signals having an amplitude and polarity representing in analog form the angular disposition and range of the vehicle relative to the fixed reference position, means responsive to the first, second, and third signal for converting such signals into signal indications digitally representing such signals, means responsive to the signal indications digitally representing the first, second and third signals for introducing such signal indications to first particular integrator storage sections in the digital differential analyzer for use as the dependent quantity for such integrator storage sections in computations in accordance with the interrelationship between the integrator storage sections and for the production by second particular integrator storage sections in the analyzer of signal indications digitally representing the ground speed of the vehicle relative to the first particular position, the bearing of the vehicle relative to the first particular position and the angular position and range of the vehicle relative to the first particular position, actuatable means movable in different directions to represent increments in the range and the angular positioning of the vehicle relative to the first particular position, means operatively coupled to the actuatable means and including electrical circuitry for producing signal indications digitally representing incremental changes in the range and the angular positioning of the vehicle with respect to the particular position and for producing such signal indications in accordance with the actuation of the actuatable means, and means responsive to the signal indications produced by the electrical circuitry for obtaining a controlled introduction of signal indications to the second particular integrator storage sections in accordance with the production of signals by the electrical circuitry to obtain corresponding changes in the signal indications representing the dependent quantity for the second particular integrator storage sections and to obtain corresponding changes in the production by the second particular integrator storage sections of signal indications digitally representing the range and angular disposition of the vehicle relative to the first particular position.

21. In a digital differential analyzer defined by a plurality of integrator storage sections and defined by a plurality of digital positions in each integrator storage section in the plurality and having an interrelationship between the integrator storage sections in the plurality in accordance with a problem to be solved, means for sequentially presenting the integrator storage sections in the plurality and the successive digital positions in the integrator storage sections in the plurality for computation on a cyclic basis, means for providing signal indications digitally representing a dependent quantity for a particular integrator storage section in the plurality upon the presentation of the particular integrator storage section for computation, means for providing signal indications digitally representing a quantity external to the particular integrator storage section for comparison with the signal indications representing the dependent quantity for the particular integrator storage section, means responsive to the signal indications representing the dependent and external quantities for the particular integrator storage section for combining these signal indications upon the presentation of the particular integrator storage section for computation to obtain signal indications representing a difference or lack of difference in the comparison and representing the polarity of any difference, means responsive to the difference signals produced for the particular integrator storage section in each cycle of computation for producing signal indications representing increments in the dependent quantity in the successive cycles of computation, means for providing signal indications representing increments having a first polarity for the particular integrator storage section in alternate cycles of computation and having an opposite polarity for the particular integrator storage section in the other cycles of computation, means responsive to the signal indications representing the increments in the dependent quantity for each cycle of computation and the alternating increments for the particular integrator storage section in each cycle of computation for combining these signal indications upon the presentation of the particular integrator section for computation to obtain signal indications representing the new value of the dependent quantity for the particular integrator storage section, means for providing signal indications representing digital increments in an independent quantity for the particular integrator storage section upon each presentation of the integrator storage section for computation, means responsive to the signal indications representing the dependent quantity and the variations in the independent quantity for the particular integrator storage section for differentially combining these signal indications upon the presentation of the particular integrator storage section for computation to obtain signal indications representing a differential combination for the particular integrator storage section, means for providing signal indications representing an output quantity for the particular integrator storage section, and means responsive to the signal indications representing the output quantity and the differential combination for the particular integrator storage section for combining these signal indications upon the presentation of the particular integrator storage section for computation to obtain signal indications representing a new value of the output quantity for the particular integrator storage section.

22. In a digital differential analyzer defined by a plurality of integrator storage sections and defined by a plurality of digital positions in each integrator storage section in the plurality and having an interrelationship between the integrator storage sections in the plurality in accordance with a problem to be solved, means for sequentially presenting the integrator storage sections in the plurality and the successive digital positions in the integrator storage sections for computation on a cyclic basis, means for providing a plurality of channels for the storage of signal indications for the different integrator storage sections in the plurality, means for providing in a first channel in the plurality signal indications digitally representing a dependent quantity for a particular integrator storage section in the plurality upon the presentation of the particular integrator storage section for computation, means for introducing to the particular integrator storage section from a source external to the particular integrator storage section signal indications digitally representing an external quantity for comparison with the dependent quantity for the particular integrator storage section, means responsive to the signal indications representing the dependent quantity for the particular integrator storage section and the signal indications representing the external quantity for the particular integrator storage section for comparing the signal indications to produce signal indications representing any differences between the dependent quantity and the external quantity for the particular integrator storage section, means responsive to the signal indications representing the difference increments produced for the particular integrator storage section in each cycle of computation for storing in a second channel in the plurality the signal indications representing the difference increments produced for the particular integrator storage section and having a polarity opposite to such difference increment, means responsive to the signal indications representing the lack of occurrence of any difference increment in each cycle of computation for storing in the second channel in the plurality signal indications representing a value having a polarity dependent upon the polarity of the difference increment for the previous cycle of computation, means responsive to the signal indications in the second channel for the particular integrator storage section and the signal indications in the first channel for the particular integrator storage section in each cycle of computation for combining such signal indications to obtain for the particular integrator storage section signal indications representing a new value of the dependent quantity for the integrator storage section, means for providing signal indications representing digital increments in an independent quantity for the particular integrator storage section upon the presentation of the particular integrator storage section for computation and in accordance with the interrelationship between the particular integrator storage section and other integrator storage sections in the plurality, means for providing in a third channel in the plurality signal indications representing an output quantity for the particular integrator storage section upon the presentation of the particular integrator storage section for computation, and means responsive to the signal indications representing the dependent quantity and the output quantity for the particular integrator storage section for combining such signal indications upon the presentation of the particular integrator storage section for computation and in accordance with the signal indications representing the digital increments in the independent quantity for the particular integrator storage section to obtain signal indications representing a new value of the output quantity for the particular integrator storage section.

23. In a digital differential analyzer as set forth in previous claim 22, means for providing signal indications representing second increments in the dependent quantity for the particular integrator storage section, means responsive in each cycle of computation to the polarity of the second increments for the particular integrator storage section for inverting such increments, and means responsive to the signal indications in the first and second channels and the second increments in the dependent quantity for combining such signal indications upon the presentation of the particular integrator storage section for computation to obtain signal indications representing a new value of the dependent quantity for the particular integrator storage section.

References Cited in the file of this patent

UNITED STATES PATENTS

| | | |
|---|---|---|
| 2,665,410 | Burbeck | Jan. 5, 1954 |
| 2,665,411 | Frady | Jan. 5, 1954 |
| 2,712,414 | Ziebolz et al. | July 5, 1955 |
| 2,729,773 | Steele | Jan. 3, 1956 |
| 2,738,461 | Burbeck et al. | Mar. 13, 1956 |
| 2,815,168 | Zukin | Dec. 3, 1957 |
| 2,841,328 | Steele et al. | July 1, 1958 |
| 2,842,311 | Petrie | July 8, 1958 |
| 2,850,232 | Hagen et al. | Sept. 2, 1958 |
| 2,860,294 | Steele | Nov. 11, 1958 |
| 2,900,134 | Steele et al. | Aug. 18, 1959 |
| 2,900,135 | Benaglio et al. | Aug. 18, 1959 |
| 2,924,381 | Eckdahl | Feb. 9, 1960 |
| 2,932,471 | Exner | Apr. 12, 1960 |
| 2,982,470 | Evans | May 2, 1961 |

FOREIGN PATENTS

| | | |
|---|---|---|
| 165,783 | Australia | Oct. 26, 1955 |

OTHER REFERENCES

Nelson, E. C.: "A Digital Computer for Aireborne Control Systems," IRE Transactions on Electronic Computers, December 1952, pp. 2–5, TK 7885 A1 I2.

Scarbrough, A. D.: "An Analog-to-Digital Converter," IRE Transactions on Electronic Computers, September 1953 pp. 5–7, TK 7885 A1 I2.

Bolles, E. E.: "The Digitac Airborne Computer," 1954 IRE Convention Record, Part 5, pp. 72–76, TK 6541 155.

Grabbe et al.: Flight testing of an Airborne, Digital Computer, pp. 66 to 71 of the convention Record of the I.R.E., part 5, Aeronautical Electronics and Telemetry, March 22, to 25th, 1954.

Esener et al.: A Digital Autopilot Coupler, pages 174 to 177 of the Convention Record of the I.R.E., part 5, Aeronautical Electronics and Telemetry, March 22 to 25th, 1954.

Burbeck, D. W., et al.: "The Digitac Airborne Control Systems," Proceedings of the Western Computer Conference, April 1954, pp. 38–44 QA 76 A 55*t*.